US012240228B2

(12) United States Patent
Ching et al.

(10) Patent No.: US 12,240,228 B2
(45) Date of Patent: Mar. 4, 2025

(54) PRINT MEDIA CONVEYANCE METHOD AND APPARATUS THEREOF

(71) Applicant: Hand Held Products, Inc., Charlotte, NC (US)

(72) Inventors: Sze Ping Ching, Singapore (SG); Suraini Binte Saptu, Singapore (SG); Phek Thong Lee, Singapore (SG); Cheng Khoon Ng, Singapore (SG); Deenadayalan Durairaju, Singapore (SG); Florante Sumalinog Go, Singapore (SG); David Pratama Djayaputra, Singapore (SG); Eng Hing Lim, Singapore (SG); Rajan Narayanaswami, Singapore (SG); Yong Xing Shu, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 290 days.

(21) Appl. No.: 17/646,631

(22) Filed: Dec. 30, 2021

(65) Prior Publication Data

US 2022/0212483 A1 Jul. 7, 2022

Related U.S. Application Data

(60) Provisional application No. 63/201,659, filed on May 7, 2021, provisional application No. 63/145,865, filed (Continued)

(30) Foreign Application Priority Data

Oct. 12, 2021 (IN) ............................ 202111046460

(51) Int. Cl.
*B41J 11/04* (2006.01)
*B41J 2/44* (2006.01)
(Continued)

(52) U.S. Cl.
CPC .............. *B41J 11/04* (2013.01); *B41J 2/442* (2013.01); *B41J 11/005* (2013.01); (Continued)

(58) Field of Classification Search
CPC . B41J 11/04; B41J 11/42; B41J 11/005; B41J 11/0095; B41J 15/046; B41J 2/442; (Continued)

(56) References Cited

U.S. PATENT DOCUMENTS 5,831,655 A 11/1998 Asawa et al.
7,036,923 B2 5/2006 Takagi et al.
(Continued)

FOREIGN PATENT DOCUMENTS

EP 2952357 A1 12/2015
JP 62-149455 A 7/1987
(Continued)

OTHER PUBLICATIONS

JP Office Action Mailed on Mar. 4, 2024 for JP Application No. 2023025923, 8 page(s).
(Continued)

*Primary Examiner* — Henok D Legesse
(74) *Attorney, Agent, or Firm* — Alston & Bird LLP

(57) ABSTRACT

Examples of the present disclosure relate generally to a printing apparatus and, more particularly, to apparatuses, systems, and methods for printing utilizing laser print head and reactive media.

8 Claims, 117 Drawing Sheets

Related U.S. Application Data on Feb. 4, 2021, provisional application No. 63/133,685, filed on Jan. 4, 2021.

(51) Int. Cl.

| | |
|---|---|
| ***B41J 11/00*** | (2006.01) |
| ***B41J 11/42*** | (2006.01) |
| ***B41M 5/00*** | (2006.01) |
| ***B65H 23/038*** | (2006.01) |
| *B41J 2/435* | (2006.01) |
| *B41J 15/04* | (2006.01) |
| *B41M 5/26* | (2006.01) |

(52) U.S. Cl.

CPC ............ *B41J 11/0095* (2013.01); *B41J 11/42* (2013.01); *B41M 5/00* (2013.01); *B65H 23/038* (2013.01); *B41J 2/435* (2013.01); *B41J 15/046* (2013.01); *B41M 5/26* (2013.01); *B65H 2513/51* (2013.01); *B65H 2513/52* (2013.01); *B65H 2801/12* (2013.01)

(58) Field of Classification Search

CPC . B41J 2/435; B41M 5/26; B41M 5/00; B65H 2513/51; B65H 2513/52; B65H 2801/12; B65H 23/038

See application file for complete search history.

(56) References Cited

U.S. PATENT DOCUMENTS

| | | | |
|---|---|---|---|
| 8,432,428 B2 | 4/2013 | Moisa et al. | |
| 2004/0257428 A1 | 12/2004 | Sato et al. | |
| 2005/0018029 A1* | 1/2005 | Takagi | B41J 15/048 347/104 |
| 2007/0188576 A1 | 8/2007 | Snyder et al. | |
| 2011/0063374 A1 | 3/2011 | Rea et al. | |
| 2014/0028747 A1 | 1/2014 | Chappell et al. | |
| 2015/0362875 A1 | 12/2015 | Ono | |
| 2018/0147866 A1 | 5/2018 | Ramis Llinares et al. | |
| 2019/0248165 A1* | 8/2019 | Matsuo | G03G 15/6567 |
| 2019/0389211 A1 | 12/2019 | Yap et al. | |
| 2020/0009887 A1 | 1/2020 | Caga-Anan et al. | |

FOREIGN PATENT DOCUMENTS

| | | |
|---|---|---|
| JP | 63-276572 A | 11/1988 |
| JP | 2005-001139 A | 1/2005 |
| JP | 2009-031401 A | 2/2009 |

OTHER PUBLICATIONS

European search report Mailed on Jul. 11, 2023 for EP Application No. 23157650, 11 page(s).

European search report Mailed on Jun. 13, 2022 for EP Application No. 22150080.

EP Office Action Mailed on Jul. 15, 2024 for EP Application No. 22150080, 5 page(s).

English translation of JP Decision to Grant dated Sep. 2, 2024 for JP Application No. 2023025923, 2 page(s).

JP Decision to Grant Mailed on Sep. 2, 2024 for JP Application No. 2023025923, 3 page(s).

Non-Final Rejection Mailed on Nov. 6, 2024 for U.S. Appl. No. 18/166,370, 12 page(s).

* cited by examiner

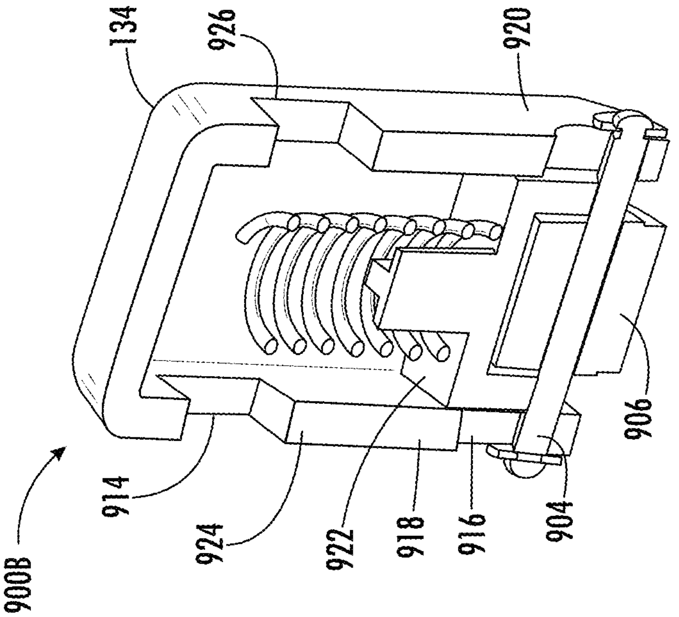
FIG. 9B
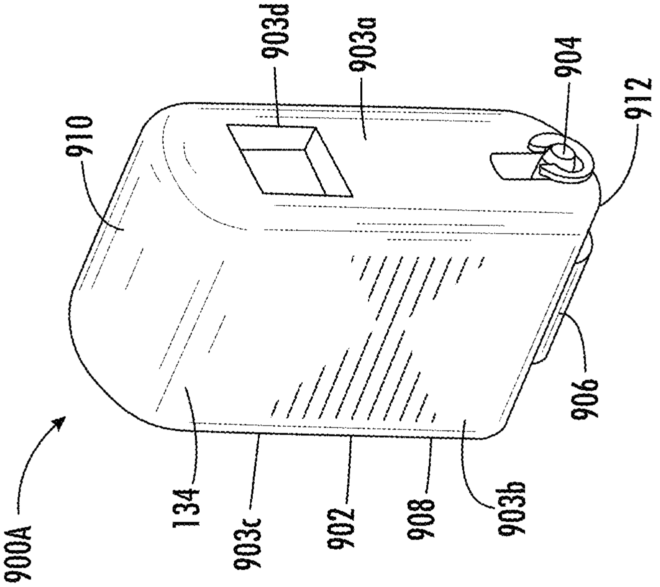
FIG. 9A
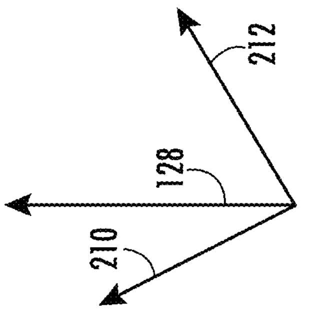

PRISM BOX AT MINIMUM EXPANSION

PRISM BOX AT MAXIMUM EXPANSION

10000A

10000C

PRINT MEDIA CONVEYANCE METHOD AND APPARATUS THEREOF

CROSS-REFERENCE TO RELATED APPLICATIONS

This application claims priority to U.S. Application No. 63/133,685, filed Jan. 4, 2021, U.S. Application No. 63/145,865, filed Feb. 4, 2021, U.S. Application No. 63/201,659, filed May 7, 2021, and Indian Application No. 202111046460, filed Oct. 12, 2021, the contents of which are hereby incorporated herein in their entirety by reference.

TECHNICAL FIELD

Example embodiments of the present disclosure relate generally to a printing apparatus and, more particularly, to apparatuses, systems, and methods for printing utilizing laser print head and reactive media.

BACKGROUND

A typical printing apparatus may include a print head that may be configured to print content on print media. In some examples, the printing apparatus may be configured to print content using one or more known technologies such as laser printing, thermal printing, and/or the like.

BRIEF SUMMARY

In accordance with various examples of the present disclosure a method is provided. The method may comprise: actuating, by a processor, a first roller and a second roller to cause traversal of print media along a first direction, wherein the first roller is positioned upstream of the second roller along the first direction; causing, by the processor, the first roller to stop rotating at a first time instant; and causing, by the processor, the second roller to stop rotating at a second time instant, wherein the second time instant is chronologically later than the first time instant.

In some examples, the method may comprise causing a print head to print content on the print media in response to stopping the rotation of the second roller.

In some examples, the first roller is positioned upstream of the print head, and the second roller is positioned downstream of the print head.

In some examples, the method further comprises causing a traversal of the first roller and the second roller along a second direction, wherein the traversal of the first roller and the second roller along the second direction causes the first roller and the second roller to be spaced apart from the print media.

In some examples, the method further comprises determining a time period between the first time instant and the second time instant based on one or more print media characteristics, wherein the one or more print media characteristics comprises at least one of a type of the print media, or a thickness of the print media.

In accordance with various examples of the present disclosure, a printing apparatus is provided. The printing apparatus may comprise: a print head assembly comprising at least a bottom chassis portion configured to receive a print media, and a frame movably positioned above the bottom chassis portion along a vertical axis of the printing apparatus, wherein the frame is movable between a first position and a second position, wherein the frame, in the first position, is spaced apart from the bottom chassis portion and wherein the frame, in the second position, presses the print media against the bottom chassis portion.

In accordance with various examples of the present disclosure, a printing apparatus is provided. In some examples, the printing apparatus may comprise: a first roller; a second roller positioned downstream of the first roller along a first direction, wherein the first roller and the second roller facilitate traversal of print media in the first direction; a processor communicatively coupled to the first roller and the second roller; wherein the processor is configured to: actuate the first roller and the second roller to cause traversal of the print media in the first direction, cause the first roller to stop rotating at a first time instant; and cause the second roller to stop rotating at a second time instant, wherein the second time instant is chronologically later than the first time instant.

In some examples, each of the first roller and the second roller comprises a biasing member and a roller, wherein the biasing member is coupled to the roller, wherein the biasing member is configured to apply a biasing force on the roller, along a second direction, causing the roller to abut the print media.

In accordance with various examples of the present disclosure a computer-implemented method is provided. The computer-implemented method may comprise: triggering an ultraviolet (UV) light emission from a UV light source onto a print media associated with a printing apparatus; detecting a reflected light from the print media; generating a light intensity indication based on the reflected light; and determining whether the print media is supported by the printing apparatus based on whether the light intensity indication satisfies a light intensity threshold.

In some examples, the computer-implemented method further comprises: determining that the light intensity indication satisfies the light intensity threshold; and in response to determining that the light intensity indication satisfies the light intensity threshold, determining that the print media is supported by the printing apparatus.

In some examples, the computer-implemented method further comprises determining that the light intensity indication does not satisfy the light intensity threshold; and in response to determining that the light intensity indication does not satisfy the light intensity threshold, determining that the print media is not supported by the printing apparatus.

In accordance with various examples of the present disclosure, a printing apparatus is provided. In some examples, the printing apparatus may comprise: a laser print head; and at least a first laser source and a second laser source in electronic communication with the laser print head.

In accordance with various examples of the present disclosure, a print media is provided. In some examples, the print media may comprise: a laser markable coating defining a top layer of the print media; and a reflective layer defining an intermediary layer of the print media.

In accordance with various examples of the present disclosure a computer-implemented method is provided. The computer-implemented method may comprise: receiving, by a controller of a print head of a printing apparatus, print data indicating at least a first power level; receiving, by the controller, a darkness setting input; adjusting, by the controller, the first power level to a second power level based at least in part on the darkness setting input; receiving, by the controller, a contrast setting input; adjusting, by the controller, the second power level to a third power level based at least in part on the contrast setting input; and providing, by the controller, the third power level to a laser power control system of the print head.

In some examples, the first power level is associated with a first dot to be printed by the print head on a print media.

In some examples, the laser power control system of the print head is configured to cause a laser subsystem of the print head to print the first dot at the third power level.

In accordance with various examples of the present disclosure a computer-implemented method is provided. The computer-implemented method may comprise: determining, by a controller of a print head of a printing apparatus, print data; determining, by the controller and based at least in part on the print data, a target print speed; and determining, by the controller and based at least in part on the target print speed, a target media temperature.

In some examples, the target print speed is determined based at least in part on a lookup table.

In some examples, the computer-implemented method further comprises: in response to determining, by the controller, that a current media temperature is within a predetermined range of the target media temperature, providing, by the controller, a control indication to cause at least one laser of the printing apparatus to perform power compensation operations.

In accordance with various examples of the present disclosure, a printing apparatus is provided. In some examples, the printing apparatus may comprise: a laser print head; and at least a first laser source in electronic communication with the laser print head, wherein the laser print head is configured to generate at least one laser control signal in order to generate a pre-emphasis driving signal at the start of at least one print dot for a time period that is less than the overall dot time.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 9A and FIG. 9B illustrate a side view and a sectional view of the second roller, according to one or more embodiments described herein;

FIG. 108 is a schematic diagram depicting an example portion of a printing apparatus in accordance with examples of the present disclosure;

FIG. 109 is a schematic diagram depicting an example portion of a printing apparatus in accordance with examples of the present disclosure;

FIG. 110 illustrates an example graph in accordance with examples of the present disclosure;

FIG. 111 is a schematic diagram depicting an example portion of a printing apparatus in accordance with examples of the present disclosure; and FIG. 112 is an example flow diagram illustrating an example method in accordance with examples of the present disclosure.

DETAILED DESCRIPTION OF THE INVENTION

Figure 1:
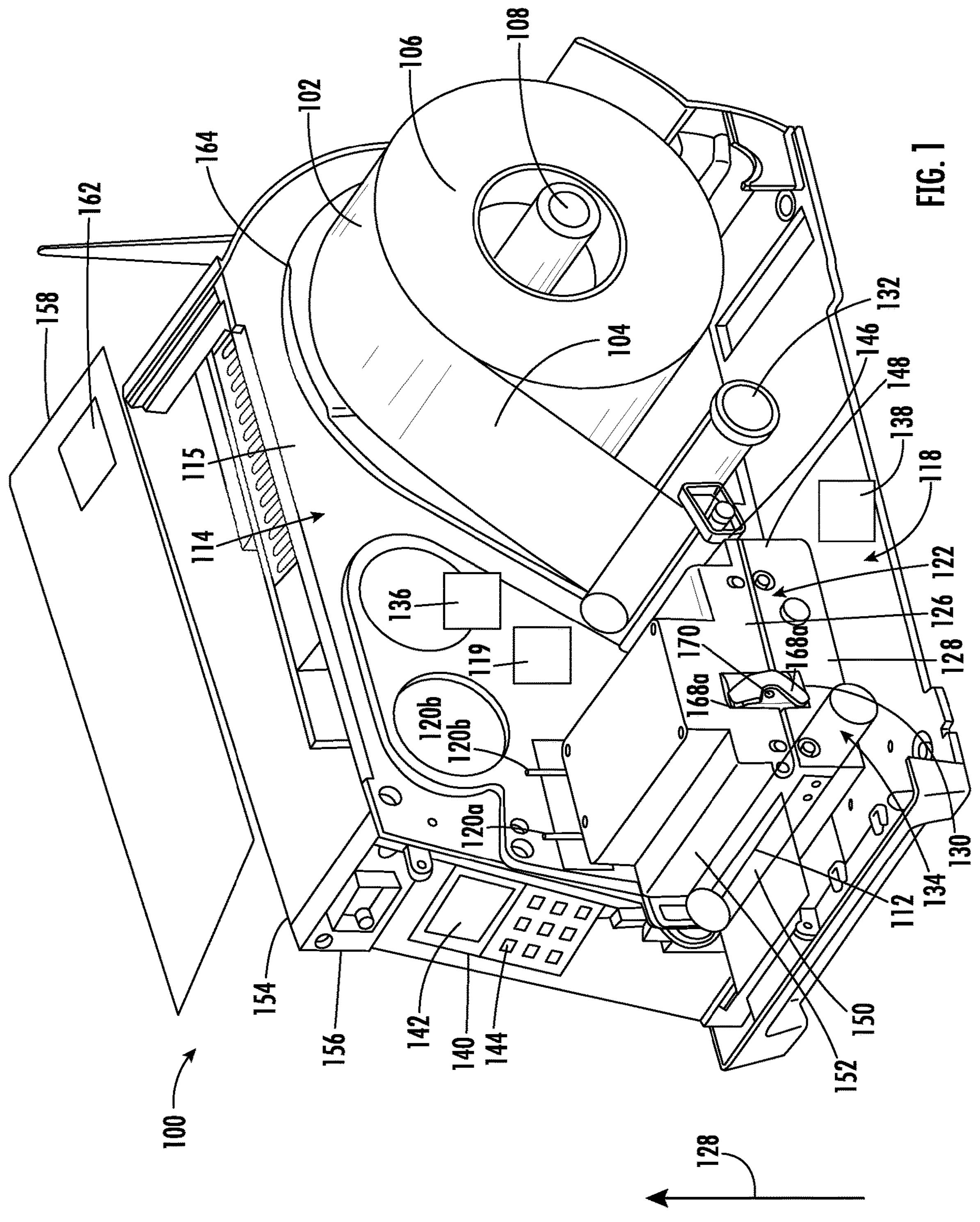
FIG. 1 illustrates a perspective view of a printing apparatus, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example, but not limited to, system bus, wired Ethernet) and/or wireless means (for example, but not limited to, Wi-Fi, Bluetooth, ZigBee), such that data and/or information may be transmitted to and/or received from these components.

The term "print media," refers to tangible, substantially durable physical material onto which text, graphics, images and/or the like may be imprinted and persistently retained over time. For example, print media generally take the form of derivatives of one or more of wood pulp or polymers, and may include conventional office paper, clear or tinted acetate media, newsprint, envelopes, mailing labels, product labels, and other kinds of labels. Thicker materials, such as cardstock or cardboard may be included as well. In exemplary embodiments discussed herein, reference may be made specifically to "paper" or "labels"; however, the operations, system elements, and methods of such exemplary applications may be applicable to media other than or in addition to the specifically mentioned "paper" or "labels." Physical print media may be used for personal communications, business communications, and/or the like to convey prose expression (including news, editorials, product data, academic writings, memos, and many other kinds of communications), data, advertising, fiction, entertainment content, and illustrations and pictures.

The terms "printer" and "printing apparatus" refer to a device that may imprint texts, images, shapes, symbols, graphics, and/or the like onto print media to create a persistent, human-viewable representation of the corresponding texts, images, shapes, symbols, graphics, and/or the like. Printers may include, for example, laser printers.

Further, the various embodiments disclosed herein is to describe a printing apparatus that capable of printing content using laser beams. More particularly, the disclosed embodiments disclose printing apparatus that is capable to utilize laser to directly write content on the print media. Further, such printing apparatus may be capable of printing more than 7000 labels in a day. Further, the printing apparatus disclosed herein is capable of printing content at multiple resolutions (varying from 200 dpi to 600 dpi) and at multiple speeds (6 IPS to 12 IPS). By removing the reliance on the thermal print ribbon and thermal print head, the overall running cost of the printing apparatus is reduced.

Further, the printing apparatus is capable of printing content, using one or more laser beams, on media have a predefined chemical compositions. In some examples, the printing apparatus may include a laser print head having one or more laser sources that are configured to facilitate direct printing, using one or more laser beams emanating from the one or more laser source, of content on print media. Further and in some examples, the print media may have a predefined chemical composition that, in an instance in which it is exposed or otherwise contacted with energy from one or more laser beams, facilitate the print media to change color. Direct printing content on the print media allows fast printing of the content in comparison to the conventional printers.

Exemplary Printer Apparatus Structure

FIG. 1 illustrates a perspective view of a printing apparatus 100, according to one or more embodiments described herein. While not shown in FIG. 1, the printing apparatus 100 may comprise a power source.

The printing apparatus 100 may include a media supply roll 102. The media supply roll 102 may comprise print media 104 that may be wound on the media supply spool 106. In the example shown in FIG. 1, the printing apparatus 100 may comprise a media supply spindle 108, and the media supply spool 106 that may be configured to be disposed on the media supply spindle 108. In some examples, the media supply spindle 108 may comprise a media sensor (not shown) that may facilitate determining whether the media supply spool 106 is loaded on the media supply spindle 108. Some examples of the media sensor may include, but are not limited to, encoder wheel, photo sensor, and/or the like. In some examples, the printing apparatus 100 may support print media 104 of different width and size.

In some examples, the printing apparatus 100 may comprise a media guiding spindle 110, which may be positioned to guide the print media 104 from the media supply roll 102 to travel in a print direction along a print path within the printing apparatus 100. In some examples, the print path may correspond to a path between the media supply spindle 108 to an exit slit 112 along which the print media 104 travels. Further, in some examples, the print direction may correspond to a direction along which the print media 104 travels for the printing operation. For example, along the print direction, the print media 104 travels from the media supply spool 106 towards the exit slit 112. Further, a direction opposite to the print direction (e.g., from exit slit 112 to the media supply spool 106) is referred to as a retract direction. In some examples, after texts, graphics, images, and/or the like (as applicable) are imprinted on the print media 104, the print media 104 may exit from the printing apparatus 100 from the exit slit 112.

In some examples, the printing apparatus 100 may comprise a first actuation unit 119 that may facilitate rotating the media supply spool 106 and the media guiding spindle 110 in an anti-clockwise rotational direction, causing the print media 104 to travel in the print direction along the print path. Additionally, or alternatively, the first actuation unit 119 may facilitate rotating of the media supply spool 106 and/or the media guiding spindle 110 in a clockwise rotational direction causing the print media 104 to travel in the retract direction. In an example embodiment, the first actuation unit 119 may include one or more of motors that may be, directly or indirectly, coupled to the media supply spool 106 and the media guiding spindle 110. The one or more motors may facilitate rotating the media supply spool 106 and the media guiding spindle 110.

In some examples, the media supply spindle 108 and/or the media guiding spindle 110 may be eliminated, and the print media 104 may be fed into the printing apparatus 100 through an opening slit (not shown), and may exit from the printing apparatus 100 through an exit slit 112.

Additionally, or alternately, the printing apparatus 100 may comprise a back-spine section 114. In some examples, the back-spine section 114 may be made of material having rigid characteristics, such as aluminum alloy, stainless steel, and/or the like. In some examples, the back-spine section 114 may comprise a first surface 115. The first surface 115 may be in a perpendicular arrangement with a printer base 118.

In some examples, the print head engine 122 may be coupled to the back-spine section 114 of the printing apparatus 100. In an example embodiment, the print head engine includes a top chassis portion 126 and a bottom chassis portion. In some examples, the bottom chassis portion 128 may be fastened to the first surface 115 of the back-spine section 114. In some examples, the bottom chassis portion 128 may be positioned under the top chassis portion 126 along the vertical axis 128 and may be configured to receive the print media 104 from the media supply roll 102.

In some examples, the top chassis portion 126 includes print head that is configured to print content on the print media 104. It may be required that print head is kept fixed in the printing apparatus 100. To this end, in some scenarios, it may be required to load print media 104 in the printing apparatus 100 such that the print media 104 traverses between the top chassis portion 126 and the bottom chassis portion 128. For smooth loading of the print media 104, the bottom chassis portion 128 may be movable with respect to the top chassis portion 126. For example, complete bottom chassis portion 128 is pivotally movable with respect to the top chassis portion 126. Additionally, or alternatively, instead of the complete bottom chassis portion 128 being movable with respect to the top chassis portion 126, a portion of the bottom chassis portion 128 may be movable with respect to the top chassis portion 126. Additionally, or alternatively, a portion of the top chassis portion 126 may be movable with respect to the bottom chassis portion 128. Such modular movement top chassis portion 126 and the bottom chassis portion 128 with respect to each other allows loading of the print media 104 in the printing apparatus. Further, such arrangement allows clearing of the media jam. In an alternate embodiment, the top chassis portion 126 may be movable with respect to the bottom chassis portion 128. For example, the top chassis portion 126 may be pivotally coupled to the bottom chassis portion 128. For example, a first end portion 146 (defined to be proximal to the media supply spool 106) of the top chassis portion 126 is pivotally coupled to a first end portion 148 (defined to be proximal to the media supply spool 106) of the bottom chassis portion 128. To this end, the top chassis portion 126 may be configured to rotate about the first end portion 148 of the bottom chassis portion 128. In some examples, the top chassis portion 126 may be biased to rotate in a clockwise direction about the first end portion 148 of the bottom chassis portion 128, when no external force is applied on the top chassis portion 126. To this end, the top chassis portion 126 may be in an open state when no external force is applied on the top chassis portion 126.

In some examples, when an external force is applied to the top chassis portion 126, the top chassis portion 126 may rotate in a counter-clockwise direction about the first end portion 148 of the bottom chassis portion 128. In such an embodiment, the top chassis portion 126 may travel (i.e., by rotating in a counterclockwise direction about the first end portion 148 of the bottom chassis portion 128) towards the bottom chassis portion 128. In some examples, the top chassis portion 126 may travel towards the bottom chassis portion 128 until the top chassis portion 126 is additionally coupled to the bottom chassis portion 128 through a latch 130.

In some examples, the scope of the disclosure is not limited to the top chassis portion 126 pivotally coupled to the bottom chassis portion 128 at the first end portion 148 of the bottom chassis portion 128. In an example embodiment, the top chassis portion 126 may be pivotally coupled to the second end portion 150 (defined to be distal from the media supply spool 106) of the coupled to the bottom chassis portion 128. For example, the second end portion 152 of the top chassis portion 126 may be pivotally coupled to the second end portion 150 of the bottom chassis portion 128. To this end, the top chassis portion 126 may be configured to rotate about the second end portion 150 of the bottom chassis portion 128. In some examples, the top chassis portion 126 may be biased to rotate in a counterclockwise direction about the first end portion 148 of the bottom chassis portion 128, when no external force is applied on the top chassis portion 126. To this end, the top chassis portion 126 may be in an open state when no external force is applied on the top chassis portion 126.

In some examples, when an external force is applied to the top chassis portion 126, the top chassis portion 126 may rotate in a clockwise direction about the second end portion 150 of the bottom chassis portion 128. In such an embodiment, the top chassis portion 126 may travel (i.e., by rotating in a clockwise direction about the second end portion 150 of the bottom chassis portion 128) towards the bottom chassis portion 128. In some examples, the top chassis portion 126 may travel towards the bottom chassis portion 128 until the top chassis portion 126 is additionally coupled to the bottom chassis portion 128 through the latch 130.

In some examples, the latch 130 may be pivotally coupled to the bottom chassis portion 128. For example, the latch 130 may be coupled to the bottom chassis portion 128 through a biasing member (not shown). Some examples of the biasing member may include a spring, a cam, or other structure configured to exert a constant biasing force.

More particularly, the latch 130 may be coupled proximal to the second end portion 150 of the bottom chassis portion 128 and distal from the first end portion 148 of the bottom chassis portion 128. The latch 130 may have a U-shape that may include the depression portion 166 and one or more raised portions 168*a* and 168*b*. Further, the depression portion 166, the raised portions 168*a* and 168*b* face towards the second end portion 150 of the bottom chassis portion 128. The raised portion 168*a* is coupled to the bottom chassis portion 128, while the raised portion 168*b* is positioned distal from the raised portion 168*a*. In some examples, the depression portion 166 is positioned between the raised portion 168*a* and the raised portion 168*b*.

To latch the top chassis portion 126 with the bottom chassis portion 128, the top chassis portion 126 may define a protrusion 170 that is received within the depression portion 166 of the latch 130. To decouple the top chassis portion 126 from the bottom chassis portion 128, the latch 130 is rotated to cause the protrusion 170 to leave the depression portion 166. Thereafter, the top chassis portion 126 may rotate in a clockwise direction to be in the open state. In some examples, the scope of the disclosure is not limited to the latch 130 coupled to the bottom chassis portion 128. In an example embodiment, the latch 130 may be coupled to the top chassis portion 126.

Alternatively, or additionally, the top chassis portion 126 may be fixed to the back-spine section 114, while the bottom chassis portion 128 may be pivotally coupled to the top chassis portion 126. In such an embodiment, the bottom chassis portion 128 may be configured to rotate between the open state and the closed state. In the open state, the bottom chassis portion 128 may tilt in a downward direction (along the vertical axis 128) with respect to the top chassis portion 126. In the closed state, the bottom chassis portion 128 may be configured to be coupled to the top chassis portion 126 through the latch 130. Further, in such an embodiment, the latch 130 may be coupled to the top chassis portion 126. In another embodiment, the latch may be coupled to the bottom chassis portion 128, without departing from the scope of the disclosure. One such structure of the print head engine 122 is further described in conjunction with FIG. 39.

Figure 39:
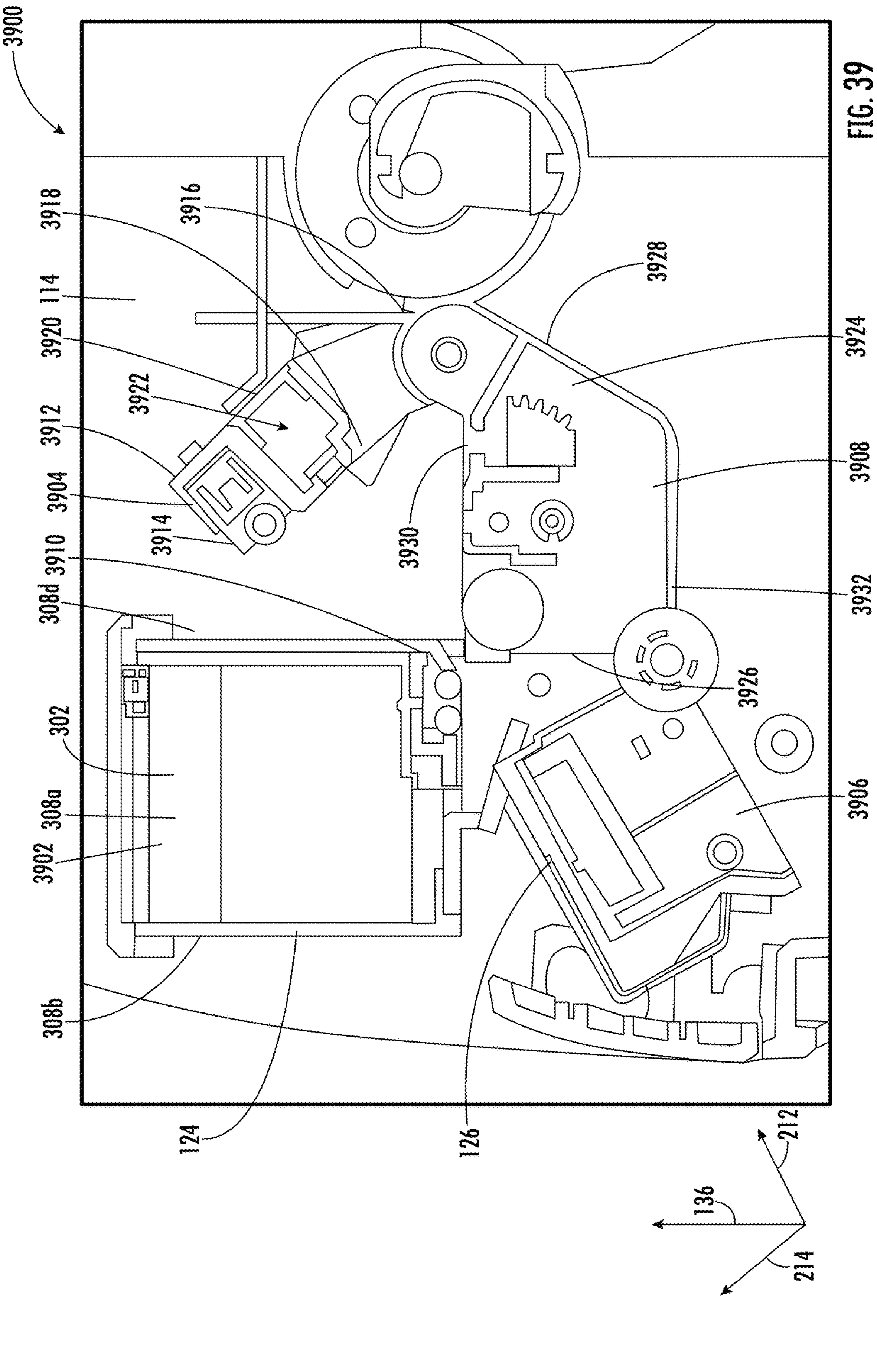
FIG. 39 illustrates a sectional view of the print head engine, according to one or more embodiments described herein.

FIG. 39 illustrates a sectional view 3900 of the print head engine 122, according to one or more embodiments described herein.

As discussed, the print head engine 122 includes the top chassis portion 126 and the bottom chassis portion 128. In an example embodiment, the top chassis portion 126 may include a first top chassis module 3902 and a second top chassis module 3904. Similarly, the bottom chassis portion 128 may comprise a first bottom chassis module 3906 and a second bottom chassis module 3908.

In an example embodiment, the first top chassis module 3902 may be configured to receive the print head 302. Further, the first top chassis module 3902 may be fixedly coupled to the back-spine section 114 of the printing apparatus 100. In an example embodiment, a shape of the first top chassis module 3902 may correspond to a polygon that having the one or more sides 308*a*, 308*b*, and 308*d*. As discussed, sides 308*b* and 308*d* are spaced apart from each other along the lateral axis 212. The side 308*d* may be configured to receive another latch 3910. Further, as discussed, the side 308*a* may be configured to receive the latch 130 (not shown in FIG. 39).

In an example embodiment, the second top chassis module 3904 may be pivotally coupled to the bottom chassis portion 128 of the print head engine 122 so as to allow for media loading in some examples. More particularly, the second top chassis module 3904 may be pivotally coupled to the second bottom chassis module 3908. In an example embodiment, the second top chassis module 3904 may have an outer surface 3912 that may define a first end portion 3914 and a second end portion 3916. In an example embodiment, the second end portion 3916 may be spaced apart from the first end portion 3914 along the lateral axis 212 of the print head engine 122. Further, the second end portion 3916 of the second top chassis module 3904 may be pivotally coupled to the bottom chassis portion 128. Additionally, or alternately, the outer surface 3912 may define a bottom end portion 3918 and a top end portion 3920. In some examples, the bottom end portion 3918 of the second top chassis module 3904 may be configured to receive a roller assembly (further described later) and a media sensor 3922. In some examples, the media sensor 3922 may be configured to detect a presence of the print media 104 between the top chassis portion 126 and the bottom chassis portion 128.

In an example embodiment, the second top chassis module 3904 may be configured to traverse between a first position and a second position with respect to the bottom chassis portion 128 of the print head engine 122. More particularly, the second top chassis module 3904 may be configured to pivotally traverse between the first position and the second position. In the first position, the first end portion 3914 of the second top chassis module 3904 may be positioned away from the bottom chassis portion 128. In the second position, the first end portion 3914 of the second top chassis module 3904 may be coupled to the first top chassis module 3902 through the latch 3910. In some examples, the second top chassis module 3904 may be biased to be in the second position. Therefore, when not external force is applied to the second top chassis module 3904 and the second top chassis module 3904 is not coupled to the latch 3910, the second top chassis module 3904 may traverse to the second position.

In some examples, the second bottom chassis module 3908 may be fixedly coupled to the back-spine section 114 of the printing apparatus 100. In some examples, second bottom chassis module 3908 may have an outer surface 3924 that may define a first end portion 3926 and a second end portion 3928. The first end portion 3926 may be spaced apart from the second end portion 3928 along the lateral axis 212 of the print head engine 122. Additionally, the outer surface 3924 of the second bottom chassis module 3908 may define a top end portion 3930 and a bottom end portion 3932. The top end portion 3930 may be spaced apart from the bottom end portion 3932 along the vertical axis 128. The top end portion 3930 of the second bottom chassis module 3908 may define an edge with the second end portion 3928 of the second bottom chassis module 3908. In some examples, the second top chassis module 3904 may be pivotally coupled with the edge between the second end portion 3928 and the second bottom chassis module 3908. Further, the bottom end portion 3932 of the second bottom chassis module 3908 may define an edge with the first end portion 3926 of the second bottom chassis module 3908. In some examples, the second top chassis module 3904 may be pivotally coupled with the edge between the first end portion 3926 of the first bottom chassis module 3906 and bottom end portion 3932 of the second bottom chassis module 3908.

In an example embodiment, the first bottom chassis module 3906 may be pivotally coupled to the second bottom chassis module 3908. In some examples, the first bottom chassis module 3906 may traverse between the first position and the second position. In the first position, the first bottom chassis module 3906 may positioned away from the top chassis portion 126. In the second position, the first bottom chassis module 3906 may be coupled to the top chassis portion 126 through the latch 130. In an example embodiment, the first bottom chassis module 3906 may be biased in the first position. For example, when no external force is applied on the first bottom chassis module 3906 and when the first bottom chassis module 3906 is decoupled from the top chassis portion 126, the first bottom chassis module 3906 may traverse to the first position.

To load the print media 104, the second top chassis module 3904 is traversed to the first position with respect to the bottom chassis portion 128. Additionally, the first bottom chassis module 3906 is traversed to the first position. Once in the first position, the second top chassis module 3904 and the first bottom chassis module 3906 are positioned away from the bottom chassis portion 128 and the top chassis portion 126, respectively thereby creating enough space in the print head engine 122 to allow an operator of the printing apparatus 100 to load print media 104 in the printing apparatus 100.

In some examples, the scope of the disclosure is not limited to the top chassis portion 126 being pivotally coupled to the bottom chassis portion 128. In alternative or additional embodiments, the top chassis portion 126 may, in some embodiments, completely decouple from the bottom chassis portion 128. For example, the top chassis portion 126 may be configured to travel along a vertical axis 128 with respect to the bottom chassis portion 128. In such an embodiment, in some examples, at least one linear guide may be disposed on a surface of an example back-spine section of an example printer body. In some examples, each of at least one linear guide may comprise a corresponding linear rail and a corresponding linear block. In some examples, the corresponding linear rail may be fastened to the first surface of the back-spine section through, for example, bolts, screws, and/or the like. In some examples, the corresponding linear block may be coupled to the corresponding linear rail through, for example, ball bearings, rollers, and/or the like, such that the corresponding linear block may move and/or slide along the corresponding linear rail. Example linear guides may include, but are not limited to, rolling element linear motion bearing guides, sliding contact linear motion bearing guides, and/or the like.

For example, in FIG. 1, a first linear guide 120A and a second linear guide 120B may be disposed on the first surface 115. The first linear guide 120A may, for example, comprise a linear rail fastened to the first surface 115 of the back-spine section 114, as well as a corresponding linear block (not shown) that is coupled to the linear rail and movable along the linear rail. Additionally, or alternatively, the second linear guide 120B may comprise a linear rail disposed on the first surface 115 of the back-spine section 114, and a corresponding linear block. In an example embodiment, the first linear guide 120A and the second linear guide 120B are positioned parallel to each other and may be positioned along a vertical axis 128 of the printing apparatus 100.

In some examples, a print head engine 122 of the printing apparatus 100 may be coupled to the first linear guide 120A and the second linear guide 120B through the corresponding linear block of the first linear guide 120A and second linear guide 120B, respectively. In an example embodiment, the print head engine 122 comprises a top chassis portion 126 and a bottom chassis portion 128. In some examples, the top chassis portion 126 of the print head engine 122 may be coupled to the first linear guide 120A and the second linear guide 120B, respectively. Further, in some examples, as the top chassis portion 126 may move along the linear rail(s) of first linear guide 120A and/or the second linear guide 120B along the vertical axis 128 of the printing apparatus 100.

In some examples, the bottom chassis portion 128 may be fastened to the first surface 115 of the back-spine section 114. In some examples, the bottom chassis portion 128 may be positioned under the top chassis portion 126 along the vertical axis 128 and may be configured to receive the print media 104 from the media supply roll 102.

In some examples, as the top chassis portion 126 may move along the vertical axis 128 along its corresponding travel path, the top chassis portion 126 may reach and/or be positioned at a bottom point of the travel path in the vertical axis 128. When the top chassis portion 126 is positioned at the bottom point, the top chassis portion 126 may be removably coupled to the bottom chassis portion 128 through the latch 130.

Additionally, or alternatively, the printing apparatus 100 includes a first roller 132 and a second roller 134. In an example embodiment, the first roller 132 may be positioned upstream of the print head engine 122 (along the print direction) and the second roller 134 may be positioned downstream of the print head engine 122 (along the print direction). The first roller 132 and the second roller 134 may facilitate the traversal of the print media 104 along the print path. Some examples of the first roller 132 and the second roller 134 may include, but are not limited to, a platen roller, a pinch roller, an idle roller, and/or the like. As depicted in FIG. 1, the first roller 132 and the second roller 134 may correspond to a single roller that may be rotatably coupled to the back-spine section 114 of the printing apparatus 100. However, in some examples, the scope of the disclosure is not limited to the first roller 132 and the second roller 134 being single rollers coupled to the back-spine section 114 of the printing apparatus 100. In an example embodiment, the first roller 132 and the second roller 134 may be part of a roller assembly, as is further described in FIGS. 2A-2B through FIGS. 10A-10B.

In an example embodiment, the first roller 132 and the second roller 134 may be communicatively coupled to the first actuation unit 119. The first actuation unit 119 may cause the first roller 132 and the second roller 134 to rotate either in a clockwise direction or in an anti-clockwise direction to facilitate print media traversal in the print direction or in the retract direction, respectively. Since the first roller 132 and the second roller 134 are coupled to the first actuation unit 119 and the first actuation unit 119 is coupled to the media supply spool 106, in some examples, the media supply spool 106, the first roller 132 and the second roller 134 may operate synchronously. In some examples, the scope of the disclosure is not limited to the media supply spool 106, the first roller 132 and the second roller 134 to operate synchronously. In an example embodiment, the media supply spool 106, the first roller 132 and the second roller 134 may operate asynchronously. To this end, the first actuation unit 119 may cause the media supply spool 106, the first roller 132 and the second roller 134 to start rotating and/or the stop rotating at different time instants. In such an example, the media supply spool 106, the first roller 132 and the second roller 134 may be coupled to the first actuation unit 119 through different gear assemblies (not shown) which may enable the asynchronous operation of the media supply spool 106, the first roller 132 and the second roller 134. Alternatively or additionally, the printing apparatus 100 may include separate actuation units for each of the media supply spool 106, the first roller 132 and the second roller 134 to achieve the asynchronous operation amongst the media supply spool 106, the first roller 132 and the second roller 134. For example, the first roller 132 and media supply spool 106 may be coupled to the first actuation unit 119, while the second roller 134 may be coupled to a second actuation unit 136. In an example embodiment, the second actuation unit 136 may be similar to the first actuation unit 119. All the embodiments and/alternative applicable of the first actuation unit 119 also apply to the second actuation unit 136.

For the purpose of ongoing description, the media supply spool 106, the first roller 132 and the second roller 134 are considered to operate asynchronously.

In an example embodiment, the printing apparatus 100 may further include a control unit 138 that may be communicatively coupled to the first actuation unit 119 and the second actuation unit 136. In some examples, the control unit 138 may be configured to control the operation of the printing apparatus 100 to cause the printing apparatus 100 to print content on the print media 104. In another example, the control unit 138 may be configured to cause the print media traversal along the print direction. The structure and the operation of the control unit 138 is further described in conjunction with FIG. 12.

In some examples, the printing apparatus 100 may include a user interface (UI) 140 for enabling communications between a user and the printing apparatus 100. The UI 140 may be communicatively coupled to other components of the printing apparatus 100 for displaying visual and/or auditory information and/or for receiving information from the user (e.g., typed, touched, spoken, etc.).

In the example shown in FIG. 1, the printing apparatus 100 may include the UI 140 with, for example, a display 142 and a keypad 144. The display 142 may be configured to display various information associated with the printing apparatus 100. The keypad 144 may comprise function buttons that may be configured to perform various typical printing functions (e.g., cancel print job, advance print media, and the like) or be programmable for the execution of macros containing preset printing parameters for a particular type of print media. In some examples, the UI 140 may be electronically coupled to a controller (such as a control unit 138) for controlling operations of the printing apparatus 100, in addition to other functions. The UI 140 may be supplemented or replaced by other forms of data entry or printer control, such as a separate data entry and control module linked wirelessly or by a data cable operationally coupled to a computer, a router, or the like.

In some examples, the scope of the disclosure is not limited to the UI 140 including the display 142 and the keypad 144. In an example embodiment, the UI 140 may include a touch screen which may enable the operator of the printing apparatus to input commands and/or to check notifications/alerts generated by the printing apparatus 100.

While FIG. 1 illustrates an example UI 140, it is noted that the scope of the present disclosure is not limited to the example UI 140 as shown in FIG. 1. In some embodiments, the user interface may be different from the one depicted in FIG. 1. In some embodiments, there may not be a user interface.

In some examples, the various components of the printing apparatus 100 described in conjunction with FIG. 1 are encompassed within a housing 154. For example, the media supply spindle 108, the print head engine, and/or the like are encompassed and positioned within the housing 154. In an example embodiment, the housing 154 may comprise a fixed portion 156 and a cover portion 158 that may be movably coupled fixed portion 156 through one or more hinges (not shown). In some examples, the one or more hinges allow the cover portion 158 to rotate about the one or more hinges. Accordingly, the cover portion 158 may rotate with respect to the fixed portion 156. To this end, in some examples, the cover portion 158 may be configured to be in a closed state and an open state. In the closed state, the cover portion 158 in conjunction with the fixed portion 156 may encompass the one or more components (as described in FIG. 1) of the printing apparatus 100. In the open state, the cover portion 158 may expose the one or more components (as described in FIG. 1) of the printing apparatus 100, thereby allowing an operator of the printing apparatus 100 to access the one or more components of the printing apparatus 100.

In some examples, the cover portion 158 may have an inner surface 160 that may be configured to receive a magnetic sensitive element 162. In an example embodiment, the magnetic sensitive element 162, such as a Hall-effect sensor, may be configured to facilitate detection of whether the cover portion 158 of the housing 154 is in a closed state or in an open state. In some examples, when the cover portion 158 of the housing 154 is in a closed state, the magnetic sensitive element 162 may be aligned with a first sensor 164 positioned on the one or more components of the printing apparatus 100. For example, the first sensor 164 may be positioned on the bottom chassis portion 128 of the print head engine 122. When the magnetic sensitive element 162 aligns with the first sensor 164, the first sensor 164 may generate a first signal, which may be indicative of the cover portion 158 being in the closed state.

In an example embodiment, the printing apparatus 100 may include more than one first sensor 164 that may be positioned at one or more positions in the printing apparatus 100. For instance, the first sensor 164 may be positioned at the back-spine section 114 of the printing apparatus 100. Correspondingly, the cover portion 158 may receive the magnetic sensitive element 162 at a position where the magnetic sensitive element 162 may align with the first sensor 164 (positioned on the back-spine section 114) when the cover portion 158 is in the closed state.

In some examples, the printing apparatus 100 may further include one or more components such as a verifier, a peeler, a re-winder, a cutter, or any other component. In an example embodiment, the verifier may correspond to an image capturing device that may be configured to capture an image of the printed content. Thereafter, the verifier may be configured to validate the printed content based on the captured image. In some examples, the verifier may be positioned as an integral component to the printing apparatus 100. In another example, the verifier may be positioned external to the printing apparatus 100. In an example embodiment, the verifier may include an imaging module that is communicatively coupled to the printer and may be disposed in the verifier. The verifier may be attached to the printing apparatus 100 or may be a standalone device to where the user brings the printed indicia for verification. In either case, the verifier is communicatively coupled to the printer.

In an example embodiment, the imaging module in the verifier may be configured to capture an image of the printed content. The image of the printed content is compared with one or more known quality standards. Thereafter, based on the comparison, the verifier may be configured to determine the print quality. If the print quality is less than a predetermined quality threshold, the verifier may instruct the printing apparatus to reprint the content. In another embodiment, the verifier may instruct the printing apparatus to print "void" or "cancel" on the printed content.

Structure of Print Head Engine—Vector Mode

Figure 2:
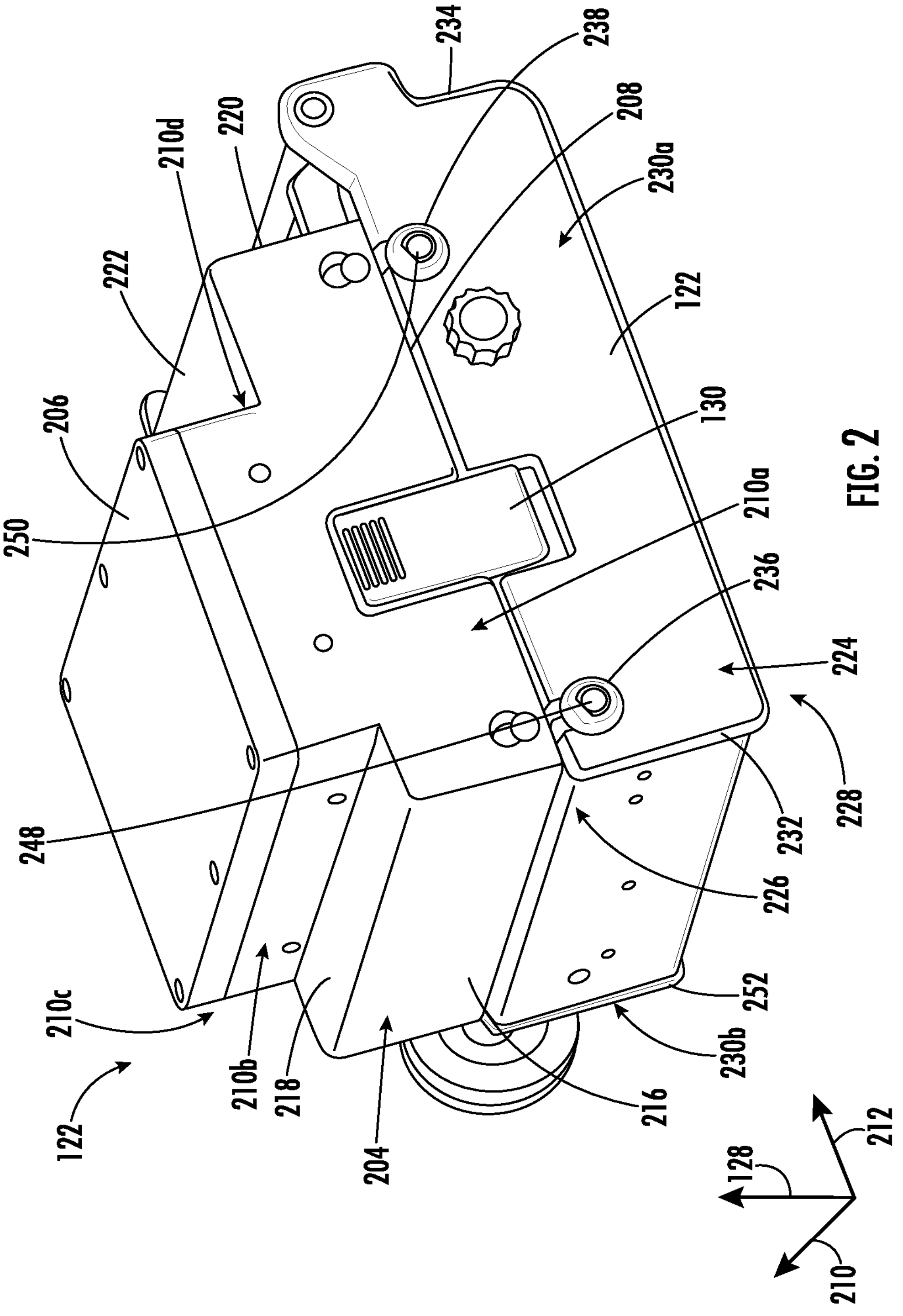
FIG. 2 illustrates perspective views of a portion of the printing apparatus depicting the print head engine, according to one or more embodiments described herein.

FIG. 2 illustrates a perspective view of a portion of the printing apparatus 100 depicting the print head engine 122, according to one or more embodiments described herein.

Referring to FIG. 2, the print head engine 122, is depicted according to one or more embodiments described herein. In an example embodiment, the print head engine 122 includes the top chassis portion 126, the bottom chassis portion 128, and a top chassis cap 201.

In an example embodiment, the top chassis portion 126 has an outer surface 204 that may define a top end portion 206 and a bottom end portion 208, which does not include the top chassis cap 201. The top end portion 206 and the bottom end portion 208, of the top chassis portion 126, are spaced apart from each other along the vertical axis 128 of the printing apparatus 100. Further, in some examples, the bottom end portion 208 may be defined to be proximal to the bottom chassis portion 128, while the top end portion 206 may be defined to be distal from the bottom chassis portion 128, when the top chassis portion 126 is coupled to the bottom chassis portion 128.

In some examples, the top chassis portion 126 may have a polygon shape, such as a rectangular shape with one or more sides 210*a*, 210*b*, 210*c*, and 210*d*. The side 210*a* and the side 210*c* may be defined to be opposite to each other along a longitudinal axis 210 of the print head engine 122. Similarly, the side 210*b* and the side 210*d* may be defined to be opposite to each other along a lateral axis 212 of the print head engine 122. In some examples, the scope of the disclosure is not limited to the top chassis portion 126 having a rectangular shape. In an example embodiment, the shape of the top chassis portion 126 may correspond to other polygons, without departing from the scope of the disclosure.

In an example embodiment, the outer surface 204 of the top chassis portion 126 defines a first wing portion 216 that protrudes out from the side 210*b* of the top chassis portion 126 along the lateral axis 212 of the print head engine 122. Additionally, the first wing portion 216 extends from the side 210*a* to the side 210*c* along the longitudinal axis 210 of the print head engine 122. In some examples, a length of the first wing portion 216 (along the longitudinal axis 210) may be the same as a length of the top chassis portion 126 (along the longitudinal axis 210). Further, a height of the first wing portion 216 is less than a height of the top chassis portion 126. Accordingly, along the vertical axis 128 of the printing apparatus 100, the first wing portion 216 may define a step 218 with the side 210*b*.

In an example embodiment, similar to the first wing portion 216, the outer surface 204 of the top chassis portion 126 defines a second wing portion 220 that protrudes out from the side 210*d* of the top chassis portion 126 along the lateral axis 212 of the print head engine 122. Additionally, the second wing portion 220 extends from the side 210*a* to the side 210*c* along the longitudinal axis 210 of the print head engine 122. In some examples, a length of the second wing portion 220 (along the longitudinal axis 210) may be the same as the length of the top chassis portion 126 (along the longitudinal axis 210). Further, a height of the second wing portion 220 is less than the height of the top chassis portion 126. Accordingly, along the vertical axis 128 of the printing apparatus 100, the second wing portion 220 may define a step 222 with the side 210*d*.

In an example embodiment, the side 210*a* is further configured to receive the latch 130 that facilitates removable coupling of the top chassis portion 126 with the bottom chassis portion 128.

In an example embodiment, the bottom chassis portion 128 has an outer surface 224. In some examples, the outer surface 224 of the bottom chassis portion 128 defines a top end portion 226 of the bottom chassis portion 128, and a bottom end portion 228 of the bottom chassis portion 128. The bottom end portion 228 of the bottom chassis portion 128 is spaced apart from the top end portion 226 of the bottom chassis portion 128 along the vertical axis 128 of the print head engine 122. Further, the top end portion 226 of the bottom chassis portion 128 is proximal to the bottom end portion 208 of the top chassis portion 126, while the bottom end portion 228 of the bottom chassis portion 128 is distal from the bottom end portion 208 of the top chassis portion 126.

In an example embodiment, the outer surface 224 of the bottom chassis portion 128 defines at least two sides 230*a* and 230*b* of the bottom chassis portion 128. In an example embodiment, the side 230*a* may be spaced apart from the side 230*b* along the longitudinal axis 210 of the print head engine 122. In an example embodiment, the sides 230*a* has a first edge 232 and a second edge 234. In some examples, the first edge 232 is spaced apart from the second edge 234 along the lateral axis 212 of the print head engine 122. Similar to the side 230*a*, the side 230*b* has a third edge 252 and a fourth edge 254 (Refer FIG. 3A). In some examples, the third edge 252 is spaced apart from the fourth edge 254 (refer FIG. 3A) along the lateral axis 212 of the print head engine 122.

In an example embodiment, the outer surface 224 of the bottom chassis portion 128 may define a first circular notch 236 and a second circular notch 238 on the side 230*a*. Further, the first circular notch 236 and the second circular notch 238 are defined (by the outer surface 224 of the bottom chassis portion 128) at the top end portion 226 of the bottom chassis portion 128. Furthermore, the outer surface 224 of the bottom chassis portion 128 defines the first circular notch 236 proximal to the first edge 232 of the side 230*a*, and the second circular notch 238 proximal to the second edge 234 of the side 230*a*. Similarly, the outer surface 224 of the bottom chassis portion 128 may define a third circular notch 240 (refer to FIG. 3A) and a fourth circular notch 242 (refer FIG. 3A) on the side 230*b* at the top end portion 226 of the bottom chassis portion 128. Further, the outer surface 224 defines the third circular notch 240 proximal to the third edge 252 of the side 230*b*, and the fourth circular notch 242 proximal to the fourth edge 254 of the side 230*b*. In some examples, the first circular notch 236 and the third circular notch 240 may have a coinciding central axis 244 (refer to FIG. 3A) extending along the longitudinal axis 210 of the print head engine 122. Similarly, the second circular notch 238 and the fourth circular notch 242 may have a coinciding central axis 246 (refer to FIG. 3A) extending along the longitudinal axis 210 of the print head engine 122. The third circular notch 240, the fourth circular notch 242, the coinciding central axis 244, and the coinciding central axis 246 are further illustrated with respect to FIG. 3A.

In an example embodiment, the first circular notch 236 and the third circular notch 240 are configured to receive a first shaft 248 such that the first shaft 248 is rotatable in the first circular notch 236 and the third circular notch 240. Additionally, the third circular notch 240 and the fourth circular notch 242 are configured to receive a second shaft 250 such that the second shaft 250 is rotatable in the second circular notch 238 and the fourth circular notch 242. In some examples, the first shaft 248 and the second shaft 250 may correspond to rollers that may assist the travel of the print media 104 along the print path.

Figure 3A:
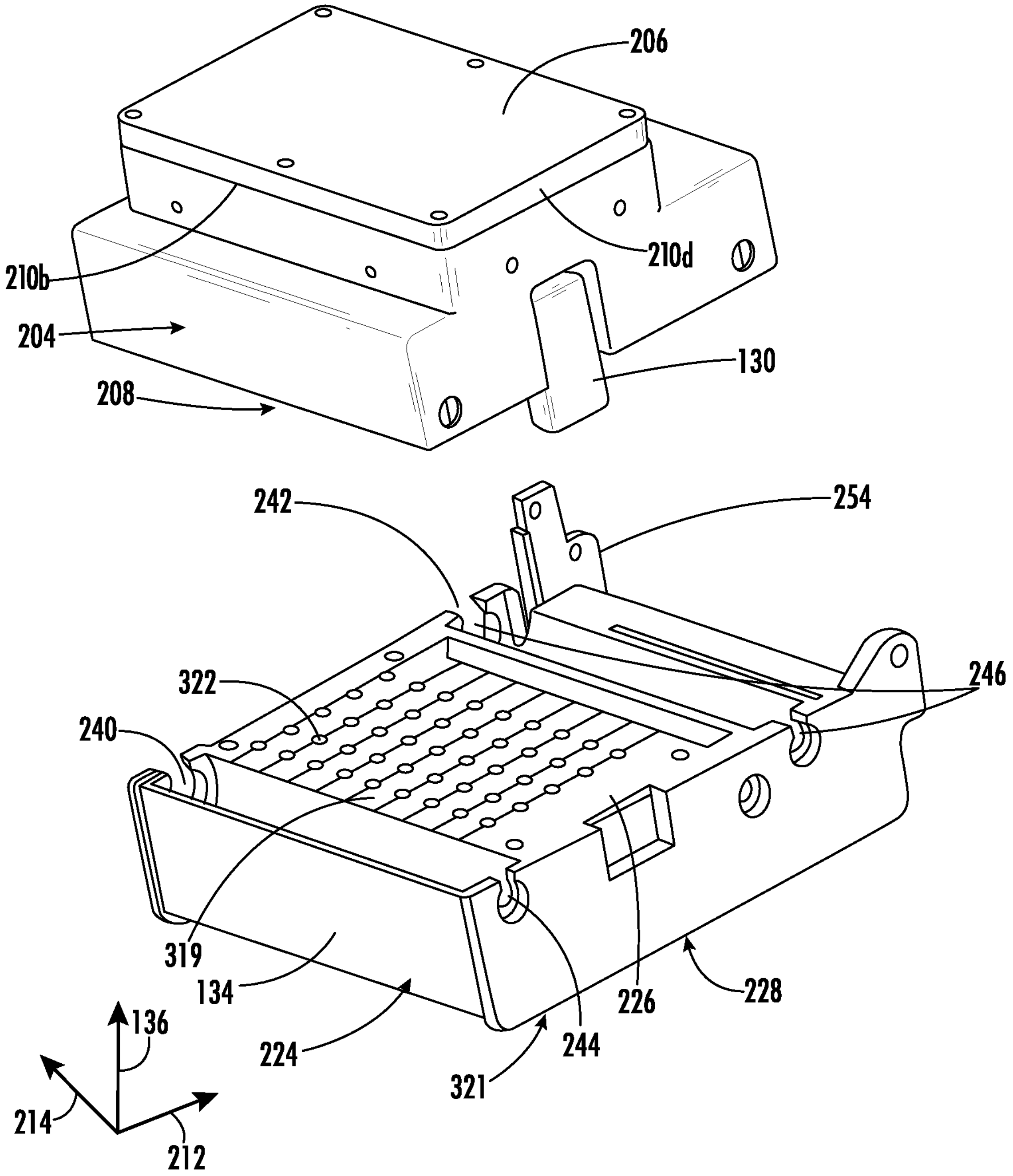
FIG. 3A illustrates an exploded view of the print head engine, according to one or more embodiments described herein.

FIG. 3A illustrates an exploded view 300A of the print head engine 122, according to one or more embodiments described herein.

Figure 3B:
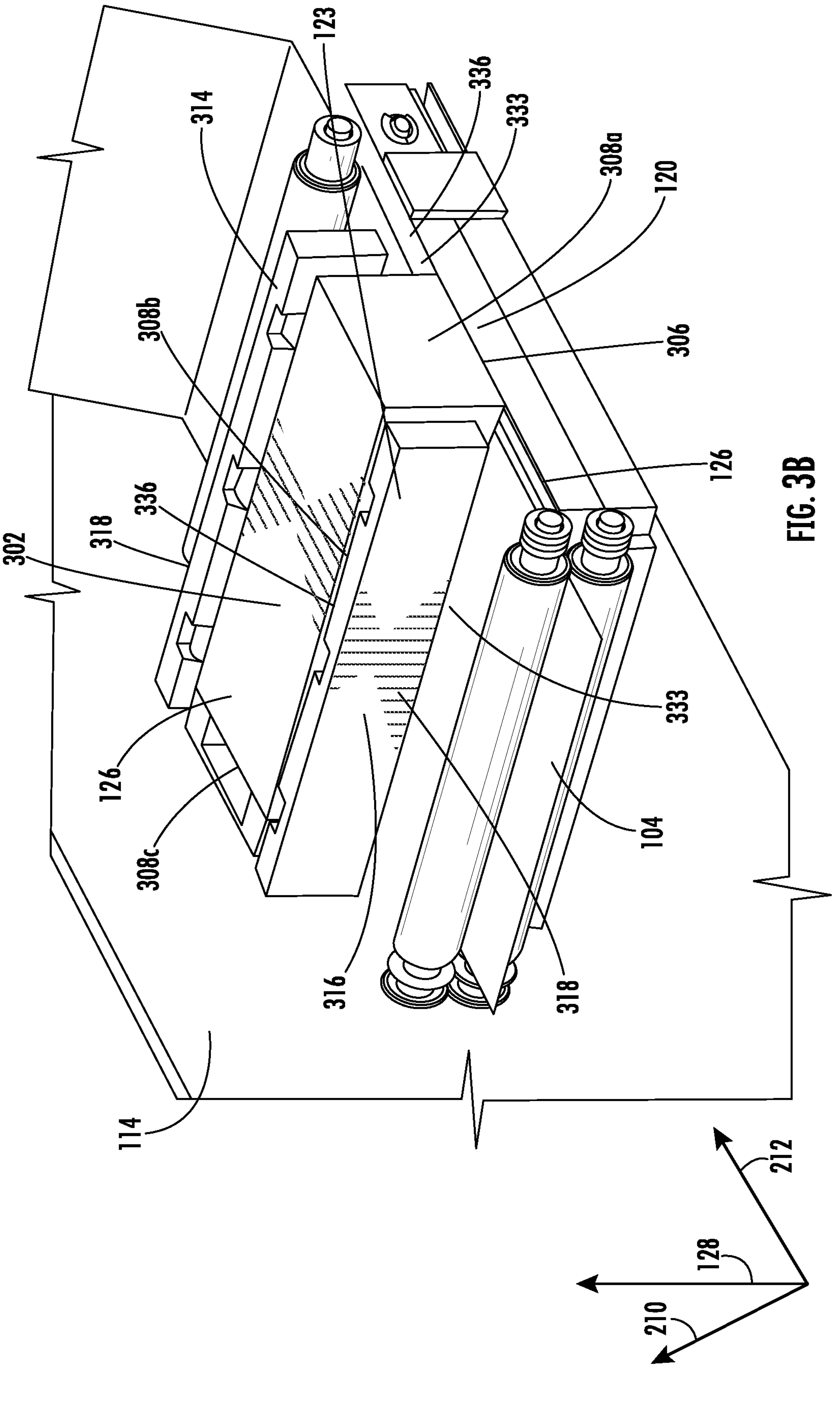
FIG. 3B illustrates another exploded view of a portion of the printing apparatus, according to one or more embodiments described herein.

In an example embodiment, the top chassis portion 126 may be configured to receive a print head, such as the print head shown in FIG. 3B. In an example embodiment, the top chassis portion 126 may be configured to couple with the bottom chassis portion 128 through the latch 130.

In an example embodiment, the bottom chassis portion 128 has the outer surface 204, a top surface 319, and a bottom surface 321. In some examples, the outer surface 224 and the top surface 319 define the top end portion 226 of the bottom chassis portion 128. Further, in some examples, the outer surface 224 and the bottom surface 321 define the bottom end portion 228 of the bottom chassis portion 128. In some examples, the top surface 319 of the bottom chassis portion 128 defines a platform 322 that may correspond to a region on which the print media 104 is received for printing operation. Further, the platform 322 extends along the length (defined along the longitudinal axis 210 of the print head engine 122) and the breadth (defined along the lateral axis 212 of the print head engine 122) of the bottom chassis portion 128.

In some examples, the platform 322 extends between the central axis 244 and the central axis 246. As discussed, the central axis 244 pass through the first circular notch 236 and the third circular notch 240. The first shaft 248 is rotatably coupled to the first circular notch 236 and the third circular notch 240. Similarly, as discussed, the central axis 246 pass through the second circular notch 238 and the third circular notch 240. The second shaft 250 is rotatably coupled to the first circular notch 236 and the third circular notch 240.

Media Path within the Print Head Engine

In some examples, various prerequisites such as, but not limited to, an orientation of the print media with respect to a print head, a focal point of the laser light source with respect to the location of the print media, and/or the like, may be required or otherwise determined prior to or during printing content on print media. For example, in an instance in which the orientation of the print media is skewed or otherwise out of alignment during the printing operation, printed content may be blurry, out of focus, or may have scaling issues. Therefore, in some examples, it may be of paramount importance to orient the print media with respect to the print head prior to the printing operation. Alternatively, or additionally, it may be advantageous to flatten the print media prior to the printing operation.

Apparatuses, systems, and methods described herein disclose a printing apparatus that is capable of flattening the print media prior to a printing operation. In an example embodiment, the printing operation may correspond to an operation of printing content on the print media. The printing apparatus includes a print head engine that may be positioned downstream of a media supply spool. The media supply spool may be configured to supply the print media to the print head engine. A direction of the print media traversal from the media supply spool to the print head engine is referred to as a print direction.

In an example embodiment, the printing apparatus may include a first roller and a second roller. The first roller may be positioned upstream of the print head engine, along the print direction of the print media traversal, while the second roller is positioned downstream of the print head, along the print direction of the print media traversal.

To initiate the print media traversal along the print direction, the first roller and the second roller are actuated, causing the first roller and the second roller to rotate. Rotation of the first roller and the second roller facilitates the print media traversal along the print direction. To halt the print media traversal, the first roller is stopped at a first time instant, while the second roller is stopped at a second time instant. In some examples, the second time instant is chronologically later than the first time instant. Accordingly, the second roller may continue to rotate after the first roller has stopped rotating. In such an implementation, the second roller continues to pull the print media, which leads to stretching and flattening of the print media. After the second rollers stops rotating, the print head engine may print content on the print media.

FIG. 3B illustrates another exploded view 300B of a portion of the printing apparatus 100, according to one or more embodiments described herein. The exploded view 300B illustrates the print head engine 122 with the top chassis portion 126 of the print head engine 122 removed. Accordingly, the exploded view 300B illustrates the print head 302, a first roller assembly 314 and a second roller assembly 316, according to one or more embodiments described herein.

In some examples, the print head 302 may have one or more sides 308*a*, 308*b*, 308*c*, and 308*d*. The side 308*a* and the side 308*c* may be defined to be opposite to each other along a longitudinal axis 210 of the print head engine 122. Similarly, the side 308*b* and the side 308*d* may be defined to be opposite to each other along the lateral axis 212 of the print head engine 122.

In an example embodiment, the side 308*b* and the side 308*d* may be configured to receive the second roller assembly 316 and the first roller assembly 314, respectively. In an example embodiment, the structure of the second roller assembly 316 and the structure of the second roller assembly 316 are same. For purpose of brevity, the structure of the second roller assembly 316 is described herein. In an example embodiment, the first roller assembly 314 and the second roller assembly 316 are configured to be received within the top chassis portion 126, when the top chassis portion 126 is received on top of the print head 302, the first roller assembly 314 and the second roller assembly 316. More particularly, the first roller assembly 314 and the second roller assembly 316 may be received within the first wing portion 216 and the second wing portion 220.

In an example embodiment, the second roller assembly 316 may include a frame 318 that may extend along the longitudinal axis 210 of the print head engine 122. In some examples, the frame 318 may extend between the side 308*a* to side 308*c* along the longitudinal axis 210 of the print head engine 122 along the longitudinal axis 210 of the print head engine 122. In an example embodiment, the frame 318 may have the cuboidal shape that has a top end portion 320, a bottom end portion 323, one or more sides 324*a*, 324*b*, 324*c*, and 324*d*. In an example embodiment, the top end portion 320 of the frame 318 is positioned to be proximal to the top end portion 206 of the top chassis portion 126. Further, the bottom end portion 323 of the frame 318 is positioned to be proximal to the bottom end portion 208 of the top chassis portion 126. Accordingly, the top end portion 320 of the frame 318 is spaced apart from the bottom end portion 323 of the frame 318 along the vertical axis 128 of the print head engine 122.

In some examples, the side 324*a* of the frame 318 and the side 324*c* of the frame 318 may be spaced apart from each other along the longitudinal axis 210 of the print head engine 122. Further, the side 324*b* and the side 324*d* may be spaced apart from each other along the lateral axis 212 of the print head engine 122. In an example embodiment, the side 324*d* may be coupled to the side 308*b* of the print head engine 122. In some examples, the scope of the disclosure is not limited to the side 324*d* coupled to the side 308*b* of the top chassis portion 126. In an example embodiment, the frame 318 may not be coupled to the print head engine 122. In such an embodiment, the frame 318 may be coupled to the back-spine section 114 of the printing apparatus 100.

In an example embodiment, a surface 326 of the side 324*d* of the frame 318 may define one or more grooves 328*a*, 328*b*, and 328*c*. In some examples, each of the one or more grooves 328*a*, 328*b*, and 328*c*, may extend inwardly from the surface 326 of the side 324*d* towards the side 324*b* along the lateral axis 212 of the print head engine 122. Additionally, or alternatively, each of the one or more grooves 328*a*, 328*b*, and 328*c* may extend between the top end portion 320 of the frame 318 and the bottom end portion 323 of the frame 318. Further, each of the one or more grooves 328*a*, 328*b*, and 328*c* may be spaced apart from each other along the longitudinal axis 210 of the print head engine 122. In some examples, each of the one or more grooves 328*a*, 328*b*, and 328*c* may be configured to receive the second roller 134. The structure of rollers, and specifically the second roller 134, is further described in conjunction with FIG. 4A, FIG. 4B, and FIG. 5.

Figure 4B:
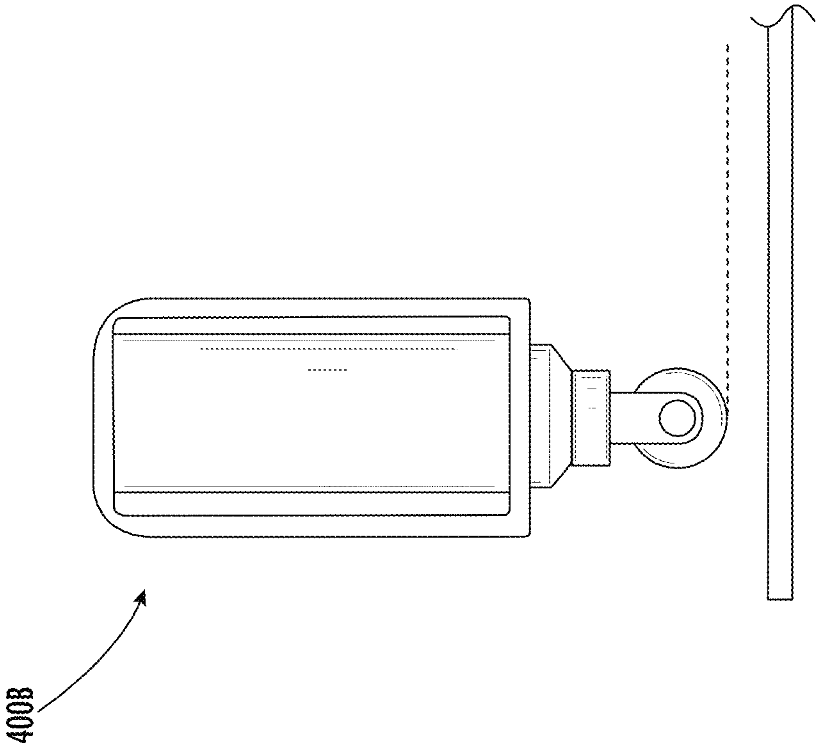
FIG. 4A and FIG. 4B illustrate side views of the second roller, respectively, according to one or more embodiments described herein.
Figure 4A:
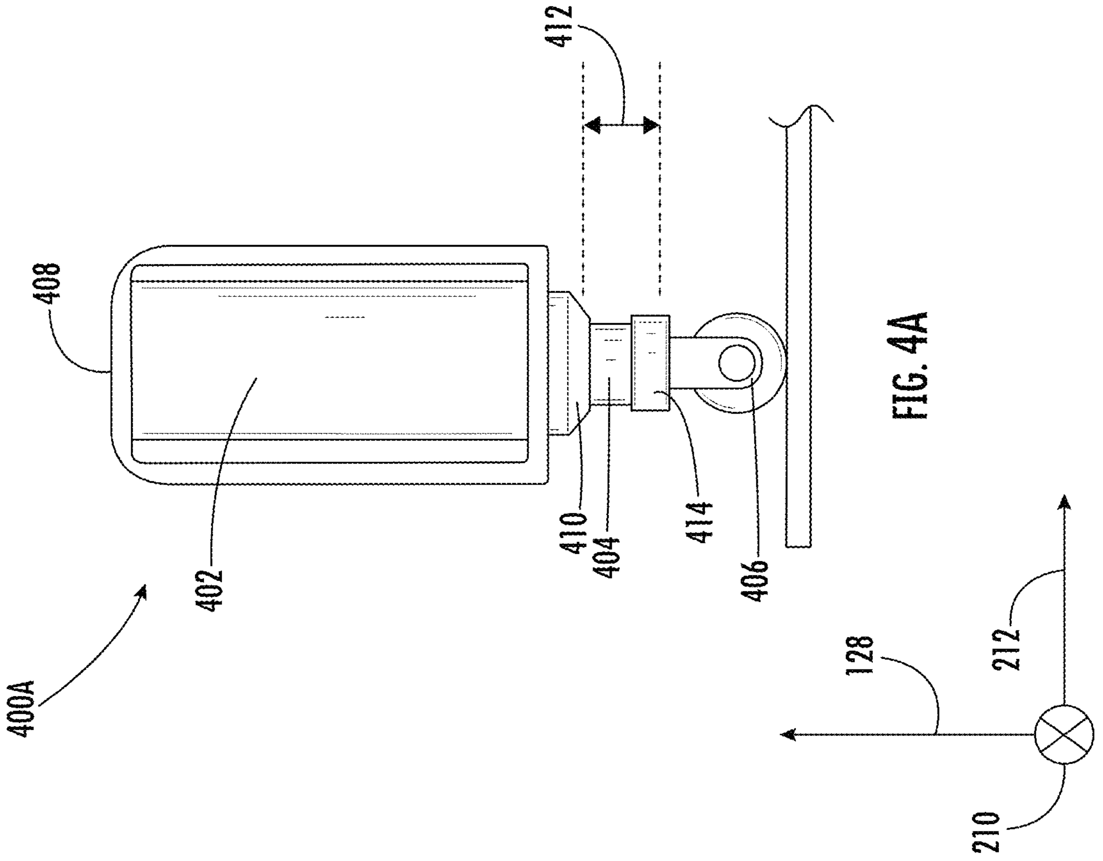

FIG. 4A and FIG. 4B illustrate side views 400A and 400B of the second roller 134, respectively, according to one or more embodiments described herein.

The second roller 134 includes a housing 402, a telescopic arm 404, and a first wheel 406. The housing 402 may have a first end 408 and a second end 410. The first end 408 of the housing is spaced apart from the second end 410 of the housing 402, along the vertical axis 128 of the printing apparatus 100, when the second roller 134 is received within a groove (e.g., the groove 328*a*) of the one or more grooves 328*a*, 328*b*, and 328*c*. The second end 410 of the housing 402 is configured to movably receive the telescopic arm 404 such that a portion 412 of the telescopic arm 404, in one embodiment, may extend out from the second end 410 of the housing 402 (hereinafter referred to as extended state). In another embodiment, the portion 412 of the telescopic arm 404 may retract within the housing 402 (hereinafter referred to as retracted state).

In an example embodiment, the telescopic arm 404 may include an end portion 414 that may be positioned external to the housing 402 irrespective of a configuration state (e.g., extended state or the retracted state) of the telescopic arm 404. The end portion 414 of the telescopic arm 404 may be configured to receive the first wheel 406. The further description of the second roller 134 is described in conjunction with FIG. 5.

Figure 5:
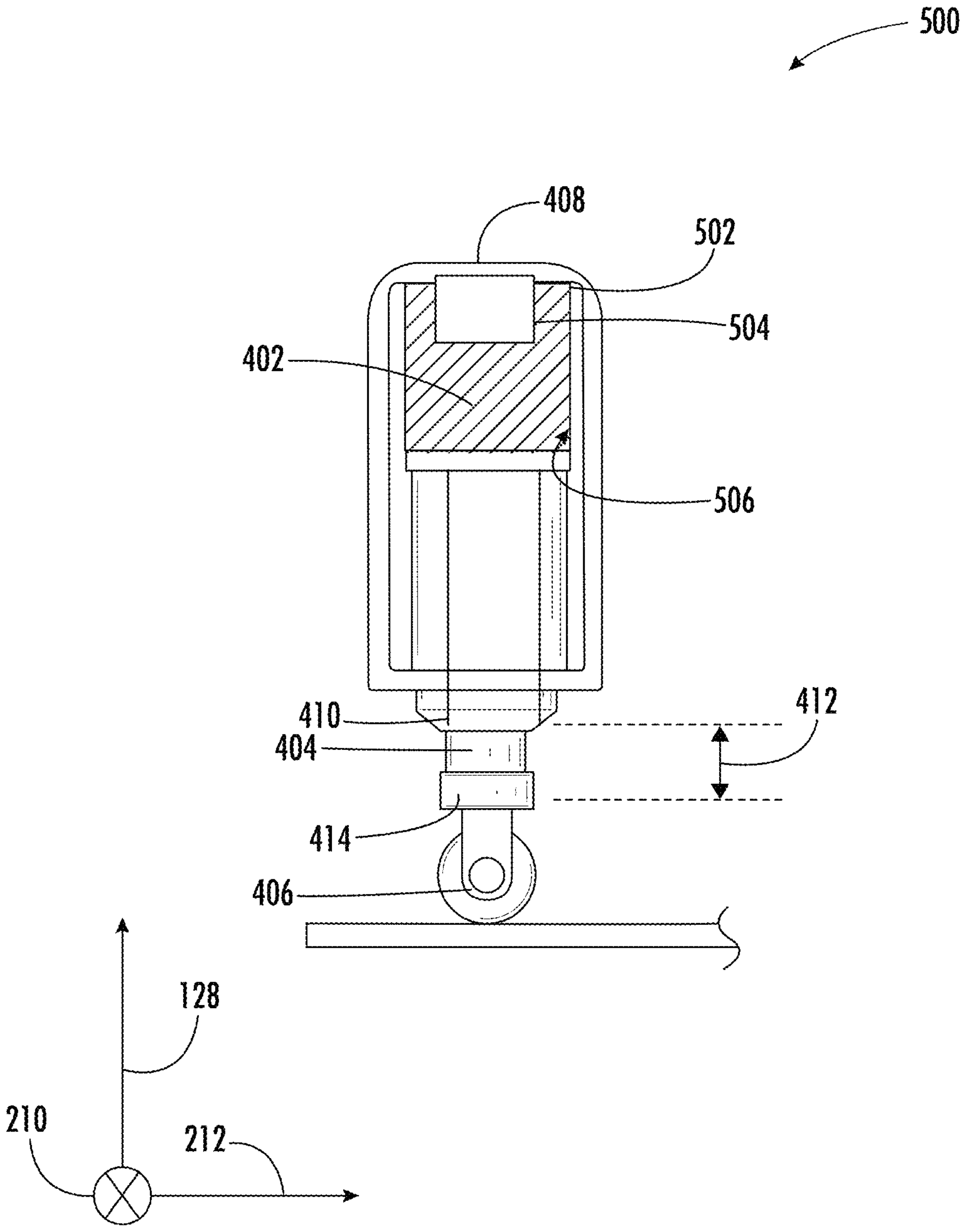
FIG. 5 illustrates a sectional view of the second roller, according to one or more embodiments described herein.

FIG. 5 illustrates a sectional view 500 of the second roller 134, according to one or more embodiments described herein. The sectional view 500 depicts that the second roller 134 includes a first biasing member 502 and a third actuation unit 504.

In an example embodiment, the housing 402 may be configured to receive the third actuation unit 504 that is communicatively coupled to the telescopic arm 404. In an example embodiment, the third actuation unit 504 may apply external force on the telescopic arm 404 causing the telescopic arm 404 to be in the extended state and/or in the retracted state. Some examples of the third actuation unit 504 may include, but are not limited to, an electromagnet, a stepper motor, and/or the like. For the purpose of ongoing description, the third actuation unit 504 is considered to be an electromagnet. To this end, the external force applied by the third actuation unit 504 may correspond to an attractive force and/or a repulsive force.

Additionally, the housing 402 is configured to receive the first biasing member 502. In some examples, the first biasing member 502 may be coupled to the telescopic arm 404 and to an inner surface 506 of the housing 402 at the first end 408 of the housing 402. The first biasing member 502 may apply a biasing force on the telescopic arm 404 to cause the telescopic arm 404 to be in the extended state when the third actuation unit 504 is not activated. In such an embodiment, when the third actuation unit 504 is activated, the third actuation unit 504 may apply the external force on the telescopic arm 404 causing the portion 412 of the telescopic arm 404 to retract within the housing 402 (i.e., the telescopic arm 404 is in retracted state).

In some examples, the first biasing member 502 may apply the biasing force on the telescopic arm 404 to cause the telescopic arm 404 to be in the retracted state when the third actuation unit 504 is deactivated. In such an embodiment, when the third actuation unit 504 is activated, the third actuation unit 504 may apply the external force on the telescopic arm 404 causing the portion 412 of the telescopic arm 404 to extend out from the housing 402 (i.e., the telescopic arm 404 is in extended state).

Additionally, or alternatively, the third actuation unit 504 may be communicatively coupled to the first wheel 406 that may cause the first wheel 406 to rotate. In another example embodiment, the first wheel 406 may be an idle roller. In such an embodiment, the third actuation unit 504 may not cause the first wheel 406 to rotate. The first wheel 406 may rotate based on interaction with another component of the printing apparatus 100. For example, the first wheel 406 may rotate based on the interaction with the print media 104 during the print media traversal.

In some examples, the scope of the disclosure is not limited to the third actuation unit 504 actuating the first wheel 406 (causing the first wheel 406 to rotate). The first wheel 406 may be coupled to the second actuation unit 136, where the second actuation unit 136 may cause the first wheel 406 to rotate. In yet another embodiment, the first wheel 406 may be coupled to the first actuation unit 119, where the second actuation unit 136 may cause the first wheel 406 to rotate.

Referring back to FIG. 4A and FIG. 4B, since the first wheel 406 is coupled to the telescopic arm 404 and since the third actuation unit 504 may cause the telescopic arm 404 to be in a particular configuration state, such as in the retracted state or in the extended state, the third actuation unit 504 may cause the first wheel 406 to traverse between a first position and a second position based on the configuration state of the telescopic arm 404. For example, the first wheel 406 is in the first position when the telescopic arm is in the retracted state. Further, in the first position, the first wheel 406 is positioned to be proximal to the second end 410 of the housing 402 in comparison to a scenario when the first wheel 406 is positioned in the second position. Further, the first wheel 406 is in the second position when the telescopic arm 404 is in the extended state. Additionally, in the second position, the first wheel 406 is positioned to be distal from the second end 410 of the housing 402 in comparison to a scenario when the first wheel 406 is positioned in the first position. FIG. 4A depicts the first wheel 406 in the first position and FIG. 4B depicts the first wheel 406 in the second position.

In operation and as is shown with respect to FIG. 5, when the third actuation unit 504 is activated (e.g., the electromagnet is activated) the third actuation unit 504 may generate an attractive force, which pulls the telescopic arm 404 causing the telescopic arm 404 to be in the retracted state. Accordingly, the first wheel 406 is in the first position. When the third actuation unit 504 is deactivated, the biasing force from the first biasing member 502 acts on the telescopic arm 404, which causes the portion of telescopic arm 404 to extend out from the housing 402. Accordingly, the first wheel 406 is in the second position.

In alternate embodiment, when the third actuation unit 504 is activated (e.g., the electromagnet is activated) the third actuation unit 504 may generate a repulsive force, which causes the telescopic arm 404 to be in the extended state. Accordingly, the first wheel 406 is in the second position. When the third actuation unit 504 is deactivated, the biasing force from the first biasing member 502 acts on the telescopic arm 404, which causes the portion of telescopic arm 404 to retract. Accordingly, the first wheel 406 is in the first position.

In some examples, the second roller 134 may devoid of the first biasing member 502. In such an embodiment, the third actuation unit 504 may cause the first wheel 406 to traverse between the first position and the second position. For example, the third actuation unit 504 may generate the repulsive force to cause the first wheel 406 to traverse to the second position. Further, the third actuation unit 504 may generate the attractive force to cause the first wheel 406 to traverse to the first position.

Referring back to FIG. 3B, the structure of the first roller assembly 314 is similar to the structure of the second roller assembly 316. For example, similar to the second roller assembly 316, the first roller assembly 314 includes the frame 318 that may define the one or more grooves 328*d*, 328*e*, and 328*f* Each of the one or more grooves 328*d*, 328*e*, and 328*f* (defined in the first roller assembly 314) are configured to receive the first roller 132. In some examples, the structure of the first roller 132 is similar to the structure of the second roller 134.

In some examples, the scope of the disclosure is not limited to the first roller assembly 314 and the second roller assembly 316 including the three first rollers 132 and three second rollers 134. In an example embodiment, the count of the first roller 132 and the second roller 134 may be varied based on one or more implementations of the printing apparatus 100. For example, in printing apparatus 100 that supports print media having narrower width in comparison to the print media 104, the count of the first rollers 132 and the second rollers 134 may be reduced. Similarly, in printing apparatus 100 that supports print media having broader width in comparison to the print media 104, the count of the first rollers 132 and the second rollers 134 may be increased.

In an example embodiment, in the second position, the first roller 132 (in the first roller assembly 314) and the second roller 134 (in the second roller assembly 316) may about the platform 322. Accordingly, when the platform 322 receives the print media 104, the first roller 132 and the second roller 134 may abut the print media 104. On the other hand, in the first position, the first roller 132 and the second roller 134 may be positioned apart from the print media 104.

Figure 3C:
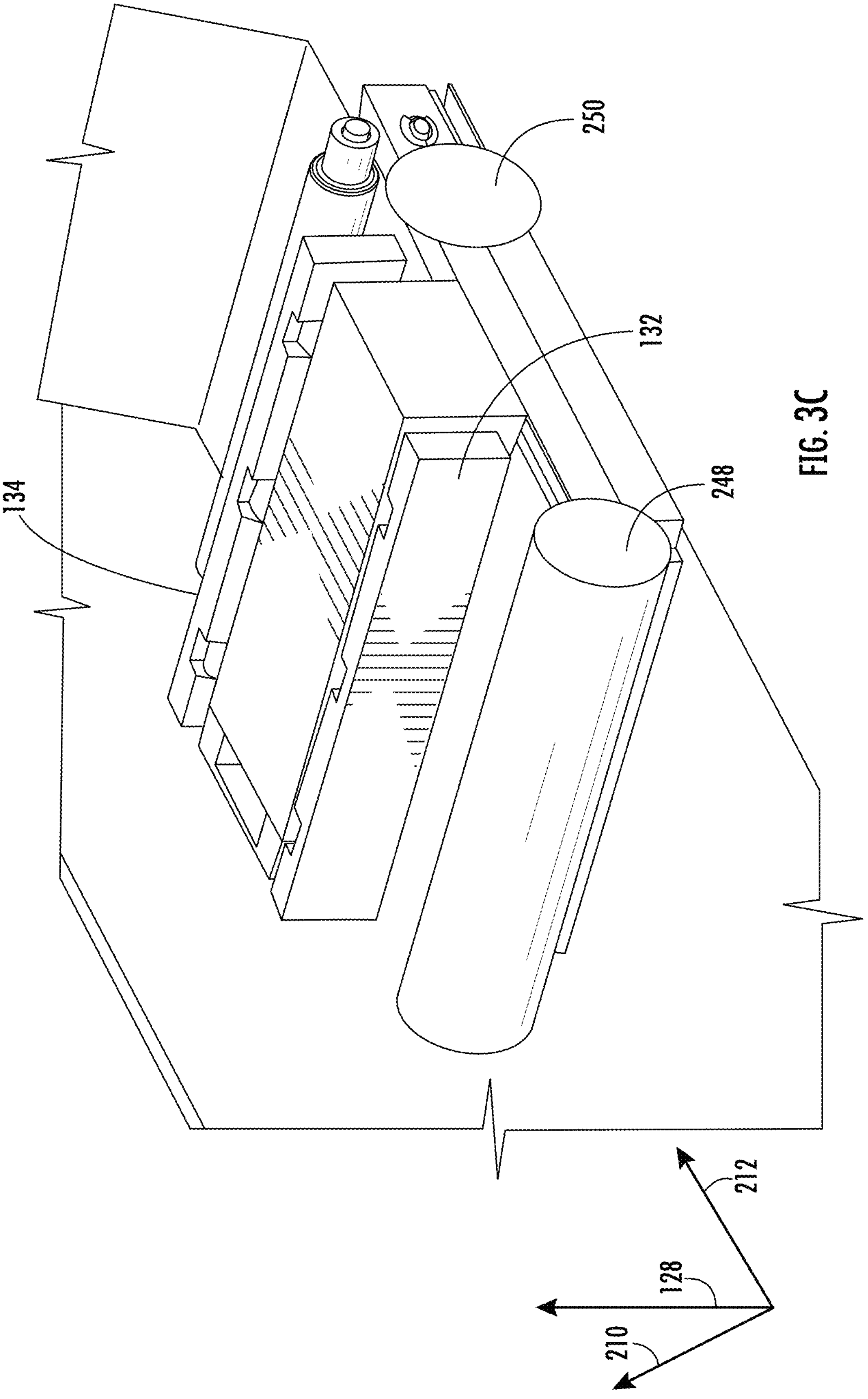
FIG. 3C illustrates an example view of a portion of the printing apparatus, according to one or more embodiments described herein.

In some examples, the scope of the disclosure is not limited to the first roller 132 and the second roller 134 abutting the platform 322. Referring to FIG. 3C, as discussed above, the bottom chassis portion 128 includes the first shaft 248 and the second shaft 250. In some examples, the first shaft 248 and the second shaft 250 may correspond to idle rollers. The first shaft 248 may be positioned upstream of the print head engine 122, along the print direction, and the second shaft 250 may be positioned downstream of the print head engine 122, along the print direction. Further, in such an embodiment, the first roller 132 and the second roller 134 may abut the first shaft 248 and the second shaft 250, respectively (when the first roller 132 and the second roller 134 are in the second position).

In some examples, the scope of the disclosure is not limited to the first wheel 406 in the first roller 132 and the second roller 134 to traverse between the first position and the second position. In an example embodiment, the operator of the printing apparatus 100 may manually facilitate the traversal of the complete first roller 132 and the second roller 134 between a third position and a fourth position. The structure of such roller assemblies that may facilitate the traversal of the complete first roller 132 and the second roller 134 is further described in conjunction with FIG. 6.

Figure 6:
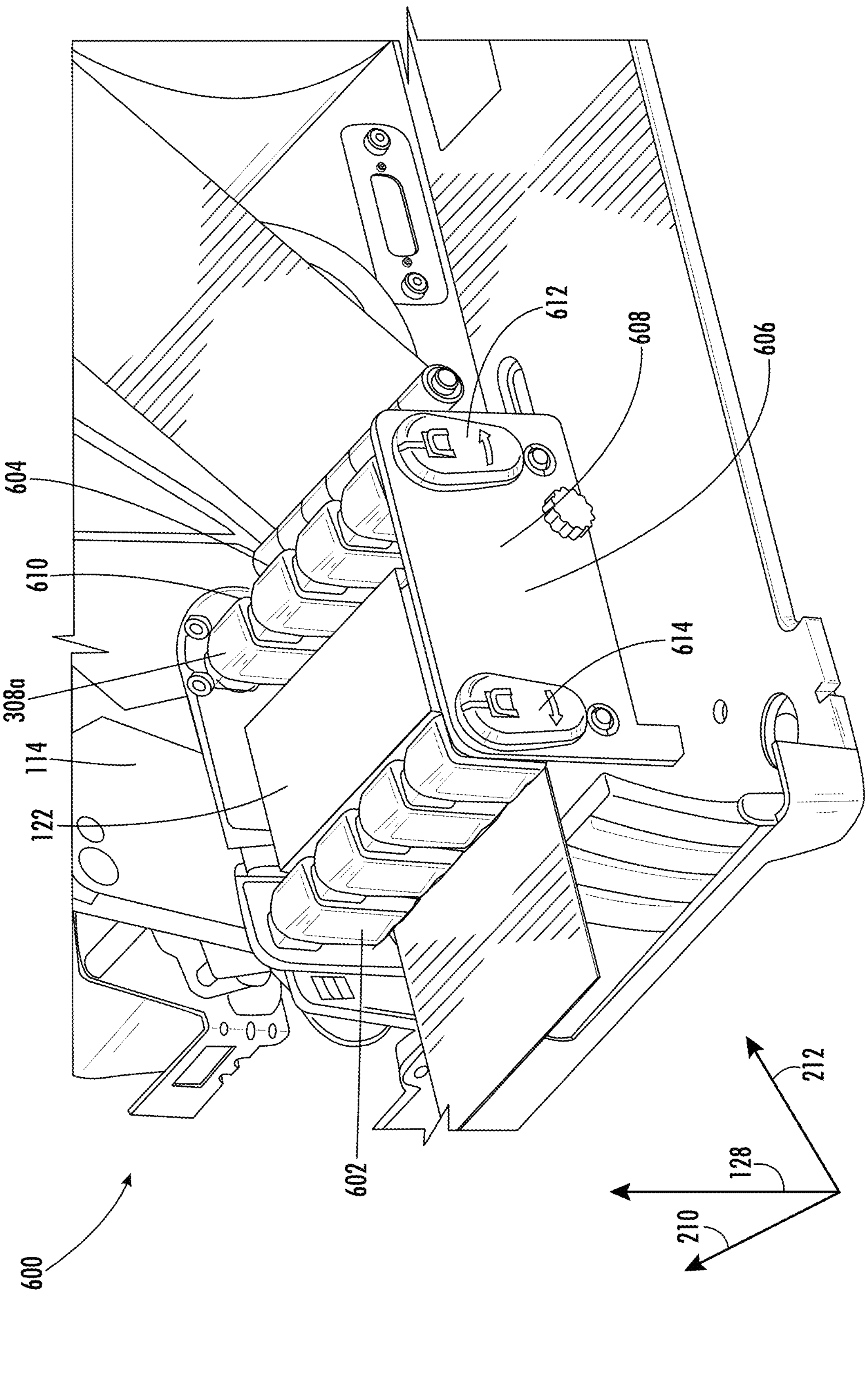
FIG. 6 illustrates another perspective view of the portion of the printing apparatus, according to one or more embodiments described herein.

FIG. 6 illustrates another perspective view 600 of a portion of the printing apparatus 100, according to one or more embodiments described herein. Referring to the perspective view 600, the printing apparatus 100 includes a print head engine 122, a third roller assembly 602, a fourth roller assembly 604, and a front plate 606.

In an example embodiment, the front plate 606 may be positioned proximal to the side 308*a* of the top chassis portion 126 such that the front plate 606 completely covers the print head engine 122 when the print head engine 122 is being view along the longitudinal axis 210 of the print head engine 122. The front plate 606 has an outer surface 608 and an inner surface 610. In some examples, the inner surface 610 of the front plate 606 faces the side 308*a* of the top chassis portion 126 of the print head engine 122.

In an example embodiment, the inner surface 610 of the front plate 606 may define a first through hole (not shown) and a second through hole (not shown) that may extend from the inner surface 610 of the front plate 606 to the outer surface 608 of the front plate 606. In an example embodiment, the first through hole (not shown) may be defined downstream of the print head engine 122, along the print direction, and the second through hole (not shown) may be defined upstream of the print head engine 122, along the print direction. In an example embodiment, the first through hole (not shown) and the second through hole (not shown) may facilitate coupling of the third roller assembly 602 and the fourth roller assembly 604 the front plate 606, respectively. and the back-spine section 114. Additionally, the third roller assembly 602 and the fourth roller assembly 604 may be movably coupled with the back-spine section 114, as is further described in conjunction with FIG. 8. Further, the structure of the third roller assembly 602 and the fourth roller assembly 604 is further described in conjunction with FIG. 9, FIG. 10A, and FIG. 10B.

Referring back to the front plate 606, additionally or alternatively, the front plate 606 may be configured to receive a first cam roller 612 and a second cam roller 614 at the outer surface 608 of the front plate 606. The first cam roller 612 may be coupled with the third roller assembly 602 and the second cam roller 614 may be coupled with the fourth roller assembly 604, respectively. In some examples, the first cam roller 612 and the second cam roller 614 may be configured to allow the operator of the printing apparatus 100 to cause traversal of the third roller assembly 602 and the fourth roller assembly 604, respectively, as is further described in conjunction with FIG. 10A and FIG. 10B.

Figure 7:
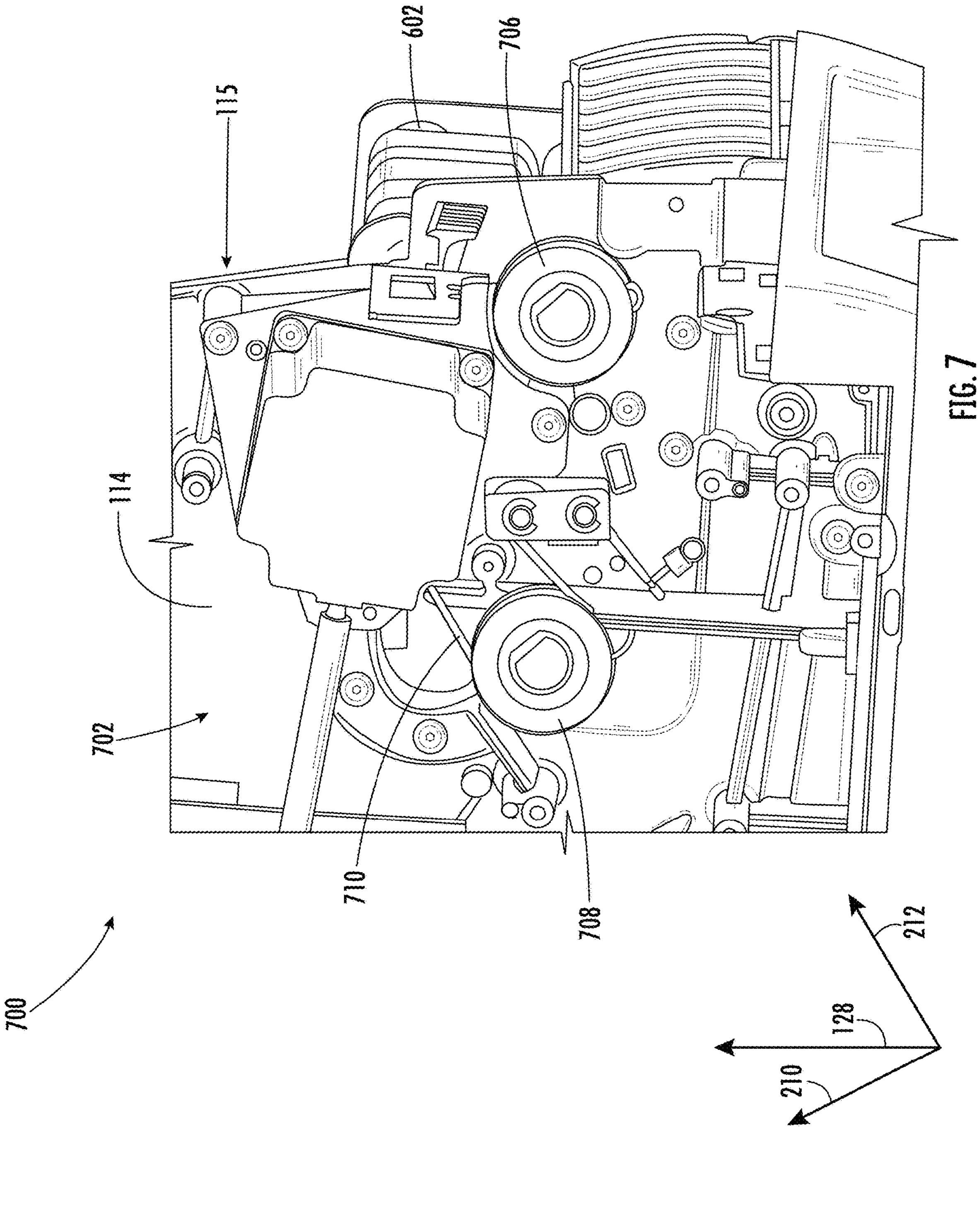
FIG. 7 illustrates a front right view of the portion of the printing apparatus, according to one or more embodiments described herein.

FIG. 7 illustrates an opposing view 700 to the view of FIG. 1, according to one or more embodiments described herein. The opposing view 700 of the printing apparatus 100 depicts the back-spine section 114 of the printing apparatus 100. The back-spine section 114 of the printing apparatus 100 has the first surface 115 and a second surface 702. The second surface 702 of the back-spine section 114 may define a third through hole (not shown) and a fourth through hole (not shown) that extends from the second surface 702 of the back-spine section 114 to the first surface 115 of the back-spine section 114. The third through hole (not shown) is defined to be downstream of the print head engine 122, along the print direction, while the fourth through hole (not shown) is defined to be upstream of the print head engine 122, along the print direction. In an example embodiment, the third through hole (not shown) and the fourth through hole (not shown) may facilitate coupling of the third roller assembly 602 and the fourth roller assembly 604, respectively, with the back-spine section 114. Additionally, the printing apparatus 100 includes a first pulley 706 and a second pulley 708 that are coupled with the third roller assembly 602 and the fourth roller assembly 604, respectively. In an example embodiment, the first pulley 706 and the second pulley 708 may be received on the second surface 702 of the back-spine section 114.

In some examples, each of the first pulley 706 and the second pulley 708 are coupled to the first actuation unit 119. For example, the first pulley 706 and the second pulley 708 are coupled to the first actuation unit 119 through a belt 710. In some examples, the first actuation unit 119 may facilitate automatic traversal of the third roller assembly 602 and the fourth roller assembly 604. In some examples, the operator of the printing apparatus 100 to manually cause the traversal of the third roller assembly 602 and the fourth roller assembly 604, as is further described in conjunction with FIG. 10A and FIG. 10B.

Figure 8:
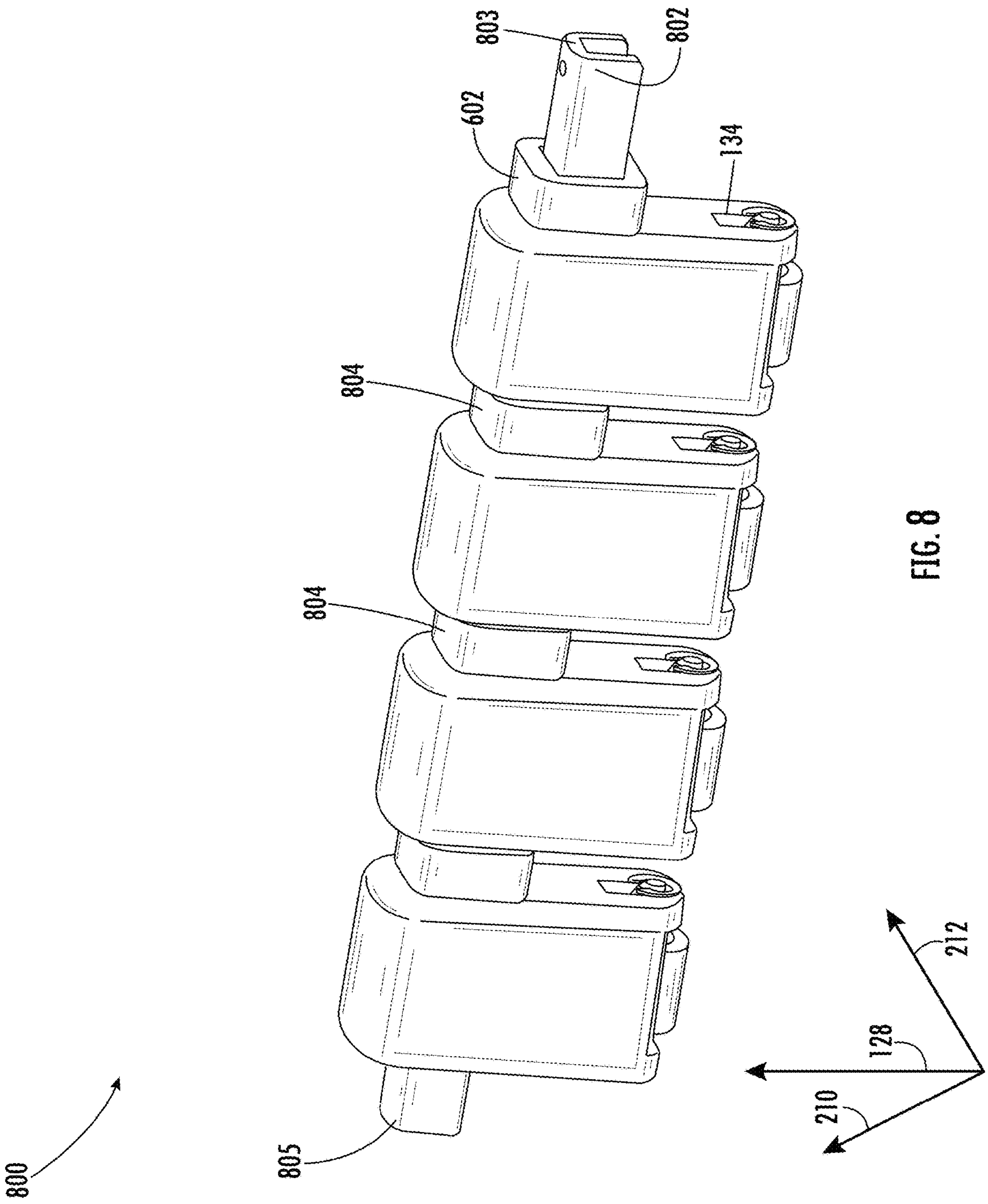
FIG. 8 illustrates a perspective view of the third roller assembly, according to one or more embodiments described herein.

FIG. 8 illustrates a perspective view 800 of the third roller assembly 602, according to one or more embodiments described herein. In some examples, the third roller assembly 602 includes a first shaft 802 and at least one second roller 134.

In an example embodiment, the first shaft 802 may correspond to a rod that may extend along the longitudinal axis 210 of the print head engine 122, when the third roller assembly 602 is movably coupled to the front plate 606 and the back-spine section 114. More particularly, the first shaft 802 may include a first end 803 and a second end 805 that are configured to be coupled to the front plate 606 and the back-spine section 114, respectively. The first shaft 802 may have a U-shaped cross section. However, in some examples, the scope of the disclosure is not limited to the first shaft 802 having the U-shaped cross section. In an embodiment, the shaft may have a circular cross-section. In another embodiment, the first shaft 802 may have a rectangular cross-section. In yet another embodiment, the first shaft 802 may have a cross section of any other geometrical shape without departing from the scope of the disclosure. In an example embodiment, the first shaft 802 may be configured to be fixedly coupled to at least one second roller 134 such that the at least one second roller 134 may extend from the first shaft 802 along the vertical axis 128 of the printing apparatus 100 (when the first roller assembly 314 is coupled to the front plate 606 and the back-spine section 114). For example, the first shaft 802 is configured to receive three second rollers 134. To this end, the three second rollers 134 are spaced apart from each other along the longitudinal axis 210 of the print head engine 122 by a predetermined distance. In some examples, a spacer member 804 may facilitate maintaining the predetermined distance amongst the three second rollers 134. The structure of the second roller 134 is further described in conjunction with FIGS. 10A and 10B. In some examples, the scope of the disclosure is not limited to having three second rollers 134 in the third roller assembly 602. The third roller assembly 602 may have any number of second rollers 134, without departing from the scope of the disclosure. For example, the number of the second rollers 134 in the third roller assembly 602 may vary based on the width of the print media 104 installed in the printing apparatus 100.

In an example embodiment, the first shaft 802 facilitates rotation of the at least one second roller 134 about the first shaft 802. For example, the first shaft 802 may enable the rotation of the at least one second roller 134, about the first shaft 802, between the third position and the fourth position. The rotation of the at least one second roller 134 between the third position and the fourth position is further described in conjunction with FIG. 10A and FIG. 10B.

FIG. 9A and FIG. 9B illustrate a side view 900A and a sectional view 900B of the second roller 134, according to one or more embodiments described herein.

The second roller 134 may include a housing 902, a second shaft 904, and a second wheel 906. In an example embodiment, housing 902 may have an outer surface 908 that may define a first end portion 910 and a second end portion 912. The first end portion 910 of the housing 902 may be spaced apart from the second end portion 912 of the housing 902 along the vertical axis 128 of the printing apparatus 100. In an example embodiment, the housing 902 may have an elliptical shape. However, the scope of the disclosure is not limited to the housing 902 having the elliptical shape. In an example embodiment, the housing 902 may have any other geometrical shape without departing from the scope of the disclosure. For example, the housing 902 may have a cuboidal shape. In some examples, the housing 902 may have one or more sides 903*a*, 903*b*, 903*c*, and 903*d*. The side 903*a* may be spaced apart from the side 903*c* along the longitudinal axis 210 of the print head engine 122. Further, the side 903*a* may be parallel to the side 903*c*. Similarly, the side 903*b* may be spaced apart from the side 903*d* along the lateral axis 212 of the print head engine 122. Further, the side 903*b* may be parallel to the side 903*d*.

In an example embodiment, the outer surface 908 of the housing 902 may define a first shaft through hole 914 that may extend from the side 903*a* to the side 903*c*. In some examples, the outer surface 908 may define the first shaft through hole 914 proximal to the first end portion 910 of the housing 902, and distal from the second end portion 912 of the housing 902. Further, the first shaft through hole 914 may be configured to receive the first shaft 802. Additionally or alternatively, the outer surface 908 of the housing 902 may be configured to define a second shaft through hole 916 that may extend from the side 903*a* to the side 903*c*. Additionally or alternatively, the outer surface 908 may define the second shaft through hole 916 in such a manner that the second shaft through hole 916 may extend along the vertical axis 128 of the printing apparatus 100. The second shaft through hole 916 may be configured to receive the second shaft 904. Since the second shaft through hole 916 extends along the vertical axis 128 of the printing apparatus 100, the second shaft 904 may be movable within the second shaft through hole 916, along the vertical axis 128 of the printing apparatus 100. Additionally, or alternatively, the second shaft 904 may be rotatable within the second shaft through hole 916.

In an example embodiment, the housing 902 of the second roller 134 is further configured to receive the second wheel 906 at the second end portion 912. More particularly, referring to FIG. 9B, the second shaft 904 is configured to receive the second wheel 906 such that the second wheel 906 is rotatable about the second shaft 904. Since the second shaft 904 is movable along the vertical axis 128 of the printing apparatus 100 (within the second shaft through hole 916), the second wheel 906 is also movable along the vertical axis 128 of the printing apparatus 100. Therefore, the second wheel 906 is both rotatable about the second shaft 904 and is traversable along the vertical axis 128 of the printing apparatus 100 within the second shaft through hole 916. In an example embodiment, the second shaft 904 is additionally coupled to a holder 918. In an example embodiment, the holder 918 comprises a first end 920 and a second end 922. The first end 920 of the holder 918 is spaced apart from the second end 922 of the holder along the vertical axis 128 of the printing apparatus 100. In an example embodiment, the first end 920 of the holder 918 abuts the second shaft 904.

In an example embodiment, at the second end 922, the holder 918 defines a protrusion 924 that may extend out from the second end 922 of the holder 918 along the vertical axis 128 of the printing apparatus 100. The protrusion 924 may be configured to receive a second biasing member 926 such as a spring and/or a leaf spring. The second biasing member 926 may additionally be coupled to the first shaft 802, when the first shaft 802 is received within the first shaft through hole 914. In an example embodiment, the second biasing member 926 may be configured to apply the biasing force on the holder 918 along the vertical axis 128 of the printing apparatus 100. More particularly, the biasing force may push the holder 918 towards the second end portion 912 of the housing 902, which causes the second shaft 904 to move towards the second end portion 912 of the housing 902. Accordingly, the movement of the second shaft 904 towards the second end portion 912 of the housing 902 causes a portion of the second wheel 906 to extend out from the second end portion 912 of the housing 902.

Referring back to FIG. 6, the structure of the fourth roller assembly 604 may be similar to the structure of the third roller assembly 602. For example, the third roller assembly 602 may include the first shaft 802 that may receive the at least one first roller 132. In an example embodiment, the structure of the at least one first roller 132 is similar to the structure of the second roller 134.

Figure 10B:
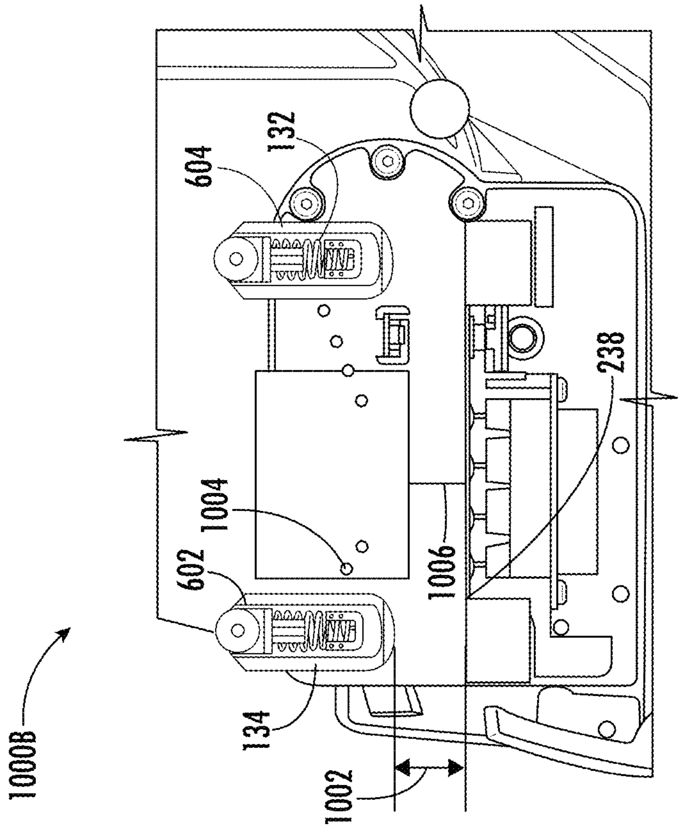
FIG. 10A and FIG. 10B are sectional views of the printing apparatus illustrating the traversal of the third roller assembly and the fourth roller assembly, according to one or more embodiments described herein.
Figure 10A:
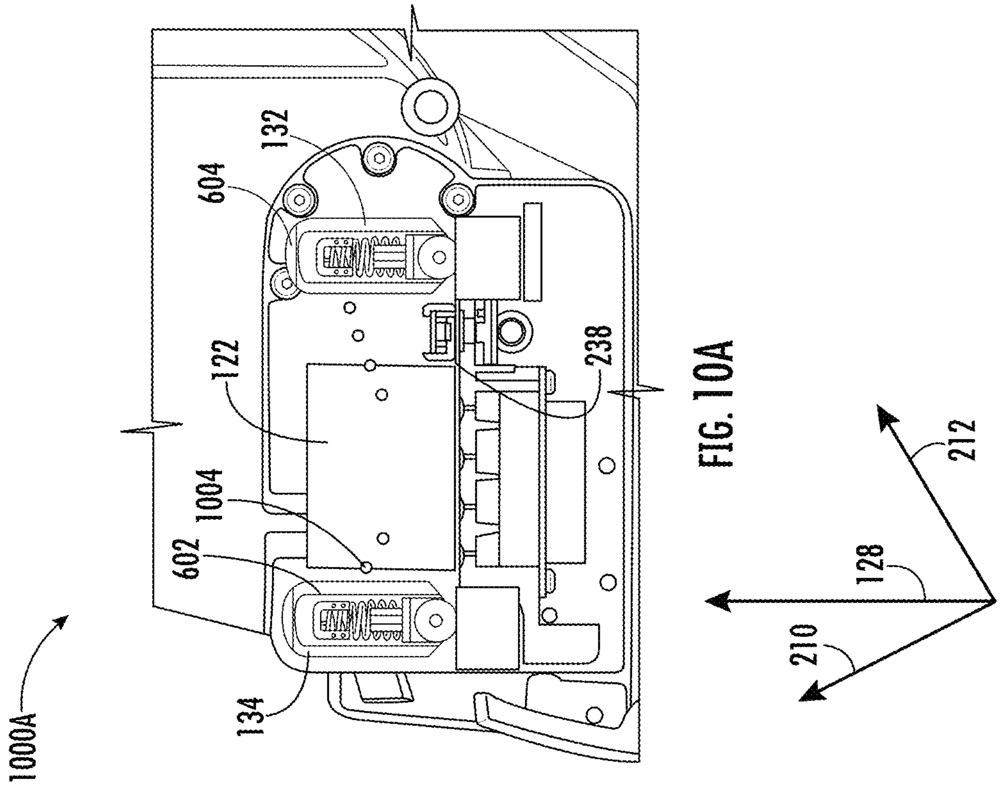

FIG. 10A and FIG. 10B are sectional views 1000A and 1000B of the printing apparatus 100 illustrating the traversal of the third roller assembly 602 and the fourth roller assembly 604, according to one or more embodiments described herein.

As depicted in the sectional view 1000A, the first roller 132 and the one or more second rollers 134 abut the platform 322 of the bottom chassis portion 128. In an example embodiment, a position of the first roller 132 and the second roller 134, where the first roller 132 and the second roller 134 abut the platform 322, is referred to as the third position. In an example embodiment, since the second biasing member 926 may apply the biasing force on the second wheel 906, accordingly, the first roller 132 and the second roller 134 may tightly abut the platform 322. To this end, when the platform 322 receives the print media 104, the first roller 132 and the second roller 134 may abut the print media 104. In some examples, in the third position, the first roller 132 and the second roller 134 may facilitate flattening of the print media 104 of the first portion of the print media 104 (positioned between the third roller assembly 602 and the fourth roller assembly 604). Since the print head engine 122 is positioned between the third roller assembly 602 (comprising the at least one second roller 134) and the fourth roller assembly 604 (comprising the at least one first rollers 132), the first portion of the print media 104 positioned within the print head engine 122 is flat. More particularly, the first portion of the print media 104 on the platform 322 is flat.

In some examples, the scope of the disclosure is not limited to the first roller 132 and the second roller 134 abutting the platform 322. In an example embodiment, as discussed in FIG. 3A, the breadth of the platform 322 may be the same as the breadth of the top chassis portion 126. In such an embodiment, the platform 322 may not extend beyond the periphery of the top chassis portion 126. To this end, the printing apparatus 100 may include the first shaft 248 and the second shaft 250. The first shaft 248 may be positioned upstream of the print head engine 122, along the print direction, and the second shaft 250 may be positioned downstream of the print head engine 122, along the print direction. Further, in such an embodiment, the first roller 132 and the second roller 134 may abut the first shaft 248 and the second shaft 250, respectively (when the first roller 132 and the second roller 134 are in the third position).

In an example embodiment, as discussed in FIG. 7, FIG. 8, FIGS. 9A and 9B, the first roller 132 and the second roller 134 are rotatable about the first shaft 802. Referring to FIG. 10B, the operator of the printing apparatus 100 may rotate the first cam roller 612 and the second cam roller 614 to cause rotation of the first shaft 802 that in turn causes the first roller 132 and the second roller 134 to rotate. Such rotation causes the first roller 132 and the second roller 134 to traverse to the fourth position. In some examples, in the fourth position, the first roller 132 and the second roller 134 may point towards the top end portion 206 of the top chassis portion 126 (of the print head engine 122). Accordingly, in the fourth position, the first roller 132 and the second roller 134 are spaced apart from the print media 104 (depicted by 1002). Such orientation of the first roller 132 and the second roller 134 allows the operator to adjust the print media 104 with respect to the print head engine 122. For example, the print media 104 may be adjusted to clear out a jam condition. In an example embodiment, the jam condition may correspond to a condition in which the print media 104 is unable to traverse in the print direction or in the retract direction due to some obstruction in the print path.

In some examples, the third roller assembly 602 and the fourth roller assembly 604 may be coupled to the print head engine 122 through coupling shafts 1004. For example, the print head engine 122 may be coupled to the first roller 132 and the second roller 134. Accordingly, when the first roller 132 and the second roller 134 are rotated (when operator of the printing apparatus 100 rotates the first cam roller 612 and the second cam roller 614), the coupling shafts 1004 may cause the top chassis portion 126 of the print head engine 122 may traverse on the first linear guide 120A and the second linear guide 120B. For example, when the first roller 132 and the second roller 134 are rotated, about the first shaft 802, to the fourth position, the top chassis portion 126 may traverse to a fifth position. In an example embodiment, in the fifth position, the top chassis portion 126 is spaced apart from the bottom chassis portion 128 thereby creating a space 1006 between the top chassis portion 126 and the bottom chassis portion 128. In some examples, when the first roller 132 and the second roller 134 are rotated, about the first shaft 802, to the third position, the top chassis portion 126 may traverse to a sixth position. In an example embodiment, in the sixth position, the top chassis portion 126 may removably couple with the bottom chassis portion 128.

In some examples, the scope of the disclosure is not limited to manually rotating the first roller 132 and the second roller 134 by rotating the first cam roller 612 and the second cam roller 614. In an example embodiment, the first roller 132 and the second roller 134 may be rotated based on the actuation of the first actuation unit 119. As discussed in FIG. 7, the third roller assembly 602 and the fourth roller assembly 604 are coupled to the first actuation unit 119 through the belt 710. Therefore, the first actuation unit 119 may cause the third roller assembly 602 and the fourth roller assembly 604 to rotate.

In some examples, the scope of the disclosure is not limited to the first roller 132 and the second roller 134 being part of the third roller assembly 602 and the fourth roller assembly 604. In an example embodiment, the first roller 132 and the second roller 134 may separate from the third roller assembly 602 and the fourth roller assembly 604. In such an embodiment, the first roller 132 and the second roller 134 may be coupled to the back-spine section 114 of the printing apparatus 100, as is illustrated in FIG. 1. Additionally, the printing apparatus 100 may include the third roller assembly 602 and the fourth roller assembly 604, as is described above in FIG. 6. To this end, the third roller assembly 602 and the fourth roller assembly 604 may include a fifth roller and a sixth roller, respectively. The structure of the fifth roller and the sixth roller may be similar to the second roller 134, as is described in FIG. 7, FIG. 8 and FIG. 9A and FIG. 9B.

In some examples, the scope of the disclosure is not limited to using roller assemblies to flatten the print media 104. In an example embodiment, the printing apparatus 100 may include one or more media guide assembly that may be configured to flatten the print media 104, as is further illustrated in FIG. 11.

Figure 11:
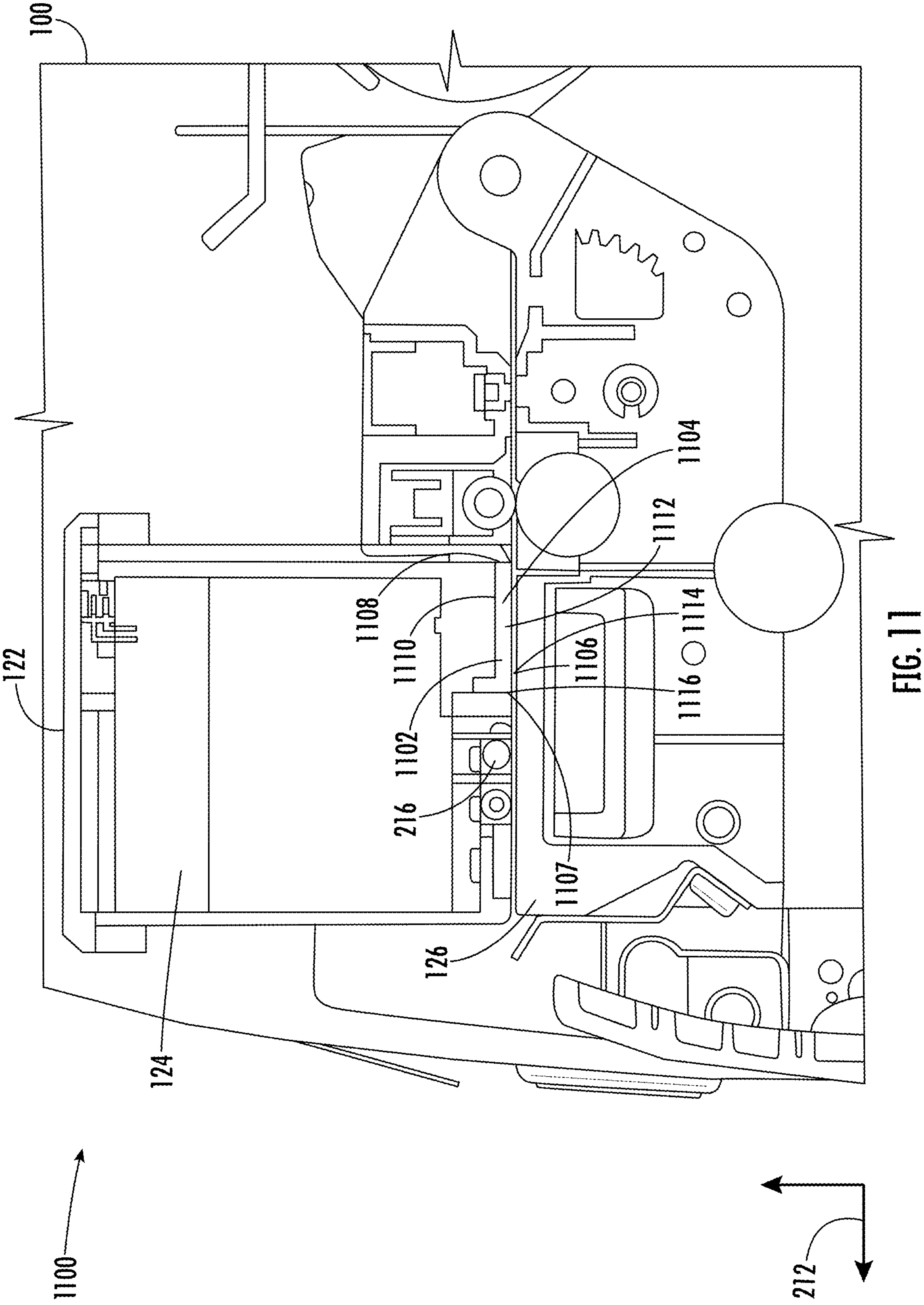
FIG. 11 illustrates a sectional view of the printing apparatus, according to one or more embodiments described herein.

FIG. 11 illustrates a sectional view 1100 of the printing apparatus 100, according to one or more embodiments described herein. The printing apparatus 100 includes a media guide assembly 1102 positioned upstream of the print head engine 122. Further, the printing apparatus 100 includes the second roller assembly 316 positioned downstream of the print head engine 122. In an example embodiment, the media guide assembly 1102 further includes an arm section 1104 and a groove section 1106.

In an example embodiment, the arm section 1104 is fixedly coupled to back-spine section 114 of the printing apparatus 100. Further, the arm section 1104 extends along the lateral axis 212 of the print head engine 122. Further, the arm section 1104 has a first end 1107 and a second end 1108. The first end 1107 of the arm section 1104 is defined to be proximal to the print head engine 122 and the second end 1108 is defined to be distal from the print head engine 122. Additionally, the arm section 1104 includes a top surface 1110 and a bottom surface 1112. The top surface 1110 is defined to be distal from the bottom chassis portion 128 of the print head engine 122, while the bottom surface 1112 is defined to be proximal to the bottom chassis portion 128.

In an example embodiment, the bottom surface 1112 is configured to define the groove section 1106 such that the groove section 1106 protrudes out from the bottom surface 1112 towards the bottom chassis portion 128 of the print head engine 122. In some examples, a distance between the bottom chassis portion 128 and the groove section 1106 is in a range of 0.4 mm to 0.6 mm. Further, when the print media 104 is received on the bottom chassis portion 128, the print media 104 is pressed by the groove section 1106 and the second roller assembly 316. To this end, the print media 104 is flattened between the second roller assembly 316 and the media guide assembly 1102.

In some examples, the groove section 1106 may include a ramp section 1114 and a valley section 1116. The ramp section 1114 may face the second end 1108 of the arm section 1104 and may have a predetermined slope. Further, the valley section 1116 may face the first end 1107 of the arm section 1104. In some examples, the slope of the ramp section 1114 may facilitate smooth traversal of the print media 104 along the print path. Accordingly, the ramp section 1114 may reduce the media jam possibility. In some examples, the scope of the disclosure is not limited to groove section 1106 having the aforementioned shape. In an example embodiment, the groove section 1106 may have any other shape without departing from the scope of the disclosure.

In some examples, a distance between the groove section 1106 and the bottom chassis portion 128 may be adjustable. In such an embodiment, the groove section 1106 may be coupled to the arm section 1104 through a coupling means such as a screw. An operator of the printing apparatus 100 may rotate the screw clockwise and/or counterclockwise to adjust a distance between the groove section 1106 and the bottom chassis portion 128. In such an embodiment, the distance between the groove section 1106 and the bottom chassis portion 128 may be adjusted from 0.4 mm to 0.6 mm, dependent on media thickness and flatness requirement, In some examples, the scope of the disclosure is not limited to a particular coupling means or screw. In an example embodiment, the coupling means may further include pen-click type mechanism. In such an embodiment, the operator of the printing apparatus 100 may adjust a distance between the groove section 1106 and the bottom chassis portion 128 by pressing a plunger coupled to the groove section 1106.

In some examples, the scope of the disclosure is not limited to having one media guide assembly 1102 in the printing apparatus 100 to flatten the print media 104. In an example embodiment, the printing apparatus 100 may include another media guide assembly positioned downstream of the print head engine 122. Further, in such an embodiment, the printing apparatus 100 may be devoid of the second roller assembly 316.

In some examples, the scope of the disclosure is not limited to the printing apparatus 100 include the media guide assembly 1102. In an example embodiment, the top chassis portion 126 of the print head engine 122 may define the groove section 1106 in the top chassis portion 126 of the print head engine 122. More particularly, the print head engine 122 may define the groove section at a bottom surface of the top chassis portion 126 (which is proximal to the bottom chassis portion 128 of the print head engine 122).

In some examples, the scope of the disclosure is not limited to the print head engine 122 including the first roller 132 and the one or more second rollers 134. Additionally, or alternatively, the printing apparatus 100 may include a frame to flatten the print media 104, as is described in conjunction with FIGS. 12-19.

Example apparatuses, systems, and methods described herein include a printing apparatus that is capable of flattening or substantially flattening print media prior to the printing operation. In some examples and in embodiments configured to flatten print media, the printing apparatus includes a platform that is capable of receiving the print media for printing operation. In some example, the printing apparatus may include a vacuum generating unit that is configured to generate a negative pressure on the platform so as to cause the print media stick to or otherwise be detachably attached to the platform. In some examples, the edges of the print media may curl during the application of the negative pressure on the platform. To de-curl the edges of the print media, the printing apparatus further includes a frame that may be configured to press upon the edges of the print media. To this end, the combination of the vacuum generating unit and the frame facilitates, in some examples, flattening of the print media.

Figure 12:
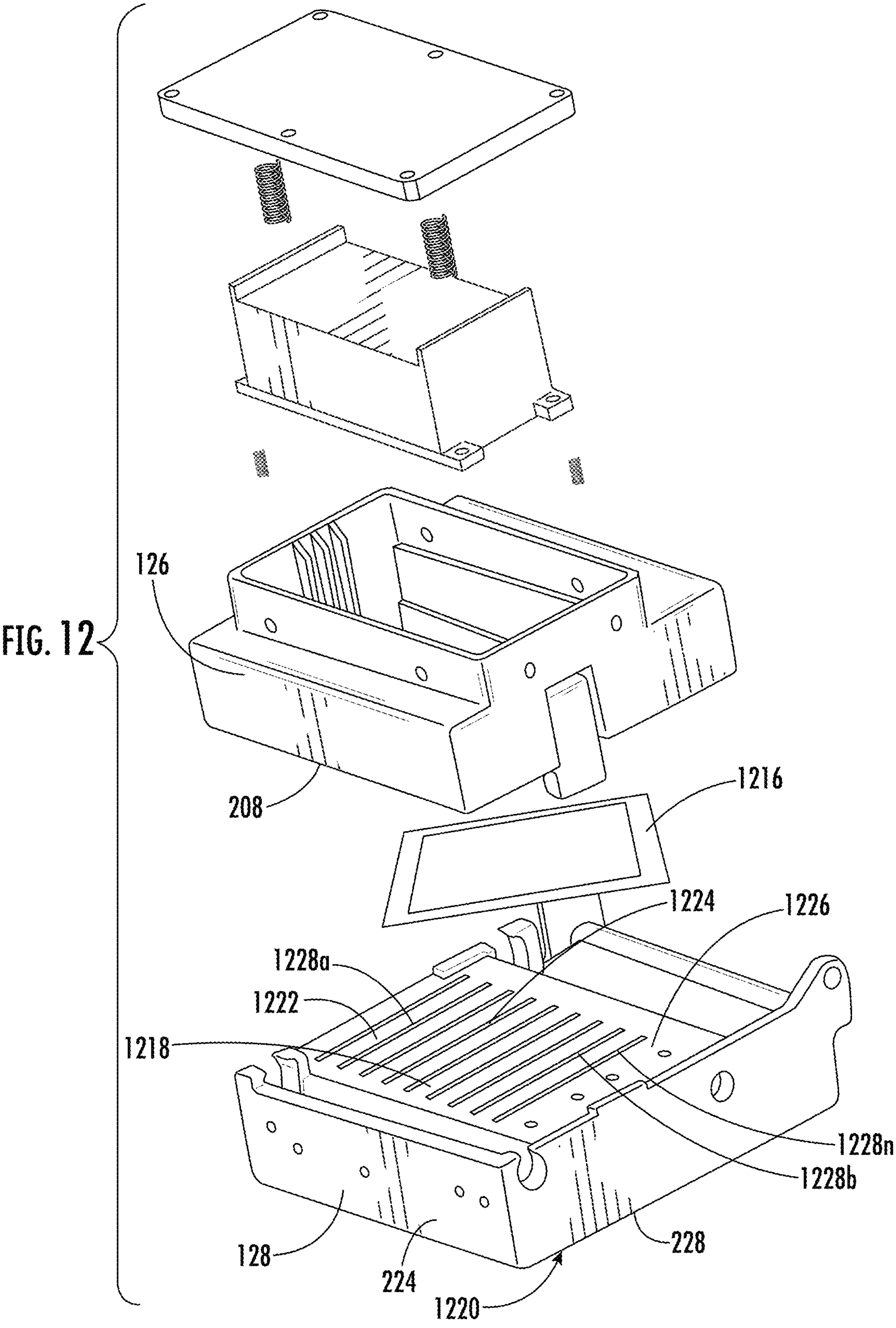
FIG. 12 illustrates an exploded view of the print head engine, according to one or more embodiments described herein.

FIG. 12 illustrates an exploded view of the print head engine 122, according to one or more embodiments described herein.

In an example embodiment, the top chassis portion 126 may be configured to receive a print head (not shown). In some examples, the top chassis portion 126 may define one or more features such as a cavity (not shown), base plate (not shown) one or more first biasing members (not shown), and/or the like that allow the top chassis portion 126 to receive the print head. Additionally, or alternatively, the bottom end portion 208 of the top chassis portion 126 may be configured receive a frame 1216. For example, the frame 1216 may be coupled to the bottom end portion 208 of the top chassis portion 126, as is further described in FIG. 14. In an alternate embodiment, the frame 1216 may be movably positioned proximal to the bottom end portion 208 of the top chassis portion 126. The structure of the frame 1216 is further described in conjunction with FIG. 13 and FIG. 15.

In an example embodiment, the top chassis portion 126 may be configured to couple with the bottom chassis portion 128 through the latch 130. When the top chassis portion 126 couple with the bottom chassis portion 128, the frame 1216 may get movably positioned between the top chassis portion 126 and bottom chassis portion 128. For example, the frame 1216 may traverse between a first position and a second position within a space between the bottom end portion 208 of the top chassis portion 126 and the top end portion 226 of the bottom chassis portion 128.

In an example embodiment, the bottom chassis portion 128 has the outer surface 224, a top surface 1218, and a bottom surface 1220. In some examples, the outer surface 224 and the top surface 1218 define the top end portion 226 of the bottom chassis portion 128. Further, in some examples, the outer surface 224 and the bottom surface 1220 define the bottom end portion 228 of the bottom chassis portion 128. In some examples, the top surface 1218 of the bottom chassis portion 128 defines a platform 1222 that may correspond to a region on which the print media 104 is received for printing operation. Further, the platform 1222 extends along the length (defined along the longitudinal axis 210 of the print head engine 122) and the breadth (defined along the lateral axis 212 of the print head engine 122) of the bottom chassis portion 128.

In an example embodiment, the top surface 1218 of the bottom chassis portion 128 further divides the platform 1222 into a printing region 1224 and a periphery region 1226. Dimensions of the printing region 1224 may be defined to be proportional to a maximum size of the print media 104 supported by the printing apparatus 100. In an example embodiment, the periphery region 1226 may be defined to be proximal to the first circular notch 236, the second circular notch 238, the third circular notch 240, and a fourth circular notch 242. In some examples, the periphery region 1226 surrounds the printing region 1224.

In an example embodiment, the top surface 1218 of the bottom chassis portion 128 defines a plurality of orifices 1228*a*, 1228*b*, . . . , 1228*n* that extends from the top surface 1218 of the bottom chassis portion 128 to the bottom surface 1220 of the bottom chassis portion 128. At the bottom surface 1220, the bottom chassis portion 128 is configured to receive a vacuum generating unit, as is further illustrated in FIG. 16.

In some examples, the scope of the disclosure is not limited to the platform 1222 to be fixedly defined by the top surface 1218 of the bottom chassis portion 128. In some examples, the platform 1222 may be a modular component that may be removably coupled to the bottom chassis portion 128, without departing from the scope of the disclosure. The structure of the bottom chassis portion 128 that allows coupling with the modular platform is further described in conjunction with FIG. 17. The structure of an example modular platform is described in conjunction with FIG. 18.

Figure 13:
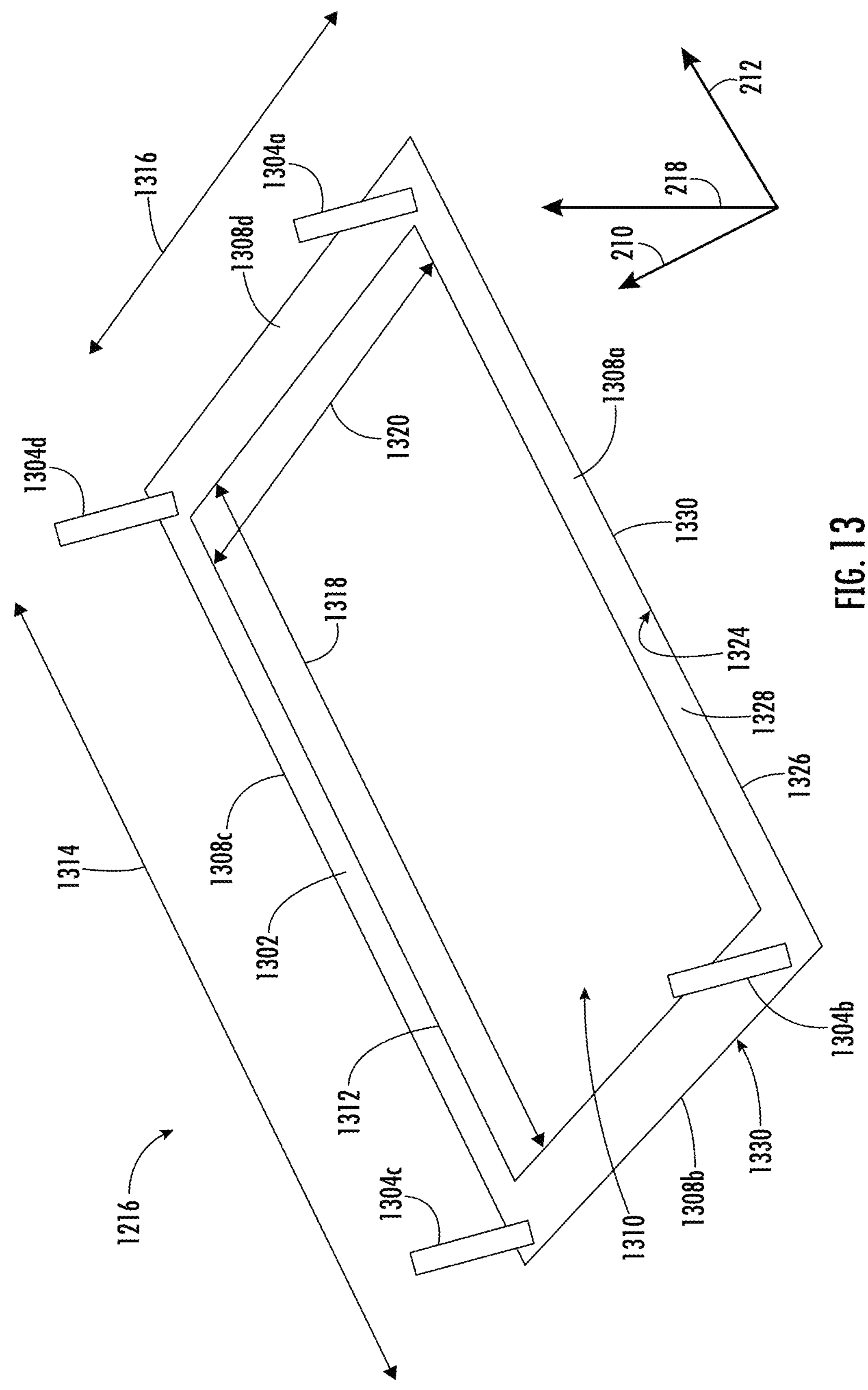
FIG. 13 illustrates a perspective view of the frame, according to one or more embodiments described herein.

FIG. 13 illustrates a perspective view of the frame 1216, according to one or more embodiments described herein. The frame 1216 includes a media flattening portion 1302, and first supporting members 1304*a*, 1304*b*, 1304*c*, and 1304*d*.

In an example embodiment, the media flattening portion 1302 may have a rectangular shape that may have one or more sides 1308*a*, 1308*b*, 1308*c*, and 1308*d*. The side 1308*a* may be spaced apart from the side 1308*c* along the longitudinal axis 210 of the print head engine 122. Further, the side 1308*a* may be parallel to the side 1308*c*. Similarly, the side 1308*b* may be spaced apart from the side 1308*d* along the lateral axis 212 of the print head engine 122. Further, the side 1308*b* may be parallel to the side 1308*d*. Additionally, the media flattening portion 1302 may have a top surface 1328 and a bottom surface 1330. In an example embodiment, the top surface 1328 of the media flattening portion 1302 may define a top end portion 1324 of the media flattening portion 1302. Further, the bottom surface 1330 of the media flattening portion 1302 may define a bottom end portion 1326 of the media flattening portion 1302.

In some examples, the bottom surface 1330 of the media flattening portion 1302 may define a void 1310 that extends from the bottom surface 1330 of the media flattening portion 1302 to the top surface 1328. In an example embodiment, a shape of the void 1310 is defined by an inner edge 1312 of the media flattening portion 1302. In some examples, the void 1310 may have the rectangular shape. In such a scenario, the shape the media flattening portion 1302 may correspond to a concentric rectangle. Further, to this end, one or more dimensions of the media flattening portion 1302 may include an outer length (depicted by 1314), an outer breadth (depicted by 1316), an inner length (depicted by 1318), and an inner breadth (depicted by 1320). In some examples, the outer length (depicted by 1314) and the inner length (depicted by 1318) of the media flattening portion 1302 is defined along the longitudinal axis 210 of the print head engine 122. Further, in some examples, the outer breadth (depicted by 1316) and the inner breadth (depicted by 1320) of the media flattening portion 1302 is defined along the lateral axis 212 of the print head engine 122.

In some examples, the media flattening portion 1302 may be configured to be coupled to the first supporting members 1304*a*, 1304*b*, 1304*c*, and 1304*d*. In an example embodiment, the media flattening portion 1302 is configured to be movably coupled to the top chassis portion 126 through the first supporting members 1304*a*, 1304*b*, 1304*c*, and 1304*d*.

In some examples, the dimensions of the inner length (depicted by 1318) of the media flattening portion 1302 and the inner breadth (depicted by 1320) may be equivalent to the dimensions of the print head. To this end, when the frame 1216 is received at the bottom end portion 208 of the top chassis portion 126, the print head is visible through the void 1310. The coupling of the frame 1216 with the top chassis portion 126 is further described in FIG. 14.

Figure 14:
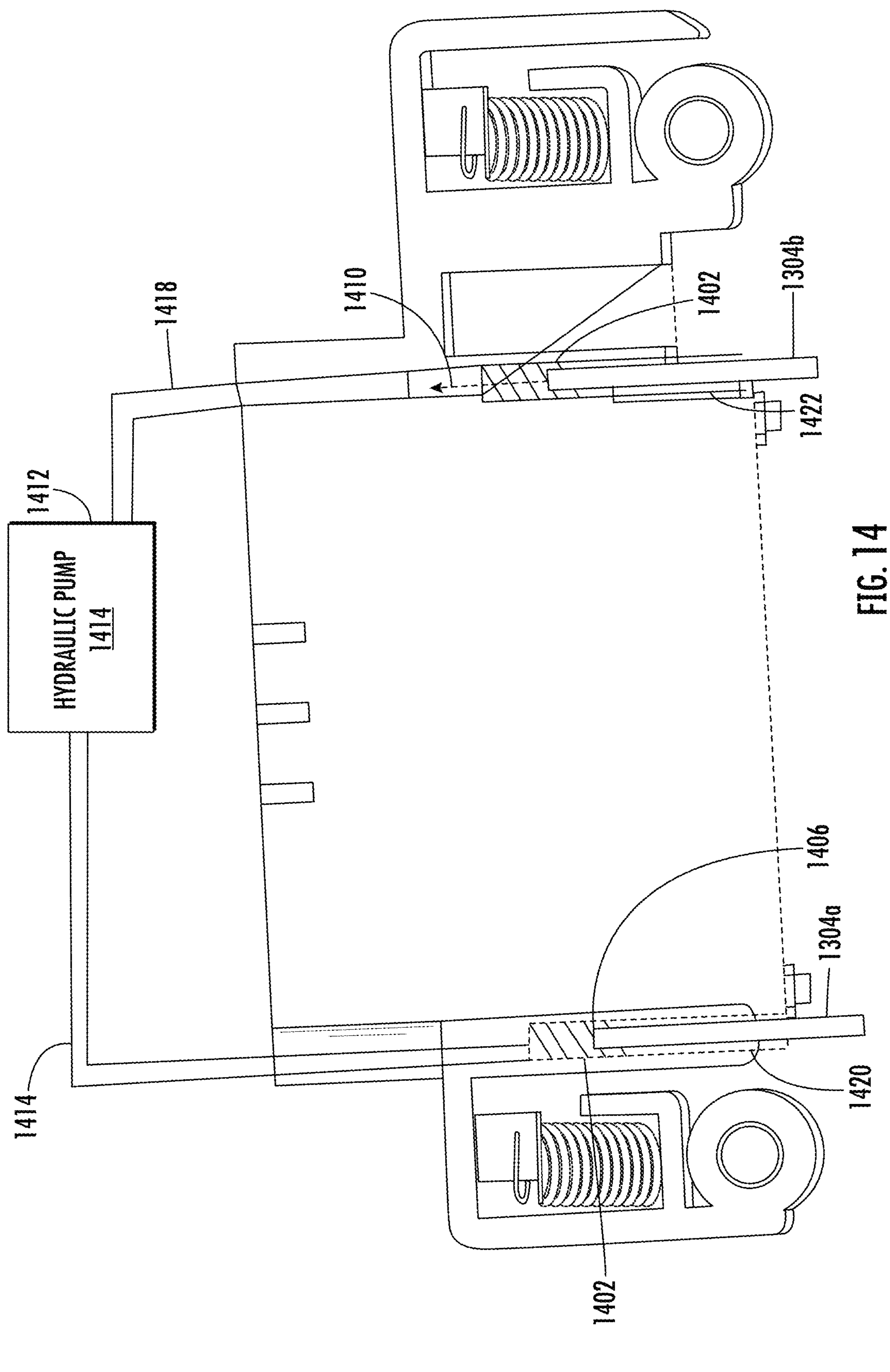
FIG. 14 illustrates a sectional view of the top chassis portion, according to one or more embodiments described herein.

FIG. 14 illustrates a sectional view of the top chassis portion 126, according to one or more embodiments described herein. As illustrated in FIG. 14, the bottom end portion 208 defines a first channel 1420, a second channel 1422, a third channel (not shown) and a fourth channel (not shown) that extends from the bottom end portion 208 of the top chassis portion 126 towards the top end portion 206 of the top chassis portion 126. The first channel 1420, and the second channel 1422 may be configured to receive at least one biasing member 1402. Similarly, though not illustrated in FIG. 14, the third channel and the fourth channel may also receive the biasing member 1402. Additionally, as illustrated, each of the first channel 1420 and the second channel 1422 may be configured to receive the first supporting members 1304*a* and 1304*b*, respectively. Similarly, (though not illustrated in FIG. 14), the third channel and the fourth channel may receive the first supporting members 1304*c*, and 1304*d*, respectively.

In some examples, the plurality of first supporting members 1304*a*, 1304*b*, 1304*c*, and 1304*d* may couple to the at least one biasing member 1402 in each of the each of the first channel 1420, the second channel 1422, the third channel, and the fourth channel, respectively. For example, a first end 1406 the first supporting member 1304*a* is coupled to the at least one biasing member 1402. In an example embodiment, the at least one biasing member 1402 exerts a biasing force (depicted by 1410) on each of the plurality of first supporting members 1304*a*, 1304*b*, 1304*c*, and 1304*d* to pull the first end 1406 of each of the plurality of first supporting members 1304*a*, 1304*b*, 1304*c*, and 1304*d* towards the top end portion 206 of the top chassis portion 126, when no external force is applied on the plurality of first supporting members 1304*a*, 1304*b*, 1304*c*, and 1304*d*. In an alternate embodiment, the at least one biasing member 1402 exerts a biasing force (depicted by 1410) on each of the plurality of first supporting members 1304*a*, 1304*b*, 1304*c*, and 1304*d* to push the first end 1406 of the plurality of first supporting members 1304*a*, 1304*b*, 1304*c*, and 1304*d* towards the bottom chassis portion 128, when no external force is applied on the plurality of first supporting members 1304*a*, 1304*b*, 1304*c*, and 1304*d*.

As discussed above, the biasing member 1402 applies the biasing force (depicted by 1410) on the first supporting members 1304*a*, 1304*b*, 1304*c*, and 1304*d*. Accordingly, the biasing force (depicted by 1410) is applied on the media flattening portion 1302 causing the media flattening portion 1302 to travel towards the bottom end portion 208 of the top chassis portion 126. In some examples, to cause the media flattening portion 1302 to traverse to a position proximal to the bottom chassis portion 128, the external force may be applied to the frame 1216. In some examples, a fifth actuation unit 1412 may be configured to apply the external force to the frame 1216. Some examples of the fifth actuation unit 1412 may include a hydraulic system. In such an embodiment, the biasing force on the frame 1216 may be applied through hydraulic system. To this end, each of the first channel 1420, the second channel 1422, the third channel, and the fourth channel, may be devoid of the at least one biasing member 1402. Further, each of the first channel 1420, the second channel 1422, the third channel, and the fourth channel may be fluidly coupled to a hydraulic pump 1414. In some examples, the hydraulic pump 1414 may be configured to pump fluid in/out from each of the first channel 1420, the second channel 1422, the third channel, and the fourth channel (through one or more conduits such as conduit 1416 and conduit 1418) to apply the external force on the frame 1216. For example, when the fluid is pumped into each of the first channel 1420, the second channel 1422, the third channel, and the fourth channel, the fluid may exert the external force on the frame 1216. In another example, when the fluid is pumped out from each of the first channel 1420, the second channel 1422, the third channel, and the fourth channel, a negative pressure (generated due to pumping out the fluid) exerts the biasing force (depicted by 1410) on the frame 1216. Further, in such an embodiment, the first supporting members 1304*a*, 1304*b*, 1304*c*, and 1304*d* may not be coupled to the biasing member 1402 in the first channel 1420, the second channel 1422, the third channel, and the fourth channel. To this end, the first supporting members 1304*a*, 1304*b*, 1304*c*, and 1304*d* may be directly received within the first channel 1420, the second channel 1422, the third channel, and the fourth channel, respectively.

Figure 16:
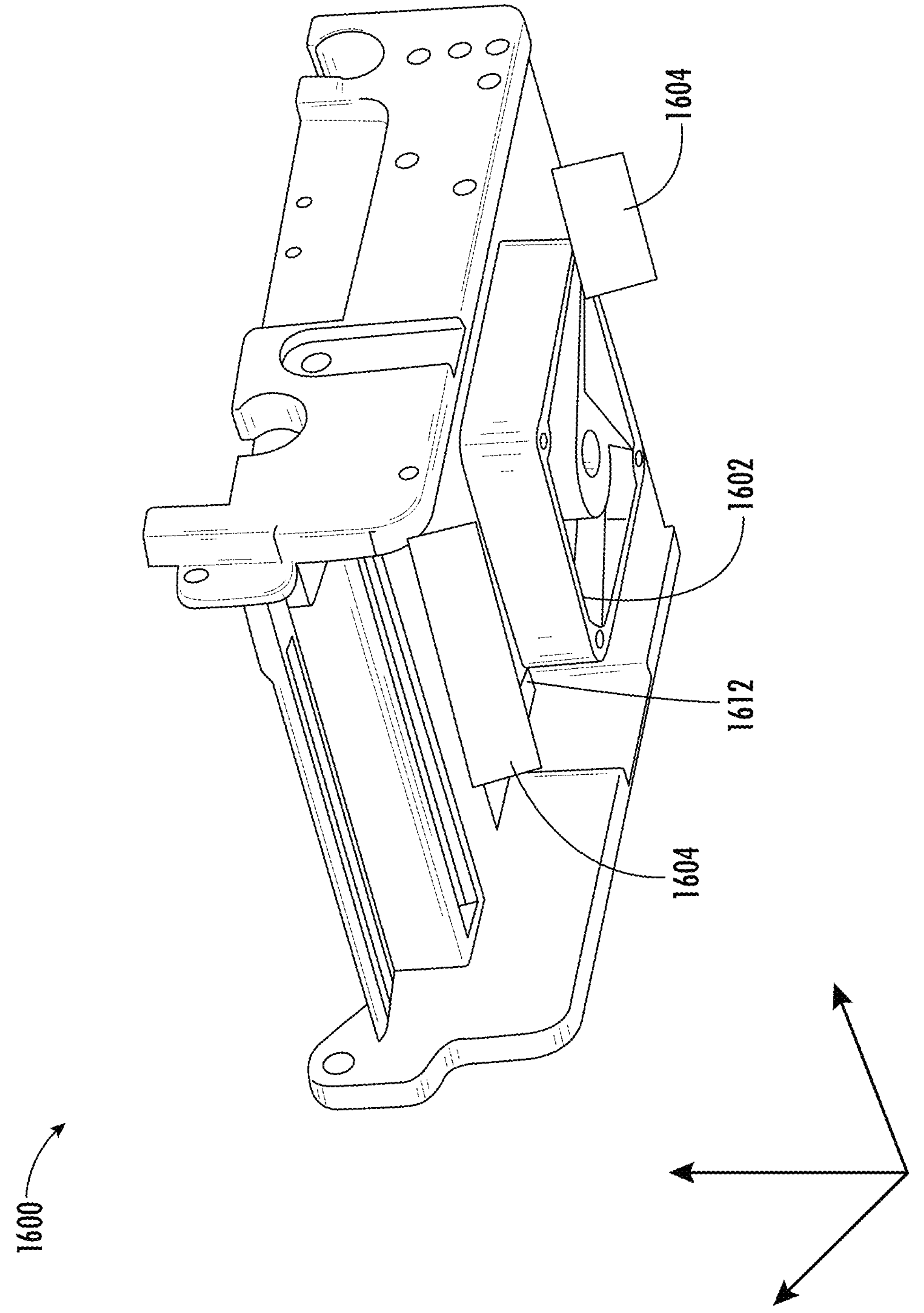
FIG. 16 illustrates a bottom perspective view of the bottom chassis portion, according to one or more embodiments described herein.

In yet another embodiment, the fifth actuation unit 1412 may correspond to an electromagnet that may be installed in the bottom chassis portion 128, as is further described in conjunction with FIG. 16. In such an implementation, activation of the electromagnet may lead to generation of magnetic field, which may apply magnetic force on the frame 1216. The magnetic force applied on the frame 1216 may correspond to the external force, which may cause the traversal of the frame 1216.

Figure 15:
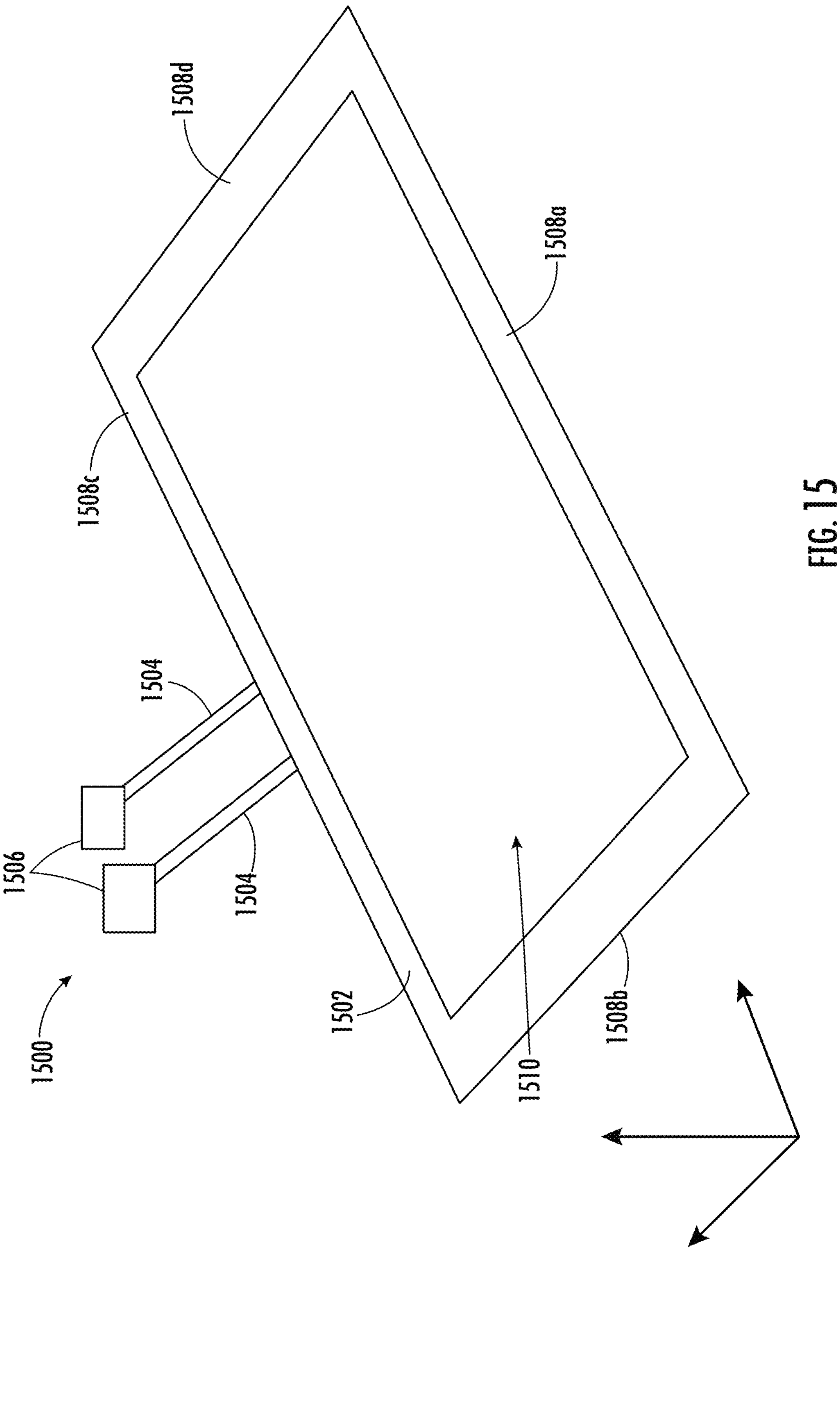
FIG. 15 illustrates a perspective view of another implementation of the frame, according to one or more embodiments described herein.

FIG. 15 illustrates a perspective view 1500 of another implementation of the frame 1216, according to one or more embodiments described herein.

In an example embodiment, the frame 1216 includes a media flattening portion 1502, a second supporting member portion 1504, and a linear block 1506. In some examples, the media flattening portion 1502 may have a structure similar to the media flattening portion 1302. For example, a shape of the media flattening portion 1502 may correspond to a concentric rectangle. Further, the media flattening portion 1502 comprises one or more sides 1508*a*, 1508*b*, 1508*c*, and 1508*d*. The side 1508*a* may be spaced apart from the side 1508*c* along the longitudinal axis 210 of the print head engine 122. Further, the side 1508*a* may be parallel to the side 1508*c*. Similarly, the side 1508*b* may be spaced apart from the side 1508*d* along the lateral axis 212 of the print head engine 122. Further, the side 1508*b* may be parallel to the side 1508*d*.

In an example embodiment, the media flattening portion 1502 is coupled to the linear block 1506 through the second supporting member portion 1504. In some examples, the side 1508*c* of the media flattening portion 1502 is coupled to the linear block 1506 through the second supporting member portion 1504. In some examples, the second supporting member portion 1504 may correspond to a support member that is capable of bearing the weight of the media flattening portion 1502.

In an example embodiment, the linear block 1506 is further movably coupled to the first linear guide 120A and the second linear guide 120B. Further, a length of the second supporting member portion 1504 is such that when the linear block 1506 is movably coupled to the first linear guide 120A and the second linear guide 120B, the void 1510 of the media flattening portion 1502 is positioned below the print head along the vertical axis 128 (mounted in the top chassis portion 126). More particularly, the print head is visible through the void 1510. For example, in scenario where the print head corresponds to a laser pint head, the void 1510 may allow the laser light from the print head to pass through.

Further, the linear block 1506 may be coupled to an actuation unit (e.g., a hydraulic pump, electromagnet, and rails as is shown in FIGS. 14-16), which may facilitate the traversal of the frame 1216. For example, the one or more motors of the printing apparatus 100 may be coupled to the linear block 1506. The actuation of the one or more motors may cause the traversal of the frame 1216.

FIG. 16 illustrates a bottom perspective view 1600 of the bottom chassis portion 128, according to one or more embodiments described herein.

As discussed in FIG. 12 and in some examples, at the bottom surface 1220, the bottom chassis portion 128 is configured to receive a vacuum generating unit. For example, at the bottom surface 1220, the bottom chassis portion 128 is configured to receive a vacuum generating unit 1602. In an example embodiment, the vacuum generating unit 1602 may be configured to generate a negative pressure at the top surface 1218 of the bottom chassis portion 128 through the plurality of orifices 1228*a*, 1228*b*, . . . , 1228*n*. In some examples, the negative pressure causes the print media 104 (received on the platform 1222) to stick to the platform 1222. Accordingly, the print media 104 may lay flat on the platform 1222, when the vacuum generating unit 1602 is activated. Some examples of the vacuum generating unit 1602 may include a fan, or a vacuum pump.

In some examples, the bottom surface 1220 of the bottom chassis portion 128 may be further configured to receive the fifth actuation unit 1412. For example, bottom surface 1220 of the bottom chassis portion 128 may be configured to receive the electromagnet 1604.

Figure 17:
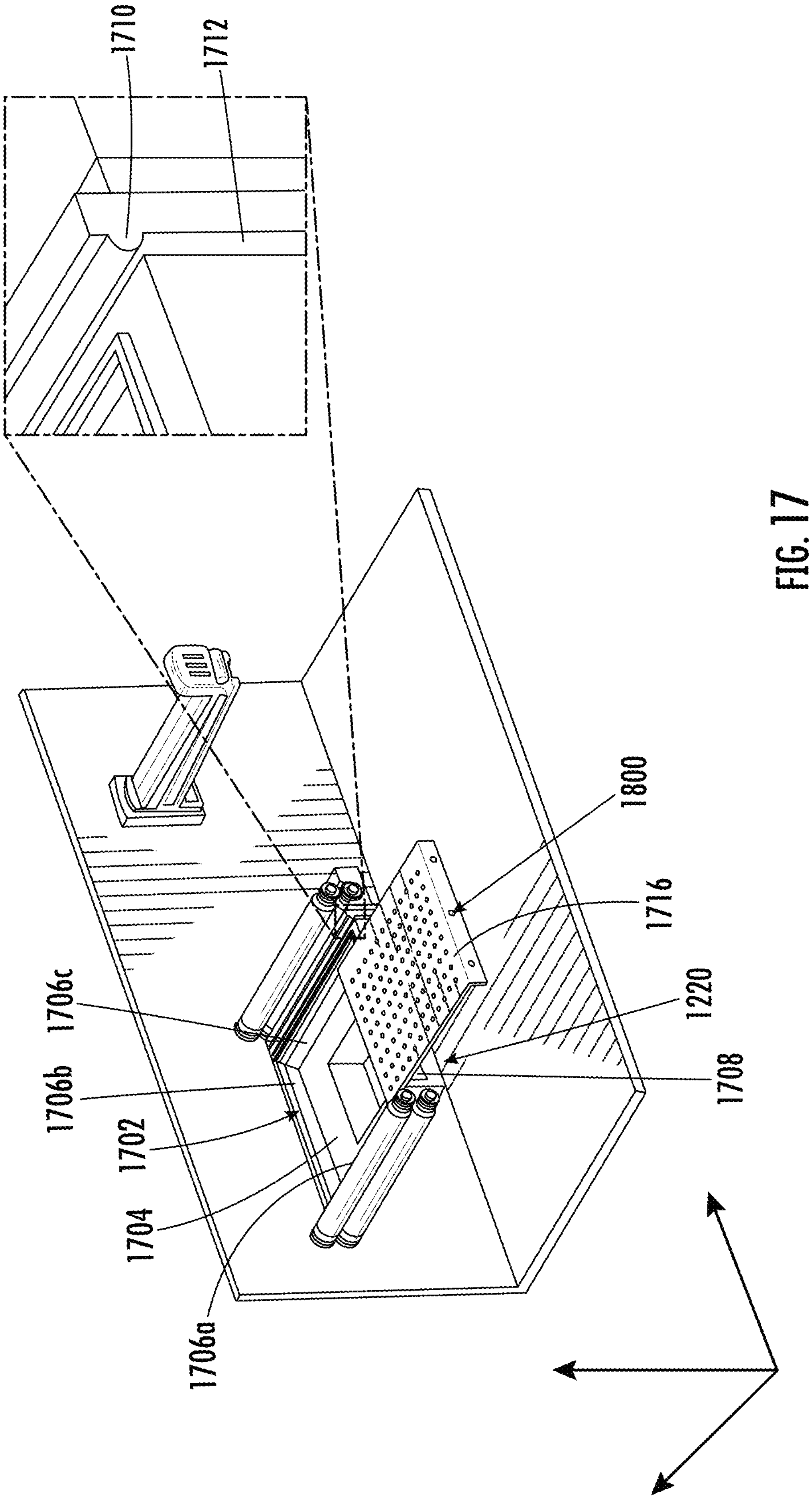
FIG. 17 illustrates another perspective view of a portion of the bottom chassis portion, according to one or more embodiments described herein.

FIG. 17 illustrates another perspective view of a portion of the bottom chassis portion 128, according to one or more embodiments described herein.

In an example embodiment, the top surface 1218 of the bottom chassis portion 128 defines a depression 1702 at the top end portion 226 of the bottom chassis portion 128. Further, the depression 1702 extends along the length (defined along the longitudinal axis 210 of the print head engine 122) and the breadth (defined along the lateral axis 212 of the print head engine 122) of the bottom chassis portion 128. In some examples, defining the depression 1702 leads to formation of a platform receiving surface 1704. The platform receiving surface 1704 may have a rectangular shape that is surrounded by wall surfaces 1706*a*, 1706*b*, and 1706*c* on the three sides. In some examples, by the wall surfaces 1706*a*, 1706*b*, and 1706*c* may extend from the platform receiving surface 1704 to the top end portion 226 of the bottom chassis portion 128 along the vertical axis 128 of the print head engine 122. In an example embodiment, the wall surfaces 1706*a* and 1706*c* may extend along the longitudinal axis 210 of the print head engine 122 and may be parallel to each other. Further, the wall surface 1706*b* may extend along the lateral axis 212 of the print head engine 122 and may be defined to be proximal to the back-spine section 114 of the printing apparatus 100. In an example embodiment, the platform receiving surface 1704 may not be surrounded by a wall surface on the fourth side to define an opening 1708. In some examples, the opening 1708 may allow the receipt of the modular component 1716 such as the modular platform (further described in FIG. 18).

In an example embodiment, each of the wall surfaces 1706*a*, 1706*b*, and 1706*c* may define a protruding groove 1710 proximal to the top end portion 226. The protruding groove 1710 may extend along a length of each wall surface 1706*a*, 1706*b*, and 1706*c*. For example, the protruding groove 1710, defined on the wall surfaces 1706*a* and 1706*c*, may extend along the longitudinal axis 210 of the print head engine 122. Further, the protruding groove 1710, defined on the wall surface 1706*b* may extend along the lateral axis 212 of the print head engine 122. In some examples, a region 1712, on each wall surface 1706*a* and 1706*c*, between the respective protruding groove 1710 and the platform receiving surface 1704 may define a path to slidingly receive the modular component 1716 such as the modular platform (described in conjunction with FIG. 18). Additionally, or alternately, the region 1712 and the protruding groove 1710, defined on wall surface 1706*b*, may lock the modular platform and accordingly, may thwart motion of the modular platform. For example, the region 1712 and the protruding groove 1710, defined on wall surface 1706*b*, may thwart the motion of the modular component along the vertical axis 128 of the printing apparatus 100.

In an example embodiment, a gasket layer 1718 may be disposed on the region 1712 on each wall surface 1706*a*, 1706*b*, and 1706*c*. In some examples, the gasket layer 1718 may prevent air from passing through an interface between the modular component 1716 (that may be received on the platform receiving surface 1704) and the region 1712.

In an example embodiment, the bottom surface 1220 of the bottom chassis portion 128 defines a cavity 1714 that extends from the bottom surface 1220 of the bottom chassis portion 128 to the platform receiving surface 1704. In a scenario, where the modular component 1716 is received on the platform receiving surface 1704, the modular component 1716 such that the modular component 1716 covers the cavity 1714 from the top end portion 226 of the bottom chassis portion 128. As discussed above, the vacuum generating unit 1602 is received at the bottom end portion 228 of the bottom chassis portion 128 to generate the negative pressure through the cavity 1714.

Figure 18:
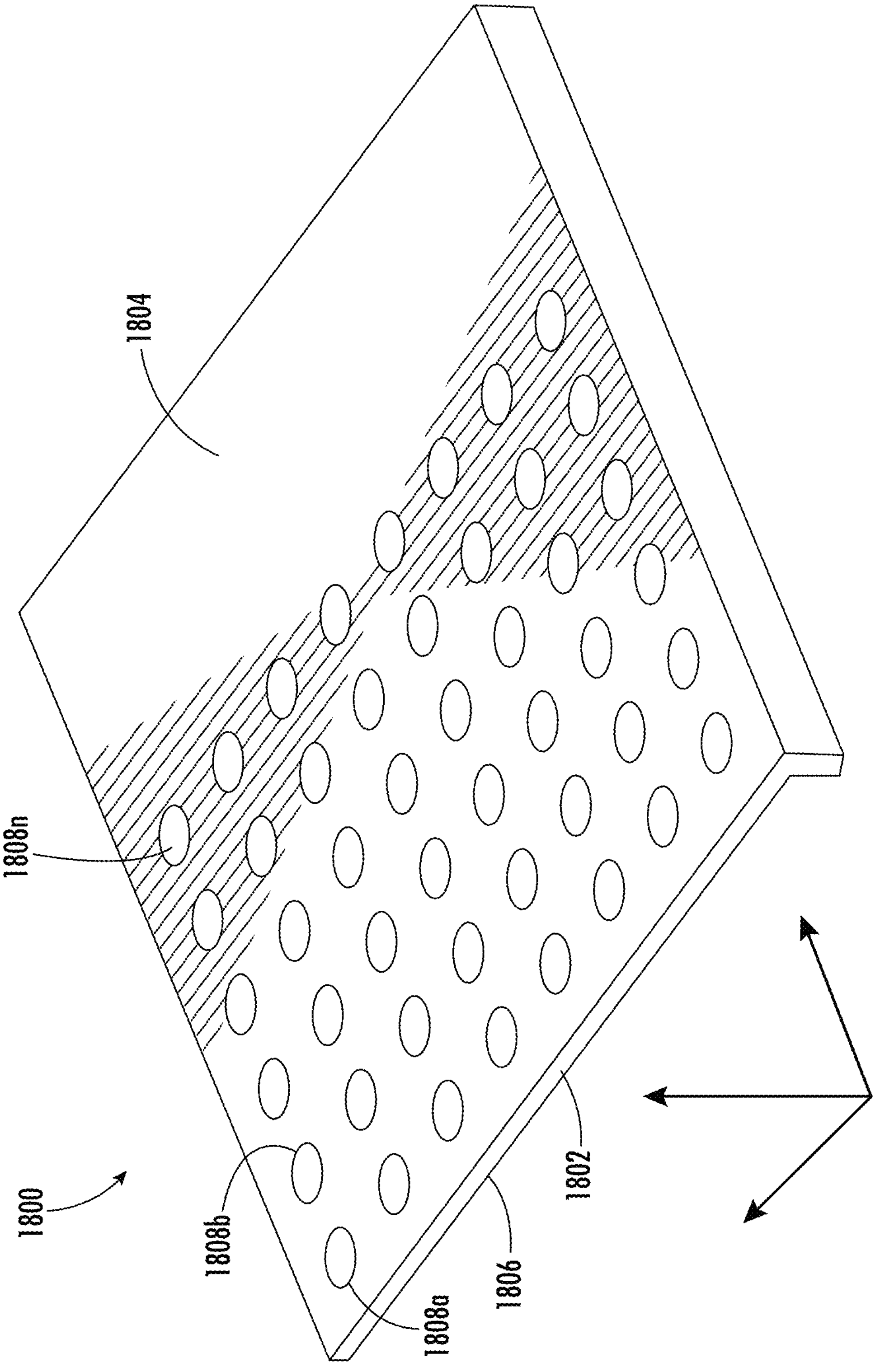
FIG. 18 illustrates a perspective view of the modular platform, according to one or more embodiments described herein.

FIG. 18 illustrates a perspective view of the modular platform 1800, according to one or more embodiments described herein.

The modular platform 1800 has an outer surface 1802 that may define a top end portion 1804 and a bottom end portion 1806 of the modular platform 1800. In some examples, the top end portion 1804 of the modular platform 1800 may be configured to be positioned proximal to the top end portion 226 of the bottom chassis portion 128 when the modular platform 1800 is received on the platform receiving surface 1704 (defined on the bottom chassis portion 128). Further, the bottom end portion 1806 of the modular platform 1800 may face the cavity 1714, when the modular platform 1800 is received on the platform receiving surface 1704. In some examples, a width of the modular platform 1800 (along the vertical axis 128 of the print head engine 122) may be equivalent to the width of the region 1712 (defined between the respective protruding groove 1710 and the platform receiving surface 1704).

In an example embodiment, the outer surface 1802 may define a plurality of orifices 1808*a*, 1808*b*, . . . 1808*n* that may extend from the bottom end portion 1806 of the modular platform 1800 to the top end portion 1804 of the modular platform 1800. In an example embodiment, the plurality of orifices 1808*a*, 1808*b*, . . . 1808*n*, may be arranged as a (N*M) matrix, where N corresponds to a count of rows of the plurality of orifices 1808*a*, 1808*b*, . . . 1808*n*, and where the M corresponds to a count of columns in the plurality of orifices 1808*a*, 1808*b*, . . . 1808*n*. In an example embodiment, the rows of the plurality of orifices are defined to extend along the lateral axis 212 of the print head engine 122. Further, the column of the plurality of orifices are defined to extend along the longitudinal axis 210 of the print head engine 122.

In an example embodiment, the count of rows of the plurality of orifices 1808*a*, 1808*b*, . . . 1808*n* may be proportional to a width of the print media 104 being used in the printing apparatus 100. For example, a count of rows of the plurality of orifices 1808*a*, 1808*b*, . . . 1808*n* may vary based on a width of the print media 104. In the example, another modular platform with less count of rows of the plurality of orifices 1808*a*, 1808*b*, . . . 1808*n* may be installed on the bottom chassis portion 128 to create better suction on a print media that has a less width. To this end, the modular platform 1800 may be removed by sliding the modular platform 1800 out of the bottom chassis portion 128. Further, the other modular platform (that supports the other print media) is slid into the bottom chassis portion 128.

Figure 19B:
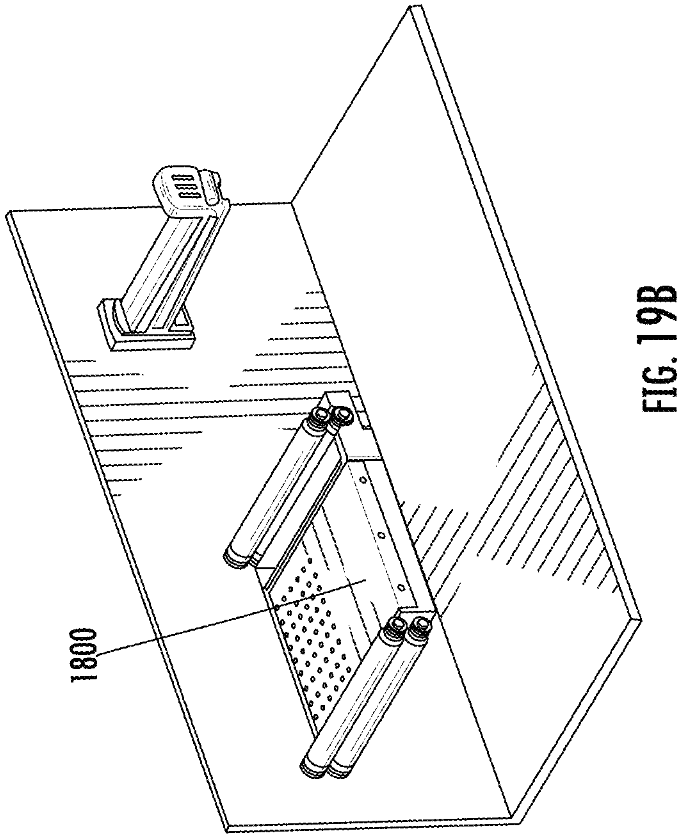
FIG. 19*a* and FIG. 19*b* illustrate perspective views of the modular platform being slid on the bottom chassis portion, and the bottom chassis portion with the modular platform, according to one or more embodiments described herein.
Figure 19A:
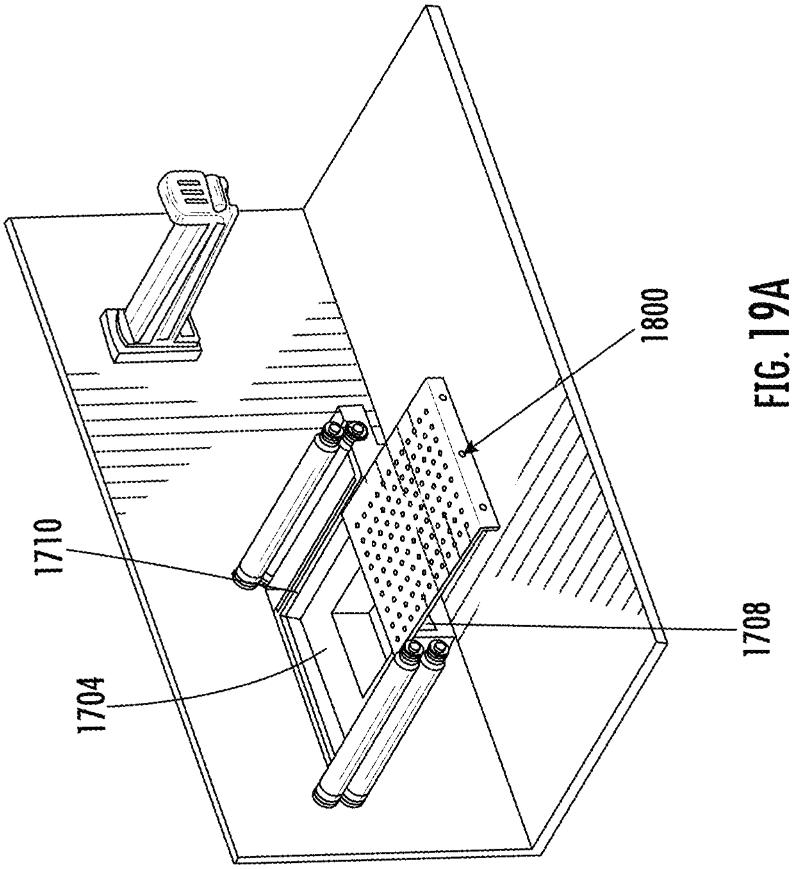

FIG. 19*a* and FIG. 19*b* illustrate perspective views of the modular platform 1800 being slid on the bottom chassis portion 128, and the bottom chassis portion 128 with the modular platform 1800, according to one or more embodiments described herein.

Referring to FIG. 19*a*, the modular platform 1800 is received on the platform receiving surface 1704 by sliding the modular platform 1800 from the opening 1708 between the groove 1710 and the platform receiving surface 1704. Referring to FIG. 19B, the modular platform 1800 positioned at the top end portion 226 of on the bottom chassis portion 128.

In some examples, the aforementioned structure of the print head engine 122 is utilizable for vector mode printing. However, the scope of the disclosure is not limited to the print head engine 122 having the aforementioned structure. In an example embodiment, the print head engine 122 may have a structure that may facilitate the printing apparatus 100 to print in raster mode. Such structure of the print head engine 122 is described herein.

Print Head Structure—Raster Mode

In some examples, to facilitate the printing apparatus 100 to print content using laser beam, the print head may include a laser subsystem. The laser subsystem may further include tone or more laser sources and optical assemblies. The one or more laser sources may be configured to generate one or more laser beams that are directed through the optical assemblies so as to focus energy on the print media for printing content.

Figure 20:
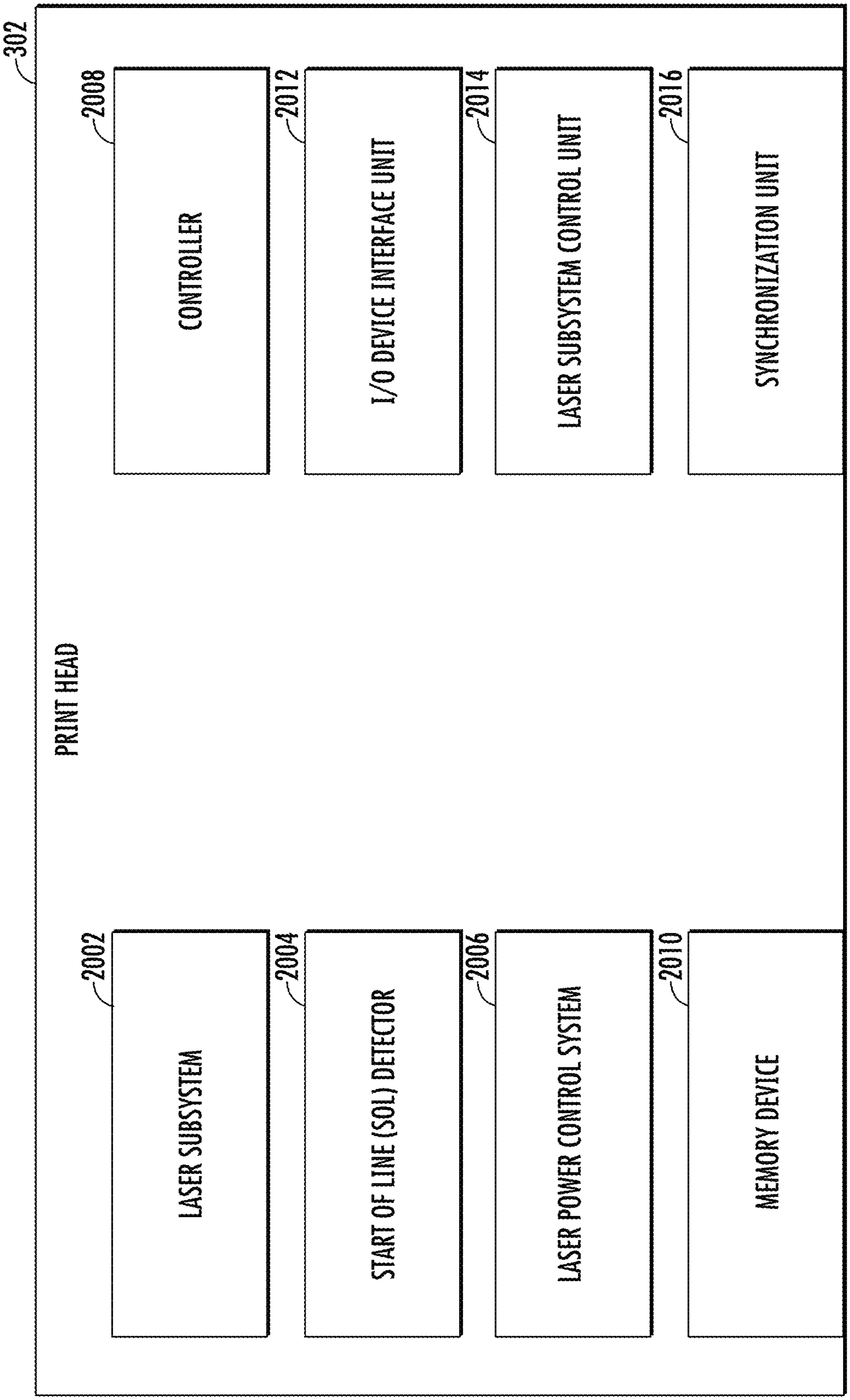
FIG. 20 illustrates a schematic of the print head, according to one or more embodiments described herein.

FIG. 20 illustrates a schematic of the print head 302, according to one or more embodiments described herein. The print head 302 includes a laser subsystem 2002, a start of line (SOL) detector 2004, a laser power control system 2006, a controller 2008, a memory device 2010, an Input/Output (I/O) interface unit 2012, a laser subsystem control unit 2014, and a synchronization unit 2016.

The controller 2008 may be embodied as means including one or more microcontrollers with accompanying digital signal controller(s), one or more controller(s) without an accompanying digital signal controller, one or more controllers, one or more multi-core controllers, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 20 as a single controller, in an embodiment, the controller 2008 may include a plurality of controllers and signal processing modules. The plurality of controllers may be embodied on a single electronic device or may be distributed across a plurality of electronic devices collectively configured to function as the circuitry of the print head 302. The plurality of controllers may be in operative communication with each other and may be collectively configured to perform one or more functionalities of the circuitry of the print head 302, as described herein. In an example embodiment, the controller 2008 may be configured to execute instructions stored in the memory device 2010 or otherwise accessible to the controller 2008. These instructions, when executed by the controller 2008, may cause the circuitry of the printing apparatus 100 to perform one or more of the functionalities as described herein.

Whether configured by hardware, firmware/software methods, or by a combination thereof, the controller 2008 may include an entity capable of performing operations according to embodiments of the present disclosure while configured accordingly. Thus, for example, when the controller 2008 is embodied as an ASIC, FPGA or the like, the controller 2008 may include specifically configured hardware for conducting one or more operations described herein. Alternatively, as another example, when the controller 2008 is embodied as an executor of instructions, such as may be stored in the memory device 2704, the instructions may specifically configure the controller 2008 to perform one or more algorithms and operations described herein.

Thus, the controller 2008 used herein may refer to a programmable microcontroller, microcomputer or multiple controller chip or chips that can be configured by software instructions (applications) to perform a variety of functions, including the functions of the various embodiments described above. In some devices, multiple controllers may be provided dedicated to wireless communication functions and one controller dedicated to running other applications. Software applications may be stored in the internal memory before they are accessed and loaded into the controllers. The controllers may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 2010 may include suitable logic, circuitry, and/or interfaces that are adapted to store a set of instructions that is executable by the controller 2008 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 2010 may be integrated with the controller 2008 on a single chip, without departing from the scope of the disclosure.

In some examples, the memory device 2010 may include a buffer space and one or more configuration registers. In an example embodiment, the buffer space may be configured to store the data that is to be printed on the print media 104. In some examples, the one or more configuration registers are configured to hold configuration values. The configuration values in the one or more configuration registers are deterministic of one or more configurations and one or more statuses of the print head 302. Following table illustrates example if the one or more configuration tables:

TABLE 1

One or more configuration registers

| S.No | Configuration table |
|---|---|
| 1 | Print head control register |
| 2 | Print head DPI register |
| 3 | Image width register |
| 4 | Image length register |
| 5 | Print speed register |
| 7 | Print darkness and contrast register |
| 8 | Mirror overrun register |
| 9 | Print head status register |
| 10 | Print head self-check status register |
| 11 | Laser beam location register |
| 12 | Upper odometer register |
| 13 | Lower odometer register |
| 14 | Print head error register |

Figure 40:
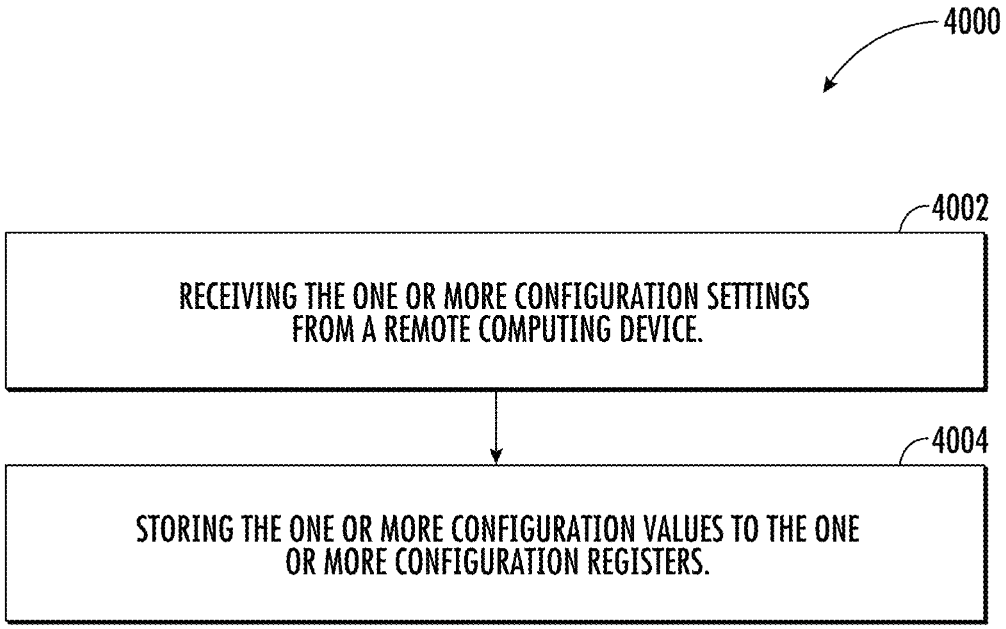
FIG. 40 illustrates an example flow chart according to one or more embodiments described herein.

The one or more configuration registers are further described in conjunction with FIG. 40.

The I/O device interface unit 2012 may include suitable logic and/or circuitry that may be configured to communicate with the one or more components of the printing apparatus 100, in accordance with one or more device communication protocols such as, without limitation, I2C communication protocol, Serial Peripheral Interface (SPI) communication protocol, Serial communication protocol, Control Area Network (CAN) communication protocol, and 1-Wire® communication protocol. Some examples of the I/O device interface unit 2012 may include, but are not limited to, a Data Acquisition (DAQ) card, an electrical drives driver circuit, and/or the like.

In an example embodiment, the I/O device interface unit 2012 includes a print head interface. In some examples, the print head interface facilitates coupling between the print head 302 and the control unit 138 of the printing apparatus. In an example embodiment, the print head interface allows communication of the one or more signals between the print head 302 and the control unit 138 of the printing apparatus 100. In an example embodiment, the one or more signals may facilitate synchronization between the print head 302 and the control unit 138, as is described in FIGS. 41-47. Additionally, or alternatively, the print head interface may include one or more electrical connectors through which the one or more signals are shared amongst the print head 302 and the control unit 138. The following table illustrates the pinout of the print head interface:

TABLE 2

Pin out of the print head interface

| Pin | SIGNAL |
|---|---|
| 1 | MOTOR_EN |
| 2 | GND |
| 3 | DATA_1 |
| 4 | DATA_9 |
| 5 | DATA_2 |
| 6 | DATA_10 |
| 7 | GND |
| 8 | DATA_3 |
| 9 | DATA_11 |
| 10 | DATA_4 |
| 11 | DATA_12 |
| 12 | GND |
| 13 | DATA_5 |
| 14 | DATA_13 |
| 15 | DATA_6 |
| 16 | DATA_14 |
| 17 | GND |
| 18 | DATA__7 |
| 19 | DATA_15 |
| 20 | DATA_8 |
| 21 | DATA_16 |
| 22 | GND |
| 23 | CLOCK |
| 24 | GND |
| 25 | LSYNC |
| 26 | FSYNC |
| 27 | LASER_EN |
| 28 | RDY2PRINT |
| 29 | LASER_PRINT |
| 30 | LASER_POS |
| 31 | LPH_RDY_N |
| 32 | RST_N |
| 33 | GND |
| 34 | SPI_CLK |
| 35 | GND |
| 36 | SPI_MOSI |
| 37 | SPI_MISO |
| 38 | SPI_CS |
| 39 | INT |
| 40 | GND |

The purpose of the one or more signals and the other pinouts in the print head interface is further described in conjunction with FIG. 41-47. In an example embodiment, the laser subsystem 2002 may include suitable logic and/or circuitry that may enable the print head 302 to direct the laser onto the print media 104 positioned on the platform 322. The laser subsystem 2002 may include one or more optical assemblies and the laser sources that may operate in conjunction to facilitate directing of the laser onto the print media 104. The structure and the operation of the laser subsystem 2002 is further described in conjunction with FIG. 21.

Laser Optics

Figure 21:
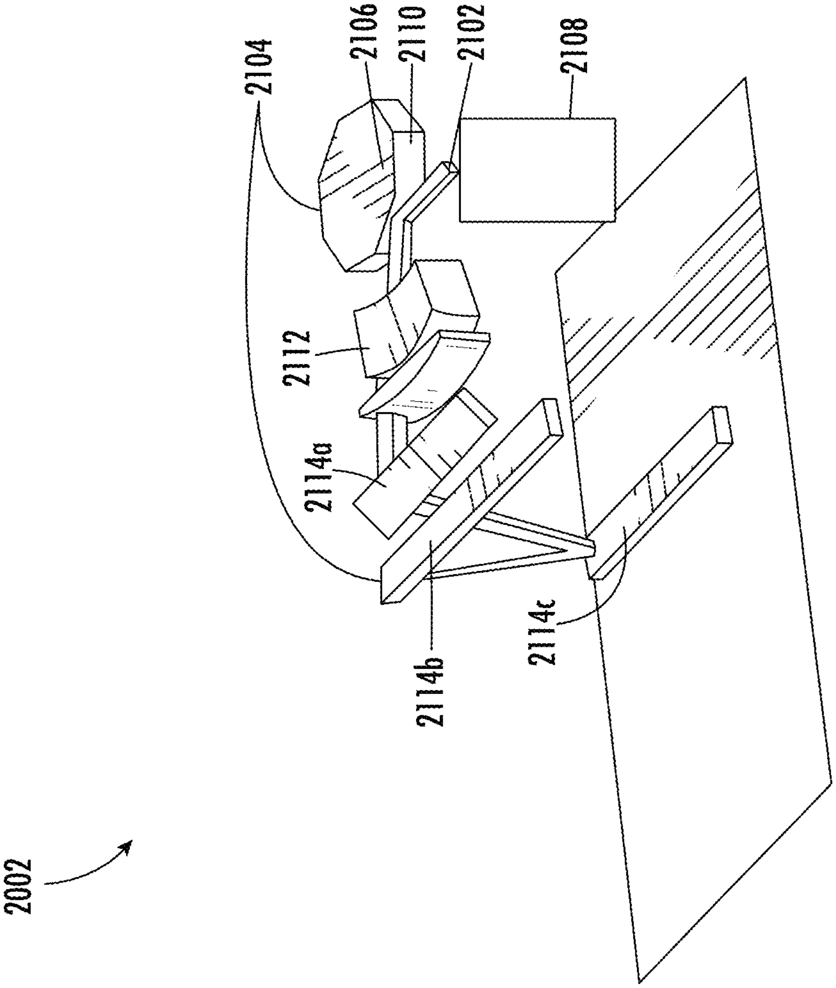
FIG. 21 illustrates a schematic diagram of the laser subsystem, according to one or more embodiments described herein.

FIG. 21 illustrates a schematic diagram of the laser subsystem 2002, according to one or more embodiments described herein. The laser subsystem 2002 includes one or more laser sources 2102 and an optical assembly 2104.

In an example embodiment, the one or more laser sources include suitable logic and/or circuitry that may enable the one or more laser sources 2102 to generate one or more laser beams. In some examples, the one or more laser sources 2102 may be capable of generating the one or more laser beams of different wavelengths. For example, the one or more laser sources may be capable of generating the one or more laser beams that have a wavelength in a range of 600 nm to 800 nm. Some examples of the one or more laser sources may include, but are not limited to, gas laser source, chemical laser source, excimer laser source, solid state laser source, fiber laser source, photonic crystal laser source, semiconductor based laser source, dye laser source, free electron laser source, and/or the like. In some examples, the one or more laser sources 2102 may be configured to product a writing laser beam and a preheating laser beam. The writing laser beam has a wavelength of 600 nm. the preheating laser beam has a wavelength of 800 nm.

The optical assembly 2104 is positioned with respect to the one or more laser sources and are configured to direct the writing laser beam and the preheating laser beam onto the print media 104. In an example embodiment, the optical assembly 2104 includes polygon mirror 2106 that may be coupled to a fourth actuation unit 2108. The fourth actuation unit 2108 may include suitable logic and/or circuitry that may facilitate rotation of the polygon mirror 2106 at a predetermined speed. In an example embodiment, the polygon mirror 2106 may have one or more reflective surfaces 2110, where a count of the one or more reflective surfaces 2110 is dependent on a shape of the polygon mirror that defines the one or more reflective surfaces 2110. For example, if the shape of the polygon mirror corresponds to an octagon, the count of the one or more reflective surfaces 2110 is eight. The polygon mirror 2106 is so positioned with respect to the one or more laser sources 2102 such that the polygon mirror 2106 reflect the writing laser beam and the preheating laser beam in along a predetermined direction. More particularly, the one or more reflective surfaces 2110 may reflect the writing laser beam and the preheating laser beam in the predetermined direction based on an angle of incidence between the writing laser beam and the preheating laser beam and a reflective surface of the one or more reflective surfaces 2110. In an example embodiment, when the polygon mirror 2106 is rotated, the angle of incidence between the writing laser beam and the preheating laser beam and a reflective surface 2110 may vary due to which the direction in which the writing laser beam and the preheating laser beam are reflected varies. To this end, the writing laser beam and the preheating laser beam may sweep along a longitudinal axis 210 of the print head engine 122.

The optical assembly 2104 further includes a plurality of lenses 2112 through which the reflected beam passes. In an example embodiment, the plurality of lenses may be configured to respectively converge the writing laser beam and the preheating laser beam. The optical assembly 2104 further includes one or more folding mirrors 2114*a*, 2114*b*, 2114*c*, and 2114*d* that are positioned downstream of the plurality of lenses 2112. In some examples, the plurality of folding mirrors 2114*a*, 2114*b*, 2114*c*, and 2114*d* may be configured to modify a direction of the writing laser beam and the preheating laser beam. More particularly, the one or more folding mirrors 2114*a*, 2114*b*, 2114*c*, and 2114*d* may direct the writing laser beam and the preheating laser beam on the print media 104 positioned on the platform 322 on the bottom chassis portion 128.

Since the writing laser beam and the preheating laser beam sweep due to rotation of the polygon mirror 2106, the writing laser beam and the preheating laser beam may sweep across a width of the print media 104. When the laser impinges on the print media 104, a color of the print media gets modified. The modification of the color of the print media 104 corresponds to the printed content. The print media 104 that changes color upon impingement of the writing laser beam and the preheating laser beam, is described later in conjunction with FIG. 25A.

In some examples, the scope of the disclosure is not limited to the one or more laser sources 2102 generating the writing laser beam and the preheating laser beam, where the writing laser beam is configured to write content on the print media 104 and the preheating laser beam is configured to pre-heat the print media 104. In an example embodiment, the one or more laser sources 2102 may be configured to generate more than one writing laser beams. For example, the one or more laser sources 2102 may be configured to generate three writing laser beams such that the three writing laser beams are configured to write content on the print media 104. To this end, the three writing laser beams are configured to be directed onto the print media 104 through the optical assembly 2104. To this end, the three writing laser beams may be directed onto the print media 104 to be adjacent to each other along the print path. In some examples, the first three laser beams may be configured to concurrently print three adjacent lines of the print media 104. In such an embodiment, the first three laser beams may be configured to print different data. In some examples, a set of the three writing laser beams may be disabled during the printing operation. In yet another example, the three writing laser beams may be configured to print the same data. In an example embodiment, the three writing laser beams may be configured per one or more configuration settings of the printing apparatus 100. In some examples, the one or more configuration settings may include, but are not limited to, a resolution at which the content is to be printed, a speed of the print media 104 traversal along the print path, and/or the like.

SOL Detector

In some examples, the print head 302 may be calibrated prior to or during the process of printing content. In some examples, calibration may be activated to determine a location of one or more optics, such as a polygon mirror, at any given time instantly. In some examples, calibration of the optics provide an indication of where content is to be printed, such as via a start of line (SOL) detector. The SOL detector may correspond to a photo-detector that receives a reflected laser beam from each face of the polygon mirror 2102 as the polygon mirror 2102 rotates or it may take the form of another detection mechanism, such as a light sensor, heat sensor, or the like that is configured to detect reflections from one or more optics. Such a detector, in some examples, allows for the detection of a speed of the optics as well as one or more characteristics of the optics, such as the face of the polygon mirror on which the one or more laser sources are directing the laser beam.

Referring back to FIG. 20, the SOL detector 2004 may include suitable logic and circuitry that may facilitate the printing apparatus 100 to determine a current position of the polygon mirror 2106. Determining the current position allows the printing apparatus 100 to calibrate the polygon mirror 2106. For example, calibration allows the printing apparatus 100 to adjust the start of line (SOL) from where the content is to be printed on the print media 104 by positioning the polygon mirror 2106. The structure of the SOL detector 2004 is further described in conjunction with FIG. 22.

Figure 22:
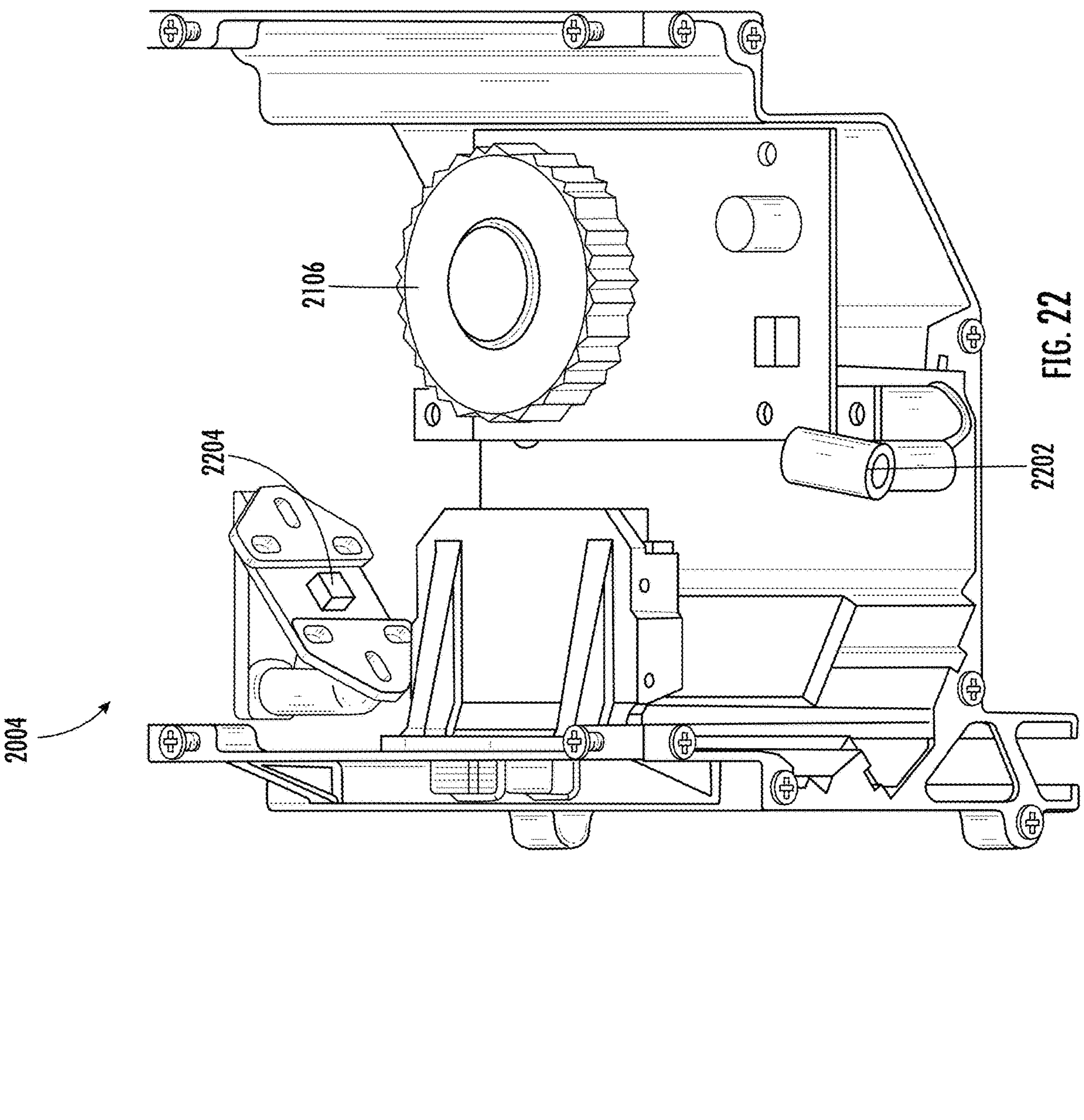
FIG. 22 illustrates a schematic diagram of the SOL detector, according to one or more embodiments described herein.

FIG. 22 illustrates a schematic diagram of the SOL detector 2004, according to one or more embodiments described herein. The SOL detector 2004 includes a second laser source 2202 and a photo detector 2204.

In an example embodiment, the second laser source 2202 may similar to one or more laser sources structurally and functionally. In some examples, the second laser source 2202 may be positioned with respect to the polygon mirror 2106 such that the calibration laser beam generated by the second laser source 2202 gets reflected from the one or more reflective surfaces 2110 of the polygon mirror 2106.

In an example embodiment, the photo detector 2204 may corresponds to a sensor that may be configured to receive a laser beam reflected from the polygon mirror 2106. For example, the photo detector 2204 may be configured to receive the reflected calibration laser beam. Accordingly, the photo detector 2204 generates a SOL signal that may indicate the position of the polygon mirror 2106. In an example embodiment, the printing apparatus 100 may determine the position of the polygon mirror 2106 based on the SOL signal. The position of the polygon mirror 2106 may facilitate the determination of the SOL.

Laser Power Control System

In some examples, the print head may include a control system. In some examples, the control system is configured to control various functionality of the print head to include the laser sources and optics enclosed therein. For example, the control system may be configured to control the speed of the polygon mirror in order to achieve printing resolutions and various printing speeds. Further, the control system may be configured to control the power level of the laser sources during operation.

Referring back to FIG. 20, the laser power control system 2006 may include suitable logic circuitry that may enable the printing apparatus 100 to control the power of the writing laser beam and the preheating laser beam. For example, the laser power control system 2006 is configured to control the power of the one or more laser sources based on mode of operation of the printing apparatus 100. In some examples, the mode of the operation of the printing apparatus 100 may be at least deterministic of resolution at which the content is to be printed on the print media 104. Some examples of the resolution may include, but are not limited to 200 DPI, 400 DPI, and 600 DPI. The structure of the laser power control system 2006 is further described in conjunction with FIG. 23.

Figure 23:
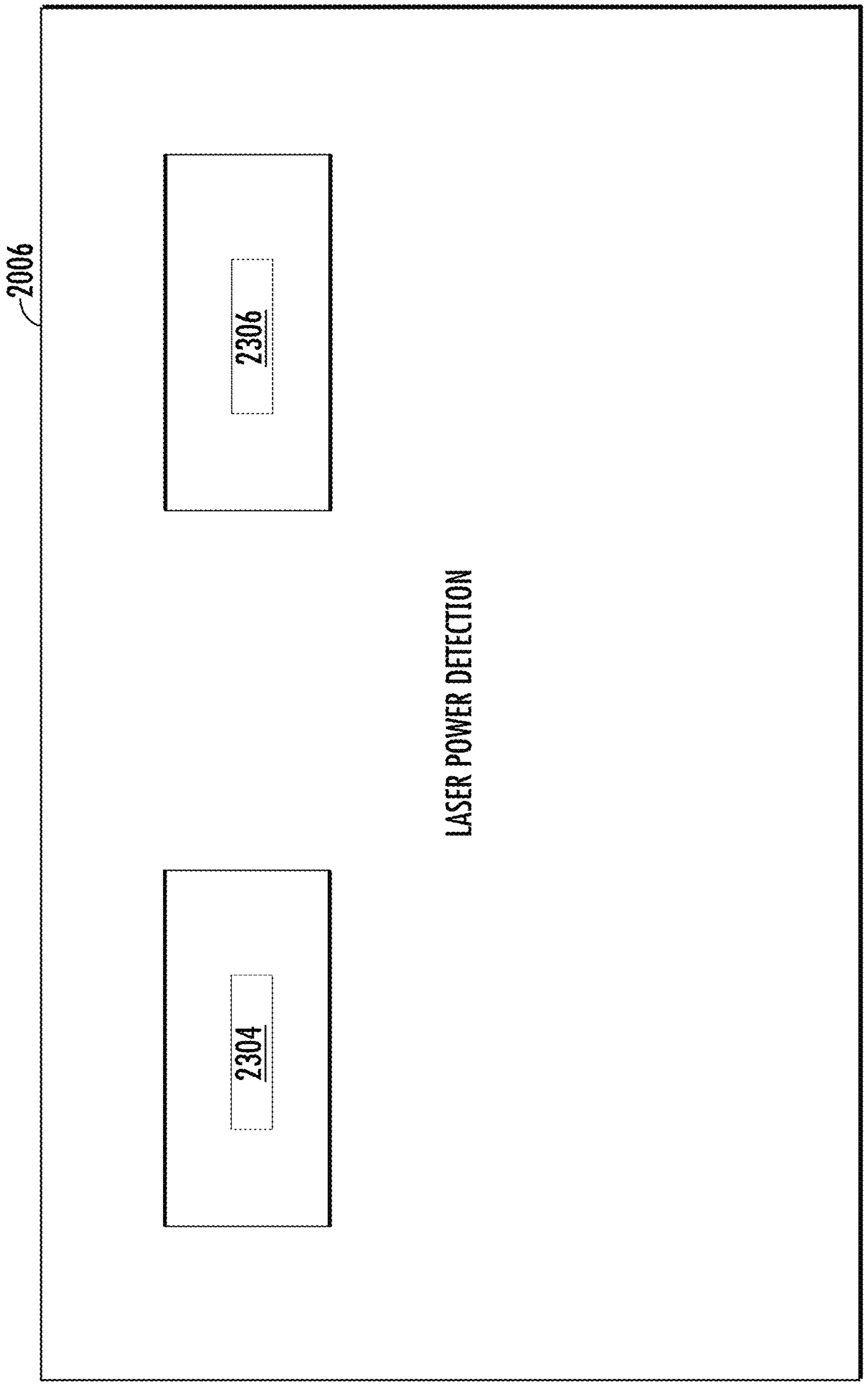
FIG. 23 illustrates a schematic of the laser power control system, according to one or more embodiments described herein.

FIG. 23 illustrates a schematic of the laser power control system 2006, according to one or more embodiments described herein. The laser power control system 2006 includes one or more photo detectors assemblies 2302. The plurality of the photo detectors assemblies 2302 may include photo detectors 2304 and optical assemblies 2306.

In an example embodiment, the optical assembly 2306 is configured to receive a portion of the writing laser beam and the preheating laser beam through the optical assembly 2104. In an example embodiment, the optical assemblies 2306 may be configured to collimate the writing laser beam and the preheating laser beam. Thereafter, the optical assemblies 2306 may be configured to direct the portion of the writing laser beam and the preheating laser beam onto the one or more photo detectors 2304. In an example embodiment, the one or more photo detectors 2304 may be configured to generate a third signal that may be indicative of the power of the writing laser beam and the preheating laser beam. The third signal may be transmitted to the control system of the printing apparatus 100. In an example embodiment, the control system of the printing apparatus 100 may be configured to determine a current power of the writing laser beam and the preheating laser beam based on the third signal. Thereafter, the control system may be configured to compare the current power of the writing laser beam and the preheating laser beam with the required power of the writing laser beam and the preheating laser beam. Thereafter, based on the comparison, the control system may be configured to modify the power of the writing laser beam and the preheating laser beam.

Referring to FIG. 20, the laser subsystem control unit 2014 may include suitable logic and/or circuitry that may enable the print head 302 to control an operation of the laser subsystem 2002. For example, the laser subsystem control unit 2014 may be configured to control a rotation speed of the polygon mirror 2106, as is further described in FIG. 47. In another example, the laser subsystem control unit 2014 may be configured to control the power of the one or more laser sources, as is described above in FIG. 23. In such an embodiment, the functionality of the laser subsystem control unit 2014 may include the laser power control system 2006.

In some examples, the laser subsystem control unit 2014 may be implemented as Application Specific Integrated Circuit (ASIC) or Field Programmable Gate Array (FPGA). The synchronization unit 2016 may include suitable logic and/or circuitry that may enable the print head 302 to receive the one or more signals from the control unit 138. For example, the synchronization unit 2016 may be configured to receive a clock signal from the control unit 138. Based on the one or more signals, the synchronization unit 2016 may be configured to instruct the laser subsystem control unit 2014 to control the operation of the print head 302, as is described in FIGS. 41-47. In some examples, the synchronization unit 2016 may be implemented as Application Specific Integrated Circuit (ASIC) or Field Programmable Gate Array (FPGA).

Preheating Media

In some examples, to conserve power and/or provide efficient printing of the content, the print media 104 may be preheated. In an example embodiment, the one or more laser sources may be directed towards the print media 104 to preheat the print media. In other embodiments, the heat of the print head itself may be used to preheat the media such as by bringing the media in proximity to the print head or a heat dissipation unit attached to or in communication with the print head. In yet other examples, other internal systems such as a fan proximate the controller or other internal components may be used to preheat the print media. To this end and as a function of preheating, content may be printed on the print media 104 using a low power writing laser beam as compared to a higher power writing laser beam that may be used in response to non-preheated media.

Referring back to FIG. 20, in operation, the print head 302 may direct the preheating laser beam onto the print media 104, which causes the print media 104 to heat up. Thereafter, the print head 302 may direct the writing laser beam onto the print media 104 to print content on the print media 104. The structure of the print media 104 is further described in conjunction with FIG. 25A.

Thermal Management

Figure 24:
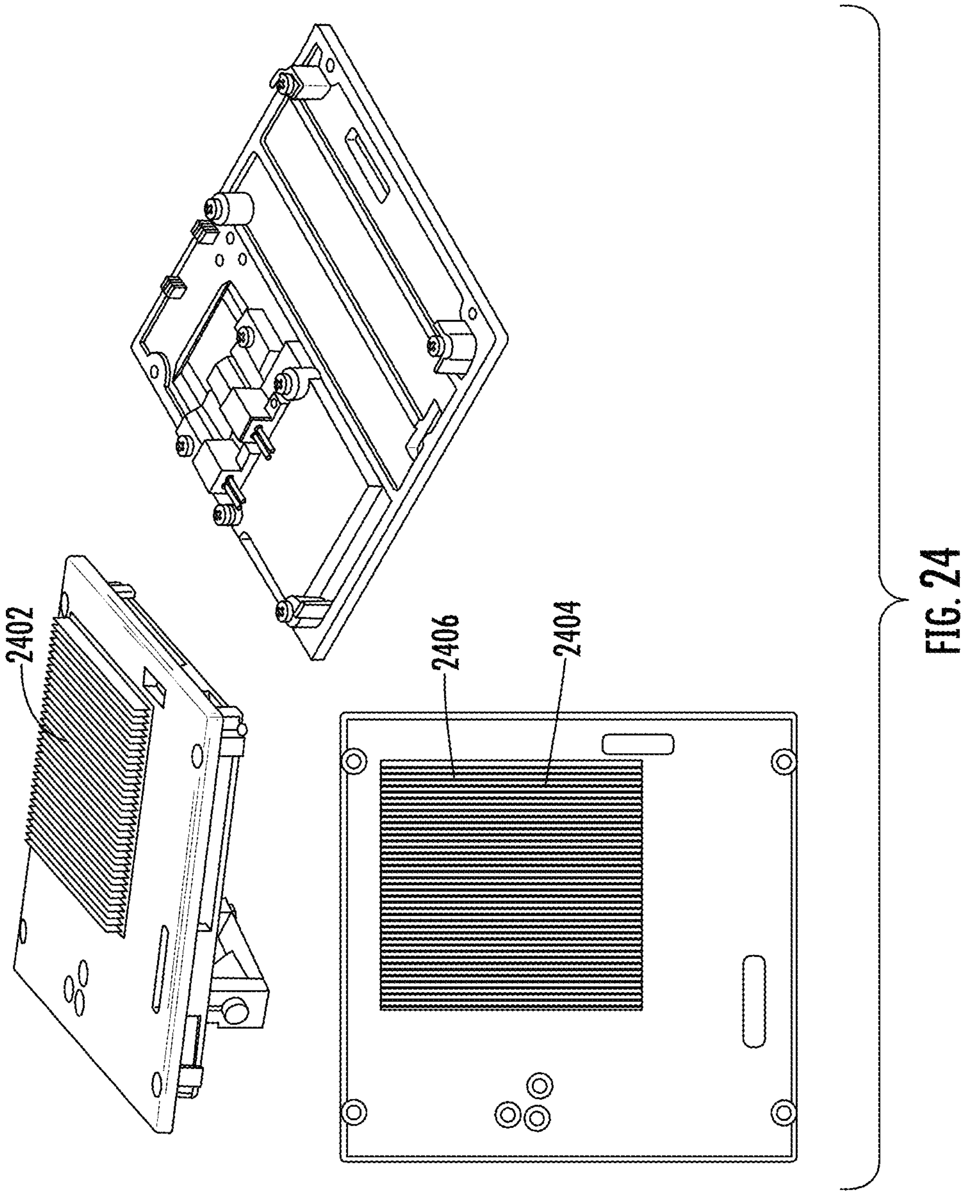
FIG. 24 illustrates a schematic diagram of the print head with the heat dissipation unit, according to one or more embodiments described herein.

In some examples, the usage of laser may cause the print head 302 to heat up. Accordingly, in some examples, the print head 302 may include a heat dissipation unit, which is further described in FIG. 24. FIG. 24 illustrates a schematic diagram of the print head 302 with the heat dissipation unit 2402. The heat dissipation unit 2402 may be coupled to the top surface 2408 of the top chassis portion 126 of the print head 302. In some examples, the heat dissipation unit 2402 may include a radiator section 2404 and a fan section 2406. The radiator section 2404 may be coupled to the top surface and the fan section 2406 may be coupled to the radiator. When the heat dissipation unit 2402 is actuated, the heat dissipation unit 2402 may be configured to transfer heat from the print head 302 to the ambient around the print head 302. In some examples, the scope of the disclosure is not limited to the heat dissipation unit 2402 includes a fan section 2406. In an example embodiment, the heat dissipation unit 2402 may be liquid cooled unit. In such an embodiment, the heat dissipation unit 2402 may include a pump (not shown) and a tank which is configured to store a fluid. The pump may be configured to pump liquid through the print head 302 and through the radiator, where the radiator may be configured to dissipate heat from the liquid to the ambient of the print head 302.

Print Media

In some examples and in order to facilitate printing content on the print media 104 upon exposure of the writing laser beam, the print media 104 may be composed of chemical composition that is configured to react to one or more wavelengths produced by one or more lasers beams emanated from the one or more laser sources. In some examples, and in an instance, in which the writing laser beam is directed on the print media 104, the exposure of the media to the writing laser beam causes a chemical reaction on the print media that facilitates a color change. Further, the print media 104 may have a protective layer which allows the printing apparatus 100 to authenticate the print media 104 prior to printing content on the print media 104.

In some examples, when the writing laser beam and the preheating laser beam impinge on the print media 104, a color of the print media 104 may change. The changed color corresponds to the printed content. In some examples, the composition of the print media 104 may enable such color change (upon impinging the of the writing laser beam and the preheating laser beam on the print media 104). The composition of the print media 104 is further described in conjunction with FIG. 25A.

Figure 25A:
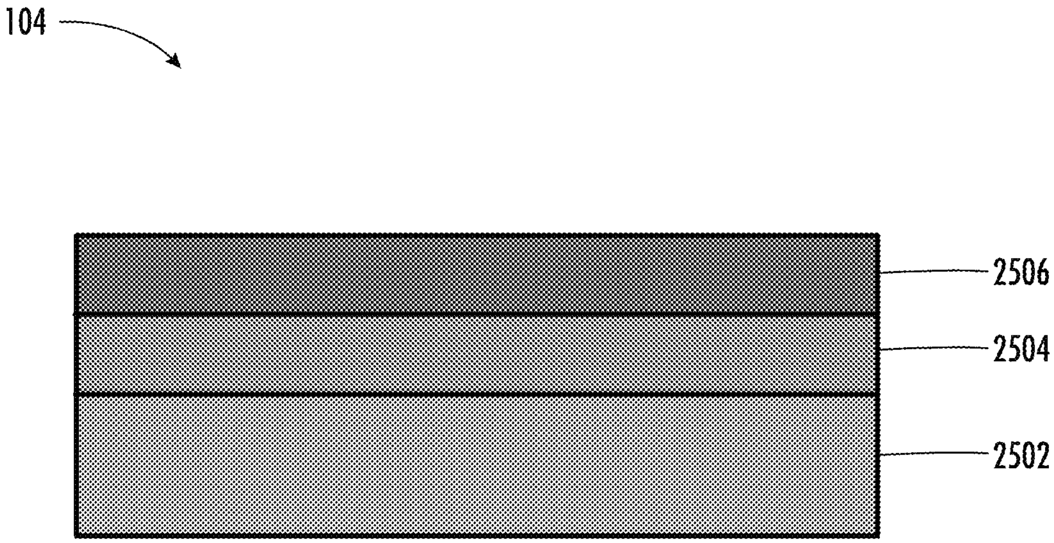
FIG. 25A and FIG. 25B illustrate the composition of the print media, and chemical processes associated therewith, according to one or more embodiments described herein.

FIG. 25A illustrates the composition of the print media 104, according to one or more embodiments described herein. In an example embodiment, the print media 104 includes a substrate 2502, a reactive layer 2504, and a protective layer 2506. In an example embodiment, the substrate 2502 may correspond to a paper layer on which the content is printed. The term "substrate" refers to a fibrous web that may be formed, created, produced, etc., from a mixture, etc., comprising paper fibers, internal paper sizing agents, etc., plus any other optional papermaking additives such as, for example, fillers, wet-strength agents, optical brightening agents (or fluorescent whitening agent), etc. The substrate may be in the form of a continuous roll, a discrete sheet, etc. In some examples, the ink or other content writing materials may be disposed on the substrate 2502 to print content on the substrate 2502.

In some examples, the reactive layer 2504 may be disposed on the substrate 2502. In some examples, the reactive layer 2504 may have a chemical composition that allows the reactive layer 2504 to change color when the reactive layer 2504 is exposed to the writing laser beam of a first predetermined wavelength. For example, the reactive layer 2504 may change color when the reactive layer 2504 is exposed to the writing laser beam having the predetermined wavelength of 500 nm. In an example embodiment, the changed color corresponds to the printed content. In some examples, the chemical composition of the reactive layer 2504 may be selected from a group consisting of leucodyes, diacetylenes, and ammonium octamolybdate. However, the scope of the disclosure is not limited to the reactive layer 2504 having the aforementioned chemical composition. In an example embodiment, the reactive layer 2504 may have other chemical compositions that may enable the reactive layer 2504 to change color upon exposure to a writing laser beam of the first predetermined wavelength.

In some examples, the protective layer 2506 may be disposed on the reactive layer 2504. In some examples, the protective layer 2506 may correspond to a photochromic layer that may be opaque to the writing laser beam having the first predetermined wavelength. Further, the protective layer 2506 may allow the writing laser beam having first predetermined wavelength to pass through while the protective layer 2506 is exposed to a preheating laser beam of a second predetermined wavelength. Exposure of the protective layer 2506 to the preheating laser beam of the second predetermined wavelength, causes the protective layer 2506 to undergo a photochromic process. Such a photochromatic process causes the protective layer to allow the writing laser beam of the first predetermined wavelength to pass through. To this end, the reactive layer 2504 gets exposed to the writing laser beam, thereby, causing the reactive layer 2504 to change color. In some examples, the second predetermined wavelength may vary in a range between 200 nm to 400 nm.

In some examples, the protective layer 2506 may be opaque to the writing laser beam having a first predetermined wavelength when the protective layer 2506 is not exposed to the preheating laser beam of the second predetermined wavelength. In some examples, the protective layer 2506 may undergo a reverse photochromatic process, when the protective layer 2506 is not exposed to the preheating laser beam of the second predetermined wavelength. For example, the protective layer 2506 may undergo a reverse photochromatic process in response to the protective layer 2506 not being exposed to the preheating laser beam of the second predetermined wavelength. Such process causes the protective layer 2506 to block the writing laser beam having the first predetermined wavelength. In some examples, no additional exposure of the protective layer 2506 is required to cause the protective layer 2506 to undergo reverse photochromatic process.

Figure 25B:
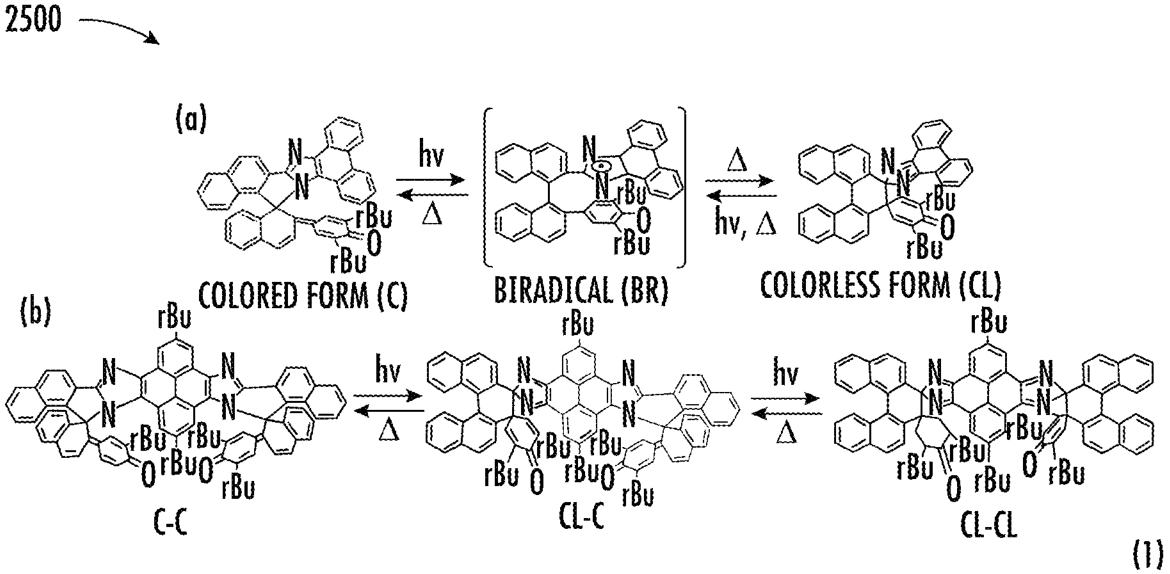

Some examples of the protective layer 2506 may have a chemical composition that may be selected from a group consisting of enaminoketone with Li+ in acetonitrile, biphotochromic molecule composed of two fast negative photochromic phenoxyl-imidazolyl radical. For the purpose of ongoing description, the protective layer 2506 is considered to be composed of two fast negative photochromic phenoxyl-imidazolyl radicals. The following chemical equation illustrates the example photochromatic process (when the protective layer 2506 is exposed to the preheating laser beam) and the example reverse photochromatic process (when the protective layer 2506 is not exposed to the preheating laser beam):

Referring now to FIG. 25B, an equation 2500 (i.e., Equation 1) depicting chemical processes according to one or more embodiments described herein is provided. As illustrated in FIG. 25B, the binaphthyl-bridged phenoxyl-imidazolyl radical complex (BN-PIC) shows reverse photochromism in which the most thermally-stable colored form (C) photochemically isomerizes to the metastable colorless form (CL) via short-lived biradical species upon irradiation using the preheating laser beam. The CL form shows a rapid thermal back reaction to the initial C form when preheating laser beam exposure is removed.

Additionally, or alternately, as depicted in FIG. 25A, the protective layer 2506 may include an Ultraviolet (UV) dye. The UV dye may be configured to validate authenticity of the print media 104. For example, when the print media is illuminated with the UV radiation, the light may get reflected from the print media 104 surface. The reflected light may be detected by a photo detector that may generate a fifth signal. Based on the fifth signal, the print media 104 may be authenticated.

In some examples, the scope of the disclosure is not limited to the print media 104 having three layers. In some examples, the print media 104 may include a binder layer. The binder layer may correspond to an adhesive layer that may be configured to bind the substrate 2502 with the reactive layer 2504 and the protective layer 2506.

Figure 26:
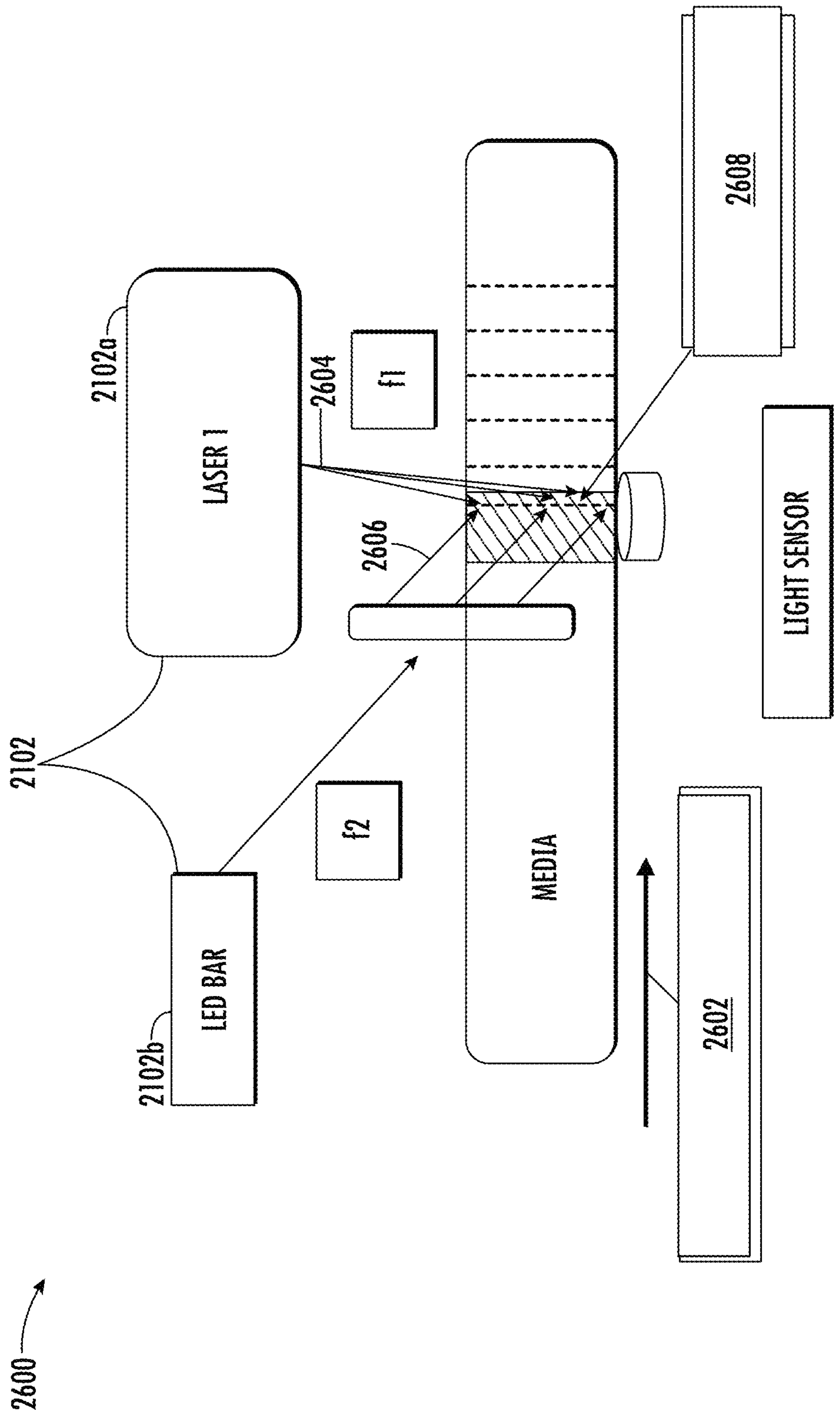
FIG. 26 is a schematic diagram illustrating printing of the content on the print media, according to one or more embodiments described herein.

The process of printing content on the print media 104 is further illustrated in FIG. 26. FIG. 26 is a schematic diagram 2600 illustrating printing of the content on the print media 104, according to one or more embodiments described herein.

The schematic diagram 2600 illustrates the print media 104 that may traverse along the print path (depicted by 2602). The schematic diagram 2600 further illustrates one or more laser sources 2102. The laser source 2102*a* is configured to generate the writing laser beam (depicted by 2604), while the laser source 2102*b* is configured to generate the preheating laser beam (2606). In some examples, the preheating laser beam 2606 is configured to illuminate a portion of the print media 104 (as is depicted by 2608). Illumination of the portion of the print media 104 causes the protective layer 2506 (within the portion 2608 of the print media 104) to undergo photochromatic process, thereby allowing the writing laser beam 2604 of the first predetermined wavelength to pass through. Accordingly, when the writing laser beam (depicted by 2604) of the first predetermined wavelength is directed onto the print media 104, the writing laser beam (depicted by 2604) passes through the protective layer 2506 onto the reactive layer 2504. The writing laser beam (depicted by 2604) causes the reactive layer 2504 to change color. As the print media 104 traverses along the print path (depicted by 2604), the portion of the print media 104 (depicted by 2608) moves along the print path (depicted by 2602). Accordingly, the portion of the print media 104 (depicted by 2608) gets unexposed from the preheating laser beam 2606. This causes the protective layer 2506 to undergo reverse photochromatic process. Thus, the protective layer 2506 blocks the writing laser beam 2604.

Printer System

Figure 27:
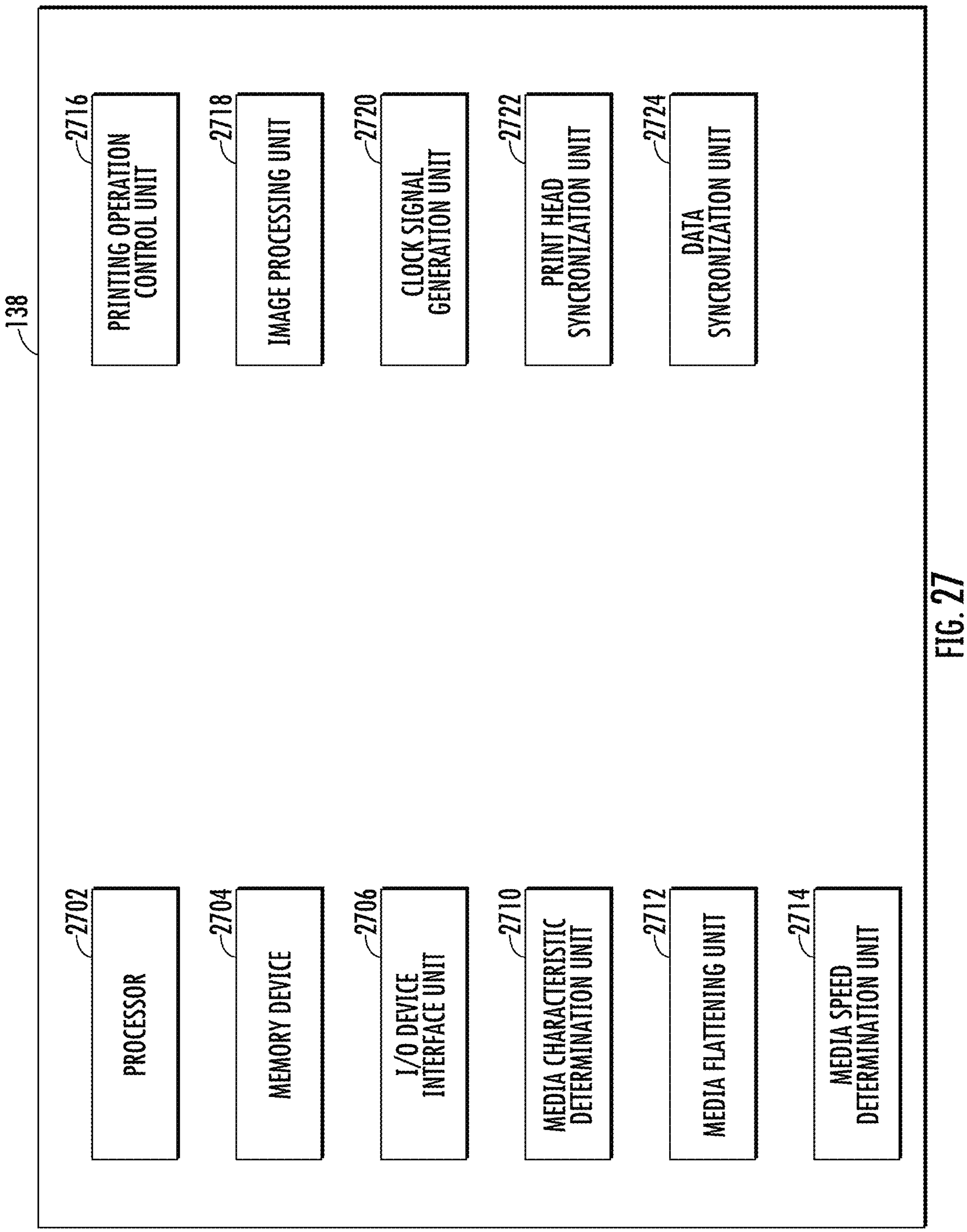
FIG. 27 illustrates a block diagram of the control unit according to one or more embodiments described herein.

FIG. 27 illustrates a block diagram of the control unit 138, according to one or more embodiments described herein. In an example embodiment, the control unit 138 includes a processor 2702, a memory device 2704, and an Input/Output (I/O) device interface unit 2706, a media characteristic determination unit 2710, a media flattening unit 2712, a media speed determination unit 2714, a printing operation control unit 2716, an image processing unit 2718, a clock signal generation unit 2720, a print head synchronization unit 2722, and a data synchronization unit 2724.

The processor 2702 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 27 as a single processor, in an embodiment, the processor 2702 may include a plurality of processors and signal processing modules. The plurality of processors may be embodied on a single electronic device or may be distributed across a plurality of electronic devices collectively configured to function as the circuitry of the printing apparatus 100. The plurality of processors may be in operative communication with each other and may be collectively configured to perform one or more functionalities of the circuitry of the printing apparatus 100, as described herein. In an example embodiment, the processor 2702 may be configured to execute instructions stored in the memory device 2704 or otherwise accessible to the processor 2702. These instructions, when executed by the processor 2702, may cause the circuitry of the printing apparatus 100 to perform one or more of the functionalities as described herein.

Whether configured by hardware, firmware/software methods, or by a combination thereof, the processor 2702 may include an entity capable of performing operations according to embodiments of the present disclosure while configured accordingly. Thus, for example, when the processor 2702 is embodied as an ASIC, FPGA or the like, the processor 2702 may include specifically configured hardware for conducting one or more operations described herein. Alternatively, as another example, when the processor 2702 is embodied as an executor of instructions, such as may be stored in the memory device 2704, the instructions may specifically configure the processor 2702 to perform one or more algorithms and operations described herein.

Thus, the processor 2702 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 2704 may include suitable logic, circuitry, and/or interfaces that are adapted to store a set of instructions that is executable by the processor 2702 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 2704 may be integrated with the processor 2702 on a single chip, without departing from the scope of the disclosure.

The I/O device interface unit 2706 may include suitable logic and/or circuitry that may be configured to communicate with the one or more components of the printing apparatus 100, in accordance with one or more device communication protocols such as, without limitation, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 2706 may communicate with the first actuation unit 119, the second actuation unit 136, and the third actuation unit 504. Some examples of the I/O device interface unit 2706 may include, but are not limited to, a Data Acquisition (DAQ) card, an electrical drives driver circuit, and/or the like.

The media characteristic determination unit 2710 may include suitable logic and/or circuitry that may be configured to determine one or more print media characteristics. In some examples, the one or more print media characteristics may include, but are not limited to, a thickness of the print media 104, a type of the print media 104 (e.g., a continuous media, gap media, black mark media, and/or the like), and/or the like. In an example embodiment, the media characteristic determination unit 2710 may receive an input from the operator of the printing apparatus 100 pertaining to a print media name, such as is further described with respect to FIG. 28. Based on the print media name, the media characteristic determination unit 2710 may determine the one or more one or more print media characteristics, as is further described in FIG. 28. In some examples, the media characteristic determination unit 2710 may directly receive the one or more print media characteristics from the operator of the printing apparatus 100, as the input. The media characteristic determination unit 2710 may be implemented using Field Programmable Gate Array and/or Application Specific Integrated Circuit (ASIC), and/or the like.

Figure 28:
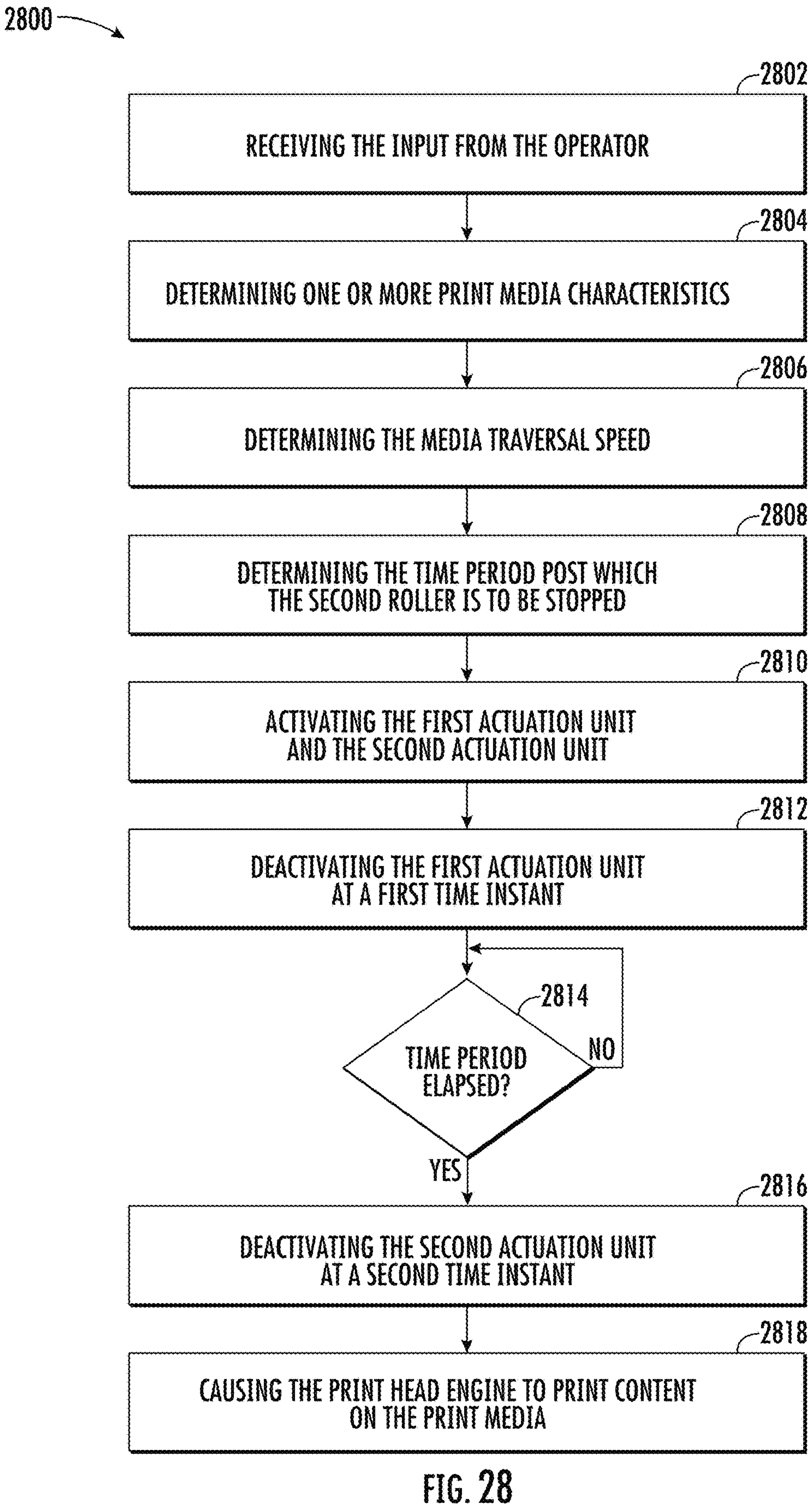
FIG. 28 illustrates a flowchart of a method for operating the printing apparatus, according to one or more embodiments described herein.

The media flattening unit 2712 may include suitable logic and/or circuitry that may be configured to determine a time period to stop/deactivate the first actuation unit 119, as is further described in FIG. 28. The media flattening unit 2712 may be implemented using Field Programmable Gate Array and/or Application Specific Integrated Circuit (ASIC), and/or the like.

The media speed determination unit 2714 may include suitable logic and/or circuitry that may be configured to determine media traversal speed of the print media 104. In an example embodiment, the media speed determination unit 2714 may be configured to receive another input from the operator of the printing apparatus 100 pertaining to the speed at which the printing apparatus 100 is to be operated. Based on the speed at which the printing apparatus 100 is to be operated, the media speed determination unit 2714 may determine the media traversal speed. Additionally, or alternatively, the media speed determination unit 2714 may receive the input from the operator of the printing apparatus 100 pertaining to a measure of an expected print quality. Based on the measure of the expected print quality, the media speed determination unit 2714 may determine the media traversal speed, as is further described in FIG. 28. The media speed determination unit 2714 may be implemented using Field Programmable Gate Array and/or Application Specific Integrated Circuit (ASIC), and/or the like.

The printing operation control unit 2716 may include suitable logic and/or circuitry that may enable the printing operation control unit 2716 to determine one or more print head parameters associated with the print head 302 to print content on the print media 104. In an example embodiment, the one or more print head parameters associated with the print head 302 may include, but are not limited to, a location of the polygon mirror 2106, a speed of the polygon mirror 2106, a duty cycle of the writing laser beams, and/or the like. For example, the printing operation control unit 2716 may be configured to access or otherwise receive the one or more configuration settings of the printing apparatus 100. In some examples, the configuration settings may take the form of registers (e.g., Print head control register, Print head DPI register, Image width register, Image length register, Print speed register, Print darkness and contrast register, Mirror overrun register, Print head status register, Print head self-check status register, Laser beam location register, Upper odometer register, Lower odometer register, Print head error register, etc.). Thereafter, the printing operation control unit 2716 may determine a rotational speed of the polygon mirror 2106 based on the one or more configuration settings, as is further described in conjunction with FIG. 32. In some examples, the printing operation control unit 2716 may be configured to determine a measure of skew that may get introduced in the printed content during printing of the content on the print media 104, as is further described in FIG. 34. The printing operation control unit 2716 may be implemented using Field Programmable Gate Array and/or Application Specific Integrated Circuit (ASIC), and/or the like.

Figure 34:
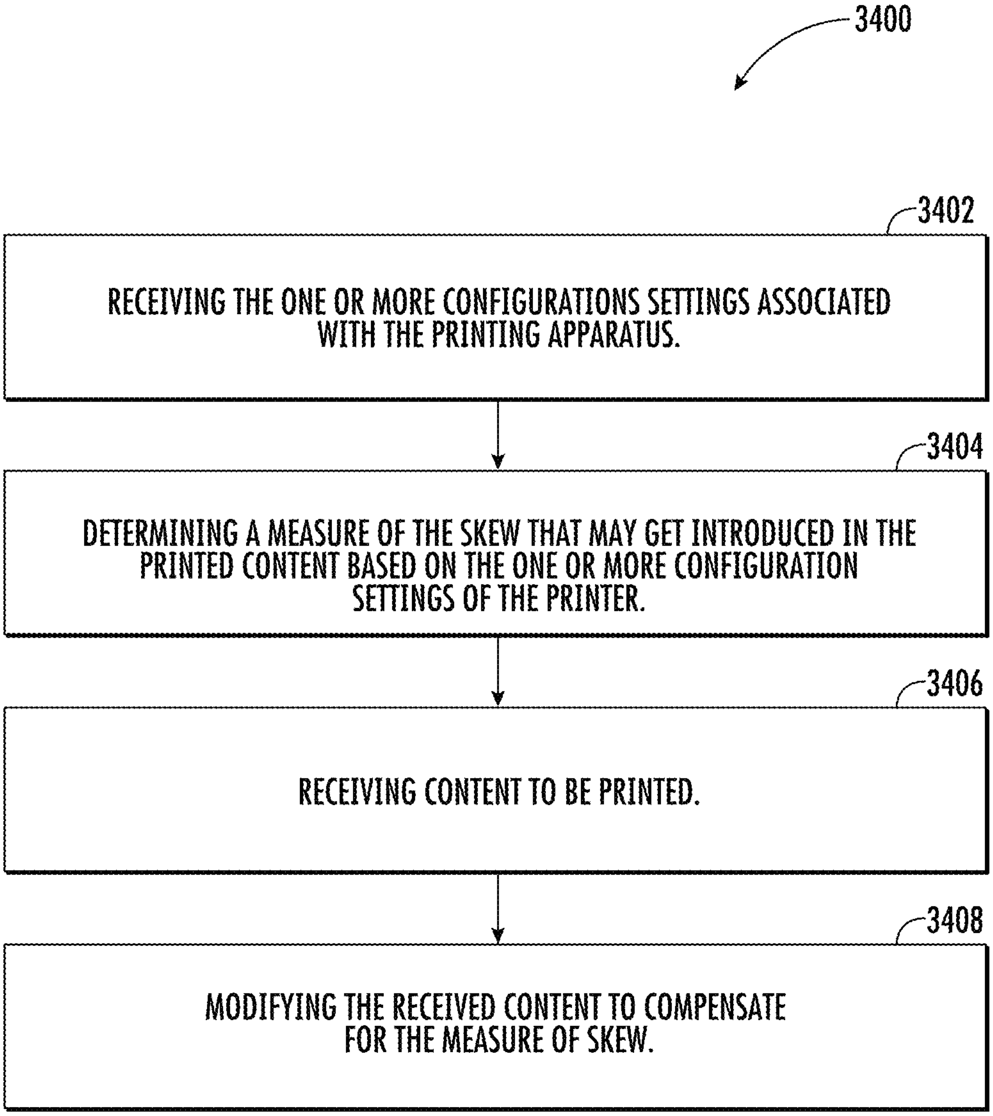
FIG. 34 is a flowchart illustrating another method for printing content on the print media, according to one or more embodiments described herein.

The image processing unit 2718 may include suitable logic and/or circuitry that may enable the image processing unit 2718 to modify content (received for printing on the print media 104), as is further described in FIG. 34. For example, in some examples, the image processing unit 2718 may be configured to modify a skew of the content prior to printing the content on the print media 104, as is further described in FIG. 34. In some examples, the image processing unit 2718 may utilize one or more known image processing techniques to modify the content. The image processing unit 2718 may be implemented using Field Programmable Gate Array and/or Application Specific Integrated Circuit (ASIC), and/or the like.

The clock signal generation unit 2720 may include suitable logic and/or circuitry that may enable the clock signal generation unit 2720 to generate a clock signal. Further, the clock signal generation unit 2720 may be configured to transmit the clock signal to the print head 302. In an example embodiment, the clock signal generation unit 2720 may utilize known methodologies such as, but not limited to, a Phase locked loop (PLL), a quartz, and/or the like to generate the clock signal. In some examples, the clock signal may have a predetermined frequency. In some examples, the clock signals may facilitate synchronization between the control unit 138 and the print head 308. The clock signal generation unit 2720 may be implemented using Field Programmable Gate Array and/or Application Specific Integrated Circuit (ASIC), and/or the like.

In some examples, the print head synchronization unit 2722 may include suitable logic and/or circuitry that may cause the print head synchronization unit 2722 to generate one or more signals based on the clock signal, the one or more signals are further described in conjunction with FIGS. 41-47. As discussed, the one or more signals may facilitate synchronization between the control unit 138 and the print head 302. For example, based on the one or more signals, the print head 302 may be configured to control the speed of the polygon mirror 2106. Similarly, based on the one or more signals, the print head 302 may control other operations of the print head 302. The print head synchronization unit 2722 may be implemented using Field Programmable Gate Array and/or Application Specific Integrated Circuit (ASIC), and/or the like.

The data synchronization unit 2724 may include suitable logic and/or circuitry that may cause generation of one or more data signals. In an example embodiment, based on the one or more data signals the control unit 138 may transmit data such as data indicative of content to be printed, to the print head 302. In some examples, the one or more data signals may include, but are not limited to, a frame sync signal (F-Sync), and a Line Sync (L-Sync) signal. In an example embodiment, the F-Sync signal may indicate to the print head 302 that control unit 138 is transmitting data to be printed on the label of the print media 104. In an example embodiment, the L-Sync signal may indicate to the print head 302 that the control unit 138 is transmitting segmented data to be printed on the label of the print media 104.

The data synchronization unit 2724 may be implemented using Field Programmable Gate Array and/or Application Specific Integrated Circuit (ASIC), and/or the like.

The operation of the control unit 138 is further described in conjunction with FIG. 28.

Method of Flattening Media

FIG. 28 illustrates a flowchart 2800 of a method for operating the printing apparatus 100, according to one or more embodiments described herein.

At step 2802, the printing apparatus 100 may include means such as the control unit 138, the processor 2702, the I/O device interface unit 2706, the media characteristic determination unit 2710, and/or the like for receiving an input of the print media name from the operator. In an example embodiment, the media characteristic determination unit 2710 may receive the input from the operator through the I/O device interface unit 2706. For example, the I/O device interface unit 2706 may receive the input from the operator through the UI. Upon receiving the input, the I/O device interface unit 2706 may be configured to transmit the input to the media characteristic determination unit 2710.

In an example embodiment, the input from the operator may include, but is not limited to, information pertaining to the print media name of the print media 104 loaded in the printing apparatus 100. Some examples of the type of the media are illustrated below:

TABLE 3

| Print media name |
|---|
| Duratherm Synthetic |
| Duratherm II Floodcoated |
| Duratherm III Receipt |
| Duratherm II Gloss Polyester |

At step 2804, the printing apparatus 100 may include means such as the control unit 138, the processor 2702, the I/O device interface unit 2706, media characteristic determination unit 2710, and/or the like for determining the one or more print media characteristics based on the print media named in an example embodiment, the media characteristic determination unit 2710 by utilizing a first look-up table. The following table illustrates an example first lookup table:

TABLE 4

First look-up table including the one or more print media characteristics

| Name of print media | Type of print media 104 | Print media thickness |
|---|---|---|
| Duratherm Synthetic | Continuous | 1 mm |
| Duratherm II Floodcoated | Gap media | 0.5 mm |
| Duratherm III Receipt | Black mark media | 0.25 mm |
| Duratherm II Gloss Polyester | Continuous | 0.75 mm |

At step 2806, the printing apparatus 100 includes the control unit 138, the processor 2702, the I/O device interface unit 2706, the media speed determination unit 2714, and/or the like for determining the media traversal speed. In an example embodiment, prior to determining the print media traversal speed, the media speed determination unit 2714 may be configured to receive another input pertaining to the speed at which the printing apparatus 100 is to be operated. Thereafter, the media speed determination unit 2714 may be configured to determine the media traversal speed by utilizing the second look-up table that includes the mapping between the media traversal speed and the speed at which the printing apparatus 100 is to be operated. The following table illustrates an example second look-up table:

TABLE 5

Second look-up table illustrating the mapping between the speed at which the printing apparatus 100 is to be operated and the media traversal speed.

| Speed at which the printing apparatus 100 is to be operated | Media traversal speed (ips) |
|---|---|
| High | 5 ips |
| Medium | 2 ips |
| Low | 1 ips |

Additionally, or alternatively, the media speed determination unit 2714 may be configured to receive the input from the operator of the printing apparatus 100 pertaining to the expected print quality. In such an example implementation, the media speed determination unit 2714 may be configured to determine the media traversal speed by utilizing a third look-up table that includes the mapping between the expected print quality and the media traversal speed. The following table illustrates an example third look-up table:

TABLE 6

Third look-up table illustrating the mapping between the measure of the expected print media quality and the media traversal speed.

| Expected print media quality | Media traversal speed (ips) |
|---|---|
| High | 1 ips |
| Medium | 2 ips |
| Low | 5 ips |

At step 2808, the printing apparatus 100 may include means such as the control unit 138, the processor 2702, the I/O device interface unit 2706, the media flattening unit 2712, and/or the like for determining the time period after which the second roller 134 is to be halted based on the one or more print media characteristics and the media traversal speed. In some examples, the media flattening unit 2712 may utilize a fourth look-up table, which includes a mapping between the one or more print media characteristics, the media traversal speed, and the time period, to determine the time period. The following table illustrates the example fourth look-up table:

TABLE 7

Fourth look-up table illustrating the mapping between the one or more print media characteristics, the media traversal speed, and the time period, to determine the time period.

| Print media thickness | Media traversal speed | Type of print media | Time period (ms) |
|---|---|---|---|
| 1 mm | 5 ips | Continuous | 1 ms |
| 0.5 mm | 2 ips | Gap media | 0.5 ms |
| 0.25 mm | 1 ips | Black mark media | 2 ms |
| 0.75 mm | 5 ips | Continuous | 1 ms |

At step 2810, the printing apparatus 100 may include means such as the control unit 138, the processor 2702, the I/O device interface unit 2706, the media flattening unit 2712, and/or the like for activating the first actuation unit 129 and the second actuation unit 136. The activation of the first actuation unit 129 and the second actuation unit 136 causes the first roller 132 and the second roller 134 to rotate, respectively. The rotation of the first roller 132 and the second roller 134 causes the print media 104 to traverse along the print direction.

At step 2812, the printing apparatus 100 may include means such as the control unit 138, the processor 2702, the I/O device interface unit 2706, the media flattening unit 2712, and/or the like for deactivating the first actuation unit 129 at a first time instant. Deactivation of the first actuation unit 129 causes the first roller 132 to stop rotating. At step 2814, the printing apparatus 100 may include means such as the control unit 138, the processor 2702, the I/O device interface unit 2706, the media flattening unit 2712, and/or the like for determining whether the time period (determined in the step 2808) has elapsed since the first time instant. If the media flattening unit 2712 determines that the time period has elapsed, the media flattening unit 2712 may be configured to perform the step 2816. However, if the media flattening unit 2712 determines that the time period has not elapsed, the media flattening unit 2712 may be configured to repeat the step 2814.

At step 2816, the printing apparatus 100 may include means such as the control unit 138, the processor 2702, the I/O device interface unit 2706, the media flattening unit 2712, and/or the like for deactivating the second actuation unit 136 at a second time instant in response to the expiration of the time period. In an example embodiment, the second time instant corresponds to a time instant at which the time period expires. Deactivation of the second actuation unit 136 causes the second roller 134 to stop rotating. In an example embodiment, the second time instant is chronologically later than the first time instant. Further, a time difference between the first time instant and the second time instant is equivalent to the time period determined at step 2808. Since the second actuation unit 136 is active after the deactivation of the first actuation unit 129, the second roller 134 keeps rotating even after the first roller 132 stops rotating. Such scenario causes the second roller 134 to pull and stretch the print media 104. Accordingly, the print media 104 flattens between the first roller 132 and the second roller 134.

At step 2818, the printing apparatus 100 may include means such as the control unit 138, the processor 2702, the I/O device interface unit 2706, and/or the like for causing the print head engine 122 to print content on the print media 104.

Figure 29:
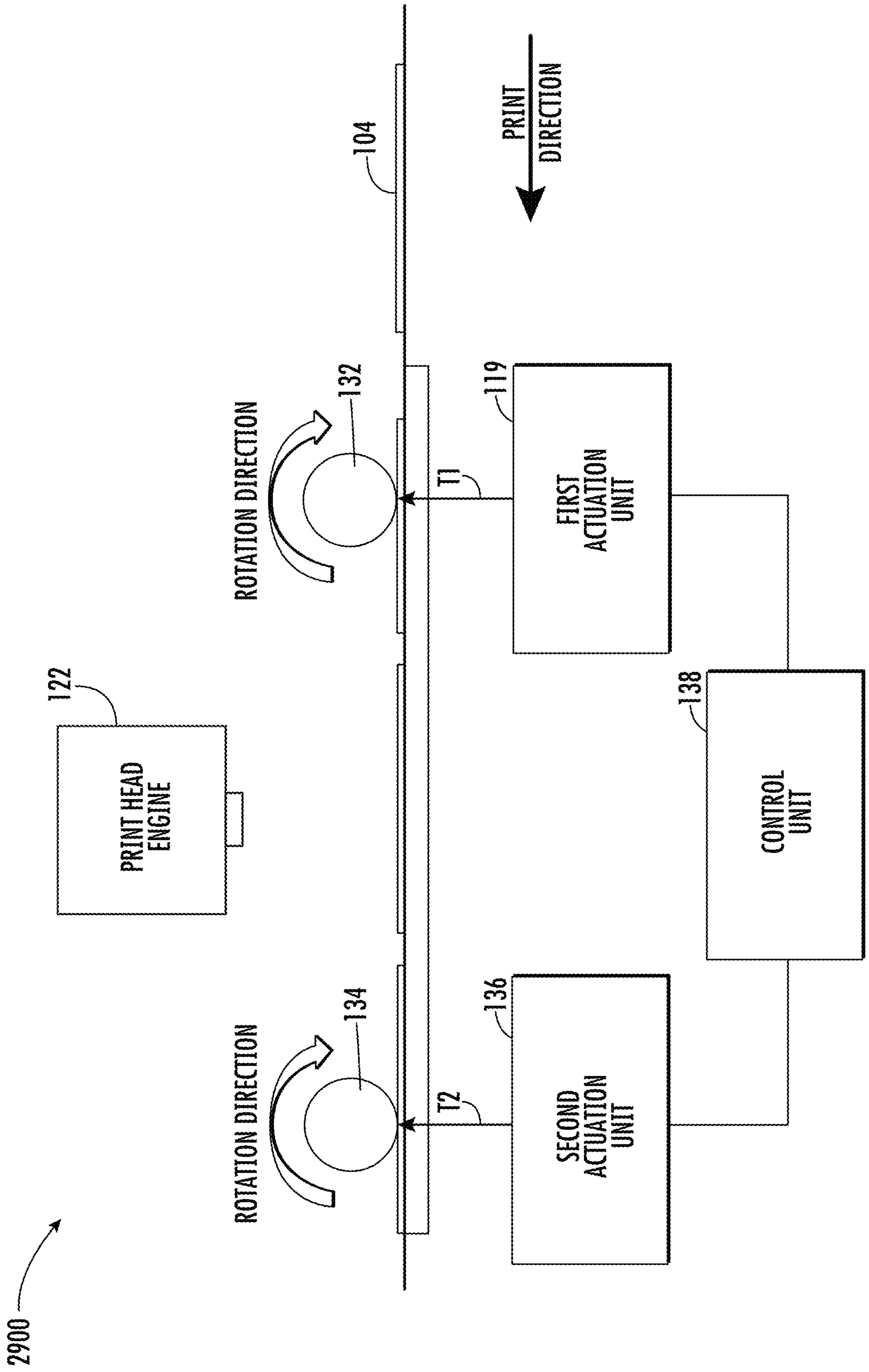
FIG. 29 illustrates a functional block diagram of the portion of the printing apparatus, according to one or more embodiments described herein.

FIG. 29 illustrates a functional block diagram 2900 of the portion of the printing apparatus 100, according to one or more embodiments described herein. The functional block diagram 2900 includes the first roller 132 and the second roller 134, the print head engine 122, the print media 104, the first actuation unit 129, the second actuation unit 136, and the control unit 138.

As depicted, the control unit 138 is coupled to the first actuation unit 129 and the second actuation unit 136. Further, as depicted, the first actuation unit 129 and the second actuation unit 136 are coupled to the first roller 132 and the second roller 134, respectively.

In an example embodiment, the control unit 138 transmits the deactivation signal to the first actuation unit 129 at the first time instant (T1). Thereafter, the control unit 138 transmits the deactivation signal to the second actuation unit 136 at the second time instant (T2). In an example embodiment, the second time instant (T2) occurs chronologically after the first time instant (T1). Therefore, the one or more second rollers 134 keep rotating even after the first roller 132 stops rotating. Such scenario causes the one or more second rollers 134 to pull and stretch the print media 104. Accordingly, the print media 104 flattens between the first roller 132 and the one or more second rollers 134.

Figure 30:
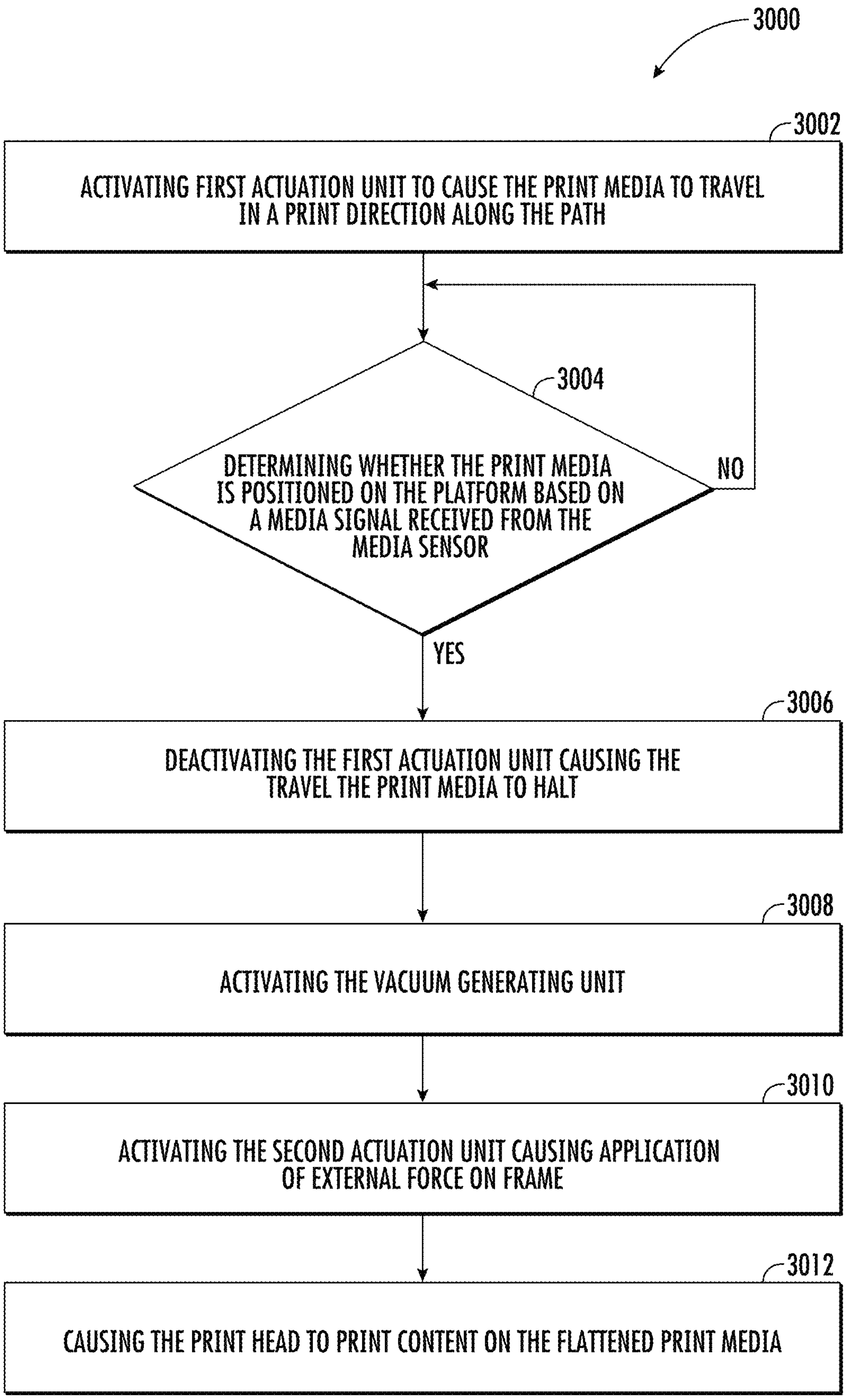
FIG. 30 illustrates a flowchart of a method for operating the printing apparatus, according to one or more embodiments described herein.

FIG. 30 illustrates a flowchart 3000 of a method for operating the printing apparatus 100, according to one or more embodiments described herein.

At step 3002, the printing apparatus 100 may include means such as, the control unit 138, the processor 2702, the I/O device interface unit 2706, and/or the like, for causing the print media 104 to travel in a print direction along the print path.

At step 3004, the printing apparatus 100 may include means such as, the control unit 138, the processor 2702, the I/O device interface unit 2706, and/or the like, for determining whether the print media 104 is positioned on the platform 1222. In an example embodiment, the I/O device interface unit 2706 may rely on a media signal from a media sensor to determine the position of the print media on the platform 1222. In some examples, the media sensor may include a light transmitter and a light receiver that may operate in conjunction to generate the media signal, which is deterministic of the position of the print media on the platform 1222. In some examples, the media signal may be indicative of the position of the print media 104. For example, the media sensor may be configured to generate media signal based on the transmissivity/reflectivity of the print media 104, while the print media 104 travels along the print path. Sudden change in the transmissivity/reflectivity of the print media 104 may be indicative of a partition between the labels passing over the media sensor, as partitions between the labels in the print media 104 may be indicated by black dot marks or through perforations in the print media 104. In some examples, when such sudden changes in the transmissivity/reflectivity in the print media 104 is identified by the processor 2702 in the media signal, the processor 2702 may determine that a label of the print media 104 is received and is positioned on the platform 1222. In response to determining that the print media 104 is positioned on the platform 1222, the processor 2702 may be configured to perform the step 3006. However, if the processor 2702 determines that the print media 104 is not positioned on the platform 1222, the processor 2702 may be configured to repeat the step 3004.

At step 3006, the printing apparatus 100 may include means such as, the control unit 138, the processor 2702, the I/O device interface unit 2706, and/or the like, for causing the travel of the print media 104 to halt.

At step 3008, the printing apparatus 100 may include means such as, the control unit 138, the processor 2702, the I/O device interface unit 2706, and/or the like, for activating the vacuum generating unit 1602. For example, the I/O device interface unit 2706 may activate the vacuum generating unit 1602 (e.g., fan). Activating the vacuum generating unit 1602 generates a negative pressure at the platform 1222 causing the print media 104 to stick to the platform 1222.

At step 3010, the printing apparatus 100 may include means such as, the control unit 138, the processor 2702, the I/O device interface unit 2706, and/or the like, for activating the fifth actuation unit 1412 that applies the external force on the frame 1216. The external force on the frame 1216 causes the frame 1216 to traverse to the second position. As discussed above and in an instance in which the frame 126 is in the second position, the frame 1216 abuts the bottom chassis portion 128 of the print head engine 122. As the print media 104 is positioned on the platform 1222 (defined on the bottom chassis portion 128), the frame 1216 may press on the print media 104. More particularly, the frame 1216 may press the one or more edges of the print media 104 against the platform 1222. Thus, combination of the vacuum (generated by the vacuum generating unit) and the frame 1216 flattens the print media 104. In some examples, the steps 3008 and 3010 may be performed concurrently.

At step 3012, the printing apparatus 100 may include means such as, the control unit 138, the processor 2702, the I/O device interface unit 2706, and/or the like, for causing the print head to print content on the flattened print media.

Thereafter, in some examples, after the content is printed, the processor 2702 may be configured to deactivate the fifth actuation unit 1412 and the vacuum generating unit 1602. Accordingly, the external force acting on the frame 1216 is removed and the frame 1216 may traverse to the first position under the effect of the biasing force applied by the biasing member 1402. Accordingly, the print media 104 may freely travel along the print path.

Figure 31A:
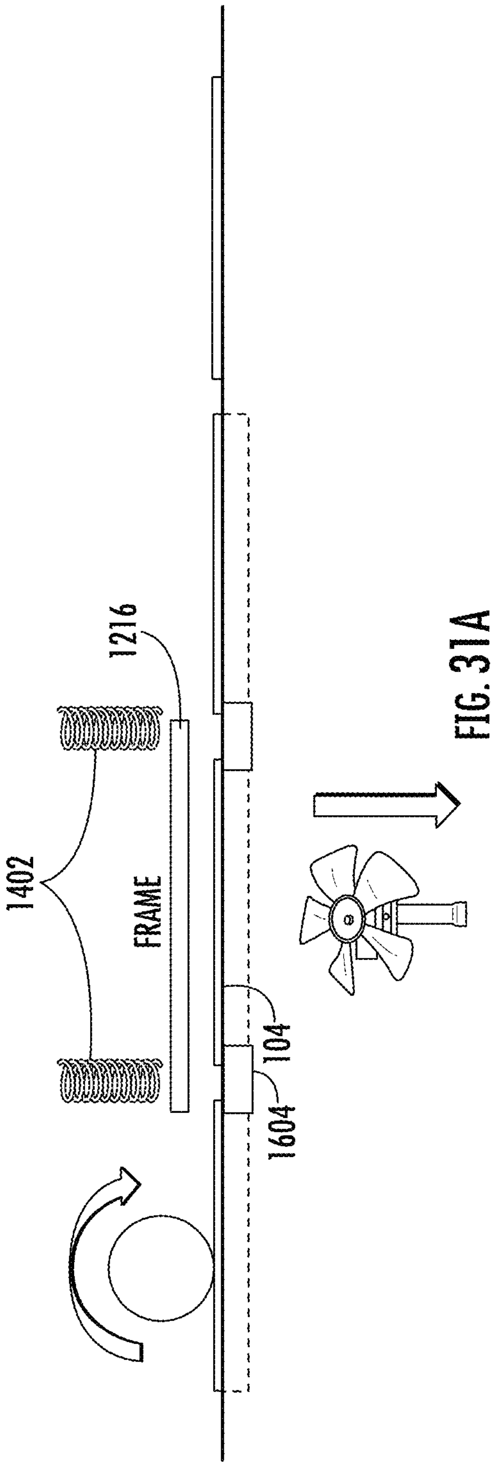
FIG. 31A and FIG. 31B illustrate the positioning of the frame with respect to the print media, according to one or more embodiments described herein.
Figure 31B:
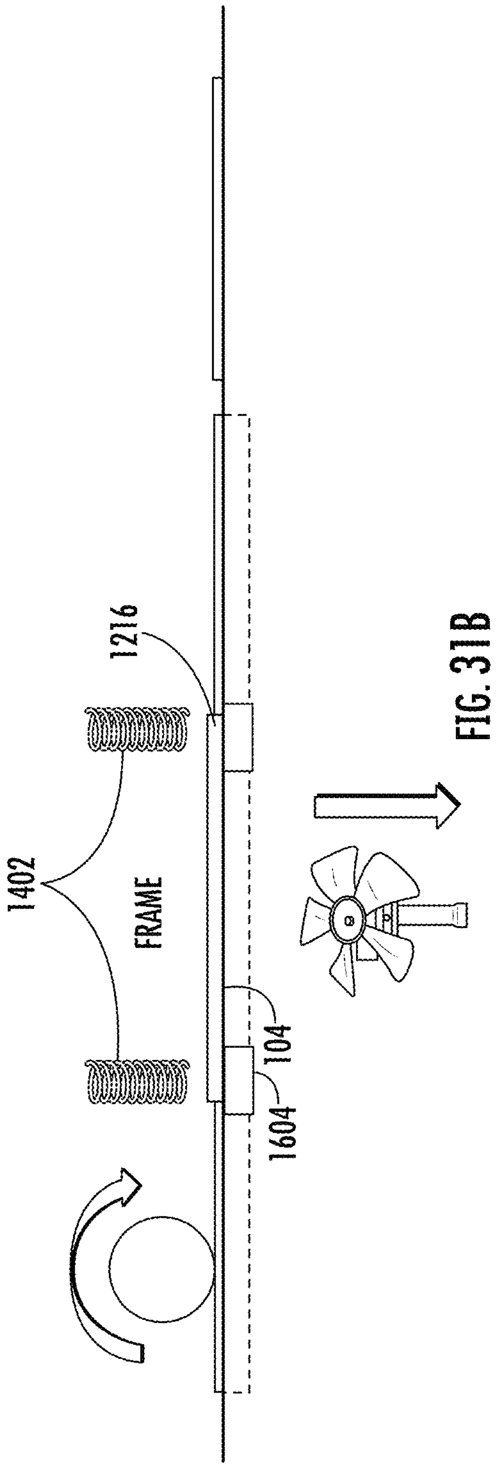

FIG. 31A and FIG. 31B illustrate the positioning of the frame 1216 with respect to the print media 104, according to one or more embodiments described herein. Referring to FIG. 31*a*, the frame 1216 is in the first position, where the frame 1216 is positioned proximal to the top chassis portion 126. Accordingly, the frame 1216 does not press the print media 104, thus, allowing the print media 104 to freely travel along the print path. Referring to FIG. 31B, the second actuation unit 136 (e.g., the electromagnet 1604) is activated. The electromagnet 1604 generates the external force that acts on the frame 1216 causing the frame 1216 to traverse to the second position. In the second position, the frame 1216 presses the one or more edges of the print media 104, thus, flattening the print media 104. When the electromagnets are deactivated, the biasing force applied by the biasing member 1402 causes the frame 1216 to traverse back to the first position.

In some examples, the scope of the disclosure is not limited to the biasing member 1402 applying the biasing force that causes the frame 1216 to be in the first position. In an example embodiment, the biasing member 1402 may apply the biasing force that causes the frame 1216 to be in the second position, where the frame 1216 presses the one or more edges of the print media 104. In such an embodiment, the fifth actuation unit 1412 may be configured to apply the external force to cause the frame 1216 to traverse to the second position. For example, the electromagnet 1604 may apply a repulsive force on the frame 1216 causing the frame 1216 to traverse to the first position.

In yet another embodiment, the positioning of the biasing member 1402 and the electromagnets 1604 (i.e., the second actuation unit 136) may be swapped with each other. In such an embodiment, the biasing member 1402 may be coupled to the bottom chassis portion 128 and the electromagnets 1604 may be positioned in the top chassis portion 126. Further, to this end, the frame 1216 may be coupled to the bottom chassis portion 128 through the biasing member 1402. The biasing member 1402 may be configured to apply the biasing force on the frame causing the frame 1216 to be in the second position (i.e., pressing the one or more edges of the print media 104). When the electromagnets 1604 are activated, the external force is applied on the frame 1216 causing the frame 1216 to traverse to the first position. For example, the electromagnet 1604 may apply an attractive force on the frame 1216 causing the frame 1216 to traverse to the first position.

In some examples, the scope of the disclosure is not limited the traversal of the frame 1216 and the vacuum generating unit 1602 operating concurrently. In an example embodiment, both the traversal of the frame 1216 and the vacuum generating unit 1602 may operate independently. For example, in one embodiment, the traversal of the frame 1216 may be disabled and only vacuum generating unit 1602 may operate to flatten the print media. In another embodiment, the vacuum generating unit 1602 may be disabled and only the frame 1216 may be operated to flatten the print media 104.

In some examples, printing apparatus 100 may receive a command or instruction, such through a configuration setting or a print job, to print at a particular resolution and/or at a particular print speed. In some examples, the command or instruction may cause a change to a different resolution or a different print speed than the resolution or print speed previously used. In such a scenario, the print head 302 may generate a plurality of laser beams that are capable of printing multiple lines in parallel. Varying the count of laser beams allows the printing apparatus 100 to print content at a variety of printing speeds. Additionally, or alternatively, multiple printing speeds may be achieved by varying rotation speed of optics, such as the polygon mirror 2106. One such method of varying the count of laser beams and the rotation speed of the polygon mirror 2106 is further described in conjunction with FIG. 32.

In some examples, the control unit 138 may be configured to configure the print head 302 to operate in one or more modes. For example, the control unit 138 may be configured to receive one or more configuration settings based on which the control unit 138 may be configured to configure the print head 302. Some examples of the one or more configuration settings include, but are not limited to, a resolution at which the print head 302 is to print content, a content width, a speed at which the content is to be printed, a contrast and/or darkness value at which the content is to be printed, a time duration for which the polygon mirror 2106 rotates at an unchanged rotation speed, a print head mode, a print head pressure, and/or the like.

In an example embodiment, the control unit 138 may be configured to set configuration values in the one or more configuration registers (in the memory device 2010 of the print head 302) based on the one or more configuration settings. In some examples, the control unit 138 may be configured to transmit the configuration values to the one or more configuration registers using one or more communication protocols such as, but not limited to, a serial peripheral interface (SPI), a serial bus, a parallel bus, and/or the like. To this end, each of the one or more configuration registers are stored at a determined memory location in the memory device 2010. To set a configuration value in the configuration register (of the one or more configuration registers), the control unit 138 may be configured to address the location of the configuration register. Thereafter, the control unit 138 may be configured to transmit the configuration value to the configuration register. As discussed, the configuration value in the configuration register is deterministic, in some examples, of the one or more configuration settings according to which the print head 302 operates.

Thereafter, the control unit 138 may be configured to receive the data to be printed from a remote device. Further, the control unit 138 may be configured to transmit the data, to be printed on the print media 104, to the print head 302 in accordance with one or more data signals. In some examples, the control unit 138 may be configured to generate the one or more data signals based on which the control unit 138 may be configured to transmit the data to the print head 138.

FIG. 40 illustrates a flowchart 4000 of a method for configuring the print head 302, according to one or more embodiments described herein.

At step 4002, the printing apparatus 100 may include means such as, the control unit 138, the processor 2702, the I/O device interface unit 2706, and/or the like, for receiving the one or more configuration settings from a remote computing device, from a user interface, from storage, and/or the like. As discussed, the one or more configuration settings may be deterministic of the mode of operation of the printing apparatus 100. Some examples of the one or more configuration settings may include, but are not limited to, the resolution at which the print head 302 prints content, the content width, the print speed at which the content is to be printed, the contrast and darkness values based on which the content is to be printed, the time duration for which the polygon mirror 2106 is at an unchanged rotation speed, mode of operation of the print head 302, pressure, and/or the like.

At step 4004, the printing apparatus 100 may include means such as, the control unit 138, the processor 2702, the I/O device interface unit 2706, and/or the like, for storing the one or more configuration values to the one or more configuration registers. For example, the processor 2702 may be configured to cause the configuration value to be stored in the print head control register (stored in the memory devices 2010). The following table illustrates an example structure of the print head control register:

TABLE 8

| Print head control register | |
|---|---|
| 15 | Reserved for |
| 14 | future use |
| 13 | LPH_BUF_Data |
| 12 | |
| 11 | |
| 10 | Media |
| 9 | RESET |
| 8 | PH_LP |

TABLE 8-continued

| Print head control register | |
|---|---|
| 7 | Reserved for future use |
| 6 | Error_INT_EN |
| 5 | Color |
| 4 | |
| 3 | Reserved for |
| 2 | future use |
| 1 | |
| 0 | Raster mode/ Vector mode |

In an example embodiment, the print head control register is a 16-bit configuration register. Bit-0 of the print head control register is deterministic of whether the print head 302 is to be operated in raster mode or in the vector mode. Bit-1 to bit 3 are reserved for future configuration settings.

Bit 5 and bit 6 of the print head control register are deterministic of one or more color settings in which the print head 302 is to be operated. The following table illustrates examples of the one or more color settings:

TABLE 9

| Color settings | | |
|---|---|---|
| Bit 5 | Bit 4 | Color setting |
| 0 | 0 | Black and White |
| 0 | 1 | Grayscale |
| 1 | 0 | Color |
| 1 | 1 | Reserved for future |

Bit 6 of the print head control register is used to interrupt the print head 302 in an instance in which the control unit 138 encounters an error. Bit 7 of the print head control register is reserved for future. Bit 8 of the print head control register is utilized to configure a power mode of the print head 302. Bit 9 of the print head control register is utilized to reset the print head 302. Bit 10 of the print head control register is indicative of a type of print media 104 installed in the printing apparatus 100. Bit 11 to bit 13 are indicative of a type of data received by the print head 302. For example, values of the Bit 11 to bit 13 may be used indicate to the print head 302 that the data in data buffer corresponds to a new line to be printed on a label or media, to a new line to be printed on a new label or new media, to a new line to be printed irrespective of the label or media. Additionally or alternatively, based on the values of Bit 11 to bit 13, the print head 302 may clear the data buffer. Further, bits 14-15 are reserved for future use.

In an example embodiment, the processor 2702 may be configured to transmit the configuration value or otherwise permit access to the print head control register based on the structure of the print head control register and the mode in which the print head 302 is to be configured. For example, if the print head 302 is to be configured to print color content, the processor 2702 may be configured to set bits 4-5 in the print head control register to "10". Similarly, the processor 2702 may be configured to set/reset other bits of the print head control register in order to configure the mode of operation of the print head 302.

In another example, the processor 2702 may receive the configuration setting that includes information pertaining to the resolution at which the printing apparatus 100 is to print content. In such an embodiment, the processor 2702 may be configured to transmit or otherwise make resolution configuration values available to the print head 302. More particularly, the processor 2702 may be configured to cause the resolution configuration value to be stored in the print head DPI register. Prior to transmitting the resolution configuration value, the processor 2702 may be configured to determine the resolution configuration value based on the information pertaining to the resolution received in the one or more configuration settings and the structure of the print head DPI register. The following table illustrates the structure of an example print head DPI register:

TABLE 10

| Print head DPI register | | | | | | | | | |
|---|---|---|---|---|---|---|---|---|---|
| 15 | 14 | 13 | 12 | 11 | 10 | 9 | 8 | 7 | 6 5 4 3 2 1 0 |
| RFU | | | | resolution configuration value | | | | | |

The example values in example bits 0-11 of the print head DPI register are configured to store or otherwise represent the resolution configuration value received from the processor 2702. As discussed, based on the information pertaining to the resolution included in the one or more configuration settings, the processor 2702 may be configured to determine the resolution configuration value. In an example embodiment, the processor 2702 may be configured to use a look-up table, such as the following look-up table, to determine the resolution configuration value based on the information pertaining to the resolution included in one or more of the configuration settings:

TABLE 11

Look-up table for determining resolution configuration value

| Resolution (included in the one or more configuration settings) | Resolution configuration value |
|---|---|
| 203 DPI | 0 × 0 CB |
| 300 DPI | 0 × 12 C |
| 600 DPI | 0 × 258 |

For example, in an instance in which the information pertaining to the resolution (included in the one or more configuration settings) is 300 DPI, the processor 2702 may determine the resolution configuration value as "0x12C". To this end, the processor 2702 may be configured to cause the resolution configuration value "0x12C" to be stored on the print head DPI register.

In another example, the processor 2702 may receive a configuration setting that includes information pertaining to the print speed at which the printing apparatus 100 is to print content. In such an embodiment, the processor 2702 may be configured to cause a print speed configuration value to be transmitted or otherwise be made accessible to the print head 302. More particularly, the processor 2702 may be configured to cause the print speed configuration value to be stored in a print speed register. Prior to transmitting the print speed configuration value, the processor 2702 may be configured to determine the print speed configuration value based on the information pertaining to the print speed received in the one or more configuration settings and a structure of the print speed register. The following table illustrates an example structure of the print speed register:

TABLE 12

| Print speed register | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| RFU | | | | | | | Print speed configuration value | | | | | | | | |

The values in the Bits 0-8 of the example print speed register are configured to store the print speed configuration value received from the processor 2702. As discussed, based on the information pertaining to the print speed included in the one or more configuration settings, the processor 2702 may be configured to determine the print speed configuration value. In an example embodiment, the processor 2702 may be configured to use a lookup table, such as the following look-up table, to determine the print speed configuration value based on the information pertaining to the print speed included in one or more of the configuration settings:

TABLE 13

Look-up table to determined print speed configuration value

| Print Speed (included in the one or more configuration settings) | Configuration value |
|---|---|
| 0 mm/s | "000000000" |
| 100 mm/s | "001100100" |
| 150 mm/s | "010010110" |

For example, in an instance in which the information pertaining to the print speed (included in the one or more configuration settings) is 100 mm/s, the processor 2702 may determine the configuration value as "001100100". To this end, the processor 2702 may be configured to cause the configuration value "001100100" to be stored in the print speed register. In another example, the processor 2702 may be configured to directly convert the print speed (obtained from the one or more configuration settings) to a print speed configuration value. For example, the processor 2702 may be configured to convert the print speed to a binary number, where the binary number corresponds to or otherwise represents the configuration value. For example, processor 2702 may convert the print speed of 200 mm/s to "011001000", where the value "011001000" corresponds to or otherwise represents the configuration value to be stored on the print speed register.

In another example, the processor 2702 may receive a configuration setting that includes information pertaining to darkness and/or contrast settings at which the printing apparatus 100 is to print content. In such an embodiment, the processor 2702 may be configured to transmit or otherwise make darkness and/or contrast configuration values available to the print head 302. More particularly, the processor 2702 may be configured to cause the darkness and/or contrast configuration values to be stored in a darkness and contrast register. Prior to transmitting the darkness and/or contrast configuration value, the processor 2702 may be configured to determine the darkness and/or contrast configuration value based on the information pertaining to the darkness and/or contrast settings received in the one or more configuration settings and the structure of the darkness and/or contrast register. The following table illustrates the example structure of the darkness and/or contrast register:

TABLE 14

| Darkness and/or contrast register | |
|---|---|
| 15 14 13 12 11 10 9 8 | 7 6 5 4 3 2 1 0 |
| Contrast configuration value | Darkness configuration value |

The example values in the bits 0-7 of the darkness and/or contrast register are configured to store or otherwise represent a darkness configuration value. Further, values in the bits 8-15 of the darkness and/or contrast register are configured to store or otherwise represent a contrast configuration value. As discussed, based on the information pertaining to the darkness and/or contrast settings included in the one or more configuration settings, the processor 2702 may be configured to determine the darkness and/or contrast configuration value. In an example embodiment, the processor 2702 may be configured to use a look-up table, such as the following look-up table, to determine the darkness and/or contrast configuration value based on the information pertaining to the darkness and/or contrast settings included in one or of more the configuration settings:

TABLE 15

Look-up table to determine the darkness and/or contrast configuration value

| Darkness settings | Configuration value | Contrast settings | Configuration value |
|---|---|---|---|
| 100% | "0 × 64" | 100% | "0 × 64" |
| 0% | "0 × 9C" | 0% | "0 × 9C" |

For example, in an instance in which the information pertaining to the darkness setting (included in the one or more configuration settings) is 100%, the processor 2702 may determine the configuration value as "0x64". To this end, the processor 2702 may be configured to cause the configuration value "0x64" to be stored in the darkness and/or contrast register.

In another example, the processor 2702 may receive the configuration setting that includes information pertaining to the polygon mirror rotation timeout. The polygon mirror rotation timeout corresponds, in some examples, to a time duration after which the polygon mirror 2106 stops rotating or is caused to reduce rotation speed in an instance in which no new print job/data is received or otherwise detected by the print head 302. In such an embodiment, the processor 2702 may be configured to transmit or otherwise make the rotation speed configuration value available to the print head 302. More particularly, the processor 2702 may be configured to cause the rotation speed configuration values to be stored in the mirror overrun register. Prior to transmitting the rotation speed configuration value, the processor 2702 may be configured to determine the rotation speed configuration value based on the information pertaining to the polygon mirror rotation timeout received in the one or more configuration settings and the structure of the mirror overrun register. The following table illustrates an example structure of the mirror overrun register:

TABLE 16

| Mirror overrun register |
|---|
| 15 14 13 12 11 10 9 8 7 6 5 4 3 2 1 0 |
| Rotation speed configuration value |

The example values in the bits 0-15 of the mirror overrun register are configured to store or otherwise represent the rotation speed configuration value. As discussed, based on the information pertaining to the polygon mirror rotation timeout included in the one or more configuration settings, the processor 2702 may be configured to determine the rotation speed configuration value. In an example embodiment, the processor 2702 may be configured to use a look-up table, such as the following look-up table, to determine the rotation speed configuration value based on the information pertaining to the polygon mirror rotation timeout included in one or more of the configuration settings:

TABLE 17 look-up table to determine the rotation speed configuration value

| Polygon mirror rotation timeout | Rotation speed configuration value |
|---|---|
| 120 seconds | 0 × 78 |
| Infinite seconds | 0 × FFFF |

For example, in an instance in which the information pertaining to the polygon mirror rotation timeout (included in the one or more configuration settings) is 120 seconds, the processor 2702 may determine the configuration value as "0x78". To this end, the processor 2702 may be configured to store the configuration value "0x78" in the mirror overrun register.

Similarly, the processor 2702 may be configured to transmit other configuration values to the other configuration registers based on respective look-up tables, predetermined values, default settings, and/or the like. In some examples, the scope of the disclosure is not limited to determining the configuration value based on the respective look-up tables. In an example embodiment, the processor 2702 may determine the configuration value directly from the one or more configuration settings. Further, in some examples, the configuration values depicted in look-up tables (i.e., tables 11, 13, 15, and 17) are example values and the scope of the disclosure is not limited to depicted configuration values.

In some examples, based on the configuration values in the one or more configuration registers, the print head 302 may print content on the print media 104. For example, based on the darkness configuration value, the print head 302 may be configured to print dark content on the print media 104. In another example, the print head 302 may be configured to determine the rotation speed of the polygon mirror 2106 based on the one or more configuration values stored in the one or more configuration register.

In some examples, multiple writing laser beams are used to print content on the print media. Using multiple writing laser beams may enable the printing apparatus 100 to operate and/or support multiple print resolutions at multiple print speeds. Further, the printing apparatus 100 may modify the count of writing laser beams to achieve different resolutions and different print speeds. One such method of printing content using multiple wiring laser beams is described in conjunction with FIG. 32.

In some examples, multiple writing laser beams are used to print content on the print media. Using multiple writing laser beams may enable the printing apparatus 100 to operate and/or support multiple print resolutions at multiple print speeds. Further, the printing apparatus 100 may modify the count of writing laser beams to achieve different resolutions and different print speeds. One such method of printing content using multiple wiring laser beams is described in conjunction with FIG. 32.

Figure 32:
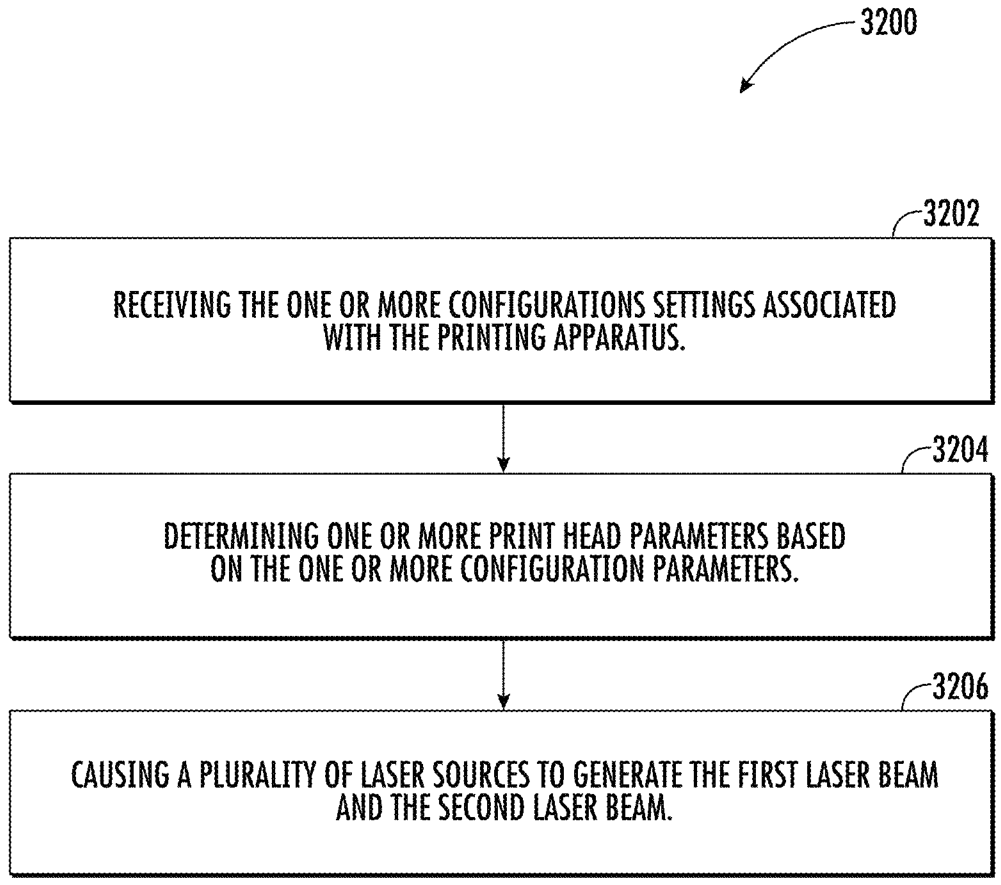
FIG. 32 illustrates a flowchart of a method for printing content in the print media, according to one or more embodiments described herein.

FIG. 32 illustrates a flowchart 3200 of a method for printing content in the print media 104, according to one or more embodiments described herein.

At step 3202, the printing apparatus 100 may include means such as, the control unit 138, the processor 2702, the I/O device interface unit 2706, and/or the like, for receiving the one or more configurations settings associated with the printing apparatus 100. In an example embodiment, the I/O device interface unit 2706 may receive the one or more configuration settings associated with the printing apparatus 100 through the UI 140. In some examples, as discussed, the one or more configuration settings may include the print resolution at which the content is to be printed on the print media 104, and the speed at which the print media 104 is to be traversed along the print path. For example, the I/O device interface unit 2706 may receive the one or more configuration settings as 600 DPI (dots per inch) at 6 IPS (inches per second). In some examples, the 600 DPI corresponds to the print resolution at which the content is to be printed on the print media 104. Further, 6 IPS corresponds to the speed at which the print media 104 is to be traversed along the print path. Additionally, the one or more configuration settings may include information pertaining to the count of writing laser beams to be used to write content on the print media 104. For example, the one or more configuration settings may state that the count of writing laser beams to write content is three.

At step 3204, the printing apparatus 100 may include means such as, the control unit 138, the processor 2702, the I/O device interface unit 2706, the printing operation control unit 2716, and/or the like, for determining one or more print head parameters based on the one or more configuration parameters. For example, the printing operation control unit 2716 may determine the rotation speed at which the polygon mirror 2106 rotates. In some examples, the printing operation control unit 2716 may be configured to determine the rotation speed of the polygon mirror 2106 based on the one or more configuration settings (resolution and media traversal speed). In some examples, the printing operation control unit 2716 may be configured to utilize the following equation to determine the rotation speed of the polygon mirror 2106.

$$\omega = \frac{r_p D_r v(1 + N_S)}{N n_L} \times 60 \text{ rpm} \qquad (2)$$

Where, $D_r = r_L / r_p$;

ω=rotation speed of the polygon mirror;

$r_p$=print resolution;

$r_L$=writing laser beam resolution;

$D_r$=Data redundancy (the number of adjacent laser lines utilized to print the same content);

v=Speed at which the print media 104 traverses;

$n_L$=Count of writing laser beams utilized to write content on print media 104;

N=number of polygon faces; and $N_S$=number of faces to skip after each scanning face.

Equation 2 presumes that adjacent printed lines are spaced apart from each other by the writing laser beam resolution.

Considering that the media traversal speed is 6 IPS, the print resolution is 600 DPI, and writing laser beam resolution is 600 DPI, the printing operation control unit 2716 may be configured to determine the data redundancy as 1. Accordingly, the printing operation control unit 2716 may determine that three writing laser beams are configured to simultaneously print separate content on the print media 104. Additionally, considering that none of the faces polygon mirror 2106 are to be skipped while printing the content (i.e. all eight faces of the polygon mirror 2106 are used to print content), based on equation 2, the printing operation control unit 2716 may determine the rotation speed of the polygon mirror 2106 as 9000 rpm.

At step 3206, the printing apparatus 100 may include means such as the control unit 138, the processor 2702, the I/O device interface unit 2706, the printing operation control unit 2716, and/or the like, for causing the one or more laser sources 2102 to generate the writing laser beams (depicted by 2604) and the pre-energizing laser beam (depicted by 2606), while the polygon mirror 2106 rotates at the determined rotation speed. In some examples, the one or more laser sources 2102 may be configured to generate the three writing laser beams having predetermined laser resolution. For example, the one or more laser sources 2102 may be configured to generate the three writing laser beams having the print resolution of 600 DPI.

Since the polygon mirror 2106 rotates at 9000 rpm and the three writing laser beams have the laser resolution of 600 dpi, the print resolution of 600 DPI and the printing speed of 6 IPS is achieved. In some examples, to modify the print resolution of the printed content and the print media traversal speed without modifying the polygon rotation speed, the multiple writing laser beams may be configured to write the same content on the print media 104. For example, to achieve the resolution of 200 DPI at the media traversal speed of 6 IPS, the printing operation control unit 2716 may be configured to determine the data redundancy as 3. Accordingly, the printing operation control unit 2716 may determine that the three writing laser beams may be configured to simultaneously write the same content on the print media 104. To this end, when the polygon mirror 2106 rotates at 9000 rpm and the three writing laser beams are configured to write the same content, a resolution of 200 DPI at 6 IPS is achieved.

In another example, to achieve the print resolution of 600 DPI and the print speed of 12 IPS, the printing operation control unit 2716 may be configured to determine the polygon mirror 2106 as 18000 rpm. Accordingly, when the polygon mirror 2106 rotates at 18000 rpm and the three writing laser beams are configured to write content on the print media 104, the print resolution of 600 dpi at 12 IPS is achieved. To modify the print resolution at the same print speed, printing operation control unit 2716 may be configured to modify the data redundancy. As discussed, data redundancy may be deterministic of a count of writing laser beams used to write the same content on the print media 104. For example, to achieve the print resolution of the 200 DPI at the same print speed 12 IPS, the printing operation control unit 2716 may be configured to modify the data redundancy as 3. Accordingly, the three writing laser beams may be configured to write the same content on the print media 104.

In some examples, during the configuration of the printing apparatus, the polygon mirror speed and the count of the writing laser beams to be used corresponding to the various print speeds and the resolution are pre-stored in the memory of the printing apparatus 100. In an alternative embodiment, the polygon mirror speed and the count of the writing laser beams may be prestored in the memory of the print head.

In an additional embodiment, to achieve the resolution of 300 DPI at the media traversal speed of 10 IPS, the printing operation control unit 2716 may be configured to determine the data redundancy as 2. Accordingly, the printing operation control unit 2716 may determine that the two writing laser beams may be configured to simultaneously write the same content on the print media 104. Further, the third writing laser beam may be configured to write a different content in the print media. To this end, the printing operation control unit 2716 may determine that the rotation speed of the polygon mirror is 15000 rpm. Therefore, to achieve the print resolution of 300 DPI at 10 IPS, the printing operation control unit 2716 may be configured to rotate the polygon mirror at 15000 rpm. Further, the printing operation control unit 2716 may be configured to cause two writing laser beams to print the same content on the print media 104.

Similarly, printing operation control unit 716 may be configured to modify one or more of the print head parameters to achieve different print resolutions and print speed.

Figure 33:
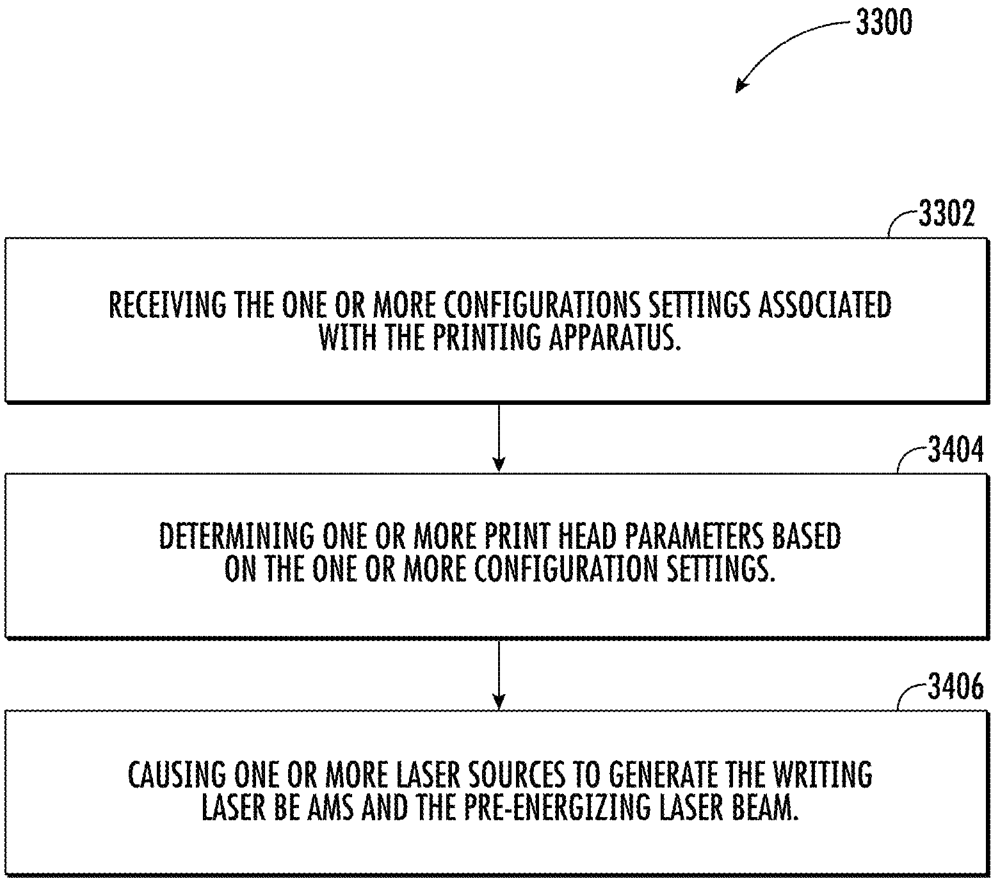
FIG. 33 illustrates another method for printing content on the print media, according to one or more embodiments described herein.

FIG. 33 illustrates another method 3300 for printing content on the print media 104, according to one or more embodiments described herein. At step 3302, the printing apparatus 100 may include means such as, the control unit 138, the processor 2702, the I/O device interface unit 2706, and/or the like, for receiving the one or more configuration settings associated with the printing apparatus 100. At step 3304, the printing apparatus 100 may include means such as, the control unit 138, the processor 2702, the I/O device interface unit 2706, the printing operation control unit 2716, and/or the like for determining one or more print head parameters based on the one or more configuration settings. At step 3306, the printing apparatus 100 may include means such as, the control unit 138, the processor 2702, the I/O device interface unit 2706, the printing operation control unit 2716, and/or the like for causing the one or more laser sources 2102 to generate the writing laser beams (depicted by 2604) and the pre-energizing laser beam (depicted by 2606), while the polygon mirror 2106 rotates at the determined rotation speed. Additionally, or alternatively, the printing operation control unit 2716 may be configured to control activation and/or deactivation of the one or more laser sources based on the faces of the polygon mirror 2106 to be skipped (determined from equation 2). In some examples, a single laser source 2102 may be used to generate the writing laser beam (depicted by 2604) and the pre-energizing laser beam (depicted by 2606), while the polygon mirror 2106 rotates at the determined rotation speed.

Figure 41:
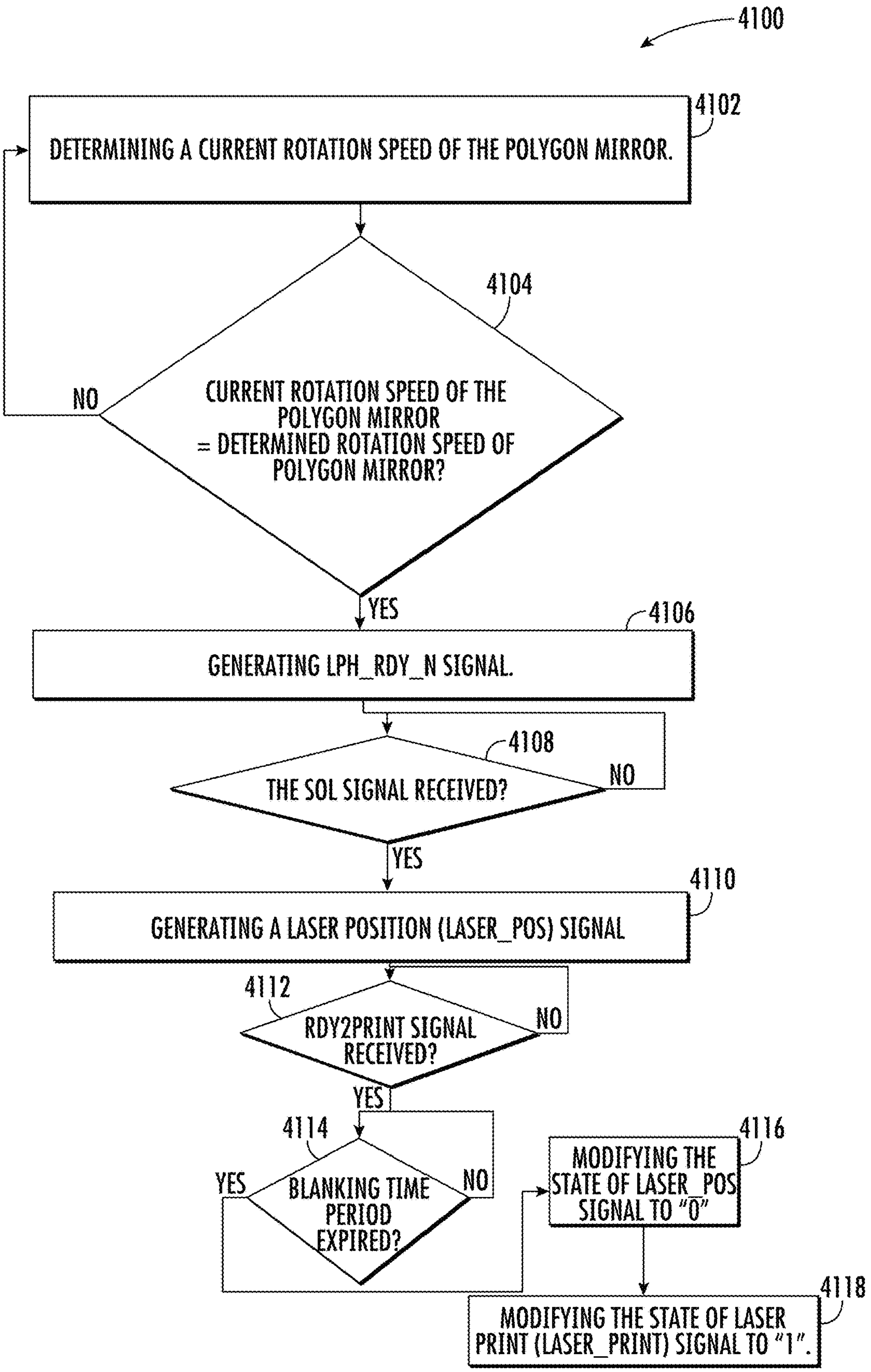
FIG. 41 illustrates an example flow chart according to one or more embodiments described herein.

FIG. 41 illustrates a flowchart 4100 of a method of synchronization between the print head 302 and the control unit 138.

At step 4102, the printing apparatus 100 may include means such as, the print head 302, the controller 2008, the laser subsystem control unit 2014, the SOL detector 2004, and/or the like, for determining a current rotation speed of the polygon mirror 2106. As discussed, the rotation speed of the polygon mirror 2106 is modified based on the one or more configuration settings. For example, the rotation speed of the polygon mirror 2106 is modified based on the print resolution and the print speed determined, as is described in FIG. 32 and FIG. 33. Further, FIG. 32 and FIG. 33 describe an example method for modifying the rotation speed of the polygon mirror that could occur in advance of or simultaneously with the steps of FIG. 41.

To this end, in an example embodiment, the controller 2008 may be configured to determine the current rotation speed of the polygon mirror 2106 based on one or more signal parameters associated with the SOL signal received from the SOL detector 2004. As discussed, the SOL detector 2004 may be configured to generate a pulse when the SOL detector 2004 receives the writing laser beam. The pulse corresponds to the SOL signal. Further, as discussed, the SOL detector 2004 receives reflected the writing laser beam for each face of the polygon mirror 2106, as the polygon mirror 2106 rotates. Accordingly, based on the frequency of the SOL signal, the controller 2008 may be configured to determine the rotation speed of the polygon mirror 2106. In an example embodiment, the controller 2008 may be configured to utilize the following equation to determine the rotation speed of the polygon mirror 2106:

$$\omega = \frac{Nr}{Nf} \tag{3}$$

Where,

Nr=Number of pulses received from SOL detector 2004 in a minute; and

Nf=Number of faces in the polygon mirror 2106.

At step 4104, the printing apparatus 100 may include means such as, the print head 302, the controller 2008, and/or the like, for determining whether the current rotation speed of the polygon mirror 2106 is the same speed as the rotation speed of polygon mirror 2106 at which the print head 302 is to print content (determined in the flowchart 3200 and 3300). In an instance in which the controller 2008 determines that the current rotation speed of the polygon mirror 2106 is the same as the rotation speed of polygon mirror 2106 at which the print head 302 is to print content, the controller 2008 performs the step 4106. However, in an instance in which the controller 2008 determines the current rotation speed is not the same as the rotation speed of polygon mirror 2106 at which the print head 302 has to print content, the controller 2008 may be configured to repeat the step 4102.

At step 4106, the printing apparatus 100 may include means such as, the print head 302, the controller 2008, the synchronization unit 2016, and/or the like, for generating a Laser print head ready (LPH_RDY_N) signal and transmitting the LPH_RDY_N signal to control unit 138. More particularly, the synchronization unit 2016 may be configured to modify the state of the LPH_RDY_N pin on the print head interface. For example, the synchronization unit 2016 may be configured to modify the state of the pin LPH_RDY_N to “0”.

At step 4108, the printing apparatus 100 may include means such as, the print head 302, the controller 2008, the synchronization unit 2016, and/or the like, for determining whether the SOL signal has been received from the SOL detector 2004. As discussed, the writing laser may sweep across one face of the polygon mirror 2106 (as the polygon mirror 2106 rotates) to print one line on the print media 104. Further, as discussed, the writing laser beam is directed to the SOL detector 2004 in an instance in which a location of the writing laser beam transitions between two faces of the polygon mirror 2106. Therefore, SOL signal is indicative of an instance in which the print head 302 is ready to print a new line on the print media 104. If the synchronization unit 2016 determines that the SOL signal is received, the synchronization unit may be configured to perform the step 4109. However, if the synchronization unit 2016 determines that the SOL signal is not received, the synchronization unit 2016 may be configured to repeat the step 4110 until the SOL signal is received.

At step 4110, the printing apparatus 100 may include means such as, the print head 302, the controller 2008, the synchronization unit 2016, and/or the like, for generating a Laser position (Laser_POS) signal. In an example embodiment, the synchronization unit 2016 may be configured to modify the state of the Laser_POS pin in the print head interface to indicate the generation of the Laser_POS signal. For example, the synchronization unit 2016 may change the state of Laser_POS signal to “1”. In some examples, the state “1” of the Laser_POS signal may indicate that the writing laser beam is at a blanking location on the face of the polygon mirror 2106. That is, and in some examples, the writing laser beam may reflect from the blanking location (on the face of the polygon mirror 2106) to a location other than the print media 104. In some examples, as the polygon mirror 2106 rotates, the angle of incidence of the writing laser beam changes. Therefore, the writing laser beam may sweep in accordance with the angle of incidence of the writing laser beam on the polygon mirror 2106. Further, the angle of incidence is determined based on the location on the polygon mirror from where the writing laser beam reflects. As the polygon mirror rotates, the location from where the writing laser beam reflects changes. Accordingly, the blanking locations and non-blanking locations on the polygon mirror 2106 are defined. For example, the writing laser beam may be reflected from the blanking location to the SOL detector 2004. Accordingly, no content is printed, while the writing laser beam reflects from the blanking location on the face of the polygon mirror 2106. In some examples, the face of the polygon mirror 2106 may include multiple blanking locations. Further, a time duration during which the writing laser beam reflects from the multiple blanking locations corresponds to blanking time period. During blanking time period, no content is printed on the print media 104 (since the writing laser beam is not directed on the print media 104). In some examples, the blanking period may indicate that the print head 302 is ready to print content on the print media 104. In some examples, the blanking time period is determined from the rotation speed of the polygon mirror 2106. For instance, and in some examples, the blanking time period is inversely proportional to the rotation speed of the polygon mirror 2106.

In an example embodiment, the locations on the polygon mirror 2106 that facilitate reflection of the writing laser beam on the print media 104 correspond to non-blanking locations. Further, a time duration during which the writing laser beam reflects from the non-blanking locations corresponds to the non-blanking time period. During the non-blanking time period, content is printed on the print media 104 (since the writing laser beam is directed on the print media 104).

At step 4112, the printing apparatus 100 may include means such as, the print head 302, the controller 2008, the synchronization unit 2016, and/or the like, for determining whether a ready to print (RDY2PRINT) signal from the control unit 138 is received, in response to change in the state of the Laser_POS signal. In an example embodiment, the RDY2PRINT signal indicates that the control unit 138 has traversed the print media 104 by a single line. In an example embodiment, the size of the single line is deterministic based on the resolution at which the printing apparatus 100 is to print content on the print media 104. For example, if the resolution is 600 dpi, the size of the single line is 0.01667 inches. Accordingly, the control unit 138 may be configured to traverse the print media 104 by 0.01667 inches. Thereafter, the control unit 138 may be configured to generate and transmit (or otherwise indicate) the RDY2PRINT signal to the print head 302. Additionally, or alternatively, the control unit 138 may be configured to modify the state of the RDY2PRINT pin on the print head interface.

The synchronization unit 2016 may, in some examples, be configured to read the RDY2PRINT pin. Reading the RDY2PRINT pin corresponds to receiving the RDY2PRINT signal. If the synchronization unit 2016 determines that RDY2PRINT is received, the synchronization unit 2016 may be configured to perform the step 4114. However, if the synchronization unit 2016 determines that it has not received the RDY2PRINT signal, the synchronization unit 2016 may be configured to repeat the step 4112 until the RDY2PRINT signal is received.

At step 4114, the printing apparatus 100 may include means such as, the print head 302, the controller 2008, the synchronization unit 2016, and/or the like, for determining whether the blanking period has expired. If the synchronization unit 2016 determines that the blanking period has expired, the synchronization unit 2016 may be configured to perform the step 4116. However, if the synchronization unit 2016 determines that blanking period has not expired, the synchronization unit 2016 may be configured to repeat the step 4114 until the blanking period expires.

At step 4116, the printing apparatus 100 may include means such as, the print head 302, the controller 2008, the synchronization unit 2016, and/or the like, for modifying the state of Laser_POS signal to “0”. State “0” of the Laser_POS signal is indicative of the start of the non-blanking period.

At step 4116, the printing apparatus 100 may include means such as, the print head 302, the controller 2008, the synchronization unit 2016, and/or the like, for modifying the state of Laser Print (Laser_print) signal to “1” in response to the modification of the LASER_POS signal to state “0”. State “1” of the Laser_print signal indicates that the content is being printed on the print media 104 using the writing laser beam.

Figure 42:
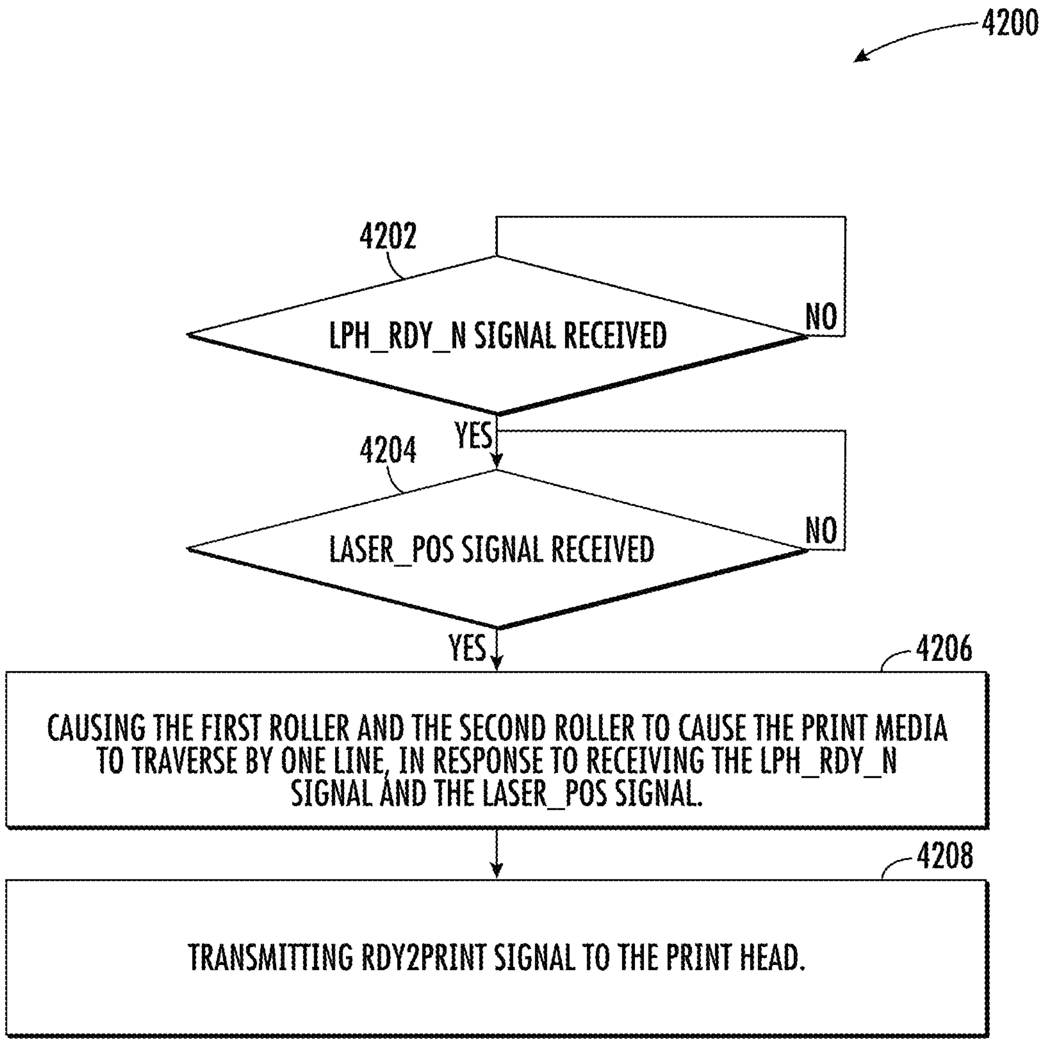
FIG. 42 illustrates an example flow chart according to one or more embodiments described herein.

FIG. 42 illustrates a flowchart 4200 of another method of synchronization between the print head 302 and the control unit 138.

At step 4202, the printing apparatus 100 may include means such as, control unit 138, the processor 2702, the print head synchronization unit 2722, and/or the like, for determining whether the LPH_RDY_N signal from the print head 302 is received. In an example embodiment, the LPH_RDY_N signal indicates that polygon mirror 2106 is rotating at the determined rotation speed. For example, the print head synchronization unit 2722 may be configured to receive the state “0” of the LPH_RDY_N signal. As discussed, the state “0” of the LPH_RDY_N signal indicates that the rotation speed of the polygon mirror 2106 has reached the determined rotation speed, such as the rotation speed determined in FIGS. 32 and 33. If the print head synchronization unit 2722 determines that the LPH_RDY_N is not received, the print head synchronization unit 2722 may be configured to repeat the step 4202 until LPH_RDY_N is received. However, if the print head synchronization unit 2722 determines that the LPH_RDY_N is received, the print head synchronization unit 2722 may be configured to perform the step 4204.

At step 4204, the printing apparatus 100 may include means such as, control unit 138, the processor 2702, the print head synchronization unit 2722, and/or the like, for receiving the LASER_POS signal from the print head 302. In an example embodiment, the LASER_POS signal indicates the start of the blanking period. For instance, the print head synchronization unit 2722 may be configured to receive the state “1” of the LASER_POS signal indicating the start of the blanking period.

At step 4206, the printing apparatus 100 may include means such as, control unit 138, the processor 2702, the print head synchronization unit 2722, the I/O device interface unit 2706 and/or the like, for causing the first roller 132 and the second roller 134 to cause the print media 104 to traverse by one line, in response to receiving the state “0” of the LPH_RDY_N signal and the state “1” of the LASER_POS signal. More particularly, the I/O device interface unit 2706 may cause the first roller 132 and the second roller 134 to move the print media 104 by a distance determined based on the print resolution (as discussed in the step 4108).

At step 4208, the printing apparatus 100 may include means such as, control unit 138, the processor 2702, the print head synchronization unit 2722, and/or the like, for transmitting RDY2PRINT signal to the print head 302. More particularly, the print head synchronization unit 2722 may be configured to transmit state “1” of the RDY2PRINT signal.

Figure 43:
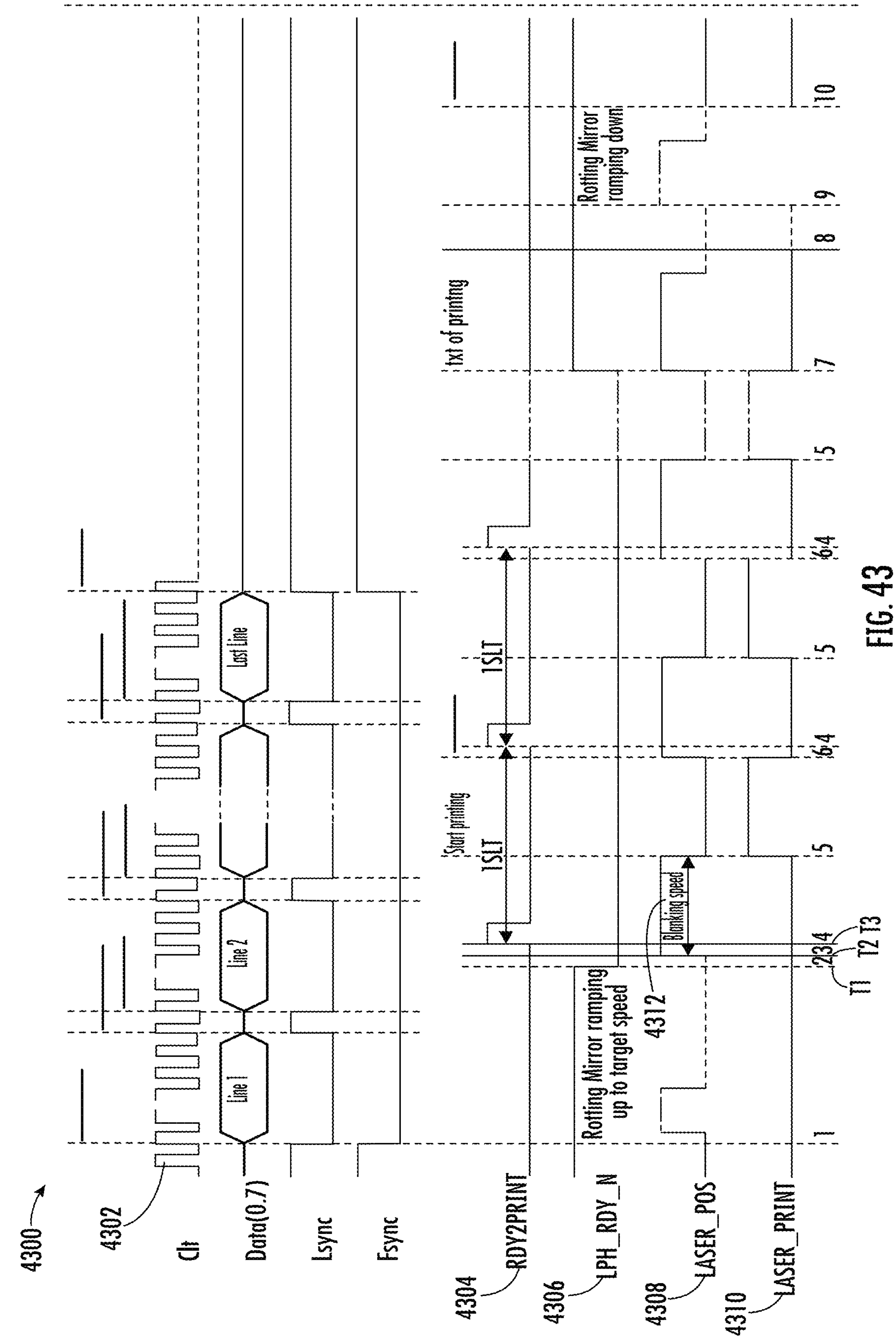
FIG. 43 illustrates an example timing diagram according to one or more embodiments described herein.

FIG. 43 is a timing diagram 4300 illustrating synchronization between the print head 302 and the control unit 138, according to one or more embodiments described herein.

The timing diagram 4300 includes the clock signal 4302, RDY2Print signal 4304, LPH_RDY_N signal 4306, LASER_POS signal 4308, and Laser_print signal 4310. From timing diagram 4300, it can be observed that at time instant T1, the LPH_RDY_N signal 4306 is set to state “0”. As discussed, the LPH_RDY_N signal 4306 indicates that polygon mirror 2106 is rotating at the determined rotation speed. At time instant T2, the LASER_POS signal 4308 is set to state “1”. As discussed, the LASER_POS signal 4308 indicates the start and/or end of the blanking period (depicted by 4312). At time instant T3, the RDY2PRINT signal 4306 is set to state “1”. The control unit 138 is configured to transmit the RDY2PRINT signal 4306 to the print head 302. As discussed, the RDY2PRINT signal indicates traversal of the print media 104 by a predetermined distance (e.g., one dot size and/or one line). At time instant T4, the Laser_print signal 4310 is set to state “1” indicating the printing of a line on the print media 104.

Figure 44:
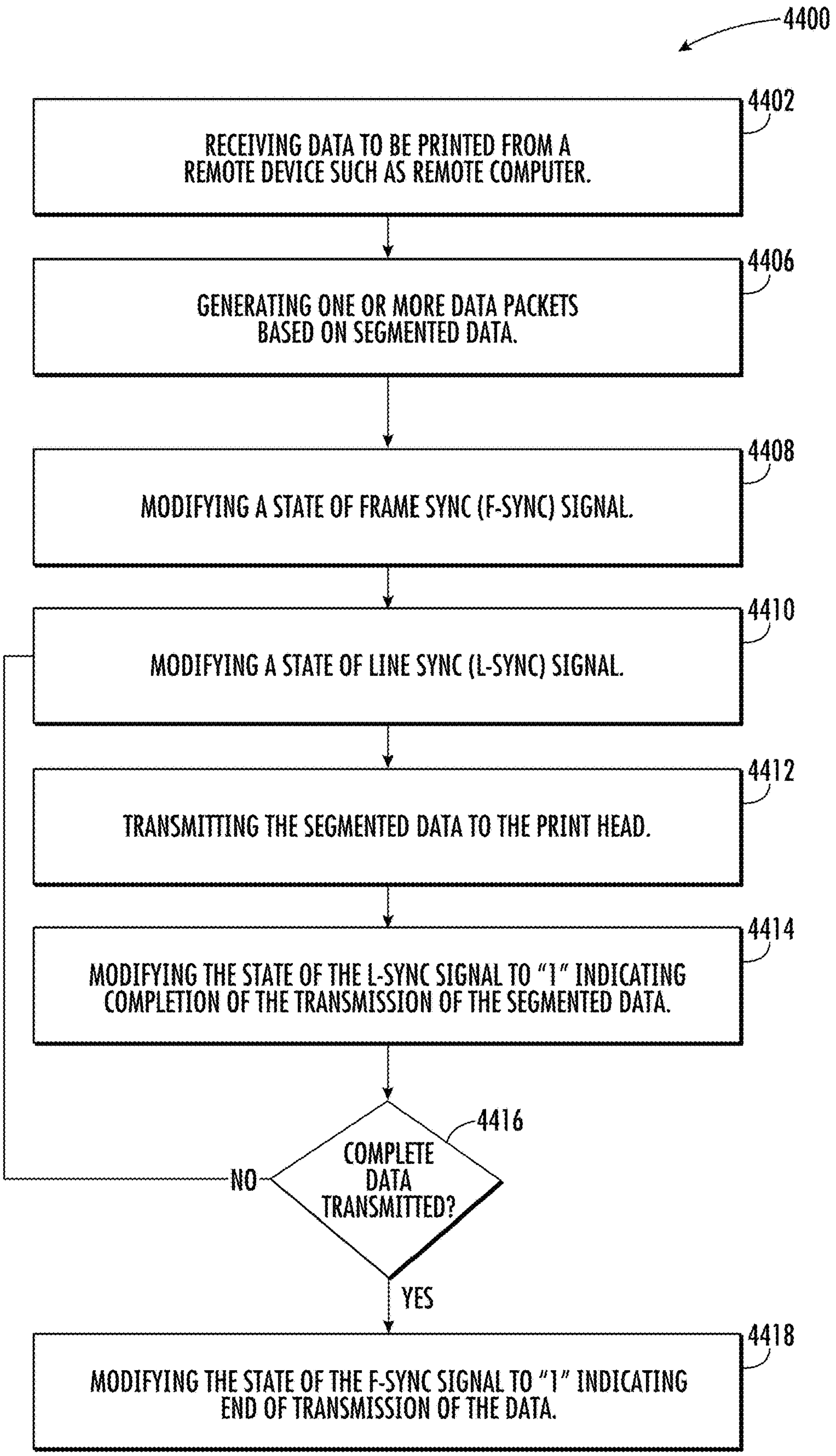
FIG. 44 illustrates an example flow chart according to one or more embodiments described herein.

FIG. 44 illustrates a flowchart 4400 of a method of data synchronization between the print head 302 and the control unit 138.

At step 4402, the printing apparatus 100 may include means such as, control unit 138, the processor 2702, the data synchronization unit 2724, and/or the like, for receiving data to be printed from a remote device such as remote computer, remote data source, network, or the like. In an example embodiment, the received data includes segmented data, where each segmented data corresponds to a portion of the data to be printed in a single line.

At step 4406, the printing apparatus 100 may include means such as, control unit 138, the processor 2702, the data synchronization unit 2724, and/or the like, for generating one or more data packets (to be transmitted to print head 302 for printing) based on segmented data. Each segmented data is included in the one or more data packets. Further, the data synchronization unit 2724 may determine a count of data packets to be transmitted to the print head in order to transmit the segmented data. The data synchronization unit 2724 may be configured to determine the count of the one or more data packets based on the print resolution, a color scheme in which the data is to be printed, a count of bits included in a single data packet. In another embodiment, the data synchronization unit 2724 may be configured to determine the count of the one or more data packets based on a look-up table, such as the following look-up table:

TABLE 18

Look-up table to determine the count of the one or more data packets

| | | | | | | |
|---|---|---|---|---|---|---|
| # bit per line | 2550 | 1275 | 863 | 20400 | 10200 | 6904 |
| # 32b word | 80 | 40 | 27 | 638 | 319 | 216 |
| bit padding | 10 | 5 | 1 | 16 | 8 | 8 |
| Total # bit send | 2560 | 1280 | 864 | 20416 | 10208 | 6912 |

From the example look-up table, it can be observed that to print content at 600 dpi, the segmented data is configured to be transmitted in 80 data packets to the print head 302. In another example, to print content at 203 dpi, the segmented data is configured to be transmitted into 27 data packets. In some examples, one or more portions of the segmented data are distributed in the one or more data packets based on a position on the print media 104 at which a portion of the segmented data is to be printed and a writing laser sweep direction. In some examples, the writing laser sweep direction corresponds to a direction in which the writing laser sweeps the print media 104. In one example, the writing laser beam may sweep the print media 104 from left to right. In another example, the writing laser beam may sweep the print media 104 from right to left.

For example, if the writing laser beam sweeps the print media 104 from left to right and the portion of the segmented data is to be printed at a left most position (along the writing laser sweep direction), the portion of the segmented data is included in the first or earlier data packet (to be transmitted to the print head 302). Similarly, if another portion of the segmented data is to be printed at a right most position (along the writing laser sweep direction), the other portion of the segmented data is included in the last or later data packet (to be transmitted to the print head 302).

Figure 45:
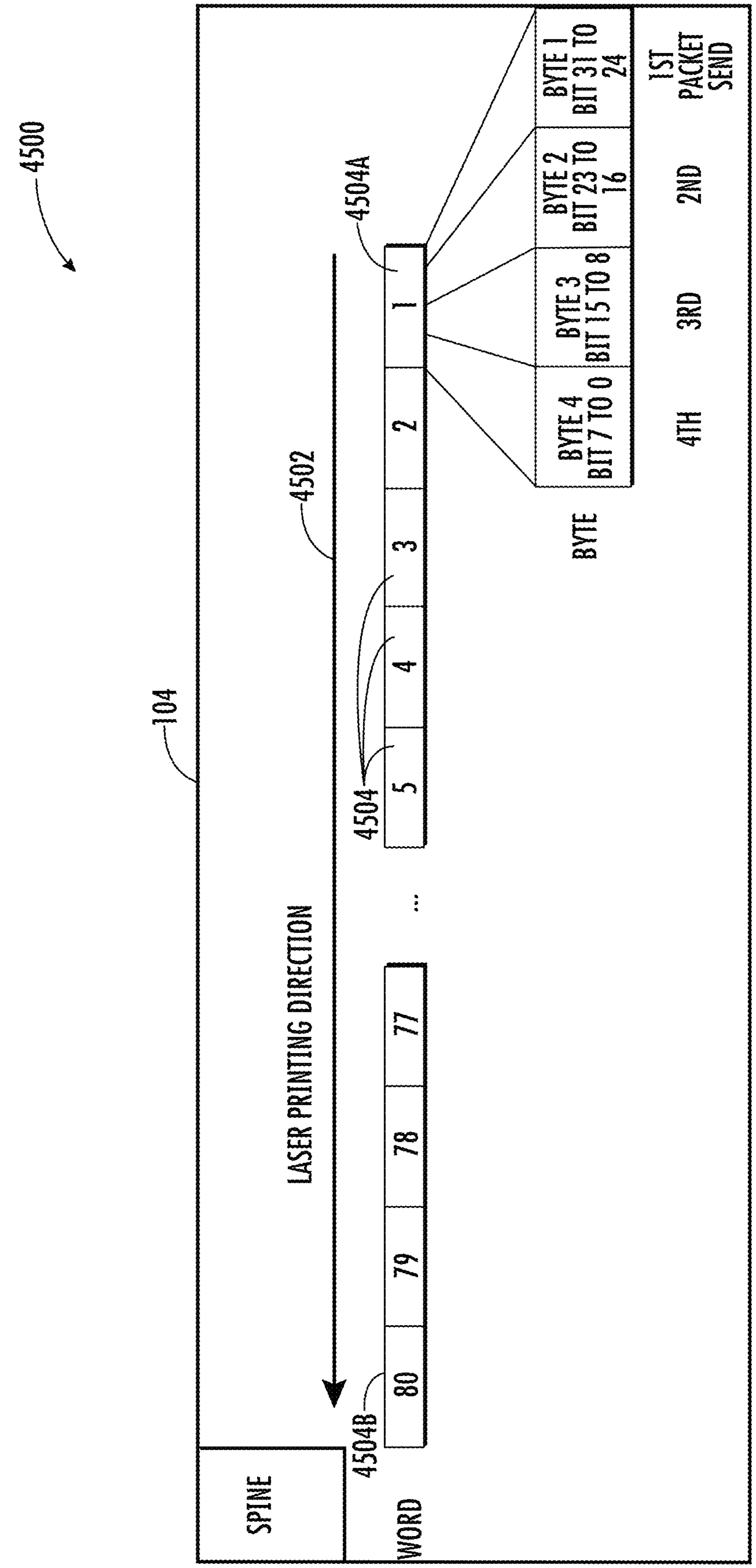
FIG. 45 illustrates an example schematic diagram according to one or more embodiments described herein.

FIG. 45 is a schematic diagram 4500 illustrating the distribution of the one or more portions of the segmented data in the one or more data packets, according to one or more embodiments described herein.

The schematic diagram 4500 includes the writing laser sweep direction 4502 and the one or more data packets 4504. In an example, the one or more data packets 4504 are arranged in a sequence in which the one or more data packets are to be printed on the print media 104. For example, the portion of the segmented data included in the first data packet 4504*a* is printed at the right most position on the print media 104. Accordingly, the data synchronization unit 2724 may be configured to transmit the first data packet 4504*a* before any other data packet in the one or more data packets. In another example, another portion of the segmented data included in the data packet 4504*b* is to be printed at the left most position on the print media 104. Accordingly, the data packet 4504*b* corresponds to the last data packet that is transmitted to the print head 302. Referring back to FIG. 44, at step 4408, the printing apparatus 100 may include means such as, control unit 138, the processor 2702, the data synchronization unit 2724, and/or the like, for modifying a state of Frame sync (F-Sync) signal. In an example embodiment, the F-Sync signal may indicate to the print head 302 that control unit 138 is transmitting data to be printed on the label of the print media 104. In an example embodiment, the data synchronization unit 2724 may be configured to modify the state of the F-Sync signal to "0", which may indicate to the print head 302 that the control unit 138 is transmitting data to be printed on the label of the print media 104.

Thereafter, at step 4410, the printing apparatus 100 may include means such as, control unit 138, the processor 2702, the data synchronization unit 2724, and/or the like, for modifying a state of Line sync (L-Sync) signal. In an example embodiment, the L-Sync signal may indicate to the print head 302 that the control unit 138 is transmitting segmented data to be printed on the label of the print media 104. As discussed, the segmented data corresponds to the portion of the data that is to be printed in a single line on the print media 104. In an example embodiment, the data synchronization unit 2724 may be configured to modify the state of the L-Sync signal to "0", which may indicate to the print head 302 that the control unit 138 is transmitting the segmented data.

While the state of the F-Sync signal and the L-Sync signal are "0", at step 4412, the printing apparatus 100 may include means such as, control unit 138, the processor 2702, the data synchronization unit 2724, and/or the like, for transmitting the segmented data to the print head 302. After the transmission of the segmented data, at step 4414, the printing apparatus 100 may include means such as, control unit 138, the processor 2702, the data synchronization unit 2724, and/or the like, for modifying the state of the L-Sync signal to "1" indicating completion of the transmission of the segmented data (i.e., the data to be printed in a line on the print media 104).

At step 4416, the printing apparatus 100 may include means such as, control unit 138, the processor 2702, the data synchronization unit 2724, and/or the like, for determining whether the data to be printed on the label of the print media 104 has been transmitted to the print head 302. If the data synchronization unit 2724 determines that the complete data has been transmitted to the print head 302, the data synchronization unit 2724 may be configured to perform the step 4418. However, if the data synchronization unit 2724 determines that the complete data has not been transmitted, the data synchronization unit 2724 may be configured to repeat the step 4412.

At step 4418, the printing apparatus 100 may include means such as, control unit 138, the processor 2702, the data synchronization unit 2724, and/or the like, for modifying the state of the F-Sync signal to "1" indicating end of transmission of the data (i.e., the complete data to be printed on the label of the print media 104).

Figure 46:
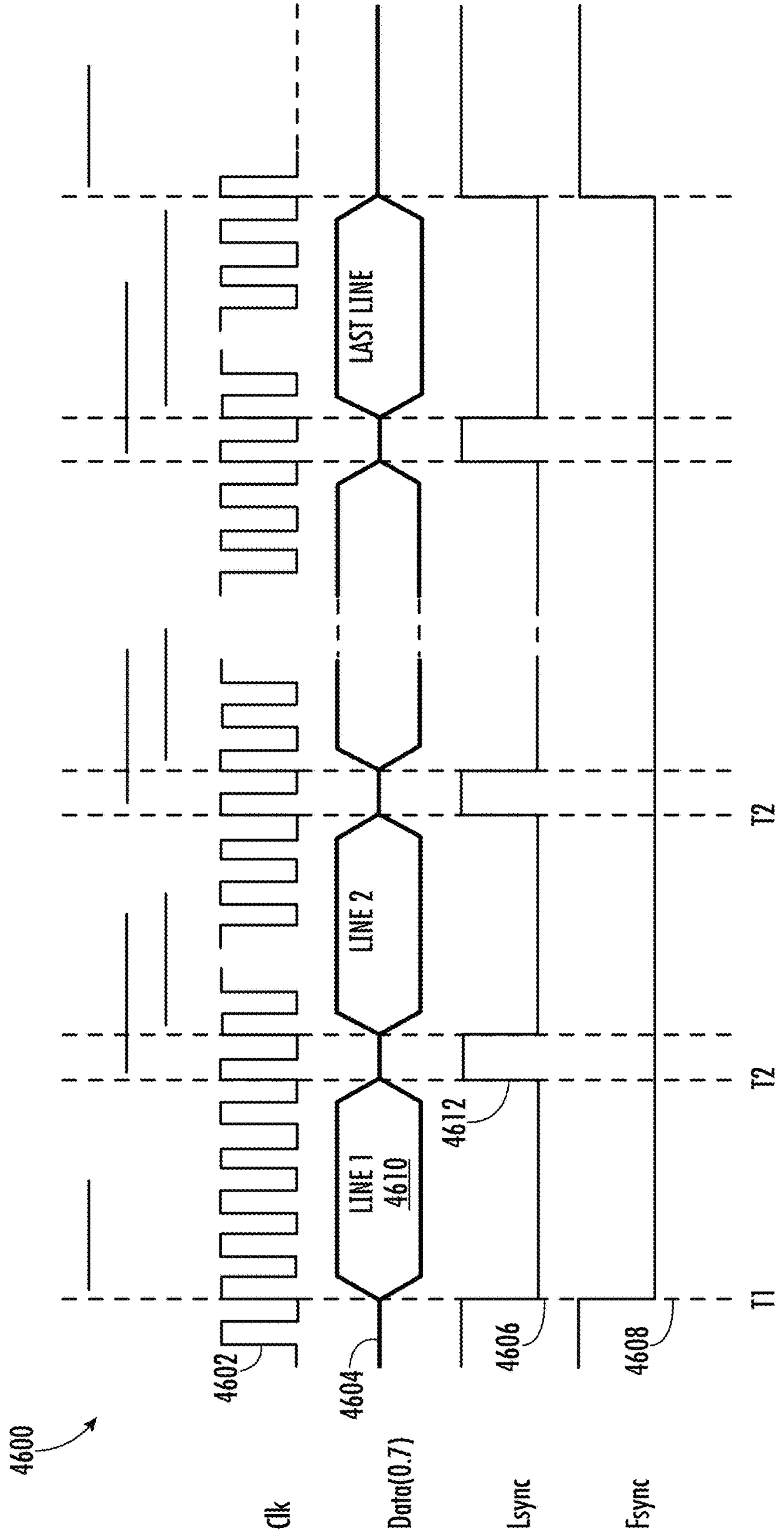
FIG. 46 is an example timing diagram according to one or more embodiments described herein.

FIG. 46 is a timing diagram 4600 illustrating data synchronization between the print head 302 and the control unit 138, according to one or more embodiments described herein. The timing diagram 4600 includes the clock signal 4602, a data bus 4604, the L-Sync signal 4606, and the F-Sync signal 4608.

It can be observed that at time instant T1, the L-sync signal 4606 and the F-Sync 4608 signal are in the state "0". Further, it can be observed the L-sync signal 4606 is in the state "0" until time instant T2. Between the time instant T1 and T2, the data bus 4604 transmits the segmented data to the print head 302 (depicted by 4610). After the transmission of the segmented data, the L-Sync signal 4606 is in the state "1" (depicted by 4612), however, the F-Sync signal 4608 is in the state "0". To this end, such states of L-sync 4606 and F-sync signal 4608 indicate that the control unit 138 has additional data to be transmitted to the print head 302.

In some examples, the states of the L-Sync signal and the F-Sync signal may be indicative of a mode of data transmission between the control unit 138 and the print head 302. The following example table illustrates the mode of data transmission between the control unit 138 and the print head 302:

TABLE 19 mode of data transmission between the control unit and the print head

| L-Sync Signal | F-Sync Signal | Mode of data transmission |
|---|---|---|
| 0 | 0 | Start of transfer segmented data |
| 1 | 0 | End of transmission of segmented data |
| 0 | 1 | Program mode |
| 1 | 1 | End of data transfer |

In an example embodiment and in an instance in which the L-Sync signal is "0" and the F-Sync signal "1", the data transmitted corresponds to a firmware data. To this end, the control unit 138 may utilize an aforementioned data mode to update a firmware of the print head 302.

In some examples, when the print head 302 does not receive any data to be printed, it may be required to save power by modifying the rotation speed of the polygon mirror 2106. Modifying the rotation speed of the polygon mirror 2106 may include reducing the rotation speed of the polygon mirror 2106. In another example, modifying the rotation speed of the polygon mirror 2106 may include halting the rotation of the polygon mirror 2106. One such method of operating the print head 302 is described in conjunction with FIG. 47.

Figure 47:
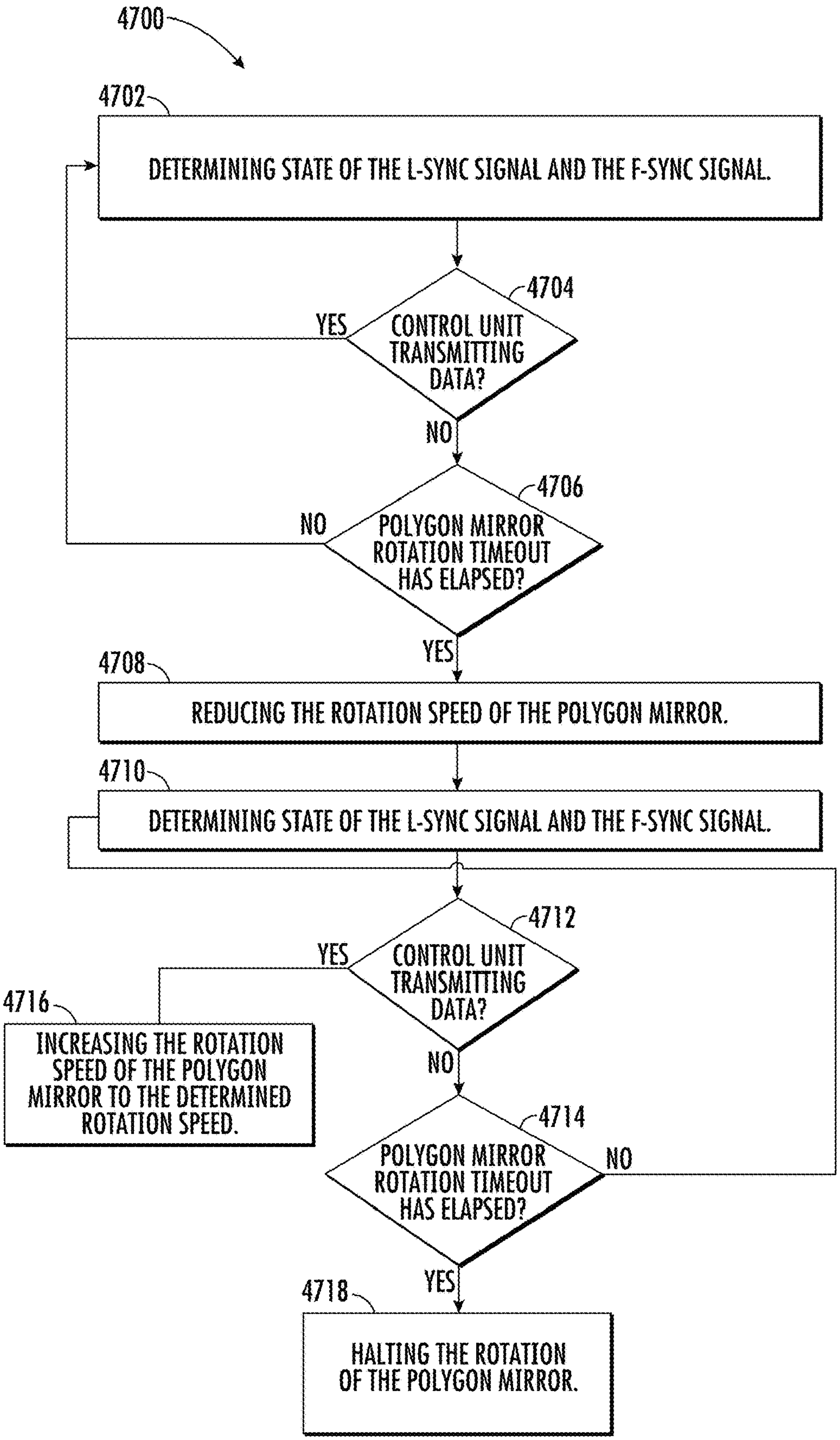
FIG. 47 illustrates an example flow chart according to one or more embodiments described herein.

FIG. 47 illustrates a flowchart 4700 of a method for operating the print head 302, according to one or more embodiments described herein.

At step 4702, the printing apparatus 100 includes means such as, the print head 302, the controller 2008, the laser subsystem control unit 2014, and/or the like, for determining a state of the L-Sync signal and the F-Sync signal. In an example embodiment, the laser subsystem control unit 2014 may be configured to determine the state of L-Sync signal and the F-Sync signal from the print head interface.

At step 4704, the printing apparatus 100 includes means such as, the print head 302, the controller 2008, the laser subsystem control unit 2014, and/or the like, for determining whether the control unit 138 is transmitting data (to be printed on the print media 104) based on the state of the L-Sync signal and the F-Sync signal. For example, referring to table 19, if the laser subsystem control unit 2014 determines that the state of the L-Sync signal is "1" and the F-Sync signal is "1", the laser subsystem control unit 2014 may determine that the control unit 138 is not transmitting any data to the print head 302. Accordingly, the laser subsystem control unit 2014 may perform the step 4706. However, if the laser subsystem control unit 2014 determines that the control unit 138 is transmitting data to the print head 302, the laser subsystem control unit 2014 may be configured to repeat the step 4702.

At step 4706, the printing apparatus 100 includes means such as, the print head 302, the controller 2008, the laser subsystem control unit 2014, and/or the like, for determining if the polygon mirror rotation timeout has elapsed. The laser subsystem control unit 2014 may be configured to determine a polygon mirror rotation timeout from the mirror overrun register. If the laser subsystem control unit 2014 determines that the polygon mirror rotation timeout has elapsed, the laser subsystem control unit 2014 may be configured to perform the step 4708. However, if the laser subsystem control unit 2014 determines that the polygon mirror rotation timeout has not expired, the laser subsystem control unit 2014 may be configured to repeat the step 4702.

At step 4708, the printing apparatus 100 includes means such as, the print head 302, the controller 2008, the laser subsystem control unit 2014, and/or the like, for reducing the rotation speed of the polygon mirror 2106. At step 4710, the printing apparatus 100 includes means such as, the print head 302, the controller 2008, the laser subsystem control unit 2014, and/or the like, for determining the state of the L-Sync signal and the F-Sync signal. At step 4712, the printing apparatus 100 includes means such as, the print head 302, the controller 2008, the laser subsystem control unit 2014, and/or the like, for determining whether the control unit 138 is transmitting data (to be printed on the print media 104) based on the state of the L-Sync signal and the F-Sync signal. If the laser subsystem control unit 2014 determines that the control unit 138 is transmitting data to the print head 302, the laser subsystem control unit 2014 may be configured to perform the step 4714. However, if the laser subsystem control unit 2014 determines that the control unit 138 is not transmitting data to the print head 302, the laser subsystem control unit 2014 may be configured to perform the step 4716.

At step 4714, the printing apparatus 100 includes means such as, the print head 302, the controller 2008, the laser subsystem control unit 2014, and/or the like, for increasing the rotation speed of the polygon mirror 2106 to the determined rotation speed (FIG. 32 and FIG. 33). At step 4716, the printing apparatus 100 includes means such as, the print head 302, the controller 2008, the laser subsystem control unit 2014, and/or the like, for determining whether a predetermined time period has elapsed. If the laser subsystem control unit 2014 determines that the predetermined time period has elapsed, the laser subsystem control unit 2014 may be configured to perform the step 4718. However, if the laser subsystem control unit 2014 determines that the predetermined time period has not elapsed, the laser subsystem control unit 2014 may be configured to repeat the step perform the step 4712.

At step 4718, the printing apparatus 100 includes means such as, the print head 302, the controller 2008, the laser subsystem control unit 2014, and/or the like, for halting the rotation of the polygon mirror 2106.

In some examples, the scope of the disclosure is not limited to reducing the rotation speed of the polygon mirror 2106 and thereafter halting the polygon mirror 2106. In an example embodiment, the laser subsystem control unit 2014 may be configured to directly halt the polygon mirror if at step 4706, it is determined that the polygon mirror rotation timeout has elapsed. Alternatively, or additionally, the speed of the polygon mirror could be increased at step 4706, if it is determined that the control unit is transmitting data.

As is described herein, print media is configured to traverse along the print path and past the print head throughout operation. As a result of the continuous traversal and in some examples, the printed content may exhibit a skew. The embodiments illustrated herein disclose one or methods in which an image or content is pre-compensated for skew. For example, a skew may be introduced in the original image or content in order to compensate for the skew. The systems and methods herein may determine skew based on one or more markings on the print media, a traversal speed, results from a verifier, and/or the like. In other examples, the speed of traversal may also be altered. In some examples, FIGS. 34-38 illustrate methods for compensating the skew that may get introduced in the print media 104.

FIG. 34 is a flowchart 3400 illustrating another method for printing content on the print media 104, according to one or more embodiments described herein.

At step 3402, the printing apparatus 100 may include means such as, the control unit 138, the processor 2702, the I/O device interface unit 2706, and/or the like, for receiving the one or more configuration settings associated with the printing apparatus 100. In an example embodiment, the I/O device interface unit 2706 may receive the one or more configuration settings associated with the printing apparatus 100 through the UI 140. In some examples, as discussed, the one or more configuration settings may include the resolution at which the content is to be printed on the print media 104, and the speed at which the print media 104 is to be traversed along the print path. Additionally, or alternatively, the one or more configuration settings may include a count of writing laser beams to be used to print content on the print media 104. For example, the I/O device interface unit 2706 may receive the one or more configuration settings as 600 DPI (dots per inch) at 6 IPS (inches per second), and three writing laser beams to be used to print content on the print media 104.

At step 3404, the printing apparatus 100 may include means such as, the control unit 138, the processor 2702, the I/O device interface unit 2706, the printing operation control unit 2716, and/or the like, for determining a measure of the skew that may get introduced in the printed content based on the one or more configuration settings of the printer (received in the step 3402). For example, the printing operation control unit 2716 may be configured to determine the measure of the skew based on the print resolution, the media traversal speed, and a count of writing laser beams to be utilized to print content on the print media 104. Additionally, or alternately, the printing operation control unit 2716 may determine the measure of skew based on the one or more print media characteristics (refer FIG. 28). As discussed, the one or more print media characteristics may include, but are not limited to, the width of the print media 104, the type of the print media 104, thickness of the print media 104, and/or the like. Determining the measure of the skew is further described in conjunction with FIG. 35.

At step 3406, the printing apparatus 100 may include means such as, the control unit 138, the processor 2702, the I/O device interface unit 2706, the printing operation control unit 2716, and/or the like, for receiving the content to be printed. In some examples, the I/O device interface unit 2706 may receive the content from a remote computer. In another embodiment, the I/O device interface unit 308 may receive the content (to be printed) from the UI 140.

At step 3408, the printing apparatus 100 may include means such as, the control unit 138, the processor 2702, the I/O device interface unit 2706, the printing operation control unit 2716, the image processing unit 2718, and/or the like, for modifying the received content to compensate for the measure of the skew (determined in the step 3404). The method of modifying the content is further described in conjunction with FIG. 37.

Figure 35:
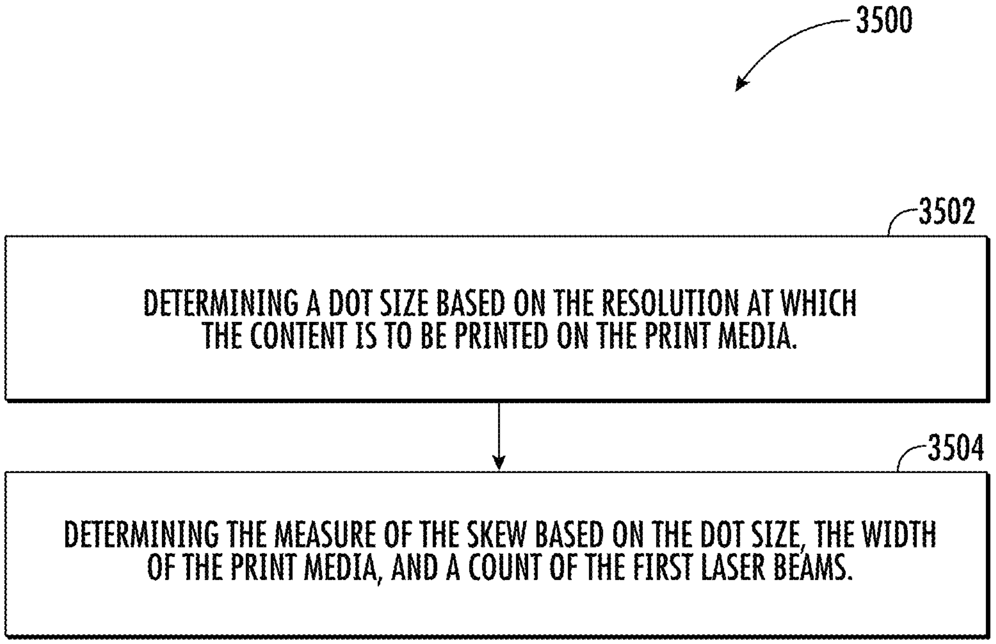
FIG. 35 illustrates a flowchart of a method for determining the measure of skew that may get introduced in the printed content, according to one or more embodiments described herein.

FIG. 35 illustrates a flowchart 3500 of a method for determining the measure of the skew that may get introduced in the printed content, according to one or more embodiments described herein.

At step 3502, the printing apparatus 100 may include means such as, the control unit 138, the processor 2702, the I/O device interface unit 2706, the printing operation control unit 2716, and/or the like, for determining a dot size based on the resolution at which the content is to be printed on the print media 104. In some examples, the printing operation control unit 2716 may utilize the following formula to determine the dot size:

$$\text{dot size} = \frac{1}{\text{resolution}} \tag{4}$$

For example, the printing operation control unit 2716 may determine the dot size as 0.005 inches if the resolution is 203 DPI. In another example, the printing operation control unit 2716 may determine the dot size as 0.0016 inches of the resolution is 600 DPI. In some examples, the printing operation control unit 2716 may not utilize the Equation 4 to determine the dot size. In an example embodiment, the printing operation control unit 2716 may utilize the following look-up table to determine the dot size:

TABLE 3 look-up table illustrating the dot size and the corresponding resolution.

| Resolution | 200 | 300 | 600 |
|---|---|---|---|
| dot size | 0.125 | 0.085 | 0.042 |

Alternatively, or additionally, dot size may be determined by other means such as by way of a verifier, scanner, images, and/or other image-based testing.

At step 3504, the printing apparatus 100 may include means such as, the control unit 138, the processor 2702, the I/O device interface unit 2706, the printing operation control unit 2716, and/or the like, for determining the measure of the skew based on the dot size (determined in the step 3502), the width of the print media 104 (refer FIG. 28), and a count of the writing laser beams. In some examples, the printing operation control unit 2716 may determine the skew by utilizing the following formula:

Measure of skew=Tan(size of one dot*count of the first laser beams/((width of the print media 104)) (5)

For example, if a count of the writing laser beam used for printing content is one, the width of the print media 104 is 4.25 inches, and dot size is 0.0016 inches, the measure of the skew is 0.07 degrees. In another example, if a count of the writing laser beam used for printing content is one, the width of the print media 104 is 4.25 inches, and the dot size is 0.005 inches, the measure of the skew is 0.02 degrees.

Figure 36A:
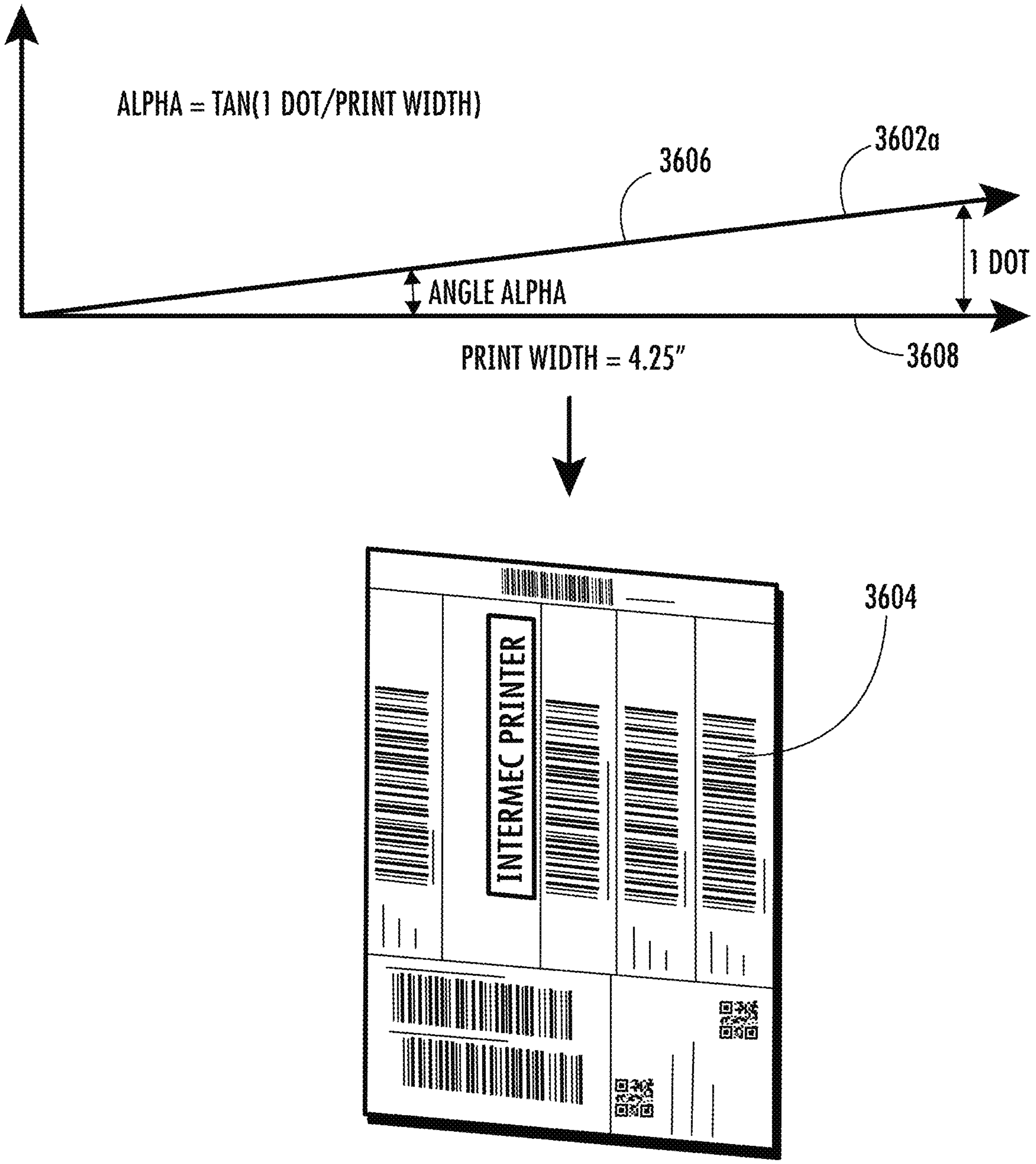
FIG. 36*a*, FIG. 36*b*, and FIG. 36*c* are schematic diagrams illustrating an example relationship between the count of writing laser beams and the measure of the skew, according to one or more embodiments described herein.
Figure 36B:
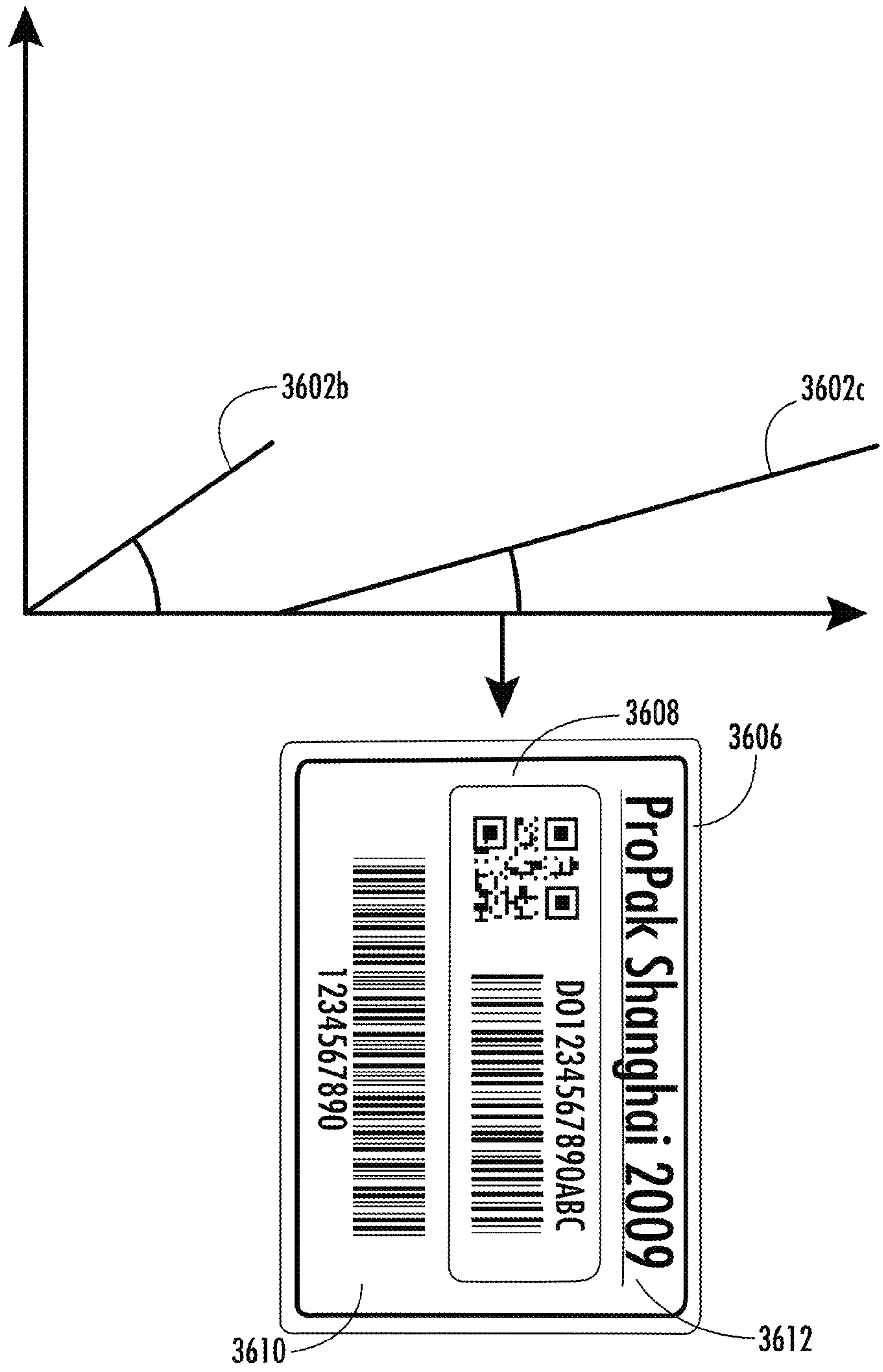
Figure 36C:
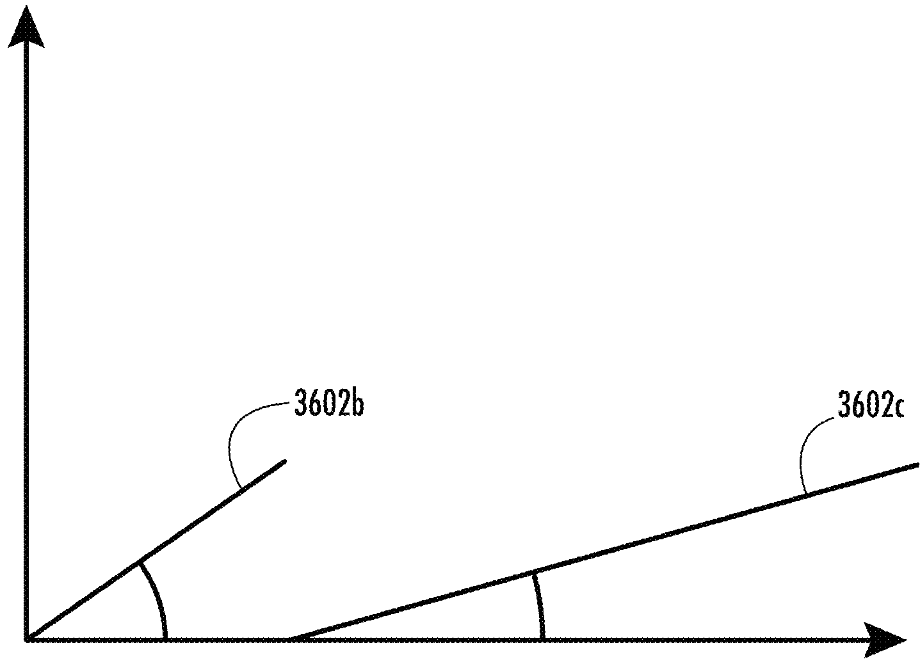

In some examples, the measure of the skew increases when the count of writing laser beams used to print content on the print media 104 increases. For example, when multiple writing laser beams are utilized to print a single line on the print media 104, the skew angle increases, as is described in FIG. 36*a*, FIG. 36*b*, and FIG. 36*c*. FIG. 36*a*, FIG. 36*b*, and FIG. 36*c* are schematic diagrams illustrating the relationship between the count of writing laser beams and the measure of the skew, according to one or more embodiments described herein.

Referring to FIG. 36*a*, the print head 302 may cause the single writing laser beam 3602*a* to sweep across the width of the print media 104. Since the print media 104 traverses along the print path, the single writing laser beam 3602*a* may sweep the width of print media 104 at a skew to generate skewed printed content 3604. The skew may correspond to an angle between an imaginary line (depicted by 3606) representing a line swept by the single writing laser beam and an imaginary line depicting the width of the print media 104 (depicted by 3608). Further, in FIG. 36*a*, the skew angle is determined based on Equation 5.

Referring to FIG. 36*b*, the print head 302 may cause the two writing laser beams 3602*b* and 3602*c* to sweep across the width of the print media 104 such that 50% of the content is printed by the writing laser beam 3602*b* and 50% of the content is printed by the writing laser beam 3602*c*. The printed content generated by the writing laser beams 3602*b* and 3602*c* is depicted by 3606. To this end, the printed content 3606 may include a joint 3608 that decides that the printed content enters into a first printed content portion 3610 and a second printed content portion 3612. In some examples, the writing laser beam 3602*b* prints the first printed content portion 3610 and the writing laser beam prints the second printed content portion 3612. Further, it can be observed that the first printed content portion 3610 and the second printed content portion 3612 have respective skews (as both portions of the printed content are printed by separate writing laser beams). Additionally, the respective measure of the skew in the first portion of the printed content and the second portion of the printed content, is greater than the measure of the skew in the printed content printed by the single writing laser beam. In some examples, the measure of the skew of the first printed content portion 3610 and the second printed content portion 3612 is the same. However, in some examples, the scope of the disclosure is not limited to the first printed content portion 3610 and the second printed content portion 3612 having the same measure of the skew. In an example embodiment, the measure of the skew of the first printed content portion 3610 and the second printed content portion 3612 may vary based on a percentage of the content printed by the writing laser beams 3602*b* and 3602*c* as is further described in FIG. 36*c*.

Referring to FIG. 36*c*, the writing laser beam 3602*b* prints 25% of the content, while the writing laser beam 3602*c* prints 75% of the content. To this end, the writing laser beam 3602*b* sweeps 25% print media 104 width, while the writing laser beam 3602*c* sweeps 75% of the print media 104 width. The measure of skew in a portion of the printed content, in such an embodiment, is determined based on the following equation:

$$\text{Measure of skew} = \text{Tan}\left(\frac{\text{size of one dot}}{\begin{array}{c}\text{(width of the print media 104)}*\\ \text{percentage of print media}\\ \text{swept by the first laser beam}\end{array}}\right) \tag{6}$$

Accordingly, based on Equation 6, the skew of the first printed portion may be greater than the skew of the second printed portion.

Figure 37:
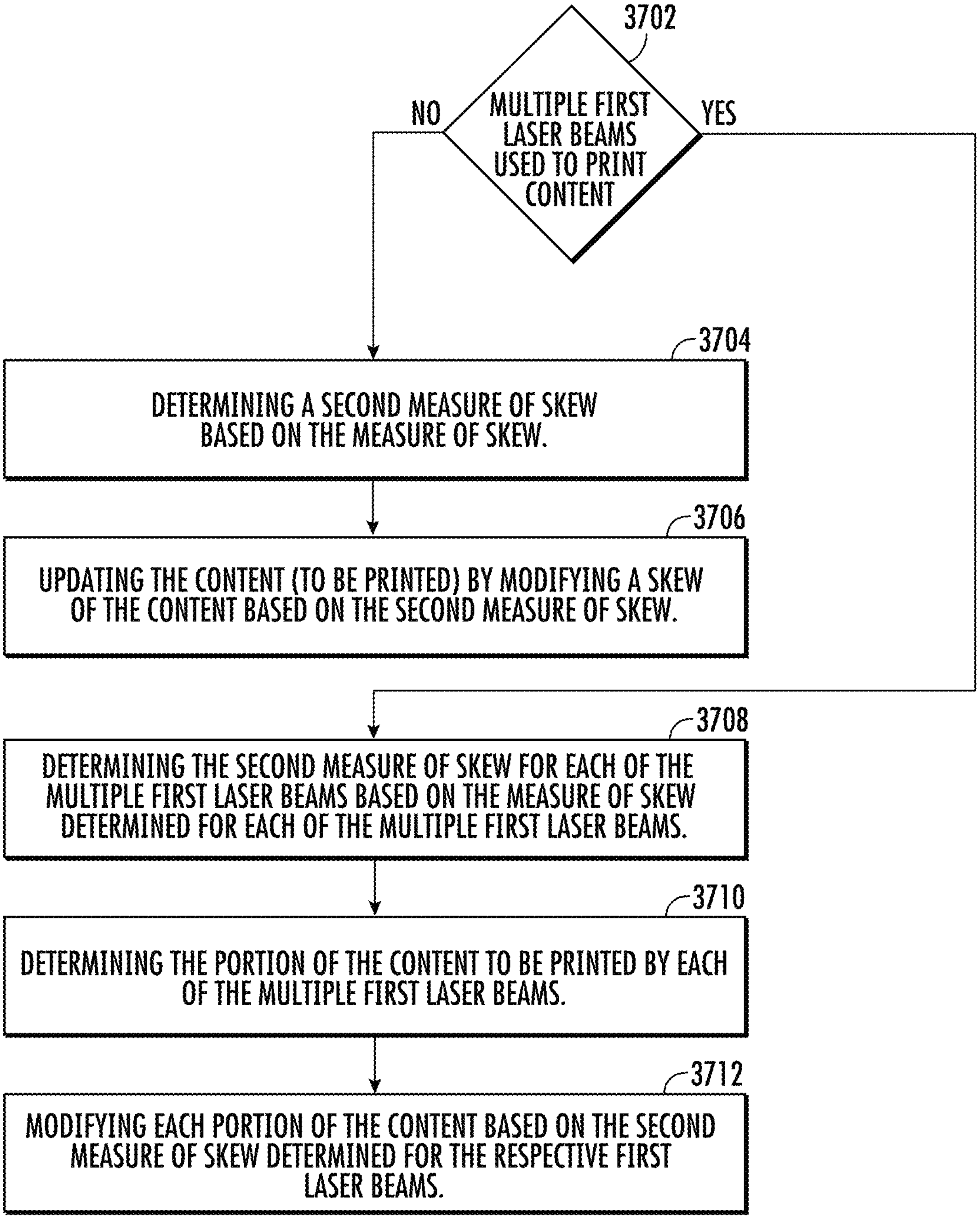
FIG. 37 illustrates a flowchart of a method for modifying the content prior to printing, according to one or more embodiments described herein.

FIG. 37 illustrates a flowchart 3700 of a method for modifying the content prior to printing, according to one or more embodiments described herein.

At step 3702, the printing apparatus 100 may include means such as, the control unit 138, the processor 2702, the I/O device interface unit 2706, the printing operation control unit 2716, the image processing unit 2718, and/or the like, for determining whether the multiple writing laser beams are to be used to print content based on the configuration setting of the printing apparatus 100 (determined in the step 3402).

If the image processing unit 2718 determines that a single writing laser beam is to be used to print content, the image processing unit 2718 may be configured to perform the step 3704. However, if the image processing unit 2718 determines that multiple writing laser beams are to be used to print content, such as because the content is of a certain size or requires a certain resolution, the image processing unit 2718 may be configured to perform the step 3708.

At step 3704, the printing apparatus 100 may include means such as, the control unit 138, the processor 2702, the I/O device interface unit 2706, the printing operation control unit 2716, the image processing unit 2718, and/or the like, for determining a second measure of the skew based on the measure of the skew determined in the step 3504. In an example embodiment, second measure of the skew is a negative value of the measure of the skew, as is depicted by the following mathematical relation:

$$\text{Second measure of skew} = -(\text{measure of skew}) \qquad (7)$$

At step 3706, the printing apparatus 100 may include means such as, the control unit 138, the processor 2702, the I/O device interface unit 2706, the printing operation control unit 2716, the image processing unit 2718, and/or the like, for updating the content (to be printed) by modifying a skew of the content based on the second measure of skew. In an example embodiment, the image processing unit 2718 may be configured to purposely add skew to the content (to be printed) such that printing of the skewed content generated printed content with zero degrees skew.

At step 3708, the printing apparatus 100 may include means such as, the control unit 138, the processor 2702, the I/O device interface unit 2706, the printing operation control unit 2716, the image processing unit 2718, and/or the like, for determining the second measure of skew for each of the multiple writing laser beams based on the measure of skew determined for each of the multiple writing laser beams. In an example embodiment, the image processing unit 2718 may be configured to utilize Equation 7 to determine the second measure of skew for each of the multiple writing laser beams.

At step 3710, the printing apparatus 100 may include means such as, the control unit 138, the processor 2702, the I/O device interface unit 2706, the printing operation control unit 2716, the image processing unit 2718, and/or the like, for determining the portion of the content to be printed by each of the multiple writing laser beams. For example, if the count of the writing laser beams is two and each of the two writing laser beams are configured to print the 50% of the content (along the width of the print media 104), the image processing unit 2718 may be configured to segment the content to be printed along the width of the print media 104 by a percentage of the content that each of the multiple writing laser beams have to print. Each segment of the content corresponds to the portion of the content.

At step 3712, the printing apparatus 100 may include means such as, the control unit 138, the processor 2702, the I/O device interface unit 2706, the printing operation control unit 2716, the image processing unit 2718, and/or the like, for modifying each portion of the content based on the second measure of skew determined for the respective writing laser beams. For example, the image processing unit 2718 may be configured to individually modify the skew of each portion of the content. For instance, the skew associated with one of the two writing laser beams is 0.5 degrees and the skew associated with the second of the two writing laser beams is 0.1 degrees. In such an embodiment, the image processing unit 2718 may be configured to modify the skew of the portion of the content, to be printed by first of the two writing laser beams, by −0.5 degrees. Further, the image processing unit 2718 may be configured to modify the skew of the portion of the content, to be printed by second of the two writing laser beams, by −0.1 degrees. In an example embodiment, the image processing unit 2718 may be configured to utilize known methods to modify the skew of the portion of the content. Some examples of the known methods may include, but are not limited to, coordinate transformation, coordinate rotation, and/or the like.

Figure 38A:
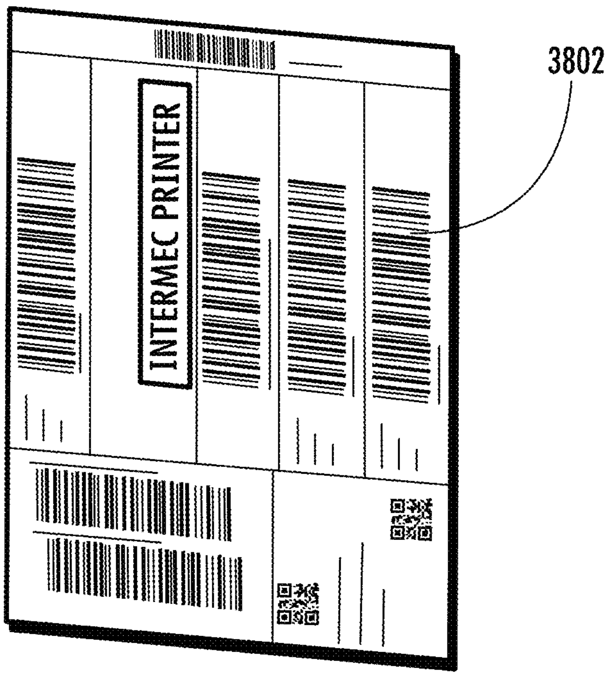
FIG. 38*a* illustrates an image of the modified content to be printed using a single writing laser beam, according to one or more embodiments described herein.
Figure 38B:
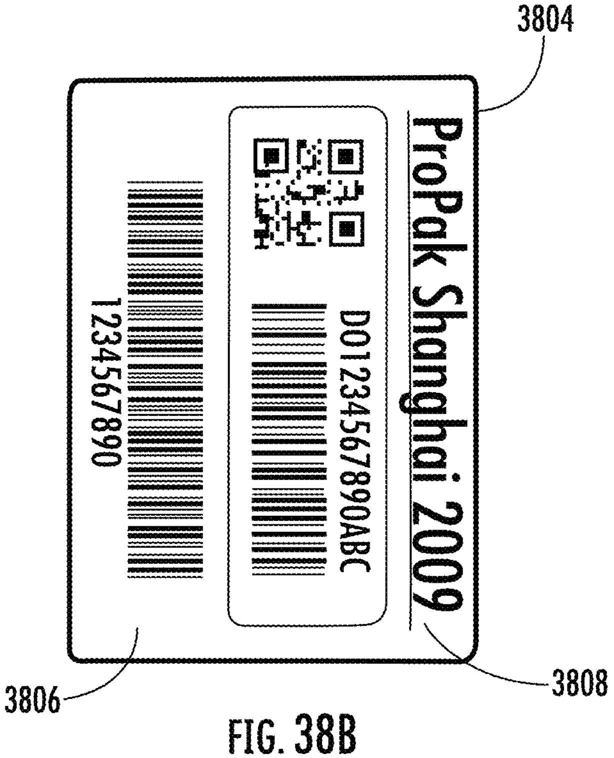
FIG. 38*b* illustrates an image of the modified content to be printed by multiple writing laser beams, according to one or more embodiments described herein.

FIG. 38*a* illustrates an image 3802 of the modified content to be printed using a single writing laser beam, according to one or more embodiments described herein. It can be observed that the modified content is skewed by an angle (determined based on the second measure of the skew). Further, FIG. 38*b* illustrates an image 3804 of the modified content to be printed by multiple writing laser beams, according to one or more embodiments described herein. It can be observed that the image 3804 of the modified content has a first portion 3806 and a second portion 3808. Both the first portion 3806 and the second portion 3808 are individually skewed (based on the second measure of skew associated with each of the multiple writing laser beams configured to print the first portion 3806 of the content and the second portion 3808 of the content).

Print Media Authentication

As described above, an example printing apparatus in accordance with example embodiments of the present disclosure may be "inkless" in that it may utilize laser interaction with laser reactive media on a print media to conduct printing instead of using ink. In order to ensure that the printing is conducted on the correct print media with the best print quality performance, it is necessary to determine and confirm that the print media loaded in the printing apparatus is a print media that is supported by the printing apparatus. For example, the printing apparatus may need to authenticate the print media to confirm that the print media is a genuine print media that is suitable for the printing apparatus and/or for inkless printing.

In some embodiments, a "watermark" (for example, in the form of a reactive coating) may be applied on print media that is supported by the printing apparatus. For example, as described above in connection with at least FIG. 25A, the protective layer 2506 (also referred to as a UV reactive layer) may include a UV dye. The UV dye may be configured to validate the authenticity of the print media. For example, the UV dye/UV reactive layer may comprise UV reactive coating (e.g. coated with UV reactive chemical). When the print media is illuminated with the UV radiation, the light may get reflected from the print media surface (for example, by the UV reactive layer).

In some embodiments, when the print media is loaded to a printing apparatus, the printing apparatus may authenticate the print media based on the light reflection from the print media. In response to determining that the print media is authenticated (e.g. the print media is supported by the printing apparatus), the printing apparatus may enable printing on the print media (for example, enable the print head of the printing apparatus). In response to determining that the print media is not authenticated (e.g. the print media is not supported by the printing apparatus), the printing apparatus may disable printing on the print media (for example, disable the print head of the printing apparatus).

In addition, example embodiments of the present disclosure may determine a type or category of print media (also referred to as "print media signature") to provide the best printing quality. For example, the print media signature may correspond to a type of the print media, whether the print media is intended for black and white printing, whether the print media is intended for greyscale printing, whether the print media is intended for color printing, and/or the like. In some embodiments, using a different type of UV reactive coatings (for example, every type of print media is coated with a unique UV coating), the printing apparatus is able to differentiate different print media signatures of print media loaded in the printing apparatus. Based on the print media signatures, the printing apparatus may set up the printing parameters automatically and without the need of user intervention.

As such, various example embodiments of the present disclosure may implement a UV light source (such as a UV LED source) and one or more light sensors (such as one or both of a UV light sensor and a Red-Green-Blue (RGB) sensor) to emit UV light on the print media, determine the luminescence level from the print media, and determine whether the print media loaded in the printing apparatus is supported by the printing apparatus, and/or a print media signature of the print media.

Figure 48:
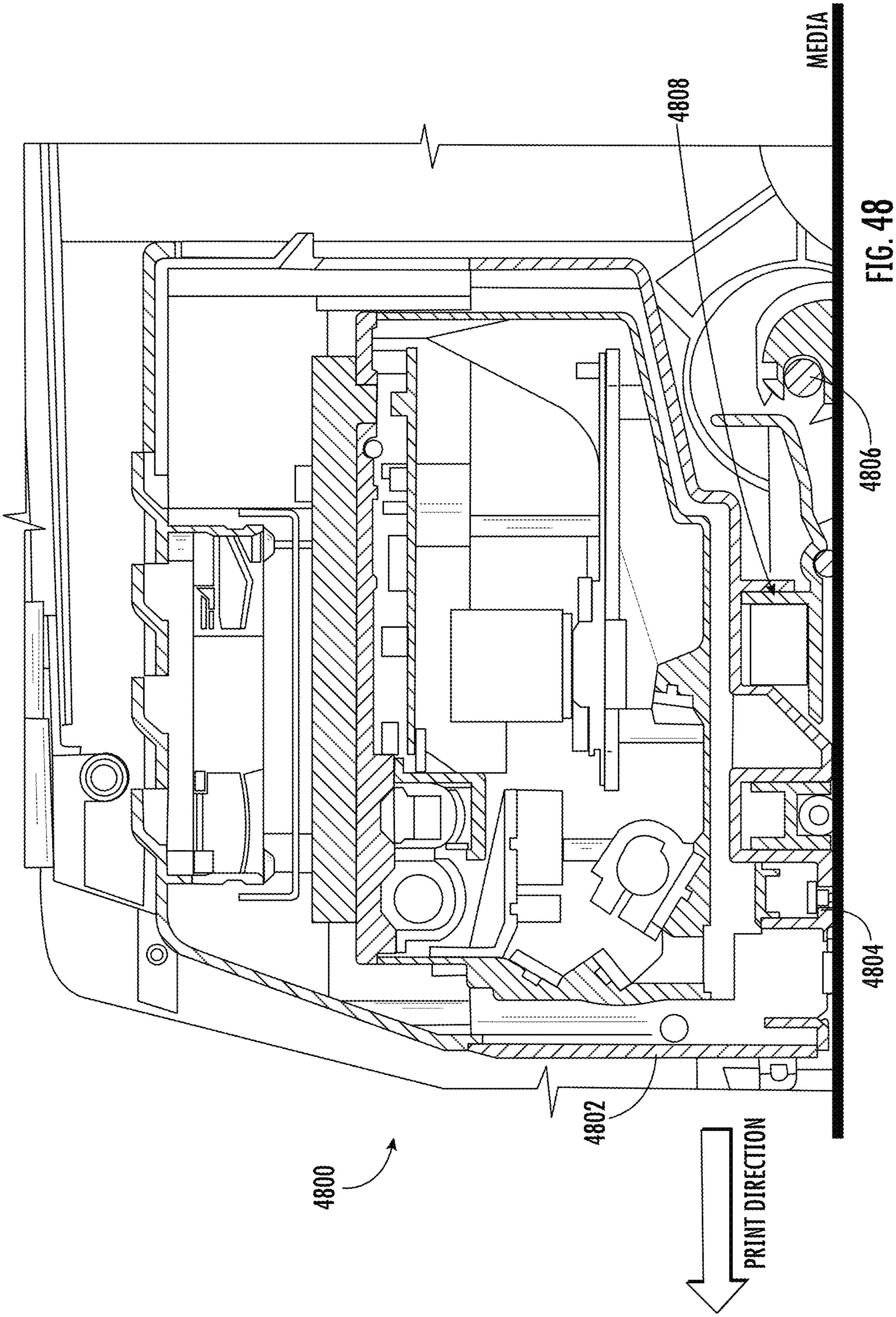
FIG. 48 illustrates an example view of a portion of an example printing apparatus according to one or more embodiments described herein.

Referring now to FIG. 48, an example view of a portion of an example printing apparatus 4800 according to one or more embodiments is illustrated.

For example, FIG. 48 illustrates an example top chassis portion 4802 of the example printing apparatus 4800. The top chassis portion 4802 is similar to various example top chassis portions illustrated and described above, including, but not limited to, the top chassis portion 126 illustrated and described above. For example, the top chassis portion 4802 may be configured to receive a print head engine 4804 that is configured to emit a laser beam onto the print media to conduct laser printing, similar to the example print head engine 122 illustrated and described above.

In some embodiments, the top chassis portion 4802 may house a media supply spindle 4806, similar to the media supply spindle 108 illustrated and described above. For example, the media supply spindle 4806 may receive a roll of print media, which may travel along a print direction during the printing process (as shown by the arrow in FIG. 48). As described above, the roll of print media may be supported by the example printing apparatus 4800 and is coated with a dedicated chemical that luminates when exposed to UV light.

Figure 49:
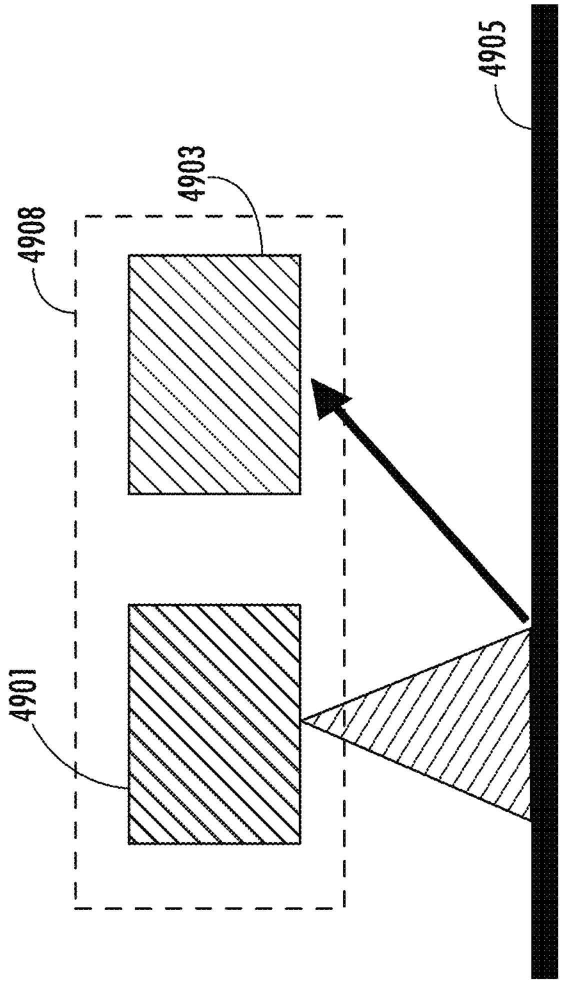
FIG. 49 illustrates an example block diagram illustrating some example components of an example printing apparatus according to one or more embodiments described herein.

In some embodiments, a print media authentication module 4808 is disposed on the top chassis portion. In some embodiments, the print media authentication module 4808 is disposed at a location along the print direction between the print head engine 4804 and the media supply spindle 4806. Referring now to FIG. 49, an example block diagram illustrating some example components of an example print media authentication module is illustrated.

In the example shown in FIG. 49, the print media authentication module may comprise a UV light source 4901 and a light sensor 4903. In some embodiments, the UV light source 4901 and the light sensor 4903 are electrically coupled to and secured on a circuit board. In some embodiments, the UV light source 4901 and the light sensor 4903 are electrically coupled to a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus). In some embodiments, the print media authentication module is disposed within the print head engine or the print head. As described herein, the print head engine or the print head may comprise a housing that prevents the laser from leaking out of the print head engine or the print head. As such, disposing the print media authentication module within the print head engine or the print head may prevent light disturbance from the local environment that may interfere with the print media authentication module. In some embodiments, the print media authentication module is located away from the media opening (where the print media exits the printing apparatus), therefore preventing ambient light from interfering with the UV light emitted by the print media authentication module. In some embodiments, the platen roller may block ambient light from interfering with the UV light emitted by the print media authentication module.

In some embodiments, the UV light source 4901 is configured to emit a UV light onto the print media 4905. For example, the UV light source 4901 may be in the form of, including but not limited to, a UV LED, a fluorescent lamp, and/or the like.

In some embodiments, if the print media 4905 comprises the UV reactive layer/coating, the print media 4905 may reflect the light from the UV light source 4901. The reflected light from the print media 4905 may be received by the light sensor 4903, which may in turn convert the light signal into a light intensity indication that indicates, including, but not limited to, a light intensity level.

In some embodiments, the light sensor 4903 may be an ambient light sensor. For example, the ambient light sensor may be configured to detect the light intensity of ambient light. In some embodiments, the light sensor 4903 may be a RGB sensor. For example, the RGB sensor may be configured to detect a light intensity of a red light from the ambient light, a light intensity of a green light from the ambient light, and a light intensity of a blue light from the ambient light. In some embodiments, the light sensor 4903 may be other type(s) of light sensor(s).

Figure 50:
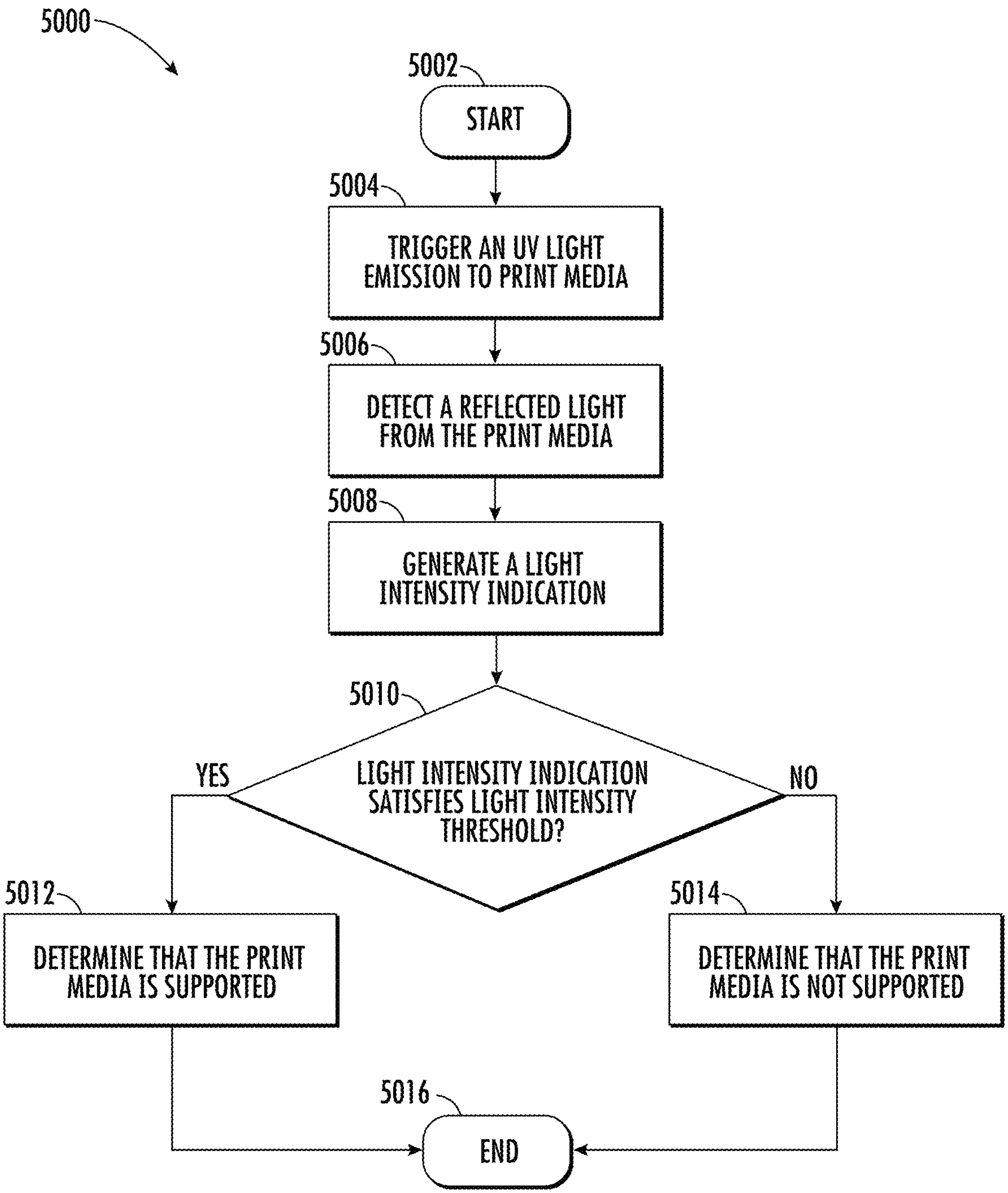
FIG. 50 is an example flow diagram illustrating example methods associated with determining whether a print media is supported by a printing apparatus according to one or more embodiments described herein.

Referring now to FIG. 50, an example method 5000 is illustrated. In particular, the example method 5000 illustrates example steps/operations of determining whether an example print media is supported by an example printing apparatus. For example, the example method 5000 illustrates determining whether a print media is supported based on whether the reflected light (for example, as detected by an ambient light sensor) satisfies a threshold.

In the example shown in FIG. 50, the example method 5000 starts at block 5002 and then proceeds to step/operation 5004. At step/operation 5004, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may trigger a UV light emission to print media.

For example, the processing circuitry may be electrically coupled to a UV light source. When the processing circuitry determines that a print media is loaded into the example printing apparatus and that the printing apparatus is in a closed state (for example, based on the signals from various sensors described above), the processing circuitry may transmit a signal to the UV light source, and the UV light source may emit a UV light onto the print media, similar to those described above in connection with FIG. 48 and FIG. 49.

Referring back to FIG. 50, subsequent to step/operation 5004, the method 5000 proceeds to step/operation 5006. At step/operation 5006, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may detect a reflected light from the print media.

In some embodiments, a light sensor (such as an ambient light sensor) may receive light that is reflected from the print media, and may convert it into an electrical signal proportional to the amount of light that the sensor received. For example, when a print media that is supported by the printing apparatus is loaded and exposed to UV light, a certain amount of light may be reflected from the print media, which may be received by the light sensor. The light sensor may convert the amount of light into an electrical signal (for example, in the form of a given voltage).

Referring back to FIG. 50, subsequent to step/operation 5006, the method 5000 proceeds to step/operation 5008. At step/operation 5008, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a light intensity indication.

For example, the light sensor and/or the processing circuitry may convert the electrical signal (for example, in the form of a given voltage) into an electronic indication that corresponds to the intensity of the light received by the light sensor. For example, the light sensor and/or the processing circuitry may conduct one or more signal functions, such as, but not limited to, signal conditioning, signal amplifying, analog-to-digital converting, and/or the like, to generate the light intensity indication based on the electrical signal.

Referring back to FIG. 50, subsequent to step/operation 5008, the method 5000 proceeds to step/operation 5010. At step/operation 5010, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine whether the light intensity indication satisfies light intensity threshold.

In some embodiments, the light intensity threshold may correspond to a light intensity level of reflected light that is received by the light sensor and from a print media that is supported by the printing apparatus. In some embodiments, the light intensity threshold may be determined based on the amount of chemical coating in the UV reactive layer of print media that is supported by the printing apparatus.

If, at step/operation 5010, the processing circuitry determines that the light intensity indication satisfies the light intensity threshold, the method 5000 proceeds to step/operation 5012. At step/operation 5012, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine that the print media is supported by the printing apparatus.

Figure 51:
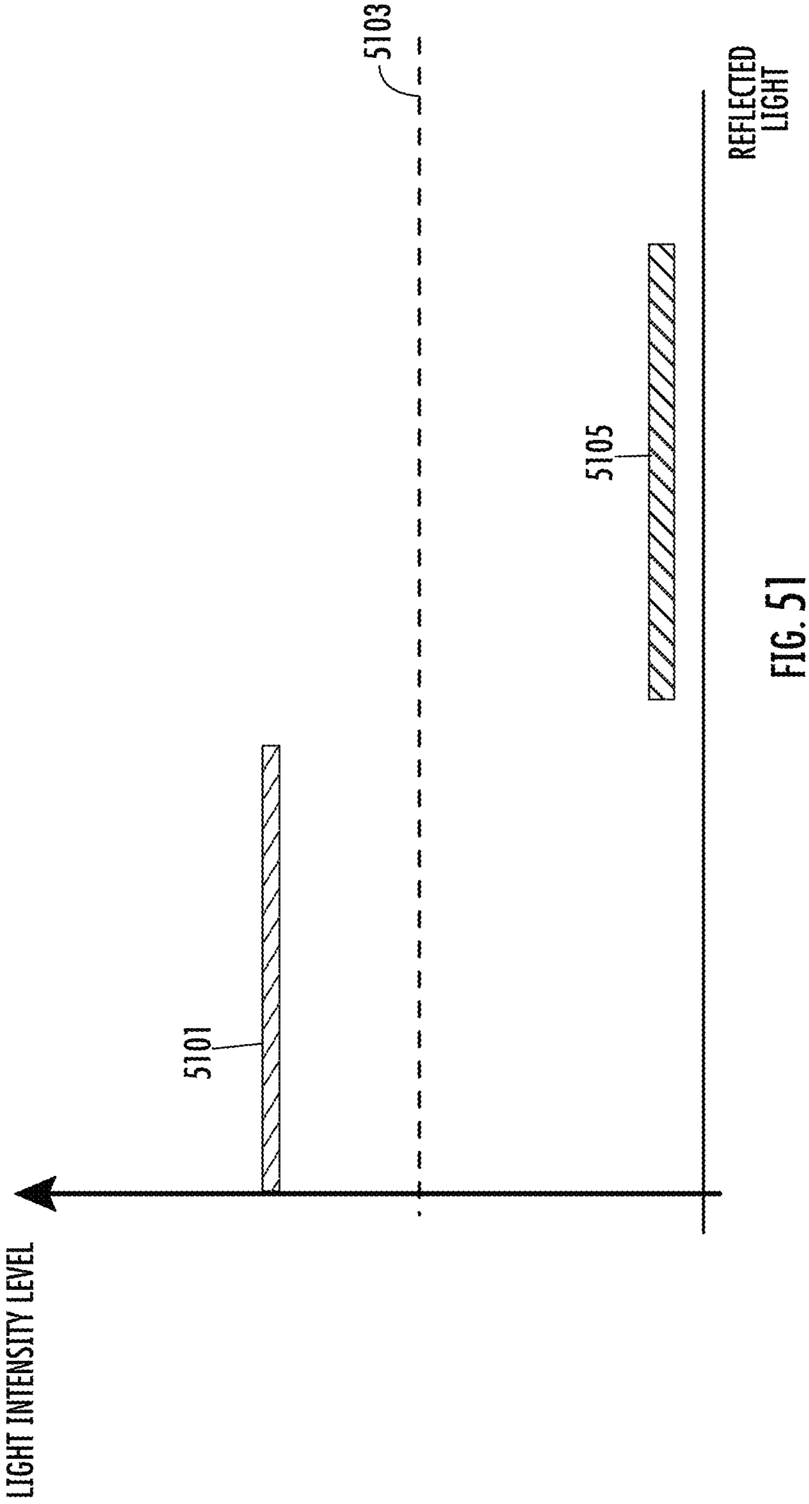
FIG. 51 illustrates an example chart showing example light intensity indications according to one or more embodiments described herein.

For example, referring now to the example shown in FIG. 51, the light intensity indication 5101 satisfies the light intensity threshold 5103. In this example, the processing circuitry determines that the print media corresponding to the light intensity indication 5101 is supported by the printing apparatus. In this example, the printing apparatus may enable all operations on the print media.

Referring back to FIG. 50, if, at step/operation 5010, the processing circuitry determines that the light intensity indication does not satisfy the light intensity threshold, the method 5000 proceeds to step/operation 5014. At step/operation 5014, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine that the print media is not supported by the printing apparatus.

In some embodiments, when a non-supported print media is loaded, due to the lack of (or insufficient) UV reactive coating, the non-supported print media may not reflect light to the light sensor, or may reflect light having less intensity than light that is reflected by a supported print media.

For example, referring now to the example shown in FIG. 51, the light intensity indication 5105 does not satisfy the light intensity threshold 5103. In this example, the processing circuitry determines that the print media corresponding to the light intensity indication 5105 is not supported by the printing apparatus. In this example, the printing apparatus may prevent all operation on the print media and may further show an alert message on a display associated with the printing apparatus, indicating that a non-supported print media is loaded.

Referring back to FIG. 50, subsequent to step/operation 5012 and/or step/operation 5014, the method 5000 proceeds to block 5016 and ends.

Figure 52:
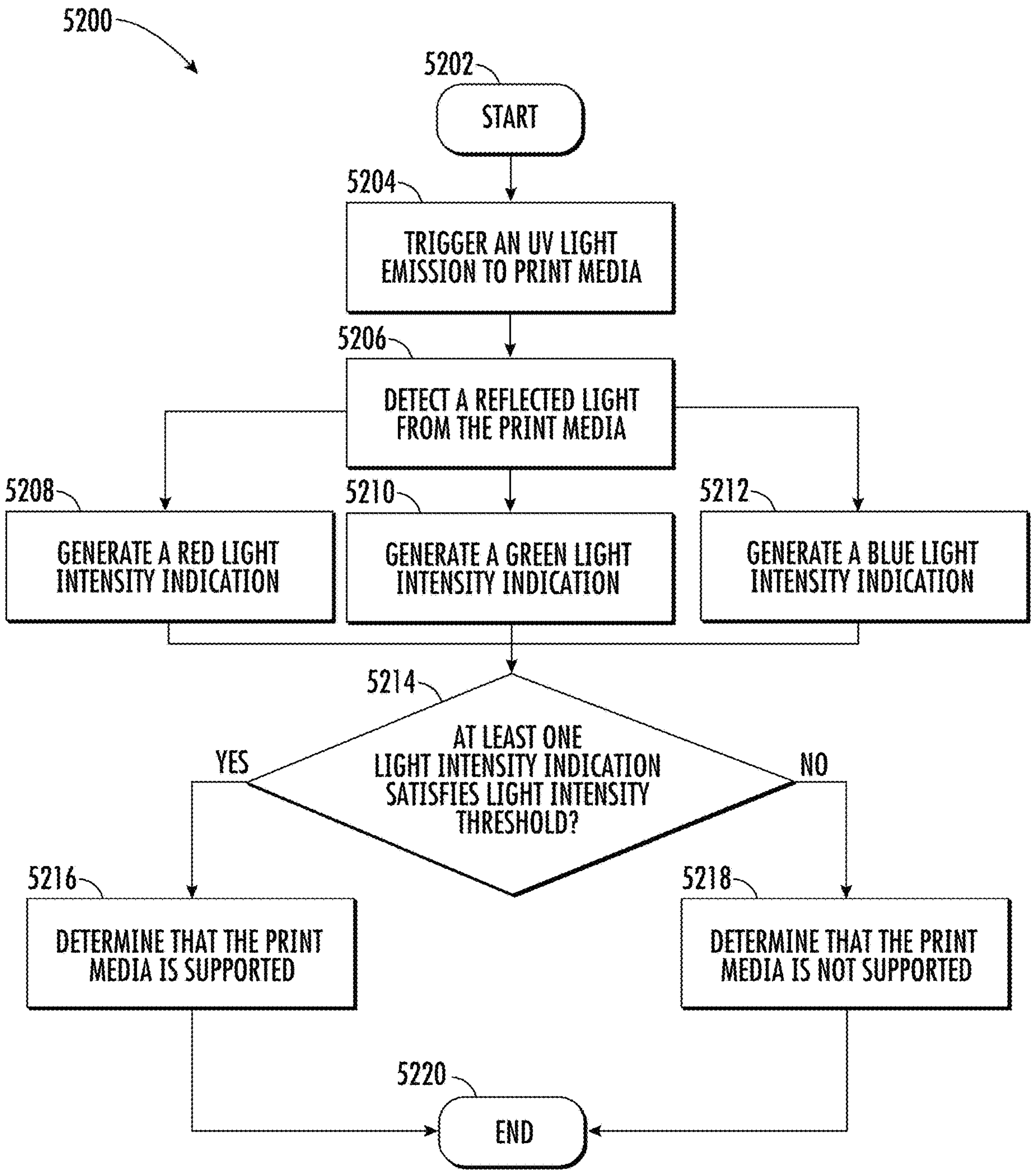
FIG. 52 is an example flow diagram illustrating example methods associated with determining whether a print media is supported by a printing apparatus according to one or more embodiments described herein.

Referring now to FIG. 52, an example method 5200 is illustrated. In particular, the example method 5200 illustrates example steps/operations of determining whether an example print media is supported by an example printing apparatus. For example, the example method 5200 illustrates determining whether a print media is supported based on whether at least one of the reflected red lights, the reflected green lights, or the reflected blue lights (for example, as detected by an ambient light sensor) satisfies a threshold.

In the example shown in FIG. 52, the example method 5200 starts at block 5202 and then proceeds to step/operation 5204. At step/operation 5204, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may trigger a UV light emission to print media.

For example, the processing circuitry may be electrically coupled to a UV light source. When the processing circuitry determines that a print media is loaded into the example printing apparatus and that the printing apparatus is in a closed state (for example, based on the signals from various sensors described above), the processing circuitry may transmit a signal to the UV light source, and the UV light source may emit a UV light onto the print media, similar to those described above in connection with FIG. 48 and FIG. 49.

Referring back to FIG. 52, subsequent to step/operation 5204, the method 5200 proceeds to step/operation 5206. At step/operation 5206, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may detect a reflected light from the print media.

In some embodiments, a light sensor (such as an RGB sensor) may receive light that is reflected from the print media. For example, when a print media that is supported by the printing apparatus is loaded and exposed to UV light, a certain amount of red light, green light, and/or blue light may be reflected from the print media, which may be received by the light sensor. The light sensor may convert the amount of red light, the amount of green light, and the amount of blue light into electrical signals (for example, in the form of given voltages).

Referring back to FIG. 52, subsequent to step/operation 5206, the method 5200 proceeds to step/operation 5208. At step/operation 5208, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a red light intensity indication.

For example, the light sensor may determine an amount of red light from the light detected at step/operation 5206, and may generate an electrical signal (for example, in the form of a given voltage) indicating the amount of red light. Additionally, in some embodiments, the processing circuitry may convert the electrical signal (for example, in the form of a given voltage) into an electronic indication that corresponds to the intensity of the red light received by the light sensor. For example, the light sensor and/or the processing circuitry may conduct one or more signal functions, such as, but not limited to, signal conditioning, signal amplifying, analog-to-digital converting, and/or the like, to generate the red light intensity indication based on the electrical signal.

Referring back to FIG. 52, subsequent to step/operation 5206, the method 5200 proceeds to step/operation 5210. At step/operation 5210, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a green light intensity indication.

For example, the light sensor may determine an amount of green light from the light detected at step/operation 5206, and may generate an electrical signal (for example, in the form of a given voltage) indicating the amount of green light. Additionally, in some embodiments, the processing circuitry may convert the electrical signal (for example, in the form of a given voltage) into an electronic indication that corresponds to the intensity of the green light received by the light sensor. For example, the light sensor and/or the processing circuitry may conduct one or more signal functions, such as, but not limited to, signal conditioning, signal amplifying, analog-to-digital converting, and/or the like, to generate the green light intensity indication based on the electrical signal.

Referring back to FIG. 52, subsequent to step/operation 5206, the method 5200 proceeds to step/operation 5212. At step/operation 5212, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a blue light intensity indication.

For example, the light sensor may determine an amount of blue light from the light detected at step/operation 5206, and may generate an electrical signal (for example, in the form of a given voltage) indicating the amount of blue light. Additionally, in some embodiments, the processing circuitry may convert the electrical signal (for example, in the form of a given voltage) into an electronic indication that corresponds to the intensity of the blue light received by the light sensor. For example, the light sensor and/or the processing circuitry may conduct one or more signal functions, such as, but not limited to, signal conditioning, signal amplifying, analog-to-digital converting, and/or the like, to generate the blue light intensity indication based on the electrical signal.

Referring back to FIG. 52, subsequent to step/operation 5208, step/operation 5210, and step/operation 5212, the method 5200 proceeds to step/operation 5214. At step/operation 5214, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine whether at least one of the red light intensity indication, the green light intensity indication, or the blue light intensity indication satisfies a light intensity threshold.

In some embodiments, the light intensity threshold may correspond to a light intensity level of reflected red light, reflected green light, and/or reflected blue light that is/are received by the light sensor and from a print media that is supported by the printing apparatus. In some embodiments, the light intensity threshold may be determined based on the amount of chemical coating in the UV reactive layer of print media that is supported by the printing apparatus.

If, at step/operation 5214, the processing circuitry determines that at least one light intensity indication satisfies the light intensity threshold, the method 5200 proceeds to step/operation 5216. At step/operation 5216, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine that the print media is supported by the printing apparatus.

In some embodiments, when a supported print media is loaded, the light intensity of the reflected light to the light sensor may satisfy the light intensity threshold, as the light intensity threshold may be set based on light that would be reflected if a supported print media is loaded.

Figure 53:
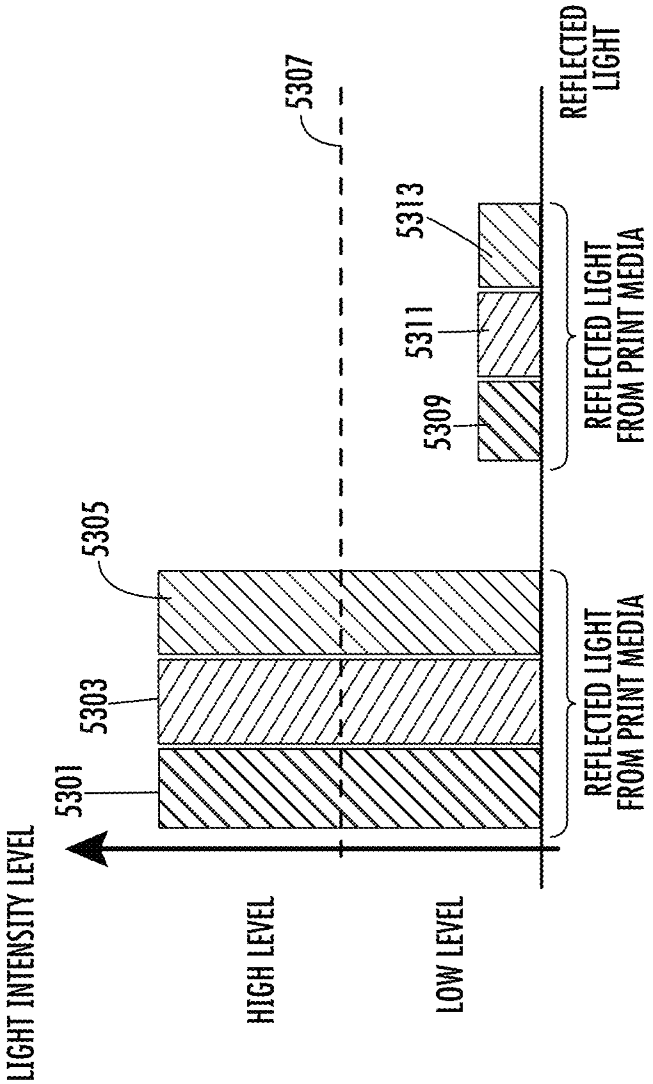
FIG. 53 illustrates an example chart showing example light intensity indications according to one or more embodiments described herein.

For example, referring now to the example shown in FIG. 53, the red light intensity indication 5301, the green light intensity indication 5303, and the blue light intensity indication 5305 all satisfy the light intensity threshold 5307. In this example, the processing circuitry determines that the print media corresponding to the red light intensity indication 5301, the green light intensity indication 5303, and the blue light intensity indication 5305 is supported by the printing apparatus. In this example, the printing apparatus may allow all operations on the print media.

If, at step/operation 5214, the processing circuitry determines that none of the light intensity indications satisfy the light intensity threshold, the method 5200 proceeds to step/operation 5218. At step/operation 5218, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine that the print media is not supported by the printing apparatus.

In some embodiments, when a non-supported print media is loaded, due to the lack of (or insufficient) UV reactive coating, the non-supported print media may not reflect light to the light sensor, or may reflect red light, green light, and blue light that all have less intensity than light that is reflected by a supported print media.

For example, referring now to the example shown in FIG. 51, the red light intensity indication 5309, the green light intensity indication 5311, and the blue light intensity indication 5313 all fail to satisfy the light intensity threshold 5307. In this example, the processing circuitry determines that the print media corresponding to the red light intensity indication 5309, the green light intensity indication 5311, and the blue light intensity indication 5313 is not supported by the printing apparatus. In this example, the printing apparatus may prevent all operation on the print media and may further show an alert message on a display associated with the printing apparatus, indicating that a non-supported print media is loaded.

Referring back to FIG. 52, subsequent to step/operation 5216 and/or step/operation 5218, the method 5200 proceeds to block 5220 and ends.

Figure 54:
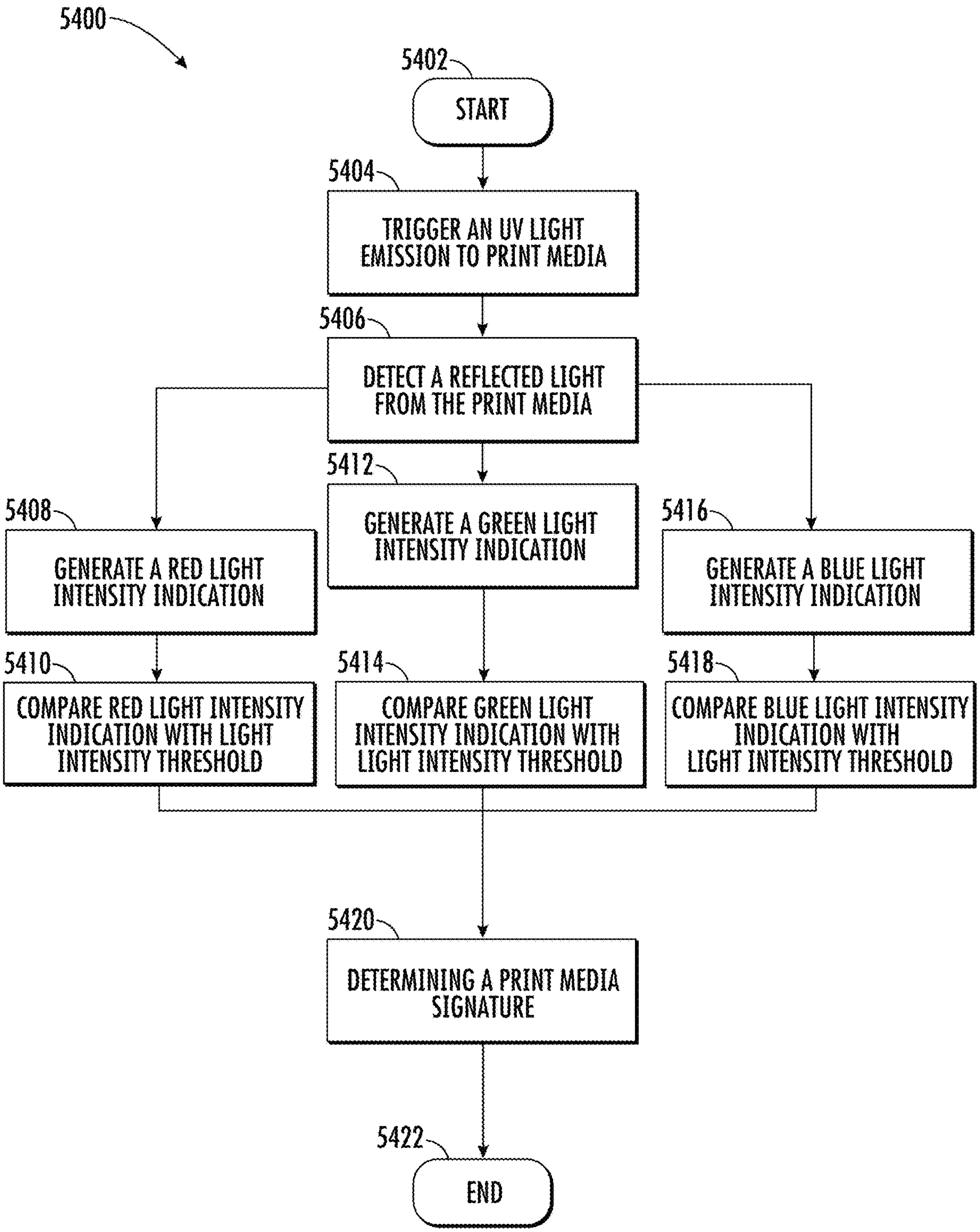
FIG. 54 is an example flow diagram illustrating example methods associated with determining a print media signature according to one or more embodiments described herein.

Referring now to FIG. 54, an example method 5400 is illustrated. In particular, the example method 5400 illustrates example steps/operations of determining the print media signature of an example print media associated with an example printing apparatus.

In the example shown in FIG. 54, the example method 5400 starts at block 5402 and then proceeds to step/operation 5404. At step/operation 5404, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may trigger a UV light emission to print media, similar to those described above in connection with at least step/operation 5204 of FIG. 52.

Referring back to FIG. 54, subsequent to step/operation 5404, the method 5400 proceeds to step/operation 5406. At step/operation 5406, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may detect a reflected light from the print media, similar to those described above in connection with at least step/operation 5206 of FIG. 52.

Referring back to FIG. 54, subsequent to step/operation 5406, the method 5400 proceeds to step/operation 5408. At step/operation 5408, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a red light intensity indication, similar to step/operation 5208 described above in connection with at least step/operation 5208 of FIG. 52.

Referring back to FIG. 54, subsequent to step/operation 5408, the method 5400 proceeds to step/operation 5410. At step/operation 5410, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the red light intensity indication with a light intensity threshold, and determine whether the red light intensity indication satisfies the light intensity threshold, similar to those described above in connection with at least step/operation 5214 of FIG. 52.

Referring back to FIG. 54, subsequent to step/operation 5406, the method 5400 proceeds to step/operation 5412. At step/operation 5414, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a green light intensity indication, similar to step/operation 5210 described above in connection with at least FIG. 52.

Referring back to FIG. 54, subsequent to step/operation 5412, the method 5400 proceeds to step/operation 5414. At step/operation 5414, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the green light intensity indication with a light intensity threshold, and determine whether the green light intensity indication satisfies the light intensity threshold, similar to those described above in connection with at least step/operation 5214 of FIG. 52.

Referring back to FIG. 54, subsequent to step/operation 5406, the method 5400 proceeds to step/operation 5416. At step/operation 5416, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a blue light intensity indication, similar to step/operation 5212 described above in connection with at least FIG. 52.

Referring back to FIG. 54, subsequent to step/operation 5416, the method 5400 proceeds to step/operation 5418. At step/operation 5418, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the blue light intensity indication with a light intensity threshold, and determine whether the blue light intensity indication satisfies the light intensity threshold, similar to those described above in connection with at least step/operation 5214 of FIG. 52.

Referring back to FIG. 54, subsequent to step/operation 5410, step/operation 5414, and step/operation 5418, the method 5400 proceeds to step/operation 5420. At step/operation 5420, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine a print media signature based on the red light intensity indication, the green light intensity indication, and the blue light intensity indication.

For example, an example printing apparatus may associate a print media signature of a print media whether its red light intensity indication satisfies the light intensity threshold, whether its green light intensity indication satisfies the light intensity threshold, and whether its blue light intensity indication satisfies the light intensity threshold. The printing apparatus may store such information on a data look-up table, and the processing circuitry may retrieve the data look-up table to determine the print media signature of a particular print media loaded in the example printing apparatus.

Figure 55:
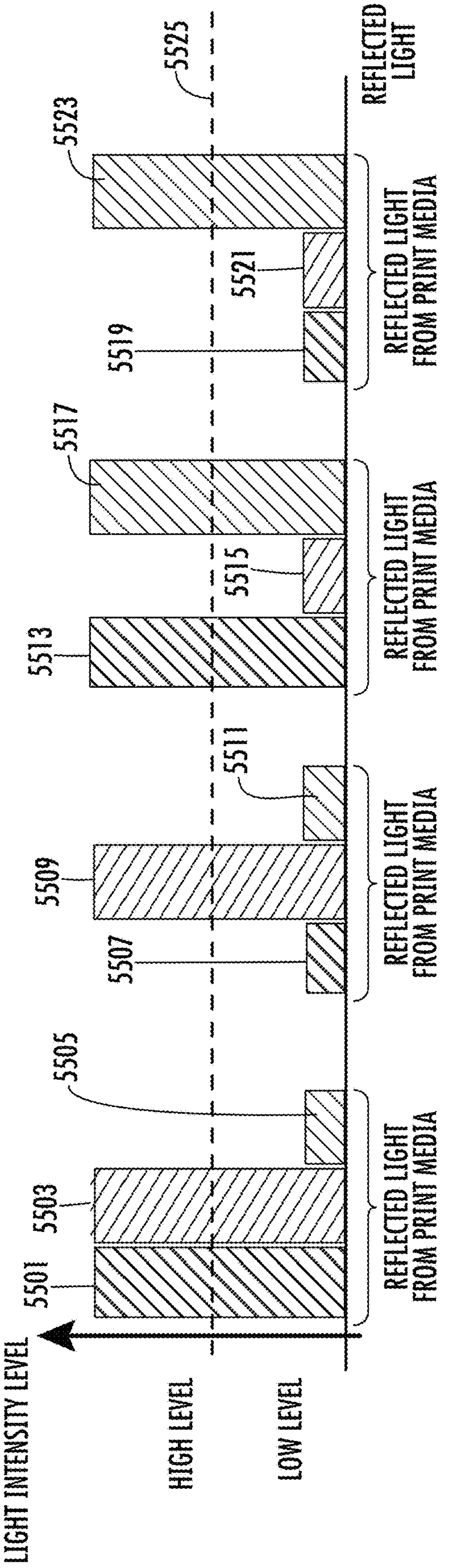
FIG. 55 illustrates an example chart showing example light intensity indications according to one or more embodiments described herein.

Referring now to the example shown in FIG. 55, the red light intensity indication 5501, the green light intensity indication 5503, and the blue light intensity indication 5505 may be associated with a print media loaded in a printing apparatus. As shown, the red light intensity indication 5501 satisfies the light intensity threshold 5525 (e.g. a high level of red light), the green light intensity indication 5503 satisfies the light intensity threshold 5525 (e.g. a high level of green light), and the blue light intensity indication 5505 does not satisfy the light intensity threshold 5525 (e.g. a low level of blue light). The processing circuitry may determine a print media signature from the data look-up table that corresponds to a high level of red light, a high level of green light, and a low level of blue light, and may determine that the print media is associated with this print media signature.

As another example, the red light intensity indication 5507, the green light intensity indication 5509, and the blue light intensity indication 5511 may be associated with a print media loaded in a printing apparatus. As shown, the red light intensity indication 5507 does not satisfy the light intensity threshold 5525 (e.g. a low level of red light), the green light intensity indication 5509 satisfies the light intensity threshold 5525 (e.g. a high level of green light), and the blue light intensity indication 5511 does not satisfy the light intensity threshold 5525 (e.g. a low level of blue light). The processing circuitry may determine a print media signature from the data look-up table that corresponds to a low level of red light, a high level of green light, and a low level of blue light, and may determine that the print media is associated with this print media signature.

As another example, the red light intensity indication 5513, the green light intensity indication 5515, and the blue light intensity indication 5517 may be associated with a print media loaded in a printing apparatus. As shown, the red light intensity indication 5513 satisfies the light intensity threshold 5525 (e.g. a high level of red light), the green light intensity indication 5509 does not satisfy the light intensity threshold 5525 (e.g. a low level of green light), and the blue light intensity indication 5517 satisfies the light intensity threshold 5525 (e.g. a high level of blue light). The processing circuitry may determine a print media signature from the data look-up table that corresponds to a high level of red light, a low level of green light, and a high level of blue light, and may determine that the print media is associated with this print media signature.

As another example, the red light intensity indication 5519, the green light intensity indication 5521, and the blue light intensity indication 5523 may be associated with a print media loaded in a printing apparatus. As shown, the red light intensity indication 5519 does not satisfy the light intensity threshold 5525 (e.g. a low level of red light), the green light intensity indication 5521 does not satisfy the light intensity threshold 5525 (e.g. a low level of green light), and the blue light intensity indication 5523 satisfies the light intensity threshold 5525 (e.g. a high level of blue light). The processing circuitry may determine a print media signature from the data look-up table that corresponds to a low level of red light, a low level of green light, and a high level of blue light, and may determine that the print media is associated with this print media signature.

In some embodiments, based on the print media signature, the printing apparatus may adjust the setting and parameters, such as darkness, contrast, speed, black and white, greyscale, color printing and/or other. For example, the print media signature may not only indicate whether the print media is for color printing, black and white printing, or grayscale printing, but can also indicate how much power is needed to make proper marks on the print media. In such an example, based on the print media signature, the printing apparatus may adjust power level and dwelling duration, such that the output provides better print quality (e.g. clearer text, higher grade barcodes, etc.).

Referring back to FIG. 54, subsequent to step/operation 5420, the method 5400 proceeds to block 5422 and ends.

Figure 56:
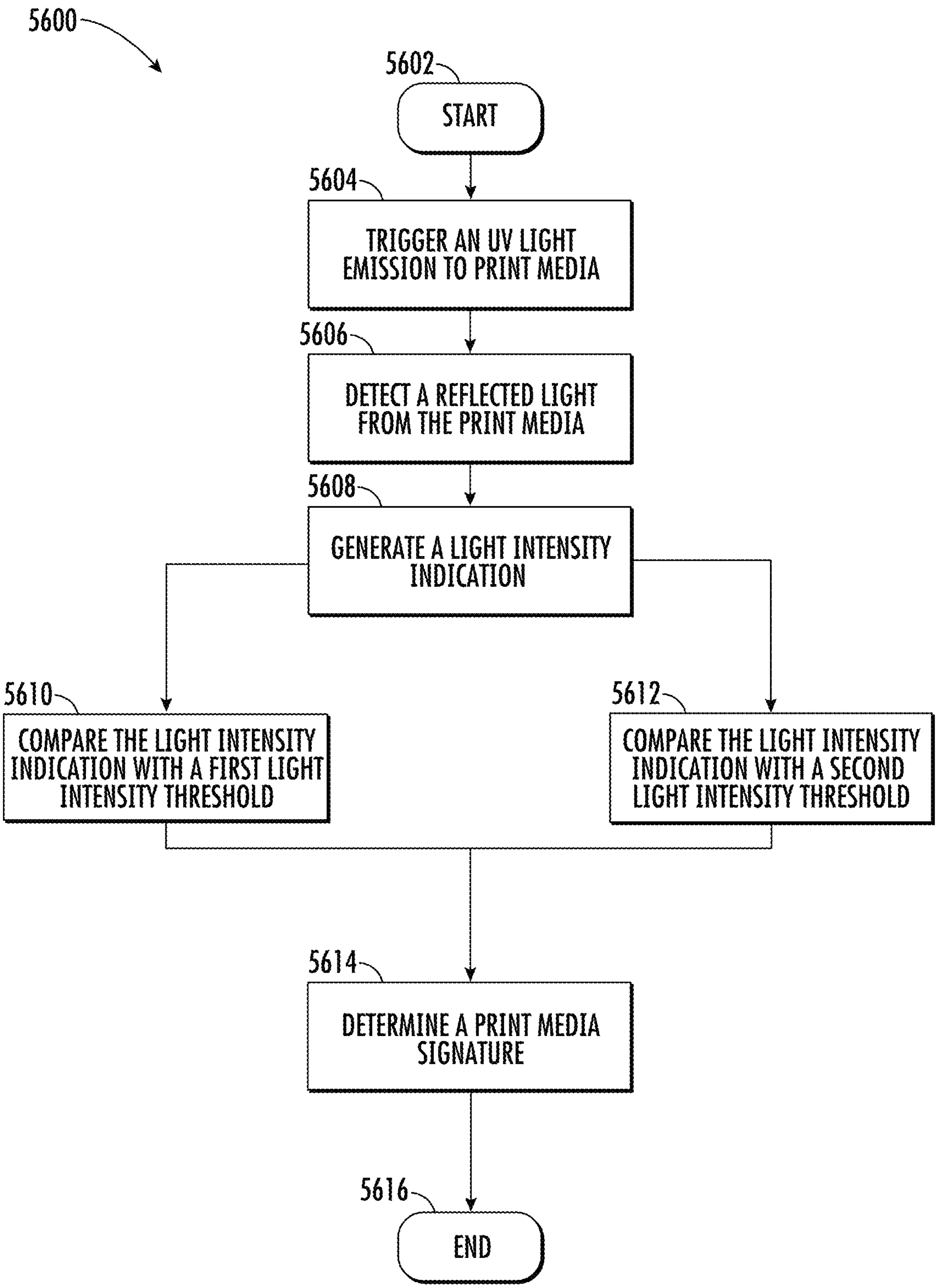
FIG. 56 is an example flow diagram illustrating example methods associated with determining a print media signature according to one or more embodiments described herein.

Referring now to FIG. 56, an example method 5600 is illustrated. In particular, the example method 5600 illustrates example steps/operations of determining the print media signature of an example print media associated with an example printing apparatus. In particular, the example method 5600 illustrates determining print media signature based on one or more light intensity thresholds.

In the example shown in FIG. 56, the example method 5600 starts at block 5602 and then proceeds to step/operation 5604. At step/operation 5604, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may trigger a UV light emission to print media, similar to those described in connection with at least step/operation 5004 of FIG. 50.

Referring back to FIG. 56, subsequent to step/operation 5604, the method 5600 proceeds to step/operation 5606. At step/operation 5606, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may detect a reflected light from the print media, similar to those described above in connection with at least step/operation 5006 of FIG. 50.

Referring back to FIG. 56, subsequent to step/operation 5606, the method 5600 proceeds to step/operation 5608. At step/operation 5608, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may generate a light intensity indication, similar to those described above in connection with step/operation 5008 of FIG. 50.

Referring back to FIG. 56, subsequent to step/operation 5608, the method 5600 proceeds to step/operation 5610. At step/operation 5610, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the light intensity indication with a first light intensity threshold, similar to those described above in connection with step/operation 5010 of FIG. 50.

Referring back to FIG. 56, subsequent to step/operation 5608, the method 5600 proceeds to step/operation 5612. At step/operation 5612, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the light intensity indication with a second light intensity threshold, similar to those described above in connection with step/operation 5010 of FIG. 50.

Referring back to FIG. 56, subsequent to step/operation 5610 and step/operation 5612, the method 5600 proceeds to step/operation 5614. At step/operation 5614, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine a print media signature based at least in part on the light intensity indication, the first light intensity threshold, and the second light intensity threshold.

Figure 57:
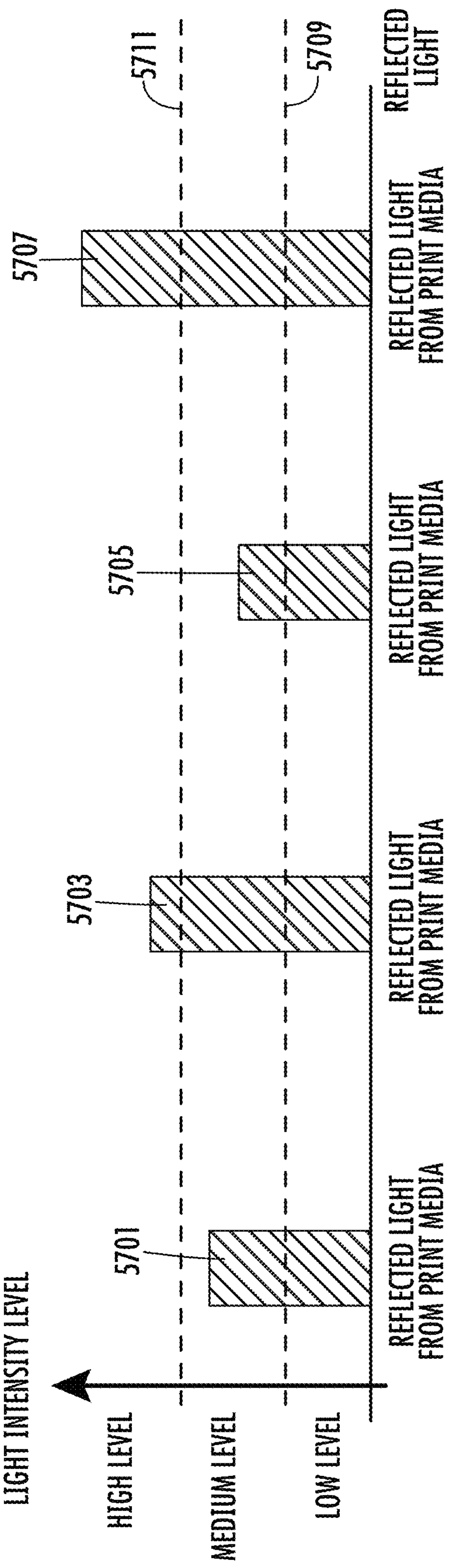
FIG. 57 illustrates an example chart showing example light intensity indications according to one or more embodiments described herein.

For example, referring now to FIG. 57, the processing circuitry may determine that the first light intensity indication 5701 and the third light intensity indication 5705 (for example, determined by an ambient light sensor described here) are at a medium level (e.g. between the threshold 5709 and threshold 5711), and may determine that the print media corresponding to the first light intensity indication 5701 and the print media corresponding to the third light intensity indication 5705 have a print media signature that corresponds to a medium level light intensity. The processing circuitry may determine that the second light intensity indication 5703 and the fourth light intensity indication 5707 are at a high level (e.g. above the threshold 5711), and may determine that the print media corresponding to the second light intensity indication 5703 and the print media corresponding to the fourth light intensity indication 5707 have a print media signature that corresponds to a high level light intensity.

Figure 58:
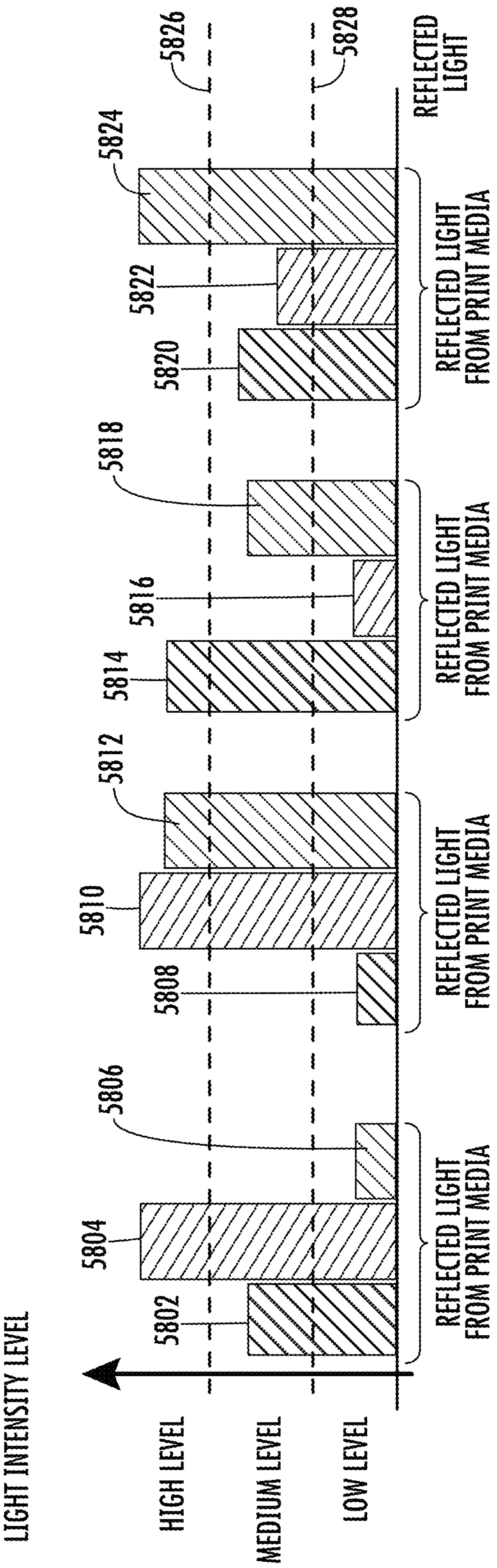
FIG. 58 illustrates an example chart showing example light intensity indications according to one or more embodiments described herein.

As another example, referring now to FIG. 58, the red light intensity indication 5802, the green light intensity indication 5804, and the blue light intensity indication 5806 may be associated with a print media loaded in a printing apparatus. As shown, the red light intensity indication 5802 is at a medium level (e.g. between the threshold 5828 and the threshold 5826), the green light intensity indication 5804 is at a high level (e.g. above the threshold 5826), and the blue light intensity indication 5806 is at a low level (e.g. below the threshold 5828). The processing circuitry may determine a print media signature from the data look-up table that corresponds to a medium level of red light, a high level of green light, and a low level of blue light, and may determine that the print media is associated with this print media signature.

As anther example, the red light intensity indication 5808, the green light intensity indication 5810, and the blue light intensity indication 5812 may be associated with a print media loaded in a printing apparatus. As shown, the red light intensity indication 5808 is at a low level, the green light intensity indication 5810 is at a high level, and the blue light intensity indication 5812 is at a high level. The processing circuitry may determine a print media signature from the data look-up table that corresponds to a low level of red light, a high level of green light, and a high level of blue light, and may determine that the print media is associated with this print media signature.

As another example, the red light intensity indication 5814, the green light intensity indication 5816, and the blue light intensity indication 5818 may be associated with a print media loaded in a printing apparatus. As shown, the red light intensity indication 5814 is at a high level, the green light intensity indication 5816 is at a low level, and the blue light intensity indication 5818 is at a medium level. The processing circuitry may determine a print media signature from the data look-up table that corresponds to a high level of red light, a medium level of green light, and a medium level of blue light, and may determine that the print media is associated with this print media signature.

As another example, the red light intensity indication 5820, the green light intensity indication 5822, and the blue light intensity indication 5824 may be associated with a print media loaded in a printing apparatus. As shown, the red light intensity indication 5820 is at a medium level, the green light intensity indication 5822 is at a medium level, and the blue light intensity indication 5824 is at a high level. The processing circuitry may determine a print media signature from the data look-up table that corresponds to a medium level of red light, a medium level of green light, and a high level of blue light, and may determine that the print media is associated with this print media signature.

In some embodiments, the number of print media signatures that can be identified increases as the number of threshold increases. For example, while a RGB sensor with one threshold could only detect 7 possible print media signatures, a RGB sensor with two thresholds (e.g. three different levels) can detect 26 print media signatures. With fourth level of intensity, 63 print media signatures are supported. In some embodiments, the number of print media signatures that can be detected may be calculated based on the following formula:

$$\text{Number of print media signatures} = \Sigma_{R=0}{}^{1}\Sigma_{G=D}{}^{1}\Sigma_{B=0}{}^{1}(\text{number of level}-1)^{(R+G+B)}+1$$

In the above formula, R stands for Red light, G stands for Green light, and B stands for Blue light. R, G, B take the value of 0 or 1. The mathematic symbol "$\Sigma_{R=0}{}^{1}$" means that the sum is calculated. The number below is the starting point, and the one on the top is the ending point. For example, the sum for R=0 is calculated, and then R=1. The formula is used to calculate how many media types can be supported for different media level if three R, G, B component are used. As an example, if number of level equals to 3, if all three component of R, G, B are used, the number of media types supported can be calculated as:

$$
\begin{aligned}
R = \; & 01G = 01B = 013 - 1R + G + B - 1 \\
= \; & 20 + 0 + 0 + 20 + 0 + 1 + 20 + 1 + 0 + 20 + 1 + 1 + \\
& 21 + 0 + 0 + 21 + 0 + 1 + 21 + 1 + 0 + 21 + 1 + 1 - 1 \\
= \; & 20 + 21 + 21 + 22 + 21 + 22 + 22 + 23 - 1 = \\
& 1 + 2 + 2 + 4 + 2 + 4 + 4 + 8 - 1 = \\
& 26 \text{ possible media types supported.}
\end{aligned}
$$

Referring back to FIG. 56, subsequent to step/operation 5614, the method 5600 proceeds to block 5616 and ends.

As such, by introducing a UV reactive coating in the media and paired with a UV LED and sensor, various embodiments of the present disclosure may detect if a supported print media is loaded in the printing apparatus (the printing apparatus may only allow supported print media for printing). Additionally, based on the coating type, various embodiments of the present disclosure may detect various media signatures, which are used to detect the print media signatures loaded in the printing apparatus. Based on the print media signature, the system may automatically adjust its settings to ensure the best print quality will be available.

Print Safety Protection

As described above, various embodiments of the present disclosure may implement a laser to print texts, images, barcodes, and the like on print media. For example, an example printing apparatus in accordance with examples of the present disclosure may include a print head engine that is configured to emit a laser beam onto the print media during the printing process.

In some embodiments, an example print media may comprise a printable area and a non-printable area. As an example, an example print media may be in the form of an example label that is carried by an example label liner (also referred to as “label backing”). In such an example, the example label may correspond to a printable area, and the example label liner may correspond to a non-printable area. In some embodiments, the example label may be positioned along a center line of the label liner and on a top surface of the label liner. As such, a center portion of the example print media may comprise the example label, while an outer portion (or the “edge”) of the print media may comprise the example label liner.

In some embodiments, the example label is attached to the example label liner through an adhesive material. In some embodiments, the example label and the example label liner may travel together within the example printing apparatus and under the print head engine of the example printing apparatus. In some embodiments, the example label liner may serve as a carrier sheet for the example label in the example printing apparatus. After texts, images, barcodes, and/or the like are printed on the example label, the example label may be detached from the example label liner and applied onto a surface of packaging, box, carton, product, and/or the like.

When applying a laser beam in laser printing, safety is always a concern. For example, a laser beam not handled properly may accidently be in direct or indirect contact with a human (for example, a user of the laser printer), and may produce serious injuries to the human (such as burned cornea, blindness, burned skin, and/or laceration).

Continuing from the example related to label and label liner, while the example label may not reflect a laser beam from its surface, the example label liner may comprise material and/or coating that may reflect the laser beam. When a laser beam is accidently directed to the example label liner, the example label liner may reflect and/or redirect the laser beam, which can cause a safety hazard. As such, there is a need to prevent the laser beam from traveling toward the edge of the print media.

Various embodiments of present disclosure may provide example apparatus, systems, and methods to detect the edge position of a print media within a printing apparatus and/or adjust the printing apparatus when it is detected that a laser travel path associated with the printing apparatus overlaps or extends from the edge portion of the print media. As such, various embodiments of the present disclosure may guide and guard the laser beam emitted from the print head engine to ensure that the laser beam is directed only to the printable area of the print media, and may present a safety hazard due to laser printing outside the edge of the print media.

Figure 59A:
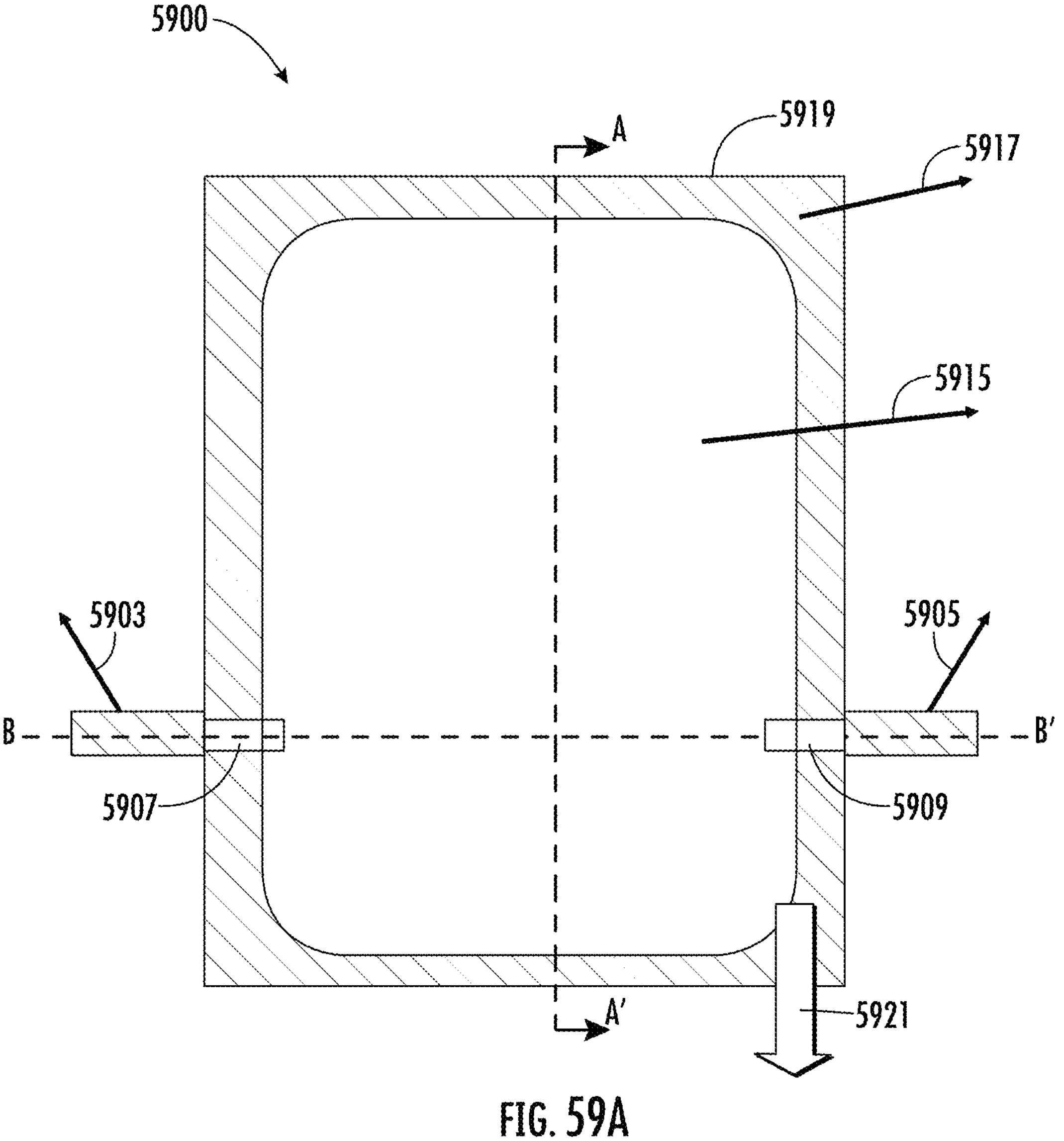
FIG. 59A illustrates an example top view of a portion of an example printing apparatus according to one or more embodiments described herein.
Figure 59B:
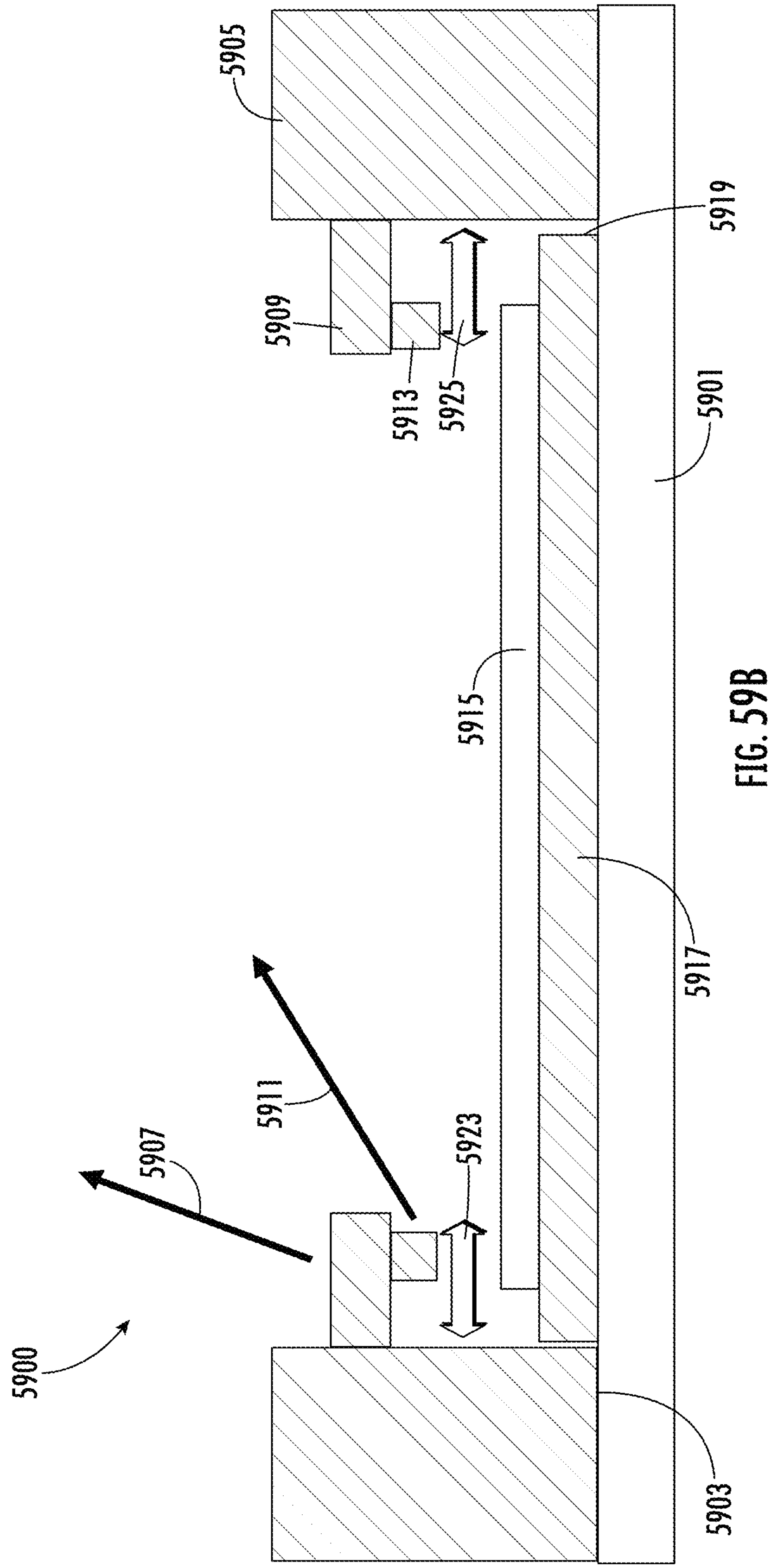
FIG. 59B illustrates an example side view of a portion of an example printing apparatus according to one or more embodiments described herein.

Referring now to FIG. 59A and FIG. 59B, an example portion of an example printing apparatus 5900 in accordance with various embodiments of the present disclosure is illustrated. In particular, FIG. 59A illustrates an example top view of the example portion of the example printing apparatus 5900. FIG. 59B illustrates an example cross-sectional view of the example printing apparatus 5900 along the cut line A-A' and viewing in the direction of the arrows in FIG. 59A.

In the example shown in FIG. 59A, an example section associated with an example bottom chassis portion of the example printing apparatus 5900 is illustrated. In this example, a print media 5919 may travel on the bottom chassis portion. The print media 5919 may travel along a media path at the travel direction 5921.

The print media 5919 may comprise a printable portion 5915 and a non-printable portion 5917. For example, the printable portion 5915 may correspond to the label portion described above, while the non-printable portion 5917 may correspond to the label liner portion described above. In the example shown in FIG. 59A, the printable portion 5915 may correspond to a center portion of the print media 5919 while the non-printable portion 5917 may correspond to an edge portion of the print media 5919.

As described above, when a laser beam is emitted to a non-printable portion 5917 of the print media, the laser beam may be reflected from the non-printable portion 5917, causing safety hazards. As such, it is important to detect the edge position of the print media so as to prevent the laser beam from being emitted to the non-printable portion 5917.

Referring now to FIG. 59B, an example cross-sectional view is provided. In the example shown in FIG. 59B, an example media guard bar 5903 and an example media guard bar 5905 may be disposed on a top surface 5901 of the example bottom chassis portion. In some embodiments, one of the media guard bars may be fixed on the top surface 5901, while the other of the media guard bars may be moveable on the top surface 5901. For example, the position of the media guard bar 5903 may be fixed on the top surface 5901, while the position of the media guard bar 5905 may be adjustable. In some embodiments, the print media 5919 travels between the example media guard bar 5903 and the example media guard bar 5905. In some embodiments, the fixed media guard bar (for example, the media guard bar 5903) may be aligned at the starting position of the print media, while the position of the adjustable media guard bar (for example, the media guard bar 5905) may be adjusted based on the width of the print media. In some embodiments, the central axis B-B' of the media guard bar 5903 and the media guard bar 5905, as shown in FIG. 59A, is in a perpendicular arrangement with the travel direction 5921 of the print media 5919. In some embodiments, the central axis B-B' of the media guard bar 5903 and the media guard bar 5905, as shown in FIG. 59A, is in a parallel arrangement with the laser printing direction, as described above.

Continuing with reference to the example shown in FIG. 59B, an example media sensor holding bar 5907 may be disposed on a surface of the example media guard bar 5903. For example, the example media sensor holding bar 5907 may be disposed on the side surface that faces the print media 5919 and may be positioned above the print media 5919. In some embodiments, a central axis of the example media sensor holding bar 5907 may be in a perpendicular arrangement with the central axis of the example media guard bar 5903.

Similarly, an example media sensor holding bar 5909 may be disposed on a surface of the example media guard bar 5905. For example, the example media sensor holding bar 5909 may be disposed on the side surface that faces the print media 5919 and may be positioned above the print media 5919. In some embodiments, a central axis of the example media sensor holding bar 5909 may be in a perpendicular arrangement with the central axis of the example media guard bar 5905.

Continuing with reference to the example shown in FIG. 59B, an example media sensor 5911 may be disposed on a surface of the example media sensor holding bar 5907. For example, the example media sensor 5911 may be disposed on a bottom surface of the example media sensor holding bar 5907 facing the example print media 5919. In some embodiments, the example media sensor 5911 may be configured to emit a first ultraviolet (UV) light on the print media 5919 and may detect a level of light reflected from the print media 5919. In some embodiments, the media sensor 5911 may be configured to detect the UV reactive coating on the print media, similar to those described above.

Similarly, an example media sensor 5913 may be disposed on a surface of the example media sensor holding bar 5909. For example, the example media sensor 5913 may be disposed on a bottom surface of the example media sensor holding bar 5909 facing the example print media 5919. In some embodiments, the example media sensor 5913 may be configured to emit a first ultraviolet (UV) light on the print media 5919 and may detect a level of light reflected from the print media 5919. In some embodiments, the media sensor 5913 may be configured to detect the UV reactive coating on the print media, similar to those described above.

In some embodiments, each of the example media sensors may be moveable along the bottom surface of the media sensor holding bar. For example, the example media sensor 5911 may be attached to a sliding guard that travels along a sliding rail disposed on the bottom surface of the media sensor holding bar 5907. In some embodiments, the movement of the media sensor 5911 may be controlled by a motor, and the media sensor 5911 may travel in the direction 5923 that is in a perpendicular arrangement with the travel direction of the print media 5919. Similarly, the example media sensor 5913 may be attached to a sliding guard that travels along a sliding rail disposed on the bottom surface of the media sensor holding bar 5909. In some embodiments, the movement of the media sensor 5913 may be controlled by a motor, and the media sensor 5913 may travel in the directions 5925 that is in a perpendicular arrangement with the travel direction 5921 of the print media 5919.

In some embodiments, as the print media 5919 travels along the travel direction 5921, the example media sensor 5911 and the example media sensor 5913 may move along its respective path to detect the edge positions of the print media 5919 and are determined. For example, the example media sensor 5911 is configured to detect a first media edge of the print media 5919 based on the first reflected light from the print media 5919, and the example media sensor 5913 is configured to detect a second media edge of the print media 5919 based on the second reflected light from the print media 5919. Additional details associated with determining the media edges are described in connection with at least FIG. 60.

Figure 60:
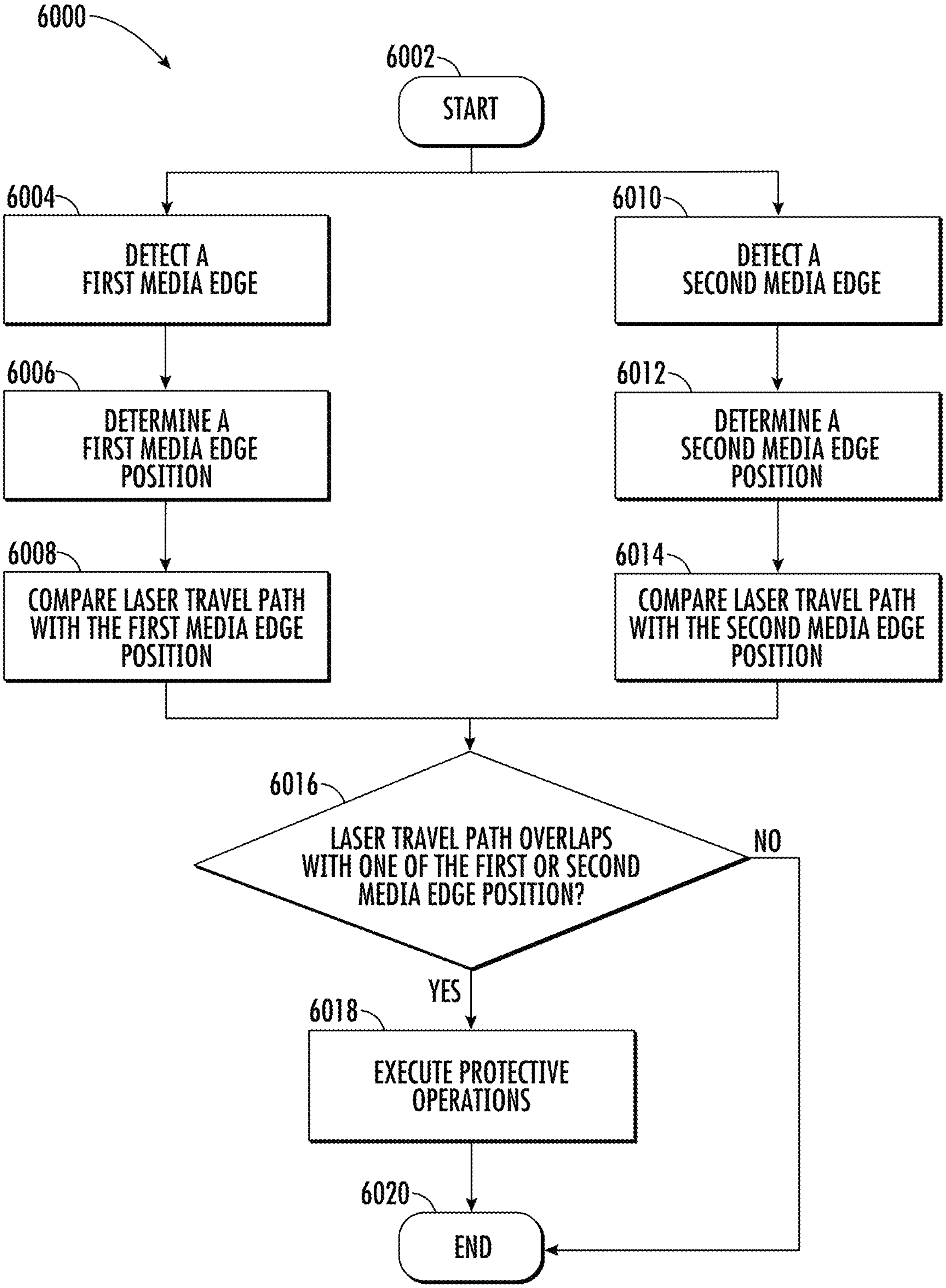
FIG. 60 is an example flow diagram illustrating example methods according to one or more embodiments described herein.

Referring now to FIG. 60, an example method 6000 is illustrated. In particular, the example method 6000 illustrates example steps/operations of determining the edge positions of an example print media associated with an example printing apparatus.

In the example shown in FIG. 60, the example method 6000 starts at block 6002 and then proceeds to step/operation 6004. At step/operation 6004, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may detect a first media edge of a print media.

In some embodiments, the processing circuitry may be electrically coupled to a media sensor, such as, but not limited to, the example media sensor 5911 described above in connection with FIG. 59A and FIG. 59B. In some embodiments, the processing circuitry may trigger the media sensor to emit a UV light onto the print media, and the media sensor may detect the amount of light reflected from the print media. In some embodiments, the amount of light reflected from a printable portion of the print media (for example, a center portion of the print media such as an example label) may be different from (for example, less than or more than) the amount of light reflected from a non-printable portion of the print media (for example, an edge portion of the print media such as an example label liner).

In some embodiments, the processing circuitry may trigger the example media sensor to continuously move on the bottom surface of its corresponding media sensor holding bar until the amount of reflected light received by the example media sensor corresponds to the amount of reflected light from a non-printable portion of the print media. Once the amount of reflected light received by the example media sensor corresponds to the amount of reflected light from a non-printable portion, the media sensor may detect the first media edge of the print media.

Referring back to FIG. 60, subsequent to step/operation 6004, the method 5600 proceeds to step/operation 6006. At step/operation 6006, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine a first media edge position.

In some embodiments, based on the length that the media sensor traveled until detecting the first media edge, the processing circuitry may determine a corresponding position of the first media edge.

For example, the media sensor 5911 described above in connection with FIG. 59A and FIG. 59B may start at a position (0, 0, 0) and travel 5 millimeters horizontally and away from the print media until the edge is detected. In this example, the processing circuitry determines that that first edge of the print media is at (−5 mm, 0, 0).

Referring back to FIG. 60, subsequent to step/operation 6006, the method 6000 proceeds to step/operation 6008. At step/operation 6008, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the laser travel path with the first media edge position to determine whether the laser travel path overlaps with the first media edge position.

As described above, the laser travel path of an example laser beam may begin from a print head engine and end on the surface print media. As an example, the laser travel path may begin at position (−5 mm, 0, 5 mm) and end at position (−5 mm, 0, 0). In this example, the laser travel path may overlap with the edge position (−5 mm, 0, 0). As another example, the laser travel path may begin at position (3 mm, 5 mm, 5 mm) and end at position (3 mm, 5 mm, 0). In this example, the laser travel path does not overlap with the edge position (−5 mm, 0, 0).

Referring back to FIG. 60, subsequent to block 6002, the method 6000 proceeds to step/operation 6010. At step/operation 6010, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may detect a second media edge of a print media.

In some embodiments, the processing circuitry may be electrically coupled to a media sensor, such as, but not limited to, the example media sensor 5913 described above in connection with FIG. 59A and FIG. 59B. In some embodiments, the processing circuitry may trigger the media sensor to emit a UV light onto the print media, and the media sensor may detect the amount of light reflected from the print media. As described above, the amount of light reflected from a printable portion of the print media (for example, a center portion of the print media such as an example label) may be different from the amount of light reflected from a non-printable portion of the print media (for example, an edge portion of the print media such as an example label liner).

In some embodiments, the processing circuitry may trigger the example media sensor to continuously move on the bottom surface of its corresponding media sensor holding bar until the amount of reflected light received by the example media sensor corresponds to the amount of reflected light from a non-printable portion of the print media. Once the amount of reflected light received by the example media sensor corresponds to the amount of reflected light from a non-printable portion, the media sensor may detect the second media edge of the print media.

Referring back to FIG. 60, subsequent to step/operation 6010, the method 6000 proceeds to step/operation 6012. At step/operation 6012, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine a second media edge position.

In some embodiments, based on the length that the media sensor traveled until detecting the second media edge, the processing circuitry may determine a corresponding position of the second media edge.

For example, the media sensor 5913 described above in connection with FIG. 59A and FIG. 59B may start at a position (0, 0, 0) and travel 5 millimeters on the horizontal plane and away from the print media until the edge is detected. In this example, the processing circuitry determines that that second edge of the print media is at (5 mm, 0, 0).

Referring back to FIG. 60, subsequent to step/operation 6012, the method 6000 proceeds to step/operation 6014. At step/operation 6014, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may compare the laser travel path with the second media edge position to determine whether the laser travel path overlaps with the second media edge position.

As described above, the laser travel path of an example laser beam may begin from a print head engine and ends on the surface print media. As an example, the laser travel path may begin at position (5 mm, 0, 5 mm) and end at position (5 mm, 0, 0). In this example, the laser travel path may overlap with the edge position (5 mm, 0, 0). As another example, the laser travel path may begin at position (3 mm, 5 mm, 5 mm) and end at position (3 mm, 5 mm, 0). In this example, the laser travel path does not overlap with the edge position (5 mm, 0, 0).

Referring back to FIG. 60, subsequent to step/operation 6008 and step/operation 6014, the method 6000 proceeds to step/operation 6016. At step/operation 6016, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may determine whether a laser travel path associated with a laser subsystem of the printing apparatus overlaps with at least one of the first media edge positions or the second media edge positions.

If, at step/operation 6016, the processing circuitry determines that the laser travel path overlaps with one of the first media edge positions or the second media edge positions, the method 6000 proceeds to step/operation 6018. At step/operation 6018, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may execute protective operations.

In some embodiments, the processing circuitry may cause the laser subsystem to be turned off.

Referring back to FIG. 60, subsequent to step/operation 6018, the method 6000 proceeds to block 6020 and ends.

If, at step/operation 6016, the processing circuitry determines that the laser travel path does not overlap with any one of the first media edge positions or the second media edge positions, the method 6000 proceeds to block 6020 and ends.

Print Media Height Limiter

As described above, various embodiments of the present disclosure may provide an example printing apparatus that utilizes laser technology for printing. In order to achieve the desired print quality and throughput, there is a need to manage and/or control the print media that is provided to the example printing apparatus. In particular, different types of print media may have different characteristics and requirements associated with laser printing, and/or corresponding method(s) of addressing issues in the example printing apparatus.

For example, certain types of print media may easily be curled-up and/or buckled during the processing circuitry (especially when the print media is near the end of the print media roll), which reduces the flatness of the print media and the quality of laser printing. As such, controlling the flatness of the print media during laser printing can be one of the key challenges.

As described above, an example printing apparatus may comprise a top chassis portion and a bottom chassis portion. In some embodiments, the print head engine may be mounted on the bottom surface of the top chassis portion, and the print media may travel on the top surface of the bottom chassis portion.

In some embodiments, the top chassis portion and the bottom chassis portion may be coupled through a latch. In some embodiments, the bottom chassis portion may be designed with a downward opening mechanism (for example, pivotally rotating around the central axis of the latch). In some embodiments, the distance tolerance between bottom surface of the top chassis portion and the top surface of the bottom chassis portion may be higher than the +/−0.05-millimeter maximum toleration that enables optimum printing quality. In some embodiments, a large gap may occur between the bottom surface of the top chassis portion and the top surface of the bottom chassis portion, which may impact the laser focal option and affect the print quality. In some embodiments, a narrow gap (or no gap) may occur between the bottom surface of the top chassis portion and the top surface of the bottom chassis portion, which may cause jamming of the print media.

Various embodiments of the present disclosure may overcome the above-referenced technical challenges. For example, various example embodiments of the present disclosure may achieve good and desirable print quality through proper media management that controls the media flatness for various media sizes and types. For example, an example height limiter panel and an example height limiter groove can be integrated within the printing apparatus and provide for raster mode printing. Various embodiments of the present disclosure may achieve the controlled media flatness without creating unnecessary media flow (or movement) disruption or causing potential risks of media curl-up (buckle) that may lead to media jam inside the printing apparatus. Additionally, or alternatively, an example biasing mechanism comprising a spring element may eliminate and/or reduce the tolerance of the distance between the top surface of the bottom chassis portion and the bottom surface of the top chassis portion. Additionally, or alternatively, example rib elements in accordance with examples of the present disclosure may control the distance between the top surface of the bottom chassis portion and the bottom surface of the top chassis portion. As such, various embodiments of the present disclosure may achieve the desired distance between the top surface of the bottom chassis portion and the bottom surface of the top chassis portion of 0.4 mm with a tolerance of +/−0.05 mm.

Figure 61A:
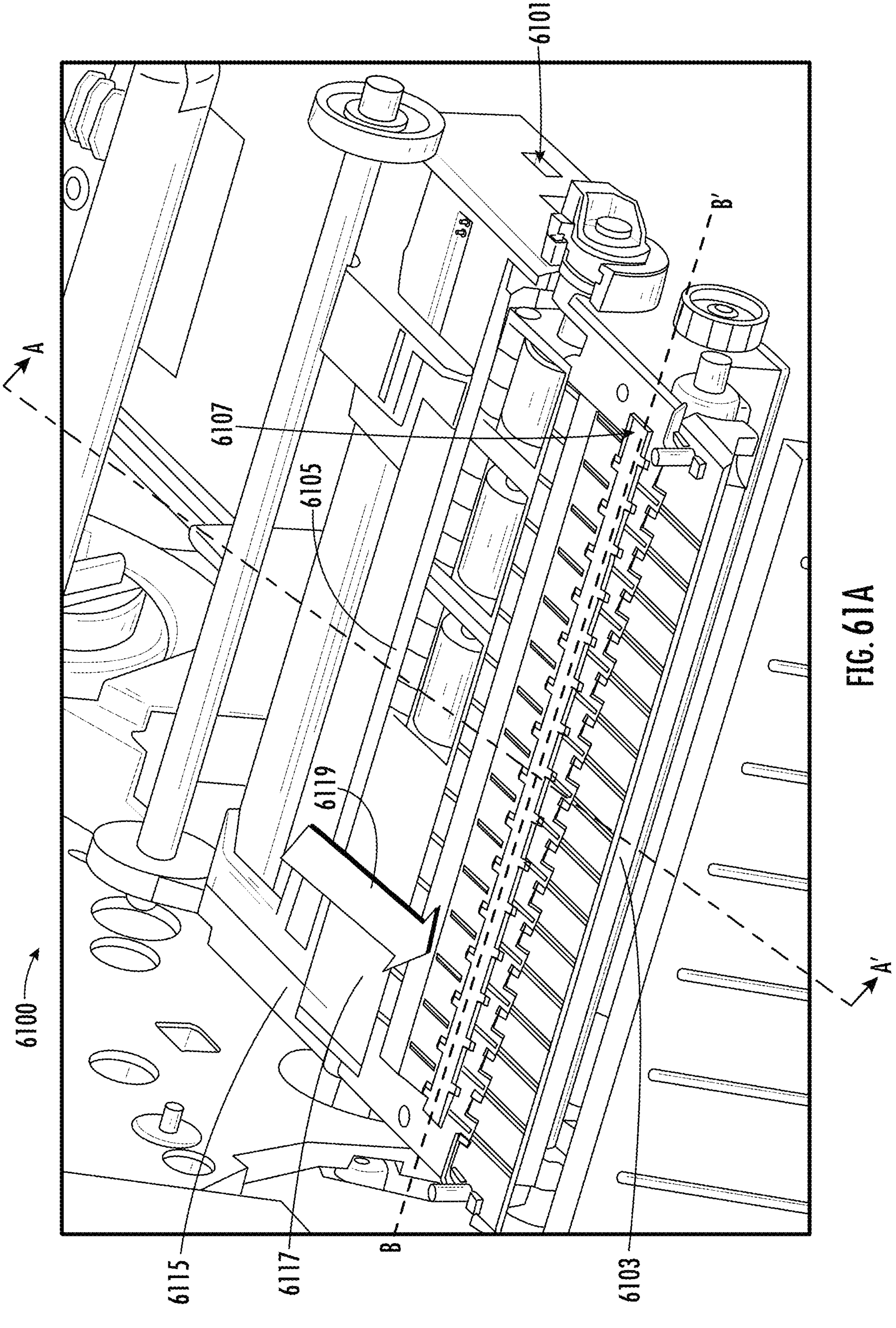
FIG. 61A illustrates an example perspective view of a portion of an example printing apparatus according to one or more embodiments described herein.
Figure 61B:
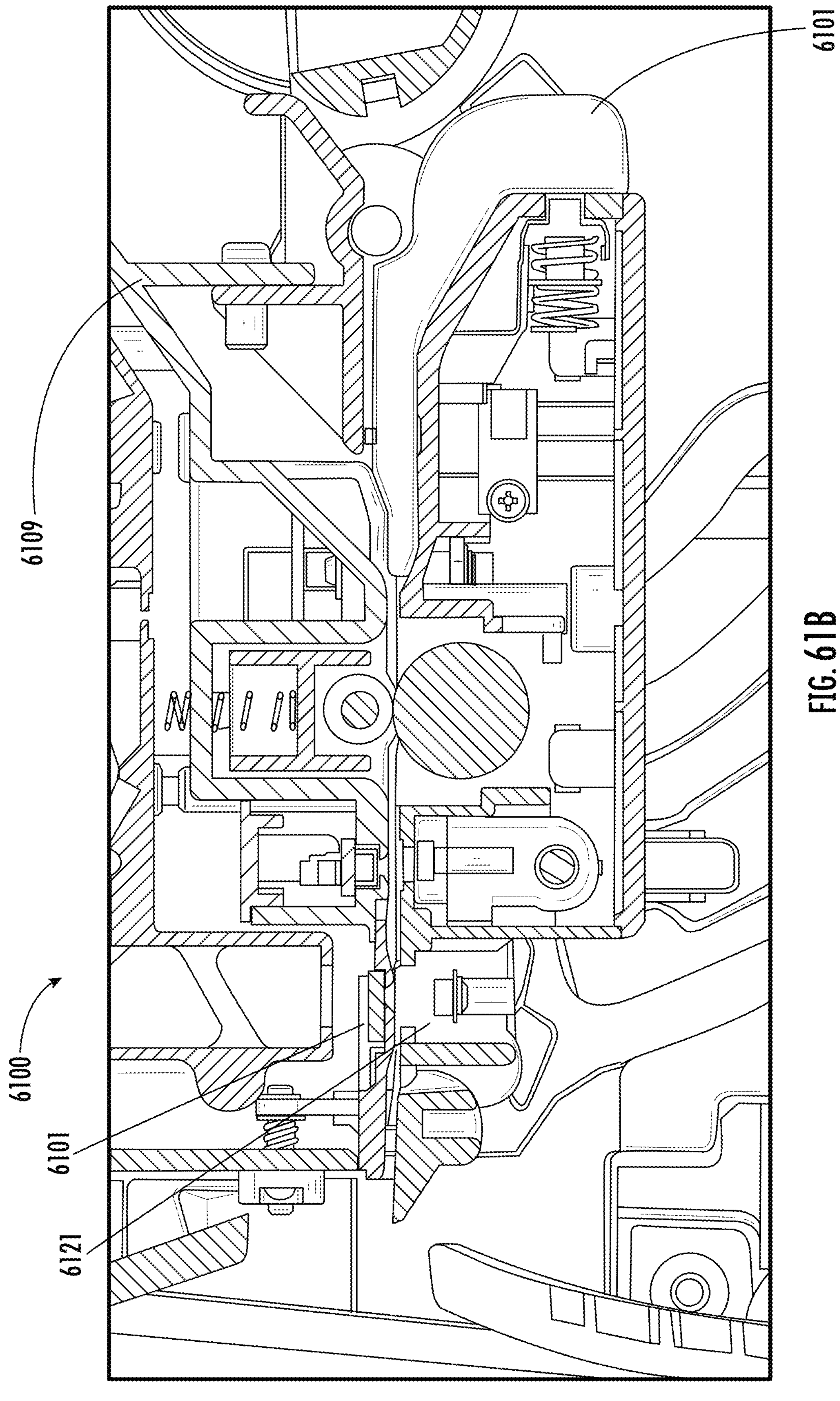
FIG. 61B illustrates an example cross-sectional view of a portion of an example printing apparatus according to one or more embodiments described herein.
Figure 61C:
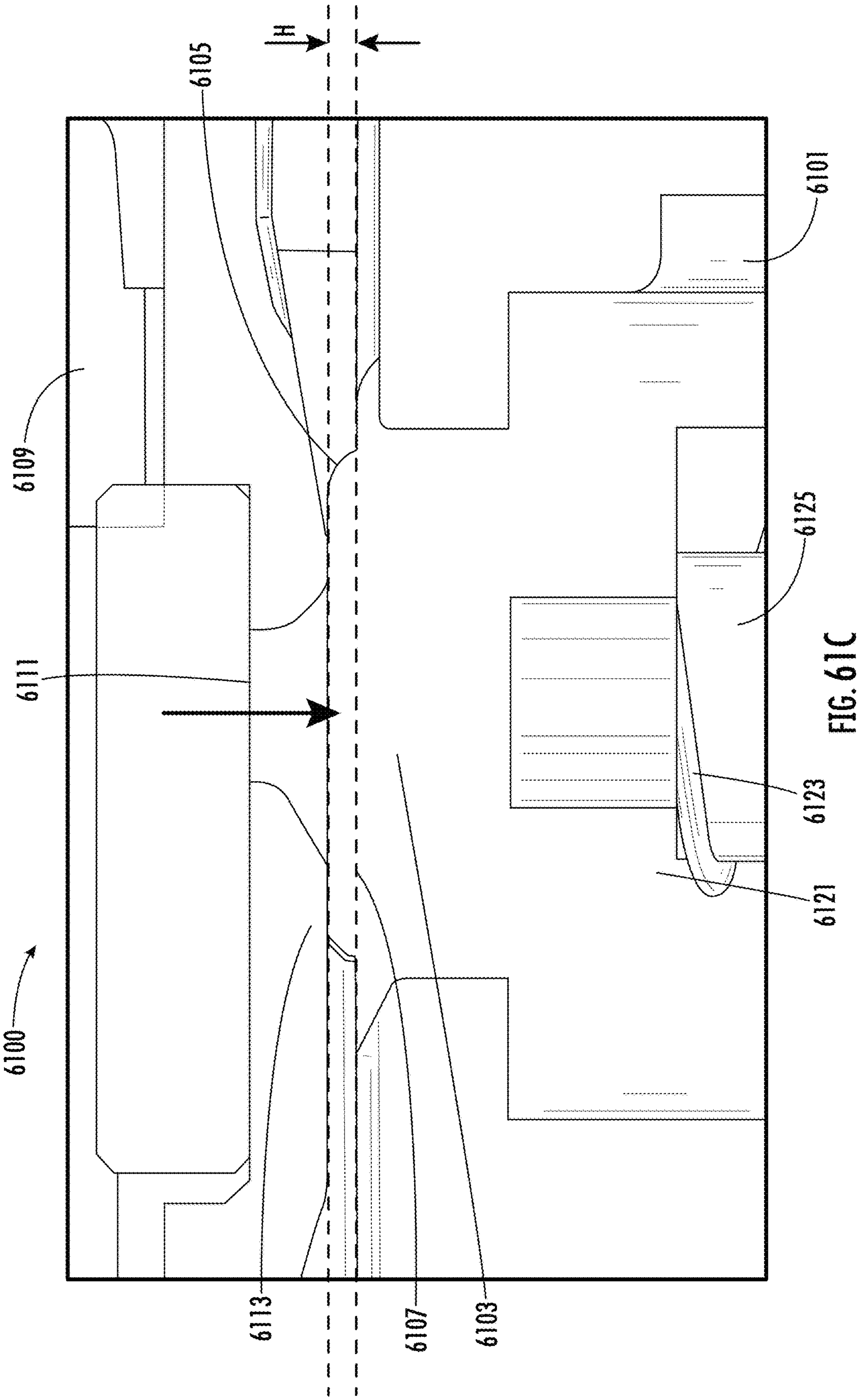
FIG. 61C illustrates an example zoomed view of a portion of an example printing apparatus according to one or more embodiments described herein.

Referring now to FIG. 61A, FIG. 61B, and FIG. 61C, various example views associated with example portions of an example printing apparatus 6100 are illustrated. In particular, FIG. 61A illustrates an example perspective view of the example printing apparatus 6100. FIG. 61B illustrates an example cross-sectional view of the example printing apparatus 6100 along the cut line A-A' and viewing in the direction of the arrows in FIG. 61A. FIG. 61C illustrates an example zoomed view of the example portion 6127 shown in FIG. 61B.

In the example shown in FIG. 61A, a section of an example bottom chassis portion 6101 is illustrated. Similar to the various example bottom chassis portions described above, the example bottom chassis portion 6101 defines a platform 6115 that may correspond to a region on which the print media is received and travels along a print path for printing operation.

For example, one or more rollers (such as, but not limited to, an example roller 6117) may be disposed on or embedded in the platform 6115. As the print media travels on the rollers, the rollers may rotate. Due to the friction between the roller surface and the print media, the rotational force of the rollers may be translated into forward motion of the print media. As such, the print media may travel along a media path at a print direction 6119. In some embodiments, the print direction 6119 of the print media may be in a perpendicular arrangement with an axis along the width of the platform 6115.

In some embodiments, the example bottom chassis portion 6101 comprises an example height limiter panel 6103. In some embodiments, the example height limiter panel 6103 may be disposed along a width of the platform 6115. For example, a central axis B-B' along the width of the example height limiter panel 6103 may be in a parallel arrangement with an axis along the width of the platform 6115. Additionally, or alternatively, the central axis B-B' along the width of the example height limiter panel 6103 may be in a perpendicular arrangement with the print direction 6119.

While the description above provides an example arrangement of the height limiter panel, it is noted that the scope of the present disclosure is not limited to the description above. In some examples, an example height limiter panel may be positioned (relatively to the print direction and/or the width of the platform) differently than those described above.

In some embodiments, at least one bottom rib element may protrude from a top surface of the example height limiter panel. In some embodiments, a first bottom rib element and a second bottom rib element may protrude from the top surface of the height limiter panel. In some embodiments, a print media travels between the first bottom rib element and the second bottom rib element.

In the example shown in FIG. 61A, a first bottom rib element 6105 and a second bottom rib element 6107 may protrude from the top surface of the example height limiter panel 6103. The print media may travel between the first bottom rib element 6105 and the second bottom rib element 6107. As such, the width of the example height limiter panel 6103 may be larger than the width of the print media.

While the description above provides an example of two bottom rib elements, it is noted that the scope of the present disclosure is not limited to the description above. In some examples, less than two or more than two bottom rib elements may protrude from the surface of the example height limiter panel.

Similar to the various example bottom chassis portions described above, the example bottom chassis portion 6101 may be positioned under a top chassis portion of the example printing apparatus. Referring now to FIG. 61B, the example printing apparatus 6100 comprises an example top chassis portion 6109 and the example bottom chassis portion 6101. As shown, the example printing apparatus 6100 is in a closed state, and the bottom chassis portion 6101 may be positioned under the top chassis portion 6109.

As shown in FIG. 61C, in some embodiments, the example top chassis portion 6109 comprises a height limiter groove 6111. In particular, when the example printing apparatus is in a closed position, the height limiter groove 6111 on the top chassis portion 6109 may correspond to the height limiter panel 6103 on the bottom chassis portion 6101.

In some embodiments, at least one top rib element protrudes from a bottom surface of the height limiter groove. Referring now to the example shown in FIG. 61C, the example top rib element 6113 protrudes from a bottom surface of the height limiter groove 6111.

In some embodiments, a distance between a top surface of one of the at least one bottom rib element and a bottom surface of one of the at least one top rib element is 0.4 millimeters. For example, the distance H between a top surface of the second bottom rib element 6107 and a bottom surface of the top rib element 6113 is 0.4 millimeters. As such, the distance H may enable the printing apparatus to achieve optimum flatness.

In some embodiments, a biasing mechanism may be disposed on a bottom surface of the height limiter panel. In some embodiments, the biasing mechanism comprises a supporting beam and a spring element. In some embodiments, the supporting beam is disposed on the bottom surface of the height limiter panel.

Referring now to the example shown in FIG. 61A and FIG. 61B, the example biasing mechanism 6121 is illustrated. As shown, the example biasing mechanism 6121 may comprise a supporting beam 6125 and a spring element 6123. As shown in FIG. 61C, the supporting beam 6125 is disposed on a bottom surface of the height limiter panel 6103.

Figure 62A:
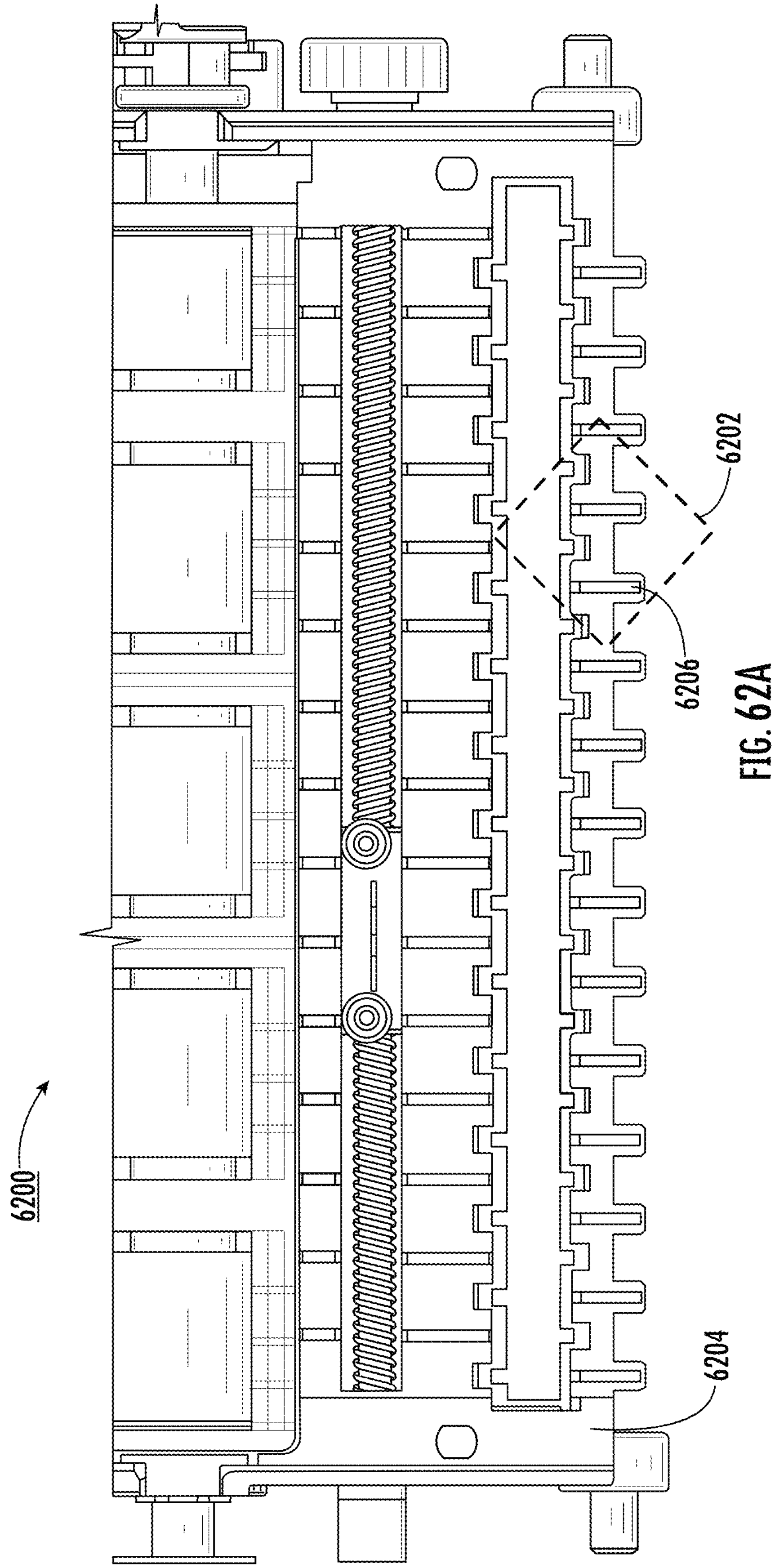
FIG. 62A illustrates an example top view of a portion of an example bottom chassis portion according to one or more embodiments described herein.
Figure 62B:
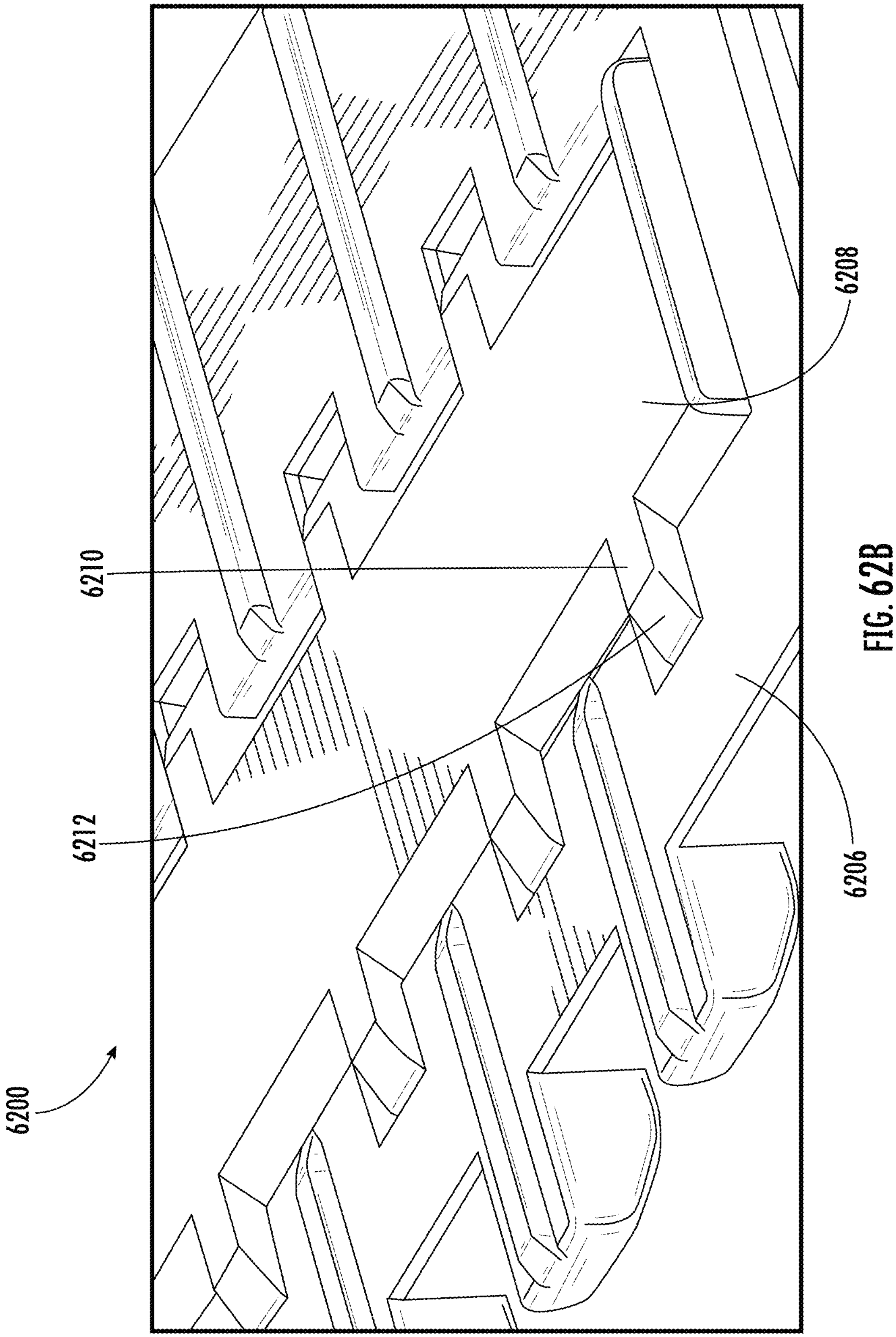
FIG. 62B illustrates an example perspective view of a portion of an example bottom chassis portion according to one or more embodiments described herein.

Referring now to FIG. 62A and FIG. 62B, various example views associated with example portions of an example printing apparatus 6200 are illustrated. In particular, FIG. 62A illustrates an example top view of the example printing apparatus 6200. FIG. 62B illustrates an example perspective view of the example portion 6202 shown in FIG. 62B.

In some embodiments, the bottom chassis portion further comprises a fixed panel. In some embodiments, a plurality of locking rib elements protrude from a side surface of the height limiter panel. In some embodiments, a plurality of locking groove elements protrudes from a side surface of the fixed panel. In some embodiments, the height limiter panel is secured to the fixed panel through the plurality of locking rib elements and the plurality of locking groove elements.

For example, with reference to the example shown in FIG. 62A and FIG. 62B, the example bottom chassis portion 6204 comprises a fixed panel 6206 and a height limiter panel 6208. As shown, a plurality of locking rib elements (such as, but not limited to, locking rib element 6210) protrude from a side surface of the height limiter panel 6208. A plurality of locking groove elements (such as, but not limited to, locking groove element 6212) are disposed on a side surface of the fixed panel 6206. In some embodiments, the height limiter panel 6208 is secured to the fixed panel 6206 through the plurality of locking rib elements (such as, but not limited to, locking rib element 6210) and the plurality of locking groove elements (such as, but not limited to, locking groove element 6212).

Figure 63A:
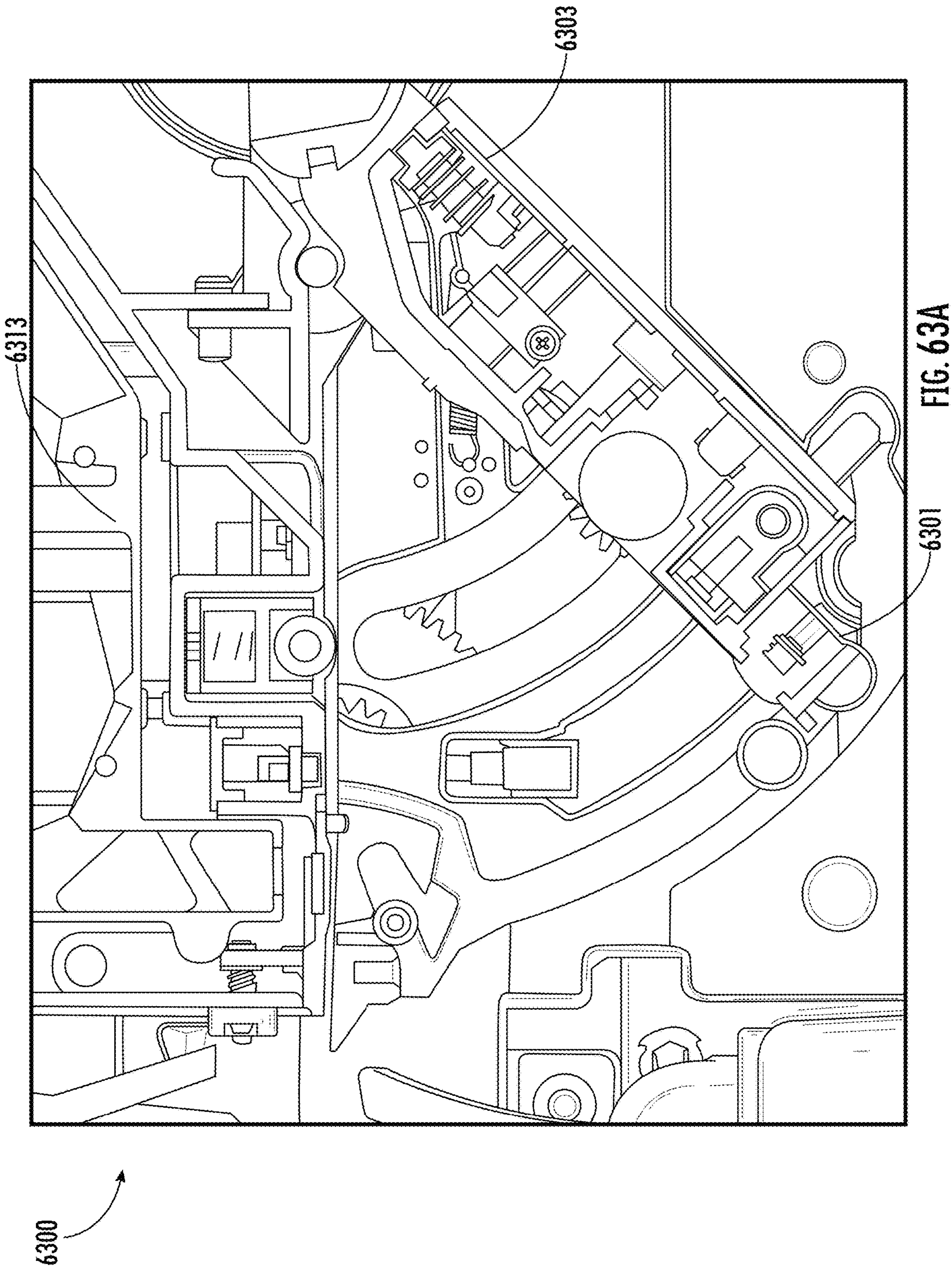
FIG. 63A illustrates an example cross-sectional view of a portion of an example printing apparatus according to one or more embodiments described herein.
Figure 63B:
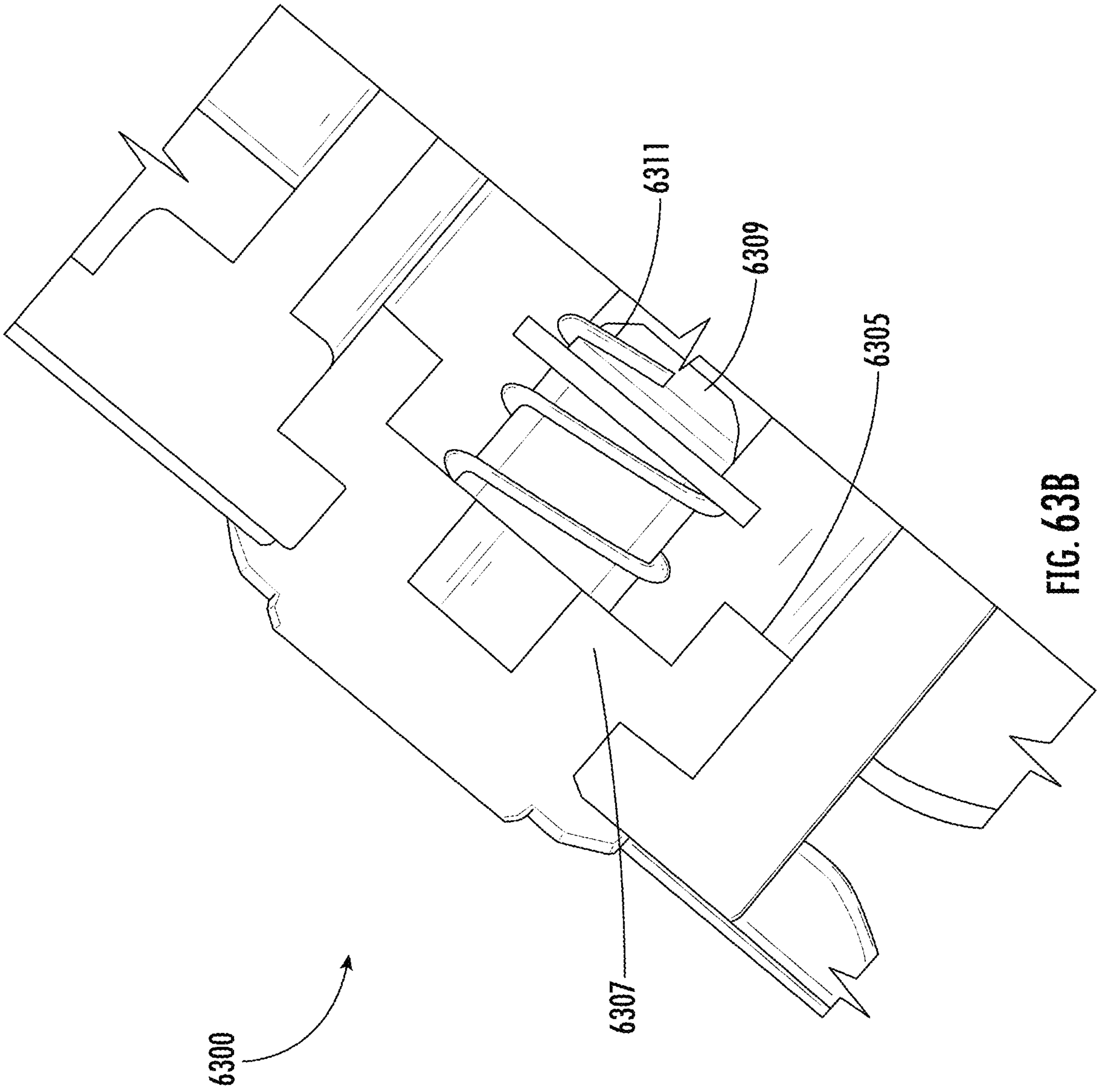
FIG. 63B illustrates a zoomed view of a portion of an example printing apparatus according to one or more embodiments described herein.

Referring now to FIG. 63A and FIG. 63B, various example views associated with example portions of an example printing apparatus 6300 are illustrated. In particular, FIG. 63A illustrates an example cross-sectional view of the example printing apparatus 6300. FIG. 63B illustrates an example perspective view of the example portion 6301 shown in FIG. 63A.

In particular, as shown in FIG. 63A, the example printing apparatus 6300 is in an open state, and the bottom chassis portion 6303 is not secured to the top chassis portion 6313.

As shown in FIG. 63B, the example biasing mechanism 6305 may be disposed on a bottom surface of the height limiter panel 6307. In some embodiments, the biasing mechanism 6305 may comprise a supporting beam 6309 and a spring element 6311. In some embodiments, the supporting beam 6309 is disposed on the bottom surface of the height limiter panel 6307. In some embodiments, a first end of the spring element 6311 is secured to the supporting beam 6309 and a second end of the spring element 6311 is secured to the bottom surface of the height limiter panel 6307.

Referring again to FIG. 20, an example printing apparatus may comprise a laser print head 302 having one or more laser sources that are configured to facilitate direct printing, using one or more laser beams emanating from one or more laser sources, of content on print media. As depicted in FIG. 20, the laser print head 302 comprises an SOL detector 2004, a laser power control system 2006, a laser subsystem control unit and I/O device interface unit 2012, and a synchronization unit 2016. Each of the SOL detector 2004, laser power control system 2006, laser subsystem control unit and I/O device interface unit 2012 and synchronization unit 2016 of the laser print head 302 may be configured to perform one or more operations of the example printing apparatus. As such, the laser print head 302 can control one or more operations of one or more components (e.g., laser sources) electronically coupled with and/or in electronic communication with the laser print head 302. While some of the embodiments herein provide an example laser print head, as described in connection with FIG. 20, it is noted that the scope of the present disclosure is not limited to such embodiments. For example, in some examples, a laser print head in accordance with the present disclosure may be in other forms.

Figure 64:
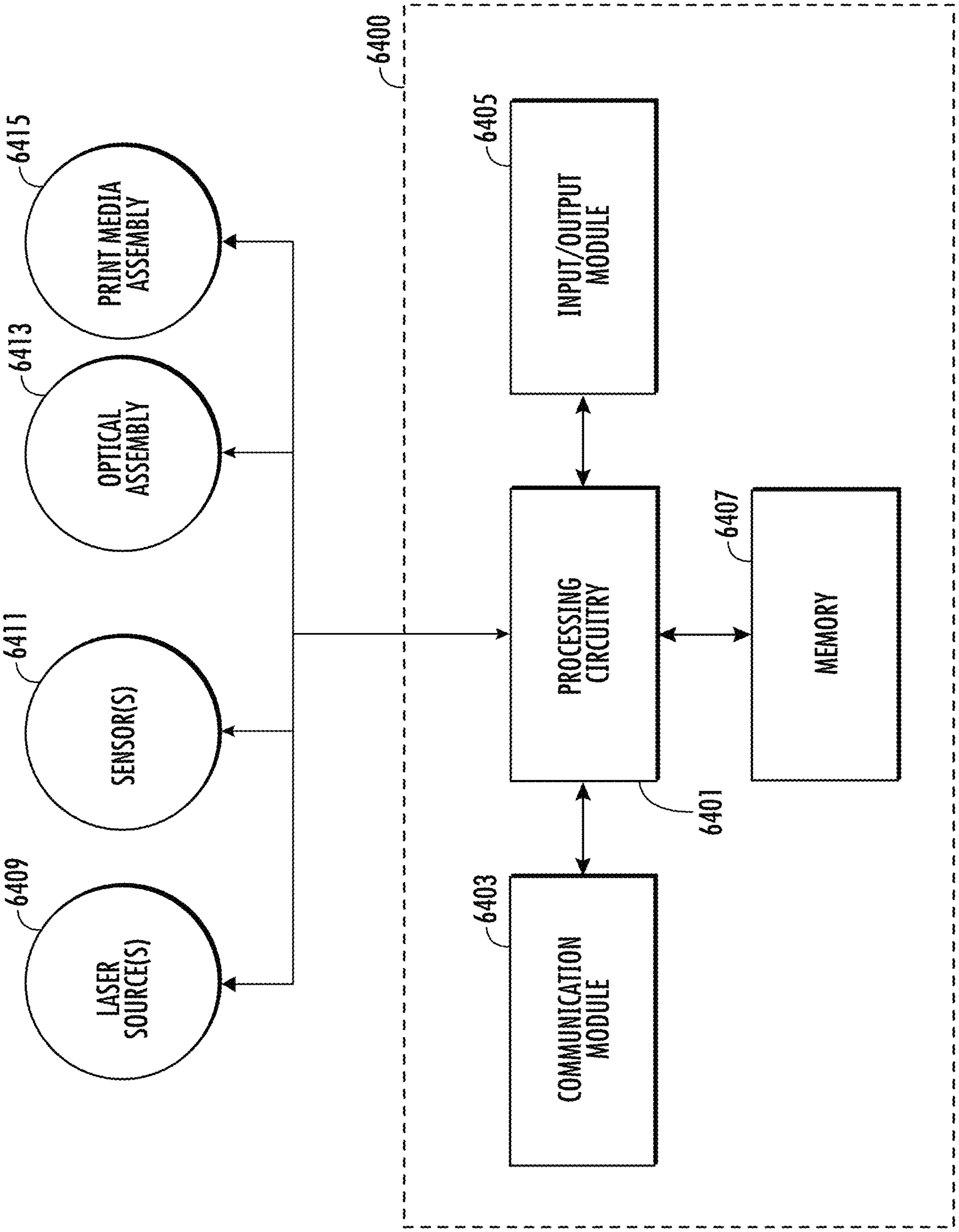
FIG. 64 illustrates an example laser print head controller according to one or more embodiments described herein.

Referring now to FIG. 64, a schematic diagram depicting an example laser print head controller 6400 in electronic communication with various other components in accordance with various embodiments of the present disclosure is provided. As shown, the laser print head controller 6400 comprises processing circuitry 6401, a communication module 6403, input/output module 6405, a memory 6407 and/or other components configured to perform various operations, procedures, functions, or the like described herein.

As shown, the laser print head controller 6400 (such as the processing circuitry 6401, communication module 6403, input/output module 6405 and memory 6407) is electrically coupled to and/or in electronic communication with one or more laser sources 6409, one or more sensors 6411, an optical assembly 6413 and a print media assembly 6415. The laser print head controller 6400 may also be electrically coupled to and/or in electronic communication with other components of the example printing apparatus, including the control unit 138 described above in connection with FIG. 27. As depicted, each of the communication module 6403, input/output module 6405 and memory 6407 may exchange (e.g., transmit and receive) data with the processing circuitry 6401 of the laser print head controller 6400.

The processing circuitry 6401 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 6401 may comprise one or more processors. In one exemplary embodiment, the processing circuitry 6401 is configured to execute instructions stored in the memory 6407 or otherwise accessible by the processing circuitry 6401. When executed by the processing circuitry 6401, these instructions may enable the laser print head controller 6400 to execute one or a plurality of the functions as described herein. No matter whether it is configured by hardware, firmware/software methods, or a combination thereof, the processing circuitry 6401 may comprise entities capable of executing operations, according to the embodiments of the present invention when correspondingly configured. Therefore, for example, when the processing circuitry 6401 is implemented as an ASIC, an FPGA, or the like, the processing circuitry 6401 may comprise specially configured hardware for implementing one or a plurality of operations described herein. Alternatively, as another example, when the processing circuitry 6401 is implemented as an actuator of instructions (such as those that may be stored in the memory 6407), the instructions may specifically configure the processing circuitry 6401 to execute one or a plurality of algorithms and operations, according to the embodiments of the present disclosure.

The memory 6407 may comprise, for example, a volatile memory, a non-volatile memory, or a certain combination thereof. Although illustrated as a single memory in FIG. 3, the memory 6407 may comprise a plurality of memory components. In various embodiments, the memory 6407 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 6407 may be configured to store information, data, application programs, instructions, and etc., so that the laser print head controller 6400 can execute various functions, according to the embodiments of the present disclosure. For example, in at least some embodiments, the memory 6407 is configured to cache input data for processing by the processing circuitry 6401. Additionally, or alternatively, in at least some embodiments, the memory 6407 is configured to store program instructions for execution by the processing circuitry 6401. The memory 6407 may store information in the form of static and/or dynamic information. When the functions are executed, the stored information may be stored and/or used by the laser print head controller 6400.

The communication module 6403 may be implemented as any apparatus included in a circuit, hardware, a computer program product, or a combination thereof, which is configured to receive and/or transmit data from/to another component or apparatus. The computer program product comprises computer-readable program instructions stored on a computer-readable medium (for example, the memory 6407) and executed by a laser print head controller 6400 (for example, the processing circuitry 6401). In some embodiments, the communication module 6403 (as with other components discussed herein) may be at least partially implemented as the processing circuitry 6401 or otherwise controlled by the processing circuitry 6401. In this regard, the communication module 6403 may communicate with the processing circuitry 6401, for example, through a bus. The communication module 6403 may comprise, for example, antennae, transmitters, receivers, transceivers, network interface cards and/or supporting hardware and/or firmware/software and is used for establishing communication with another apparatus. The communication module 6403 may be configured to receive and/or transmit any data that may be stored by the memory 6407 by using any protocol that can be used for communication between apparatuses. The communication module 6403 may additionally or alternatively communicate with the memory 6407, the input/output module 6405 and/or any other component of the laser print head controller 6400, for example, through a bus.

In some embodiments, the laser print head controller 6400 may comprise an input/output module 6405. The input/output module 6405 may communicate with the processing circuitry 6401 to receive instructions input by the user and/or to provide audible, visual, mechanical, or other outputs to the user. Therefore, the input/output module 6405 may be in electronic communication with supporting devices, such as a keyboard, a mouse, a display, a touch screen display, and/or other input/output mechanisms. Alternatively, at least some aspects of the input/output module 6405 may be implemented on a device used by the user to communicate with the laser print head controller 6400. The input/output module 6405 may communicate with the memory 6407, the communication module 6403 and/or any other component, for example, through a bus. One or a plurality of input/output modules and/or other components may be included in the laser print head controller 6400.

Printing with Two Crossed High-Aspect Ratio Multi-Mode Lasers

In various laser printing and laser marking applications, controlling spot size and focal depth of a laser beam are important for print quality. Typically, Nd:YAG or carbon dioxide ($CO_2$) lasers are used in such systems. However, such lasers may be expensive and are not capable of operating at a switching bandwidth required to print quickly. In some embodiments of the present disclosure, various configurations of low-cost, high-power multi-mode laser diodes may be utilized to reduce product costs and achieve fast printing speeds.

In some examples, two crossed high-aspect-ratio lasers (e.g., multi-mode laser spots/diodes) may be utilized to provide a low-cost, high-speed print and/or marking system. In some examples, the implementation of the two crossed high-aspect-ratio laser configuration may facilitate the use of print media with media coatings having higher sensitivity threshold characteristics.

In general, multi-mode lasers exhibit a high-aspect beam profile where the laser energy is distributed over an elliptical area that cannot be optically focused/resolved in a circular shape in both axes. In some examples, attempting to print using a single multi-mode laser would produce a rectangular or high aspect ellipse that would not meet print quality or DPI (dots per inch) requirements. Additionally, it may be difficult to control print quality of a single-mode laser in various printing applications. Accordingly, by constructing the print head to use two multi-mode lasers (e.g., two multi-mode lasers arranged perpendicular to one another) at a lower power setting a high-power spot at the center of both beams can be generated due to the combined laser irradiance at the center of both high-aspect ratio ellipses. This output mimics a single high-power laser with a circular beam to produce a print dot that meets required specifications (e.g., print quality or DPI requirements).

As discussed above in connection with FIG. 21, the laser subsystem 2002 may include one or more laser sources 2102, an optical assembly 2104 positioned adjacent and/or close to the one or more laser sources 2102, a polygon mirror 2106, and a reflective surface 2110. The optical assembly 2104 and the one or more laser sources 2102 may operate in conjunction with the laser print head 302 to facilitate the directing of laser beams onto a print media. For example, the one or more laser sources 2102 may including suitable logic and/or circuitry that enable the one or more laser sources 2102 to generate one or more laser beams in response to receiving laser control signal(s) from the laser print head 302/laser print head controller.

In some examples, a plurality of laser sources (e.g., multi-mode lasers) may be provided. In some examples, two multi-mode lasers may be provided and arranged in a perpendicular fashion with respect to one another. In some examples, the output of each multi-mode laser may be approximately 10 watts.

Figure 65:
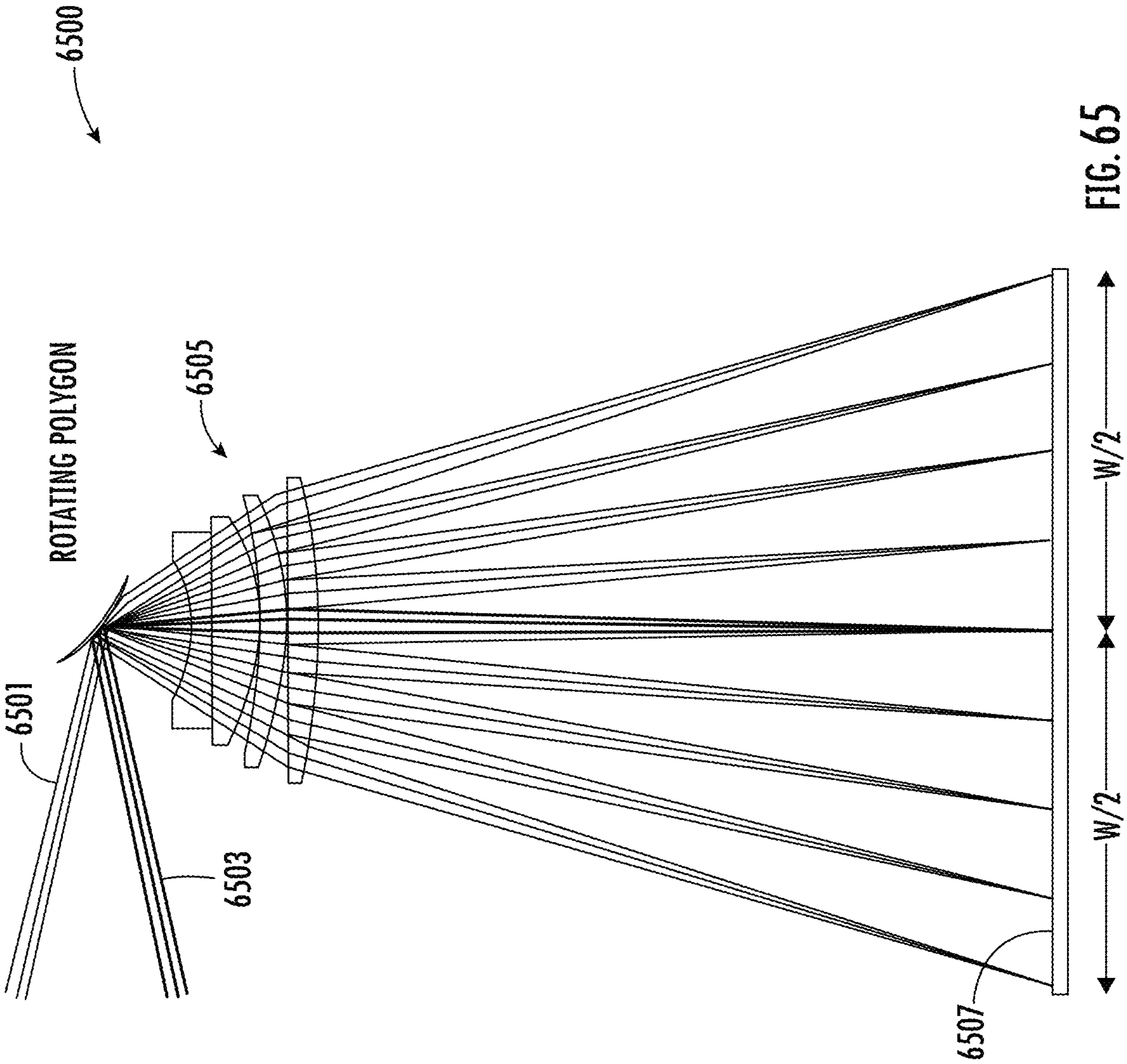
FIG. 65 illustrates an example schematic depicting laser beams generated by two laser sources according to one or more embodiments described herein.

FIG. 65 provides an example schematic 6500 depicting laser beams generated by two laser sources in accordance with various embodiments of the present disclosure.

As depicted, an example laser print head controller (such as, but not limited to, the laser print head controller 6400 illustrated in connection with FIG. 64, discussed above) may cause a first laser source to generate a first laser beam 6501 and a second laser source to generate a second laser beam 6503 directed through an optical assembly 6505. The optical assembly 6505 may be similar to the optical assembly 2104 described herein in connection with FIG. 21. The laser print head controller may be configured to generate one or more laser control signals in order to cause two or more laser sources to each generate a respective laser beam concurrently or in close succession (e.g., within 1-4 milliseconds of one another). In some examples, the laser print head controller may generate one or more laser control signals to cause the one or more laser sources 2102 to each generate a laser beam incident on a target location of a print media 6507 (e.g., a width or line of the print media 6507).

As noted, the first laser beam 6501 and the second laser beam 6503 may be directed onto a print media through an optical assembly 6505. For example, the optical assembly 6505 may comprise at least a polygon mirror. The laser print head controller may cause the first laser beam 6501 and the second laser beam 6503 to sweep across a width of a print media 6507. As depicted in FIG. 65, in some examples, the laser print head controller may cause the first laser beam 6501 and the second laser beam 6503 to sweep a target location (e.g., a width) of the print media 6507 such that at least a portion of the output of first laser beam 6501 and the second laser beam 6503 overlap. For example, as depicted, the output of the first laser beam 6501 and the second laser beam 6503 may generate a high-power spot at the center of both beams. For example, the output of the first laser beam 6501 and the second laser beam 6503 may be superimposed onto one another in order to impinge a mark (e.g., a dot) onto the print media 6507. In other examples, the output of each laser beam may be directed through the optical assembly 6505, so as to impinge a respective portion of content (e.g., marks, dots, and/or the like) onto the print media. The laser print head controller may be configured to cause a first laser source to generate a first laser beam 6501 at a first power output and a second laser source to generate a second laser beam 6503 at a second power output. As such, the power output of each respective laser source may be a configurable parameter. For example, the output of each respective laser source may be a configurable parameter corresponding with one or more printing parameters such as, for example without limitation, a print resolution.

Pre-Energizing Direct-Print Media with a High-Power Laser & High-Frequency SM Pulsed Laser Data with Low-Frequency MM Pulsed Data for Improved Efficiency In various embodiments, a high-power laser capable of generating a high-intensity laser beam may be required to impinge content onto a print media. In addition to cost implications associated therewith, laser beam quality may reduce as a result of increased power output of a laser source.

Although a low-quality, multi-mode laser may be unsuitable for generating a high-resolution mark, it may be utilized to supply energy to the print media up to/just before an activation threshold at which content can be impinged onto the print media (i.e., a threshold at a mark can be made). A relatively large amount of energy is needed to energize the print media up to the activation threshold and then any additional energy supplied thereafter operates to activate the "ink" and mark the print media.

As such, in some embodiments of the present disclosure, a combination of high-power and low-quality lasers may be utilized to sustain both high printing speeds and high-quality print resolution. By way of example, a first high-power, low-quality laser (e.g., pre-energizing laser) may be utilized for pre-energizing a target area of a print media, followed rapidly by a low or medium power, high-quality laser (e.g., writing laser/beam) to impinge content onto the print media (i.e., perform color changing operations with respect to the print media).

In some examples, the example pre-energizing laser may comprise a multi-mode laser. The example multi-mode laser may have multiple-transverse modes limiting the ability of the laser to focus the size of a beam in at least one dimension (e.g., x-dimension). However, in a second dimension (e.g., y-dimension), the example multi-mode laser may operate in a single-mode fashion and is capable of being focused similarly to a high-quality laser.

In some examples, the writing laser may comprise a single-mode laser. The example single-mode laser can be focused with accuracy in both the x-dimension and the y-dimension. Accordingly, the marking area of the pre-energizing area may be significantly larger than that of the writing laser. For example, the shape or mark generated by the pre-energizing laser may be substantially rectangular (e.g., 1 mm long and 80 μm wide with slightly rounded corners).

In some examples, the pre-energizing beam should be quickly followed (e.g., within 1 millisecond) by the writing beam so that the energy absorbed by the print media does not disperse prior to the writing beam being incident on the target area. In contrast with the pre-energizing laser, the mark generated by the writing laser may be substantially circular, e.g., a dot that is approximately 80 μm in diameter. In some examples, the high-quality dimension of the pre-energizing laser is oriented to the line width of the print media such that a high-resolution band matching the resolution of the writing beam is deposited prior to the writing beam being incident on the target area such that maximum energy efficiency is achieved. As the pre-energizing beam and the writing beam scan by, each beam may be selectively turned on and off only to deposit energy as required in order to conserve power and eliminate component temperate increases. By way of example, in order to print content onto a print media requiring an overall print density of approximately 30%, laser sources do not need to be left on continuously. A control algorithm may be utilized to turn on each respective laser as needed. With respect to the writing beam, a higher frequency-controlled pulsing at the rate of the actual print dots may be utilized. With respect to the pre-energizing beam, a lower frequency pulsing may be utilized such that the pre-energizing laser turns off when traversing large areas where no print is to occur.

As discussed above in relation to FIG. 32, the example printing apparatus may include means for receiving one or more configurations values. As discussed, the one or more configuration values are deterministic and/or representative of the configuration in which the print head is to operate in order to print content onto the print media. Additionally, multiple printing parameters (e.g., print speeds) may be implemented by varying rotation speed of the optical assembly, such as the polygon mirror. In some examples, a count of laser beams and/or a rotation speed of the polygon mirror may be varied.

Figure 66:
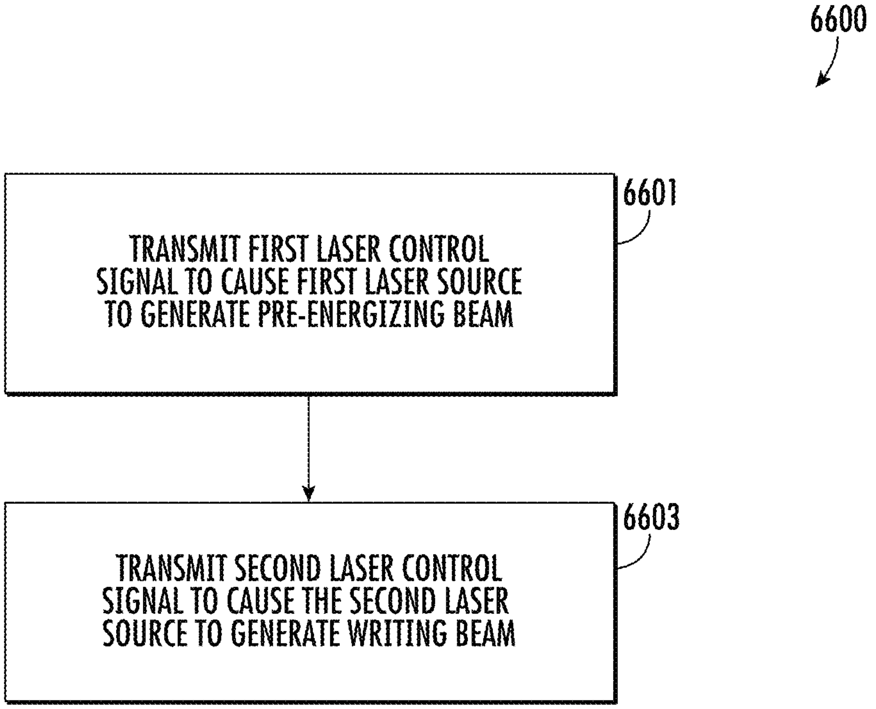
FIG. 66 illustrates a flowchart diagram illustrating example operations according to one or more embodiments described herein.

Referring now to FIG. 66, a flowchart diagram illustrating example operations 6600 in accordance with various embodiments of the present disclosure is provided. The operations 6600 may be performed by a laser print head controller. The laser print head controller may be similar to the laser print head controller 6400 described herein in connection with FIG. 64. For example, the laser print head controller may similarly comprise processing circuitry 6401, a communication module 6403, an input/output module 6405, and a memory 6407. The laser print head controller may be electrically coupled to and/or in electronic communication with various components of the printing apparatus, such as one or more laser sources 6409, one or more sensors 6411, an optical assembly 6413, and a print media assembly 6415.

The example method 6600 begins with step/operation 6601. At step/operation 6601, a processing circuitry (such as, but not limited to, the processing circuitry 6401 of laser print head controller 6400 illustrated in regard to FIG. 64) may, in response to receiving one or more configuration values, transmit a first laser control signal in order to cause the first laser source to generate a pre-energizing beam incident on a target location of a print media. As discussed above, the first laser source may comprise a multi-mode laser configured to supply energy to the print media up to an activation threshold at which content can be impinged onto the print media. The example first laser source may have a power output of approximately 10 watts. The high-quality dimension of the pre-energizing beam may be oriented to a line width of the print media such that the energy supplied by the pre-energizing beam is in the shape of a dash (e.g., more focused in the y-dimension than in the x-dimension). However, the energy supplied by the pre-energizing beam may not result in a visible mark on the print media. In some examples, the first laser source/pre-energizing laser may be configured to be in an off state when traversing a portion of the print media where no content is to be printed, such that it operates at a lower frequency than the second laser source/writing laser.

Subsequent to step/operation 6601, the method 6600 proceeds to step/operation 6603. At step/operation 6603, the processing circuitry transmits a second laser control signal to cause the second laser source to generate a writing beam in incident on the target location of the print media. In various embodiments, the second laser source may be caused to generate the writing beam within 1 millisecond of the first laser source generating the pre-energizing beam. In some embodiments, the processing circuitry may transmit the second laser control signal in response to determining that a condition of the print media satisfies an activation threshold. In some embodiments, the processing circuitry may transmit a single laser control signal to cause the first laser source and the second laser source to generate a respective laser beam. As noted above, the second laser source may comprise a single-mode laser configured to supply energy to the print media above the activation threshold. The example second laser source/single-mode laser may have a power output of approximately 0.5 watts. In some examples, the writing beam may impinge a dot superimposed onto the dash impinged by the pre-energizing beam. In some examples, the first laser source may generate the pre-energizing beam at a first frequency and the second laser source may generate the writing beam at a second frequency. The first frequency may be lower than the second frequency such that the second laser source/writing beam operates to generate a plurality of pulses at a rapid, uniform frequency in order to impinge small dots onto the print media. In some examples, a resolution band of the pre-energizing beam may match a resolution band of the writing beam.

Perform Laser Power Compensation Utilizing Printed Grayscale Calibration Data in Printed Media In various laser printing and laser marking applications, well calibrated power delivery to print media is required in order to achieve good print quality over all environmental conditions and over the operating life of the apparatus. As noted herein, print media is sensitive to the wavelength and optical power of a light source incident thereon. Both the optical power and wave wavelength of a light source may vary with temperature and due to optical transmission variation across a scan or sweep. Additionally, laser/drive circuit efficiency may change with respect to temperature and time. In some embodiments of the present disclosure, a calibration system is provided. In some examples, image data (e.g., printed media) and a correction lookup table is utilized to adjust laser power parameters. The printed media may be in the form of optical density as a function of beam sweep angle for a constant laser power output. The data may be incorporated as a lookup table or a calculated function in memory and used to scale the output power of one or more laser sources based on, for example, known polygon speed and a start-of-line pulse.

In some embodiments, calibration operations may occur during printing operations and with respect to a print media as required. As a result, a calibration system providing an improved print quality can be realized. For instance, the uniformity and/or accuracy of grayscale printing across an example label can be enhanced. In some examples, printed media with data/content impinged thereon contains information which can be analyzed and utilized for calibration operations. Such techniques may be used during the apparatus design or manufacturing process. For instance, a media scanner device may be used for unit calibration during the design or manufacturing process. In another example, an example printing apparatus may comprise a sensor, such as an image sensor for real-time calibration adjustment during operations.

Figure 67:
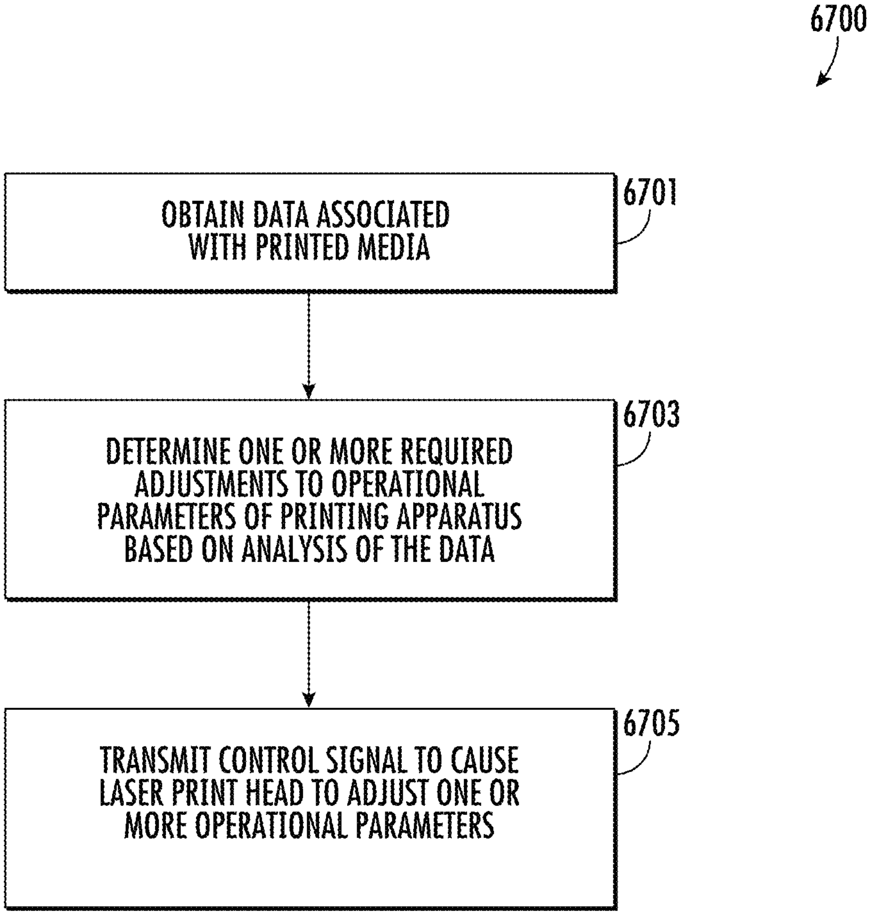
FIG. 67 illustrates a flowchart diagram illustrating example operations according to one or more embodiments described herein.

Referring now to FIG. 67, a flowchart diagram illustrating example operations 6700 in accordance with various embodiments of the present disclosure is provided. The operations 6700 may be performed by a laser print head controller. The laser print head controller may be similar to the laser print head controller 6400 described herein in connection with FIG. 64. For example, the laser print head controller may similarly comprise processing circuitry 6401, a communication module 6403, an input/output module 6405 and a memory 6407. The laser print head controller may be electrically coupled to and/or in electronic communication with various components of the printing apparatus such as one or more laser sources 6409, one or more sensors 6411, an optical assembly 6413, and a print media assembly 6415.

The example method 6700 begins with step/operation 6701. At step/operation 6701, a processing circuitry (such as, but not limited to, the processing circuitry 6401 of laser print head controller 6400 illustrated in regard to FIG. 64) obtains data associated with a printed media. As noted, the printed media may be in the form of optical density as a function of beam sweep angle for a constant laser power output. In some examples, the data (e.g., image data) may be obtained using a media scanner device in electronic communication with the processing circuitry. In some examples, the data (e.g., image data) may be obtained using one or more sensors (such as, but not limited to, the one or more sensors 6411 in communication with the laser print head controller 6400 illustrated in regard to FIG. 64). In some examples, the one or more sensors may be or comprise linear sensor(s) (e.g., linear CCD sensor(s)), optical camera(s) and/or the like. The example sensor may be coupled to the example printing apparatus. For example, an example image sensor may be arranged adjacent (e.g., downstream) with respect to a printed media such that it can capture printed media data subsequent to content being impinged onto the print media as it traverses the example printing apparatus. By way of example, with reference to FIG. 1, discussed herein, the one or more sensors may be located adjacent to a surface of the print head engine 122.

Subsequent to step/operation 6701, the example method 6700 proceeds to step/operation 6703. At step/operation 6703, the processing circuitry determines one or more required adjustments to operational parameters of the printing apparatus based on analysis of the data. For example, the processing circuitry may determine one or more operational parameters with reference to a stored correction lookup table or a calculated function in memory (such as, but not limited to, the memory 6407 of laser print head controller 6400 illustrated in regard to FIG. 64). The one or more operational parameters may be or comprise print resolution parameters. For example, a print resolution may comprise a particular print density (e.g., 100% black print density, 0% print density, 10% greyscale print density, 20% greyscale print density, 30% greyscale print density, or the like). A print resolution may be associated with various operational parameters, such as laser output power, polygon mirror speed, start-of-line pulse, and/or the like. As such, the processing circuitry may utilize a stored correction lookup table or calculated function in memory to determine required adjustments/compensations to operational parameters for generating a target print resolution. By way of example, the processing circuitry may determine a required adjustment to a timing and/or power output associated with one or more laser sources of the printing apparatus. By way of example, the processing circuitry may determine, based at least in part on analysis of a printed media, that the 15% greyscale print density is darker than required. Therefore, the processing circuitry may determine that the 15% greyscale print density parameters (e.g., power output and/or timing of one or more lasers configured to impinge content at 15% greyscale print density) need to be reduced. In another example, the processing circuitry may determine, based at least in part on analysis of a printed media, that the 30% greyscale print density is lighter than required. Therefore, the processing circuitry may determine that the 30% greyscale print density parameters (e.g., power output and/or timing of one or more lasers configured to impinge content at 30% greyscale print density) need to be increased. In another example, the processing circuitry may determine, based at least in part on analysis of a printed media, that the 100% black print density is within target print quality parameters. Therefore, the processing circuitry may determine that no changes are required with respect to the 100% black print density parameters.

Subsequent to step/operation 6703, the method proceeds to step/operation 6705. At step/operation 6705, the processing circuitry transmits a control signal to cause the laser print head to adjust one or more operational parameters of the printing apparatus. For example, the processing circuitry may cause the laser print head to adjust one or more operational parameters of the optical assembly (such as, but not limited to, the optical assembly 6413 of laser print head controller 6400 illustrated in regard to FIG. 64). In some examples, the processing circuitry may cause the laser print head to adjust one or more of a laser output power, polygon mirror speed, start-of-line pulse, and/or the like.

Accordingly, using the above-detailed techniques, print quality issues due to variations in optical power caused by polarization and/or reflectivity characteristics of the optical assembly can be adjusted during design, manufacturing and/or in real-time during printing operations.

Lasing Single Print Lines Multiple Times

In various examples, delivery of sufficient power to a print media surface is critical for proper operation of a printing apparatus. The amount of optical power that can be delivered per laser scan or sweep is limited by the available laser power and optical system (e.g., optical assembly) losses, including less than 100% reflectivity on mirrors and less than 100% transmissivity in lenses. Additionally, minimum polygon motor operation speed is limited primarily by jitter performance. Slower polygon motor speeds result in higher jitter, which is incompatible with high precision laser imaging/printing.

In some embodiments, a number of required writes cycles (e.g., "N" write cycles) is a pre-determined value or integer based on, for example, a media type, a sweep rate, a required print speed and/or the like. In some examples, the laser print head/laser print head controller drives the laser sources, polygon motor, and printer platen roller in such a manner such that each horizontal print line on a surface of the print media is impinged (i.e., printed) "N" times. In some examples, adjacent polygon facets may be selectively used to facilitate the fastest possible printing. Any pyramidal error may be compensated for using wobble-correction optics, and any facet to facet angular error may be compensated for by adjusting laser timing.

Figure 68:
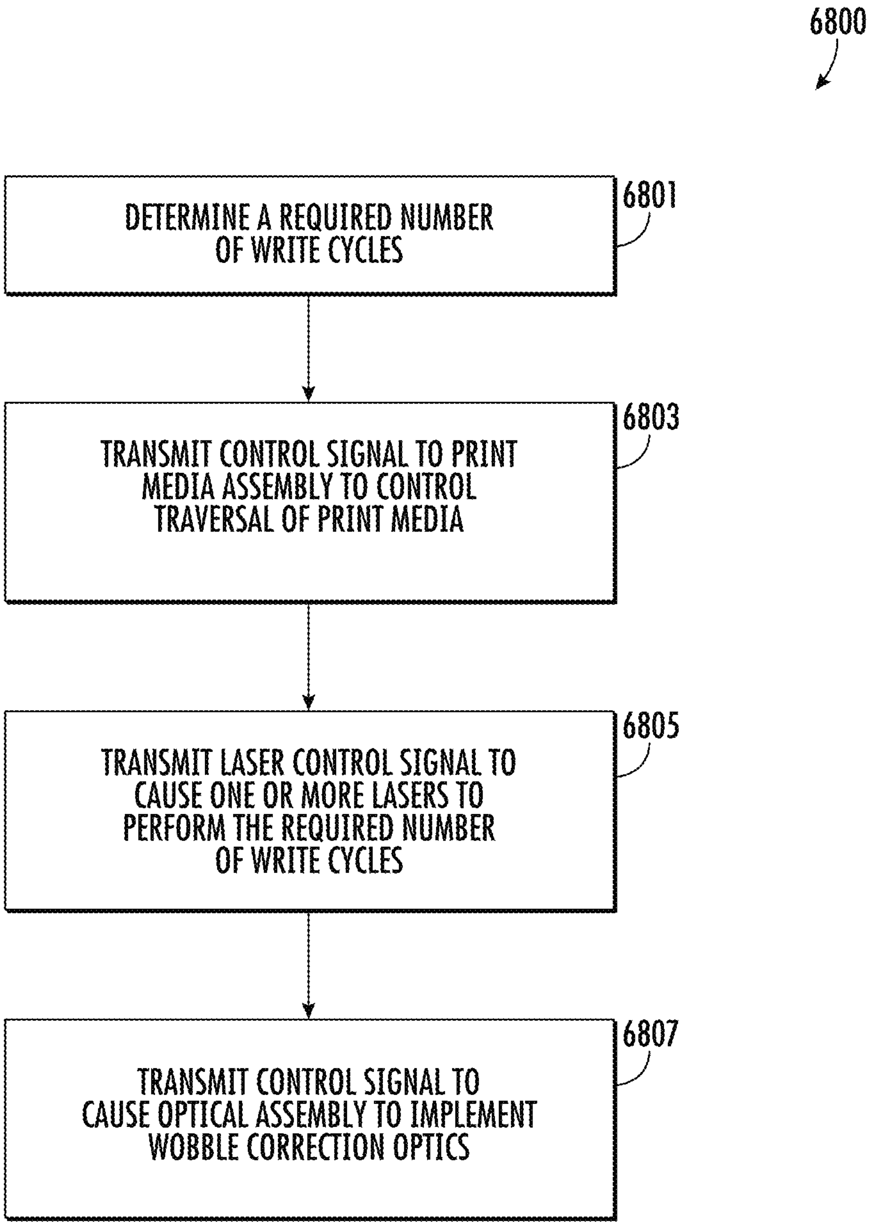
FIG. 68 illustrates a flowchart diagram illustrating example operations according to one or more embodiments described herein.

Referring now to FIG. 68, a flowchart diagram illustrating example operations 6800 in accordance with various embodiments of the present disclosure is provided. The operations 6800 may be performed by a laser print head controller. The laser print head controller may be similar to the laser print head controller 6400 described herein in connection with FIG. 64. For example, the laser print head controller may similarly comprise processing circuitry 6401, a communication module 6403, an input/output module 6405 and a memory 6407. The laser print head controller may be electrically coupled to and/or in electronic communication with various components of the printing apparatus such as one or more laser sources 6409, one or more sensors 6411, an optical assembly 6413 and a print media assembly 6415.

The example method 6800 begins with step/operation 6801. At step/operation 6801, a processing circuitry (such as, but not limited to, the processing circuitry 6401 of laser print head controller 6400 illustrated in regard to FIG. 64) determines a required number of write cycles with respect to particular data/content to be printed by the printing apparatus. As noted above, the number of write cycles may be determined based at least in part on a media type, a sweep rate and a required print speed. The number of write cycles may be a value or integer (e.g., "N") corresponding to a number of laser source iterations required to impinge/print the content.

Subsequent to step/operation 6801, the method 6800 proceeds to step/operation 6803. At step/operation 6803, the processing circuitry transmits a control signal to the print media assembly to control the traversal of the print media. In some examples, the laser print head controller may transmit a control signal to cause the print media assembly to stop or adjust a traversal speed of the print media.

Subsequent to step/operation 6803, the method 6800 proceeds to step/operation 6805. At step/operation 6805, the processing circuitry transmits a laser control signal to cause the one or more laser sources to perform the plurality of write cycles by generating one or more laser beams incident on the print media such that content is impinged onto a print media. Additionally, in some examples, adjacent polygon facets of the optical assembly may be selectively used to optimize print speed.

In some embodiments, the print media assembly may be in a fixed position while the one or more lasers impinge content thereon. In some embodiments, the print media assembly may operate to resume traversal of the print media, such as from a first width of the print media to a second width of the print media subsequent to content being impinged in an area corresponding with the first width. In some examples, the one or more laser sources may generate one or more laser beams incident on the print media while the print media traverses the printing apparatus. In another example, performing the plurality of write cycles may comprise sequentially sweeping a first portion of a first print media width. In some examples, subsequent to sequentially sweeping the first portion of the first print media width, a second portion of a second print media width may be scanned or swept. By way of example, the scan line of a laser beam may sweep at a rate such that the print media traverses a fraction of a dot. For instance, one or more laser beams may sweep a number of times (e.g., 10 times) during a time duration within which the print media traverses from a first width or line to a second width or line.

In some embodiments, prior to causing the one or more lasers to perform the pre-determined number of write cycles, the processing circuitry may transmit a control signal to cause the print media assembly to stop traversal of the print media. Then, the processing circuitry may transmit a laser control signal to cause one or more lasers to perform the pre-determined number of write cycles. Upon completion of the plurality of write cycles, the processing circuitry may transmit another control signal to cause the print media assembly to start (i.e., resume) traversal of the print media.

Subsequent to step/operation 6805, the method 6800 proceeds to step/operation 6807. At step/operation 6807, the processing circuitry transmits a control signal to cause the optical assembly to implement wobble-correction optics. As noted above, wobble-correction optics may be used to compensate for pyramidal error while facet to facet angular error may be compensated for by adjusting a timing of one or more lasers. Accordingly, by combining print media assembly and optical assembly control techniques, an example printing apparatus can produce high quality printed media that is also effective on print media with media coatings having higher sensitivity threshold characteristics.

Laser Spot Shaping Beam Delivery System

In many examples, a laser source/diode may have variable beam divergence that is not precisely controlled. Additionally, a laser source/diode may produce beams with elliptical cross sections. By way of example, the output of an example single mode laser source/diode (i.e., a laser beam shape) may diverge between 33 and 40 degrees. In another example, the output of an example multi-mode laser source/diode may diverge between 8 and 12 degrees. This variability translates to an inability to accurately control an output of a laser source/diode resulting in product variability and inconsistent performance. In some cases, a laser beam output/shape may be controlled by providing an aperture in front of the beam to truncate a portion of the laser beam output to a target size/shape. However, in situations where limited power is available (e.g., a lower power laser source/diode) using an aperture results in inefficiency and wastage of power.

Figure 69:
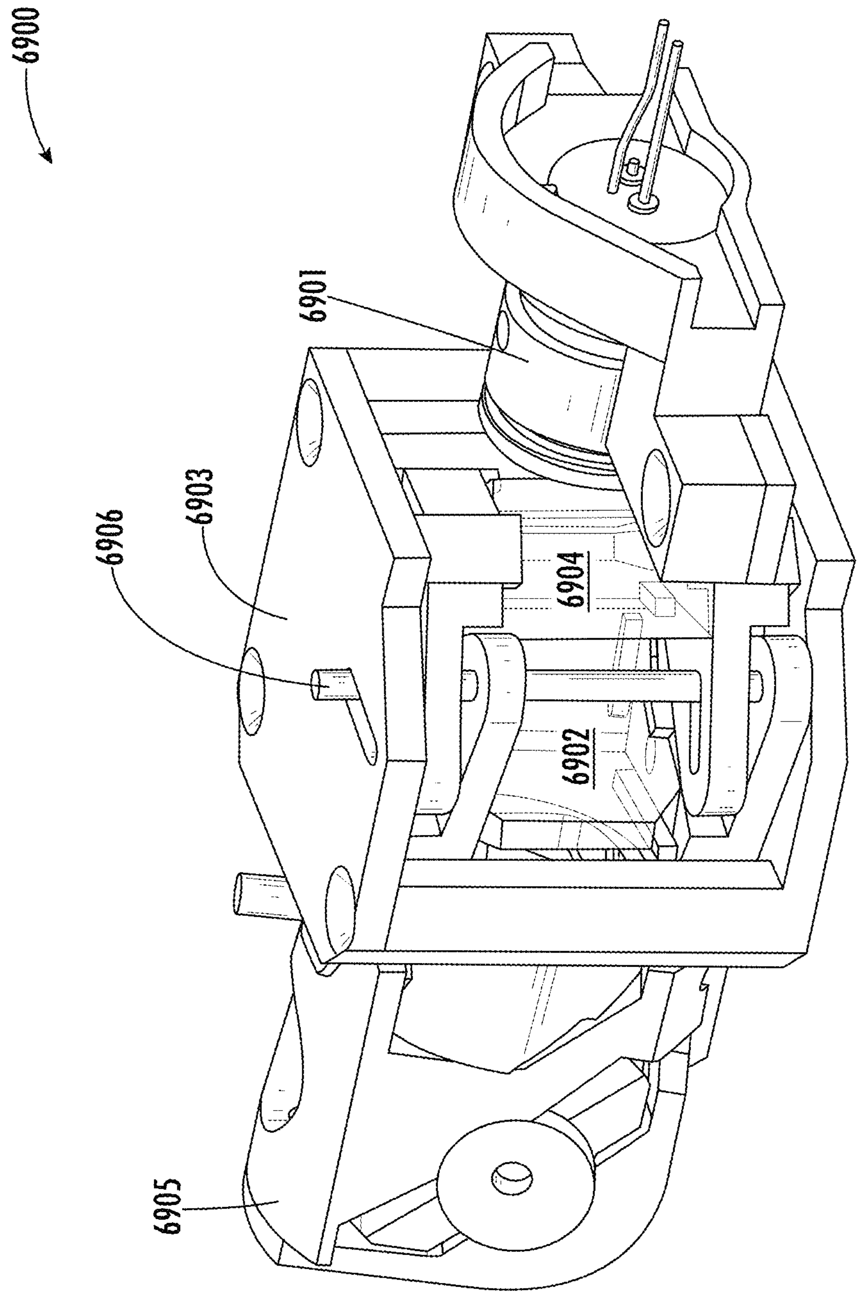
FIG. 69 illustrates an example schematic diagram depicting an optical assembly according to one or more embodiments described herein.

Referring now to FIG. 69, an example schematic diagram depicting an optical assembly 6900 in accordance with various embodiments of the present disclosure is provided. In various examples, the optical assembly 6900 may be configured to control or condition a laser beam (e.g., collimate, circularize and/or focus a laser beam). As depicted in FIG. 69, the optical assembly 6900 comprises a collimating component 6901, a beam control component 6903 and a focusing component 6905.

As depicted in FIG. 69, the optical assembly 6900 comprises a collimating component 6901 configured to collimate an output of a laser source (e.g., control a resolution of a laser beam in a cross-scan dimension). In various examples, the collimating component 6901 may be or comprise one or more pluralities of lenses (e.g., one or more groups of lenses). The optical assembly 6900 may be configured to operate with various types of laser sources/diodes, such as, but not limited to, a multi-mode laser, a single-mode laser, or the like. In some examples, the collimating component 6901 may be removably attached to or otherwise connected/coupled to an example laser assembly (e.g., comprising a laser source) so as to collimate an output (i.e., laser beam(s)) generated by the laser assembly. For example, at least one surface of the collimating component 6901 may be disposed adjacent to at least a surface of an example laser assembly.

As noted above, and as depicted in FIG. 69, the optical assembly 6900 comprises a beam control component 6903. As shown in some examples, at least a surface of the beam control component 6903 is disposed adjacent to a surface of the collimating component 6901 such that a laser beam can traverse the collimating component 6901 to reach the beam control component 6903. As depicted, the beam control component 6903 comprises a pair of prisms 6902 and 6904 (e.g., an anamorphic prism pair) configured to modify a dimension of a laser beam along one axis. For example, the beam control component 6903 may operate to modify the shape of a laser beam by adjusting angles between a laser beam and the example pair of prisms. In various examples, the beam control component 6903 may operate to modify an aspect ratio associated with a laser beam. For example, the beam control component 6903 may operate to modify an elliptical beam shape generated by a laser source into a circular beam shape. In various examples, the size of a laser beam may be reduced or expanded based on an angular relative position of the pair of prisms. In various examples, as depicted, the example beam control component 6903 comprises a control pin 6906 for simultaneously adjusting relative positions of the pair of prisms 6902 and 6904.

As noted above, and as depicted in FIG. 69, the optical assembly 6900 comprises a focusing component 6905 configured to direct an output (e.g., laser beam) of the optical assembly 6900 within an example printing apparatus (e.g., direct a laser beam to be incident on a print media). As shown in some examples, at least a surface of the focusing component 6905 may be disposed adjacent to a surface of the beam control component 6903 such that a laser beam traverses the beam control component 6903 to reach the focusing component 6905. In some examples, the focusing component 6905 may comprise one or more mirrors.

While some of the embodiments herein provide an example optical assembly 6900, it is noted that the present disclosure is not limited to such embodiments. For instance, in some examples, optical assembly 6900 in accordance with the present disclosure may comprise other elements, one or more additional and/or alternative elements, and/or may be structured/positioned differently than that illustrated in FIG. 69.

Figure 70:
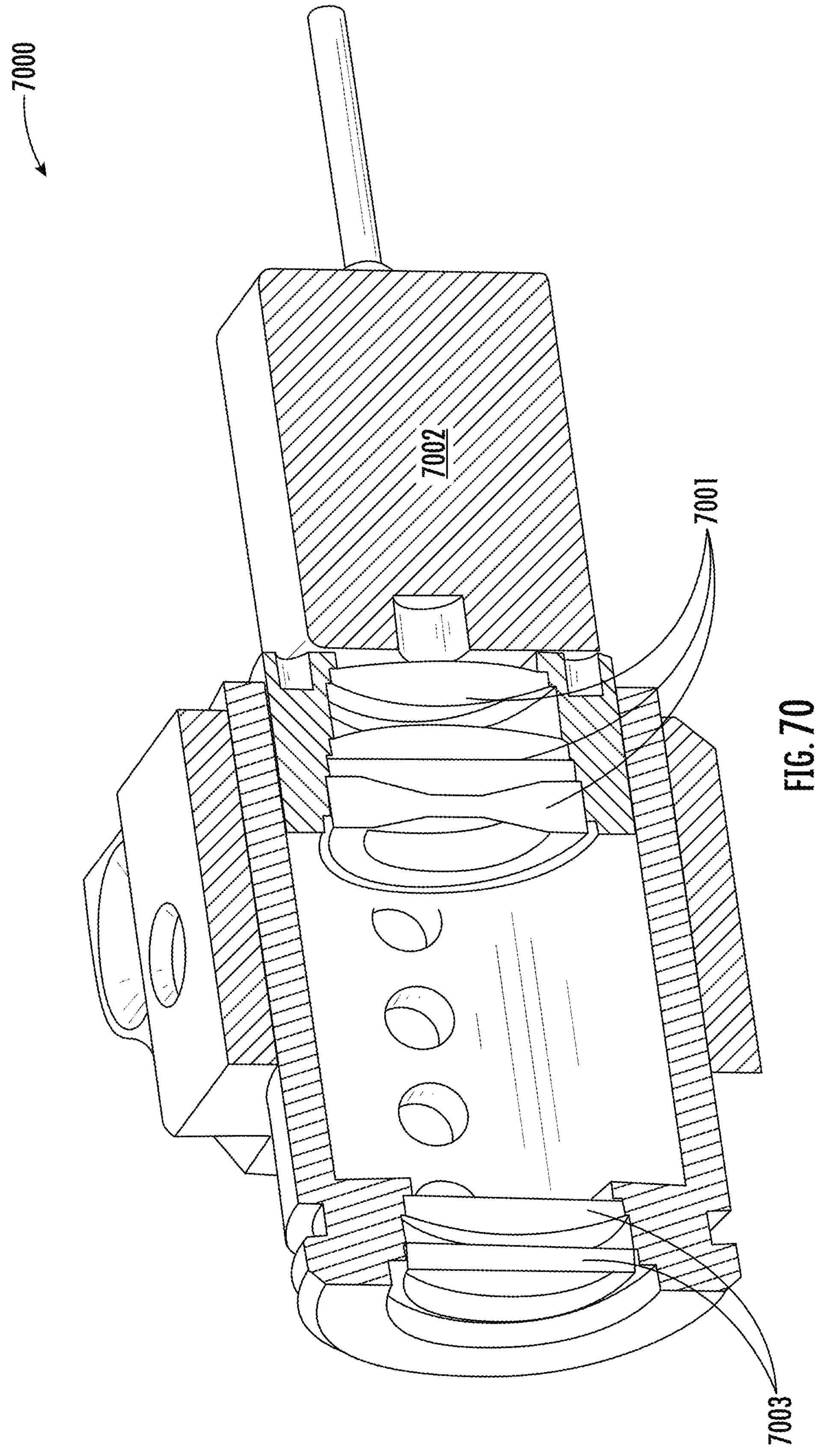
FIG. 70 illustrates an example cross-sectional view of a collimating component according to one or more embodiments described herein.

Referring now to FIG. 70, an example schematic diagram depicting a cross-sectional view of a collimating component 7000 in accordance with various embodiments of the present disclosure is provided. In various examples, the collimating component 7000 may be configured to collimate an output of a laser source (i.e., laser beams). For example, the collimating component 7000 may be configured to control a resolution of a laser beam in a cross-scan dimension. At least a surface of the collimating component 7000 may be disposed adjacent to at least a surface of an example laser assembly so as to collimate an output (i.e., laser beam(s)) generated by the laser assembly. The example collimating component 7000 may be configured to collimate an output of a multi-mode laser (e.g., in some examples, with a beam divergence variability between 8 and 12 degrees). In some examples, the collimating component 7000 may operate to focus the cross scan to approximately 1000 DPI in the cross-scan dimension.

In some examples, as depicted, the collimating component 7000 may be or comprise a cylindrical member (e.g., barrel) containing at least one plurality of lenses. As depicted in FIG. 70, the example collimating component 7000 comprises a housing 7002, a first plurality of lenses 7001 and a second plurality of lenses 7003. In various embodiments, the first plurality of lenses 7001 and the second plurality of lenses 7003 may be at least partially disposed within the housing 7002 of the collimating component 7000.

As depicted in FIG. 70, the example collimating component 7000 comprises a housing 7002. The example housing 7002 may be or comprised of a metal or any other suitable material.

As depicted in FIG. 70, the collimating component 7000 comprises a first plurality of lenses 7001. In some examples, the first plurality of lenses 7001 may be disposed within and/or define a first end portion of the collimating component 7000 (e.g., adjacent an example laser assembly). As depicted, the first plurality of lenses 7001 comprises three spherical lenses configured to move independently in relation to the second plurality of lenses 7003. Each spherical lens may comprise glass or a similar material. Each spherical lens may be or comprise a Fast-Axis Collimator (FAC). The example collimating component 7000 may operate to output a laser beam within a particular divergence range (e.g., 10×10 degrees Full Width Half Maximum (FWHM)). The example first plurality of lenses 7001 may be configured to tolerate a laser chip offset of plus or minus 0.1 mm. Accordingly, the first plurality of lenses 7001 may operate to control a resolution in a cross-scan dimension of a laser beam (e.g., a pre-energizing laser beam).

As depicted in FIG. 70, the collimating component 7000 comprises a second plurality of lenses 7003. In some examples, the second plurality of lenses 7003 may be disposed within and/or define a second end portion of the collimating component 7000 (e.g., remote from an example laser assembly). Thus, an example laser beam may travel from an example laser assembly to the first plurality of lenses 7001 and subsequently reach the second plurality of lenses 7003. As depicted, the second plurality of lenses 7001 comprises two spherical lenses configured to move independently in relation to the first plurality of lenses 7003. Each spherical lens may comprise glass or a similar material. Each spherical lens may be or comprise a Fast-Axis Collimator (FAC). The example second plurality of lenses 7003 may be configured to tolerate a laser chip offset of plus or minus 0.1 mm. Accordingly, the second plurality of lenses 7003 may also operate to control a resolution in a cross-scan dimension of a laser beam (e.g., a pre-energizing laser beam). Subsequent to reaching the second plurality of lenses 7003, the example laser beam may then enter another component of the optical assembly/printing apparatus (e.g., an example focusing component).

While some of the embodiments herein provide an example collimating component 7000, it is noted that the present disclosure is not limited to such embodiments. For instance, in some examples, a collimating component 7000 in accordance with the present disclosure may comprise other elements, one or more additional and/or alternative elements, and/or may be structured/positioned differently than that illustrated in FIG. 70.

Figure 71:
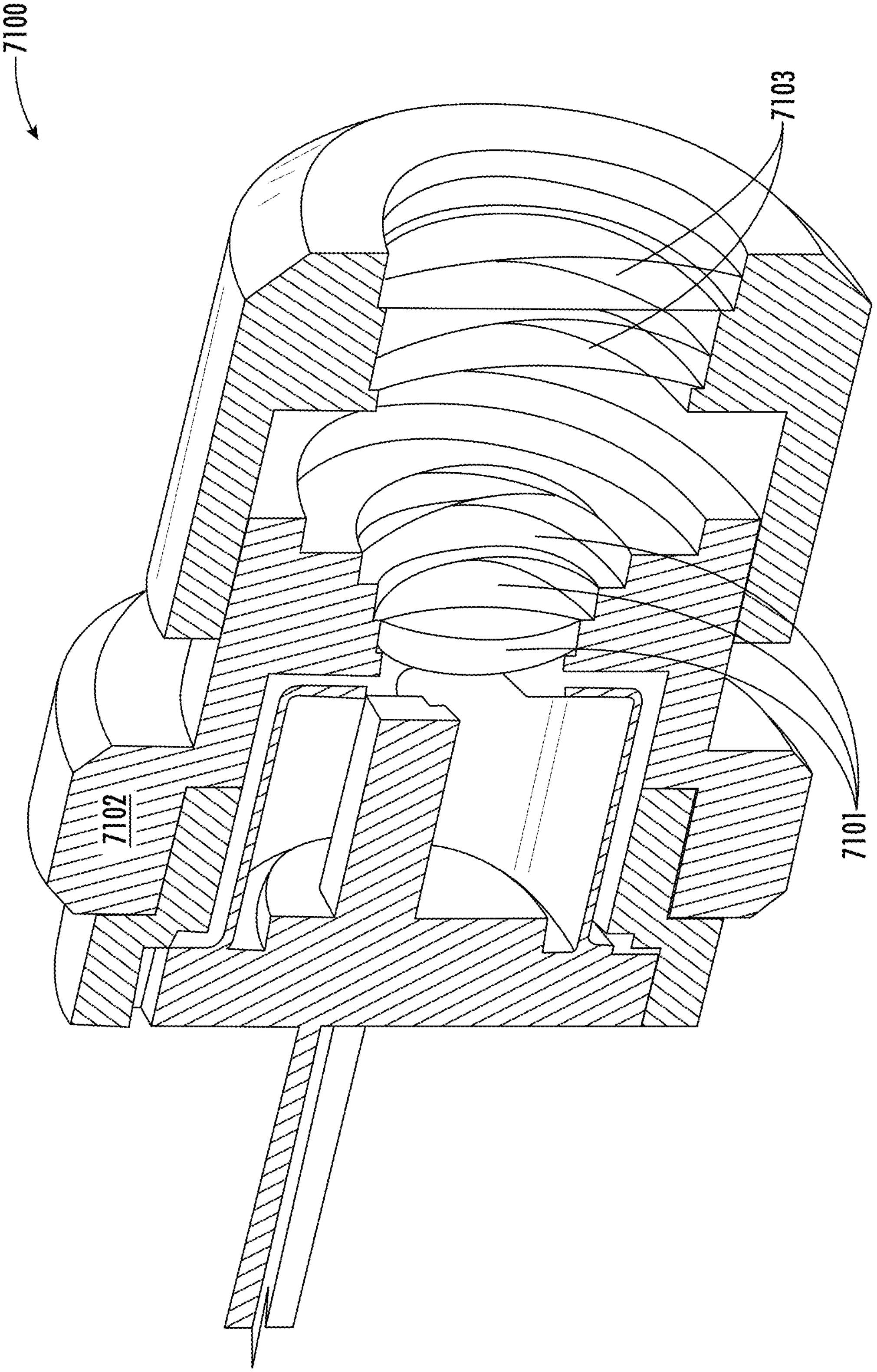
FIG. 71 illustrates an example schematic diagram depicting a cross-sectional view of a collimating component according to one or more embodiments described herein.

Referring now to FIG. 71, an example schematic diagram depicting a cross-sectional view of a collimating component 7100 in accordance with various embodiments of the present disclosure is provided. In various examples, the collimating component 7100 may be configured to collimate an output of a laser source (i.e., laser beams). For example, the collimating component 7100 may be configured to control a resolution of a laser beam in a cross-scan dimension. At least a surface of the collimating component 7100 may be disposed adjacent to at least a surface of an example laser assembly so as to collimate an output (i.e., laser beam(s)) generated by the laser assembly. The example collimating component 7100 may be configured to collimate an output of a single-mode laser (e.g., in some examples, with a beam divergence variability between 33 and 40 degrees). In some examples, the collimating component 7100 may operate to focus the cross-scan to approximately 1000 DPI in the cross-scan dimension.

In some examples, the collimating component 7100 may be or comprise a cylindrical member containing at least one plurality of lenses. The example housing 7002 may be or comprise a metal or any other suitable material. As depicted in FIG. 71, the example collimating component 7100 comprises a housing 7002, a first plurality of lenses 7101 and a second plurality of lenses 7103. In various embodiments, the first plurality of lenses 7101 and the second plurality of lenses 7103 may be at least partially disposed within the housing 7102 of the collimating component 7100.

As depicted in FIG. 71, the collimating component 7100 comprises a first plurality of lenses 7101. In some examples, the first plurality of lenses 7101 may be disposed within and/or define a first end portion of the collimating component 7100 (e.g., adjacent an example laser assembly). As depicted, the first plurality of lenses 7101 comprises three spherical lenses configured to move independently in relation to the second plurality of lenses 7103. Each spherical lens may comprise glass or a similar material. Each spherical lens may be or comprise a Fast-Axis Collimator (FAC). The example collimating component 7100 may operate to output a laser beam within a particular divergence range (e.g., 35×5 degrees FWHM). The example first plurality of lenses 7101 may be configured to tolerate a laser chip offset of plus or minus 0.1 mm. Accordingly, the first plurality of lenses 7101 may operate to control a resolution in a cross-scan dimension of a laser beam (e.g., a writing laser beam).

As depicted in FIG. 71, the collimating component 7100 comprises a second plurality of lenses 7103. In some examples, the second plurality of lenses 7103 may be disposed within and/or define a second end portion of the collimating component 7100 (e.g., remote from an example laser assembly). Thus, an example laser beam may travel from an example laser assembly to the first plurality of lenses 7101 and subsequently reach the second plurality of lenses 7103. As depicted, the second plurality of lenses 7101 comprises two spherical lenses configured to move independently in relation to the first plurality of lenses 7103. Each spherical lens may comprise glass or a similar material. Each spherical lens may be or comprise a Fast-Axis Collimator (FAC). The example second plurality of lenses 7103 may be configured to tolerate a laser chip offset of plus or minus 0.1 mm. Accordingly, the second plurality of lenses 7103 may also operate to control a resolution in a cross-scan dimension of a laser beam (e.g., a writing laser beam). The slow axis of the example collimating component 7100 may be collimated and expanded to produce approximately 200 DPI directly through the first and second plurality of lenses 7101 and 7103 in the scan dimension. Subsequent to reaching the second plurality of lenses 7103, the example laser beam may then enter another component of the optical assembly/printing apparatus (e.g., an example focusing component).

While some of the embodiments herein provide an example collimating component 7100, it is noted that the present disclosure is not limited to such embodiments. For instance, in some examples, a collimating component 7100 in accordance with the present disclosure may comprise other elements, one or more additional and/or alternative elements, and/or may be structured/positioned differently than that illustrated in FIG. 71.

Figure 72:
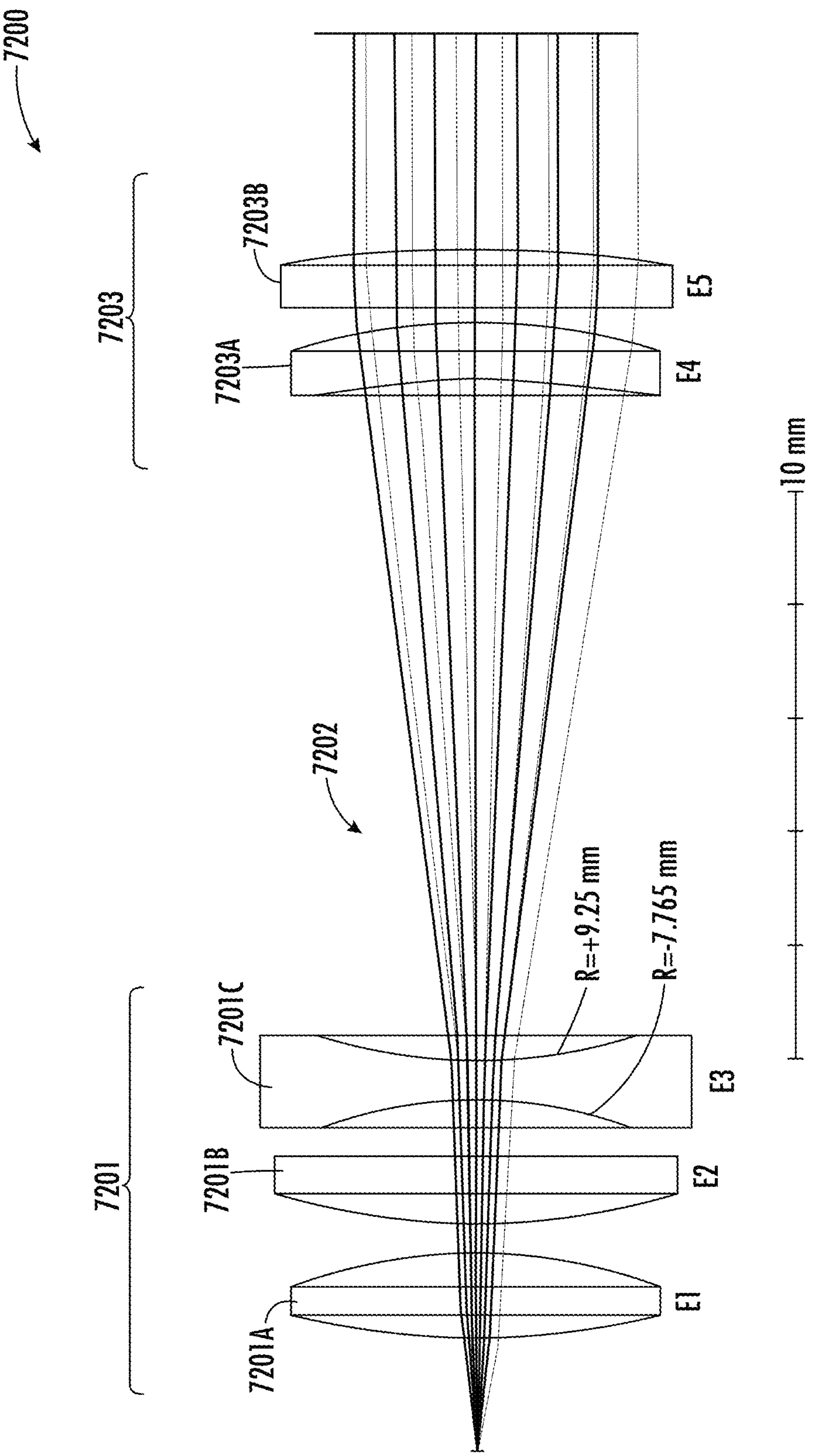
FIG. 72 illustrates an example schematic diagram depicting a side view of at least a portion of a collimating component according to one or more embodiments described herein.

Referring now to FIG. 72, an example schematic diagram depicting a side view of at least a portion of a collimating component 7200 in accordance with various embodiments of the present disclosure is provided. In various examples, the collimating component 7200 may be configured to collimate an output of a laser source (i.e., laser beams). The example collimating component 7200 may be at least partially disposed within a housing (e.g., cylindrical member, barrel, or the like). For example, the collimating component 7200 may be configured to control a resolution of a laser beam in a cross-scan dimension. At least a surface of the collimating component 7200 may be disposed adjacent at least a surface of an example laser assembly so as to collimate an output (i.e., laser beam(s)) generated by the laser assembly. The example collimating component 7200 may be configured to collimate an output of a multi-mode laser (e.g., in some examples, with a beam divergence variability between 8 and 12 degrees). In some examples, the collimating component 7200 may operate to focus the cross-scan to approximately 1000 DPI in the cross-scan dimension. As depicted in FIG. 72, the example collimating component 7200 comprises a first plurality of lenses 7201 and a second plurality of lenses 7203.

As depicted in FIG. 72, the collimating component 7200 comprises a first plurality of lenses 7201. In some examples, the first plurality of lenses 7201 may be disposed within and/or define a first end portion of the collimating component 7200 (e.g., adjacent an example laser assembly). Said differently, the first plurality of lenses 7201 may be disposed at a first distance with respect to an example laser assembly. The first plurality of lenses 7201 may be configured to move independently (i.e., as a group) in relation to the second plurality of lenses 7203. For example, the first plurality of lenses 7201 may be configured to move horizontally along an example laser beam path 7202. As depicted, the first plurality of lenses 7201 comprises a first spherical lens 7201A, a second spherical lens 7201B, and a third spherical lens 7201C disposed in a parallel configuration with respect to one another. Each spherical lens 7201A, 7201B and 7201C may comprise glass or a similar material. In some examples, each spherical lens 7201A, 7201B and 7201C may have a diameter between 5 mm and 10 mm. As further depicted in FIG. 72, each spherical lens 7201A, 7201B and 7201C may have different dimensions, shapes and/or be configured differently from one another. In some examples, each spherical lens 7201A, 7201B and 7201C may be or comprise a Fast-Axis Collimator (FAC). The example collimating component 7200 may operate to output a laser beam within a particular divergence range (e.g., 10×10 degrees Full Width Half Maximum (FWHM)). The example each spherical lenses 7201A, 7201B and 7201C may be configured to tolerate a laser chip offset of plus or minus 0.1 mm. In some examples, the first plurality of lenses 7201 may operate to control a resolution in a cross-scan dimension of a laser beam (e.g., a pre-energizing laser beam).

As depicted in FIG. 72, the collimating component 7200 comprises a second plurality of lenses 7203. In some examples, the second plurality of lenses 7203 may be disposed within and/or define a second end portion of the collimating component 7200 (e.g., remote from an example laser assembly). As shown, the example second plurality of lenses 7203 may be disposed approximately 10-12 mm from the first plurality of lenses 7201. In other words, the second plurality of lenses 7202 may be disposed at a second distance with respect to the example laser assembly such that the second plurality of lenses 7202 is disposed further from the laser assembly than the first plurality of lenses 7201. Thus, an example laser beam may travel from an example laser assembly to the first plurality of lenses 7201 and subsequently reach the second plurality of lenses 7203. As depicted, the second plurality of lenses 7203 comprises a first spherical lens 7203A and a second spherical lens 7203B disposed in a parallel configuration with respect to one another. Each spherical lens 7203A and 7203B may be configured to move independently (i.e., as a group) in relation to the first plurality of lenses 7201. For example, the second plurality of lenses 7202 may be configured to move horizontally along an example laser beam path 7202. Each spherical lens 7203A and 7203B may comprise glass or a similar material. In some examples, each spherical lens 7203A and 7203B may have a diameter between 5 mm and 10 mm. As depicted in FIG. 72, each spherical lens 7203A and 7203B may have different dimensions, shapes and/or be configured differently from one another. Each spherical lens 7203A and 7203B may be or comprise a Fast-Axis Collimator (FAC). The example second plurality of lenses 7203 may be configured to tolerate a laser chip offset of plus or minus 0.1 mm. Accordingly, the second plurality of lenses 7203 may also operate to control a resolution in a cross-scan dimension of a laser beam (e.g., a pre-energizing laser beam). Subsequent to reaching the second plurality of lenses 7203, the example laser beam may then enter another component/element of the optical assembly/printing apparatus (e.g., an example focusing component).

While some of the embodiments herein provide an example portion of a collimating component 7200, it is noted that the present disclosure is not limited to such embodiments. For instance, in some examples, a collimating component 7200 in accordance with the present disclosure may comprise other elements, one or more additional and/or alternative elements, and/or may be structured/positioned differently than that illustrated in FIG. 72.

Figure 73:
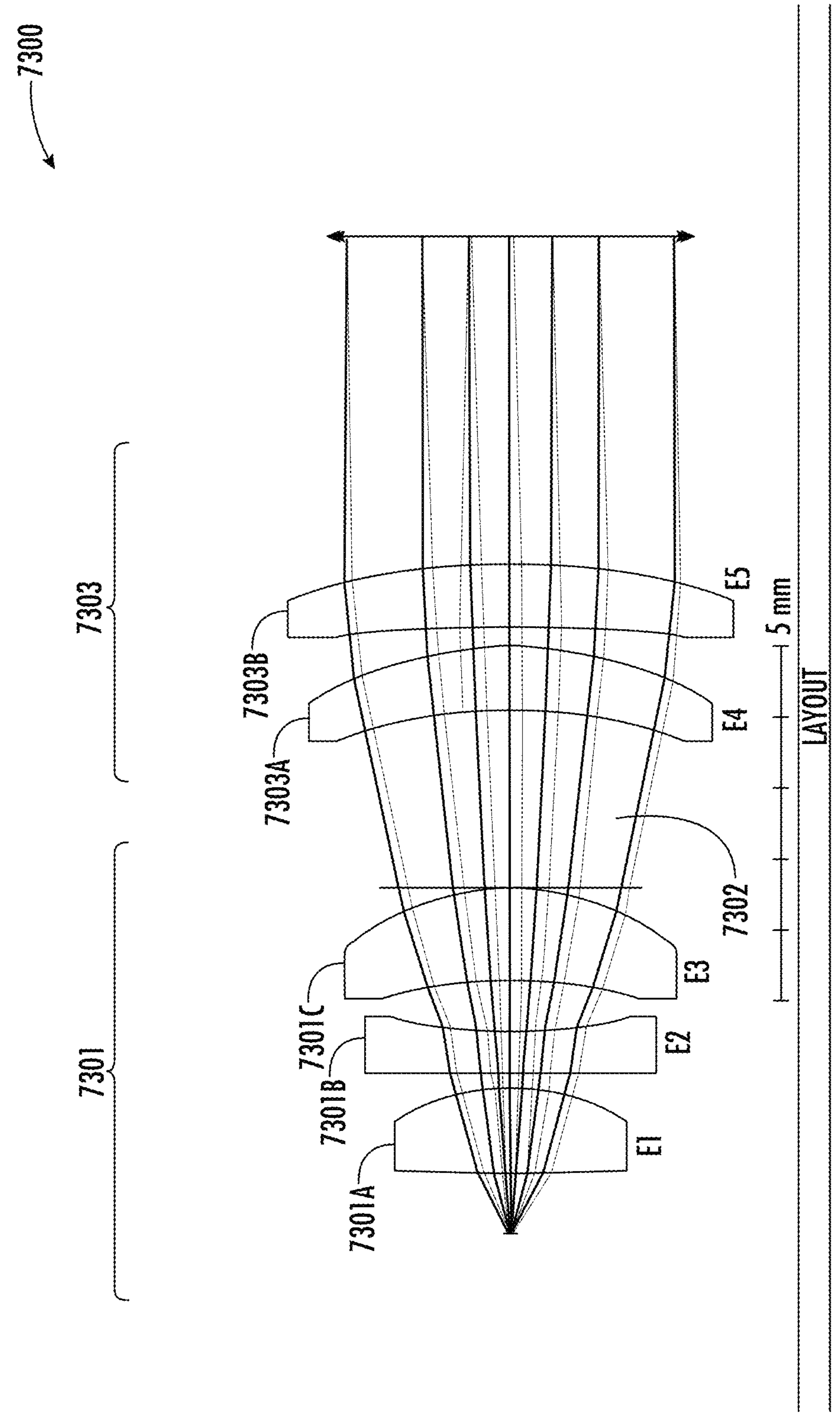
FIG. 73 illustrates an example schematic diagram depicting a side view of at least a portion of a collimating according to one or more embodiments described herein.

Referring now to FIG. 73, an example schematic diagram depicting a side view of at least a portion of a collimating component 7300 in accordance with various embodiments of the present disclosure is provided. In various examples, the collimating component 7300 may be configured to collimate an output of a laser source (i.e., laser beams). The example collimating component 7300 may be at least partially disposed within a housing (e.g., cylindrical member, barrel, or the like). For example, the collimating component 7300 may be configured to control a resolution of a laser beam in a cross-scan dimension. At least a surface of the collimating component 7300 may be disposed adjacent at least a surface of an example laser assembly so as to collimate an output (i.e., laser beam(s)) generated by the laser assembly. The example collimating component 7300 may be configured to collimate an output of a multi-mode laser (e.g., in some examples, with a beam divergence variability between 8 and 12 degrees). In some examples, the collimating component 7300 may operate to focus the cross-scan to approximately 1000 DPI in the cross-scan dimension. As depicted in FIG. 73, the example collimating component 7300 comprises a first plurality of lenses 7301 and a second plurality of lenses 7303.

As depicted in FIG. 73, the collimating component 7300 comprises a first plurality of lenses 7301. In some examples, the first plurality of lenses 7301 may be disposed within and/or define a first end portion of the collimating component 7300 (e.g., adjacent an example laser assembly). Said differently, the first plurality of lenses 7301 may be disposed at a first distance with respect to an example laser assembly. The first plurality of lenses 7301 may be configured to move independently (i.e., as a group) in relation to the second plurality of lenses 7303. For example, the first plurality of lenses 7301 may be configured to move horizontally along an example laser beam path 7302. As depicted, the first plurality of lenses 7301 comprises a first spherical lens 7301A, a second spherical lens 7301B, and a third spherical lens 7301C disposed in a parallel configuration with respect to one another. Each spherical lens 7301A, 7301B and 7301C may comprise glass or a similar material. In some examples, each spherical lens 7301A, 7301B and 7301C may have a diameter between 5 mm and 10 mm. As further depicted in FIG. 73, each spherical lens 7301A, 7301B and 7301C may have different dimensions, shapes and/or be configured differently from one another. In some examples, each spherical lens 7301A, 7301B and 7301C may be or comprise a Fast-Axis Collimator (FAC). The example collimating component 7300 may operate to output a laser beam within a particular divergence range (e.g., 10×10 degrees Full Width Half Maximum (FWHM)). The example each spherical lenses 7301A, 7301B and 7301C may be configured to tolerate a laser chip offset of plus or minus 0.1 mm. In some examples, the first plurality of lenses 7301 may operate to control a resolution in a cross-scan dimension of a laser beam (e.g., a pre-energizing laser beam).

As depicted in FIG. 73, the collimating component 7300 comprises a second plurality of lenses 7303. In some examples, the second plurality of lenses 7303 may be disposed within and/or define a second end portion of the collimating component 7300 (e.g., remote from an example laser assembly). As shown, the example second plurality of lenses 7303 may be disposed approximately 10-12 mm from the first plurality of lenses 7301. In other words, the second plurality of lenses 7303 may be disposed at a second distance with respect to the example laser assembly such that the second plurality of lenses 7303 is disposed further from the laser assembly than the first plurality of lenses 7301. Thus, an example laser beam may travel from an example laser assembly to the first plurality of lenses 7301 and subsequently reach the second plurality of lenses 7303. As depicted, the second plurality of lenses 7303 comprises a first spherical lens 7303A and a second spherical lens 7303B disposed in a parallel configuration with respect to one another. Each spherical lens 7303A and 7303B may be configured to move independently (i.e., as a group) in relation to the first plurality of lenses 7301. For example, the second plurality of lenses 7303 may be configured to move horizontally along an example laser beam path 7302. Each spherical lens 7303A and 7303B may comprise glass or a similar material. In some examples, each spherical lens 7303A and 7303B may have a diameter between 5 mm and 10 mm. As depicted in FIG. 73, each spherical lens 7303A and 7303B may have different dimensions, shapes and/or be configured differently from one another. Each spherical lens 7303A and 7303B may be or comprise a Fast-Axis Collimator (FAC). The example second plurality of lenses 7303 may be configured to tolerate a laser chip offset of plus or minus 0.1 mm. Accordingly, the second plurality of lenses 7303 may also operate to control a resolution in a cross-scan dimension of a laser beam (e.g., a pre-energizing laser beam). Subsequent to reaching the second plurality of lenses 7303, the example laser beam may then enter another component/element of the optical assembly/printing apparatus (e.g., an example focusing component).

While some of the embodiments herein provide an example portion of a collimating component 7300, it is noted that the present disclosure is not limited to such embodiments. For instance, in some examples, a collimating component 7300 in accordance with the present disclosure may comprise other elements, one or more additional and/or alternative elements, and/or may be structured/positioned differently than that illustrated in FIG. 73.

Figure 74:
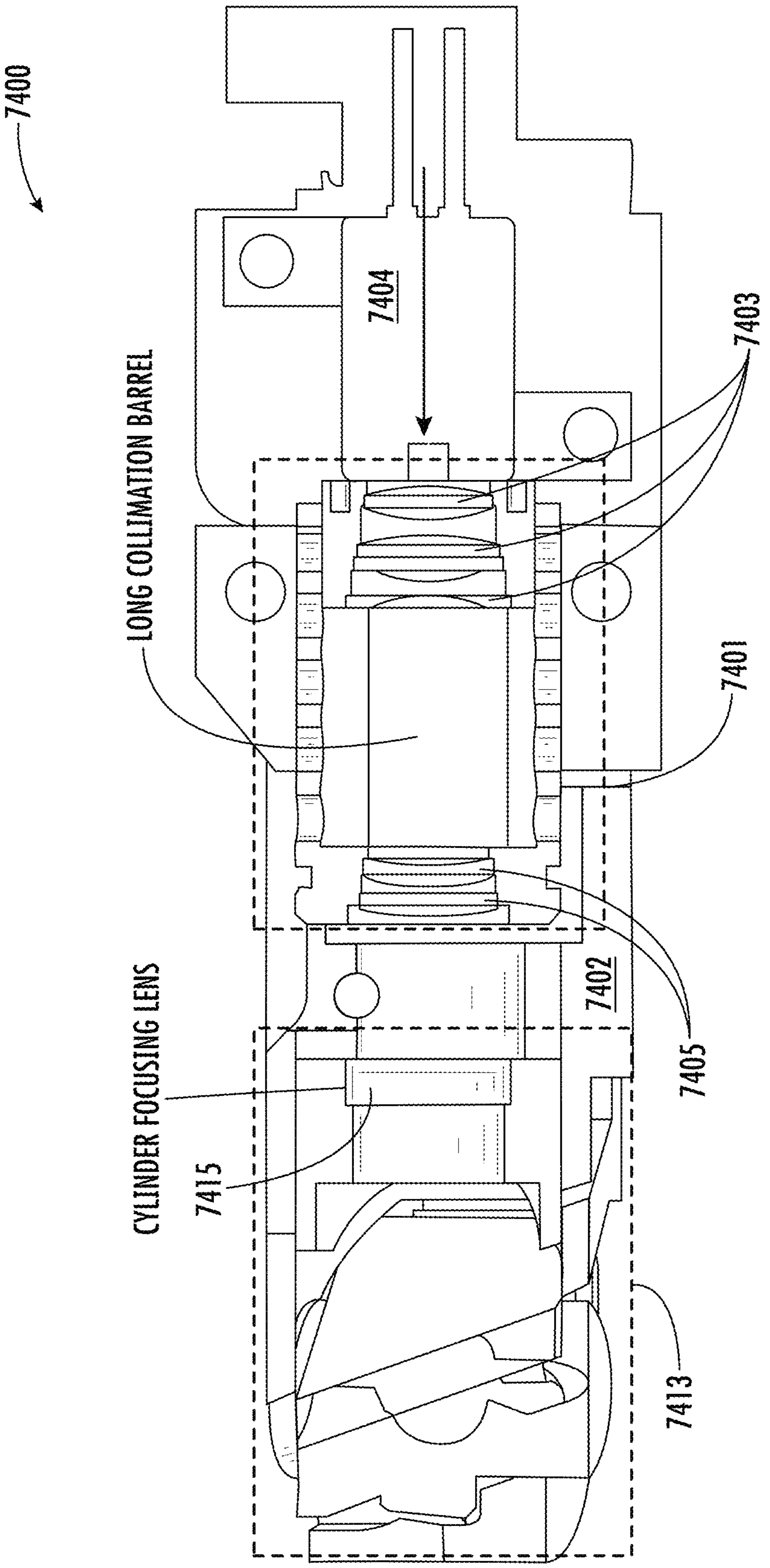
FIG. 74 illustrates an example schematic diagram depicting a top section view of an optical assembly according to one or more embodiments described herein.

Referring now to FIG. 74, an example schematic diagram depicting a top section view of an optical assembly 7400 in accordance with various embodiments of the present disclosure is provided. In various examples, the optical assembly 7400 may be configured to collimate, circularize and/or focus laser beams. As depicted in FIG. 74, the optical assembly 7400 comprises a collimating component 7401 and a focusing component 7413. The example optical assembly 7400 may operate to collimate an output (i.e., laser beam(s)) generated by an example laser assembly (e.g., a multi-mode laser). In some examples, at least one surface of the collimating component 7401 may be disposed adjacent at least a surface of the example laser assembly.

As depicted in FIG. 74, the optical assembly 7400 comprises a collimating component 7401 configured to control a resolution in a cross-scan dimension of a laser beam (e.g., pre-energizing laser beam). The collimating component 7401 may be similar to the collimating component 7200 described above in connection with FIG. 72. As depicted, the collimating component 7401 comprises a cylindrical member/barrel. In some examples, as depicted, the collimating component 7401 is at least partially disposed within a housing 7402 of the optical assembly 7400. In various examples, the collimating component 7401 may be or comprise one or more pluralities of lenses (e.g., one or more groups of lenses). As depicted, the collimating component 7401 comprises a first plurality of lenses 7403 and a second plurality of lenses 7405. In some examples, as further depicted, the first plurality of lenses 7403 comprises three spherical lenses and the second plurality of lenses 7405 comprises two spherical lenses.

In some examples, the first plurality of lenses 7403 may be disposed within and/or define a first end portion of the collimating component 7401 (e.g., adjacent an example laser assembly). Said differently, the first plurality of lenses 7403 may be disposed at a first distance with respect to an example laser assembly. The first plurality of lenses 7403 may be configured to move independently (i.e., as a group) in relation to the second plurality of lenses 7405. For example, the first plurality of lenses 7403 may be configured to move horizontally along an example laser beam path 7404.

As depicted in FIG. 74, the collimating component 7401 comprises a second plurality of lenses 7405. In some examples, the second plurality of lenses 7405 may be disposed within and/or define a second end portion of the collimating component 7401 (e.g., remote from an example laser assembly). Said differently, the second plurality of lenses 7405 may be disposed at a second distance with respect to the example laser assembly such that the second plurality of lenses 7405 is disposed further from the laser assembly than the first plurality of lenses 7403. Thus, an example laser beam may travel from an example laser assembly to the first plurality of lenses 7403 and subsequently reach the second plurality of lenses 7405. The second plurality of lenses 7405 may be configured to move independently (i.e., as a group) in relation to the first plurality of lenses 7403. For example, the second plurality of lenses 7405 may be configured to move horizontally along the example laser beam path 7404. Subsequent to reaching the second plurality of lenses 7405, the example laser beam may then enter another component/element of the optical assembly/printing apparatus (e.g., in some examples, the focusing component 7413).

As noted above, and as depicted in FIG. 74, the optical assembly 7400 comprises a focusing component 7413 configured to direct an output (e.g., laser beam) of the optical assembly 7400 within an example printing apparatus (e.g., direct a laser beam to be incident on a print media). As shown, in some examples, at least a surface of the focusing component 7413 may be disposed adjacent a surface of the collimating component 7401 such that a laser beam can traverse the collimating component 7401 to reach the focusing component 7413. In some examples, as depicted, the focusing component 7413 may comprise a focusing lens 7415, one or more mirrors, and/or the like.

While some of the embodiments herein provide an example optical assembly 7400, it is noted that the present disclosure is not limited to such embodiments. For instance, in some examples, optical assembly 7400 in accordance with the present disclosure may comprise other elements, one or more additional and/or alternative elements, and/or may be structured/positioned differently than that illustrated in FIG. 74.

Figure 75:
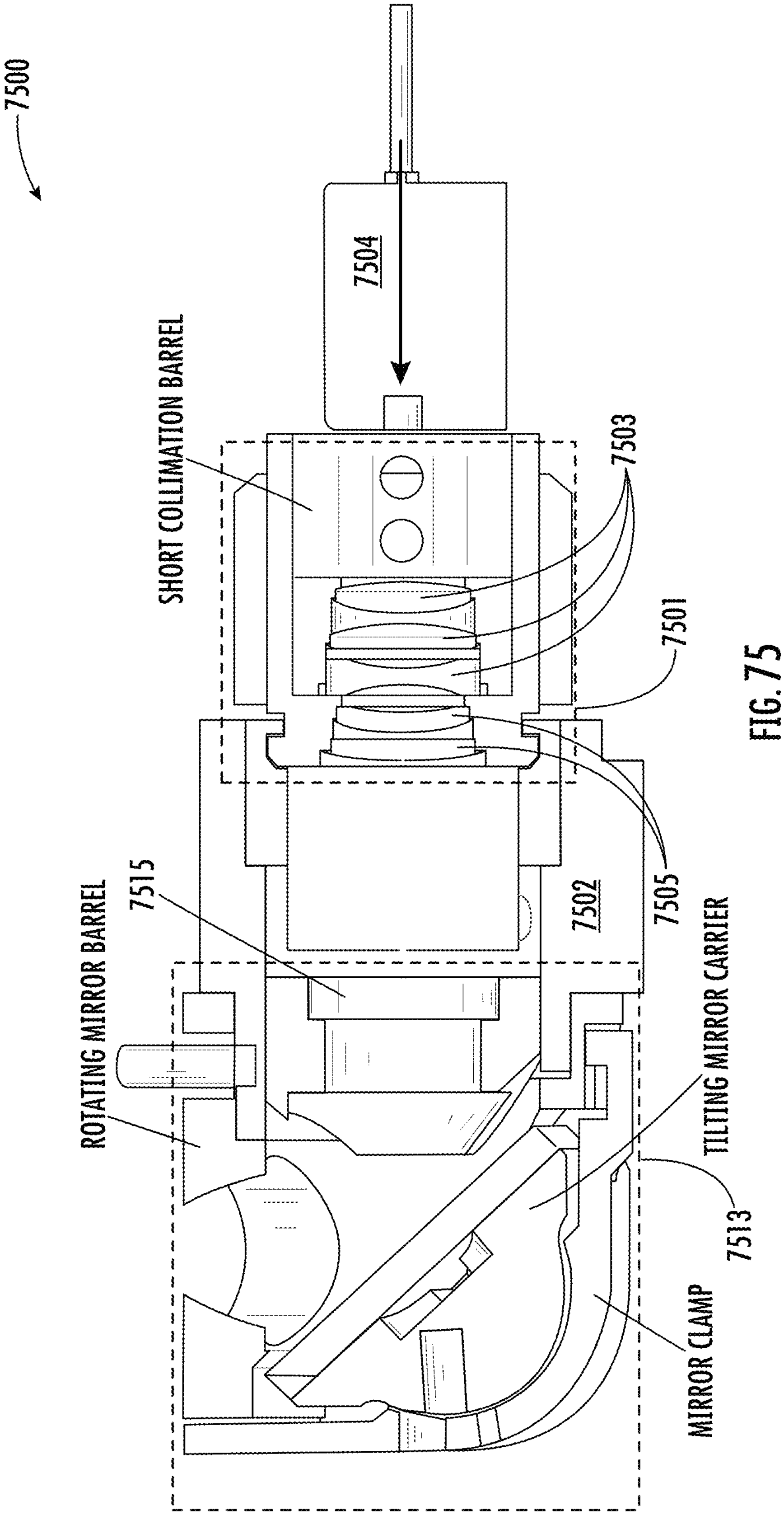
FIG. 75 illustrates an example schematic diagram depicting a top section view of an optical assembly according to one or more embodiments described herein.

Referring now to FIG. 75, an example schematic diagram depicting a top section view of an optical assembly 7500 in accordance with various embodiments of the present disclosure is provided. The example optical assembly 7500 may be similar or identical to the optical assembly 7400 described above in connection with FIG. 74. In various examples, the optical assembly 7500 may be configured to collimate, circularize and/or focus laser beams. As depicted in FIG. 75, the optical assembly 7500 comprises a collimating component 7501 and a focusing component 7513. The example optical assembly 7500 may operate to collimate an output (i.e., laser beam(s)) generated by an example laser assembly (e.g., a multi-mode laser). In some examples, at least one surface of the collimating component 7501 may be disposed adjacent to at least a surface of the example laser assembly.

As depicted in FIG. 75, the optical assembly 7500 comprises a collimating component 7501 configured to control a resolution in a cross-scan dimension of a laser beam (e.g., pre-energizing laser beam). The collimating component 7501 may be similar to the collimating component 7200 described above in connection with FIG. 72. As depicted, the collimating component 7501 comprises a cylindrical member/barrel. In some examples, as depicted, the collimating component 7501 is at least partially disposed within a housing 7502 of the optical assembly 7500. In various examples, the collimating component 7501 may be or comprise one or more pluralities of lenses (e.g., one or more groups of lenses). As depicted, the collimating component 7501 comprises a first plurality of lenses 7503 and a second plurality of lenses 7505. In some examples, as further depicted, the first plurality of lenses 7503 comprises three spherical lenses and the second plurality of lenses 7505 comprises two spherical lenses.

In some examples, the first plurality of lenses 7503 may be disposed within and/or define a first end portion of the collimating component 7501 (e.g., adjacent an example laser assembly). Said differently, the first plurality of lenses 7503 may be disposed at a first distance with respect to an example laser assembly. The first plurality of lenses 7503 may be configured to move independently (i.e., as a group) in relation to the second plurality of lenses 7505. For example, the first plurality of lenses 7503 may be configured to move horizontally along an example laser beam path 7504.

As depicted in FIG. 75, the collimating component 7501 comprises a second plurality of lenses 7505. In some examples, the second plurality of lenses 7505 may be disposed within and/or define a second end portion of the collimating component 7501 (e.g., remote from an example laser assembly). Said differently, the second plurality of lenses 7505 may be disposed at a second distance with respect to the example laser assembly such that the second plurality of lenses 7505 is disposed further from the laser assembly than the first plurality of lenses 7503. Thus, an example laser beam may travel from an example laser assembly to the first plurality of lenses 7503 and subsequently reach the second plurality of lenses 7505. The second plurality of lenses 7505 may be configured to move independently (i.e., as a group) in relation to the first plurality of lenses 7503. In various examples, the collimating component 7501 may be configured to move within the housing 7502 of the optical assembly 7500 so as to vary the relative positions of the first plurality of lenses 7503 and the second plurality of lenses 7505. As depicted in FIG. 75, the collimating component 7501 may be configured to retract in order to modify a distance between the first plurality of the lenses 7503 and the second plurality of lenses 7505. Referring again to FIG. 75, the example collimating component 7501 is depicted in an extended state in comparison to the collimating component 7501 depicted in FIG. 75 which is in a retracted state. Accordingly, the first plurality of lenses 7503 and/or the second plurality of lenses 7505 may be configured to move horizontally along the example laser beam path 7504. In various examples, subsequent to reaching the second plurality of lenses 7505, the example laser beam may then enter another component/element of the optical assembly/printing apparatus (e.g., in some examples, the focusing component 7513).

As noted above, and as depicted in FIG. 75, the optical assembly 7500 comprises a focusing component 7513 configured to direct an output (e.g., laser beam) of the optical assembly 7500 within an example printing apparatus (e.g., direct a laser beam to be incident on a print media). As shown, in some examples, at least a surface of the focusing component 7513 may be disposed adjacent a surface of the collimating component 7501 such that a laser beam can traverse the collimating component 7501 to reach the focusing component 7513. In some examples, as depicted, the focusing component 7513 may comprise a focusing lens 7515, one or more mirrors, and/or the like.

While some of the embodiments herein provide an example optical assembly 7500, it is noted that the present disclosure is not limited to such embodiments. For instance, in some examples, optical assembly 7500 in accordance with the present disclosure may comprise other elements, one or more additional and/or alternative elements, and/or may be structured/positioned differently than that illustrated in FIG. 75.

Figure 76:
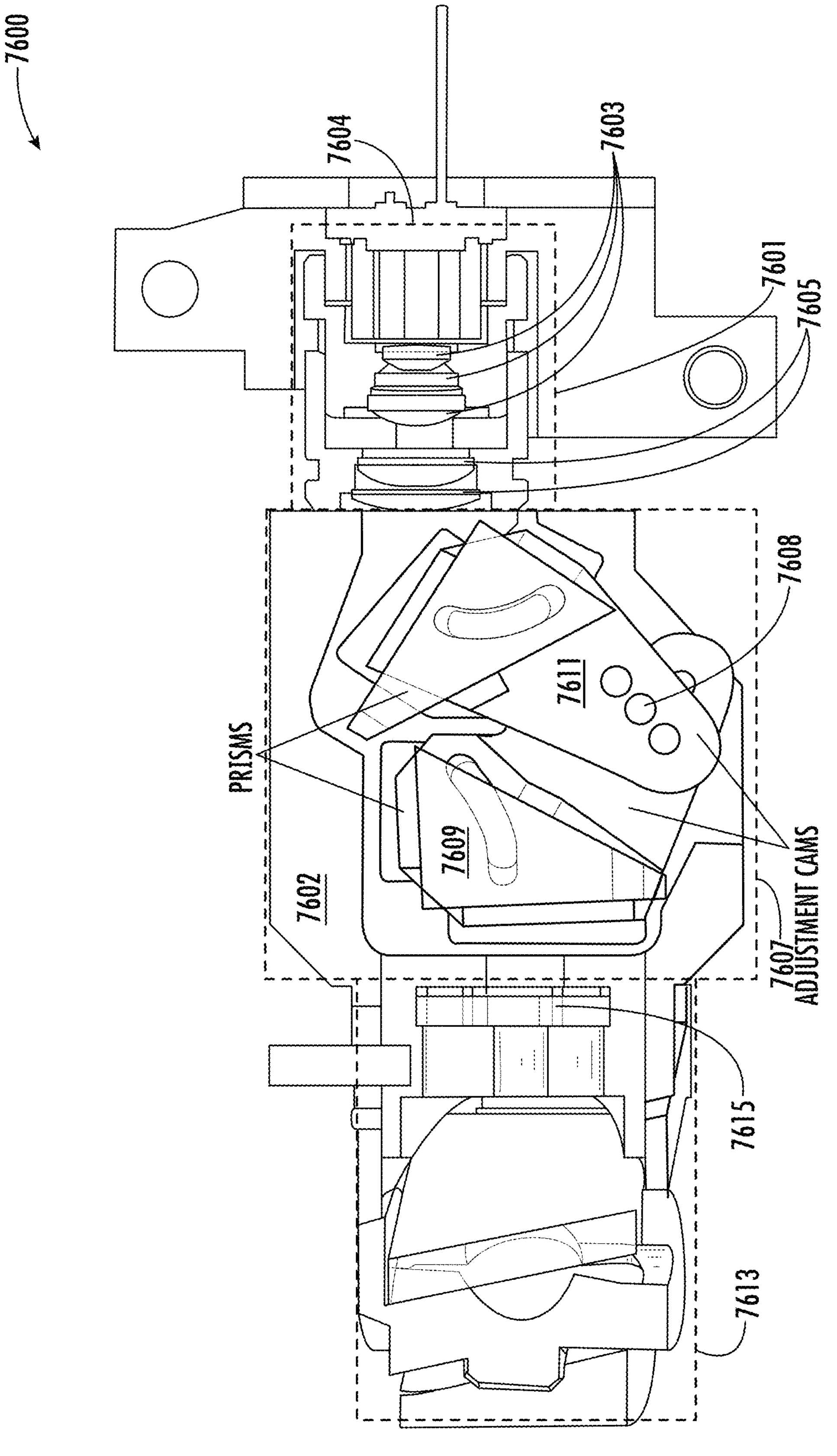
FIG. 76 illustrates an example schematic diagram depicting a top section view of an optical assembly according to one or more embodiments described herein.

Referring now to FIG. 76, an example schematic diagram depicting a top section view of an optical assembly 7600 in accordance with various embodiments of the present disclosure is provided. In various examples, the optical assembly 7600 may be configured to collimate, circularize and/or focus laser beams. The example optical assembly 7600 may operate to modify a laser beam which may be diverging within a particular range in order to provide a laser beam of a constant beam size. As depicted in FIG. 76, the optical assembly 7600 comprises a collimating component 7601, a beam control component 7607 and a focusing component 7613. The example optical assembly 7600 may operate to collimate an output (i.e., laser beam(s)) generated by an example laser assembly (e.g., a single-mode laser). In some examples, at least one surface of the collimating component 7601 may be disposed adjacent at least a surface of the example laser assembly.

As depicted in FIG. 76, the optical assembly 7600 comprises a collimating component 7601 configured to control a resolution in a cross-scan dimension of a laser beam (e.g., pre-energizing laser beam). The collimating component 7601 may be similar to the collimating component 7300 described above in connection with FIG. 73. As depicted, the collimating component 7601 comprises a cylindrical member/barrel. In some examples, as depicted, the collimating component 7601 is at least partially disposed within a housing 7602 of the optical assembly 7600. In various examples, the collimating component 7601 may be or comprise one or more pluralities of lenses (e.g., one or more groups of lenses). As depicted, the collimating component 7601 comprises a first plurality of lenses 7603 and a second plurality of lenses 7605. In some examples, as further depicted, the first plurality of lenses 7603 comprises three spherical lenses and the second plurality of lenses 7605 comprises two spherical lenses.

In some examples, the first plurality of lenses 7603 may be disposed within and/or define a first end portion of the collimating component 7601 (e.g., adjacent an example laser assembly). Said differently, the first plurality of lenses 7603 may be disposed at a first distance with respect to an example laser assembly. The first plurality of lenses 7603 may be configured to move independently (i.e., as a group) in relation to the second plurality of lenses 7605. For example, the first plurality of lenses 7603 may be configured to move horizontally along an example laser beam path 7604.

As depicted in FIG. 76, the collimating component 7601 comprises a second plurality of lenses 7605. In some examples, the second plurality of lenses 7605 may be disposed within and/or define a second end portion of the collimating component 7601 (e.g., remote from an example laser assembly). Said differently, the second plurality of lenses 7605 may be disposed at a second distance with respect to the example laser assembly such that the second plurality of lenses 7605 is disposed further from the laser assembly than the first plurality of lenses 7603. Thus, an example laser beam may travel from an example laser assembly to the first plurality of lenses 7603 and subsequently reach the second plurality of lenses 7605. The second plurality of lenses 7605 may be configured to move independently (i.e., as a group) in relation to the first plurality of lenses 7603. In various examples, subsequent to reaching the second plurality of lenses 7605, the example laser beam may then enter another component/element of the optical assembly/printing apparatus (e.g., in some examples, the beam control component 7607).

As noted above, and as depicted in FIG. 76, the optical assembly 7600 comprises a beam control component 7607. The example beam control component 7607 may operate to modify a laser beam to produce a laser beam of a particular aspect ratio (e.g., a circular aspect ratio of 1:1) while directing the laser beam in a constant direction. As shown, in some examples, at least a surface of the beam control component 7607 is disposed adjacent a surface of the collimating component 7601 such that a laser beam can traverse the collimating component 7601 to reach the beam control component 7607. As depicted, the beam control component 7607 comprises a first prism element 7609 and a second prism element 7611 (e.g., defining an anamorphic prism pair) configured to modify a dimension of a laser beam along one axis (e.g., expand the size of a laser beam in a horizontal dimension) For example, the beam control component 7607 may operate to modify a shape of a laser beam based on an angular relative position of the example first prism element 7609 and second prism element 7611. For example, the beam control component 7607 may operate to modify an elliptical beam shape generated by a laser source into a circular beam shape. In various examples, as depicted, the example beam control component 7607 comprises a control pin 7608 to facilitate adjusting relative positions of the first prism element 7609 and the second prism element 7611. In some examples, the beam control component 7607 may be configured to automatically adjust the relative positions of the first prism element 7609 and the second prism element 7611 in response to detecting a divergence of a laser beam.

As noted above, and as depicted in FIG. 76, the optical assembly 7600 comprises a focusing component 7613 configured to direct an output (e.g., laser beam) of the optical assembly 7600 within an example printing apparatus (e.g., direct a laser beam to be incident on a print media). As shown, in some examples, at least a surface of the focusing component 7613 may be disposed adjacent a surface of the beam control component 7607 such that a laser beam can traverse the beam control component 7607 to reach the focusing component 7613. In some examples, as depicted, the focusing component 7613 may comprise a focusing lens 7615, one or more mirrors, and/or the like.

While some of the embodiments herein provide an example optical assembly 7600, it is noted that the present disclosure is not limited to such embodiments. For instance, in some examples, optical assembly 7600 in accordance with the present disclosure may comprise other elements, one or more additional and/or alternative elements, and/or may be structured/positioned differently than that illustrated in FIG. 76.

Figure 77:
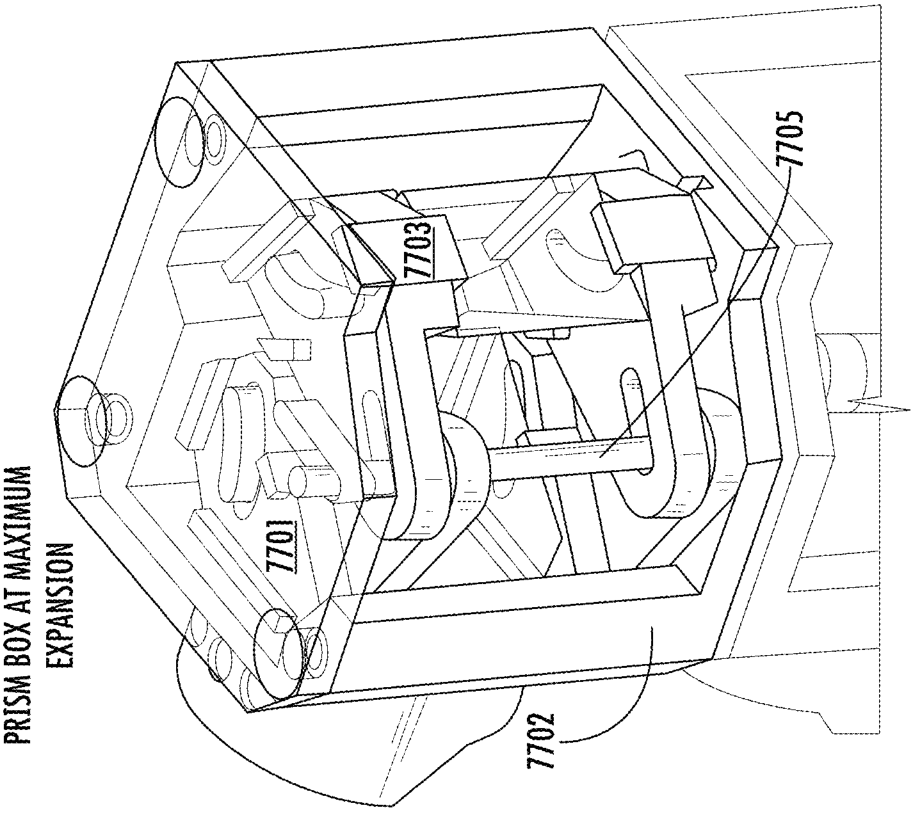
FIG. 77 illustrates an example schematic diagram depicting a perspective view of a beam control component according to one or more embodiments described herein.

Referring now to FIG. 77, an example schematic diagram depicting a perspective view of a beam control component 7700 in accordance with various embodiments of the present disclosure is provided. In various examples, the beam control component 7700 may operate to control a laser beam diverging within a particular range in order to provide a laser beam of a constant beam size (i.e., perform aspect ratio control). In some examples, the beam control component 7700 may be configured to control or modify an output of a single-mode laser. As depicted in FIG. 77, the beam control component 7700 comprises a first prism element 7701 and a second prism element 7703. In some examples, at least one surface of the beam control component 7700 may be disposed adjacent an example collimating component. Additionally, in some examples, at least one surface of the beam control component 7700 may be disposed adjacent to an example focusing component.

In some examples, and as depicted in FIG. 77, the beam control component 7700 comprises a first prism element 7701 and a second prism element 7703 defining an anamorphic prism pair. As depicted in FIG. 77, the first prism element 7701 and the second prism element 7703 may be optically identical. In various examples, the first prism element 7701 and the second prism element 7703 may be at least partially disposed within a housing 7702 (e.g., a housing of an example optical assembly/printing apparatus). The first prism element 7701 and the second prism element 7703 may operate to control (e.g., expand or compress) a laser beam in order to produce a laser beam of a particular aspect ratio (e.g., a circular aspect ratio of 1:1) while directing the laser beam in a constant direction. For example, the beam control component 7700 may operate to modify a shape of a laser beam based on an angular relative position of the example first prism element 7701 and second prism element 7703. For example, the beam control component 7700 may operate to modify an elliptical beam shape generated by a laser source into a circular beam shape. By way of example, the first prism element 7701 may deflect an example laser beam in a first direction and the second prism element 7703 may deflect the example laser beam in the reverse direction. As such each of the first prism element 7701 and the second prism element 7703 may modify a size of the example laser beam. When the beam incidence angles are set to equal and opposite directions for the first prism element 7701 and the second prism element 7703, the resultant beam is parallel to the incident beam such that a net beam angular deviation is zero, with a residual beam offset of the optical axis. In various examples, as depicted, the example beam control component 7707 comprises a control pin 7705 configured to facilitate adjusting relative positions of the first prism element 7701 and the second prism element 7703. In various examples, the control pin 7705 simultaneously controls the motion of the first prism element 7701 and the second prism element 7703 so that they are always in alignment and therefore provide a nearly constant beam offset at any expansion setting. As noted above, the beam control component 7707 may be configured to manually or automatically (e.g., dynamically) adjust the relative positions of the first prism element 7701 and the second prism element 7703 in response to detecting a divergence of a laser beam. The beam control component 7700 may further comprise a beam measurement element (e.g., disposed adjacent an exit aperture of the beam control component 7700). Accordingly, based on a detected measurement associated with a laser beam, the relative positions of the first prism element 7701 and the second prism element 7703 may be manually or automatically adjusted and tuned based on real-time feedback until a target beam size and target aspect ratio are achieved. The example control pin 7705 may operate to orient the first prism element 7701 and the second prism element 7703 with respect to one another so as to direct an example laser beam in a constant direction. As depicted in FIG. 77, the control pin 7705 is disposed in a first position such that the first prism element 7701 and the second prism element 7703 are at a maximum relative position with respect to one another. In various examples, the control pin 7705 may facilitate orienting the first prism element 7701 and the second prism element 7703 in a plurality of relative positions with respect to one another.

While some of the embodiments herein provide an example beam control component 7700, it is noted that the present disclosure is not limited to such embodiments. For instance, in some examples, a beam control component 7700 in accordance with the present disclosure may comprise other elements, one or more additional and/or alternative elements, and/or may be structured/positioned differently than that illustrated in FIG. 77.

Figure 78:
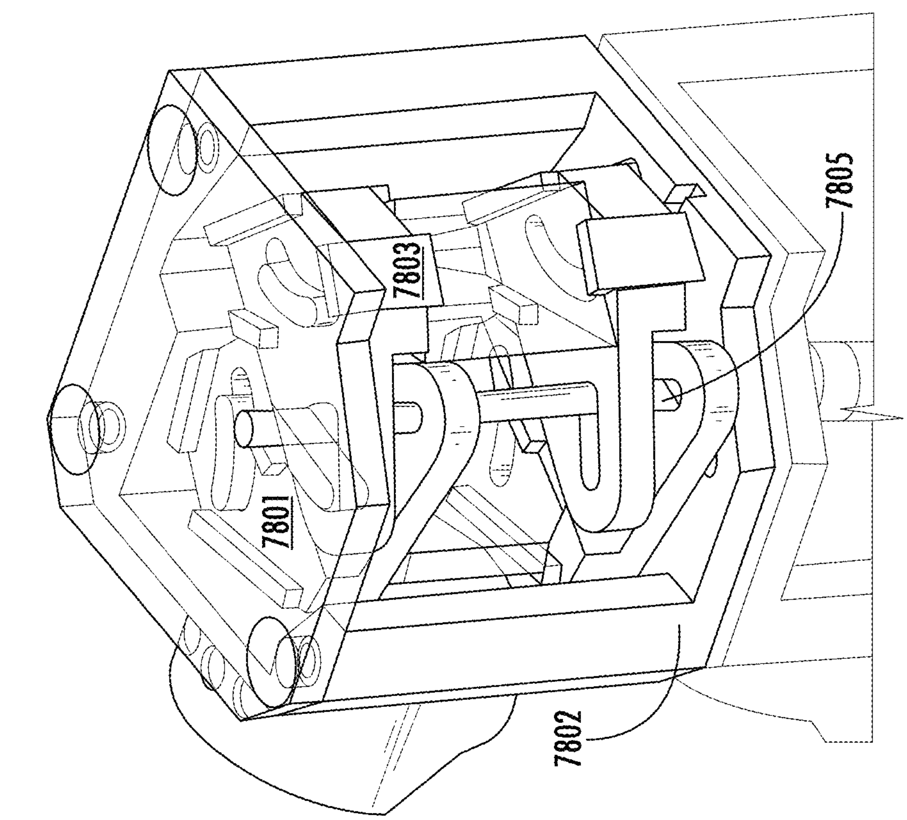
FIG. 78 illustrates an example schematic diagram depicting a perspective view of a beam control component according to one or more embodiments described herein.

Referring now to FIG. 78, an example schematic diagram depicting a perspective view of a beam control component 7800 in accordance with various embodiments of the present disclosure is provided. The beam control component 7800 may be similar or identical to the beam control component 7700 described above in connection with FIG. 77. In various examples, the beam control component 7800 may operate to control a laser beam diverging within a particular range in order to provide a laser beam of a constant beam size (i.e., perform aspect ratio control). In some examples, the beam control component 7800 may be configured to control or modify an output of a single-mode laser. As depicted in FIG. 78, the beam control component 7800 comprises a first prism element 7801 and a second prism element 7803. In some examples, at least one surface of the beam control component 7800 may be disposed adjacent an example collimating component. Additionally, in some examples, at least one surface of the beam control component 7800 may be disposed adjacent an example focusing component.

As noted above, and as depicted in FIG. 78, the beam control component 7800 comprises a first prism element 7801 and a second prism element 7803 defining an anamorphic prism pair. As depicted in FIG. 78, the first prism element 7801 and the second prism element 7803 may be optically identical. In various examples, the first prism element 7801 and the second prism element 7803 may be at least partially disposed within a housing 7802 (e.g., a housing of an example optical assembly/printing apparatus). The first prism element 7801 and the second prism element 7803 may operate to control (e.g., expand or compress) a laser beam in order to produce a laser beam of a particular aspect ratio (e.g., a circular aspect ratio of 1:1) while directing the laser beam in a constant direction. For example, the beam control component 7800 may operate to modify a shape of a laser beam based on an angular relative position of the example first prism element 7801 and second prism element 7803. For example, the beam control component 7800 may operate to modify an elliptical beam shape generated by a laser source into a circular beam shape. By way of example, the first prism element 7801 may deflect an example laser beam in a first direction and the second prism element 7803 may deflect the example laser beam in the reverse direction. As such each of the first prism element 7801 and the second prism element 7803 may modify a size of the example laser beam. When the beam incidence angles are set to equal and opposite directions for the first prism element 7801 and the second prism element 7803, the resultant beam is parallel to the incident beam such that a net beam angular deviation is zero, with a residual beam offset of the optical axis. In various examples, as depicted, the example beam control component 7807 comprises a control pin 7805 configured to facilitate adjusting relative positions of the first prism element 7801 and the second prism element 7803. In various examples, the control pin 7805 simultaneously controls the motion of the first prism element 7801 and the second prism element 7803 so that they are always in alignment and therefore provide a nearly constant beam offset at any expansion setting. As noted above, the beam control component 7800 may be configured to manually or automatically (e.g., dynamically) adjust the relative positions of the first prism element 7801 and the second prism element 7803 in response to detecting a divergence of a laser beam. The beam control component 7800 may further comprise a beam measurement element (e.g., disposed adjacent an exit aperture of the beam control component 7800). Accordingly, based on a detected measurement associated with a laser beam, the relative positions of the first prism element 7801 and the second prism element 7803 may be manually or automatically adjusted and tuned based on real-time feedback until a target beam size and target aspect ratio are achieved. The example control pin 7805 may operate to orient the first prism element 7801 and the second prism element 7803 with respect to one another so as to direct an example laser beam in a constant direction. As depicted in FIG. 78, the control pin 7805 is disposed in a second position such that the first prism element 7801 and the second prism element 7803 are at a minimum relative position with respect to one another. In various examples, the control pin 7805 may facilitate orienting the first prism element 7801 and the second prism element 7803 in a plurality of relative positions with respect to one another.

While some of the embodiments herein provide an example beam control component 7800, it is noted that the present disclosure is not limited to such embodiments. For instance, in some examples, a beam control component 7800 in accordance with the present disclosure may comprise other elements, one or more additional and/or alternative elements, and/or may be structured/positioned differently than that illustrated in FIG. 78. For example, the beam control component 7800 may comprise one prism element or more than two prism elements.

Increased Laser Absorption Efficiency Through Reduced Light Transmission

In various examples, laser markable coatings may be utilized for producing marks on a print media (e.g., bar codes) in conjunction with a laser source. An example laser markable coating may comprise at least one color former (e.g., a leuco dye), at least one color developer (e.g., a proton donor), and at least one optothermal converting agent. An example optothermal converting agent may be a material that converts electromagnetic radiation (EMFs), specifically an infrared (IR) laser, to thermal energy. Such laser markable coatings are plagued with technical difficulties and challenges.

In some examples, a plurality of color formers may be blended together in order to provide a target shade/color post laser-activation. In such cases, the example color formers, color developer and optothermal converting agent may need to be kept apart (e.g., in an unreacted and colorless state) as discrete particles so that they do not react with one another prematurely (e.g., until laser radiation is incident thereon). However, in some examples, by separating the color formers, the color developer, and the optothermal converting agent, it may be difficult to achieve color uniformity and fast activation.

In some examples, the use of higher melting temperatures may result in better color stability, but unsuitably slow laser marking speeds. Additionally, in many examples, it may not be possible to keep the example color formers, color developer and optothermal converting agent in a completely colorless state in which color is only developed in response to exposure to an IR laser. In many examples, color former(s), color developer(s) and/or optothermal converting agent(s) may comprise a natural color. By way of example, an optothermal converting agent may comprise an IR-absorbing dye which, in some examples, may be blue, green, yellow, brown or black.

Figure 79:
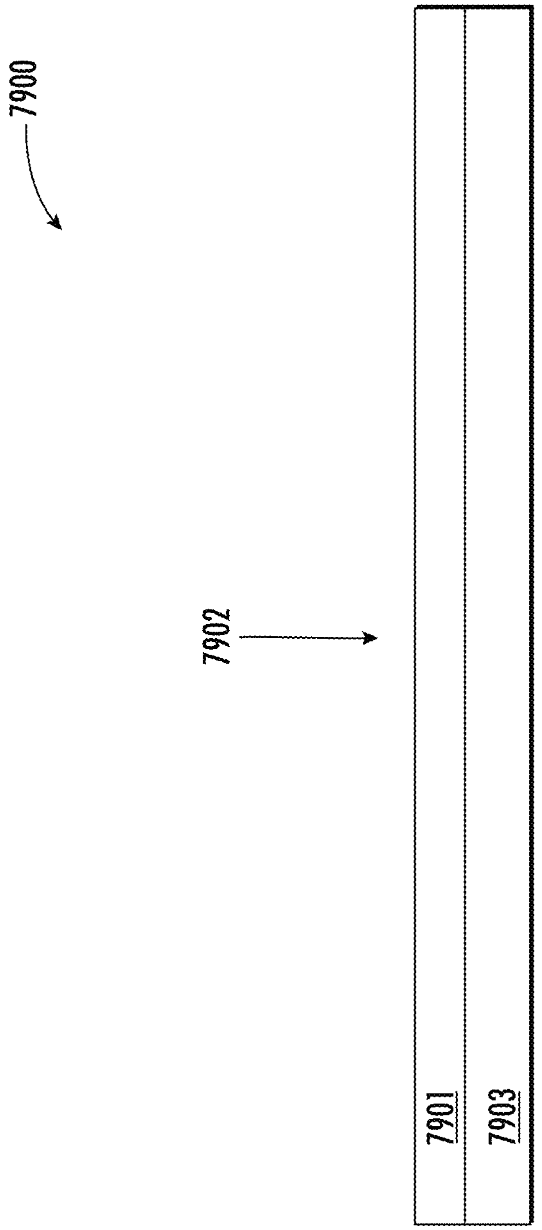
FIG. 79 illustrates an example schematic diagram depicting a side section view of a printing media according to one or more embodiments described herein.

Referring now to FIG. 79, an example schematic diagram depicting a side section view of a print media 7900 in accordance with various embodiments of the present disclosure is provided. In response to receiving electromagnetic radiation (e.g., IR energy 7902), the example print media 7900 may react by converting the absorbed electromagnetic radiation (e.g., IR energy) to thermal energy so as to impinge a mark onto the print media 7900. As depicted in FIG. 79, the print media 7900 comprises a plurality of layers/substrates defining a unitary body. In some examples, the print media 7900 may have a thickness dimension that is less than 0.2 mm. As depicted in FIG. 79, the example print media 7900 comprises a laser markable coating 7901 and a substrate 7903.

As depicted in FIG. 79, the example print media 7900 comprises a laser markable coating 7901 defining a top surface of the print media 7900. The example laser markable coating 7901 may comprise a plurality of reactive components. For example, the laser markable coating 7901 may comprise at least one color former (e.g., a leuco dye), at least one color developer (e.g., a proton donor), and at least one optothermal converting agent. In response to electromagnetic radiation, the example laser markable coating 7901 may convert the electromagnetic radiation to thermal energy so as to impinge a mark onto the print media.

As depicted in FIG. 79, the example print media 7900 comprises a substrate 7903 defining a bottom surface of the print media 7900. In various examples, the substrate 7903 may be or comprise a layer of processed fibers such as, without limitation, wood pulp, rice, organic material (e.g., plants), and/or the like.

In some examples, the example print media 7900 may be exposed to electromagnetic radiation (e.g., IR energy 7902). By way of example, the print media 7900 may be exposed to IR energy 7902 at a wavelength of 1064 nanometers or 1.064 microns. In such examples, a first portion of energy (in some examples, approximately 25% of the IR energy 7902), may be back-scattered or reflected backwards, at some angle greater than 90 degrees from the laser's initial direction, and generally towards the direction of a laser source. Accordingly, this portion of the energy emitted by the laser source (i.e., 25% of the IR energy 7902) may not be absorbed by the print media 7900 and does not participate in the conversion of the laser markable coating 7901 (i.e., reactive components) to generate marks (e.g., an image). Additionally, a second portion of energy (in some examples, approximately 25% of the IR energy 7902) may be transmitted such that it bypasses the laser markable coating 7901 (for example, either directly in-line with a path of an incident IR energy 7902 or deflected at some angle less than 90 degrees from the laser source's initial direction. Thus, this second portion of energy may also not be absorbed by the print media 7900 and does not participate in the conversion of the laser markable coating 7901 (i.e., reactive components) to generate marks (e.g., an image). In addition, a third portion of energy (in some examples, approximately 50% of the IR energy 7902) may not be detectable. In other words, approximately 50% of the IR energy 7902 may not be detectable (e.g., identified as striking a side of the print media 7900 or exiting a bottom surface of the print media 7900. Accordingly, only the third portion of IR energy 7902 is absorbed by the print media 7900 and available to be converted into thermal energy therefore contributing to the reaction of the laser markable coating 7901 (i.e., reactive components) of the print media 7900 required to produce a mark (e.g., image). As detailed above, the loss of approximately 50% of IR energy 7902 provided by an example laser source results in a suboptimal use of available energy.

The systems, methods and techniques described herein provide print media with laser markable coatings that are stable in a variety of environments irrespective of storage conditions and/or exposure to incident light and/or heat. In some examples, the laser markable coating materials may not need to be in a colorless, near colorless or color neutral state prior to activation. Additionally, activation of the example laser markable coating materials may be performed at higher, optimal speeds. Moreover, a customer's overall usage costs will be significantly lower than existing solutions. For example, the example customer may reduce costs associated with consumable materials including inks, dilution solvents, cleaning solvents, sponges and cleaning materials. Further, the customer may not be burdened with safety training, personal protective equipment and environmental reporting required with incumbent solutions. Additionally, methods and systems which result in less wastage of incident radiation (e.g., IR energy) are provided herein. In some examples, an overall amount of IR energy absorbed by a target media may be significantly increased while providing faster operations and generating marks with higher optical densities.

Figure 80:
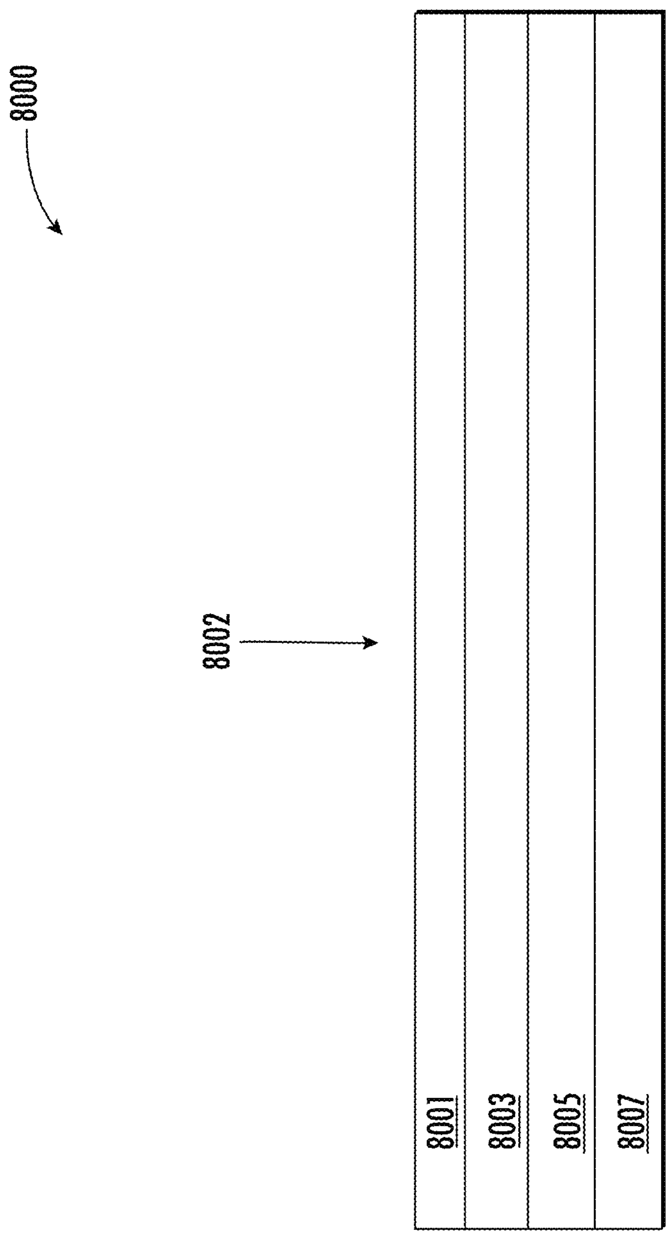
FIG. 80 illustrates an example schematic diagram depicting a side section view of a printing media according to one or more embodiments described herein.

Referring now to FIG. 80, an example schematic diagram depicting a side section view of a print media 8000 in accordance with various embodiments of the present disclosure is provided. In response to receiving electromagnetic radiation (e.g., IR energy), the example print media 8000 may react by converting the absorbed electromagnetic radiation (e.g., IR energy) to thermal energy so as to impinge a mark onto the print media 8000. As depicted in FIG. 80, the print media 8000 comprises a plurality of layers/substrates defining a unitary body. In some examples, the print media 8000 may have a thickness dimension that is less than 0.2 mm. As depicted in FIG. 80, the example print media 8000 comprises a laser markable coating 8001, a reflective layer 8003, an absorbing layer 8005 and a substrate 8007.

As depicted in FIG. 80, the example print media 8000 comprises a laser markable coating 8001 defining a top surface of the print media 8000. The example laser markable coating 8001 may comprise a plurality of reactive components. For example, the laser markable coating 8001 may comprise at least one color former (e.g., a leuco dye), at least one color developer (e.g., a proton donor), and at least one optothermal converting agent. In response to receiving electromagnetic radiation (e.g., IR energy 8002), the example laser markable coating 8001 may convert the electromagnetic radiation to thermal energy so as to impinge a mark onto the print media 8000.

As depicted in FIG. 80, in some examples, the print media 8000 may comprise a reflective layer 8003 defining an intermediary layer of the print media 8000. For example, as shown, the reflective layer 8003 may be disposed adjacent a bottom surface of the laser markable coating 8001. The reflective layer 8003 may operate to prevent transmission of IR energy 8002 through a bottom surface of the print media 8000 by reflecting the IR energy 8002 towards the laser markable coating where it can be absorbed. In various examples, the reflective layer 8003 may not be disposed directly adjacent the laser markable coating 8001, and may be disposed adjacent any intermediary layer of the print media 8000. In various examples, the reflective layer 8003 may be or comprise a metallic layer and/or metallic particles. In some examples, the reflective layer 8003 may comprise a vacuum-metallized aluminum metal. The reflective layer 8003 may comprise aluminum, nickel, bronze, steel, combinations thereof, and/or the like. In some examples, the reflective layer 8003 may comprise hexagonal boron nitride (h-BN).

As further depicted in FIG. 80, in some examples, the print media 8000 comprises an absorbing layer 8005 defining another intermediary layer of the print media 8000. For example, as shown, the absorbing layer 8005 may be disposed adjacent a bottom surface of the reflective layer 8003. However, it is noted that the present disclosure is not limited to such embodiments. In other examples, the absorbing layer 8005 may be positioned differently than illustrated in FIG. 80. The absorbing layer 8005 may operate to absorb a portion of the IR energy 8002 in order to improve the reactivity of the example print media 8000. For example, the thermal energy generated from absorbing a portion of the IR energy 8002 may improve the reactivity of the laser markable coating 8001 (e.g., a reaction speed). As such, the absorbing layer 8005 may operate to improve an optical density associated with a mark generated on the laser markable coating 8001. In some examples, the absorbing layer 8005 may comprise metal oxides, ceramics and/or the like. In one example, the absorbing layer 8005 may comprise titanium dioxide.

As depicted in FIG. 80, the example print media 8000 comprises a substrate 8007 defining a bottom surface of the print media 8000. In some examples, as depicted, the substrate 8007 may be disposed adjacent a bottom surface of the absorbing layer 8005. In various examples, the substrate 8007 may be or comprise a layer of processed fibers such as, without limitation, wood pulp, rice, organic material (e.g., plants), and/or the like.

While some of the embodiments herein provide an example print media 8000, it is noted that the present disclosure is not limited to such embodiments. For instance, in some examples, a print media 8000 in accordance with the present disclosure may comprise other elements, one or more additional and/or alternative elements, and/or may be structured/positioned differently than that illustrated in FIG. 80.

Darkness and Contrast Adjustment

As described above, various embodiments of the present disclosure may utilize a laser print head to conduct laser printing on a print media. For example, various embodiments of the present disclosure may utilize laser technologies to mark dedicated print media that have a reactive coating tuned to react to the printer laser. In some embodiments, when printing on the same media type, there is a manufacturing variation in the reactive coating, which makes the print quality to be uneven even when a constant laser power is applied. Additionally, the print quality may also vary because of the media substrate, which means that the print quality would vary even for the same laser power and even if the reactive coating was perfectly the same from one print media to another print media. As such, there is a need for fine-tuning the operational parameters associated with the print head in order to address the variation of print quality within same media type as well as across different media types. In embodiments where a printing apparatus utilizes thermal printing technologies, this fine-tuning process may be done by adjusting contrast and darkness parameters that control the duration for which a thermal print head is turned ON & OFF. In embodiments where a printing apparatus utilizes laser printing technologies (including, but not limited to, pulsed laser, continuous laser, etc.), the present disclosure provides example methods and algorithms to adjust contrast and darkness.

Various embodiments of the present disclosure may overcome technical challenges associated with adjusting contrast and darkness in a printing apparatus that utilizes laser printing technologies. For example, some embodiments of the present disclosure may adjust the darkness and contrast within a laser print head (for example, by the controller 2008 of the print head 302 illustrated and described above in connection with FIG. 20) instead of through the CPU of the printing apparatus (for example, the processor 2702 illustrated and described above in connection with FIG. 27), which may reduce processing time and free up CPU resources so the printing apparatus can handle printing tasks more efficiently compared to that of a thermal printer. Some embodiments of the present disclosure may provide a set of methods to adjust the darkness and contrast, which improve the print quality to produce a grade A barcode as well as improved text and drawing printout. In some embodiments, the set of methods may include algorithms, lookup tables, or a combination of both. Some embodiments of the present disclosure may directly adjust the power level of the output power from the laser print head in order to modify the darkness or contrast in the printout, which can be applicable to a print head utilizing continuous laser or pulsed laser. Some embodiments of the present disclosure may directly adjust the ON duration (e.g. the duty cycle) of the laser print head when printing a dot in order to modify darkness or contrast, which can be applicable to a print head utilizing pulsed laser. In contrast, a printing apparatus utilizes thermal printing technologies only to adjust the ON duration when printing a full line (instead of printing a dot by a printing apparatus utilizing laser printing technologies).

In the present disclosure, the term "darkness setting input" refers to an input provided by a user (for example, through various user interfaces described herein such as, but not limited to, the UI 140 described above in connection with FIG. 1) that indicates a desired level of darkness in a printout produced by a laser print head. In response to the darkness setting input indicates a darkness increase, the laser print head produces the entire printout darker compared to a printout prior to the darkness increase, details of which are described herein. In response to the darkness setting input indicates a darkness decrease, the laser print head produces the entire printout lighter compared to a printout prior to the darkness decrease, details of which are described herein.

In the present disclosure, the term "contrast setting input" refers to an input provided by a user (for example, through various user interfaces described herein such as, but not limited to, the UI 140 described above in connection with FIG. 1) that indicates a desired level of contrast in a printout produced by a laser print head. In response to the contrast setting input indicates a contrast increase, the laser print head produces any dark grey area in the printout darker and any light grey area in the printout lighter/whiter, details of which are described herein. In response to the contrast setting input indicates a contrast decrease, the laser print head produces any dark grey area in the printout lighter and any light grey area in the printout darker, details of which are described herein.

As described above, in examples where the printing apparatus utilizes thermal printing technologies, any contrast/darkness adjustment would be made by the printer CPU either via image processing technique or by calculating the modified ON time of a full line depending on the darkness/contrast settings. In some embodiments, the printer CPU may receive print data and create a first image buffer based on the print data. Subsequently, the printer CPU may conduct adjustment by applying darkness algorithms, applying contrast algorithm, and rendering new image buffer or adjusting the ON time of the print head. For example, the printer CPU may modify the pixel value up or down when applying darkness algorithms and may determine the minimum and maximum pixel value prior to applying contrast algorithm. Once the adjustments are completed, the printer CPU may provide the print data to a laser print head, which may in turn provide print data to a laser power control system (for example, the laser power control system 2006 described above in connection with FIG. 20).

As described above, in a printing apparatus that utilizes thermal printing technologies, the darkness and contrast of a printout depend on the previous dot, the current dot and future dot to be printed in a column, as well as the duration of the full segment (e.g. the ON time to print a line). In some embodiments, a line is made of four segments, which means that the printing apparatus prints four time over the same line before printing the next line. The calculation behind the ON time duration may be based on testing cases to identify the best match for any type of barcode/printout; however, this method does not work for all type of printout and barcode. In addition, using image processing technique can be time consuming and process intensive for the printer CPU to handle efficiently while performing printing operations and others task, hence such techniques may not be suitable for many printing apparatuses. Further, thermal management algorithms used in thermal printing apparatus cannot be used for laser printing apparatus because the printing technology is different. For example, thermal management algorithm used in thermal printing apparatus may be dedicated to print line by line, while laser printing apparatus prints dot by dot, as described above.

Figure 81:
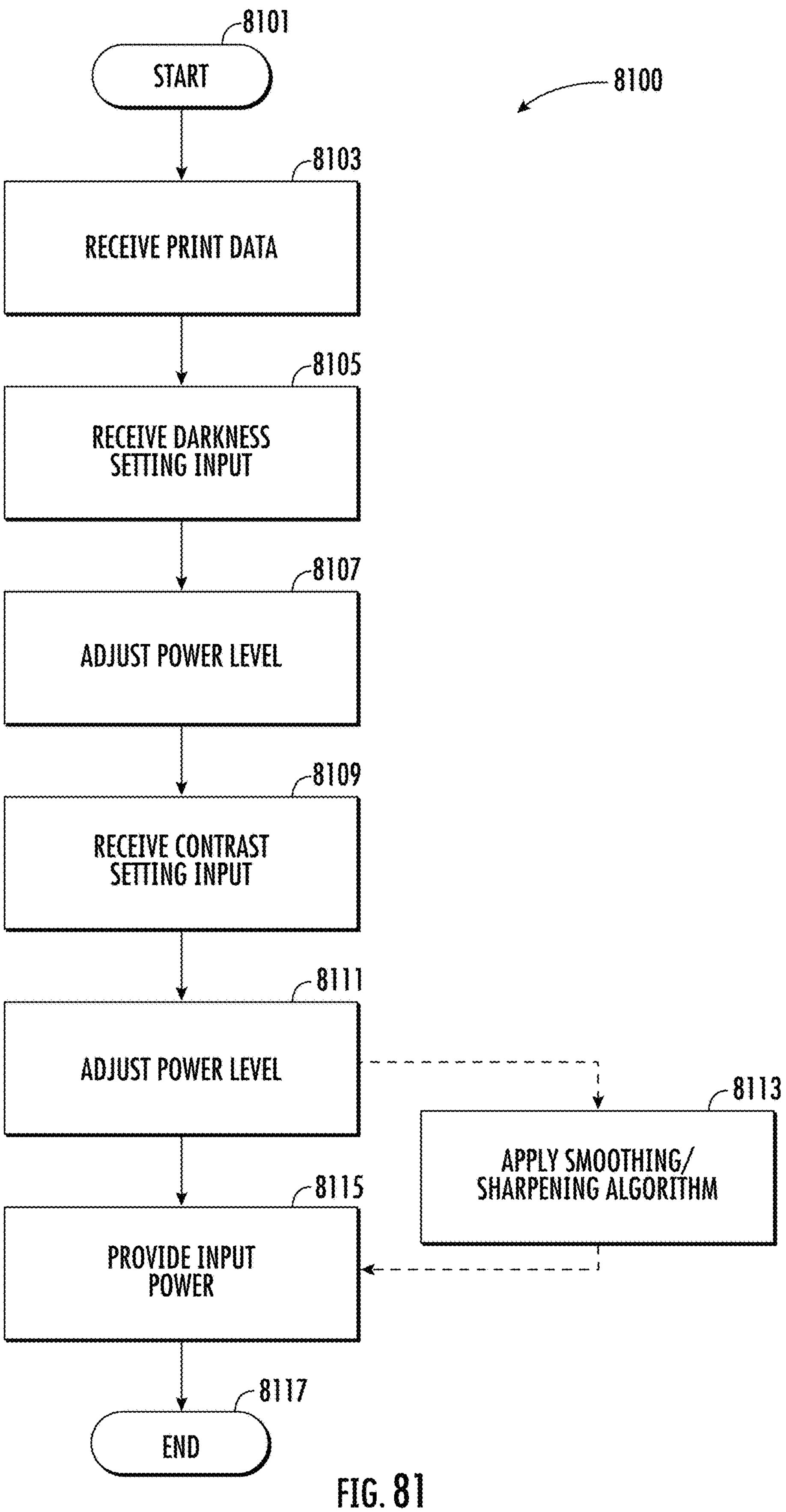
FIG. 81 is an example flow diagram illustrating example methods in accordance with examples of the present disclosure.

Example embodiments of the present disclosure may overcome technical challenges associated with adjusting contrast and darkness in a printing apparatus that utilizes laser printing technologies. Referring now to FIG. 81, an example method 8100 is illustrated. In particular, the example method 8100 illustrates example steps/operations of adjusting power levels in response to darkness setting input and/or contrast setting input. In some embodiments, the contrast and darkness setting modifications are conducted by a controller of a print head of a printing apparatus circuitry (such as, but not limited to, the controller 2008 of the print head 302 illustrated and described above in connection with FIG. 20), which may improve the printing operation efficiency as the main printer CPU does not handle any of the intensive darkness/contrast adjustments.

In the example shown in FIG. 81, the example method 8100 starts at block 8101 and then proceeds to step/operation 8103. At step/operation 8103, a processing circuitry (e.g. a controller of a print head of a printing apparatus such as, but not limited to, the controller 2008 of the print head 302 illustrated and described above in connection with FIG. 20) may receive print data.

In some embodiments, the print data may be in the form of an image buffer. In some embodiments, a processor of the printing apparatus (for example, the main CPU of the printing apparatus) may receive raw printing data, which comprises data representing barcode, text, image, and/or the like that are to be printed on a print media. The processor of the printing apparatus (for example, the main CPU of the printing apparatus) may generate an image buffer based at least in part on the raw print data and provide a temporary storage for the raw print data. Prior to the print head beginning to print the barcode, text, image, and/or the like represented by the raw print data, the processor of the printing apparatus may provide the image buffer to a controller of a print head (such as, but not limited to, the controller 2008 of the print head 302 illustrated and described above in connection with FIG. 20).

In some embodiments, the print data may indicate at least a first power level. In the present disclosure, the term "power level" refers to the amount of power that is provided to the laser source when conducting printing operations. In some embodiments, a power level may be expressed as a percentage of the maximum power that can be provided to the laser source. For example, when the power level is 100%, the maximum power is provided to the laser source, which in turn produces a fully black dot. When the power level is 0%, the minimum power or no power is provided to the laser source, which in turn produces a fully white dot.

Figure 82:
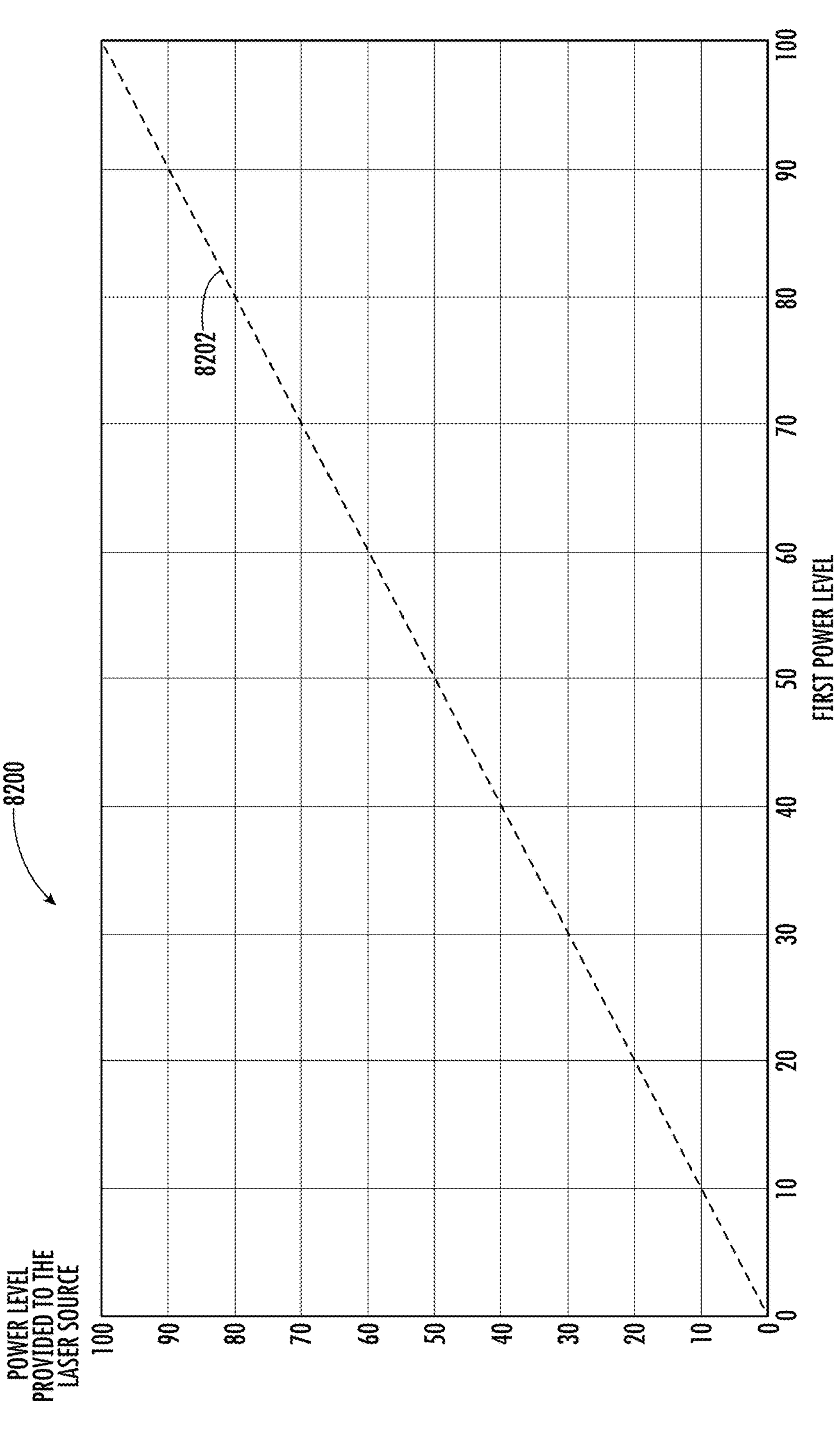
FIG. 82 illustrates an example power level relationship diagram in accordance with examples of the present disclosure.

In some embodiments, the first power level is associated with a first dot to be printed by the print head on a print media. In examples where no darkness or contrast adjustments are made, the power level provided to the laser source in the print head equals to the first power level. For example, if the first power level equals to 40%, then the power level provided to the laser source equals to 40% when no darkness or contrast adjustments are made, and the laser source prints the first dot at 40% of the maximum power. If the first power level equals to 72%, then the power level provided to the laser source equals to 72% when no darkness or contrast adjustments are made, and the laser source prints the first dot at 72% of the maximum power. This relationship between the first power level and the power level provided to the laser source when no darkness or contrast adjustments are made is illustrated by curve 8202 in the example diagram 8200 shown in FIG. 82. In the example diagram 8200 shown in FIG. 82, when 0% power level is provided to the laser source, the laser source prints a fully white dot; when 100% is provided to the laser source, the laser source prints a fully black dot. This relationship between the first power level and the power level provided to the laser source when no darkness or contrast adjustments are made is also illustrated in the following example algorithm:

$$\text{Power}(y)=x$$

In the above example algorithm, Power (y) is the power level provided to the laser source, and x is the first power level.

Referring back to FIG. 81, subsequent to step/operation 8103, the example method 8100 proceeds to step/operation 8105. At step/operation 8105, a processing circuitry (e.g. a controller of a print head of a printing apparatus such as, but not limited to, the controller 2008 of the print head 302 illustrated and described above in connection with FIG. 20) may receive darkness setting input.

In some embodiments, the darkness setting input may be received by a controller of a print head. As described above, the darkness setting input may indicate a desired level of darkness in a printout. In some embodiments, the darkness setting input may be expressed as a percentage between −100% to +100%. For example, a −100% darkness setting input indicates a reduction of darkness in the printout to the minimum, and a +100% darkness setting input indicates an increase of darkness in the printout to the maximum. In some embodiments, a positive darkness setting input indicates a darkness increase, while a negative darkness setting input indicates a darkness decrease. In some embodiments, when the darkness setting input equals to zero, there is no change in the darkness.

Referring back to FIG. 81, subsequent to step/operation 8105, the example method 8100 proceeds to step/operation 8107. At step/operation 8107, a processing circuitry (e.g. a controller of a print head of a printing apparatus such as, but not limited to, the controller 2008 of the print head 302 illustrated and described above in connection with FIG. 20) may adjust power level.

In some embodiments, the controller of the print head may adjust the power level when the print head is in a continuous laser print mode (e.g. the laser source continuously emits laser beams). In some embodiments, the controller of the print head may adjust the power level when the print head is in a pulsed laser print mode (e.g. the laser source starts and stops emitting laser beams based on a regular rhythm).

In some embodiments, the controller of the print head may adjust the first power level to a second power level based at least in part on the darkness setting input. For example, the controller may adjust the power level based on the following example algorithm:

$$P(y)=\max\left(\min\left(x+\frac{\text{Ratio }\%}{100\%}\text{Darkness},\ 100\right),\ 0\right)$$

In the above algorithm, x is the first power level, which is between 0% (inclusive) and 100% (inclusive). Darkness is the darkness setting input adjustable by the user, which is between −100% (inclusive) and 100% (inclusive). Ratio % is darkness step size ratio that is predetermined and fixed by the printing apparatus based on the step size between two darkness levels. In other words, adjusting the first power level to the second power level is further based on the darkness step size ratio. In some embodiments, the darkness step size ratio is 25%. In some embodiments, the darkness step size ratio is less than 25%. In some embodiments, the darkness step size ratio is more than 25%.

In the above algorithm, the min calculations and max calculations are utilized to clip/normalize the second power level P(y) between 0% or 100% in case the calculated value is below 0% or above 100%. The following is an example calculation of the second power level P(y) in a hypothetical use case where the first power level x equals 60%, the darkness step size ratio Ratio % equals 25%, the darkness setting input Darkness equals +15%:

$$P(y) = 60\% + \left(\frac{25\%}{100\%}\right) \times (+15\%) = 63.75\% \approx 64\%$$

Figure 83:
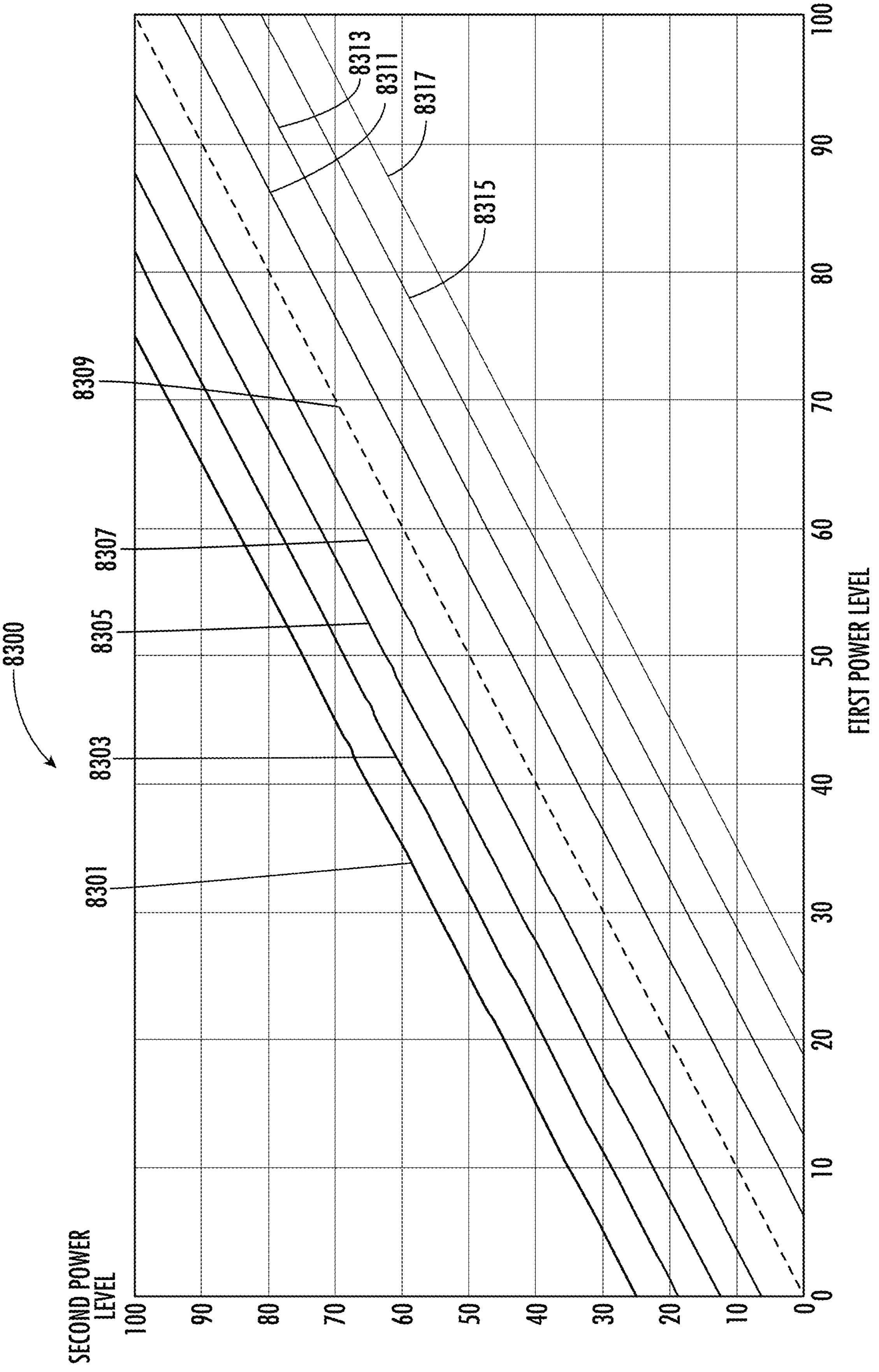
FIG. 83 illustrates an example power level relationship diagram in accordance with examples of the present disclosure.

FIG. 83 is an example diagram 8300 that illustrates example relationships between the first power level and the second power level in response to receiving a plurality of darkness setting inputs.

In particular, curve 8301 illustrates an example relationship between the first power level and the second power level in response to receiving a darkness setting input indicating +100%. Curve 8303 illustrates an example relationship between the first power level and the second power level in response to receiving a darkness setting input indicating +75%. Curve 8305 illustrates an example relationship between the first power level and the second power level in response to receiving a darkness setting input indicating +50%. Curve 8307 illustrates an example relationship between the first power level and the second power level in response to receiving a darkness setting input indicating +25%. Curve 8309 illustrates an example relationship between the first power level and the second power level in response to receiving a darkness setting input indicating 0%. Curve 8311 illustrates an example relationship between the first power level and the second power level in response to receiving a darkness setting input indicating −25%. Curve 8313 illustrates an example relationship between the first power level and the second power level in response to receiving a darkness setting input indicating −50%. Curve 8315 illustrates an example relationship between the first power level and the second power level in response to receiving a darkness setting input indicating −75%. Curve 8317 illustrates an example relationship between the first power level and the second power level in response to receiving a darkness setting input indicating −100%.

Figure 84:
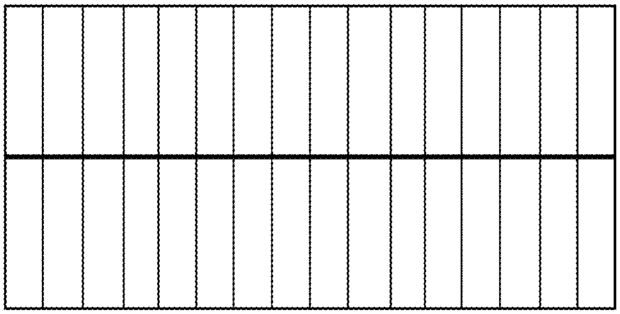
FIG. 84 illustrates an example print media in accordance with examples of the present disclosure.
Figure 85:
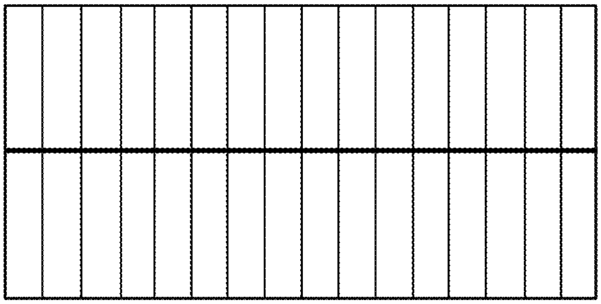
FIG. 85 illustrates an example print media in accordance with examples of the present disclosure.
Figure 86:
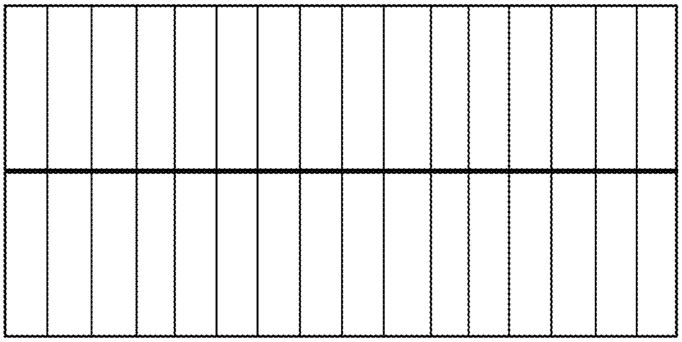
FIG. 86 illustrates an example print media in accordance with examples of the present disclosure.

FIG. 84 illustrates an example image of an example printout. FIG. 85 illustrates an example image of the example printout in FIG. 83 after the darkness is increased. FIG. 86 illustrates an example image of the example printout in FIG. 83 after the darkness is decreased.

As shown in the examples of FIG. 83 to FIG. 86, in response to receiving a darkness increase (e.g. a positive darkness setting input) associated with the darkness setting input, the controller of the print head increases the first power level to the second power level. In other words, the second power level is higher than the first power level, making the entire printout darker. In response to receiving a darkness decrease (e.g. a negative darkness setting input) associated with the darkness setting input, the controller of the print head decreases the first power level to the second power level. In other words, the second power level is lower than the first power level, making the entire printout lighter.

Referring back to FIG. 81, subsequent to step/operation 8107, the example method 8100 proceeds to step/operation 8109. At step/operation 8109, a processing circuitry (e.g. a controller of a print head of a printing apparatus such as, but not limited to, the controller 2008 of the print head 302 illustrated and described above in connection with FIG. 20) may receive contrast setting input.

In some embodiments, the contrast setting input may be received by a controller of a print head. As described above, the contrast setting input may indicate a desired level of contrast in a printout. In some embodiments, the contrast setting input may be expressed as a percentage between −100% to +100%. For example, a −100% contrast setting input indicates a reduction of contrast in the printout to the minimum, and a +100% contrast setting input indicates an increase of contrast in the printout to the maximum. In some embodiments, a positive contrast setting input indicates a contrast increase, while a negative contrast setting input indicates a contrast decrease. In some embodiments, when the contrast setting input equals to zero, there is no change in the contrast. In some embodiments, the contrast setting input may modify the slope and/or curve between white to black, thus either making the printout greyer (contrast decrease) or more black-and-white (contrast increase).

Referring back to FIG. 81, subsequent to step/operation 8109, the example method 8100 proceeds to step/operation 8111. At step/operation 8111, a processing circuitry (e.g. a controller of a print head of a printing apparatus such as, but not limited to, the controller 2008 of the print head 302 illustrated and described above in connection with FIG. 20) may adjust power level.

In some embodiments, the controller of the print head may adjust the power level when the print head is in a continuous laser print mode (e.g. the laser source continuously emits laser beams). In some embodiments, the controller of the print head may adjust the power level when the print head is in a pulsed laser print mode (e.g. the laser source starts and stops emitting laser beams based on a regular rhythm).

In some embodiments, the controller of the print head may adjust the second power level to a third power level based at least in part on the contrast setting input. For example, the controller may adjust the power level based on the following example algorithm:

$$y1 = A \times \sin\left(2\pi \times \frac{x}{f}\right)$$

$$P(y) = \max\left(\min\left(x - \text{Contrast} \times y1 \times \frac{\text{Ratio }\%}{100\%}, 100\right), 0\right)$$

In the above algorithm, x is the second power level, which is between 0% (inclusive) and 100% (inclusive). Contrast is the contrast setting input adjustable by the user, which is between −100% (inclusive) and 100% (inclusive). Ratio % is contrast step size ratio that is predetermined and fixed by the printing apparatus based on the slope steepness between two contrast levels. In other words, adjusting the second power level to the third power level is further based on the contrast step size ratio. In some embodiments, the contrast step size ratio is 25%. In some embodiments, the contrast step size ratio is less than 25%. In some embodiments, the contrast step size ratio is more than 25%. A is a predetermined, fixed amplitude value for the curvature. In some embodiments, A is set to 1. In some embodiments, A is set to other values.

In the above algorithm, the min calculations and max calculations are utilized to clip/normalize the third power level P(y) between 0% or 100% in case the calculated value is below 0% or above 100%. f is the frequency value based on whether the power levels are normalized. In the above algorithm, the power levels are normalized, hence f is set to 100. In an example where the power level is not normalized, f is set to the max power level value.

The following is an example calculation of the third power level P(y) in a hypothetical use case where the second power level x equals 60%, the contrast step size ratio Ratio % equals 25%, the contrast setting input Contrast equals +55%, the amplitude A equals to 1, and the frequency f equals to 100%:

$$y1 = 1 \times \sin\left(2\pi \times \frac{60\%}{100\%}\right) = -0.5877$$

$$P(y) = 60\% - 25\% \times (-0.5877) \times \frac{25\%}{100\%} = 62.2041947 \approx 62\%$$

Figure 87:
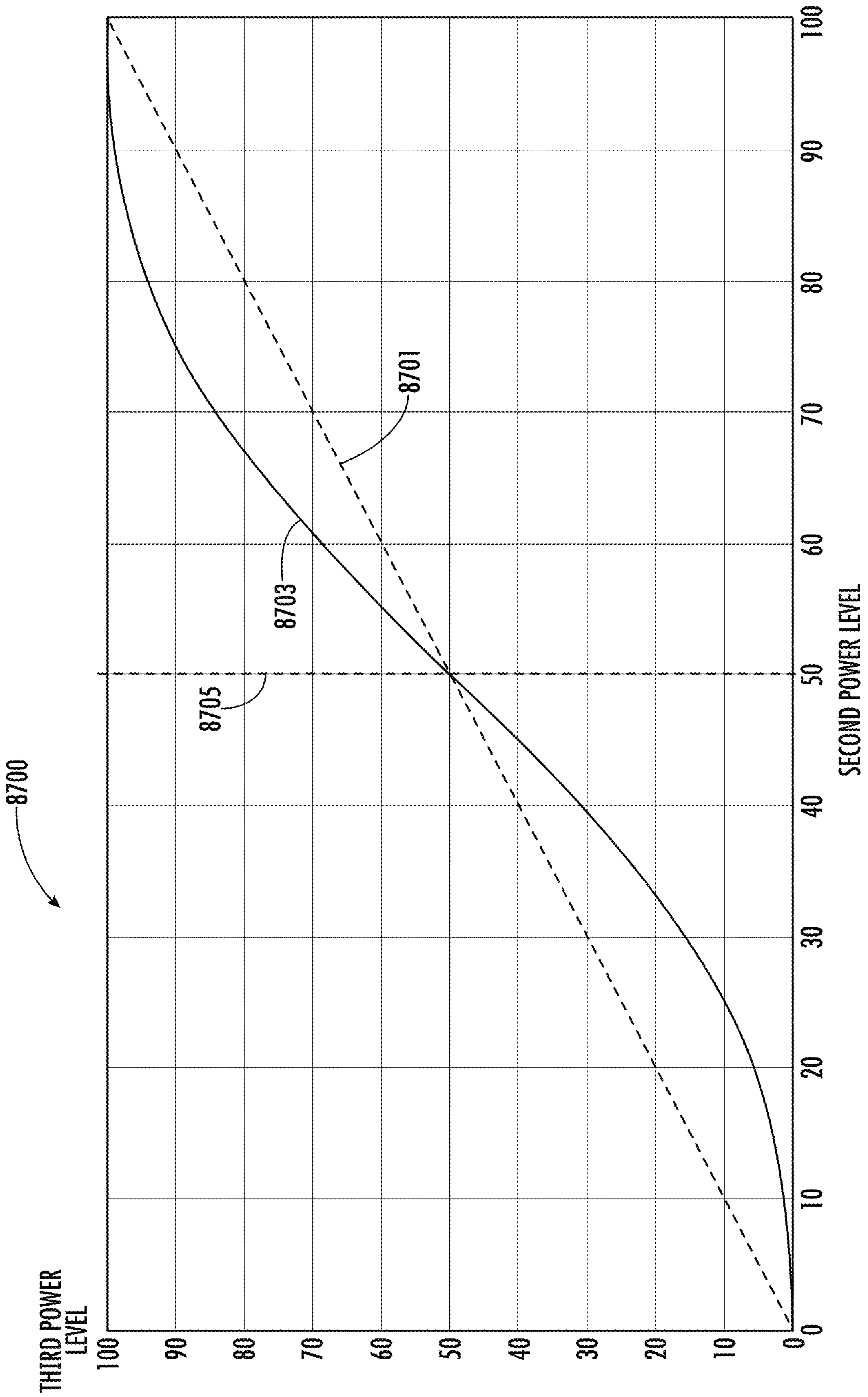
FIG. 87 illustrates an example power level relationship diagram in accordance with examples of the present disclosure.

FIG. 87 illustrates an example diagram 8700 that includes a curve 8703 indicating a relationship between the second power level and the third power level in response to receiving a contrast setting input. In particular, the contrast setting input indicates a contrast increase of +100%. The curve 8701 indicates a relationship between the second power level and the third power level when no contrast setting input is received.

In FIG. 87, the line 8705 indicates an example power level threshold. In the example shown in FIG. 87, the example power level threshold is set at 50%. In some embodiments, the example power level threshold may be less than 50%. In some embodiments, the example power level threshold may be more than 50%.

As illustrated in FIG. 87, in response to receiving a contrast increase associated with the contrast setting input and determining that the second power level satisfies a power level threshold (for example, more than 50%), the controller of the print head increases the second power level to the third power level (e.g. the third power level is higher than the second power level). In other words, when contrast is increased, the output power for the darker dot (for example, above 50%) is increased, making the dot even darker.

In response to receiving a contrast increase associated with the contrast setting input and determining that the second power level does not satisfy a power level threshold (for example, less than 50%), the controller of the print head decreases the second power level to the third power level (e.g. the third power level is lower than the second power level). In other words, when contrast is increased, the output power for the lighter dot (for example, below 50%) is decreased, making the dot even lighter.

Figure 88:
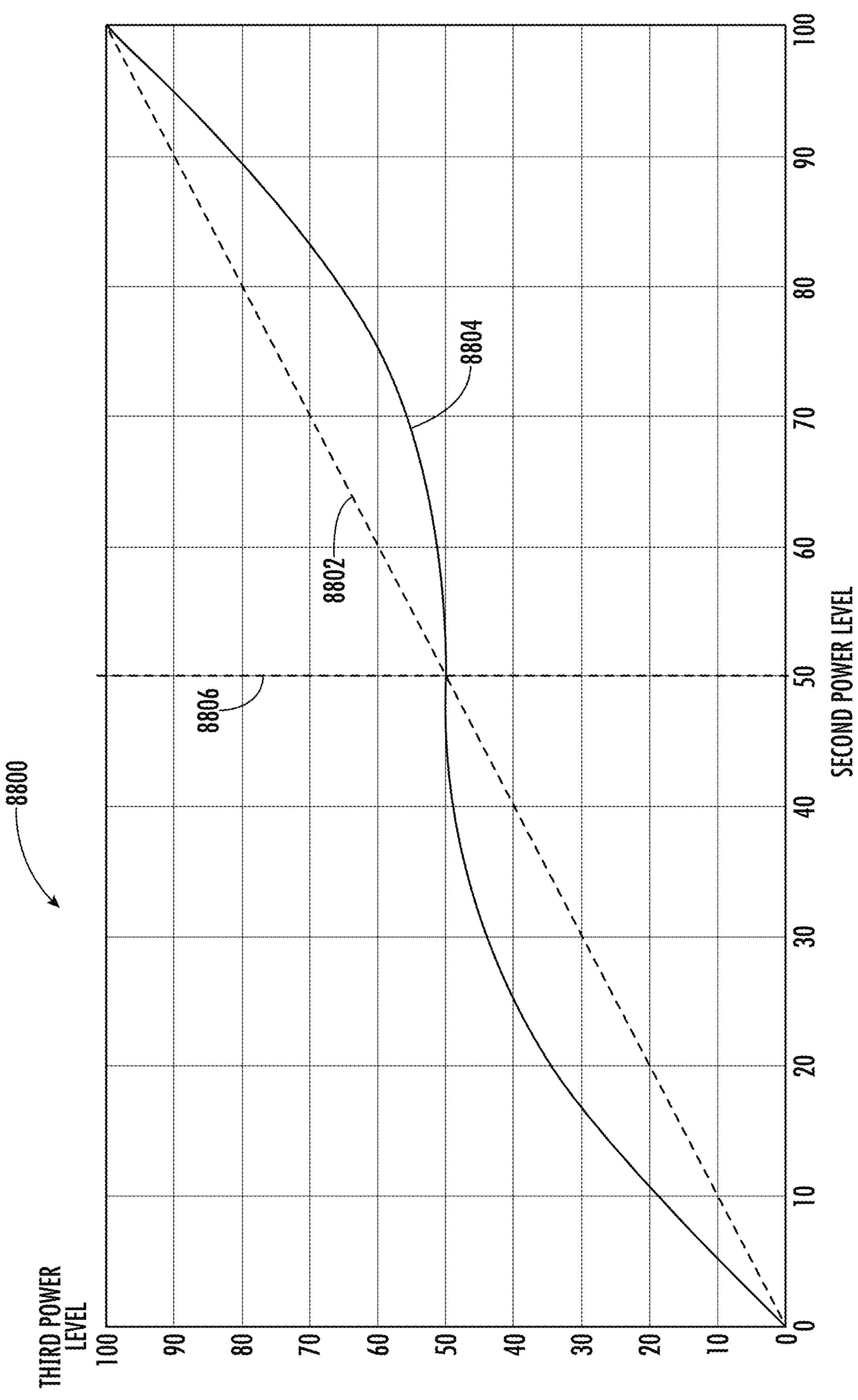
FIG. 88 illustrate an example power level relationship diagram in accordance with examples of the present disclosure.

FIG. 88 illustrates an example diagram 8800 that includes a curve 8804 indicating a relationship between the second power level and the third power level in response to receiving a contrast setting input. In particular, the contrast setting input indicates a contrast decrease of −100%. The curve 8802 indicates a relationship between the second power level and the third power level when no contrast setting input is received.

In FIG. 88, the line 8806 indicates an example power level threshold. In the example shown in FIG. 88, the example power level threshold is set at 50%. In some embodiments, the example power level threshold may be less than 50%. In some embodiments, the example power level threshold may be more than 50%.

As illustrated in FIG. 88, in response to receiving a contrast decrease associated with the contrast setting input and determining that the second power level satisfies a power level threshold (for example, more than 50%), the controller of the print head decreases the second power level to the third power level (e.g. the third power level is lower than the second power level). In other words, when contrast is decreased, the output power for the darker dot (for example, above 50%) is decreased, making the dot lighter.

In response to receiving a contrast decrease associated with the contrast setting input and determining that the second power level does not satisfy a power level threshold (for example, less than 50%), the controller of the print head increases the second power level to the third power level (e.g. the third power level is higher than the second power level). In other words, when contrast is decreased, the output power for the lighter dot (for example, below 50%) is increased, making the dot darker.

Figure 89:
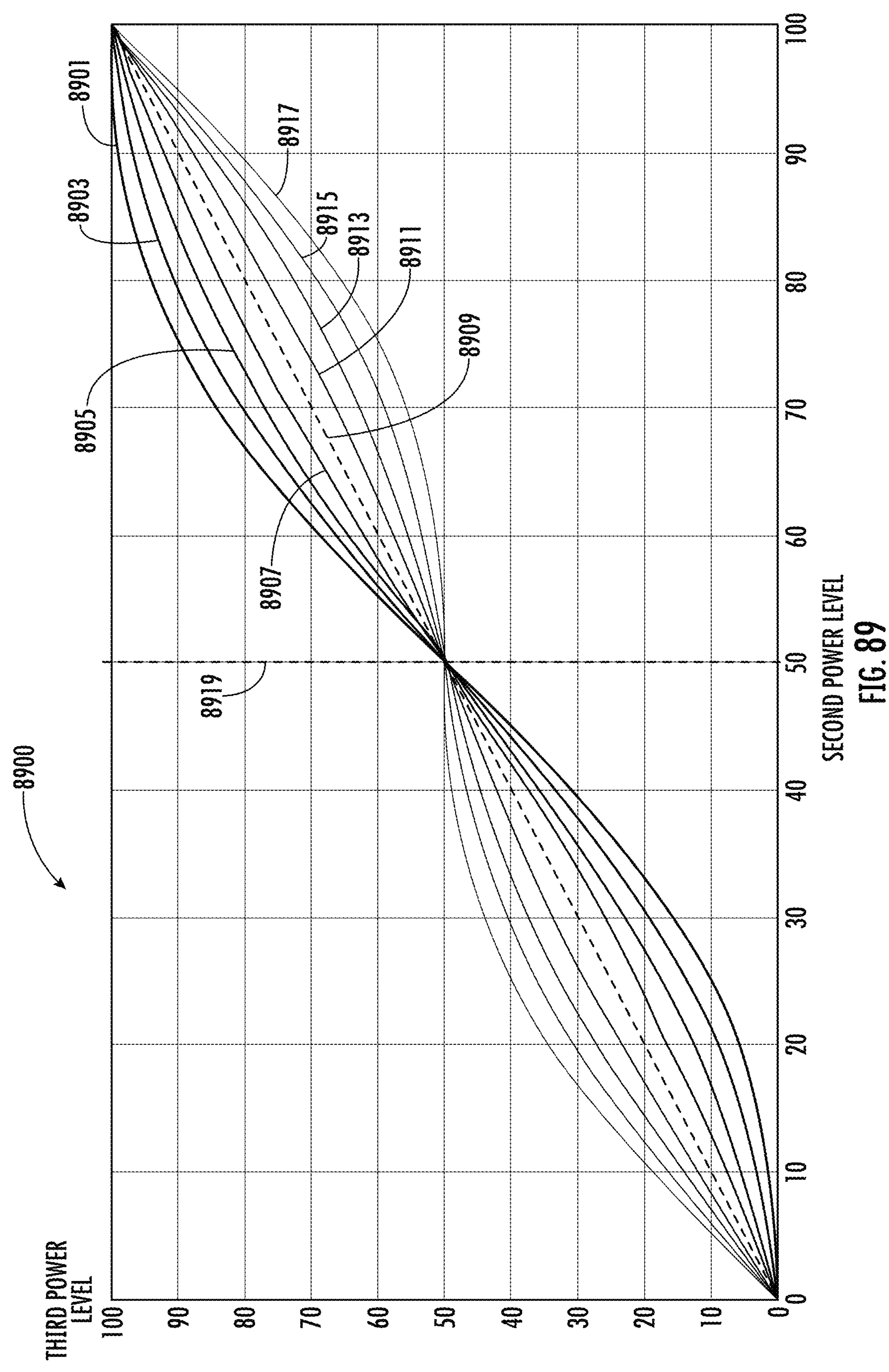
FIG. 89 illustrates an example power level relationship diagram in accordance with examples of the present disclosure.

FIG. 89 is an example diagram 8900 that illustrates example relationships between the second power level and the third power level in response to receiving a plurality of contrast setting inputs.

In particular, line 8919 indicates an example power level threshold at 50%. Curve 8901 illustrates an example relationship between the second power level and the third power level in response to receiving a contrast setting input indicating +100%. Curve 8903 illustrates an example relationship between the second power level and the third power level in response to receiving a contrast setting input indicating +75%. Curve 8905 illustrates an example relationship between the second power level and the third power level in response to receiving a contrast setting input indicating +50%. Curve 8907 illustrates an example relationship between the second power level and the third power level in response to receiving a contrast setting input indicating +25%. Curve 8909 illustrates an example relationship between the second power level and the third power level in response to receiving a contrast setting input indicating 0%. Curve 8911 illustrates an example relationship between the second power level and the third power level in response to receiving a contrast setting input indicating −25%. Curve 8913 illustrates an example relationship between the second power level and the third power level in response to receiving a contrast setting input indicating −50%. Curve 8915 illustrates an example relationship between the second power level and the third power level in response to receiving a contrast setting input indicating −75%. Curve 8917 illustrates an example relationship between the second power level and the third power level in response to receiving a contrast setting input indicating −100%.

Figure 90:
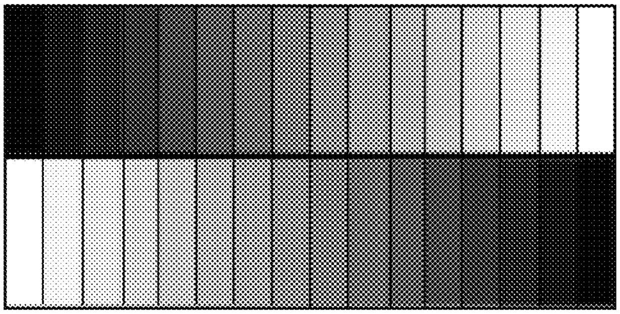
FIG. 90 illustrates an example print media in accordance with examples of the present disclosure.
Figure 91:
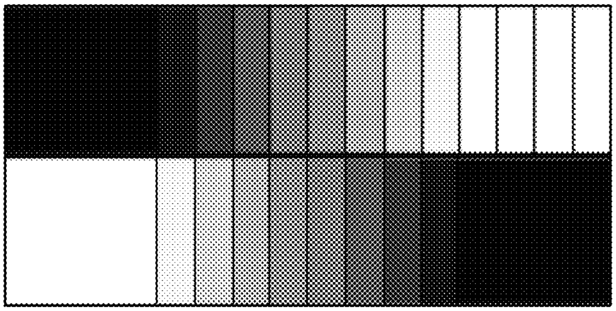
FIG. 91 illustrates an example print media in accordance with examples of the present disclosure.
Figure 92:
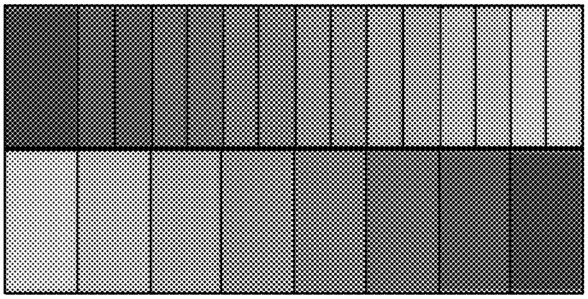
FIG. 92 illustrates an example print media in accordance with examples of the present disclosure.

FIG. 90 illustrates an example image of an example printout. FIG. 91 illustrates an example image of the example printout in FIG. 90 after the contrast is increased. FIG. 92 illustrates an example image of the example printout in FIG. 90 after the contrast is decreased.

Referring back to FIG. 81, subsequent to step/operation 8111, the example method 8100 proceeds to step/operation 8115. At step/operation 8115, a processing circuitry (e.g. a controller of a print head of a printing apparatus such as, but not limited to, the controller 2008 of the print head 302 illustrated and described above in connection with FIG. 20) may provide input power.

In some embodiments, the controller of the print head may provide the third power level to a laser power control system of the print head. As described above, the third power level has been adjusted based on the darkness setting input and the contrast setting input. The laser power control system of the print head is configured to cause a laser subsystem of the print head to print the first dot at the third power level. As such, the printing apparatus prints the first dot at the desired level of darkness and the desired level of contrast as provided by the user through the darkness setting input and the contrast setting input, respectively.

Referring back to FIG. 81, subsequent to step/operation 8115, the example method 8100 proceeds to step/operation 8117 and ends.

In some embodiments, subsequent to step/operation 8111 and prior to step/operation 8115, the example method 8100 may proceed to step/operation 8113. At step/operation 8117, a processing circuitry (e.g. a controller of a print head of a printing apparatus such as, but not limited to, the controller 2008 of the print head 302 illustrated and described above in connection with FIG. 20) may apply smoothing/sharpening algorithm.

Figure 93:
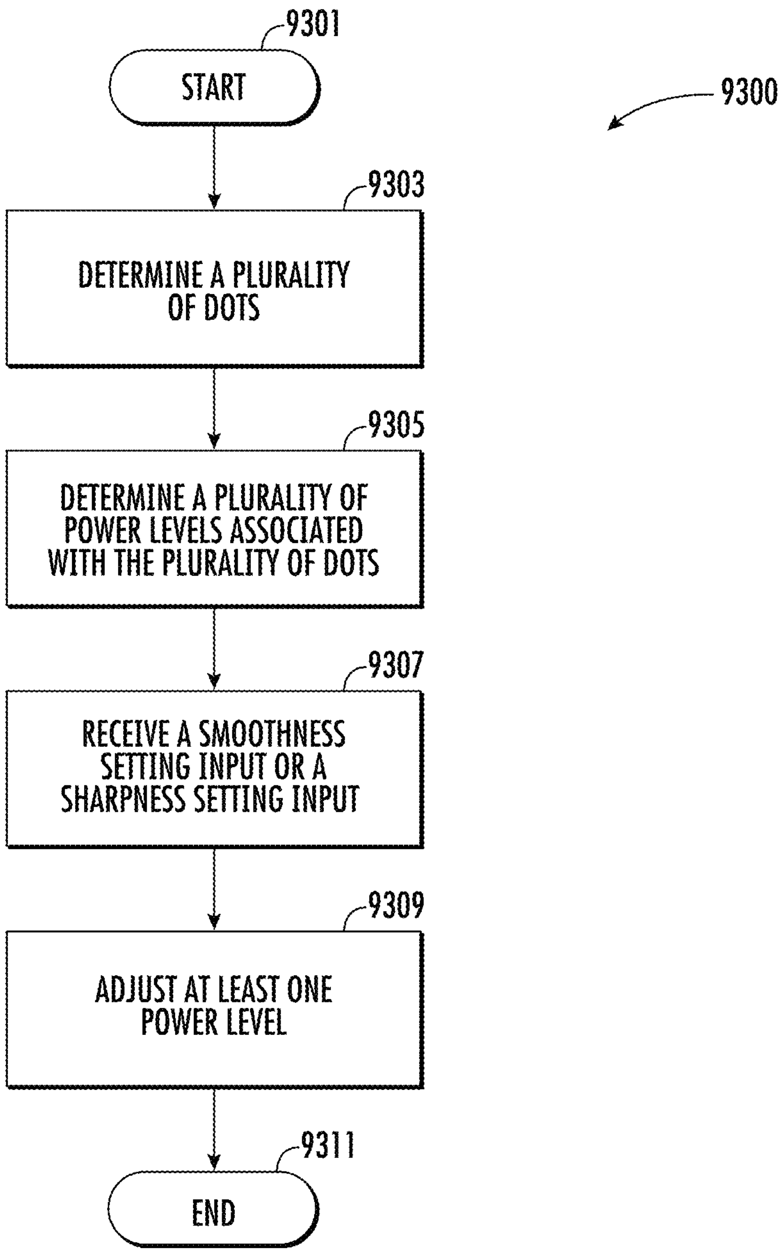
FIG. 93 is an example flow diagram illustrating example methods in accordance with examples of the present disclosure.

Referring now to FIG. 93, an example method 9300 is illustrated. In particular, the example method 9300 illustrates example steps/operations of adjusting power levels in response to smoothness setting input and/or sharpness setting input.

In various embodiments of the present disclosure, by modifying the darkness and contrast, it is possible to see artifact in the edges separating a black-and-white area of the print, which would usually be seen between bars of a barcode. Thus, subsequent to adjusting the power levels based on the darkness setting input and/or contrast setting input, example methods of the present disclosure may further adjust the power level to increase smoothness or sharpness of the edges.

In the example shown in FIG. 93, the example method 9300 starts at block 9301 and then proceeds to step/operation 9303. At step/operation 9303, a processing circuitry (e.g. a controller of a print head of a printing apparatus such as, but not limited to, the controller 2008 of the print head 302 illustrated and described above in connection with FIG. 20) may determine a plurality of dots.

For example, a controller of a print head of a printing apparats may determine a first dot, a second dot, and a third dot from an image buffer or from print data. Each of the first dot, the second dot, and the third dot are to be printed by the printing apparatus on a print media. In some embodiments, the second dot is positioned between the first dot and the third dot. For example, the first dot may be on the left, the second dot may be in the middle, and the third dot may be on the right.

Referring back to FIG. 93, subsequent to step/operation 9303, the example method 9300 proceeds to step/operation 9305. At step/operation 9305, a processing circuitry (e.g. a controller of a print head of a printing apparatus such as, but not limited to, the controller 2008 of the print head 302 illustrated and described above in connection with FIG. 20) may determine a plurality of power levels associated with the plurality of dots.

Continuing from the example above, the controller may determine a first power level associated with the first dot, a second power level associated with the second dot, and a third power level associated with the third dot. As described above, each of the first power level, the second power level, and the third power level has been adjusted based on the darkness setting input and/or contrast setting input (for example, based on the example methods described in at least FIG. 81).

Referring back to FIG. 93, subsequent to step/operation 9305, the example method 9300 proceeds to step/operation 9307. At step/operation 9307, a processing circuitry (e.g. a controller of a print head of a printing apparatus such as, but not limited to, the controller 2008 of the print head 302 illustrated and described above in connection with FIG. 20) may receive a smoothness setting input or a sharpness setting input.

In the present disclosure, the term "smoothness setting input" refers to an input provided by a user (for example, through various user interfaces described herein such as, but not limited to, the UI 140 described above in connection with FIG. 1) that indicates a user request to increase smoothness of the edges in the printout. In other words, the smoothness setting input indicates a user request to decrease the separation between black and white in the printout and provide a gentler gradient between a white-to-black area.

The term "sharpness setting input" refers to an input provided by a user (for example, through various user interfaces described herein such as, but not limited to, the UI 140 described above in connection with FIG. 1) that indicates a user request to increase sharpness of the edges in the printout. In other words, the sharpness setting input indicates a user request to increase the separation between black and white in the printout and reduce the gradient between a white-to-black area.

Referring back to FIG. 93, subsequent to step/operation 9307, the example method 9300 proceeds to step/operation 9309. At step/operation 9309, a processing circuitry (e.g. a controller of a print head of a printing apparatus such as, but not limited to, the controller 2008 of the print head 302 illustrated and described above in connection with FIG. 20) may adjust at least one power level.

In some embodiments, the controller may adjust the second power level based at least in part on the first power level and the third power level in response to receiving a smoothness setting input or a sharpness setting input. For example, the controller may calculate a convolution over the three dots (e.g. a left dot, a current/middle dot, and a right dot), and apply an array multiplication.

For example, in response to receiving a smoothness setting input, the controller may adjust the power level based on the following example algorithm:

$$dot'_{second}=dot_{second}\times\tfrac{1}{3}\times[(1\times dot_{first})(1\times dot_{second})(1\times dot_{third})]$$

In the above example, $dot_{first}$ is the power level associated with the first dot, $dot_{second}$ is the power level associated with the second dot prior to receiving a smoothness setting input, $dot'_{second}$ is the power level associated with the second dot subsequent to receiving a smoothness setting input, and $dot_{third}$ is the power level associated with the third dot. In some embodiments, in response to receiving the smoothness setting input, the printing apparatus may print the second dot based on the power level $dot'_{second}$. In some embodiments, the kernel matrix above can be different than the example algorithm above. In some embodiments, the kernel matrix could be extended to be 3×3 instead of 1×3.

As another example, in response to receiving a sharpness setting input, the controller may adjust the power level based on the following example algorithm:

$$dot'_{second}=dot_{second}\times\tfrac{1}{3}\times[(-1\times dot_{first})(2\times dot_{second})(-1\times dot_{third})]$$

In the above example, $dot_{first}$ is the power level associated with the first dot, $dot_{second}$ is the power level associated with the second dot prior to receiving a sharpness setting input, $dot'_{second}$ is the power level associated with the second dot subsequent to receiving a sharpness setting input, and $dot_{third}$ is the power level associated with the third dot. In some embodiments, in response to receiving the sharpness setting input, the printing apparatus may print the second dot based on the power level $dot'_{second}$. In some embodiments, the kernel matrix above can be different than the example algorithm above. In some embodiments, the kernel matrix could be extended to be 3×3 instead of 1×3.

Referring back to FIG. 93, subsequent to step/operation 9309, the example method 9300 proceeds to step/operation 9311 and ends.

While the description above provides example methods and algorithms of adjusting the power level based on the darkness setting input, the contrast setting input, the smoothness setting input, and/or the sharpness setting input, it is noted that the scope of the present disclosure is not limited to the description above. In some examples, in response to the darkness setting input, the contrast setting input, the smoothness setting input, and/or the sharpness setting input, a controller of a print head of a printing apparatus may adjust the duty cycle of the print head.

In contrast with a printing apparatus utilizing thermal printing technologies (which adjusts the print duration of a full line), an example printing apparatus utilizing laser printing technologies may operate in a pulsed mode and may adjust the duty cycle of the pulse per dot. As such, an example printing apparatus utilizing laser printing technologies enables proper print quality and greyscale control, while a printing apparatus utilizing thermal printing technologies may only be able to conduct a gross adjustment, making some part of the label with better print quality while other would be worse (due to dot history control, which cannot be optimized for all type of combination).

Figure 94:
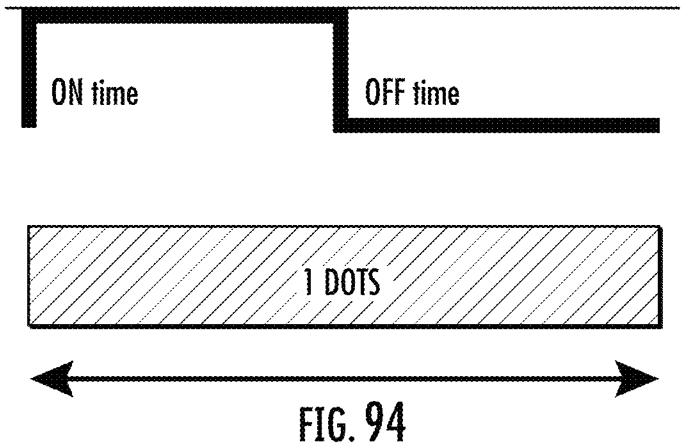
FIG. 94 is an example diagram illustrating an example duty cycle in accordance with examples of the present disclosure.
Figure 95:
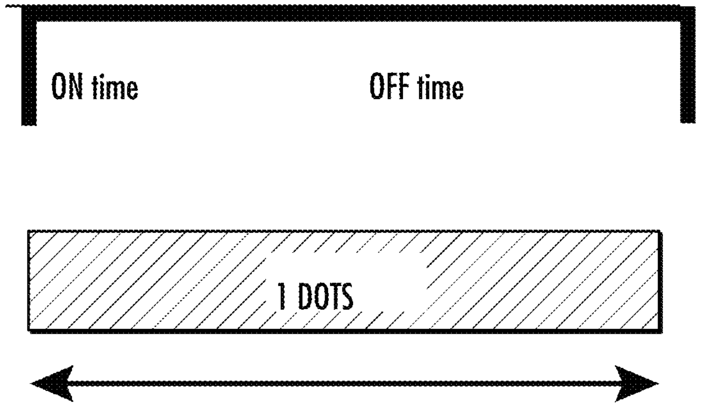
FIG. 95 is an example diagram illustrating an example duty cycle in accordance with examples of the present disclosure.
Figure 96:
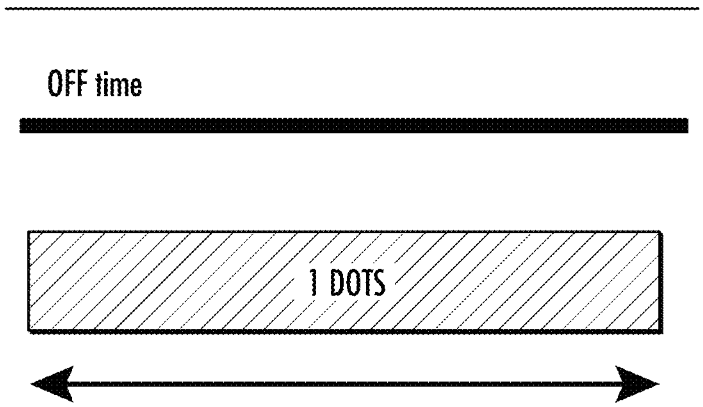
FIG. 96 is an example diagram illustrating an example duty cycle in accordance with examples of the present disclosure.

In the present disclosure, the term "duty cycle" refers to the amount of time that the laser source is turned ON when printing a dot as compared to the total amount of time of printing the dot. Referring now to FIG. 94 to FIG. 96, three example duty cycles are illustrated.

FIG. 94 illustrates an example 50% duty cycle, where the laser source is turn ON 50% of the time when printing a dot and turned OFF 50% of the time when printing the dot. In some example, the resulting average power making the printed dot be equivalent to a 50% grey. FIG. 95 illustrates an example 100% duty cycle, where the laser source is turn ON 100% of the time when printing a dot and turned OFF 0% of the time when printing the dot. In some example, the resulting average power would make the printed dot be equivalent to a full black. FIG. 96 illustrates an example 0% duty cycle, where the laser source is turn ON 0% of the time when printing a dot and turned OFF 100% of the time when printing the dot. In some example, the resulting average power would make the printed dot be equivalent to a full white.

Figure 97:
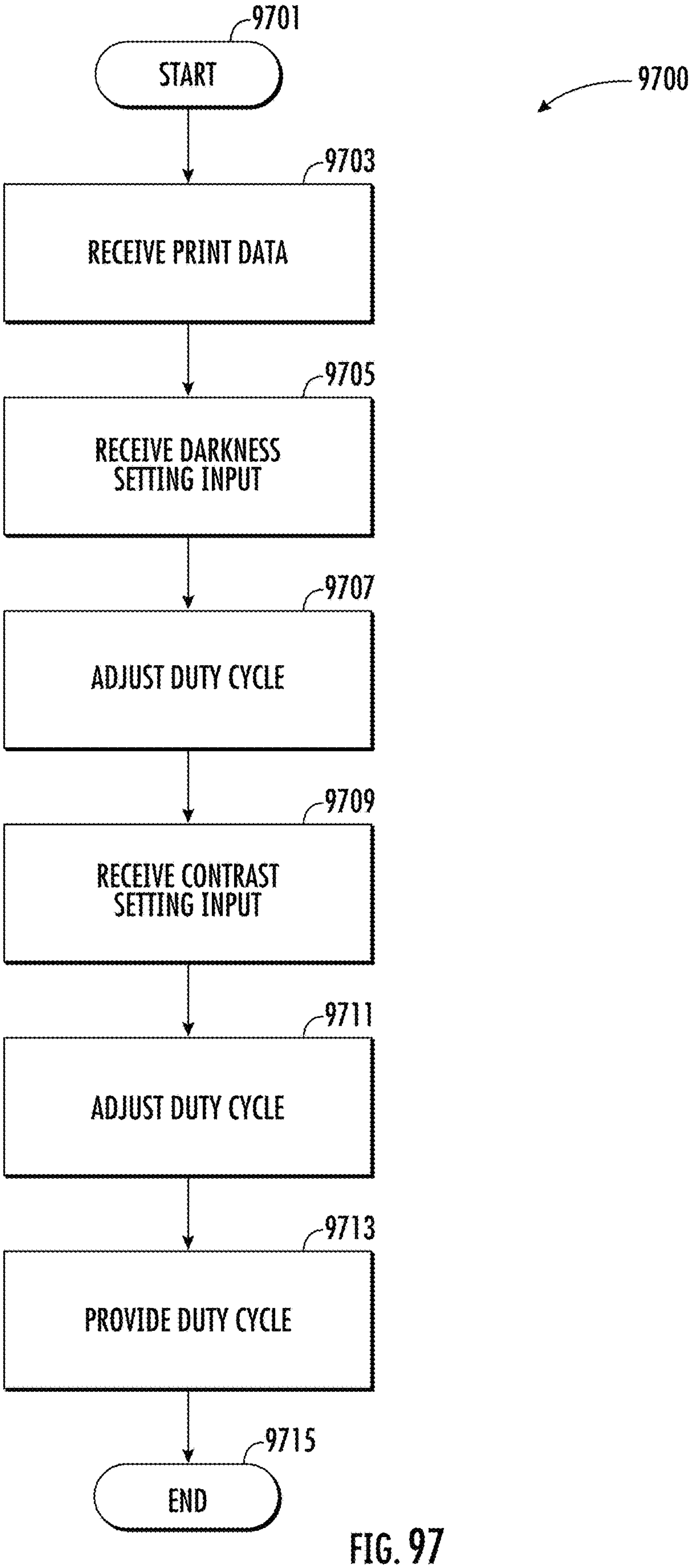
FIG. 97 is an example flow diagram illustrating example methods in accordance with examples of the present disclosure.

Referring now to FIG. 97, an example method 9700 is illustrated. In particular, the example method 9700 illustrates example steps/operations of adjusting duty cycles in response to darkness setting input and/or contrast setting input. In some embodiments, the contrast and darkness setting modification conducted by a controller of a print head of a printing apparatus circuitry (such as, but not limited to, the controller 2008 of the print head 302 illustrated and described above in connection with FIG. 20), which may improve the printing operation efficiency as the main printer CPU does not handle any of the intensive darkness/contrast adjustments.

In the example shown in FIG. 97, the example method 9700 starts at block 9701 and then proceeds to step/operation 9703. At step/operation 9703, a processing circuitry (e.g. a controller of a print head of a printing apparatus such as, but not limited to, the controller 2008 of the print head 302 illustrated and described above in connection with FIG. 20) may receive print data.

As described above, the print data may be in the form of an image buffer. In some embodiments, a processor of the printing apparatus (for example, the main CPU of the printing apparatus) may receive raw printing data, which comprises data representing barcode, text, image, and/or the like that are to be printed on a print media. The processor of the printing apparatus (for example, the main CPU of the printing apparatus) may generate an image buffer based at least in part on the raw print data and provides a temporary storage for the raw print data. Prior to the print head beginning to print the barcode, text, image, and/or the like represented by the raw print data, the processor of the printing apparatus may provide the image buffer to a controller of a print head (such as, but not limited to, the controller 2008 of the print head 302 illustrated and described above in connection with FIG. 20).

In some embodiments, the print data may indicate at least a first duty cycle. In some embodiments, the first duty cycle is associated with a first dot to be printed by the print head on a print media. In examples where no darkness or contrast adjustments are made, the duty cycle provided to the laser source in the print head equals to the first duty cycle.

Referring back to FIG. 97, subsequent to step/operation 9703, the example method 9700 proceeds to step/operation 9705. At step/operation 9705, a processing circuitry (e.g. a controller of a print head of a printing apparatus such as, but not limited to, the controller 2008 of the print head 302 illustrated and described above in connection with FIG. 20) may receive darkness setting input.

In some embodiments, the darkness setting input may be received by a controller of a print head. As described above, the darkness setting input may indicate a desired level of darkness in a printout. In some embodiments, the darkness setting input may be expressed as a percentage between −100% to +100%.

Referring back to FIG. 97, subsequent to step/operation 9705, the example method 9700 proceeds to step/operation 9707. At step/operation 9707, a processing circuitry (e.g. a controller of a print head of a printing apparatus such as, but not limited to, the controller 2008 of the print head 302 illustrated and described above in connection with FIG. 20) may adjust duty cycle.

In some embodiments, the controller of the print head may adjust the first duty cycle to a second duty cycle based at least in part on the darkness setting input. For example, the controller may adjust the duty cycle based on the following example algorithm:

$$P(y)=\max\left(\min\left(x+\frac{\text{Ratio }\%}{100\%}\text{Darkness},\,100\right),\,0\right)$$

In the above algorithm, x is the first duty cycle, which is between 0% (inclusive) and 100% (inclusive). Darkness is the darkness setting input adjustable by the user, which is between −100% (inclusive) and 100% (inclusive). Ratio % is the darkness step size ratio that is predetermined and fixed by the printing apparatus based on the step size between two darkness levels. In other words, adjusting the first duty cycle to the second duty cycle is further based on the darkness step size ratio. In some embodiments, the darkness step size ratio is 25%. In some embodiments, the darkness step size ratio is less than 25%. In some embodiments, the darkness step size ratio is more than 25%.

In the above algorithm, the min calculations and max calculations are utilized to clip/normalize the second duty cycle P(y) between 0% or 100% in case the calculated value is below 0% or above 100%. The following is an example calculation of the second duty cycle P(y) in a hypothetical use case where the first duty cycle x equals 60%, the darkness step size ratio Ratio % equals 25%, the darkness setting input Darkness equals +15%:

$$P(y) = 60\% + \left(\frac{25\%}{100\%}\right) \times (+15\%) = 63.75\% \approx 64\%$$

As illustrated in the above example calculation, in response to receiving a darkness increase (e.g. a positive darkness setting input) associated with the darkness setting input, the controller of the print head increases the first duty cycle to the second duty cycle. In other words, the second duty cycle is higher than the first duty cycle, making the entire printout darker. In response to receiving a darkness decrease (e.g. a negative darkness setting input) associated with the darkness setting input, the controller of the print head decreases the first duty cycle to the second duty cycle. In other words, the second duty cycle is lower than the first duty cycle, making the entire printout lighter.

Referring back to FIG. 97, subsequent to step/operation 9707, the example method 9700 proceeds to step/operation 9709. At step/operation 9709, a processing circuitry (e.g. a controller of a print head of a printing apparatus such as, but not limited to, the controller 2008 of the print head 302 illustrated and described above in connection with FIG. 20) may receive contrast setting input.

In some embodiments, the contrast setting input may be received by a controller of a print head. As described above, the contrast setting input may indicate a desired level of contrast in a printout. In some embodiments, the contrast setting input may be expressed as a percentage between −100% to +100%.

Referring back to FIG. 97, subsequent to step/operation 9709, the example method 9700 proceeds to step/operation 9711. At step/operation 9711, a processing circuitry (e.g. a controller of a print head of a printing apparatus such as, but not limited to, the controller 2008 of the print head 302 illustrated and described above in connection with FIG. 20) may adjust duty cycle In some embodiments, the controller of the print head may adjust the second duty cycle to a third duty cycle based at least in part on the contrast setting input. For example, the controller may adjust the duty cycle based on the following example algorithm:

$$y1 = A \times \sin\left(2\pi \times \frac{x}{f}\right)$$

$$P(y) = \max\left(\min\left(x - \text{Contrast} \times y1 \times \frac{\text{Ratio }\%}{100\%}, 100\right), 0\right)$$

In the above algorithm, x is the second duty cycle, which is between 0% (inclusive) and 100% (inclusive). Contrast is the contrast setting input adjustable by the user, which is between −100% (inclusive) and 100% (inclusive). Ratio % is the contrast step size ratio that is predetermined and fixed by the printing apparatus based on the slope steepness between two contrast levels. In other words, adjusting the second duty cycle to the third duty cycle is further based on the contrast step size ratio. In some embodiments, the contrast step size ratio is 25%. In some embodiments, the contrast step size ratio is less than 25%. In some embodiments, the contrast step size ratio is more than 25%. A is a predetermined, fixed amplitude value for the curvature. In some embodiments, A is set to 1. In some embodiments, A is set to other values.

In the above algorithm, the min calculations and max calculations are utilized to clip/normalize the third duty cycle P(y) between 0% or 100% in case the calculated value is below 0% or above 100%. f is the frequency value based on whether the duty cycles are normalized. In the above algorithm, the duty cycles are normalized, hence f is set to 100. In an example where the duty cycle is not normalized, f is set to the max duty cycle value.

The following is an example calculation of the third duty cycle P(y) in a hypothetical use case where the second duty cycle x equals 60%, the contrast step size ratio Ratio % equals 25%, the contrast setting input Contrast equals +55%, the amplitude A equals to 1, and the frequency f equals to 100%:

$$y1 = 1 \times \sin\left(2\pi \times \frac{60\%}{100\%}\right) = -0.5877$$

$$P(y) = 60\% - 25\% \times (-0.5877) \times \frac{25\%}{100\%} = 62.2041947 \approx 62\%$$

Similar to those described above, in response to receiving a contrast increase associated with the contrast setting input and determining that the second duty cycle satisfies a duty cycle threshold (for example, more than 50%), the controller of the print head increases the second duty cycle to the third duty cycle (e.g. the third duty cycle is higher than the second duty cycle). In other words, when contrast is increased, the duty cycle for the darker dot (for example, above 50%) is increased, making the dot even darker. In response to receiving a contrast increase associated with the contrast setting input and determining that the second duty cycle does not satisfy a duty cycle threshold (for example, less than 50%), the controller of the print head decreases the second duty cycle to the third duty cycle (e.g. the third duty cycle is lower than the second duty cycle). In other words, when contrast is increased, the duty cycle for the lighter dot (for example, below 50%) is decreased, making the dot even lighter.

Similar to those described above, in response to receiving a contrast decrease associated with the contrast setting input and determining that the second duty cycle satisfies a duty cycle threshold (for example, more than 50%), the controller of the print head decreases the second duty cycle to the third duty cycle (e.g. the third duty cycle is lower than the second duty cycle). In other words, when contrast is decreased, the duty cycle for the darker dot (for example, above 50%) is decreased, making the dot lighter. In response to receiving a contrast decrease associated with the contrast setting input and determining that the second duty cycle does not satisfy a duty cycle threshold (for example, less than 50%), the controller of the print head increases the second duty cycle to the third duty cycle (e.g. the third duty cycle is higher than the second duty cycle). In other words, when contrast is decreased, the duty cycle for the lighter dot (for example, below 50%) is increased, making the dot darker.

Referring back to FIG. 97, subsequent to step/operation 9711, the example method 9700 proceeds to step/operation 9713. At step/operation 9713, a processing circuitry (e.g. a controller of a print head of a printing apparatus such as, but not limited to, the controller 2008 of the print head 302 illustrated and described above in connection with FIG. 20) may provide duty cycle.

In some embodiments, the controller of the print head may provide the third duty cycle to a laser power control system of the print head. As described above, the third duty cycle has been adjusted based on the darkness setting input and the contrast setting input. The laser power control system of the print head is configured to cause a laser subsystem of the print head to print the first dot at the third duty cycle. As such, the printing apparatus prints the first dot at the desired level of darkness and the desired level of contrast as provided by the user through the darkness setting input and the contrast setting input, respectively.

Referring back to FIG. 97, subsequent to step/operation 9713, the example method 9700 proceeds to step/operation 9715 and ends.

While the description above provides example algorithms for adjusting darkness and/or contrast, it is noted that the scope of the present disclosure is not limited to the description above. For example, example embodiments may implement one or more lookup tables in addition to, or in alternative of, the example algorithms.

As described above, when implementing example algorithms, power level associated with each dot will be input to the darkness algorithm and then to the contrast algorithm to calculate the resulting output power, with little to no need for prior calculation. The last calculated power level is sent to the laser power control subsystem for printing the current dot.

In embodiments where one or more lookup tables are implemented, the entire lookup table for darkness adjustments and/or for contrast adjustments will be calculated in advance for each of the possible power levels and/or duty cycles. In other others, a processor may calculate the entire input range from 0 to 100% for each of the lookup tables. When an input (e.g. the first power level or the first duty cycle) is provided to the controller of the print head, the controller can directly fetch the resulting output without doing any calculation.

In some embodiments, a processor may calculate a lookup table for the darkness adjustment with respect to power levels based on the examples described above including, but not limited to, those described in connection with at least FIG. 81. In some embodiments, a processor may calculate a lookup table for the contrast adjustment with respect to power levels based on the examples described above including, but not limited to, those described in connection with at least FIG. 81. In some embodiments, a processor may calculate a lookup table for the darkness adjustment and the contrast adjustment with respect to power levels based on the examples described above including, but not limited to, those described in connection with at least FIG. 81.

In some embodiments, a processor may calculate a lookup table for the darkness adjustment with respect to duty cycles based on the examples described above including, but not limited to, those described in connection with at least FIG. 97. In some embodiments, a processor may calculate a lookup table for the contrast adjustment with respect to duty cycles based on the examples described above including, but not limited to, those described in connection with at least FIG. 97. In some embodiments, a processor may calculate a lookup table for the darkness adjustment and the contrast adjustment with respect to duty cycles based on the examples described above including, but not limited to. those described in connection with at least FIG. 97.

As an example, an example simplified lookup table for a darkness setting input indicating +50% is provided below. The lookup table can work for both power level and duty cycle. For example, if the first power level or duty cycle is 30%, the second power level or duty cycle is 42.5%. As another example, if the first power level or duty cycle is 60%, the second power level or duty cycle is 72.5%. In both examples, the total power would be increased to make the dot darker.

Example Darkness Setting Lookup Table

| First Power Level or Duty Cycle | Second Power Level or duty Cycle (Darkness Setting Input = 50%) |
|---|---|
| 0% | 12.5% |
| 10% | 22.5% |
| 20% | 32.5% |
| 30% | 42.5% |
| 40% | 52.5% |
| 50% | 62.5% |
| 60% | 72.5% |
| 70% | 82.5% |
| 80% | 92.5% |
| 90% | 100% |
| 100% | 100% |

As such, in accordance with various embodiments of the present disclosure, the controller of the print head may adjust the first power level to the second power level based on a darkness setting lookup table. Additionally, or alternatively, the controller of the print head may adjust the second power level to the third power level further based on a contrast setting lookup table.

In some embodiments, a combination of both example algorithms and lookup tables may be used. For example, the controller of the print head may adjust the first power level to the second power level based on a darkness setting lookup table, and may adjust the second power level to the third power level based on the example algorithm described above in connection with at least FIG. 81. As another example, the controller of the print head may adjust the first power level to the second power level based on the example algorithm described above in connection with at least FIG. 81, and may adjust the second power level to the third power level based on a contrast setting lookup table. As another example, the controller of the print head may adjust the first duty cycle to the second duty cycle based on a darkness setting lookup table, and may adjust the second duty cycle to the third duty cycle based on the example algorithm described above in connection with at least FIG. 97. As another example, the controller of the print head may adjust the first duty cycle to the second duty cycle based on the example algorithm described above in connection with at least FIG. 97, and may adjust the second duty cycle to the third duty cycle based on a contrast setting lookup table.

As such, various embodiments of the present disclosure provide improvements in darkness and contrast setting adjustments in a print apparatus utilizing laser printing technologies. For example, calculations and operations associated with darkness and contrast setting adjustments are handled by the laser print head itself for faster processing and in order to free the main printer CPU from calculation. Various examples of darkness and contrast algorithms are provided to adjust either or both the output power level and/or duty cycle for each dot to be printed, thus bringing an improved print quality on the print media by controlling accurately the greyscale level for each individual dot. Various example embodiments of the present disclosure may be applied to not only a laser printer in a continuous laser mode, but also in a pulsed laser mode. Various example methods of the present disclosure can be done through mathematic algorithm, via one or more lookup tables, or a combination of both.

LPH Smart Print Head

In many examples, thermal print heads may be passive components with no in-built intelligence. An example thermal print head may be configured to react only to a control signal/data signal sent by an example printer. In addition, many thermal print heads may be incompatible with ILIT media.

In accordance with various embodiments of the present disclosure, systems, methods and apparatuses with intelligence to provide a variety of advantageous features are provided. In some examples, print raster, vector, support to reprint, error handling, printer synchronization and active printer communication capabilities are provided.

In some embodiments, the print head may comprise a plurality of components/element. For example, the print head may comprise a microcontroller unit, an FPGA, Double Data Rate Synchronous Dynamic Random-Access Memory (DDR SDRAM) memory, a bi-directional communication bus and/or the like.

In some examples, a print head for support of raster/vector printing, complete synchronization with printer and media feed with laser scanning functions may be provided. The example print head may provide bi-directional communication with an example printer via a Serial Peripheral Interface (SPI) bus and control signals. Using the SPI bus, in some examples, the printer may provide firmware updates for the example microcontroller unit and/or FPGA. In one example, the firmware updates may be implemented when the print head boots up. A checksum feature may be implemented to ensure that firmware is not corrupted and to provide means to revert to the previous firmware in the event of upgrade failure. In some examples, bi-directional communication may facilitate print head setup, print head alerting (e.g., alerting a printer of an error/interrupt functionality), firmware upgrades, motor and laser synchronization, and/or the like. In contrast with many existing solutions, the example print head may be configured to store additional data (e.g., multiple lines of data). Accordingly, the example print head may utilize RAM memory to provide auto-reprint capabilities (e.g., an entire label) without needing to obtain/fetch data from an example printer. Additionally, the example print head may provide real-time error monitoring and error reporting conditions to the example printer (e.g., temperature changes, power rail out of range, critical laser error, verify genuine ILIT media is inserted, perform self-diagnostics, and/or the like). The example print head may enable in the field firmware upgrades for continuous print head improvement. In some examples, the print head may integrate safety interlock features in order to shut off a laser when unsafe conditions are detected. Additionally, the print head may be configured to detect when a non-ILIT media is inserted into the printer, support color and greyscale printer, or the like.

In some examples, the microcontroller unit may be configured as the main controller in order to program various PLL (which are used for polygon motor speed control and laser dot clock), setup/configure the print head for any print label, and/or provide active monitoring for error conditions.

In some examples, the FPGA may be configured to receive print data and convert each dot into a power value in order to facilitate black/white printing or greyscale printing. Additionally, the example FPGA may coordinate synchronization between the polygon motor, laser scan clock and printer motor stepping in order to ensure that all parts are optimally synchronized without any latency which may result, in some examples, in a slanted printout. Additionally, the FPGA may bridge communication between the printer CPU and print head microcontroller unit, provide additional safety interlock handling, or the like. The example system may support both raster printing and vector printing, as well as an ability to reprint a full label without fetching data from the printer side. As noted above, in some examples, the print head may be equipped with a DDR SDRAM memory.

As discussed herein, vector printing may follow a calculated path instead of printing line by line. As such, the ability to store print image data in internal memory further supports vector printing functionality. Additionally, in an instance in which an error occurs on a current label and a reprint is requested (in vector or raster mode), the print head can directly fetch the data from memory to reprint the most recently printed label and/or a number of recently printed labels.

Identify and Calculate the Media Starting Offset Position for Laser Enabled Barcode Printers Using ML In some examples, the starting position of a media for a laser enabled printing apparatus may be incorrectly positioned such that a printed label may be substandard and/or unusable.

In accordance with various embodiments of the present disclosure, systems, methods and techniques for automatically determining a media starting offset position for a printing apparatus are provided.

Firstly, a manually adjusted start position offset may be provided. For example, values associated with a position of an example media, motor and/or hexagon mirror may be provided. Then, data associated with the vibration and movement of the printing apparatus due to an external environment (e.g., factory vibrations, belt movement, sound vibration, and/or the like) and an internal environment (e.g., motor, media characteristics including weight, and/or the like) in addition to the manually adjusted start position offset may be captured. By way of example, vibration of the example printing apparatus may increase if the motor is trying to pull more weighted media, which may result in displacement of the laser offset. Based on the captured data/measured parameters, training data may be generated. In various examples, the training data may be utilized to train a Machine Learning algorithm. The Machine Learning algorithm may be configured to automatically adjust the start position offset, which in turn may internally adjust the example hexagon mirror and media position. In some examples, the Machine Learning algorithm may identify patterns. For example, the Machine Learning algorithm may be trained to identify a ratio of the incident vibrations in relation to the start position offset and generate a predictive output corresponding with a target start position offset from which printing may commence. The Machine Learning algorithm may be or comprise a hierarchical clustering algorithm configured to identify similarities and patterns associated with captured data/measured parameters (e.g., detected vibrations) and automatically adjust the start position offset accordingly.

Energizing Drum Roll for Enabling the Low Power Laser Usage in Laser Based Barcode Printing As described herein, in some examples, a high power laser beam may be utilized to pre-energize/heat an example media prior to a lower power laser beam (e.g., writing laser beam) impinging a mark on the example media.

In accordance with various embodiments of the present disclosure, an energizing drum roll may be provided. The energizing drum roll may be configured to heat the media up to a threshold level such that less power is required to pre-energize/heat the media. Thus, a lower power laser beam may be utilized as the pre-energizing beam thereby reducing overall power consumption by the printing apparatus.

Auto Laser Power Adjustment Based on the Media Type for Laser Barcode Printer for Avoiding Hazards In some examples, a power output of an example laser source may need to be constant. Damage may result (e.g., a fire) if a non-standard media is used with an example printing apparatus.

In accordance with various embodiments of the present disclosure, a light beam based sensor is provided. The example light beam based sensor may be utilized to determine a media type and may operate to control a power output of a laser source that is focused on the example media based at least in part on the detected media type. In so doing, potential damage to the media and its surroundings may be averted.

Laser Print Head Focus Test Methodology

In order to obtain a target DPI and provide a good print quality, the laser focal point may need to be precisely set and within a target range when mounted on a printing apparatus.

In accordance with various embodiments of the present disclosure, an automated process for determining the laser focal point of a print head is provided. In some examples, the automated process may measure and verify that a focal point setting is within a target range. In some examples, a printed pattern may be used to determine a corresponding reflectance value for a specified laser focal point. In some examples, an example printed pattern may facilitate measurement of DPI and a size deviation from a target value or range. In various examples, a verifier scanner, reflective sensor, one or RGB sensors, one or more single-color light sources, or an ambient light source may be utilized to determine a laser focal point.

In some examples, a beam generated by an example laser source may converge at a focal point in order to print a small dot. The power of the laser print head may be defined at this location for a specific laser reactive media. The dot size may progressively increase as printing occurs outside the focal point. This may also decrease the dot reflectance value as the power is spread to a larger area. The term reflectance may refer to an amount of light reflected and may be represented/measured as a percentage.

In some examples, a first printed pattern comprising a plurality of dots arranged in a matrix format may be used to measure a laser focal point. The dot size may be defined by the smallest resolution of the laser print head and the distance between dots (e.g., between two center points of two respective dots) and may be determined based on a reflectance value of a group of printed dots. In various examples, dots may be distinct when printed at focal point and may appear larger when printed outside the focal point. Thus, a dot size may increase when printing occurs further away from a particular focal point. A reflectance value of a plurality of printed dots may vary as the dot sizes change. For example, a reflectance value printed at a focal point will result at a maximum due to wide white spaces in between the dots. As the dot sizes becomes larger, the area of the white gap may shrink thus reducing the reflectance. A correlation graph may be determined based on reflectance values that is printed at different locations with respect to a focal point. In turn, this may be used to determine the location of the focal point or determine whether the focal point is within a target range.

In some examples, an example printing apparatus may utilize an RGB sensor with ambient light in order to detect laser reactive media. The example RGB sensor may detect reflected light and generate one or more signals corresponding with the reflected light. The one or more signals may be mapped at different reflectance values. In another example, a CMOS sensor with a red light source may be utilized to capture the grayscale level of the printed image. In another example, a second printed pattern may be used to ensure accurate adjustment of a focal point (e.g., by using a series of alternating bars and spaces of equal widths). In some examples, the second printed pattern may be printed vertically, horizontally or in both directions. Additionally and/or alternatively, a chess pattern comprising black and white squares of equal sizes may be used. If the focal point is out of a target range, the printed area will be wider than the space area. The acquisition of the printed pattern reflectance may be performed by a sensing device/element (e.g., a verifier scanner, a reflective sensor or an RGB sensor) placed in front of the printer and after the printing line. The sensing device/element may generate a corresponding reflectance waveform. The signal provided by the sensing device/element may analyzed to determine the size of each element using an algorithm. Based on the delta difference between the space width and the bar width, the system may determine whether the focal point is set correctly. In some examples, the delta difference may be determined according to the following equation:

$$\text{Delta}=\text{average(bars)}-\text{average(space)}$$

The focal point may be set when delta is below a particular threshold (e.g., 0.2 dot size). The focal point may be adjusted using a mechanical fixture to modify a position of the print head based on the determined delta difference. Using the techniques described herein, a laser focal point may be measured and set to provide optimum print resolution and print quality.

Print Head Scanning Beam Alignment to Moving Media

In many examples, the complexity of an optical assembly in a high-power laser print head may cause variability in scanning laser beam positioning and orientation. Compensation for this variability may be required to efficiently maintain performance, ease manufacturability, and ensure repeatability/consistency of print quality.

Using the systems, methods and techniques disclosed herein, easier manufacturability, performance repeatability, higher yields on manufacturing lines and increased consistency of product performance unit-to-unit may be achieved.

In accordance with various embodiments of the present disclosure, techniques for controlling focus, line position, and line skew in the print head are provided such that fine-tuning operations can be eliminated and/or substantially reduced. As described herein, an example optical assembly may comprise a focusing component comprising one or more mirrors (e.g., fixed fold mirrors disposed downstream with respect to collimation optics, a rotating polygon and a scan lens). In some examples, at least one of the example mirrors may be adjusted in multiple degrees of freedom to achieve the required alignment. In some examples, a fold mirror having a reflection angle closest to normal may be utilized. For instance, a mirror with an incidence angle of approximately 10 degrees may be utilized.

In various embodiments, the example mirror may comprise an elongated, narrow rectangle that is configured to relay a single scanning line from a prior mirror to a subsequent mirror. In some examples, a mount may be placed behind the example mirror to secure it (e.g., using a glue or other adhesive). In some examples, the mount may be a rectangular-shaped metallic member. The example mount may comprise socket joints in a plurality of corners (e.g., three of the four corners of the example rectangular mount). Additionally, a plurality of screws with ball heads may be inserted into the socket joints and threaded into the print head housing. In order to adjust the example mirror, the position of the plurality of screws (e.g., three screws) may be adjusted to change the position of the example mirror by shortening or lengthening the path length to an example print media. In some examples, one of the plurality of screws may be vertically aligned and one of the plurality of screws may be horizontally aligned to serve as a pivot point. The vertically aligned screw may be adjusted to shift the targeting of a scan line up and down, aiming for a subsequent mirror and an exit window aperture. In some examples, the horizontally aligned screw may be adjusted to cause a slight tilt of the line. At the same time the line may be shifted to the left or right, but the laser on-off timing can be shifted to compensate so that the print line remains horizontally oriented. In various examples, adjustments may be monitored in real time by a line width profiler to verify that a target is hit. Accordingly, the unit may be integrated into a printing apparatus without further adjustments.

Media Jam Detection

In many examples, in order to avoid laser direct firing on the print platen, it may be necessary to stop laser power when a media jam occurs. In some examples, the media may feed incorrectly (i.e., wrap around) an example platen roller when misaligned.

In accordance with various embodiments of the present disclosure, systems, methods and techniques for preventing direct exposure of a print platen to laser beams (e.g., in the event of a media jam) are provided.

In some examples, a media jam sensor may be provided to detect a media jam event during printing operations. The example media jam sensor may be or comprise a transmissive optical sensor and encoder disk. The example encoder disk may link to the example platen roller within which the encoder disk will be rotated by the platen roller during media movement. The transmissive sensor may detect and record movement of the example media and provide feedback to an example processor. If a media jam event is detected (e.g., if the media is feeding into the platen roller incorrectly), a slow down or sudden stop of an encoder count may be detected. In some examples, the encoder delta may be computed according to the formula below:

$$\text{EncoderDelta}=\text{EncoderCount}_{i+n}-\text{EncoderCount}_i$$

In various examples, a media jam event may be identified if the EncoderDelta value falls below a media jam threshold. In one example if the EncoderDelta value falls below half of the averaged EncoderDelta, a media jam event may be identified. In some examples, the media jam threshold may be defined in accordance with the formula below:

$$MediaJamThreshold = \frac{\sum_{i=1}^{n}(EncoderDelta_n)}{2n}$$

Low Inductance, High Frequency, High Power Laser Drive Circuit

As described herein, an example printing apparatus may utilize high power laser sources to activate reactive media at a target print speed rate. In various examples, high frequency lasers operating at 1 MHz or higher may be utilized to print high resolution images/text at high speeds. This poses a challenge in achieving high laser on/off speeds as high power laser sources may be physically larger and typically used in lower speed applications, such as welding, where high frequency is not required.

In accordance with various embodiments of the present disclosure, systems and techniques for facilitating high speed operations are provided. In some examples, circuitry, component selection, placement, and PCB routing may be optimized to minimize inductance in a high current laser drive loop. The following formula describes Ohms Law in relation to an inductor:

$$V = L\frac{di}{dt}$$

In the above formula, V is the instantaneous voltage across an inductor; L is a measure of inductance (henries); and $$\frac{di}{dt}$$

is the instantaneous rate of current change (Amps/second).

Accordingly, in one example, a change in current (di) of 14 A nominally and a fixed voltage of approximately 2V may turn an example laser source on at full power. The inductance (L) must be low (e.g., in the order of nanohenries) in order to permit a low rise/fall time (dt) and high frequency. This high switching current path or "loop" begins with the laser power supply and continues through the PCB to the laser source/diode. In some examples, the loop may continue through a GaN transistor, a sense resistor and finally to a ground reference plane back to a power supply ground. The example GaN transistor may be used based at least in part on its low package inductance characteristics. In various examples, component placement may be optimized for low inductance. Additionally, PCB routing may utilize wide, short, thick copper planes for connectivity. Multiple vias organized in arrays may be utilized for connectivity between layers where required.

Internal Timeout Timer for Laser Enable Control

As noted herein, in many examples failure detection may be required to prevent laser operation when abnormal conditions are detected.

In accordance with various embodiments of the present disclosure, a printing apparatus (e.g., printer side comprising a processor and/or FPGA) may be configured to detect abnormal conditions, and a print head (e.g., a print head processor and/or print head FPGA) may be configured to detect abnormal conditions simultaneously. In an instance in which any component of the example printing apparatus fails, laser operations may be automatically suspended until the issues are rectified.

In some examples, hanging detection may be provided by utilizing a heartbeat signal exchanged amongst the various elements (e.g., by the printer side processor and/or FPGA and the print head processor and/or FPGA). When the heartbeat signal is absent (e.g., not detected by any one of the processors and/or FPGAs), laser control may be automatically disabled to ensure a safe state at all times. Additionally, a user may be alerted. For example, a message may be displayed on a printer user interface. In other examples, signaling means such as an audio signal or LED may be used to alert the user.

Auto Detection of Defects in Laser Printing Optics

In various examples, as noted above, a laser beam may traverse an optical assembly (e.g., set of optics, lenses, and/or mirrors) before reaching a print media. If there are any defects, scratches or aberrations in the optical assembly (e.g., optics, lenses or mirrors) due to manufacturing issues or due to rough handling in the field (e.g., due to falls or vibrations), the printout generated by an example printing apparatus may have visible defects, which in some cases may be apparent to an end-user.

In accordance with various embodiments of the present disclosure, a line-scanner may be incorporated in an output path of an example printing apparatus. In some examples, the line-scanner may scan an image of a printed label. When coupled with image processing algorithms, the printer firmware may analyze the image of the printed label to detect aberrations or defects in the optical assembly. The detection of such conditions may be flagged to the end-user via a user interface message or prompt. Accordingly, servicing and/or replacement of the optical assembly can be arranged as required minimizing potential downtime and loss of productivity.

Y-Axis Adjustment (Calibration) Mechanism for Laser Printer Print Head

In various examples, directing a laser beam to a target location from an aperture of a print head may pose many technical challenges.

In accordance with various embodiments of the present disclosure, systems, methods and techniques for directing a laser beam to be incident on a target location are provided. In some examples, an upper print head mechanism/housing and a lower print head mechanism/housing may have an offset position on a y-axis orientation. Accordingly, mechanisms for y-axis adjustment for calibration purposes are provided. In some embodiments, an adjustment feature may be disposed between upper and lower print mechanisms/housings. The example adjustment feature may comprise a slot opening panel which may be adjusted by a set of lead screw/nut assemblies. The example slot opening panel may be adjusted up to +/−2.5 mm along the y-axis in order to accurately align a laser beam exiting an aperture of the print head.

Horizontal Swivel Tear Bar

In some examples, a printing apparatus may employ auto-feed techniques to feed a media therethrough. Over time, excessive dirt may accumulate in an internal area of a tear bar and may cause media jams. In many examples, an end-user may be unable to access a narrow path between the print head and tear bar in order to manually route a media therethrough.

In accordance with various embodiments of the present disclosure, methods, systems and techniques for minimizing media jams occurring in a media path are provided. In some examples, a removeable (e.g., swivel) tear bar may be provided. The user may remove a media (e.g., label) from a print mechanism and return the removeable tear bar to its original position once the media is in place. As such, an end-user may manually route an example media accurately and quickly. The angle of the aperture along a bottom portion of the example media path may be expanded further and may facilitate cleaning of a tear bar.

Polaris Preheater Temperature and Power Compensation Algorithm

In various examples, as noted above, in order for a printing apparatus to reach a high target print speed, a preheating laser may be utilized to preheat (i.e., warm up) a media to a target temperature. In some examples, due to heat transfer capability, the faster a media traverses a portion of a printing apparatus during printing operations, the higher the temperature the example preheating laser will need to be. Accordingly, for each print speed, an associated target preheating temperature must be reached and maintained in order to meet print quality standards and avoid over-burning or under-burning of the media. In some examples, warming-up or cooling-down the media to a target temperature may require additional time. Therefore, additional means may be required to accelerate the process and ensure that an end-user does not have to wait long for a printing apparatus to begin printing operations. In various examples, maintaining a target temperature with respect to a media, preheating laser or other components of a printing apparatus may pose many technical challenges.

In accordance with various embodiments of the present disclosure, systems, methods and techniques for bringing a preheating laser to a target temperature and subsequently bringing a media and/or surrounding print mechanism to a target temperature, depending on input variables such as media print speed and existing media temperature, are provided. In some embodiments, an example media temperature and an example preheating laser temperature may be maintained at a constant value throughout printing operations. In some embodiments, power compensation techniques may be utilized to speed up the printing process when the current media/preheating laser temperature is not yet at a target value. In some embodiments, a method for preventing burn marks by retracting at least a portion of an unprinted media to a safe position when a printing apparatus is not in use is provided.

Figure 98:
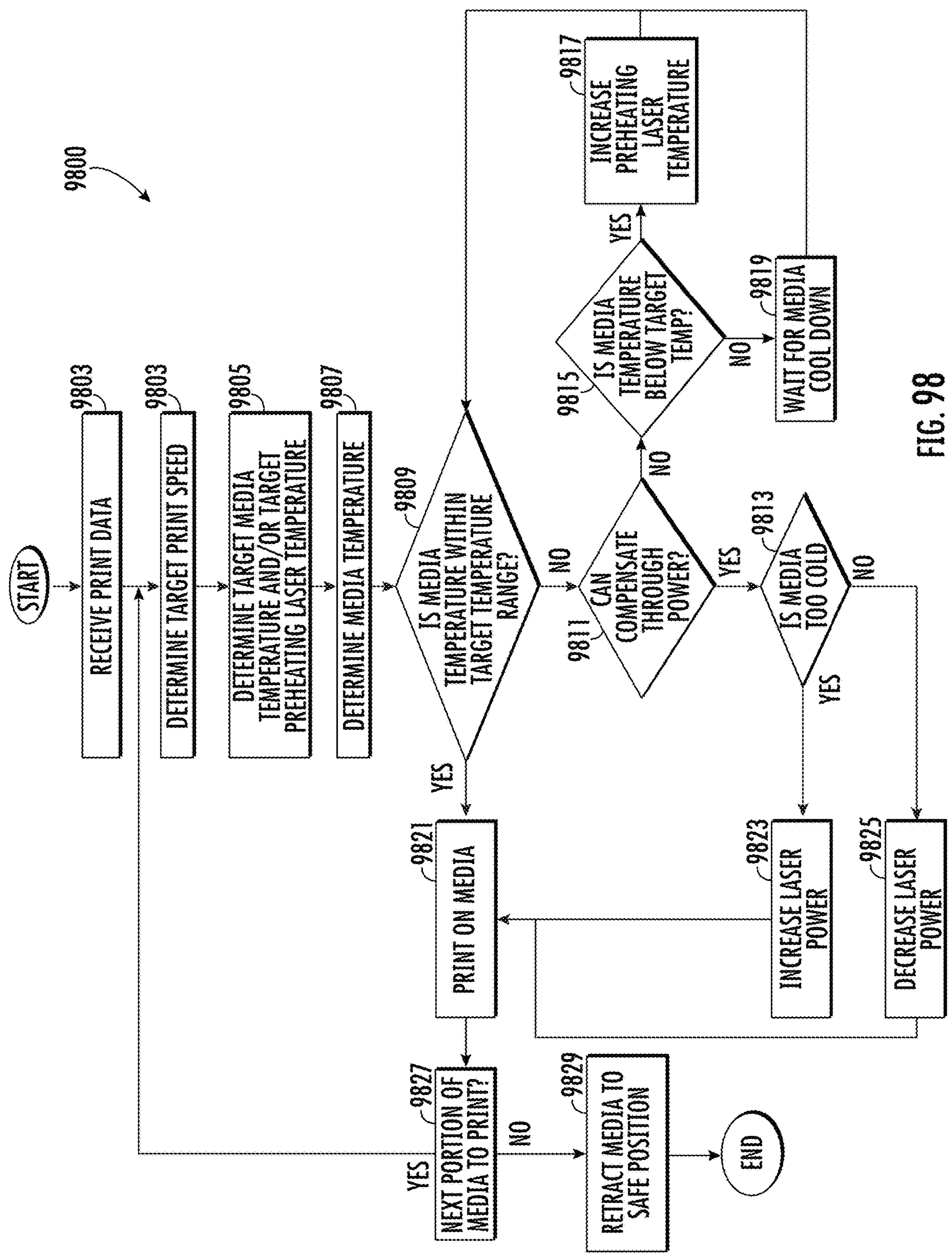
FIG. 98 is an example flow diagram illustrating example methods in accordance with examples of the present disclosure.

Referring now to FIG. 98, an example method 9800 is illustrated. In particular, the example method 9800 illustrates example steps/operations for bringing a media/preheating laser temperature to a target temperature value/range in order to optimize print quality at a particular print speed.

In the example shown in FIG. 98, the example method 9800 starts at step/operation 9801. At step/operation 9801, a processing circuitry (such as, but not limited to, the controller 2008 illustrated and described above in connection with FIG. 20, the processor 2702 illustrated and described above in connection with FIG. 27, a control unit 138 illustrated and described in connection with FIG. 29, and/or a processor electrically coupled to the example printing apparatus) may receive print data. In various examples, the print data may comprise instructions for printing content onto at least a portion of a media (e.g., print a label) of an example printing apparatus 100.

Subsequent to receiving print job data at step/operation 9801, at step/operation 9803, the processing circuitry determines a target print speed at which the example printing apparatus 100 is to print content onto a media (e.g., print a label). In some examples, the target print speed may be determined based at least in part on, or received in conjunction with, the print data.

Subsequent to determining the print speed at step/operation 9803, at step/operation 9805, the processing circuitry determines a target media temperature and/or a target preheating laser temperature associated with the target print speed. It should be understood that the target media temperature and the target preheating laser temperature are related parameters that may vary in accordance with a known offset and are further associated with a target print speed. Said differently, if the preheating laser temperature is known, then by adding a known offset value, other temperatures associated with other system elements/components can be determined. Accordingly, in various examples, the processing circuitry can monitor either the media temperature, the preheating laser temperature and/or another temperature associated with the example printing apparatus 100 (e.g., print mechanism temperature). Accordingly, the terms preheating laser temperature, media temperature and print mechanism temperature are used interchangeably herein.

In some examples, the processing circuitry determines the target media temperature and/or target preheating laser temperature based at least in part by referencing a stored look-up table that describes a mapping between a print speed/media traversal speed, a target media temperature and/or a target preheating laser temperature. In various embodiments, the target media temperature and/or the target preheating laser temperature may each comprise a value or a range (e.g., 40 degrees Celsius, between 40-45 degrees Celsius, combinations thereof, or the like). The following table illustrates an example look-up table for determining the target media temperature by the processing circuitry.

TABLE 6

Look-up table illustrating a mapping between a speed at which the printing apparatus 100 is to be operated, a target media temperature and a target preheating laser temperature.

| Print Speed | Target media temperature | Target preheating laser temperature |
|---|---|---|
| 1 ips | Media_temp_1 | Pre-heat_temp_1 |
| 2 ips | Media_temp_2 | Pre-heat_temp_2 |
| 3 ips | Media_temp_3 | Pre-heat_temp_3 |
| . . . | . . . | . . . |

if the media temperature is already within a certain predetermined range of the target temperature value, then the processing circuitry determines that the system/example printing apparatus 100 is ready to begin printing operations. In such examples, the method 9800 proceeds to step/operation 9821 and the printing apparatus 100 prints the content onto the media immediately. By way of example, the target temperature range may be within a predetermined threshold range from a target temperature value (e.g., +/−3 degrees Celsius). By way of example, if the target temperature value is 40 degrees Celsius, the predetermined threshold range is +/−3 degrees Celsius and the current media temperature is 39 degrees Celsius, then the processing circuitry determines that the current media temperature is within the predetermined threshold range and proceeds to step/operation 9821.

However, if at step/operation 9809, the media temperature is not within the predetermined threshold range of the target temperature value, then the processing circuitry may proceed to step/operation 9811. By way of example, if the target temperature value is 40 degrees Celsius, the predetermined threshold range is +/−3 degrees Celsius and the current media temperature is 35 degrees Celsius, then the processing circuitry determines that the current media temperature is not within the predetermined threshold and proceeds to step/operation 9811.

At step/operation 9811, the processing circuitry determines whether laser compensation can be achieved by varying the power of the writing laser. In some examples, the processing circuitry determines whether laser compensation can be achieved based at least in part on a current media temperature being within a predetermined range of a target temperature value or target temperature range (e.g., close to the target temperature value/range, for instance −5 degrees Celsius). In another example, with reference to FIG. 99 discussed below, the processing circuitry may determine that laser compensation can be achieved in an instance in which the current media temperature is +/−10% of a higher threshold temperature value 9902 or a lower threshold temperature value 9904.

Subsequent to step/operation 9805, at step/operation 9807, the processing circuitry determines a current media temperature. In some examples, the processing circuitry determines the media temperature via one or more sensing elements/sensors that are operatively coupled to and/or positioned adjacent the media (e.g., an array of sensors). In some examples, the one or more sensors may be or comprise infrared sensors, resistor-based sensors and/or the like that are configured to determine a surface temperature of at least a portion of a media. Additionally and/or alternatively, in some examples, the processing circuitry determines a temperature of a heating element (e.g., one or more lasers) of the printing apparatus via one or more sensors such as a resistance temperature detector (RTD) positioned adjacent a surface of the example heating element and operatively coupled thereto. In some examples, at step/operation 9809, For example, the processing circuitry may determine whether the writing laser needs to be overdriven in an instance in which the media temperature is too cold (e.g., below a threshold temperature value/range) or underdriven in an instance in which the media temperature is too warm/hot. In an instance in which the processing circuitry determines that laser compensation can be achieved by varying the power of the writing laser, the method 9800 proceeds to step/operation 9813. At step/operation 9813, subsequent to determining that laser compensation can be achieved, the processing circuitry determines (via the one or more sensing elements/sensors operatively coupled to the media) whether the media is too cold (e.g., below a threshold temperature value/range). In an instance in which the processing circuitry determines that the media is too cold (e.g., below a threshold temperature value/range), the method 9800 proceeds to step/operation 9823. At step/operation 9823, the processing circuitry provides (e.g., generates, sends) a control indication to increase/overdrive the power of the writing laser. Then subsequent to increasing the power of the preheating laser, the method proceeds to step/operation 9821 and the processing circuitry provides a control indication to cause the printing apparatus 100 to print content onto the media.

In some examples, at step/operation 9827 the processing circuitry determines whether or not to continue printing operations (e.g., to print a new label). In an instance in which the processing circuitry determines that no further printing operations are required, and a portion of a media (e.g., a previous label) has just been printed, the heater element may still be warm as it may not yet have reached a safe cool-down temperature. In such examples, an example media (e.g., a roll) may be parked/positioned at a tear bar and adjacent (e.g., right above/below) an example heating element. This may result in unwanted burn marks being incident on at least a portion of the unprinted media. In order to prevent this, while no media is being printed, at step/operation 9829, the example processing circuitry may provide a control indication to cause the at least a portion of the unprinted media to retract into a feed roller thereby ensuring that the media is not directly exposed to the higher temperature and thus preventing any burn marks being incident thereon.

Returning to step/operation 9813, in an instance in which the media temperature is not too cold (e.g. is above a threshold temperature value/range), the processing circuitry provides a control indication to decrease/underdrive the power of the writing laser. Subsequent to decreasing the power of the writing laser at step/operation 9825, the method proceeds to step/operation 9821 and the processing circuitry provides a control indication to cause the printing apparatus 100 to print content onto the media.

Returning to step/operation 9811, in an instance in which the processing circuitry determines that laser compensation (e.g., in relation to one or more writing lasers) cannot be utilized, the method 9800 proceeds to step/operation 9815. At step/operation 9815, the processing circuitry determines whether the media temperature is below a target temperature range. In an instance in which the media temperature is below the target temperature range, the method 9800 proceed to step/operation 9817, and the processing circuitry provides (e.g., generates, sends) a control indication to cause an increase in the operating temperature of the preheating laser. In some embodiments, subsequent to causing an increase in the operating temperature of the preheating laser at step/operation 9817, the method proceeds to step/operation 9809, and the processing circuitry further determines whether the media temperature is within the target temperature range. Subsequently, processing circuitry provides a control indication to cause the printing apparatus 100 to print content onto the media.

Returning to step/operation 9815, in an instance in which the processing circuitry determines that the media temperature is above the target temperature range, the processing circuitry provides (e.g., generates, sends) a control indication to cause the printing apparatus 100 to wait for a predetermined amount of time in order to allow the media to cool down. Subsequent to waiting for a predetermined amount of time, the method proceeds to step/operation 9809 and the processing circuitry further determines whether or not the media temperature is within the target temperature range. Subsequently, the processing circuitry provides a control indication to cause the printing apparatus 100 to print content onto the media.

Figure 99:
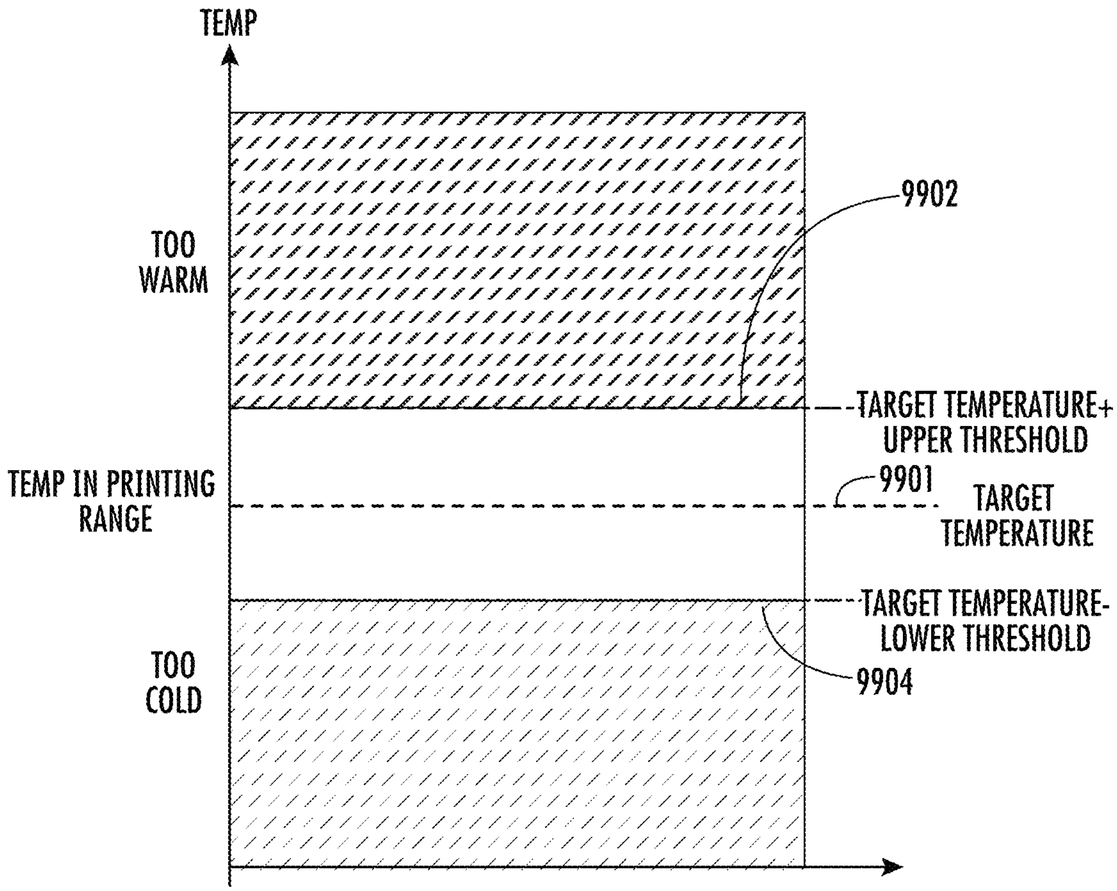
FIG. 99 is an example graph in accordance with examples of the present disclosure.

Referring now to FIG. 99, an example graph 9900 depicting an example target temperature range in accordance with various embodiments of the present disclosure is provided. As noted above, in various embodiments, the example target temperature range may be associated with a media, a preheating and/or any other print mechanism of an example printing apparatus 100.

As depicted in FIG. 99, the x-axis represents a plurality of instances in time. As depicted, the y-axis represents a plurality of temperature values. In various embodiments, the processing circuitry may operate to regulate a media temperature in order to ensure optimal printing operations by the example printing apparatus 100. For example, in order to print new content (e.g., a label), the processing circuitry may start by increasing the preheating laser temperature which translates into increasing a media temperature. As depicted in FIG. 99, the target temperature may comprise a target temperature value 9901 at which optimal printing operations can be achieved at a particular print speed. As further depicted in FIG. 99, the target temperature may further comprise a range defined by a lower threshold temperature value 9904 and a higher threshold temperature value 9902.

Subsequent to reaching a target media temperature (e.g., a target temperature value 9901 or target temperature range defined by the lower threshold temperature value 9904 and the higher threshold temperature value 9902), the processing circuitry may operate to maintain a constant target media temperature. For example, in an instance in which a media temperature reaches or exceeds the higher threshold temperature value 9902, the processing circuitry may provide a control indication in order to deactivate a preheating laser for a short/predetermined amount of time until the target media temperature falls below the higher threshold temperature value 9902. In another example, in an instance in which the media temperature reaches or falls below the lower threshold temperature value 9904, the processing circuitry may provide a control indication in order to activate the preheating laser for a short/predetermined amount of time until the target media temperature is above the lower threshold temperature value 9904. This oscillating cycle may continue until no new print data is received or until a print speed or target temperature associated with print data/a print job is modified.

Figure 100A:
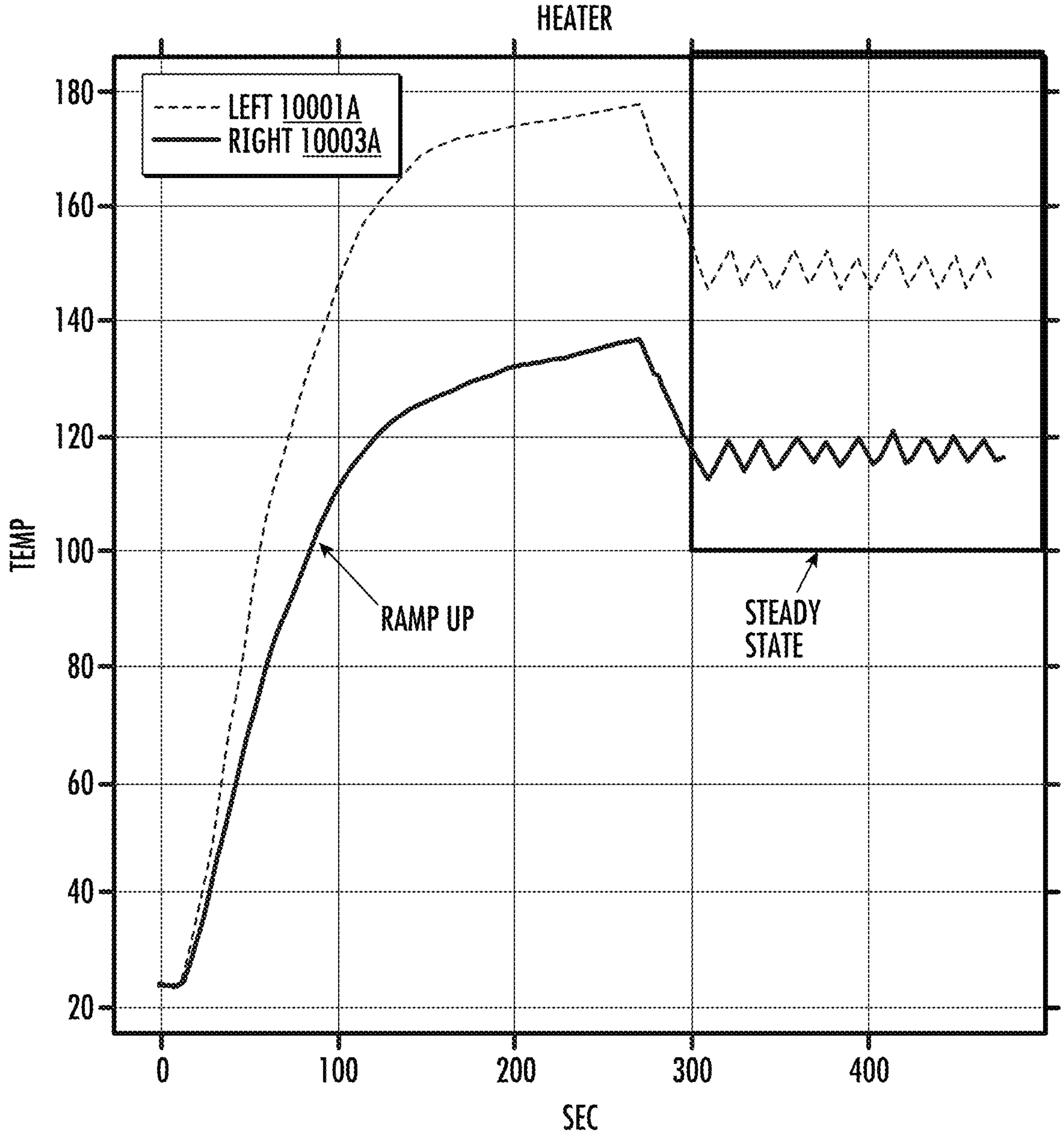
FIG. 100A is an example graph in accordance with examples of the present disclosure.

Referring now to FIG. 100A, an example graph 10000A depicting example measurements associated with a first preheating laser (represented by line 10001A) and a second preheating laser (represented by line 10003A) based on operations of an example processing circuitry is provided.

As illustrated in FIG. 100A, the x-axis represents a plurality of instances in time. As depicted, the y-axis represents a plurality of detected temperature values associated with a first preheating laser (represented by line 10001A) and a second preheating laser (represented by line 10003A). As illustrated in FIG. 100A, responsive to receiving a control indication by an example processing circuitry, the preheating laser temperature for each of the first preheating laser represented by line 10001A) and the second preheating laser (represented by line 10003A) rises quickly to a given level (as depicted, between 0 and approximately 270 along the x-axis). Then, the preheating laser temperature for each of the first preheating laser (represented by line 10001A) and the second preheating laser (represented by line 10003A) enters a steady state mode (as depicted, between approximately 270 and 480 along the x-axis) during which the preheating laser temperature oscillates in order to maintain a near constant value within a predetermined range.

Figure 100B:
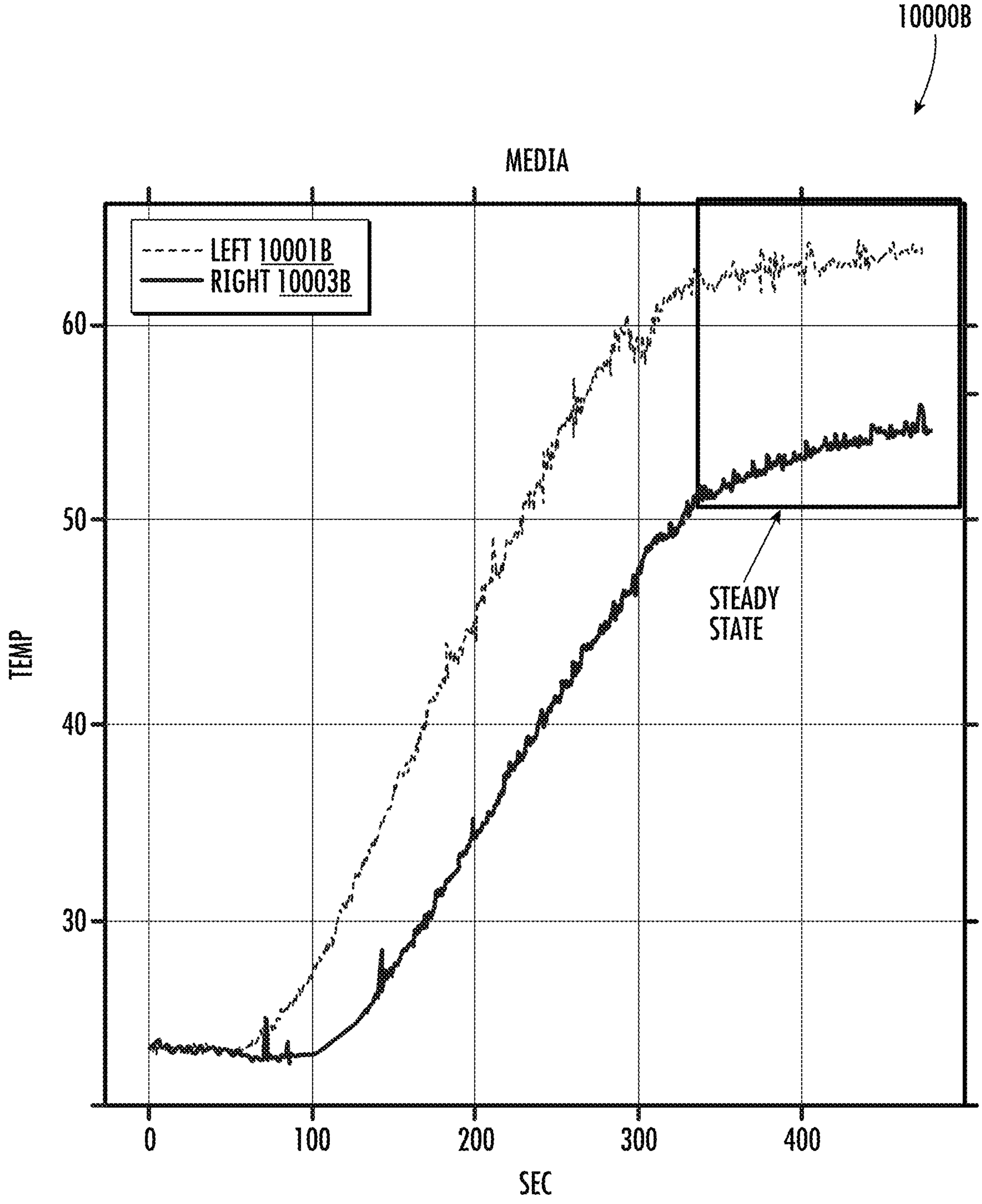
FIG. 100B is an example graph in accordance with examples of the present disclosure.

Referring now to FIG. 100B, an example graph 10000B depicting example measurements associated with a first media (represented by line 10001B) and a second media (represented by line 10003B) based on operations of an example processing circuitry is provided.

As illustrated in FIG. 100B, the x-axis represents a plurality of instances in time. As depicted, the y-axis represents a plurality of detected temperature values associated with the first media (represented by line 10001B) and the second media (represented by line 10003B). As illustrated in FIG. 100B, responsive to receiving a control indication by an example processing circuitry, the media temperature for each of the first media (represented by line 10001B) and the second media (represented by line 10003B) rises quickly to a given level (as depicted, between 0 and approximately 345 along the x-axis). Then, the media temperature for each of the first media (represented by line 10001B) and the second media (represented by line 10003B) reaches a steady state temperature (as depicted, between approximately 345 and 480 along the x-axis).

Figure 100C:
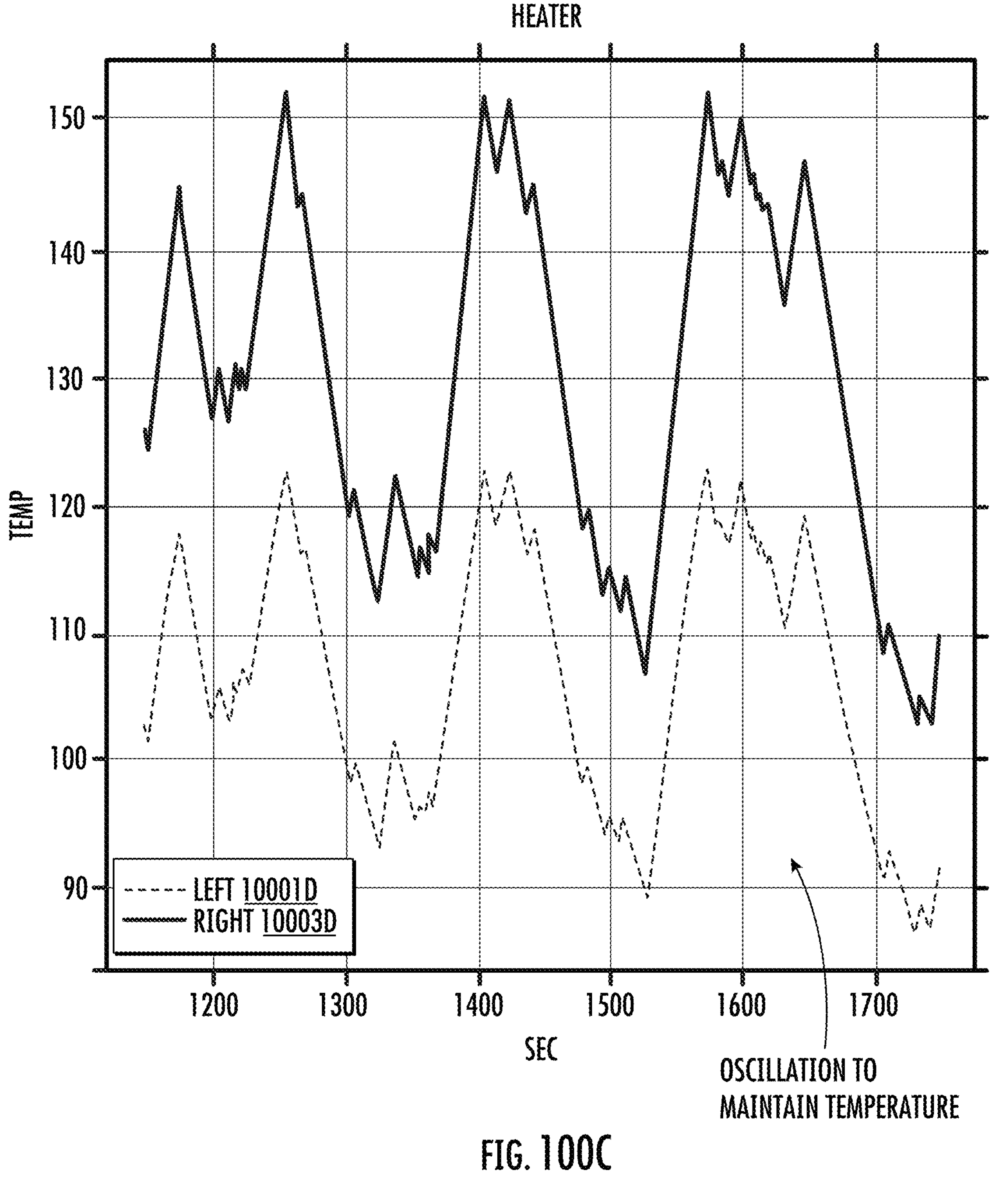
FIG. 100C is an example graph in accordance with examples of the present disclosure.

Referring now to FIG. 100C, an example graph 10000C depicting example measurements associated with a first preheating laser (represented by line 10001C) and a second preheating laser (represented by line 10003C) based on operations of an example processing circuitry is provided.

As illustrated in FIG. 100C, the x-axis represents a plurality of instances in time. As depicted, the y-axis represents a plurality of detected temperature values associated with the first preheating laser (represented by line 10001C) and the second preheating laser (represented by line 10003C). As illustrated in FIG. 100C, during a steady state mode, the preheating laser temperature for each of the first preheating laser (represented by line 10001C) and the second preheating laser (represented by line 10003C) oscillates periodically (for example, as depicted, from a first peak at approximately 1250 to a second peak at approximately 1400 along the x-axis) as the example processing circuitry operates to maintain a temperature value within a predetermined temperature range.

Figure 100D:
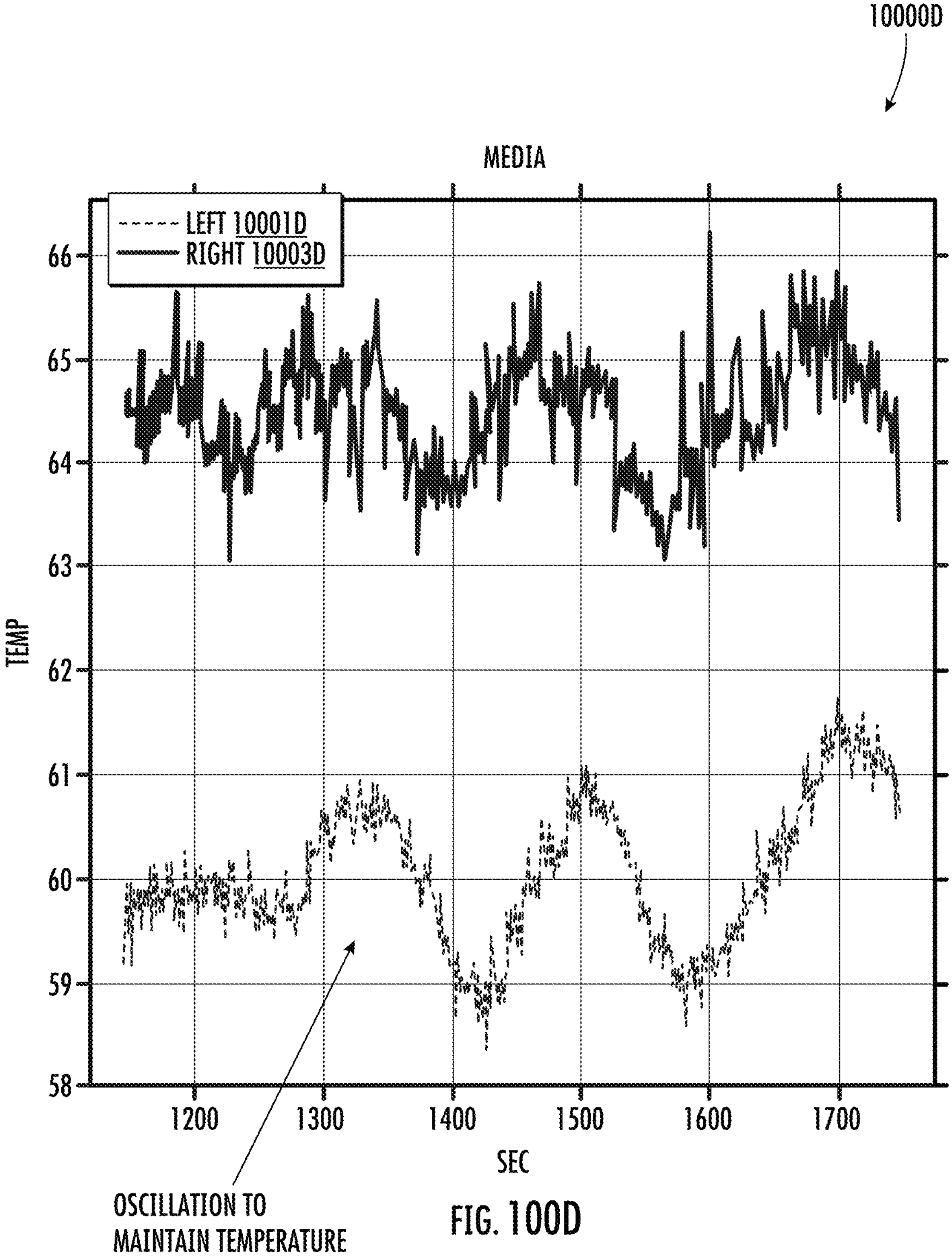
FIG. 100D is an example graph in accordance with examples of the present disclosure.

Referring now to FIG. 100D, an example graph 10000D depicting example measurements associated with a first media (represented by line 10001D) and a second media (represented by line 10003D) based on operations of an example processing circuitry is provided. As illustrated in FIG. 100D, the x-axis represents a plurality of instances in time. As depicted, the y-axis represents a plurality of detected temperature values associated with the first media (represented by line 10001D) and the second media (represented by line 10003D). As illustrated in FIG. 100D, during a steady state mode, the media temperature for each of the first media (represented by line 10001D) and the second media (represented by line 10003D) oscillates periodically (for example, as depicted, from a first peak at approximately 1340 to a second peak at approximately 1500 along the x-axis) as the example processing circuitry operates to maintain a temperature value within a predetermined temperature range.

Accordingly, FIG. 100A, FIG. 100B, FIG. 100C and FIG. 100D demonstrate that the example processing circuitry will operate to maintain a constant temperature with respect to a media and/or preheating laser that is within a predetermined temperature range defined by a lower threshold temperature value and the higher threshold temperature value.

Figure 101:
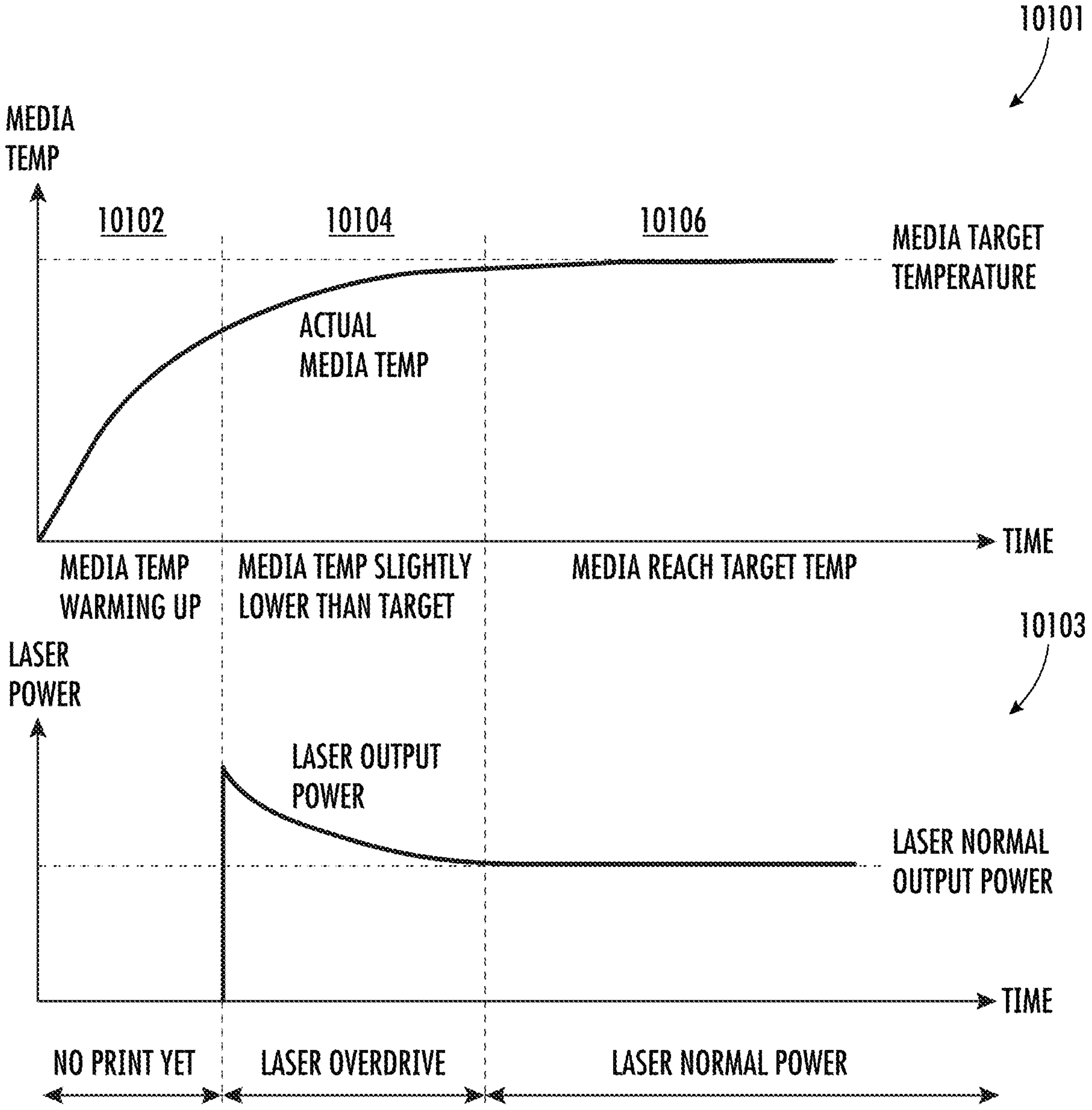
FIG. 101 illustrates example graphs in accordance with examples of the present disclosure.

Referring now to FIG. 101, a first example graph 10101 depicting example measurements associated with an example media and a second example graph 10103 depicting measurements associated with an example writing laser during power compensation operations of an example processing circuitry/printing apparatus 100 are provided.

As illustrated in FIG. 101, the x-axis represents a plurality of instances in time. As depicted, the y-axis of the first graph 10101 represents a plurality of detected temperature values associated with the media and the y-axis of the second graph 10103 represents a plurality of detected temperature values associated with a writing laser.

In some examples, as discussed above in connection with FIG. 98, in order to speed up media printing, it is not always necessary to wait for the media to reach the target temperature. In some embodiments, when the media temperature is somewhat below/close to the target temperature (e.g., a lower threshold temperature value), it may be possible to increase the writing laser output power and overdrive it in order to optimize printing operations and target print parameters (e.g., quality, a darkness level). Similarly, when the media temperature is somewhat above the target temperature (e.g., a higher threshold temperature value), it may be possible to decrease the writing laser output power and underdrive it in order to optimize printing operations and target print parameters.

As depicted in FIG. 101, during a first phase 10102 of printing operations, the media temperature rises quickly while no printing operations occur by the writing laser. As further depicted in FIG. 101, during a second phase 10104 of printing operations the actual media temperature is slightly lower than a target temperature (e.g., a lower threshold temperature value). Accordingly, as depicted, at the end of the first phase, in an instance in which the media temperature is still below the target temperature, the writing laser will enter an overdrive mode. Subsequently, as the media temperature approaches the target temperature during the second phase 10104, the overdrive writing laser power will reduce and return to a normal output writing laser power level at the end of the second phase 10104 and through the third phase 10106. Correspondingly, during the third phase 10106, the media reaches the target temperature.

Similarly, as noted above, when the media temperature is above a target temperature (e.g., above a higher threshold temperature value) and therefore too hot for optimal operations, it is possible to reduce the output writing laser power in order to prevent overburn and achieve proper print quality. Correspondingly, as the media cools down, the writing laser output power will slowly increase back to a normal output power level.

Regulating Media Temperature in Preheating Chamber Using Heat Spreader Movement

As discussed herein, in some examples, a printing apparatus (e.g., a laser industrial printer) may utilize a preheater/preheating beam to warm up a print media (e.g., label) prior to printing operations/generating a mark on the print media. In some embodiments, at least a portion of an example media may be at least partially disposed within a heating chamber prior to commencing printing operations. In some embodiments, the heating chamber may comprise at least one heat spreader element that is configured to warm up the print media as it traverses at least a portion of the printing apparatus/heating chamber.

In some examples, a first portion of an example media (e.g., defining a portion of a print media roll) may be disposed/positioned within a heating chamber for preheating prior to printing operations. Subsequently, the first portion of the example print media may exit/traverse the heating chamber and a second portion of the example print media may be disposed/positioned within the heating chamber. In such examples, the heating chamber may become warm/hot in order to preheat the print media. Additionally, in some examples, when preheating operations cease/stop (e.g., when a current source to a heating element is turned off), the heating chamber may remain warm/hot for a period of time. Thus, in an instance in which the first portion of the example print media has exited the heating chamber, and the second portion of the example print media is disposed/positioned within the heating chamber, the second portion of the example print media may begin to warm up/react to the residual warmth/heat in the heating chamber prior to reactivation of the heating chamber for subsequent preheating operations. This may result in unwanted burn marks being incident on the second portion of the print media. In some examples, as a result of the unwanted burn marks, the affected portion of the print media (e.g., adjacent a printed label) may need to be rejected/replaced prior to commencing printing operations which may result in print media wastage.

In accordance with various embodiments of the present disclosure, example apparatuses, methods and techniques for controlling preheating operations (e.g., a temperature within an example heating chamber of an example printing apparatus) are provided. In some embodiments, the example printing apparatus comprises at least one moveable heat spreader element that is configured to control a predetermined gap associated with a print media path in order to prevent the example print media from becoming unnecessarily heated up/warm when disposed in a heating chamber (e.g., prior to commencing preheating and/or printing operations).

Figure 102:
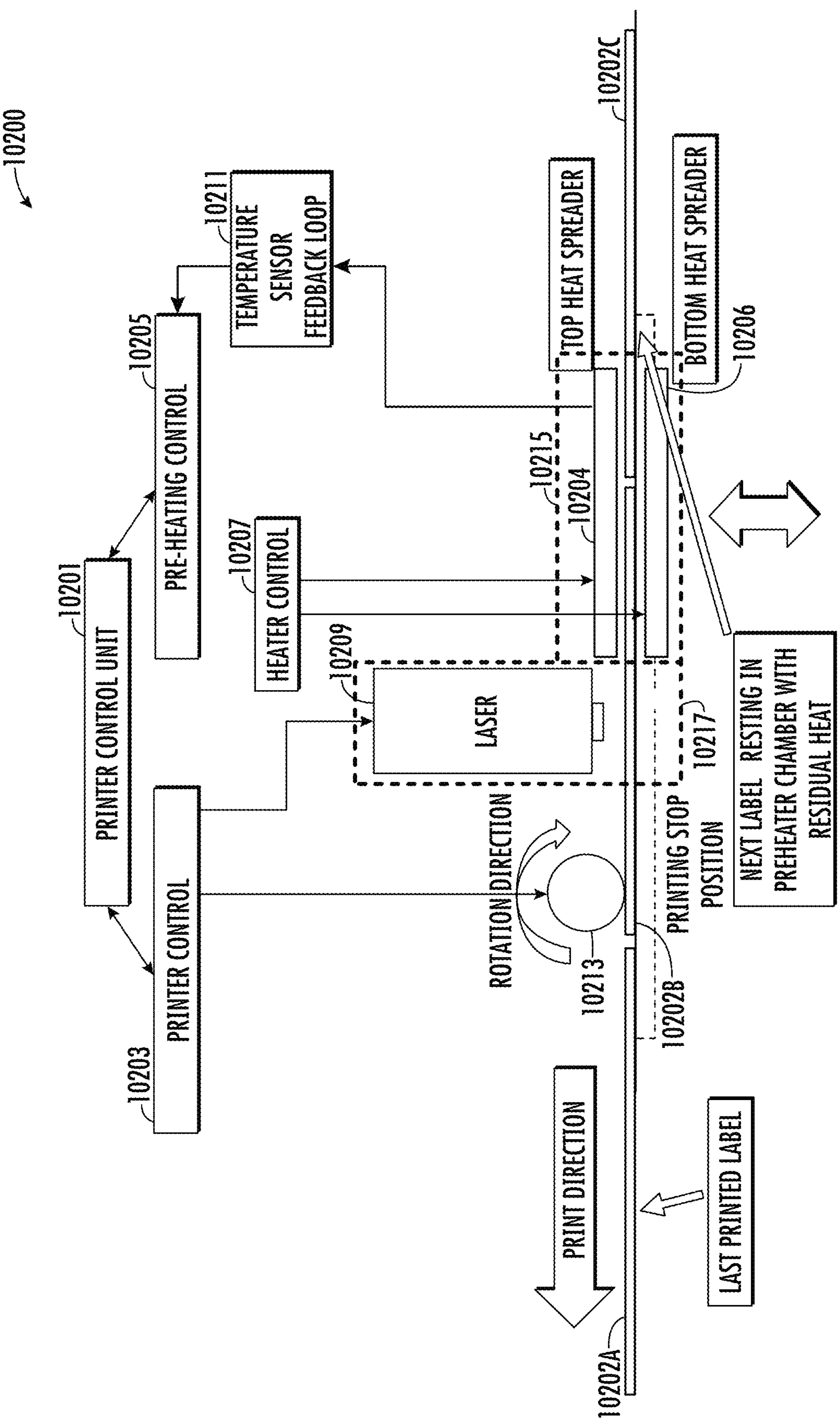
FIG. 102 illustrates a functional block diagram of a portion of a printing apparatus, according to one or more embodiments described herein.

Referring now to FIG. 102, an example functional block diagram depicting at least a portion of an example printing apparatus 10200 in accordance with various embodiments of the present disclosure is provided. As depicted in FIG. 102, the example printing apparatus 10200 comprises at least a printer control unit 10201, a printing control component 10203, a preheating control unit 10205, a heater control unit 10207, at least one writing laser 10209, a temperature sensor 10211, a roller 10213, a preheating chamber 10215, a first moveable heat spreader element 10204, and a second moveable heat spreader element 10206. In various embodiments, the example printing apparatus 10200 is configured to warm/preheat a print media prior to performing printing operations. In various embodiments the example roller 10213 operates to move, drive, and/or direct a print media from a first location to a second location (e.g., along a print path) within the printing apparatus 10200 (e.g., from a preheating chamber 10215 to a laser writing location 10217, and then to exit the printing apparatus 10200 subsequent to printing operations).

As depicted in FIG. 102, the printer control unit 10201 may generate one or more control indications/signals in order to cause the preheating control unit 10205 to preheat at least a portion of a print media (e.g., print media 10202A, 10202B, and/or 10202C). As noted above, the example printing apparatus 10200 comprises a preheating chamber 10215. As further depicted, a first moveable heat spreader element 10204 and a second moveable heat spreader element 10206 are at least partially positioned, disposed and/or contained within the preheating chamber 10215. In various examples, the first moveable heat spreader element 10204 and the second moveable heat spreader element 10206 may each be or comprise a heating element, heating coil, heating plate, light source, and/or the like that is configured to emit radiant energy/heat in response to a control indication/signal provided by the preheating control unit 10205 operating in conjunction with the printer control unit 10201. The first moveable heat spreader element 10204 and the second moveable heat spreader element 10206 may be driven by one or more actuators and/or operatively coupled to one or more moveable arms/moveable components. As illustrated, the first moveable heat spreader element 10204 is positioned/disposed adjacent a top surface of the example print media (e.g., print media 10202A, 10202B and 10202C), at a first distance, such that there is a predetermined gap between the top surface of the example print media and the first moveable heat spreader element 10204. As further depicted, the second moveable heat spreader element 10206 is positioned/disposed adjacent a bottom surface of the example print media (e.g., print media 10202A, 10202B and 10202C), at a first distance, such that there is a predetermined gap between the top surface of the example print media and the second moveable heat spreader element 10206. In various embodiments, each of the first moveable heat spreader element 10204 and the second moveable heat spreader element 10206 may be driven by one or more actuators/power sources (e.g., one or more current sources). In various examples, the preheating control unit 10205 (operating in conjunction with the printer control unit 10201) is configured to transmit one or more control indications/signals in order to cause the first moveable heat spreader element 10204 and the second moveable heat spreader element 10206 to preheat/warm at least a portion of the print media (e.g., print media 10202A, 10202B and 10202C) as it traverses a location associated with the first moveable heat spreader element 10204 and the second moveable heat spreader element 10206 (e.g., the preheating chamber 10215) and moves in the direction of the laser writing location 10217.

In some embodiments, subsequent to preheating at least a portion of the print media (e.g., to a target temperature, as detected by the temperature sensor 10211 feedback loop), the printer control unit 10201 and/or printing control component 10203 (e.g., one or more actuators) performs printing operations. For example, the printer control unit 10201 transmits a control indication/signal to cause at least one writing laser 10209 to write/impinge one or more marks on at least a portion of the preheated print media (e.g., print media 10202A, 10202B and 10202C).

As depicted in FIG. 102, the printer control unit 10201 and printing control component 10203 (e.g., one or more actuators) are operatively coupled to one another and to the roller 10213. In some embodiments, the printer control unit 10201 may transmit a control indication/signal to the printing control component 10203 (e.g., one or more actuators) to cause the roller 10213 to drive (e.g., roll, pull, stretch, or the like) the print media along a print path. In other words, the roller 10213 may drive the print media to move from the preheating chamber 10215 (adjacent the first moveable heat spreader element 10204 and the second moveable heat spreader element 10206) to the laser writing location 10217 (adjacent the at least one writing laser 10209). Subsequently, the printer control unit 10201 may transmit a control indication/signal to the printing control component 10203 (e.g., one or more actuators) to cause the roller 10213 to drive (e.g., roll, pull, stretch, or the like) the print media (e.g., printed label) along the print path to exit the printing apparatus 10200. By way of example, a first portion of a print media 10202A may enter the preheating chamber 10215, the laser writing location 10217, and then exit the printing apparatus 10200. Similarly, a second portion of a print media 10202B may enter the preheating chamber 10215, the laser writing location 10217, and then exit the printing apparatus 10200. Finally, a third portion of a print media 10202C may enter the preheating chamber 10215, the laser writing location 10217, and then exit the printing apparatus 10200.

Referring now to FIG. 10300, another example functional block diagram depicting at least a portion of an example printing apparatus 10300 in accordance with various embodiments of the present disclosure is provided. The printing apparatus 10300 may be similar or identical to the printing apparatus 10200 described above in connection with FIG. 102.

Figure 103:
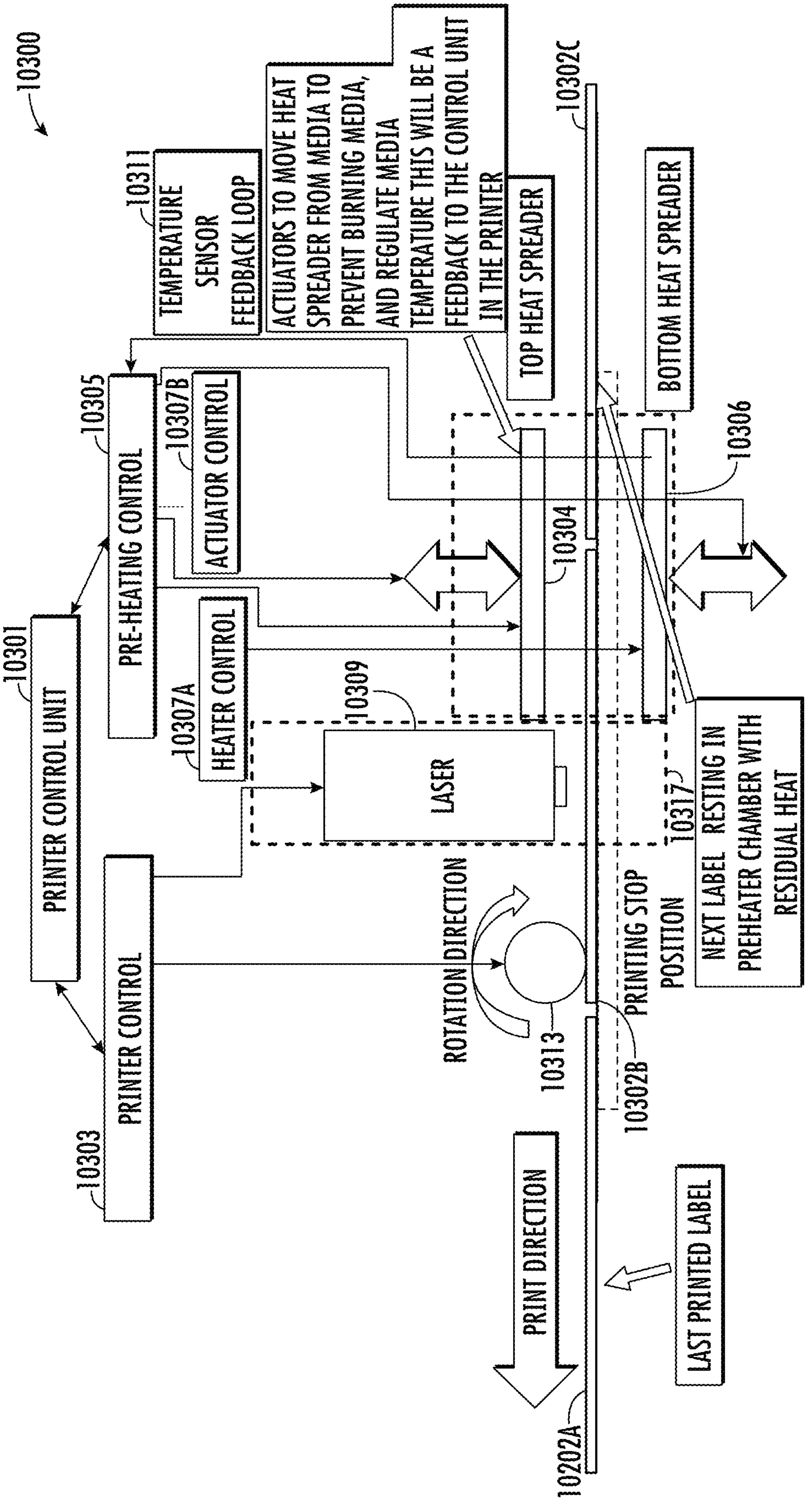
FIG. 103 illustrates a functional block diagram of a portion of a printing apparatus, according to one or more embodiments described herein.

As depicted in FIG. 103, the example printing apparatus 10300 comprises at least a printer control unit 10301, a printing control component 10303 a preheating control unit 10305, a heater control unit 10307, at least one writing laser 10309, a temperature sensor 10311, a roller 10313, a preheating chamber 10315, a first moveable heat spreader element 10304, and a second moveable heat spreader element 10306. In various embodiments, the example printing apparatus 10300 is configured to warm/preheat a print media prior to performing printing operations. In various embodiments the example roller 10313 operates to move, drive, and/or direct a print media from a first location to a second location (e.g., along a print path) within the printing apparatus 10300 (e.g., from a preheating chamber 10315 to a laser writing location 10317, and then to exit the printing apparatus 10300 subsequent to printing operations).

As depicted in FIG. 103, the printer control unit 10301 may generate one or more control indications/signals in order to cause the preheating control unit 10305 to preheat at least a portion of a print media (e.g., print media 10302A, 10302B and 10302C). As noted above, the example printing apparatus 10300 comprises a preheating chamber 10315. As further depicted, a first moveable heat spreader element 10304 and a second moveable heat spreader element 10306 are at least partially positioned, disposed and/or contained within the preheating chamber 10315. In various examples, the first moveable heat spreader element 10304 and the second moveable heat spreader element 10306 may each be or comprise a heating element, heating coil, heating plate, light source, and/or the like that is configured to emit radiant energy/heat in response to a control indication/signal provided by the preheating control unit 10305 operating in conjunction with the printer control unit 10301. The first moveable heat spreader element 10304 and the second moveable heat spreader element 10306 may be driven by one or more actuators and/or operatively coupled to one or more moveable arms/moveable components.

As noted above, subsequent to preheating at least a portion of the print media (e.g., to a target temperature, as detected by the temperature sensor 10311 feedback loop), the printer control unit 10301 and/or printing control component 10303 (e.g., one or more actuators) performs printing operations. For example, the printer control unit 10301 transmits a control indication/signal to cause at least one writing laser 10309 to write/impinge one or more marks on at least a portion of the preheated print media (e.g., print media 10302A, 10302B and 10302C).

As illustrated, the first moveable heat spreader element 10304 is positioned/disposed adjacent a top surface of the example print media (e.g., print media 10302A, 10302B and 10302C), at a first/particular distance, such that there is a predetermined gap between the top surface of the example print media and the first moveable heat spreader element 10304. As further depicted, the second moveable heat spreader element 10306 is positioned/disposed adjacent a bottom surface of the example print media (e.g., print media 10302A, 10302B and 10302C), at a second distance (relative to the first distance depicted in FIG. 102), such that there is a predetermined gap between the top surface of the example print media and the second moveable heat spreader element 10306 (that is different from the gap depicted in FIG. 102). In various embodiments, each of the first moveable heat spreader element 10304 and the second moveable heat spreader element 10306 may be driven by an actuator control unit 10307B comprising one or more actuators/power sources (e.g., one or more current sources).

In various embodiments, in response to detecting that printing operation with respect to at least a portion of the print media (e.g., a first portion of the print media 10302A) have ceased, the printer control unit 10301 may generate one or more control indications/signals in order to cause the first moveable heat spreader element 10304 and the second moveable heat spreader element 10306 to move from a first position to a second position (e.g., away from the portion of print media that is disposed within the preheating chamber 10315). For example, the first moveable heat spreader element 10304 and/or second moveable heat spreader element 10306 may each comprise one or more arms (e.g., driven by an actuator control unit 10307B) that are configured to move vertically with respect to the print media in order to attenuate the effects of residual heat on subsequent portions of the print media within the preheating chamber 10315 (e.g., to prevent burn marks). In other words, the first moveable heat spreader element 10304 and/or second moveable heat spreader element 10306 may each move from a first position to a second position in order to increase a respective gap/distance between the first moveable heat spreader element 10304 and/or second moveable heat spreader element 10306 and a location of the print media. Accordingly, the printer control unit 10301, together with the actuator control unit 10307B, may operate to control a preheating temperature within the preheating chamber 10315 and prevent unwanted burn marks from appearing on the print media.

As depicted in FIG. 103, the printer control unit 10301 and printing control component 10303 (e.g., one or more actuators) are operatively coupled to one another and to the roller 10313. In some embodiments, the printer control unit 10301 may transmit a control indication/signal to the printing control component 10303 (e.g., one or more actuators) to cause the roller 10313 to drive (e.g., roll, pull, stretch, or the like) the print media along a print path. In other words, the roller 10313 may drive the print media to move from the preheating chamber 10315 (adjacent the first moveable heat spreader element 10304 and the second moveable heat spreader element 10306) to the laser writing location 10317 (adjacent the at least one writing laser 10309). Accordingly, in response to detecting that the portion of a print media is in a print stop position and/or has exited the laser writing location 10217, the printer control unit 10301 may transmit a control indication/signal to the printing control component 10303 (e.g., one or more actuators) to cause the first moveable heat spreader element 10304 and/or second moveable heat spreader element 10306 to move away from the print media disposed within the preheating chamber 10315.

In various examples, the above-noted techniques may facilitate faster cooling when printing operations stop and/or in an instance in which the print media is static. Additionally, another control parameter is provided for regulating a temperature of a print media. For example, as discussed herein, at least one moveable heat spreader element can be moved (e.g., up and down) to control a predetermined gap in a media path as a print media traverses a heating chamber. The solution can be easily implemented and addresses the issue of unwanted burn marks.

Laser Writing Pre-Emphasis for Improved Print Contrast

As discussed herein, in some examples, an example printing apparatus may comprise at least one laser source/diode to generate a laser beam that continuously scans/sweeps across a print media. In some examples, the movement of the laser beam may result in the laser beam traversing across a target print dot location when the laser is ON. In some examples, as the laser and associated laser beam move, a first portion (beginning) of a print media may no longer be exposed to the laser which can result in a partial printing or a lower contrast edge at the beginning/start of printing operations.

In accordance with various embodiments of the present disclosure, example apparatuses, methods and techniques for preventing partial printing and improving print contrast during printing operations are provided. In some embodiments, an example method comprises pre-emphasizing (e.g., scaling, varying, modulating, increasing, or the like) an amount of current going through an example laser source/diode at a start of marking of a laser beam unto the print media in order to improve signal integrity and print quality. In other words, an example method may comprise increasing an amount of power/current at the beginning of each print dot for a time period that is less that the overall dot time (i.e., the time period required to impinge/generate a dot) at the beginning of the print dot. In some examples, the amount of power or current drawn by the laser source/diode may be 10% more or 50% higher at the beginning of each print dot. This additional current may enable faster turn on of the laser source/diode and provide additional optical power at the beginning of the print dot which can improve the overall print contrast at the beginning of a print dot/line when the previous dot is not printed. Additionally, this current amplification can also be used at the end of a print line/dot to improve edge contrast when printing is stopped.

Figure 104:
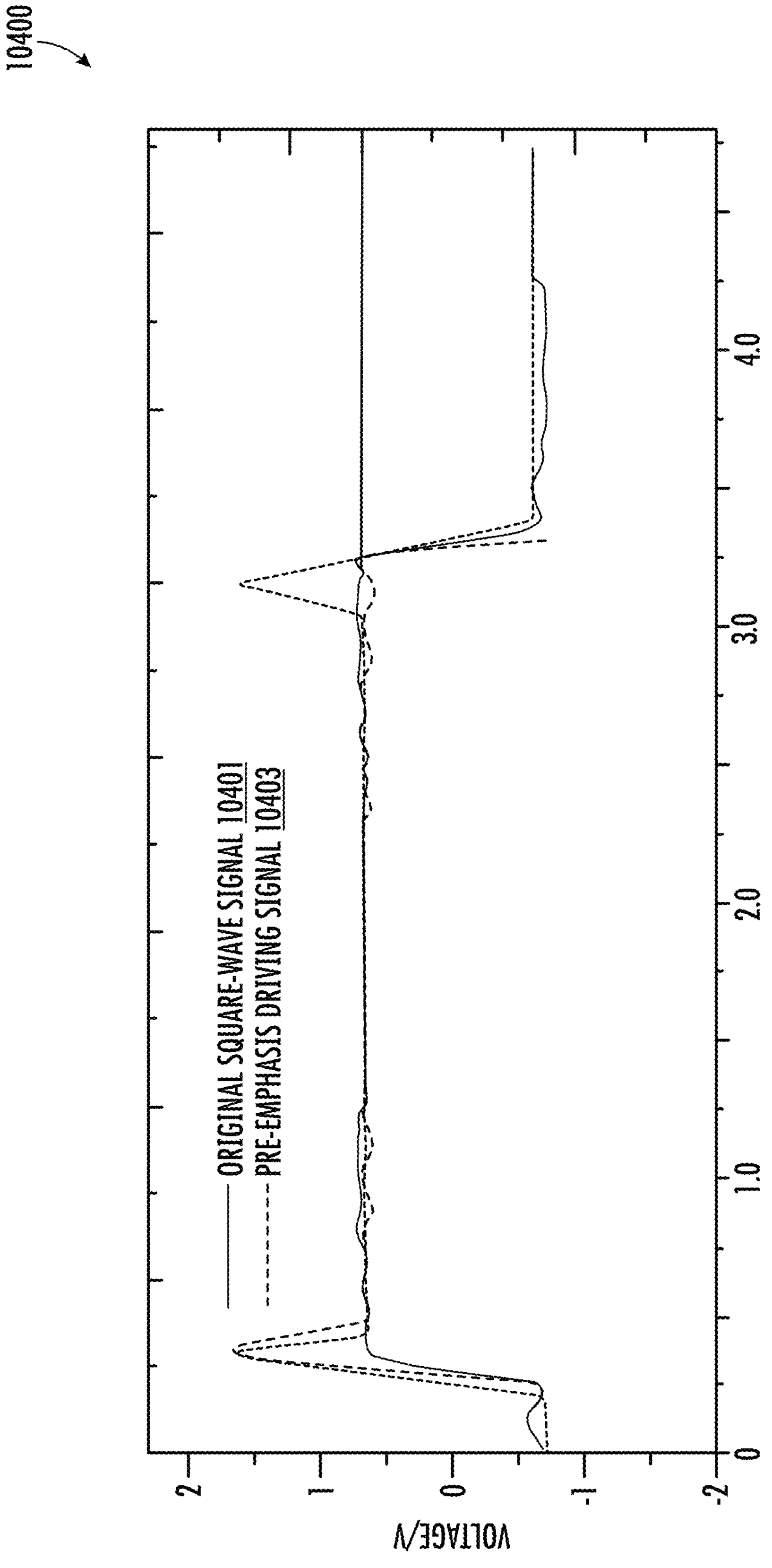
FIG. 104 illustrates an example graph in accordance with examples of the present disclosure.

Referring now to FIG. 104, an example graph 10400 depicting example measurements based on operations of an example laser source/diode are provided. As depicted in FIG. 104, the x-axis represents a plurality of instances in time (measured in seconds). As illustrated, the y-axis represents a voltage output associated with an original square-wave signal (represented by line 10401). As further illustrated, the y-axis also represents a voltage output associated with a pre-emphasis driving signal (represented by line 10403). In some examples, as shown, the pre-emphasis driving signal generates a first voltage peak at approximately 0.4 along the x-axis, corresponding with the start of a first print dot. Additionally, the pre-emphasis driving signal generates a second voltage peak at approximately 3.1 along the x-axis, corresponding with the start of a second print dot.

Accordingly, FIG. 104 demonstrates a technique for pre-emphasizing an amount of power/current drawn by an example laser source/diode at a start of each print dot. The noted technique may also enhance print edge contrast when an example laser source/diode is initially turned ON for printing operations.

Photodiode Detector-Based Laser Failsafe System

In some examples, a printing apparatus/LPH system may comprise one or more class 4 lasers for printing content onto laser sensitive print media. Accordingly, preventing unintentional laser emission is of utmost importance for safety. In many examples, these lasers may pose significant safety risks, including potential eye and burn hazards. Additionally, in some examples, an unintentional turn (e.g., caused by a short circuit on a control circuit board) may cause a laser to turn on unintentionally which may result in a fire incident.

In accordance with various embodiments of the present disclosure, example apparatuses, methods and techniques for detecting an unintended laser turn on and immediately disabling a laser drive circuit and power supply is provided. In some embodiments, an example laser failsafe system may be implemented entirely as a hardware and/or firmware solution to prevent inadvertent laser firing. In some examples, at least one dedicated photodiode may be positioned near at least one laser such that the at least one laser turns on when any of the lasers are lasing, and even at low power. In some embodiments, a comparator with a suitably low "on" threshold completes the light detection circuit. A laser light detector output signal may be compared to a digital logic output from an FPGA that goes active high only when the at least one laser is intended to be on, for printing or SOL detection purposes. A mismatch, indicating that the at least one laser is on when it should not be, may trigger digital logic devices to drive the positive inputs of drive operational amplifiers low, and also disable the laser power supply, thereby turning off the lasers. The techniques disclosed herein protect against errors that may occur in firmware or hardware, including short circuits, that can result in at least one laser being on unintentionally. For example, a short circuit Gallium nitride (GaN) Gate to Drain may result in laser firing or oscillating on/off, but would be detected by the example photodiode. Accordingly, the laser power supply disable logic may operate to turn off the at least one laser. In some embodiments, a latch circuit may be utilized to keep a fault indication latched on, where the latch is only resettable with a power cycle. In some embodiments, a counter may be implemented to track these events and store counts in non-volatile memory. In some embodiments, once a repeat failure count threshold is reached, the printing apparatus/LPH may be disabled permanently. In some examples, signal timing tuning may permit a certain amount of slack in order to avoid false triggers, but may still turn off very quickly in the event of a legitimate failure.

Method to Automatically Tune Digital-to-Analog Converter (DAC) Compensation Values in Laser Printer System In some embodiments, an example printing apparatus or laser printing system may comprise a digital-to-analog converter (DAC) that is used to control timing/power delivery to one or more lasers. For example, the DAC may be used to scale the output voltage. By way of example, an example DAC may comprise a plurality of channels where each channel of the DAC is used to control a particular laser. In this manner, a printing apparatus may be configured to print in greyscale by scaling the maximum output power as required depending on various parameters including print speed, media reactivity, temperature of the media, and/or the like.

In some examples, the example DAC may be a portion of a current control system for driving at least one laser. For example, an output of the example DAC may be provided first to a differential amplifier and then a drive operational amplifier in order to drive a laser. However, in some examples, the DAC may utilize an inaccurate internal reference resulting in a power output that is below an intended/target setpoint (in some examples, up to 16% below a target setpoint). Additionally, in some examples, components of a current control system (e.g., a differential amplifier and a drive operational amplifier) may add errors to the laser drive output that require calibration.

In accordance with various embodiments of the present disclosure, example apparatuses, methods and techniques for automatically tuning DAC compensation values in a laser printing system are provided. In contrast with known methods, the techniques described herein may quickly and automatically tune a laser printing apparatus using a single measurement point (e.g., a full scale output of a dedicated DAC that is used to drive a laser). This single measurement may then be used to compensate the gain of the DAC output to ensure that the DAC output can be driven across its full output scale. In some embodiments, DAC calibration may be performed by tuning the DAC GAIN and RSET values. Accordingly, the techniques disclosed herein relate to automatic tuning of DAC GAIN and RSET values at system startup by measuring an analog voltage downstream of the DAC output, and compensating for the internal accuracy of the DAC every time the system is powered on, addressing the need for initial calibration and subsequent calibration operations to address any drift over time.

Figure 105:
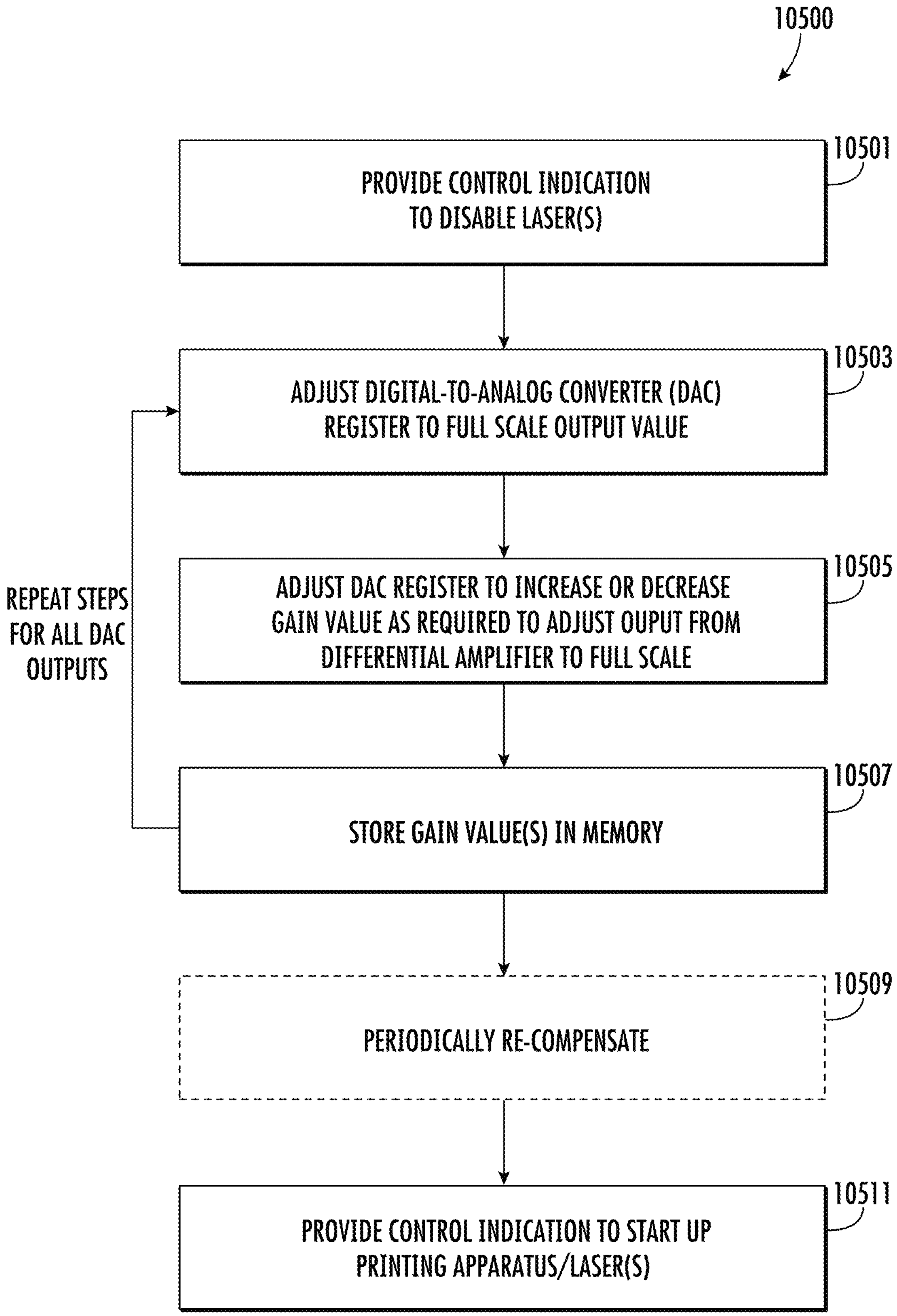
FIG. 105 is an example flow diagram illustrating an example method in accordance with examples of the present disclosure.

Referring now to FIG. 105, an example flow diagram illustrating an example method 10500 in accordance with examples of the present disclosure is provided.

In some examples, the method 10500 may be performed by processing circuitry (for example, but not limited to, a microcontroller unit (MCU), an ASIC, or a CPU. In some examples, the processing circuitry may be electrically coupled to and/or in electronic communication with other circuitries of an example printing apparatus, a memory (such as, for example, random access memory (RAM) for storing computer program instructions), and/or the like.

In some examples, one or more of the procedures described in FIG. 105 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

The example method 10500 begins at step/operation 10501. At step/operation 10501, a processing circuitry (such as, but not limited to, an MCU) provides (e.g., generates, transmits) a control indication to disable one or more lasers of the example printing apparatus. Since the noted method 10500 does not require any lasing, step/operation 10501 may be performed in order to ensure that the one or more lasers do not turn on while the method 10500 is being performed. In some examples, laser offset values (e.g., for auxiliary DAC (AUXDAC) outputs) may be adjusted and stored in non-volatile memory prior to or in conjunction with step/operation 10501.

Subsequent to step/operation 10501, the method 10500 proceeds to step/operation 10503. At step/operation 10503, the processing circuitry/MCU may adjust the DAC register (e.g., DAC register 07 (QRSET)) to a full scale output value (in some examples, near or as close as possible to a full scale output value), for example 700 mV, at an output from the differential amplifier, without exceeding the full scale value. In some examples, this is measured by the processing circuitry/MCU's Analog-to-Digital Converter (ADC) (Bit 7 of QRSET must remain '1'. QRSET is at location 5:0 and is two's complement).

Subsequent to step/operation 10503, the method 10500 proceeds to step/operation 10505. At step/operation 10505, the processing circuitry/MCU proceeds to adjust DAC register 06 (QDACGAIN bits) to increase or decrease the gain value as required to increase or decrease the output from the differential amplifier (e.g., to 200.0 mV). In some embodiments, the differential amplifier output may be measured by the example MCU's ADC. Accordingly, in various embodiments, the processing circuitry/MCU may drive an output value of a DAC to full scale/close to full scale, measure the output and perform compensation operations using internal gain and resistor registers within the DAC. In various examples, the DAC output may pass through a differential amplifier circuit and then to a laser drive circuit. The processing circuitry/MCU may measure a voltage output from an example differential amplifier circuit and compare the output to the DAC output voltage when the commanded output is at the intended system full scale output voltage. Then, the processing circuitry/MCU may use an algorithm to tune DAC compensation values until the differential amplifier circuit outputs are as close as possible to the target value given the available incremental compensation values.

Subsequent to step/operation 10505, the method 10500 proceeds to step/operation 10507. At step/operation 10507, the processing circuitry/MCU stores the gain values (e.g., in non-volatile memory). In various embodiments, the processing circuitry/MCU may repeat step/operation 10501, step/operation 10503, and step/operation 10505 for all system DAC outputs. By way of example, an example DAC may be associated with one of a plurality of lasers and two corresponding outputs.

Subsequent to step/operation 10507, the method 10500 proceeds to step/operation 10509. At step/operation 10509, the processing circuitry/MCU (optionally) periodically re-compensates, for example, if a long/threshold time period has passed since the printing apparatus has been power cycled, or if processing circuitry detects an ambient temperature outside a predetermined range (e.g., unusually hot or cold ambient temperature) which could affect the DAC and/or differential amplifier outputs.

Subsequent to step/operation 10509, the method 10500 proceeds to step/operation 10511. At step/operation 10511, processing circuitry/MCU provides a control indication to start up the printing apparatus/one or more lasers and operates optimally. Accordingly, any drift in the DAC output and/or differential amplifier output can be compensated for while eliminating the need for manually tuning these values at time of manufacturing.

Multimode Laser in a Printer with Cross-Scan Beam Magnification

As detailed herein, an example printing apparatus may comprise a plurality of multi-mode lasers and/or single-mode lasers that generate laser beams which are used to print/impinge content onto a print media. In some embodiments, as described herein, the lasers/scanning lens optics of a printing apparatus may be divided into groups. By way of example a first group may be a scan dimension group or f-theta lens group, and a second group may be a cross-scan dimension group or magnifying lens group. In some embodiments, optical power may be removed from the f-theta lens group in the cross-scan dimension. For example, an example printing apparatus may comprise a plurality of multi-mode lasers (e.g., four multi-mode lasers).

In accordance with various embodiments of the present disclosure, example apparatuses, methods and techniques for providing a multi-mode laser printing apparatus are provided. In various embodiments, the example printing apparatus is optimally configured to simultaneously write multiple lines on a print media and implement wobble correction operations. The term "wobble" may refer to a measure of angular deviation variance in a cross-scan dimension of a laser beam (e.g., as it leaves a polygon mirror). Correcting wobble allows the beam angle to deviate without moving the spot at the print media. Advantageously, the example printing apparatus may also be associated with a reduction in beam alignment complexity and operational sensitivity. Additionally, in some examples, the use of an integrated laser component may simplify manufacturing as well as repair and replacement of faulty components.

Figure 106:
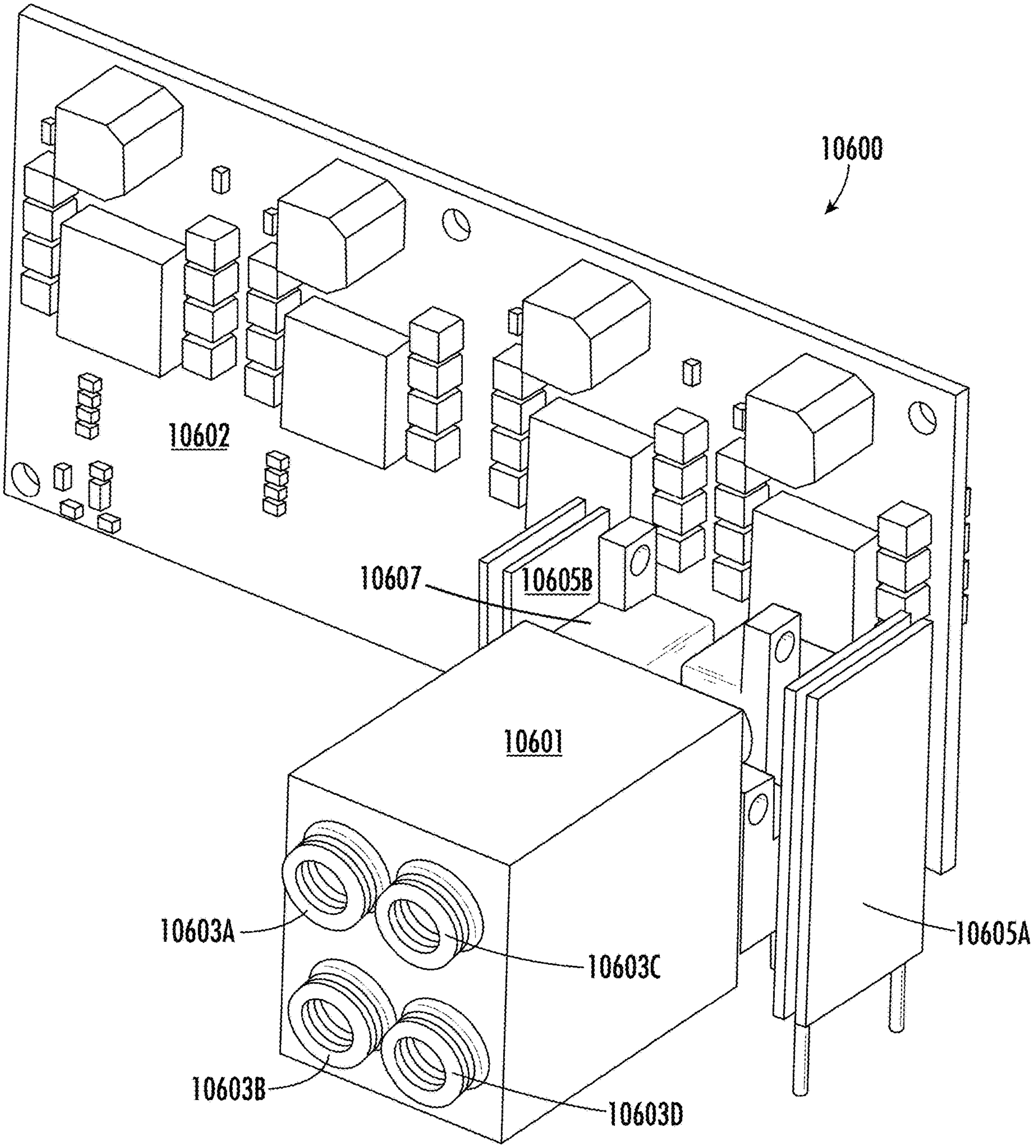
FIG. 106 is a schematic diagram depicting an example portion of a printing apparatus in accordance with examples of the present disclosure.

Referring now to FIG. 106, a schematic diagram depicting an example view of a portion of a printing apparatus 10600 in accordance with examples of the present disclosure is provided. The printing apparatus 10600 may be at least partially disposed, contained and/or arranged within a housing (e.g., body, structure). In particular, as depicted, the example printing apparatus 10600 comprises an integrated laser component 10601, a controller component 10602 (e.g., laser drive board), a first thermoelectric cooler element 10605A, a second thermoelectric cooler element 10605B, and at least one laser 10607 (e.g., multi-mode laser). In various embodiments, the integrated laser component 10601, the controller component 10602 (e.g., laser drive board), the first thermoelectric cooler element 10605A, the second thermoelectric cooler element 10605B, and the at least one laser 10607 are in electronic communication with one another such that data and/or information may be transmitted to and/or received between the various components/elements.

As noted above, the example printing apparatus 10600 comprises an integrated laser component 10601. In some examples, as depicted, the integrated laser component 10601 defines/comprises a housing. In various embodiments, the integrated laser component 10601 comprises a collimating assembly operatively coupled to at least one laser. The example housing may be or comprise any suitable metal (e.g., such as aluminum or brass) and may be configured to at least partially contain/house one or more lasers (e.g., the at least one laser 10607) and beam shaping optics. As illustrated in FIG. 106, the example integrated laser component 10601 is operatively coupled to the controller component 10602 (e.g., laser drive board and/or printed circuit board assembly (PCBA)). Additionally, at least a surface of the integrated laser component 10601 is positioned adjacent the controller component 10602 (e.g., laser drive board). The example integrated laser component 10601 may be or comprise a collimating assembly comprising a plurality of lens. In particular, as shown, the integrated laser component 10601 comprises a first lens 10603A, a second lens 10603B, a third lens 10603C, and a fourth lens 10603D arranged in a 2×2 array. Additionally, in various embodiments, the example integrated laser component 10601 is disposed adjacent the at least one laser 10607 (e.g., multi-mode laser). Additionally, as depicted in FIG. 106, the at least one laser 10607 comprises a plurality of lasers, in particular, four multi-mode lasers arranged/configured in a 2×2 array. In some examples, the integrated laser component 10601 and the at least one laser 10607 define a unitary body/single assembly. In some examples, each lens 10603A, 10603B, 10603C and 10603D of the integrated lens component 10601 may be operatively coupled to a respective laser (e.g., a first multi-mode laser, a second multi-mode laser, a third multi-mode laser and fourth multi-mode laser). In some examples, at least a portion of the at least one laser 10607 may be at least partially disposed within the housing of the integrated laser component 10601.

In some embodiments, the at least one laser 10607 (e.g., a first multi-mode laser, a second multi-mode laser, a third multi-mode laser and fourth multi-mode laser) is oriented so that the multi-mode dimension of the at least one laser 10607 laser (e.g., first multi-mode laser, second multi-mode laser, third multi-mode laser and fourth multi-mode laser) is in a cross-scan dimension.

Figure 107:
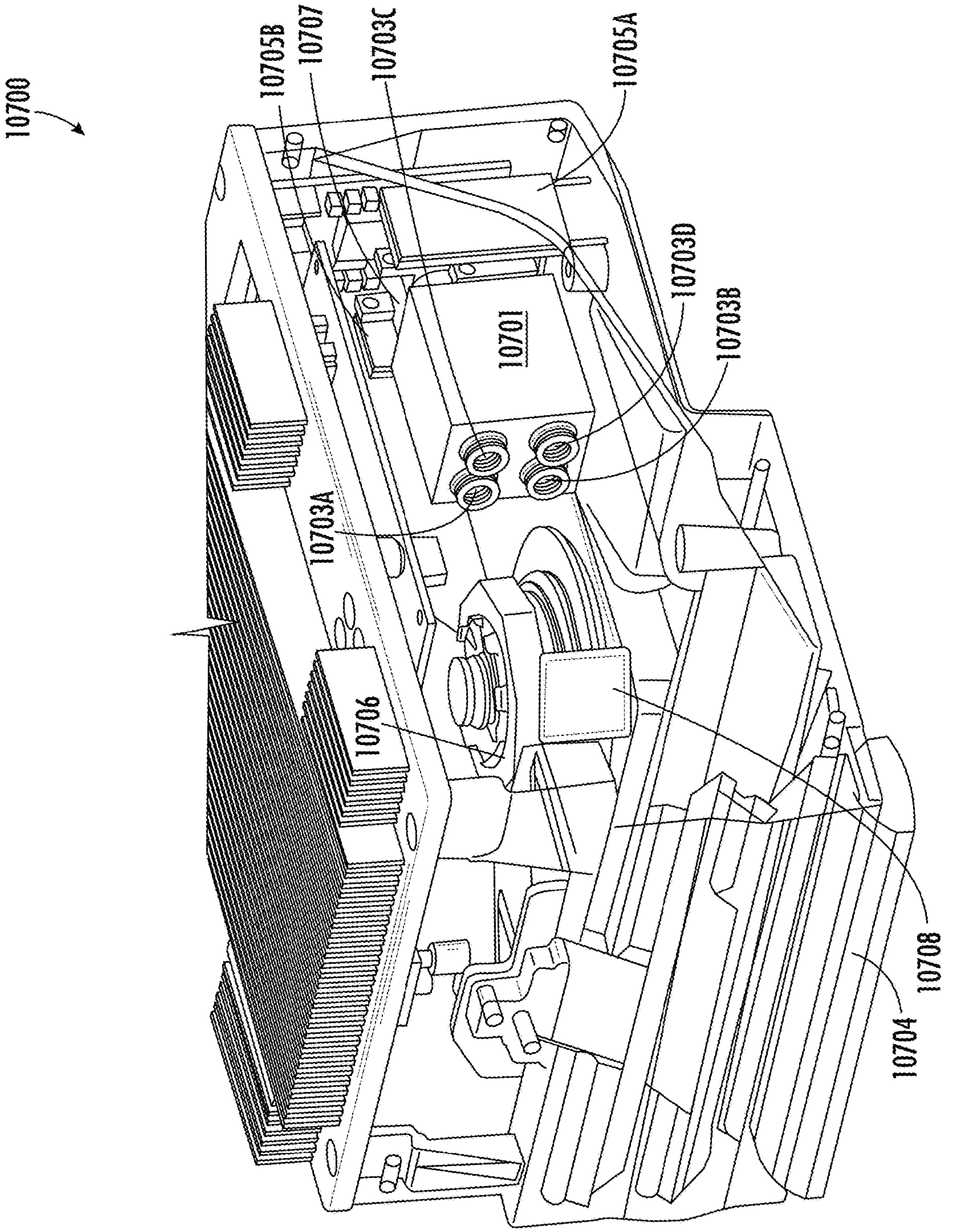
FIG. 107 is a schematic diagram depicting an example portion of a printing apparatus in accordance with examples of the present disclosure.

Referring now to FIG. 107, a schematic diagram depicting an example view of a portion of a printing apparatus 10700 in accordance with examples of the present disclosure is provided. The example printing apparatus 10700 may be similar or identical to the printing apparatus 10600 discussed above in connection with FIG. 106. As illustrated, the printing apparatus 10700 may be at least partially disposed, contained, and/or arranged within a body/housing. In particular, as depicted, the example printing apparatus 10700 comprises an integrated laser component 10701, a controller component 10702 (e.g., laser drive board), a first thermoelectric cooler element 10705A, a second thermoelectric cooler element 10705B, at least one laser 10707, a mirror 10708, and a lens element 10704 (e.g., cross-scan magnifying lens element). In various embodiments, each of the components/elements of the printing apparatus 10700 are in electronic communication with one another such that data and/or information may be transmitted to and/or received between the various components/elements.

As noted above, the example printing apparatus 10700 comprises an integrated laser component 10701. In some examples, as depicted, the integrated laser component 10701 comprises a housing. The example housing may be or comprise any suitable metal and may be configured to at least partially contain/house one or more lasers and beam shaping optics. As illustrated in FIG. 107, the example integrated laser component 10701 is operatively coupled to the controller component 10702 (e.g., laser drive board or PCBA). In particular, as depicted, the example integrated laser component 10701 may be a collimating assembly comprising a first lens 10703A, a second lens 10703B, a third lens 10703C and a fourth lens 10703D arranged in a 2×2 array. As further depicted, in various examples, the integrated laser component 10701 comprises/is operatively coupled to at least one laser 10707 (e.g., four multi-mode lasers that are each associated with a respective lens 10703A, 10703B, 10703C, and 10703D). As depicted, the at least one laser 10707 is at least partially disposed/positioned between the first thermoelectric cooler element 10705A and the second thermoelectric cooler element 10705B. In some embodiments, the at least one laser 10707 (e.g., four multi-mode lasers) is oriented such that the multi-mode dimension is in a cross-scan dimension (e.g., 90 degrees relative to the scan dimension). As further depicted in FIG. 107, the example printing apparatus 10700 comprises one or more optical components. In particular, the example printing apparatus 10700 comprises a polygon mirror 10706, a mirror 10708 (e.g., post-collimation pre-polygon (PCPP) mirror), and a lens element 10704 (e.g., cross-scan magnifying cylinder lens). In some embodiments, the lens element 10704 (e.g., cross-scan magnifying cylinder lens) is disposed adjacent a location of a print media (e.g., an inch away from a surface of the print media) in order to provide a magnification factor that is less than 1 or on the order of 0.1. This may serve to shrink the focused spot size down to a target resolution (e.g., 200 DPI).

In some embodiments, each of the lasers of the integrated laser component 10701 are focused on the mirror 10708 (e.g., single PCPP mirror). The mirror 10708 may reflect the incoming beams onto the polygon mirror 10706 coincident in a cross-scan dimension, thereby forming the object to be imaged. Additionally, the lens element 10704 (e.g., cross-scan magnifying cylinder lens) may image a laser spot from a surface of the polygon mirror 10706, and then onto a surface of the print media in order to provide sufficient magnification to shrink the spot size down at the print media and achieve wobble correction. In various examples, placing the object on a surface of the polygon mirror 10706 prior to providing the image to the print media also addresses wobble correction. For example, at an exit aperture of the print head, due to the relative positions of the polygon mirror 10706 and the print media, a large beam is magnified down to a smaller size at a media (for example, at a magnification factor of ×0.1).

As further illustrated in FIG. 107, the example printing apparatus 10700 comprises a first thermoelectric cooler element 10705A and a second thermoelectric cooler element 10705B which operate to regulate the temperature of the integrated laser component 10701. In some examples, at least a portion of the integrated laser component 10701/at least one laser 10707 is disposed adjacent/at least partially between the first thermoelectric cooler element 10705A and the second thermoelectric cooler element 10705B.

As noted above, in some embodiments, in order to print content using a printing apparatus comprising a plurality of multi-mode lasers, laser beams (e.g., emitted by an integrated laser component) may need to be compressed to achieve a target print resolution. This may require significant magnification in a cross-scan dimension to reduce the image size and may be accomplished using a lens element (e.g., magnifying cylinder lens) positioned adjacent/close to a print media.

Figure 108:
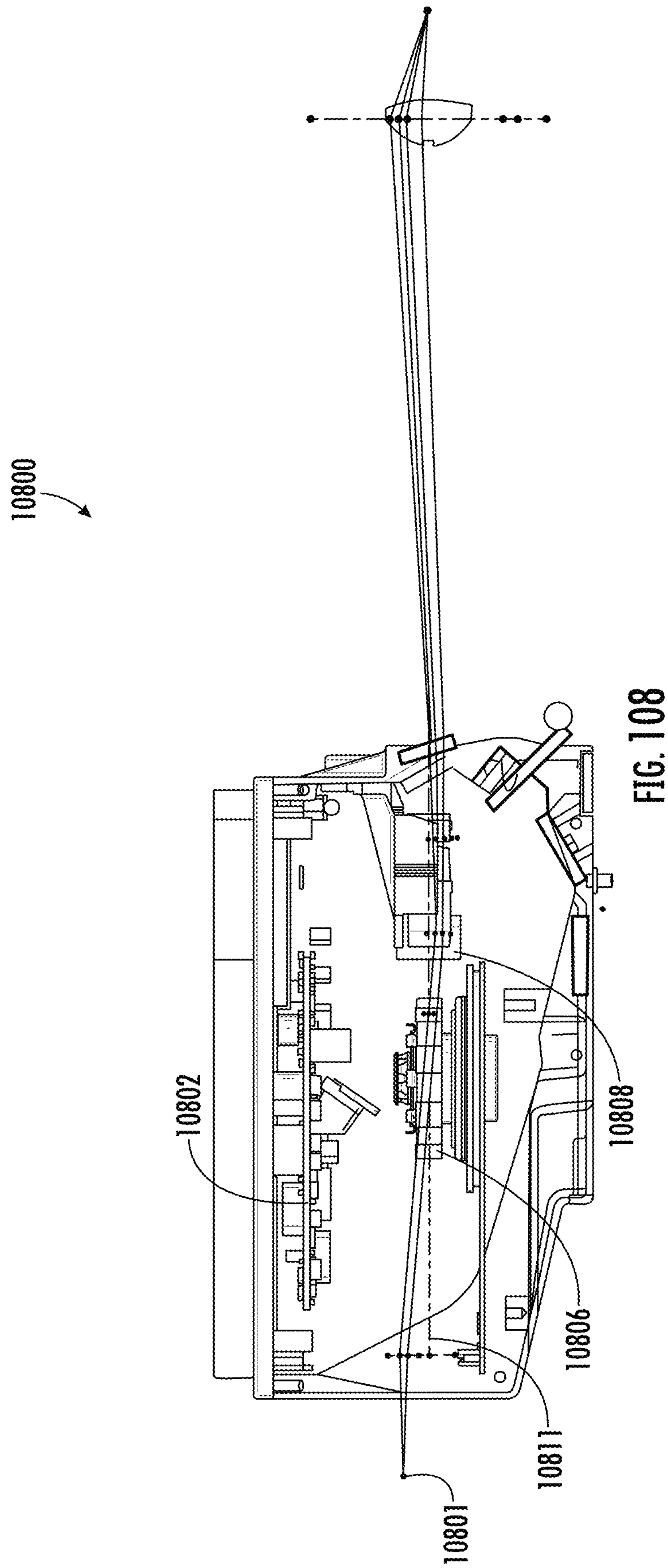

Referring now to FIG. 108, a schematic diagram depicting an example view of a portion of a printing apparatus 10800 in accordance with examples of the present disclosure is provided.

As illustrated, the printing apparatus 10800 may be at least partially disposed, contained and/or arranged within a body/housing. In particular, as depicted, the example printing apparatus 10800 comprises an integrated laser component/at least one laser source 10801, a controller component 10802 (e.g., laser drive board). As depicted in FIG. 108, the example printing apparatus 10800 comprises one or more optical components. In particular, the example printing apparatus 10800 comprises a polygon mirror 10806, a mirror 10808 (e.g., PCPP mirror), and a lens element 10804 (e.g., magnifying dual-cylinder lens). In various embodiments, each of the components/elements of the printing apparatus 10800 are in electronic communication with one another such that data and/or information may be transmitted to and/or received between the various components/elements.

As noted above, the example printing apparatus 10800 comprises an integrated laser component/at least one laser source 10801 (comprising at least one multi-mode laser). In some examples, as depicted, the integrated laser component/at least one laser source 10801 comprises/defines a housing. The example housing may be or comprise any suitable metal and may be configured to at least partially contain/house one or more lasers (e.g., a plurality of multi-mode lasers). As illustrated in FIG. 108, the example integrated laser component/at least one laser source 10801 (e.g., at least one multi-mode laser) is operatively coupled to the controller component 10802 (e.g., laser drive board or PCBA). In some embodiments, the example printing apparatus 10800 comprises a lens element 10804 (e.g., magnifying dual-cylinder lens) is disposed adjacent a location of a print media (e.g., an inch away from a surface of the print media) in order to provide a magnification factor that is less than 1.

In some embodiments, the integrated laser component/at least one laser source 10801 (e.g., at least one multi-mode laser) is configured to focus an output beam onto the mirror 10808 (e.g., single PCPP mirror). Then, the mirror 10808 may reflect the incoming beams onto the polygon mirror 10806 in a cross-scan dimension, thereby forming the object to be imaged. In some embodiments, two of the laser beams (e.g., generated by a first pair/set of multi-mode lasers) may be configured on a high path, while another two of the laser beams (e.g., generated by a second pair/set of multi-mode lasers) may be configured on a low path in order to minimize optical size. Referring again to FIG. 108, an example one of two possible symmetric paths (originating from integrated laser component/at least one laser source 10801, mirrored about a line of symmetry 10811, and terminating at the lens element 10804 leading to the print mechanism aperture 10813) is depicted. In various embodiments, the example printing apparatus 10800 may be configured such that laser beam(s) are incident on a partial height, full height or center point of the lens element 10804.

In some embodiments, the lens element 10804 (e.g., cross-scan magnifying cylinder lens) may image a laser spot from a surface of the polygon mirror 10806, and then onto a surface of the print media in order to provide sufficient magnification/a target magnification to shrink the spot size down at the print media while also implementing wobble correction. In various examples, placing the object on a surface of the polygon mirror 10806 prior to providing the image to the print media also addresses wobble correction. For example, at an exit aperture of the print head, due to the relative positions of the polygon mirror 10806 and the print media, a large beam is magnified down to a smaller size at a print media (for example, at a magnification factor of ×0.1)

Figure 109:
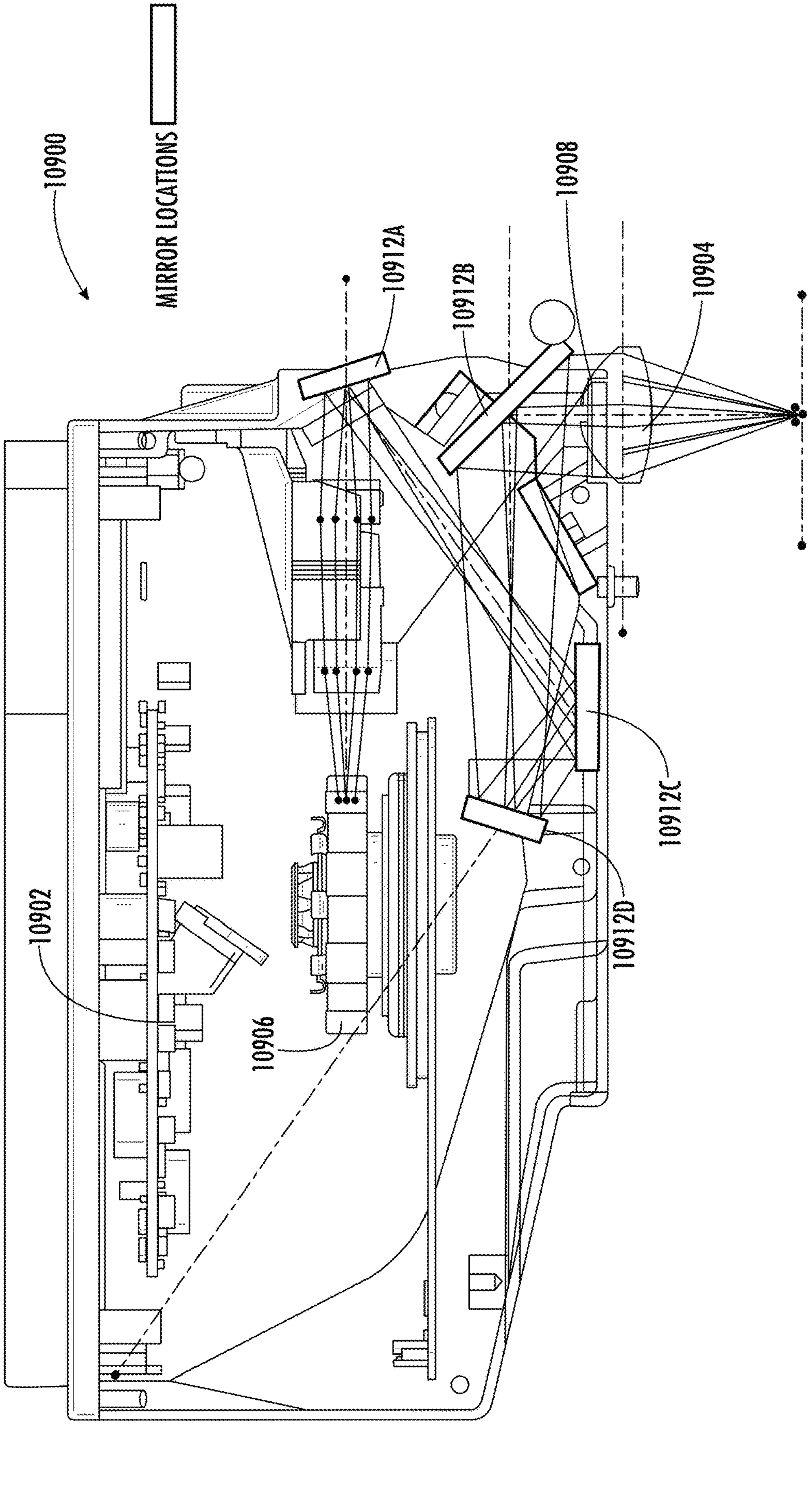

In some embodiments, an example printing apparatus may be configured to use a folded beam path. Referring now to FIG. 109, a schematic diagram depicting an example view of a portion of a printing apparatus 10900 in accordance with examples of the present disclosure is provided.

As illustrated in FIG. 109, the example printing apparatus 10900 may be at least partially disposed, contained and/or arranged within a body/housing. In particular, as depicted, the example printing apparatus 10900 comprises, a controller component 10902 (e.g., laser drive board), and one or more optical components. In particular, the example printing apparatus 10900 comprises a polygon mirror 10906, a lens element 10904 (e.g., magnifying cylinder lens), and a plurality of mirrors (as depicted, a first mirror 10912A, a second mirror 10912B, a third mirror 10912C, and a fourth mirror 10912D). In some examples, the plurality of mirrors 10912A, 10912B, 10912C and 10912D may steer (e.g., direct, channel) the laser beams to a common alignment target. In various embodiments, each of the components/elements of the printing apparatus 10900 are in electronic communication with one another such that data and/or information may be transmitted to and/or received between the various components/elements.

In some embodiments, an output beam of a laser source (e.g., integrated laser component/at least one laser source 10801 discussed above in connection with FIG. 108) may be incident on the polygon mirror 10906 and then sequentially focused on/directed to each of the plurality of mirrors 10912A, 10912B, 10912C and 10912D in turn. Then, an output of the plurality of mirror 10912A, 10912B, 10912C and 10912D may be directed onto the lens element 10904 prior to terminating at a print mechanism aperture 10913. In some examples, a size of the print mechanism aperture 10913 may be 2 mm. In some embodiments the lens element 10904 (e.g., dual cylinder magnifying lens) may be positioned between an f-theta lens and the print media, in some examples, adjacent/close to the print media.

As noted above, an example lens element 10904 (e.g., magnifying cylinder lens) may be disposed adjacent a location of a print media (e.g., an inch away from a surface of the print media) in order to shrink a focused spot size down to a target resolution (e.g., 200 DPI).

Figure 110:
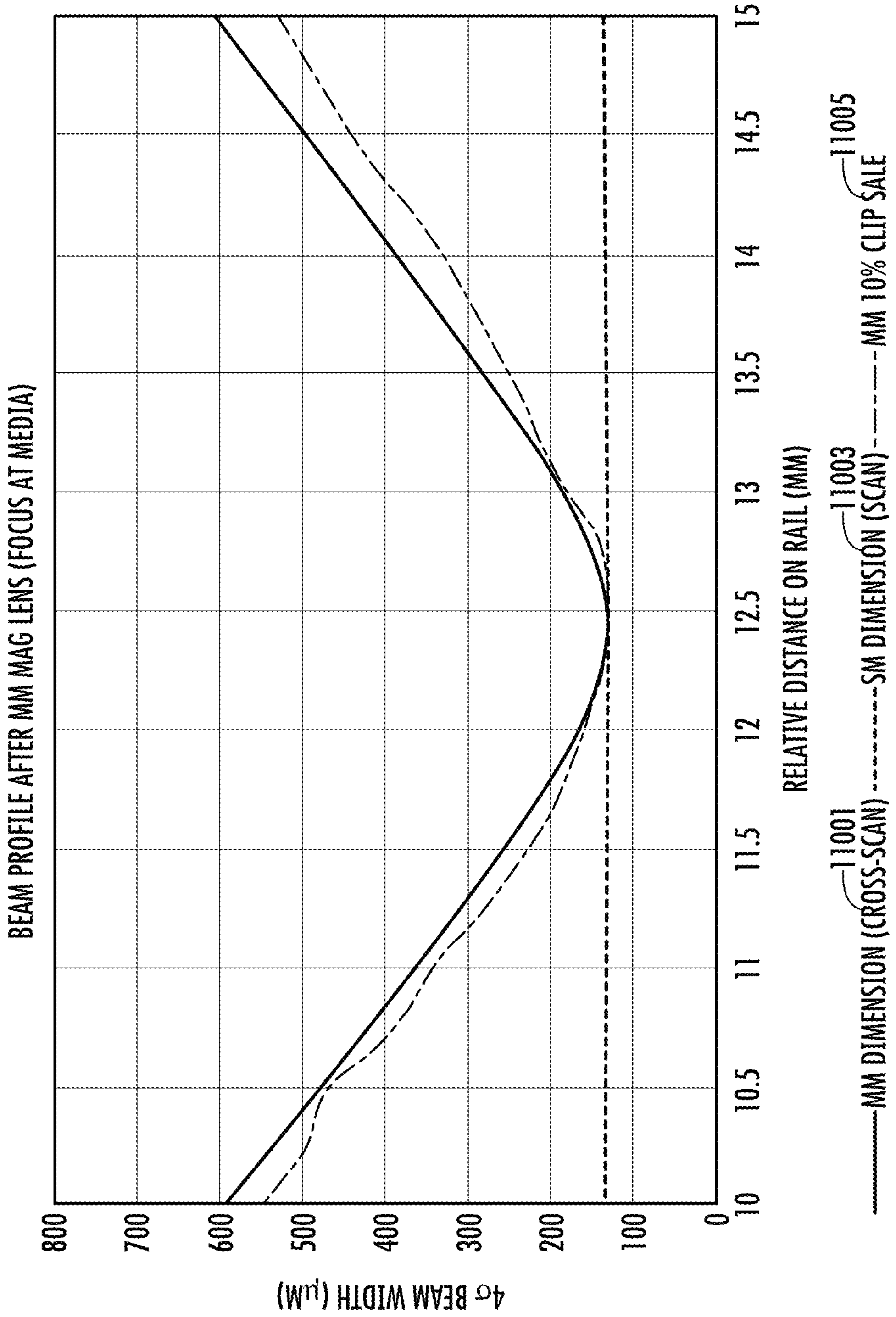

Referring now to FIG. 110, an example graph 11000 depicting example measurements based on operations of example apparatuses are provided. As depicted in FIG. 110, the x-axis represents relative distance from a laser source to a print media measured in millimeters.

As illustrated, the y-axis represents a beam width (measured in microns) associated with a first multi-mode laser beam at a print media (represented by line 11001 and line 11005). As depicted, the beam width generated by the first multi-mode laser is able to reach a target resolution of 120 microns at the print media (located at approximately 12.5 mm on the graph).

As further illustrated, the y-axis also represents a beam width (measured in microns) associated with a single-mode dimension of the laser beam at a print media (represented by line 11003). As depicted, the beam width generated by the first multi-mode laser is able to reach and maintain a target resolution around 120 microns at a relative distance between 10 and 15 mm from the print media in the single-mode dimension (e.g. the scan dimension).

Accordingly, FIG. 110 demonstrates that both single-mode and multi-mode dimensions of a multi-mode laser may be utilized to print content at a target resolution (e.g., 120 microns or 200 DPI).

Multi-Laser Beam Delivery Module with Common Beam Sub-System

In some examples, high power may be necessary in order to directly write/impinge content onto a sensitive print media. In some examples, it may be difficult to provide a sufficient amount of power using a single laser at a reasonable cost and size. As discussed herein, in some applications, a plurality of lasers may be utilized. The use of multiples lasers may require precise methods of alignment and assembly in order for the plurality of lasers to function optimally in concert with one another.

In accordance with various embodiments of the present disclosure, example apparatuses, methods and techniques for providing a multi-laser beam delivery module with a common beam sub-system are provided.

Referring again to FIG. 107, as discussed above, an example printing apparatus 10600 may comprise an integrated laser component 10701. The example printing apparatus 10600 may be similar or identical to the example printing apparatus 10700 described above in connection with FIG. 107.

As noted above, the example integrated laser component 10701 comprises a collimating assembly with a 2×2 array of lens (as depicted, lens 10703A, 10703B, 10703C and 10703D) operatively coupled to at least one laser 10707 (e.g., multi-mode laser). In some examples, the integrated laser component 10701 defines a unified laser bank which may be aligned outside the example laser printhead. In various examples, the at least one multi-mode laser 10707 may be associated with a respective collimating lens (lens 10703A, 10703B, 10703C and 10703D) and can be be independently focused/collimated therewith (in some examples, in conjunction with the other lasers).

In some embodiments, a lens element 10704 (e.g., cross-scan magnifying cylinder lens element) may operate to focus the cross-scan dimension of the at least one laser 10707 (e.g., at least one multi-mode laser) to the same distance, and a configuration of mirrors may steer the beams to a common alignment target. In various examples, using a common target may facilitate writing content on multiple/different print lines, or writing content to a single line concurrently. In some embodiments, as depicted in FIG. 107, the integrated laser component 10701/at least one laser 10707 (e.g., laser bank) may be mounted within an example print head as a unit, requiring a single mirror/optical path directing the beams to an example polygon mirror (e.g., polygon mirror 10706).

In various embodiments, the example integrated laser component 10701/at least one laser 10707 may comprise/be embedded with multiple instances of the same beam shaping and steering system (one per laser). In some examples, each instance may comprise a collimating lens with a focal length set to control the beam size in the scan dimension. In some examples, each instance may comprise a cylinder lens that is configured to focus the cross-scan dimension to the surface of the polygon mirror (e.g., polygon mirror 10706). In some examples, each instance may comprise a wedge prism (or multiple prisms) adjusted to angularly deflect the beam to an alignment target. In some examples, each instance may comprise a leveling prism to realign an incident beam to a nearly coplanar condition with the other lasers of the system. In some examples, each collimating lens, cylinder lens, and/or wedge prism may require adjustment in order to achieve a target alignment. Accordingly, in various examples, each collimating lens and/or cylinder lens may be translated in the direction of beam propagation to achieve proper focus. Additionally, each wedge prism may (e.g., deflecting prism(s)) may be rotated to achieve a target/proper beam height (or x/y position) on the polygon mirror (e.g., polygon mirror 10706) after passing through the leveling prism (i.e., alignment of the different laser lines to one another). Once the module is fully aligned (e.g., during manufacturing), it may be positioned within an example print head/printing apparatus and a simple alignment process (e.g., adjustment of a single mirror) may bring all lasers into alignment with a scanning optical component (e.g., spinning polygon mirror).

Active Media Laser Printer with Symmetric Optical Layout and Segmented Scan Lines As noted above, an example printing apparatus may comprise an integrated laser component (e.g., consisting of four multi-mode laser diodes and corresponding lens each in a 2×2 array arrangement). In such examples, each laser beam generated by the plurality of multi-mode lasers may be inherently non-coplanar as they sweep through the optical system. In some examples, a lack of coplanarity may require larger optics, reduced depth of focus at a print media, reduced laser spot quality (e.g., due to aberrations), and/or difficulty forcing the four beams to print the same coincident line.

In accordance with various embodiments of the present disclosure, example apparatuses, methods and techniques for providing a multi-laser beam arrangement with a symmetric optical layout and segmented scan lines is provided.

Figure 111:
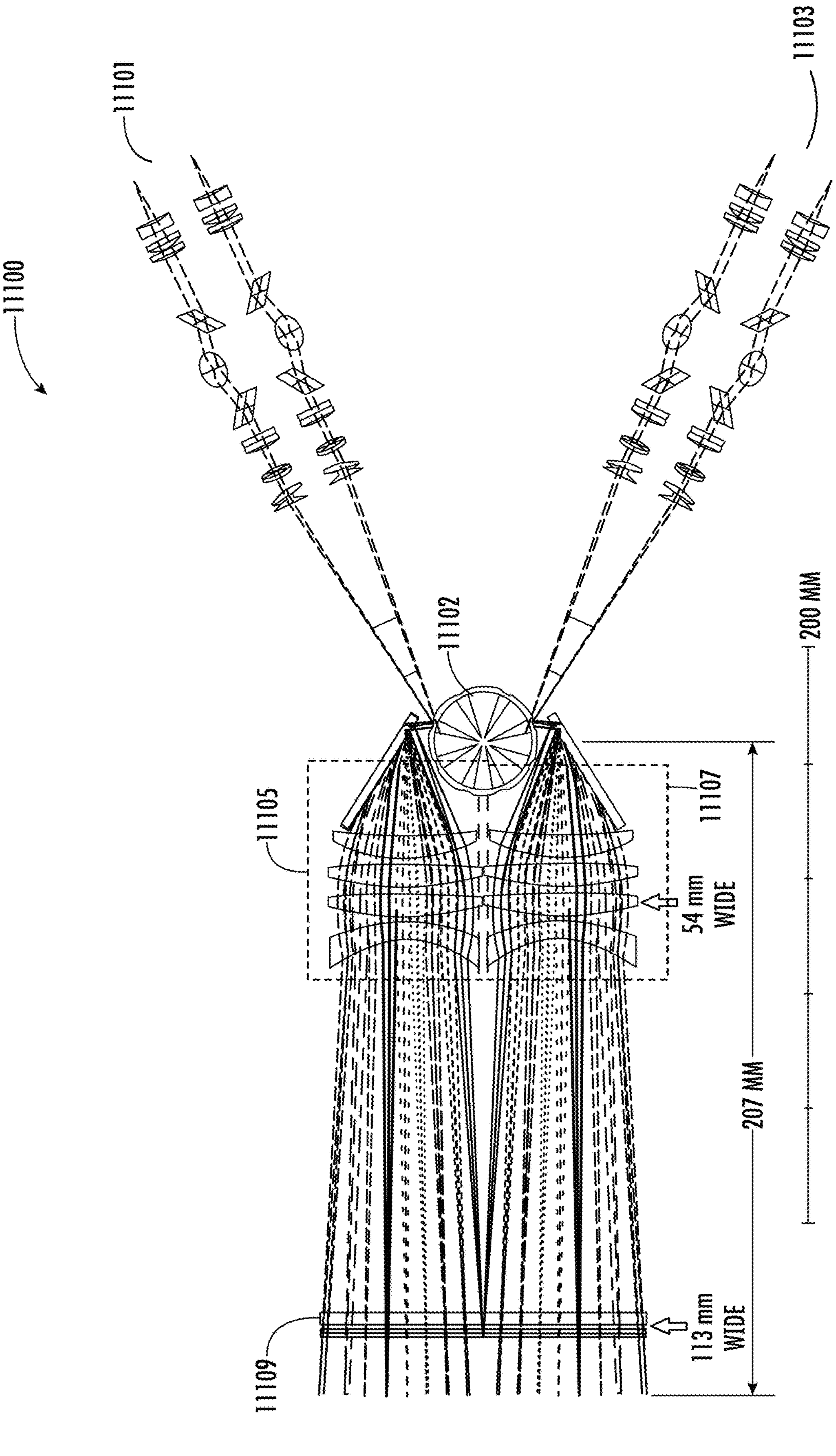

Referring now to FIG. 111, a schematic diagram depicting an example portion of a printing apparatus 11100 in accordance with examples of the present disclosure is provided. The example portion of a printing apparatus 11100 may be at least partially disposed, contained and/or arranged within a housing (e.g., body, structure, container). In some examples, the example printing apparatus 11100 may comprise two separate/distinct a 1×2 arrays. As shown, the example printing apparatus 11100 comprises a first laser array 11101 (e.g., a 1×2 laser array) and a second laser array 11103 (e.g., a 1×2 laser array). As illustrated, each of the first laser array 11101 and the second laser array 11103 may be configured to direct laser beams through a configuration of optical elements/lens(es).

As further depicted in FIG. 111, the example printing apparatus 11100 comprises a polygon mirror 11102 disposed downstream with respect to the first laser array 11101 and the second laser array 11103. As further illustrated, a first set of optical elements 11105 (e.g., scan lenses) and a second set of optical elements 11107 (e.g., scan lenses) are positioned downstream with respect to the polygon mirror 11102 such that the one or more laser beams are directed/channeled therethrough. As depicted, the first set of optical elements 11105 are associated with the first laser array 11101, and the second set of optical elements 11107 are associated with the second laser array 11103. Additionally, as shown, each of the first laser array 11101 and the second laser array 11103 is positioned symmetrically around/with respect to the scanning polygon mirror 11102. As further illustrated in FIG. 111, the example printing apparatus 11100 further comprises a common lens element 11109 (e.g., magnifying dual-cylinder lens) that is configured to focus the cross-scan dimension of each laser beam provided by the first laser array 11101 and the second laser array 11103.

In some examples, a scan line generated by the example printing apparatus 11100 may be divided/split into two segments, each covering half a print media/label. In some examples, the separate segments may necessitate data stitching. In some examples, it may be necessary to compress the sweep optically (e.g., from a full label size down to half a label). In some embodiments, digital compensation may be used to avoid distortion of a print image in an instance in which the lasers within each laser array 11101 and 11103 are scanning at a slightly different speeds.

In some examples, the example printing apparatus 11100 may provide improvements in depth of focus, laser spot quality, system compactness, and/or print efficiency (i.e., power vs. speed). Additionally, the example printing apparatus 11100 may provide advantages relating to heat migration and the electrical layout within the print head.

Method to Print with Laser Printer Utilizing Preheating System

In some embodiments, as discussed herein, a laser printer system may utilize a preheater in order to heat/warm a print media to a target temperature prior to lasing. In some examples, an example preheater/preheating system may require a period of time (in some examples, between 10 minutes and 15 minutes) to bring the print media to a target temperature.

In accordance with various embodiments of the present disclosure, example apparatuses, methods and techniques for rapidly heating a print media prior to lasing are provided. The noted techniques may allow an end user to print immediately after powering up an example printing apparatus.

Figure 112:
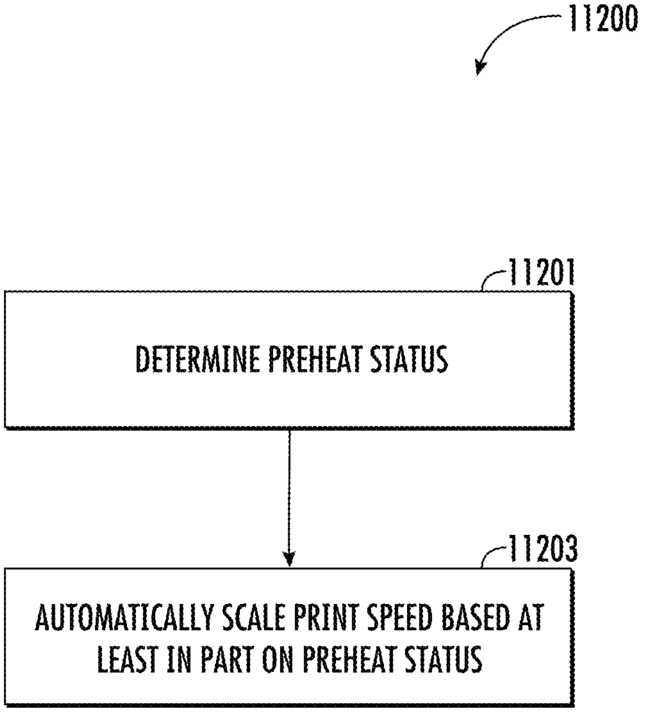

Referring now to FIG. 112, an example flow diagram illustrating an example method 11200 in accordance with examples of the present disclosure is provided.

In some examples, the method 11200 may be performed by processing circuitry, an application-specific integrated circuit (ASIC), a CPU, or the like. In some examples, the processing circuitry may be electrically coupled to and/or in electronic communication with other circuitries of an example printing apparatus, a memory (such as, for example, random access memory (RAM) for storing computer program instructions), and/or the like.

In some examples, one or more of the procedures described in FIG. 112 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

The example method 11200 begins at step/operation 11201. At step/operation 11201, a processing circuitry (such as, but not limited to, a CPU) determines a preheat status associated with an example printing apparatus.

Subsequent to determining the preheat status at step/operation 11201, the method 11200 proceeds to step/operation 11203. At step/operation 11203, processing circuitry automatically scales a print speed available based on the preheat status. For example, initially, a printing apparatus may print at a lower speed (e.g., 1.5 IPS to 2 IPS) than the speed that is typically required to fulfil a particular print operation. Accordingly, in some examples, where possible, printing operations may be performed successfully at a lower speed (e.g., using one laser instead of a plurality of lasers). In another example, at power up if a print job is requested at 4 IPS, the printing apparatus/processing circuitry may proceed to print at 1.5 IPS to 2 IPS, depending on final performance capability of the system design/target print parameters. As the preheater heats up the media, the maximum print speed is increased to match the capability, for example 4 IPS when fully preheated.

In accordance with various examples of the present disclosure a method is provided. The method may comprise: actuating, by a processor, a first roller and a second roller to cause traversal of print media along a first direction, wherein the first roller is positioned upstream of the second roller along the first direction; causing, by the processor, the first roller to stop rotating at a first time instant; and causing, by the processor, the second roller to stop rotating at a second time instant, wherein the second time instant is chronologically later than the first time instant.

In some examples, the method may comprise causing a print head to print content on the print media in response to stopping the rotation of the second roller.

In some examples, the first roller is positioned upstream of the print head, and the second roller is positioned downstream of the print head.

In some examples, the method further comprises causing a traversal of the first roller and the second roller along a second direction, wherein the traversal of the first roller and the second roller along the second direction causes the first roller and the second roller to be spaced apart from the print media.

In some examples, the method further comprises causing a traversal of the first roller and the second roller along a third direction, wherein the traversal of the first roller and the second roller along the third direction causes the first roller and the second roller to abut the print media, and wherein the third direction is opposite to the second direction.

In some examples, the method further comprises determining a time period between the first time instant and the second time instant based on one or more print media characteristics, wherein the one or more print media characteristics comprises at least one of a type of the print media, or a thickness of the print media.

In some examples, the method further comprises determining a time period between the first time instant and the second time instant based on a media traversal speed.

In some examples, the method further comprises receiving an input from an operator pertaining to an expected print quality, and determining the media traversal speed based on the expected print quality.

In accordance with various examples of the present disclosure, a printing apparatus is provided. The printing apparatus may comprise: a first roller; a second roller positioned downstream of the first roller along a first direction, wherein the first roller and the second roller facilitate traversal of print media in the first direction; a processor communicatively coupled to the first roller and the second roller; wherein the processor is configured to: actuate the first roller and the second roller to cause traversal of the print media in the first direction, cause the first roller to stop rotating at a first time instant; and cause the second roller to stop rotating at a second time instant, wherein the second time instant is chronologically later than the first time instant.

In some examples, the printing apparatus further comprises a print head communicatively coupled with the processor, wherein the processor is configured to cause the print head to print content after the second time instant.

In some examples, the first roller is positioned upstream of the print head, and wherein the second roller is positioned downstream of the print head.

In some examples, the printing apparatus further comprises a first actuation unit and a second actuation unit, wherein the first actuation unit and the second actuation unit are coupled to the processor, wherein the processor is configured to activate the first actuation unit and the second actuation unit to cause the first roller and the second roller to rotate, respectively.

In some examples, each of the first roller and the second roller comprises a biasing member and a roller, wherein the biasing member is coupled to the roller, wherein the biasing member is configured to apply a biasing force on the roller, along a second direction, causing the roller to abut the print media.

In some examples, the printing apparatus further comprises a third actuation unit communicatively coupled to the processor, wherein the third actuation unit is further coupled to the roller in the first roller and the second roller, wherein the processor is configured to cause the third actuation unit to move the roller in a third direction causing the first roller and the second roller to be spaced apart from the print media.

In some examples, each of the first roller and the second roller further comprises a shaft that is coupled to the biasing member, wherein the shaft allows rotation of the first roller and the second roller about the shaft.

In some examples, the first roller and the second roller are rotatable, about the shaft, between a first position and a second position.

In some examples, at the first position, the first roller and the second roller abut the print media.

In some examples, at the second position, the first roller and the second roller are positioned away from the print media.

In some examples, the first roller and the second roller are coupled to a print head.

In some examples, the rotation of the first roller and the second roller, about the shaft, causes the print head to traverse along the second direction.

In accordance with various examples of the present disclosure, a printing apparatus is provided. The printing apparatus may comprise: a print head assembly comprising at least a bottom chassis portion configured to receive a print media, and a frame movably positioned above the bottom chassis portion along a vertical axis of the printing apparatus, wherein the frame is movable between a first position and a second position, wherein the frame, in the first position, is spaced apart from the bottom chassis portion and wherein the frame, in the second position, presses the print media against the bottom chassis portion.

In some examples, the print head assembly further comprises a top chassis portion removably coupled to the bottom chassis portion, wherein a bottom surface of the top chassis portion is positioned at a predetermined distance from a top surface of the bottom chassis portion.

In some examples, the frame is coupled to the top chassis portion such that the frame is extendible from the bottom surface of the top chassis portion.

In some examples, the frame is positioned between the bottom surface of the top chassis portion and the top surface of the bottom chassis portion.

In some examples, the printing apparatus further comprises a housing, wherein the housing comprises a base and a back-spine section, wherein the back-spine section is orthogonally coupled to the base, and wherein the back-spine section extends along the vertical axis of the printing apparatus.

In some examples, the printing apparatus further comprises at least one first rail coupled to the back-spine section, wherein the frame is slidably coupled to the at least one first rail.

In some examples, a shape of the frame corresponds to a concentric rectangle, and wherein the frame is configured to press against at least one edge of the print media.

In some examples, the bottom chassis portion comprises a top end portion and a bottom end portion, and wherein a top surface of the bottom chassis portion defines the top end portion of the bottom chassis portion, and wherein a bottom surface of the bottom chassis portion defines the bottom end portion of the bottom chassis portion.

In some examples, the bottom surface of the bottom chassis portion defines a plurality of orifices that extends from the bottom end portion of the bottom chassis portion to the top end portion of the bottom chassis portion.

In some examples, the printing apparatus further comprises a fan configured to be received at the bottom end portion of the bottom chassis portion, wherein the fan is configured to generate a negative pressure at the top end portion of the bottom chassis portion through the plurality of orifices, wherein the print media gets pulled towards the top surface of the bottom chassis portion based on the negative pressure generated by the fan through the plurality of orifices.

In some examples, the frame is configured to further press the print media against the top surface of the bottom chassis portion while the fan generates the negative pressure generated by the fan through the plurality of orifices.

In some examples, the bottom surface of the bottom chassis portion defines a cavity that extends from the bottom end portion of the bottom chassis portion to the top end portion of the bottom chassis portion, wherein the cavity defines an inner surface of the bottom chassis portion, and wherein the inner surface of the bottom chassis portion defines a plurality of protruding grooves that extend along a lateral axis of the printing apparatus.

In some examples, the printing apparatus further comprises a modular platform configured to be removably received on the top end portion of the bottom chassis portion through the plurality of protruding grooves, wherein the modular platform has a bottom surface and a top surface, and wherein the bottom surface of the modular platform faces the cavity and the top surface of the modular platform is positioned opposite to the cavity.

In some examples, the bottom surface defines a plurality of orifices that extend from the bottom surface of the modular platform to the top surface of the modular platform.

In some examples, the printing apparatus further comprises a fan configured to be received at the bottom end portion of the bottom chassis portion, wherein the fan is configured to generate a negative pressure at the top end portion of the bottom chassis portion through the plurality of orifices and the cavity, wherein the print media gets pulled towards the top surface of the modular platform based on the negative pressure generated by the fan through the plurality of orifices and the cavity.

In accordance with various examples of the present disclosure a method is provided. The method may comprise: causing, by a processor in the printing apparatus, a frame, movably positioned above a bottom chassis portion along a vertical axis of the printing apparatus, to move to a first position, wherein the frame, in the first position, is spaced apart from the bottom chassis portion; causing, by the processor, a traversal of print media along a print path to position a print media on a top surface of the bottom chassis portion; and causing, by the processor, the frame to move to a second position, wherein the frame, in the second position, presses the print media against the bottom chassis portion during printing of content on the print media.

In some examples, the method further comprises activating an actuation unit that causes an application of an external force on the frame, wherein the frame moves to the second position in response to the application of the external force.

In some examples, the method further comprises activating a vacuum generating unit, positioned at a bottom surface of the bottom chassis portion, wherein the activation of the vacuum generating unit causes the print media to stick to the top surface of the bottom chassis portion.

In some examples, the combination of the frame being positioned at the second position and the activation of the vacuum generating unit causes flattening of the print media.

In accordance with various examples of the present disclosure a computing device configured to operate a printing apparatus is provided. In some examples, the computing device comprises: a memory device comprising one or more instructions; a processor configured to execute the one or more instructions to: cause a frame, movably positioned above a bottom chassis portion along a vertical axis of the printing apparatus, to move to a first position, wherein the frame, in the first position, is spaced apart from the bottom chassis portion; cause a traversal of a print media along a print path to position the print media on a top surface of the bottom chassis portion; and cause the frame to move to a second position, wherein the frame, in the second position, presses the print media against the bottom chassis portion during printing of content on the print media.

In accordance with various examples of the present disclosure a method is provided. The method may comprise: receiving, by a processor, one or more configuration parameters associated with the printing apparatus, wherein the one or more configuration parameters include at least a resolution at which content is to be printed on a print media; determining, by the processor, one or more print head parameters based on the one or more configuration parameters associated with a print head in the printing apparatus, wherein the one or more print head parameters include a rotation speed of a polygon mirror in the print head; receiving, by the processor, one or more updated configuration parameters, wherein the one or more updated configuration parameters comprise at least an updated resolution at which the content is to be printed on the print media; and updating, by the processor, the one or more print head parameters, wherein updating the one or more print head parameters includes at least updating the rotation speed of the polygon mirror.

In some examples, the method further comprises determining, by the processor, a count of laser beams to be used to print content.

In some examples, the method further comprises modifying the count of laser beams to be used to print content based on the updated resolution.

In some examples, the polygon mirror comprises a plurality of faces.

In some examples, the method further comprises determining a count of faces of the plurality of faces to be used to print content based on the updated resolution.

In accordance with various examples of the present disclosure a method is provided. The method may comprise: receiving, by a processor, one or more configuration parameters associated with the printing apparatus, wherein the one or more configuration parameters include at least a resolution at which content is to be printed on a print media and a media traversal speed; determining, by the processor, a measure of skew at which the one or more laser beams are configured to sweep a width of the print media based on the one or more configuration parameters;

In some examples, the method further comprises: receiving, by the processor, content to be printed on the print media; and modifying, by the processor, the content to introduce a second measure of skew in the content, wherein printing of the modified content generates a printed content with zero degrees skew.

In some examples, the method further comprises determining a dot size based on the resolution at which the content is to be printed.

In some examples, the measure of skew is determined based on the dot size.

In some examples, the method further comprises determining by the processor a count of laser beams being used write content.

In some examples, the method further comprises determining an amount of content to be printed by each of the laser beams in the count of laser beams.

In some examples, the measure of skew is determined for each laser beam in the count of laser beams, and wherein the measure of skew for each laser beam is determined based on the amount of content printed by each laser beam in the count of laser beams.

In accordance with various examples of the present disclosure, a print head engine apparatus is provided. The print head engine apparatus may comprise: a top chassis portion; and a bottom chassis portion pivotally coupled to the bottom chassis portion, wherein the bottom chassis portion is movable between a first position and a second position, and wherein in the first position, the bottom chassis portion is coupled to the top chassis portion through a latch, and wherein in the second position the bottom chassis portion is positioned away from the top chassis portion.

In some examples, the top chassis portion comprises a first top chassis portion and a second top chassis portion, and wherein the bottom chassis portion comprises a first bottom chassis portion and a second bottom chassis portion.

In some examples, the first top chassis portion is fixedly coupled to the back-spine section of a printing apparatus, wherein the second top chassis portion is pivotally coupled to the second bottom chassis portion.

In some examples, the second bottom chassis portion is fixedly coupled to the back-spine section of a printing apparatus, wherein the first bottom chassis portion is pivotally coupled to the second bottom chassis portion.

In some examples, the first bottom chassis portion is pivotally coupled to the first top chassis portion.

In accordance with various examples of the present disclosure a method for synchronization between a printing apparatus and a print head is provided. The method may comprise: receiving a print head ready signal and a laser position signal from the print head; and in response to the reception of the print head ready signal and the laser position signal, causing the traversal of a print media in the printing apparatus by a predetermined distance; and transmitting a ready-to-print signal to the print head.

In some examples, the predetermined distance is deterministic based on a resolution at which the content is to be printed on the print media.

In some examples, the print head ready signal is indicative of a polygon mirror in the print head reaching a determined rotation speed.

In some examples, the laser position signal is indicative of a determined position of a writing laser on the polygon mirror.

In accordance with various examples of the present disclosure a method for synchronization between a printing apparatus and a print head is provided. The method may comprise: causing a polygon mirror in the print head to rotate at a predetermined rotation speed; in response to the polygon mirror rotating at the predetermined rotation speed, generating a print head ready signal; receiving an SOL signal from an SOL detector; generating a laser position signal in response to reception of the SOL signal; transmitting the laser position signal and the print head ready signal to a control unit of the printing apparatus; and receiving a ready to print signal from the control unit of the printing apparatus in response to the transmission of the laser position signal and the print head ready signal.

In some examples, the ready to print signal is indicative of the traversal of the print media by a predetermined distance.

In some examples, the predetermined distance is deterministic based on a resolution at which the content is to be printed on the print media.

In some examples, the laser position signal is a start of a blanking period, wherein the blanking period corresponds to a timer period in which the writing laser is directed to a location other than the print media.

In accordance with various examples of the present disclosure a method is provided. The method may comprise: receiving, by a processor, one or more configuration parameters associated with the printing apparatus, wherein the one or more configuration parameters include at least a resolution at which content is to be printed on a print media and a media traversal speed; determining, by the processor, a measure of skew at which the one or more laser beams are configured to sweep a width of the print media based on the one or more configuration parameters; receiving, by the processor, content to be printed on the print media; and modifying, by the processor, the content to introduce a second measure of skew in the content, wherein printing of the modified content generates a printed content with zero degrees skew.

In accordance with various examples of the present disclosure a computer-implemented method is provided. The computer-implemented method may comprise: triggering an ultraviolet (UV) light emission from a UV light source onto a print media associated with a printing apparatus; detecting a reflected light from the print media; generating a light intensity indication based on the reflected light; and determining whether the print media is supported by the printing apparatus based on whether the light intensity indication satisfies a light intensity threshold.

In some examples, the computer-implemented method further comprises: determining that the light intensity indication satisfies the light intensity threshold; and in response to determining that the light intensity indication satisfies the light intensity threshold, determining that the print media is supported by the printing apparatus.

In some examples, the computer-implemented method further comprises determining that the light intensity indication does not satisfy the light intensity threshold; and in response to determining that the light intensity indication does not satisfy the light intensity threshold, determining that the print media is not supported by the printing apparatus.

In accordance with various examples of the present disclosure a computer-implemented method is provided. The computer-implemented method may comprise: triggering an ultraviolet (UV) light emission from a UV light source onto a print media associated with a printing apparatus; detecting a reflected light from the print media; generating a red light intensity indication based on the reflected light; generating a green light intensity indication based on the reflected light; generating a blue light intensity indication based on the reflected light; and determining whether the print media is supported by the printing apparatus based on whether at least one of the red light intensity indication, the green light intensity indication, and the blue light intensity indication satisfies a light intensity threshold.

In some examples, the computer-implemented method further comprises: determining that at least one of the red light intensity indication, the green light intensity indication, and the blue light intensity indication satisfies the light intensity threshold; and in response to determining that at least one of the red light intensity indication, the green light intensity indication, and the blue light intensity indication satisfies the light intensity threshold, determining that the print media is supported by the printing apparatus.

In some examples, the computer-implemented method further comprises: determining that none of the red light intensity indication, the green light intensity indication, and the blue light intensity indication satisfies the light intensity threshold; and in response to determining that none of the red light intensity indication, the green light intensity indication, and the blue light intensity indication satisfies the light intensity threshold, determining that the print media is not supported by the printing apparatus.

In accordance with various examples of the present disclosure a computer-implemented method is provided. The computer-implemented method may comprise: triggering an ultraviolet (UV) light emission from a UV light source onto a print media associated with a printing apparatus; detecting a reflected light from the print media; generating a red light intensity indication based on the reflected light; generating a green light intensity indication based on the reflected light; generating a blue light intensity indication based on the reflected light; and determining a print media signature associated with the print media based on the red light intensity indication, the green light intensity indication, and the blue light intensity indication.

In some examples, determining the print media signature associated with the print media further comprises: comparing the red light intensity indication with a light intensity threshold; comparing the green light intensity indication with the light intensity threshold; and comparing the blue light intensity indication with the light intensity threshold.

In some examples, determining the print media signature associated with the print media further comprises: comparing the red light intensity indication with a first light intensity threshold and a second light intensity threshold; comparing the green light intensity indication with the first light intensity threshold and the second light intensity threshold; and comparing the blue light intensity indication with the first light intensity threshold and the second light intensity threshold.

In accordance with various examples of the present disclosure a computer-implemented method is provided. The computer-implemented method may comprise: triggering an ultraviolet (UV) light emission from a UV light source onto a print media associated with a printing apparatus; detecting a reflected light from the print media; generating a light intensity indication based on the reflected light; and determining a print media signature associated with the print media based on the light intensity indication.

In some examples, determining the print media signature associated with the print media further comprises: comparing the light intensity indication with a first light intensity threshold and a second light intensity threshold.

In accordance with various examples of the present disclosure, a printing apparatus is provided.

In some examples, the printing apparatus may comprise: a first media guard bar and a second media guard bar disposed on a top surface of a bottom chassis portion, wherein a print media travels between the first media guard bar and the second media guard bar; a first media sensor holding bar disposed on a first side surface of the first media guard bar; a first media sensor slidably disposed on a first bottom surface of the first media guard bar and configured to emit a first ultraviolet (UV) light on the print media; a second media sensor holding bar disposed on a second side surface of the second media guard bar; a second media sensor slidably disposed on a second bottom surface of the second media guard bar and configured to emit a second ultraviolet (UV) light on the print media.

In some examples, the first media sensor is configured to detect a first media edge of the print media, wherein the first media sensor is configured to detect a second media edge of the print media.

In some examples, when detecting the first media edge of the print media, the first media sensor is configured to detecting a first reflected light from the print media, wherein, when detecting the second media edge of the print media, the second media sensor is configured to detecting a second reflected light from the print media.

In accordance with various examples of the present disclosure a computer-implemented method is provided. The computer-implemented method may comprise: detecting a first media edge of a print media associated with a printing apparatus; determining a first media edge position based on the first media edge; detecting a second media edge of the print media associated with the printing apparatus; determining a second media edge position based on the second media edge; determining whether a laser travel path associated with a laser subsystem of the printing apparatus overlaps with at least one of the first media edge positions or the second media edge positions; and in response to determining that the laser travel path overlaps with the first media edge position or the second media edge position, causing the laser subsystem to be turned off.

In some examples, the computer-implemented method further comprises: in response to determining that the laser travel path overlaps with the first media edge position or the second media edge position, causing adjusting the laser travel path.

In accordance with various examples of the present disclosure, a printing apparatus is provided.

In some examples, the printing apparatus may comprise: a bottom chassis portion comprising a height limiter panel, wherein at least one bottom rib element protrudes from a top surface of the height limiter panel; and a top chassis portion comprising a height limiter groove, wherein at least one top rib element protrudes from a bottom surface of the height limiter groove.

In some examples, a distance between a top surface of one of the at least one bottom rib element and a bottom surface of one of the at least one top rib elements is 0.4 millimeters.

In some examples, a first bottom rib element and a second bottom rib element protrude from the top surface of the height limiter panel, wherein a print media travels between the first bottom rib element and the second bottom rib element.

In some examples, the printing apparatus further comprises: a biasing mechanism disposed on a bottom surface of the height limiter panel, wherein the biasing mechanism comprises: a supporting beam disposed on the bottom surface of the height limiter panel, and a spring element, wherein a first end of the spring element is secured to the supporting beam and a second end of the spring element is secured to the bottom surface of the height limiter panel.

In some examples, the bottom chassis portion further comprises a fixed panel, wherein a plurality of locking rib elements protrude from a side surface of the height limiter panel, wherein a plurality of locking groove elements are disposed on a side surface of the fixed panel, wherein the height limiter panel is secured to the fixed panel through the plurality of locking rib elements and the plurality of locking groove elements.

In accordance with various examples of the present disclosure, a printing apparatus is provided. In some examples, the printing apparatus may comprise: a laser print head; and at least a first laser source and a second laser source in electronic communication with the laser print head.

In some examples, the laser print head is configured to generate at least one laser control signal in order to: cause the first laser source to generate a first laser beam incident on a target location of a print media, and cause the second laser source to generate a second laser beam incident on the target location of the print media such that content is impinged on the print media.

In some examples, the target location comprises a width of the print media, and wherein laser print head is configured to cause the first laser beam and the second laser beam to sweep the width of the print media concurrently.

In some examples, the output of the first laser beam and the output of the second laser beam are superimposed onto one another in order to impinge the content onto the print media.

In some examples, the content comprises one or more dots.

In some examples, the first laser source and the second laser source are oriented in a perpendicular arrangement with respect to one another.

In some examples, the first laser source and the second laser source each comprise multi-mode lasers.

In some examples, the laser print head is configured to: cause the first laser source to generate the first laser beam at a first power output, and cause the second laser source to generate the second laser beam at a second power output that is different from the first power output.

In some examples, the first power output and the second power output comprise configurable parameters.

In some examples, the configurable parameters correspond with a print resolution.

In some examples, the laser print head is configured to generate a first laser control signal in order to: cause the first laser source to generate a pre-energizing beam incident on a target location of a print media; and subsequent to causing the first laser source to generate the pre-energizing beam, cause the second laser source to generate a writing beam incident on the target location of the print media.

In some examples, the laser print head is configured to cause the second laser source to generate the writing beam in response to determining that a condition of the print media satisfies an activation threshold.

In some examples: the first laser source comprises a single-mode laser, and the second laser source comprises a multi-mode laser.

In some examples, the pre-energizing beam impinges a dash onto the print media, and the writing beam impinges a dot superimposed thereon.

In some examples, the laser print head is configured to cause the second laser source to generate the writing beam within a millisecond of causing the first laser source to generate the pre-energizing beam.

In some examples, the first laser source is configured to generate the pre-energizing beam at a first frequency, and the second laser source is configured to generate a writing beam at a second frequency.

In some examples, the first frequency is lower than the second frequency.

In some examples, the first laser source is configured to be in an off state when traversing a portion of the print media where no content is to be printed.

In some examples, a high-quality dimension of the pre-energizing beam is oriented to a line width of the print media.

In some examples, a resolution band of the pre-energizing beam matches a resolution band of the writing beam.

In some examples, one or more of the first laser source and the second laser source are in a deactivated state when not aimed at the target area of the print media.

In accordance with various examples of the present disclosure, a printing apparatus is provided. In some examples, the printing apparatus may comprise: a laser print head; and a laser print head controller in electronic communication with the laser print head, wherein the laser print head controller is configured to: in response to receiving data associated with a printed media of the printing apparatus, determine, based at least in part on analysis of the data, one or more operational parameters of the printing apparatus.

In some examples, the laser print head controller is further configured to determine the one or more operational parameters based at least in part on a stored correction lookup table.

In some examples, the laser print head controller is further configured to: transmit a control signal to cause the laser print head to adjust one or more operational parameters of the printing apparatus.

In some examples, adjusting the one or more operational parameters comprises adjusting one or more of a timing or a power output associated with at least one of the laser sources.

In some examples, the operational parameters are associated with print resolution parameters.

In some examples, the printing apparatus further comprises a sensor in electronic communication with the laser print head controller.

In some examples, the sensor is located downstream in relation to the print media.

In some examples, the sensor is configured to: obtain image data associated with the print media having content printed thereon.

In some examples, the sensor comprises a linear sensor or an image sensor.

In some examples, the sensor is configured to provide real-time feedback during printing operations of the printing apparatus.

In accordance with various examples of the present disclosure, a printing apparatus is provided. In some examples, the printing apparatus may comprise: a print media assembly; an optical assembly comprising one or more laser sources; and a laser print head controller in electronic communication with the print media assembly and the optical assembly.

In some examples, the laser print head controller is configured to determine a required number of write cycles.

In some examples, the required number of write cycles is based at least in part on a print media type, a sweep rate, and a required print speed.

In some examples, the laser print head controller is configured to cause the one or more laser sources to perform a plurality of write cycles in order to impinge content onto a print media.

In some examples, the laser print head controller is further configured to: cause the print media assembly to stop traversal of the print media; and cause the one or more laser sources to perform the plurality of write cycles by generating one or more laser beam incident on the print media.

In some examples, the laser print head controller is configured to: subsequent to causing the one or more laser sources to perform the plurality of write cycles, cause the print media assembly to start traversal of the print media.

In some examples, performing the plurality of write cycles comprises causing the one or more laser sources to generate one or more laser beams incident on the print media while the print media traverses the printing apparatus.

In some examples, the laser print head controller is further configured to cause the optical assembly to implement wobble-correction optics.

In some examples, performing the plurality of write cycles comprises: sequentially sweeping a first portion of a first print media width.

In some examples, performing the plurality of write cycles further comprises: subsequent to sweeping the first portion of the first print media width, sequentially sweeping a second portion of a second print media width.

In accordance with various examples of the present disclosure, an optical assembly is provided. In some examples, the optical assembly may comprise: a collimating component comprising at least a first plurality of lenses and a second plurality of lenses, wherein the collimating component is configured to collimate a laser beam generated by a laser source.

In some examples, the first plurality of lenses and the second plurality of lenses are configured to move independently with respect to one another.

In some examples, the laser source comprises a multimode laser.

In some examples, the laser source comprises a single-mode laser.

In some examples, the optical assembly further comprises a focusing component configured to focus an output of the collimating component.

In some examples, the optical assembly further comprises a beam control component configured to condition an output of the collimating component.

In some examples, the beam control component comprises one or more prism elements.

In some examples, the one or more prism elements comprises an anamorphic prism pair.

In some examples, the beam control component is further configured to condition the output of the collimating component by adjusting a relative position of the anamorphic prism pair.

In some examples, the optical assembly further comprises a beam measurement element configured to detect one or more parameters of the laser beam, wherein the beam control component is configured to condition the output of the collimating component based at least in part on the one or more parameters of the laser beam.

In some examples, the one or more parameters comprises a detected divergence of the laser beam.

In accordance with various examples of the present disclosure, a print media is provided.

In some examples, the print media may comprise: a laser markable coating defining a top layer of the print media; and a reflective layer defining an intermediary layer of the print media.

In some examples, the print media further comprises an absorbing layer defining a second intermediary layer of the print media.

In some examples, the laser markable coating comprises at least one color former, at least one color developer, and at least one optothermal converting agent.

In some examples, the at least one color former comprises a leuco dye.

In some examples, the at least one color developer comprises a proton donor.

In some examples, the reflective layer comprises a metallic layer or metallic particles.

In some examples, the metallic layer or metallic particles comprise one or more of aluminum, nickel, bronze, and steel.

In some examples, the reflective layer comprises hexagonal boron nitride.

In some examples, the absorbing layer comprises titanium dioxide.

In some examples, the absorbing layer comprises a ceramic material or metallic oxide.

In accordance with various examples of the present disclosure a computer-implemented method is provided. The computer-implemented method may comprise: receiving, by a controller of a print head of a printing apparatus, print data indicating at least a first power level; receiving, by the controller, a darkness setting input; adjusting, by the controller, the first power level to a second power level based at least in part on the darkness setting input; receiving, by the controller, a contrast setting input; adjusting, by the controller, the second power level to a third power level based at least in part on the contrast setting input; and providing, by the controller, the third power level to a laser power control system of the print head.

In some examples, the first power level is associated with a first dot to be printed by the print head on a print media.

In some examples, the laser power control system of the print head is configured to cause a laser subsystem of the print head to print the first dot at the third power level.

In some examples, the computer-implement method further comprises: receiving, by a processor of the printing apparatus, raw print data; generating, by the processor, an image buffer based at least in part on the raw print data; and providing, by the processor, the image buffer to the controller of the print head.

In some examples, when adjusting the first power level to the second power level, the computer-implemented method further comprises: in response to receiving a darkness increase associated with the darkness setting input, increasing the first power level to the second power level.

In some examples, when adjusting the first power level to the second power level, the computer-implemented method further comprises: in response to receiving a darkness decrease associated with the darkness setting input, decreasing the first power level to the second power level.

In some examples, the first power level is between 0% (inclusive) and 100% (inclusive).

In some examples, the darkness setting input is between −100% (inclusive) and 100% (inclusive).

In some examples, adjusting the first power level to the second power level is further based on a darkness step size ratio.

In some examples, the darkness step size ratio is 25%.

In some examples, adjusting the first power level to the second power level is further based on a darkness setting lookup table.

In some examples, when adjusting the first power level to the second power level, the computer-implemented method further comprises: in response to receiving a contrast increase associated with the contrast setting input and determining that the second power level satisfies a power level threshold, increasing the second power level to the third power level.

In some examples, when adjusting the first power level to the second power level, the computer-implemented method further comprises: in response to receiving a contrast increase associated with the contrast setting input and determining that the second power level does not satisfy a power level threshold, decreasing the second power level to the third power level.

In some examples, when adjusting the first power level to the second power level, the computer-implemented method further comprises: in response to receiving a contrast decrease associated with the contrast setting input and determining that the second power level satisfies a power level threshold, decreasing the second power level to the third power level.

In some examples, when adjusting the first power level to the second power level, the computer-implemented method further comprises: in response to receiving a contrast decrease associated with the contrast setting input and determining that the second power level does not satisfy a power level threshold, increasing the second power level to the third power level.

In some examples, adjusting the second power level to the third power level is further based on a contrast step size ratio.

In some examples, the contrast step size ratio is 25%.

In some examples, adjusting the second power level to the third power level is further based on a contrast setting lookup table.

In accordance with various examples of the present disclosure a computer-implemented method is provided. The computer-implemented method may comprise: receiving, by a controller of a print head of a printing apparatus, print data indicating at least a first duty cycle; receiving, by the controller, a darkness setting input; adjusting, by the controller, the first duty cycle to a second duty cycle based at least in part on the darkness setting input; receiving, by the controller, a contrast setting input; adjusting, by the controller, the second duty cycle to a third duty cycle based at least in part on the contrast setting input; and providing, by the controller, the third duty cycle to a laser power control system of the print head.

In some examples, the first duty cycle is associated with a first dot to be printed by the print head on a print media.

In some examples, the laser power control system of the print head is configured to cause a laser subsystem of the print head to print the first dot at the third duty cycle.

In some examples, the computer-implemented method further comprises: receiving, by a processor of the printing apparatus, raw print data; generating, by the processor, an image buffer based at least in part on the raw print data; and providing, by the processor, the image buffer to the controller of the print head.

In some examples, when adjusting the first duty cycle to the second duty cycle, the computer-implemented method further comprises: in response to receiving a darkness increase associated with the darkness setting input, increasing the first duty cycle to the second duty cycle.

In some examples, when adjusting the first duty cycle to the second duty cycle, the computer-implemented method further comprises: in response to receiving a darkness decrease associated with the darkness setting input, decreasing the first duty cycle to the second duty cycle.

In some examples, the first duty cycle is between 0% (inclusive) and 100% (inclusive).

In some examples, the darkness setting input is between −100% (inclusive) and 100% (inclusive).

In some examples, adjusting the first duty cycle to the second duty cycle is further based on a darkness step size ratio.

In some examples, the darkness step size ratio is 25%.

In some examples, adjusting the first duty cycle to the second duty cycle is further based on a darkness setting lookup table.

In some examples, when adjusting the first duty cycle to the second duty cycle, the computer-implemented method further comprises: in response to receiving a contrast increase associated with the contrast setting input and determining that the second duty cycle satisfies a duty cycle threshold, increasing the second duty cycle to the third duty cycle.

In some examples, when adjusting the first duty cycle to the second duty cycle, the computer-implemented method further comprises: in response to receiving a contrast increase associated with the contrast setting input and determining that the second duty cycle does not satisfy a power level threshold, decreasing the second duty cycle to the third duty cycle.

In some examples, when adjusting the first duty cycle to the second duty cycle, the computer-implemented method further comprises: in response to receiving a contrast decrease associated with the contrast setting input and determining that the second duty cycle satisfies a power level threshold, decreasing the second duty cycle to the third duty cycle.

In some examples, when adjusting the first duty cycle to the second duty cycle, the computer-implemented method further comprises: in response to receiving a contrast decrease associated with the contrast setting input and determining that the second duty cycle does not satisfy a power level threshold, increasing the second duty cycle to the third duty cycle.

In some examples, adjusting the second duty cycle to the third duty cycle is further based on a contrast step size ratio.

In some examples, the contrast step size ratio is 25%.

In some examples, adjusting the second duty cycle to the third duty cycle is further based on a contrast setting lookup table.

In accordance with various examples of the present disclosure a computer-implemented method is provided. The computer-implemented method may comprise: determining, by a controller of a print head of a printing apparatus, a first dot, a second dot, and a third dot from an image buffer, wherein the second dot is between the first dot and the third dot; determining, by the controller, a first power level associated with the first dot, a second power level associated with the second dot, and a third power level associated with the third dot; and in response to receiving a smoothness setting input or a sharpness setting input, adjusting the second power level based at least in part on the first power level and the third power level.

In accordance with various examples of the present disclosure a computer-implemented method is provided. The computer-implemented method may comprise: determining, by a controller of a print head of a printing apparatus, print data; determining, by the controller and based at least in part on the print data, a target print speed; and determining, by the controller and based at least in part on the target print speed, a target media temperature.

In some examples, the target print speed is determined based at least in part on a lookup table.

In some examples, the computer-implemented method further comprises: in response to determining, by the controller, that a current media temperature is within a predetermined range of the target media temperature, providing, by the controller, a control indication to cause at least one laser of the printing apparatus to perform power compensation operations.

In some examples, causing the at least one laser of the printing apparatus to perform power compensation operations comprises: determining, by the controller and via one or more sensors, that the current media temperature is below a low threshold temperature value; and providing, by the controller, a second control indication to cause the at least one laser to increase an amount of output power.

In some examples, causing the at least one laser of the printing apparatus to perform power compensation operations comprises: determining, by the controller, and via one or more sensors that the current media temperature is above a high threshold temperature value; and providing, by the controller, a second control indication to cause the at least one laser to decrease an amount of output power.

In some examples, the computer-implemented method further comprises: determining, by the controller and via one or more sensors, that a current media temperature is below a second predetermined range of the target media temperature that exceeds a power compensation range; and providing, by the controller, a control indication to cause an increase to a preheating laser temperature of at least one preheating laser.

In some examples, the computer-implemented method further comprises: determining, by the controller and via one or more sensors, that a current media temperature is above a second predetermined range of the target media temperature that exceeds a power compensation range; and providing, by the controller, a control indication to cause the printing apparatus to halt operations for a predetermined time period.

In some examples, the computer-implemented method further comprises: in response to determining, by a controller of a print head of a printing apparatus, that no further printing operations are required, providing, by the controller, a control indication to cause at least a portion of an unprinted media to retract within a feed roller.

In accordance with various examples of the present disclosure, a printing apparatus is provided. In some examples, the printing apparatus may comprise: a preheating chamber having at least one moveable heat spreader element disposed at a first position relative to a portion of a print media; and a printer control unit in electronic communication with the at least one moveable heat spreader element that is configured to: responsive to detecting that the portion of the print media has exited a laser writing location, provide a control indication to cause the at least one moveable heat spreader element to move from the first position to a second position relative to the print media.

In some examples, the at least one moveable heat spreader element is driven by an actuator control unit that is operatively coupled to the printer control unit.

In some examples, the at least one moveable heat spreader element is attached to/operatively coupled to a moveable arm or moveable component.

In accordance with various examples of the present disclosure, a printing apparatus is provided.

In some examples, the printing apparatus may comprise: a laser print head; and at least a first laser source in electronic communication with the laser print head, wherein the laser print head is configured to generate at least one laser control signal in order to generate a pre-emphasis driving signal at the start of at least one print dot for a time period that is less than the overall dot time.

In some examples, the pre-emphasis driving signal is between 10% and 50% higher than a laser driving signal subsequent to the time period.

In accordance with various examples of the present disclosure a method for automatically tuning a printing apparatus is provided. The method may comprise: providing, by at least one processing circuitry, a control indication to disable one or more lasers of the printing apparatus; driving, by the at least one processing circuitry, a digital-to-analog converter (DAC) output to full scale, wherein the DAC is configured to drive at least one laser of the printing apparatus; and compensating, by the at least one processing circuitry, a gain value as required to increase or decrease an output from a differential amplifier that is operatively coupled to the DAC.

In some examples, the at least one processing circuitry comprises a microcontroller unit.

In some examples, the method further comprises: providing, by the at least one processing circuitry, a control indication to start up the printing apparatus.

In some examples, the method further comprises: in an instance in which a threshold time period has elapsed since the printing apparatus has been power cycled, or in an instance in which an ambient temperature associated with the printing apparatus is outside a predetermined range, periodically performing, by the at least one processing circuitry, recompensating operations.

In accordance with various examples of the present disclosure, a printing apparatus is provided. In some examples, the printing apparatus may comprise: a housing; at least one integrated laser component at least partially disposed within the housing, wherein the integrated laser component comprises a plurality of lasers; and a controller component in electronic communication with the integrated laser component.

In some examples, the plurality of lasers comprises four multi-mode lasers arranged in a 2×2 array.

In some examples, the printing apparatus further comprises a polygon mirror configured to direct an input beam of the at least one integrated laser component; and a lens element configured to magnify an output beam of the polygon mirror in a cross-scan dimension onto a print media.

In some examples, the lens element comprises a magnifying cylinder lens.

In some examples, each of the plurality of lasers is concurrently aligned using a beam shaping and steering system comprising at least one of a collimating lens, a cylinder lens, a leveling prism, and a wedge prism.

In accordance with various examples of the present disclosure a method for for scaling a print speed of a printing apparatus is provided. The method may comprise: detecting, by at least one processing circuitry, a preheat status associated with a print media; and automatically scaling, by the at least one processing circuitry, the print speed based at least in part on the preheat status.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of the example embodiments described above may be combined to, for example, improve the safety of the laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

What is claimed is:

1. A method comprising:

actuating, by a processor, a first roller and a second roller to cause traversal of print media along a first direction, wherein the first roller is positioned upstream of the second roller along the first direction;

causing, by the processor, the first roller to stop rotating at a first time instant;

determining a time period based on one or more print media characteristics and a print media traversal speed; and causing, by the processor, the second roller to stop rotating at a second time instant, wherein the second time instant is chronologically later than the first time instant, wherein the second time instant is determined based on the time period.

2. The method of claim 1, further comprising causing a print head to print content on the print media in response to stopping the rotation of the second roller.

3. The method of claim 2, wherein the first roller is positioned upstream of the print head, and wherein the second roller is positioned downstream of the print head.

4. The method of claim 1 further comprising causing a traversal of the first roller and the second roller along a second direction, wherein the traversal of the first roller and the second roller along the second direction causes the first roller and the second roller to be spaced apart from the print media.

5. The method of claim 1, wherein the one or more print media characteristics comprises at least one of a type of the print media, or a thickness of the print media.

6. A printing apparatus comprising:

a print head assembly comprising at least a bottom chassis portion configured to receive a print media, a frame movably positioned above the bottom chassis portion along a vertical axis of the printing apparatus, and at least one biasing member coupled to the bottom chassis portion, wherein the at least one biasing member is configured to exert a force to move the frame between a first position and a second position, wherein the frame, in the first position, is spaced apart from the bottom chassis portion and wherein the frame, in the second position, presses the print media against the bottom chassis portion.

7. A printing apparatus comprising:

a first roller;

a second roller positioned downstream of the first roller along a first direction, wherein the first roller and the second roller facilitate traversal of print media in the first direction;

a processor communicatively coupled to the first roller and the second roller; wherein the processor is configured to:

actuate the first roller and the second roller to cause traversal of the print media in the first direction, cause the first roller to stop rotating at a first time instant;

determine a time period based on one or more print media characteristics and a print media traversal speed; and cause the second roller to stop rotating at a second time instant, wherein the second time instant is chronologically later than the first time instant, wherein the second time instant is determined based on the time period.

8. The printing apparatus of claim 7, wherein each of the first roller and the second roller comprises a biasing member and a roller, wherein the biasing member is coupled to the roller, wherein the biasing member is configured to apply a biasing force on the roller, along a second direction, causing the roller to abut the print media.

* * * * *